US011839214B2

(12) United States Patent
Riediger et al.

(10) Patent No.: US 11,839,214 B2
(45) Date of Patent: *Dec. 12, 2023

(54) FUNGICIDAL MIXTURE COMPRISING SUBSTITUTED PYRIDINES

(71) Applicant: BASF SE, Ludwigshafen (DE)

(72) Inventors: Nadine Riediger, Limburgerhof (DE); Bernd Mueller, Ludwigshafen (DE); Ana Escribano Cuesta, Ludwigshafen (DE); Michael Seet, Ludwigshafen (DE); Waldemar Bernat, Limburgerhof (DE); Lutz Brahm, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 312 days.

This patent is subject to a terminal disclaimer.

(21) Appl. No.: 16/769,404

(22) PCT Filed: Dec. 6, 2018

(86) PCT No.: PCT/EP2018/083785

§ 371 (c)(1),
(2) Date: Jun. 3, 2020

(87) PCT Pub. No.: WO2019/115343

PCT Pub. Date: Jun. 20, 2019

(65) Prior Publication Data

US 2021/0127674 A1 May 6, 2021

(30) Foreign Application Priority Data

Dec. 15, 2017 (EP) .................................... 17207734
Apr. 12, 2018 (EP) .................................... 18167020

(51) Int. Cl.
*A01N 43/42* (2006.01)
*A01N 43/56* (2006.01)

(52) U.S. Cl.
CPC ............. *A01N 43/42* (2013.01); *A01N 43/56* (2013.01)

(58) Field of Classification Search
None
See application file for complete search history.

(56) References Cited

U.S. PATENT DOCUMENTS 11,064,697 B2 * 7/2021 Grammenos ........ C07D 401/14

FOREIGN PATENT DOCUMENTS

WO WO-2017/016915 A1 2/2017
WO WO-2017016915 A1 * 2/2017 ............. A01N 43/40
WO WO-2018/054711 A1 3/2018
WO WO-2018/054721 A1 3/2018
WO WO-2018/054723 A1 3/2018
WO WO-2018/065182 A1 4/2018
WO WO-2018/073110 A1 4/2018
WO WO-2018/134127 A1 7/2018
WO WO-2018/149754 A1 8/2018
WO WO-2018/184882 A1 10/2018
WO WO-2018/219725 A1 12/2018
WO WO-2019/145174 A1 8/2019
WO WO-2019/145176 A1 8/2019
WO WO-2019/145177 A1 8/2019
WO WO-2019/145178 A1 8/2019
WO WO-2019/154663 A1 8/2019
WO WO-2019/154665 A1 8/2019

OTHER PUBLICATIONS

International Application No. PCT/EP2018/083785, International Search Report and Written Opinion, dated Jan. 16, 2019.
European Search Report for EP Patent Application No. 17207734.9, dated Feb. 22, 2018, 3 pages.
European Search Report for EP Patent Application No. 18167020.9, dated Jun. 12, 2018, 3 pages.

* cited by examiner

*Primary Examiner* — Amanda L. Aguirre
(74) *Attorney, Agent, or Firm* — MARSHALL, GERSTEIN & BORUN LLP

(57) ABSTRACT

The present invention relates to fungicidal mixtures comprising at least one substituted pyridines (compounds I) and at least one active compound II in a weight ratio of from 100:1 to 1:100; to a method for controlling phytopathogenic harmful fungi using mixtures of at least one compound I and at least one compound II in a weight ratio of from 100:1 to 1:100; to the use of mixtures comprising compounds I and compounds II for controlling phytopathogenic harmful fungi; to agrochemical compositions comprising these mixtures; and to agrochemical compositions further comprising seed.

16 Claims, No Drawings

FUNGICIDAL MIXTURE COMPRISING SUBSTITUTED PYRIDINES

CROSS-REFERENCE TO RELATED APPLICATIONS

This is the U.S. national phase of International Application No. PCT/EP2018/080597, filed Dec. 6, 2018, which claims the benefit of European Patent Application No. 17207734.9, filed on Dec. 15, 2017 and European Patent Application No. 18167020.9, filed Apr. 12, 2018.

DESCRIPTION

The present invention relates to a fungicidal mixture comprising, as active components 1) at least one active compound of the formula I, or an N-oxide, or an agriculturally useful salt thereof,

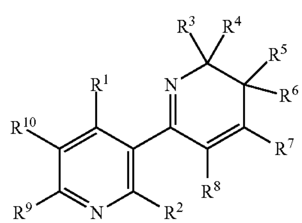

I wherein $R^1$ is in each case independently selected from hydrogen, halogen, $C_1$-$C_6$-alkyl and $C_1$-$C_6$-halogenalkyl;

$R^2$ is in each case independently selected from hydrogen, halogen, $C_1$-$C_6$-alkyl and $C_1$-$C_6$-halogenalkyl;

$R^3$, $R^4$ are independently selected from $C_1$-$C_6$-alkyl, $C_2$-$C_6$-alkenyl, $C_2$-$C_6$-alkynyl, $C_1$-$C_6$-halogenalkyl, $C_2$-$C_6$-halogenalkenyl and $C_2$-$C_6$-halogenalkynyl;

$R^5$ is halogen;

$R^6$ is halogen;

$R^7$, $R^8$ together with the carbon atoms to which they are bound form a ring A, wherein the ring A is phenyl and wherein the ring A is substituent by $(R^{78})_o$, wherein o is 0, 1, 2 or 3; and $R^{78}$ are independently selected from halogen, $C_1$-$C_6$-alkyl, $C_1$-$C_6$-alkoxy, $C_1$-$C_6$-halogenalkyl and $C_1$-$C_6$-halogenalkoxy;

$R^9$, $R^{10}$ are independently selected from H, halogen, $O(R^{95})$, $C_1$-$C_6$-alkyl and $C_1$-$C_6$-halogenalkyl; wherein $R^{95}$ is $C_1$-$C_6$-alkyl, $C_1$-$C_6$-halogenalkyl; and and as component 2) at least one active compound II selected from groups A) to 0), or an N-oxide, or an agriculturally useful salt thereof:

A) Respiration Inhibitors A)

Inhibitors of complex III at $Q_o$ site:azoxystrobin (A.1.1), coumethoxystrobin (A.1.2), coumoxystrobin (A.1.3), dimoxystrobin (A.1.4), enestroburin (A.1.5), fenaminstrobin (A.1.6), fenoxystrobin/flufenoxystrobin (A.1.7), fluoxastrobin (A.1.8), kresoxim-methyl (A.1.9), mandestrobin (A.1.10), metominostrobin (A.1.11), orysastrobin (A.1.12), picoxystrobin (A.1.13), pyraclostrobin (A.1.14), pyrametostrobin (A.1.15), pyraoxystrobin (A.1.16), trifloxystrobin (A.1.17), 2-(2-(3-(2,6-dichlorophenyl)-1-methyl-allylideneaminooxymethyl)-phenyl)-2-methoxyimino-N-methyl-acetamide (A.1.18), pyribencarb (A.1.19), triclopyricarb/chlorodincarb (A.1.20), famoxadone (A.1.21), fenamidone (A.1.21a), methyl-N-[2-[(1,4-dimethyl-5-phenyl-pyrazol-3-yl)oxylmethyl]phenyl]-N-methoxy-carbamate (A.1.22), 1-[3-chloro-2-[[1-(4-chlorophenyl)-1H-pyrazol-3-yl]oxymethyl]phenyl]-4-methyl-tetrazol-5-one (A.1.23), 1-[3-bromo-2-[[1-(4-chlorophenyl)pyrazol-3-yl]oxymethyl]phenyl]-4-methyl-tetrazol-5-one (A.1.24), metyltetrapole (A.1.25), 1-[2-[[1-(4-chlorophenyl)pyrazol-3-yl]oxymethyl]-3-fluoro-phenyl]-4-methyl-tetrazol-5-one (A.1.26), 1-[2-[[1-(2,4-dichlorophenyl)pyrazol-3-yl]oxymethyl]-3-fluoro-phenyl]-4-methyl-tetrazol-5-one (A.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]-oxymethyl]phenyl]-4-methyl-tetrazol-5-one (A.1.29), 1-[3-cyclopropyl-2-[[2-methyl-4-(1-methylpyrazol-3-yl)phenoxy]methyl]phenyl]-4-methyl-tetrazol-5-one (A.1.30), 1-[3-(difluoromethoxy)-2-[[2-methyl-4-(1-methylpyrazol-3-yl)phenoxy]methyl]phenyl]-4-methyl-tetrazol-5-one (A.1.31), 1-methyl-4-[3-methyl-2-[[2-methyl-4-(1-methyl pyrazol-3-yl) phenoxy] methyl]phenyl]tetrazol-5-one (A.1.32), 1-methyl-4-[3-methyl-2-[[1-[3-(trifluoromethyl)phenyl]-ethylideneamino]oxymethyl]phenyl]tetrazol-5-one (A.1.33), (42E)-5-[1-(2,4-dichlorophenyl)pyrazol-3-yl]-oxy-2-methoxyimino-N,3-dimethyl-pent-3-enamide (A.1.34), (Z,2E)-5-[1-(4-chlorophenyl)pyrazol-3-yl]oxy-2-methoxyimino-N,3-dimethyl-pent-3-enamide (A.1.35), pyriminostrobin (A.1.36), bifujunzhi (A.1.37), 2-(ortho-((2,5-dimethylphenyl-oxymethylen)phenyl)-3-methoxy-acrylic acid methylester (A.1.38).

Inhibitors of complex III at $Q_i$ site: cyazofamid (A.2.1), amisulbrom (A.2.2), [(6S,7R,8R)-8-benzyl-3-[(3-hydroxy-4-methoxy-pyridine-2-carbonyl)amino]-6-methyl-4,9-dioxo-1,5-dioxonan-7-yl] 2-methylpropanoate (A.2.3), fenpicoxamid (A.2.4), [(6S,7R,8R)-8-benzyl-3-[[4-methoxy-3-(propanoyloxymethoxy)pyridine-2-carbonyl]amino]-6-methyl-4,9-dioxo-1,5-dioxonan-7-yl] 2-methylpropanoate (A.2.5), florylpicoxamid (A.2.6).

Inhibitors of complex II: benodanil (A.3.1), benzovindiflupyr (A.3.2), bixafen (A.3.3), boscalid (A.3.4), carboxin (A.3.5), fenfuram (A.3.6), fluopyram (A.3.7), flutolanil (A.3.8), fluxapyroxad (A.3.9), furametpyr (A.3.10), isofetamid (A.3.11), isopyrazam (A.3.12), mepronil (A.3.13), oxycarboxin (A.3.14), penflufen (A.3.15), penthiopyrad (A.3.16),), pydiflumetofen (A.3.17), pyraziflumid (A.3.18), sedaxane (A.3.19), tecloftalam (A.3.20), thifluzamide (A.3.21), inpyrfluxam (A.3.22), pyrapropoyne (A.3.23), fluindapyr (A.3.28), methyl (E)-2-[2-[(5-cyano-2-methyl-phenoxy)methyl]phenyl]-3-methoxy-prop-2-enoate (A.3.30), isoflucypram (A.3.31), 2-(difluoromethyl)-N-(1,1,3-trimethyl-indan-4-yl)pyridine-3-carboxamide (A.3.32), 2-(difluoromethyl)-N-[(3R)-1,1,3-trimethyl-indan-4-yl]pyridine-3-carboxamide (A.3.33), 2-(difluoromethyl)-N-(3-ethyl-1,1-dimethyl-indan-4-yl)pyridine-3-carboxamide (A.3.34), 2-(difluoromethyl)-N-[(3R)-3-ethyl-1,1-dimethyl-indan-4-yl]pyridine-3-carboxamide (A.3.35), 2-(difluoromethyl)-N-(1,1-dimethyl-3-propyl-indan-4-yl)pyridine-3-carboxamide (A.3.36), 2-(difluoromethyl)-N-[(3R)-1,1-dimethyl-3-propyl-indan-4-yl]pyridine-3-carboxamide (A.3.37), 2-(difluoromethyl)-N-(3-isobutyl-1,1-dimethyl-indan-4-yl)pyridine-3-carboxamide (A.3.38), 2-(difluoromethyl)-N-[(3M)-3-isobutyl-1,1-dimethyl-indan-4-yl] pyridine-3-carboxamide (A.3.39),;

Other respiration inhibitors: diflumetorim (A.4.1); nitrophenyl derivates: binapacryl (A.4.2), dinobuton (A.4.3), dinocap (A.4.4), fluazinam (A.4.5), meptyldinocap (A.4.6), ferimzone (A.4.7); organometal compounds: fentin salts, e. g. fentin-acetate (A.4.8), fentin chloride (A.4.9) or fentin hydroxide (A.4.10); ametoctradin (A.4.11); silthiofam (A.4.12).

B) Sterol Biosynthesis Inhibitors (SBI Fungicides)

C14 demethylase inhibitors: triazoles: azaconazole (B.1.1), bitertanol (B.1.2), bromuconazole (B.1.3), cyproconazole (B.1.4), difenoconazole (B.1.5), diniconazole (B.1.6), diniconazole-M (B.1.7), epoxiconazole (B.1.8), fenbuconazole (B.1.9), fluquinconazole (B.1.10), flusilazole (B.1.11), flutriafol (B.1.12), hexaconazole (B.1.13), imibenconazole (B.1.14), ipconazole (B.1.15), metconazole (B.1.17), myclobutanil (B.1.18), oxpoconazole (B.1.19), paclobutrazole (B.1.20), penconazole (B.1.21), propiconazole (B.1.22), prothioconazole (B.1.23), simeconazole (B.1.24), tebuconazole (B.1.25), tetraconazole (B.1.26), triadimefon (B.1.27), triadimenol (B.1.28), triticonazole (B.1.29), uniconazole (B.1.30), 1-[re/-(2S;3R)-3-(2-chloro-phenyl)-2-(2,4-difluorophenyl)-oxiranylmethyl]-5-thiocyanato-1H-[1,2,4]triazole (B.1.31), 2-[re/-(2S;3R)-3-(2-chlorophenyl)-2-(2,4-difluorophenyl)-oxiranylmethyl]-2H-[1,2,4]triazole-3-thiol (B.1.32), 2-[2-chloro-4-(4-chlorophenoxy)phenyl]-1-(1,2,4-triazol-1-yl)pentan-2-ol (B.1.33), 1-[4-(4-chlorophenoxy)-2-(trifluoro-methyl)phenyl]-1-cyclopropyl-2-(1,2,4-triazol-1-yl)ethanol (B.1.34), 2-[4-(4-chloro-phenoxy)-2-(trifluoromethyl)phenyl]-1-(1,2,4-triazol-1-yl)butan-2-ol (B.1.35), 2-[2-chloro-4-(4-chlorophenoxy)phenyl]-1-(1,2,4-triazol-1-yl)butan-2-ol (B.1.36), ipfentrifluconazole (B.1.37), mefentrifluconazole (B.1.38), 2-[2-chloro-4-(4-chlorophenoxy)phenyl]-3-methyl-1-(1,2,4-triazol-1-yl)butan-2-ol (B.1.39), 2-[4-(4-chlorophenoxy)-2-(trifluoromethyl)phenyl]-1-(1,2,4-triazol-1-yl)pentan-2-ol (B.1.40), 2-[4-(4-fluorophenoxy)-2-(trifluoromethyl) phenyl]-1-(1,2,4-triazol-1-yl)propan-2-ol (B.1.41), 2-[2-chloro-4-(4-chlorophenoxy)phenyl]-1-(1,2,4-triazol-1-yl)pent-3-yn-2-ol (B.1.42), 2-(chloromethyl)-2-methyl-5-(p-tolylmethyl)-1-(1,2,4-triazol-1-ylmethyl) cyclopentanol (B.1.43); imidazoles: imazalil (B.1.44), pefurazoate (B.1.45), prochloraz (B.1.46), triflumizol (B.1.47); pyrimidines, pyridines and piperazines: fenarimol (B.1.49), pyrifenox (B.1.50), triforine (B.1.51), [3-(4-chloro-2-fluoro-phenyl)-5-(2,4-difluorophenyl) isoxazol-4-yl]-(3-pyridyl)methanol (B.1.52).

Delta14-reductase inhibitors: aldimorph (B.2.1), dodemorph (B.2.2), dodemorph-acetate (B.2.3), fenpropimorph (B.2.4), tridemorph (B.2.5), fenpropidin (B.2.6), piperalin (B.2.7), spiroxamine (B.2.8).

Inhibitors of 3-keto reductase: fenhexamid (B.3.1).

Other Sterol biosynthesis inhibitors: chlorphenomizole (B.4.1).

C) Nucleic Acid Synthesis Inhibitors

Phenylamides or acyl amino acid fungicides: benalaxyl (C.1.1), benalaxyl-M (C.1.2), kiralaxyl (C.1.3), metalaxyl (C.1.4), metalaxyl-M (C.1.5), ofurace (C.1.6), oxadixyl (C.1.7).

Other nucleic acid synthesis inhibitors: hymexazole (C.2.1), octhilinone (C.2.2), oxolinic acid (C.2.3), bupirimate (C.2.4), 5-fluorocytosine (C.2.5), 5-fluoro-2-(p-tolylmethoxy)pyrimidin-4-amine (C.2.6), 5-fluoro-2-(4-fluorophenylmethoxy)pyrimidin-4-amine (C.2.7), 5-fluoro-2-(4-chlorophenylmethoxy)pyrimidin-4 amine (C.2.8).

D) Inhibitors of Cell Division and Cytoskeleton

Tubulin inhibitors: benomyl (D.1.1), carbendazim (D.1.2), fuberidazole (D1.3), thiabendazole (D.1.4), thiophanate-methyl (D.1.5), 3-chloro-4-(2,6-difluorophenyl)-6-methyl-5-phenyl-pyridazine (D.1.6), 3-chloro-6-methyl-5-phenyl-4-(2,4,6-trifluorophenyl) pyridazine (D.1.7), N-ethyl-2-[(3-ethynyl-8-methyl-6-quinolyl)oxy]butanamide (D.1.8), N-ethyl-2-[(3-ethynyl-8-methyl-6-quinolyl)oxy]-2-methylsulfanyl-acetamide (D.1.9), 2-[(3-ethynyl-8-methyl-6-quinolyl) oxy]-N-(2-fluoroethyl)butanamide (D.1.10), 2-[(3-ethynyl-8-methyl-6-quinolyl)oxy]-N-(2-flu-oroethyl)-2-methoxy-acetamide (D.1.11), 2-[(3-ethynyl-8-methyl-6-quinolyl)oxy]-N-propyl-butanamide (D.1.12), 2-[(3-ethynyl-8-methyl-6-quinolyl)oxy]-2-methoxy-N-propyl-acetamide (D.1.13), 2-[(3-ethynyl-8-methyl-6-quinolyl)oxy]-2-methylsulfanyl-N-propyl-acetamide (D.1.14), 2-[(3-ethynyl-8-methyl-6-quinolyl)oxy]-N-(2-fluoroethyl)-2-methylsulfanyl-acetamide (D.1.15), 4-(2-bromo-4-fluoro-phenyl)-N-(2-chloro-6-fluoro-phenyl)-2,5-dimethyl-pyrazol-3-amine (D.1.16).

Other cell division inhibitors: diethofencarb (D.2.1), ethaboxam (D.2.2), pencycuron (D.2.3), fluopicolide (D.2.4), zoxamide (D.2.5), metrafenone (D.2.6), pyriofenone (D.2.7).

E) Inhibitors of Amino Acid and Protein Synthesis

Methionine synthesis inhibitors: cyprodinil (E.1.1), mepanipyrim (E.1.2), pyrimethanil (E.1.3).

Protein synthesis inhibitors: blasticidin-S (E.2.1), kasugamycin (E.2.2), kasugamycin hydrochloride-hydrate (E.2.3), mildiomycin (E.2.4), streptomycin (E.2.5), oxytetracyclin (E.2.6).

F) Signal Transduction Inhibitors

MAP/histidine kinase inhibitors: fluoroimid (F.1.1), iprodione (F.1.2), procymidone (F.1.3), vinclozolin (F.1.4), fludioxonil (F.1.5).

G protein inhibitors: quinoxyfen (F.2.1).

G) Lipid and Membrane Synthesis Inhibitors

Phospholipid biosynthesis inhibitors: edifenphos (G.1.1), iprobenfos (G.1.2), pyrazophos (G.1.3), isoprothiolane (G.1.4).

Lipid peroxidation: dicloran (G.2.1), quintozene (G.2.2), tecnazene (G.2.3), tolclofos-methyl (G.2.4), biphenyl (G.2.5), chloroneb (G.2.6), etridiazole (G.2.7).

Phospholipid biosynthesis and cell wall deposition: dimethomorph (G.3.1), flumorph (G.3.2), mandipropamid (G.3.3), pyrimorph (G.3.4), benthiavalicarb (G.3.5), iprovalicarb (G.3.6), valifenalate (G.3.7).

Compounds affecting cell membrane permeability and fatty acides: propamocarb (G.4.1).

Inhibitors of oxysterol binding protein: oxathiapiprolin (G.5.1), 2-{3-[2-(1-{[3,5-bis(di-fluoromethyl-1H-pyrazol-1-yl]acetyl}piperidin-4-yl)-1,3-thiazol-4-yl]-4,5-dihydro-1,2-oxazol-5-yl}phenyl methanesulfonate (G.5.2), 2-{3-[2-(1-{[3,5-bis(difluorome-thyl)-1H-pyrazol-1-yl]acetyl}piperidin-4-yl) 1,3-thiazol-4-yl]-4,5-dihydro-1,2-oxazol-5-yl}-3-chlorophenyl methanesulfonate (G.5.3), 4-[1-[2-[3-(difluoromethyl)-5-methyl-pyrazol-1-yl]acetyl]-4-piperidyl]-N-tetralin-1-yl-pyridine-2-carboxamide (G.5.4), 4-[1-[2-[3,5-bis (difluoromethyl)pyrazol-1-yl]acetyl]-4-piperidyl]-N-tetralin-1-yl-pyridine-2-carboxamide (G.5.5), 4-[1-[2-[3-(difluoromethyl)-5-(tri-fluoromethyl)pyrazol-1-yl]

acetyl]-4-piperidyl]-N-tetralin-1-yl-pyridine-2-carboxamide (G.5.6), 4-[1-[2-[5-cyclopropyl-3-(difluoromethyl)pyrazol-1-yl]acetyl]-4-piperidyl]-N-tetralin-1-yl-pyridine-2-carboxamide (G.5.7), 4-[1-[2-[5-methyl-3-(trifluoromethyl)pyrazo-1-yl]acetyl]-4-piperidyl]-N-tetralin-1-yl-pyridine-2-carboxamide (G.5.8), 4-[1-[2-[5-(difluoromethyl)-3-(trifluoromethyl)pyrazol-1-yl]acetyl]-4-piperidyl]-N-tetralin-1-yl-pyridine-2-carboxamide (G.5.9), 4-[1-[2-[3,5-bis(trifluoromethyl)pyrazol-1-yl]acetyl]-4-piperidyl]-N-tetralin-1-yl-pyridine-2-carboxamide (G.5.10), (4-[1-[2-[5-cyclopropyl-3-(trifluoromethyl)pyrazol-1-yl]acetyl]-4-piperidyl]-N-tetralin-1-yl-pyridine-2-carboxamide (G.5.11).

H) Inhibitors with Multi Site Action

Inorganic active substances: Bordeaux mixture (H.1.1), copper (H.1.2), copper acetate (H.1.3), copper hydroxide (H.1.4), copper oxychloride (H.1.5), basic copper sulfate (H.1.6), sulfur (H.1.7).

Thio- and dithiocarbamates: ferbam (H.2.1), mancozeb (H.2.2), maneb (H.2.3), metam (H.2.4), metiram (H.2.5), propineb (H.2.6), thiram (H.2.7), zineb (H.2.8), ziram (H.2.9).

Organochlorine compounds: anilazine (H.3.1), chlorothalonil (H.3.2), captafol (H.3.3), captan (H.3.4), folpet (H.3.5), dichlofluanid (H.3.6), dichlorophen (H.3.7), hexachlorobenzene (H.3.8), pentachlorphenole (H.3.9) and its salts, phthalide (H.3.10), tolylfluanid (H.3.11).

Guanidines and others: guanidine (H.4.1), dodine (H.4.2), dodine free base (H.4.3), guazatine (H.4.4), guazatine-acetate (H.4.5), iminoctadine (H.4.6), iminoctadine-triacetate (H.4.7), iminoctadine-tris(albesilate) (H.4.8), dithianon (H.4.9), 2,6-di-methyl-1H,5H-[1,4]dithiino[2,3-c:5,6-c']dipyrrole-1,3,5,7(2H,6H)-tetraone (H.4.10).

I) Cell Wall Synthesis Inhibitors

Inhibitors of glucan synthesis: validamycin (1.1.1), polyoxin B (1.1.2).

Melanin synthesis inhibitors: pyroquilon (1.2.1), tricyclazole (1.2.2), carpropamid (1.2.3), dicyclomet (1.2.4), fenoxanil (1.2.5).

J) Plant Defence Inducers

Acibenzolar-S-methyl (J.1.1), probenazole (J.1.2), isotianil (J.1.3), tiadinil (J.1.4), prohexadione-calcium (J.1.5); phosphonates: fosetyl (J.1.6), fosetyl-aluminum (J.1.7), phosphorous acid and its salts (J.1.8), potassium or sodium bicarbonate (J.1.9), 4-cyclopropyl-N-(2,4-dimethoxyphenyl)thiadiazole-5-carboxamide (J.1.10), calcium phosphonate (J.1.11), potassium phosphonate (J.1.12).

K) Unknown Mode of Action

Bronopol (K.1.1), chinomethionat (K.1.2), cyflufenamid (K.1.3), cymoxanil (K.1.4), dazomet (K.1.5), debacarb (K.1.6), diclocymet (K.1.7), diclomezine (K.1.8), difenzoquat (K.1.9), difenzoquat-methylsulfate (K.1.10), diphenylamin (K.1.11), fenitropan (K.1.12), fenpyrazamine (K.1.13), flumetover (K.1.14), flusulfamide (K.1.15), flutianil (K.1.16), harpin (K.1.17), methasulfocarb (K.1.18), nitrapyrin (K.1.19), nitrothal-isopropyl (K.1.20), tolprocarb (K.1.21), oxin-copper (K.1.22), proquinazid (K.1.23), tebufloquin (K.1.24), tecloftalam (K.1.25), triazoxide (K.1.26), N'-(4-(4-chloro-3-trifluoromethyl-phenoxy)-2,5-dimethyl-phenyl)-N-ethyl-N-methyl formamidine (K.1.27), N'-(4-(4-fluoro-3-trifluoromethyl-phenoxy)-2,5-dimethyl-phenyl)-N-ethyl-N-methyl formamidine (K.1.28), N'-[4-[[3-[(4-chlorophenyl)methyl]-1,2,4-thiadiazol-5-yl]oxy]-2,5-dimethyl-phenyl]-N-ethyl-N-methyl-formamidine (K.1.29), N'-(5-bromo-6-indan-2-yloxy-2-methyl-3-pyridyl)-N-ethyl-N-methyl-formamidine (K.1.30), N'-[5-bromo-6-[1-(3,5-difluorophenyl)ethoxy]-2-methyl-3-pyridyl]-N-ethyl-N-methyl-formamidine (K.1.31), N'-[5-bromo-6-(4-isopropylcyclohexoxy)-2-methyl-3-pyridyl]-N-ethyl-N-methyl-formamidine (K.1.32), N'-[5-bromo-2-methyl-6-(1-phenylethoxy)-3-pyridyl]-N-ethyl-N-methyl-formamidine (K.1.33), N'-(2-methyl-5-trifluoromethyl-4-(3-trimethylsilanyl-propoxy)-phenyl)-N-ethyl-N-methyl formamidine (K.1.34), N'-(5-difluoromethyl-2-methyl-4-(3-tri-methylsilanyl-propoxy)-phenyl)-N-ethyl-N-methyl formamidine (K.1.35), 2-(4-chloro-phenyl)-N-[4-(3,4-dimethoxy-phenyl)-isoxazol-5-yl]-2-prop-2-ynyloxy-acetamide (K.1.36), 3-[5-(4-chloro-phenyl)-2,3-dimethyl-isoxazolidin-3-yl]-pyridine (pyrisoxazole) (K.1.37), 3-[5-(4-methylphenyl)-2,3-dimethyl-isoxazolidin-3 yl]-pyridine (K.1.38), 5-chloro-1-(4,6-dimethoxy-pyrimidin-2-yl)-2-methyl-1H-benzoimidazole (K.1.39), ethyl (Z)-3-amino-2-cyano-3-phenyl-prop-2-enoate (K.1.40), picarbutrazox (K.1.41), pentyl N-[6-[[(Z)-[(1-methyltetrazol-5-yl)-phenyl-methylene]amino]oxymethyl]-2-pyridyl]carbamate (K.1.42), but-3-ynyl N-[6-[[(Z)-[(1-methyltetrazol-5-yl)-phenyl-methylene]amino]oxymethyl]-2-pyridyl]carbamate (K.1.43), 2-[2-[(7,8-difluoro-2-methyl-3-quinolyl)oxy]-6-fluoro-phenyl]propan-2-ol (K.1.44), 2-[2-fluoro-6-[(8-fluoro-2-methyl-3-quinolyl)oxy]phen-yl]propan-2-ol (K.1.45), 3-(5-fluoro-3,3,4,4-tetramethyl-3,4-dihydroisoquinolin-1-yl)quinoline (K.1.46), quinofumelin (K.1.47), 3-(4,4,5-trifluoro-3,3-dimethyl-3,4-dihydroisoquinolin-1-yl)quinoline (K.1.48), 9-fluoro-2,2-dimethyl-5-(3-quinolyl)-3H-1,4-benzoxazepine (K.1.49), 2-(6-benzyl-2-pyridyl)quinazoline (K.1.50), 2-[6-(3-fluoro-4-methoxy-phenyl)-5-methyl-2-pyridyl]quinazoline (K.1.51), dichlobentiazox (K.1.52), N'-(2,5-dimethyl-4-phenoxy-phenyl)-N-ethyl-N-methyl-formamidine (K.1.53), aminopyrifen (K.1.54);.

L) Biopesticides

L1) Microbial pesticides with fungicidal, bactericidal, viricidal and/or plant defense activator activity: *Ampelomyces quisqualis* (L.1.1), *Aspergillus flavus* (L.1.2), *Aureobasidium pullulans* (L.1.3), *Bacillus* altitudinis (L.1.4), *B. amyloliquefaciens* (L.1.5), *B. megaterium* (L.1.6), *B. mojavensis* (L.1.7), *B. mycoides* (L.1.8), *B. pumilus* (L.1.9), *B. simplex* (L.1.10), *B. solisalsi* (L.1.11), *B. subtilis* (L.1.12), *B. subtilis* var. *amyloliquefaciens* (L.1.13), *Candida oleophila* (L.1.14), *C. saitoana* (L.1.15), *Clavibacter michiganensis* (bacteriophages) (L.1.16), *Coniothyrium minitans* (L.1.17), *Cryphonectria parasitica* (L.1.18), *Cryptococcus albidus* (L.1.19), Dilophosphora *alopecuri* (L.1.20), *Fusarium oxysporum* (L.1.21), C/onostachys *rosea* f. *catenulate* (also named *Gliocladium catenulatum*) (L.1.22), *Gliocladium roseum* (L.1.23), Lysobacter *antibioticus* (L.1.24), *L. enzymogenes* (L.1.25), *Metschnikowia fructicola* (L.1.26), Microdochium *dimerum* (L.1.27), Microsphaeropsis *ochracea* (L.1.28), Muscodor *albus* (L.1.29), *Paenibacillus alvei* (L.1.30), *Paenibacillus* epiphyticus (L.1.31), *P. polymyxa* (L.1.32), *Pantoea vagans* (L.1.33), *Penicillium* bilaiae (L.1.34), *Phlebiopsis gigantea* (L.1.35), *Pseudomonas* s p. (L.1.36), *Pseudomonas* chloraphis (L.1.37), Pseudozyma flocculosa (L.1.38), *Pichia anomala* (L.1.39), *Pythium oligandrum* (L.1.40), Sphaerodes mycoparasitica (L.1.41), *Streptomyces griseoviridis* (L.1.42), *S. lydicus* (L.1.43), *S. violaceusniger* (L.1.44), *Talaromyces flavus* (L.1.45), *Trichoderma* asperelloides (L.1.46), T. asperellum (L.1.47), T. atroviride (L.1.48), T. fertile (L.1.49), T. gamsii (L.1.50), T. harmatum (L.1.51), *T. harzianum* (L.1.52), *T. polysporum* (L.1.53), T. stromaticum (L.1.54), *T. virens* (L.1.55), *T. viride* (L.1.56), Typhula phacorrhiza (L.1.57), Ulocladium oudemansii0 (L.1.58), *Verticillium* dahlia, zucchini yellow mosaic virus (avirulent strain) (L.1.59);

L2) Biochemical pesticides with fungicidal, bactericidal, viricidal and/or plant defense activator activity: harpin protein (L.2.1), *Reynoutria* sacha/inensis extract (L.2.1);

L3) Microbial pesticides with insecticidal, acaricidal, molluscidal and/or nematicidal activity: *Agrobacterium radiobacter* (L.3.1), *Bacillus cereus* (L.3.2), *B. firmus* (L.3.3), *B. thuringiensis* (L.3.4), *B. thuringiensis* ssp. *aizawai* (L.3.5), B. t. ssp. *israelensis* (L.3.6), B. t. ssp. galleriae (L.3.7), B. t. ssp. kurstaki (L.3.8), B. t. ssp. tenebrionis (L.3.9), *Beauveria bassiana* (L.3.10), *B. brongniarti* (L.3.11), *Burkholderia* spp. (L.3.12), *Chromobacterium subtsugae* (L.3.13), *Cydia pomonella* granulovirus (CpGV) (L.3.14), Cryptophlebia leucotreta granulovirus (CrleGV) (L.3.15), *Flavobacterium* spp. (L.3.16), *Helicoverpa armigera* nucleopolyhedrovirus (HearNPV) (L3.17), *Helicoverpa zea* nucleopolyhedrovirus (HzNPV) (L3.18), *Helicoverpa zea* single capsid nucleopolyhedrovirus (HzSNPV) (L.3.19), Heterorhabditis bacteriophora (L.3.20), Isaria fumosorosea (L3.21), Lecanicillium *longisporum* (L.3.22), *L. muscarium* (L.3.23), Metarhizium anisopliae (L.3.24), *M. anisopliae* var. anisopliae (L3.25), *M. anisopliae* var. acridum (L.3.26), *Nomuraea rileyi* (L.3.27), *Paecilomyces* fumosoroseus (L.3.28), *P. lilacinus* (L.3.29), *Paenibacillus popilliae* (L.3.30), Pasteuria spp. (L.3.31), *P. nishizawae* (L.3.32), *P. penetrans* (L.3.33), *P. ramosa* (L.3.34), P. thornea (L.3.35), P. usgae (L.3.36), *Pseudomonas fluorescens* (L.3.37), *Spodoptera littoralis* nucleopolyhedrovirus (SpliNPV) (L.3.38), Steinernema carpocapsae (L.3.39), S. feltiae (L.3.40), *S. kraussei* (L.3.41), *Streptomyces galbus* (L.3.42), *S. microflavus* (L.3.43);

L4) Biochemical pesticides with insecticidal, acaricidal, molluscidal, pheromone and/or nematicidal activity: L-carvone, citral (L.4.1), (E,Z)-7,9-dodecadien-1-yl acetate (L.4.2), ethyl formate (L.4.3), (E,Z)-2,4-ethyl decadienoate (pear ester) (L.4.4), (Z,Z,E)-7,11,13-hexadecatrienal (L.4.5), heptyl butyrate (L.4.6), isopropyl myristate (L.4.7), lavanulyl senecioate (L.4.8), cis-jasmone (L.4.9), 2-methyl 1-butanol (L.4.10), methyl eugenol (L.4.11), methyl jasmonate (L.4.12), (E,Z)-2, 13-octadecadien-1-ol (L.4.13), (E,Z)-2,13-octadecadien-1-ol acetate (L.4.14), (E,Z)-3,13-octadecadien-1-ol (L.4.15), (R)-1-octen-3-ol (L.4.16), pentatermanone (L.4.17), (E,Z,Z)-3,8,11-tetradecatrienyl acetate (L.4.18), (ZE)-9,12-tetradecadien-1-yl acetate (L.4.19), (2-7-tetradecen-2-one (L.4.20), (2-9-tetradecen-1-yl acetate (L.4.21), (2-11-tetradecenal (L.4.22), (2-11-tetradecen-1-ol (L.4.23), extract of *Chenopodium ambrosiodes* (L.4.24), Neem oil, Quillay extract (L.4.25);

L5) Microbial pesticides with plant stress reducing, plant growth regulator, plant growth promoting and/or yield enhancing activity: Azospirillum amazonense (L.51), A. brasilense (L.5.2), *A. lipoferum* (L.5.3), *A. irakense* (L.5.4), *A. halopraeferens* (L.5.5), *Bradyrhizobium* spp. (L.5.6), *B. elkanii* (L.5.7), *B. japonicum* (L.5.8), *B. liaoningense* (L.5.9), *B. lupini* (L.5.10), Delftia *acidovorans* (L.5.11), *Glomus intraradices* (L.5.12), *Mesorhizobium* s p p. (L.5.13), *Rhizobium leguminosarum* bv. *phaseoli* (L.5.14), R. I. bv. *trifolii* (L.5.15), R. I. bv. *viciae* (L.5.16), *R. tropici* (L.5.17), *Sinorhizobium meliloti* (L.5.18);

M) Growth Regulators abscisic acid (M.1.1), amidochlor, ancymidol (M.1.2), 6-benzylaminopurine (M.1.3), brassinolide (M.1.4), butralin (M.1.5), chlormequat (M.1.6), chlormequat chloride (M.1.7), choline chloride (M.1.8), cyclanilide (M.1.9), daminozide (M.1.10), dikegulac (M.1.11), dimethipin (M.1.12), 2,6-dimethylpuridine (M.1.13), ethephon (M.1.14), flumetralin (M.1.15), flurprimidol (M.1.16), fluthiacet (M.1.17), forchlorfenuron (M.1.18), gibberellic acid (M.1.19), inabenfide (M.1.20), indole-3-acetic acid (M.1.21), maleic hydrazide (M.1.22), mefluidide (M.1.23), mepiquat (M.1.24), mepiquat chloride (M.1.25), naphthaleneacetic acid (M.1.26), N-6-benzyladenine (M.1.27), paclobutrazol (M.1.28), prohexadione (M.1.29), prohexadione-calcium (M.1.30), prohydrojasmon (M.1.31), thidiazuron (M.1.32), triapenthenol (M.1.33), tributyl phosphorotrithioate (M.1.34), 2,3,5-tri-iodobenzoic acid (M.1.35), trinexapac-ethyl and uniconazole (M.1.36);

N) Herbicides from Classes N.1 to N.15

N.1 Lipid biosynthesis inhibitors: alloxydim (N.1.1), alloxydim-sodium (N.1.2), butroxydim (N.1.3), clethodim (N.1.4), clodinafop (N.1.5), clodinafop-propargyl (N.1.6), cycloxydim (N.1.7), cyhalofop (N.1.8), cyhalofop-butyl (N.1.9), diclofop(N.1.10), diclofop-methyl (N.1.11), fenoxaprop (N.1.12), fenoxaprop-ethyl (N.1.13), fenoxaprop-P (N.1.14), fenoxaprop-P-ethyl (N.1.15), fluazifop (N.1.16), fluazifop-butyl (N.1.17), fluazifop-P (N.1.18), fluazifop-P-butyl (N.1.19), haloxyfop (N.1.20), haloxyfop-methyl (N.1.21), haloxyfop-P (N.1.22), haloxyfop-P-methyl (N.1.23), metamifop (N.1.24), pinoxaden (N.1.25), profoxydim (N.1.26), propaquizafop (N.1.27), quizalofop (N.1.28), quizalofop-ethyl (N.1.29), quizalofop-tefuryl (N.1.30), quizalofop-P (N.1.31), quizalofop-P-ethyl (N.1.32), quizalofop-P-tefuryl (N.1.33), sethoxydim (N.1.34), tepraloxydim (N.1.35), tralkoxydim (N.1.36), 4-(4'-chloro-4-cyclo¬propyl-2'-fluoro[1,1'-biphenyl]-3-yl)-5-hydroxy-2,2,6,6-tetramethyl-2H-pyran-3(6H)-one ((N.1.37) CAS 1312337-72-6); 4-(2',4'-dichloro-4-cyclopropyl[1,1'-bi-phenyl]-3-yl)-5-hydroxy-2,2,6,6-tetramethyl-2H-pyran-3(6H)-one ((N.1.38) CAS 1312337-45-3); 4-(4'-chloro-4-ethyl-2'-fluoro[1,1'-biphenyl]-3-yl)-5-hydroxy-2,2,6,6-tetramethyl-2H-pyran-3(6H)-one ((N.1.39) CAS 1033757-93-5); 4-(2',4'-Dichloro-4-ethyl[1,1'-biphenyl]-3-yl)-2,2,6,6-tetramethyl-2H-pyran-3,5(4H,6H)-dione ((N.1.40) CAS 1312340-84-3); 5-(acetyloxy)-4-(4'-chloro-4-cyclopropyl-2'-fluoro[1,1'-biphenyl]-3-yl)-3,6-dihydro-2,2,6,6-tetramethyl-2H-pyran-3-one ((N.1.41) CAS 1312337-48-6); 5-(acetyloxy)-4-(2',4'-dichloro-4-cyclopropyl-[1,1'-biphenyl]-3-yl)-3,6-dihydro-2,2,6,6-tetramethyl-2H-pyran-3-one (N.1.42); 5-(acetyloxy)-4-(4'-chloro-4-ethyl-2'-fluoro[1,1'-biphenyl]-3-yl)-3,6-dihydro-2,2,6,6-tetramethyl-2H-pyran-3-one ((N.1.43) CAS 1312340-82-1); 5-(acetyloxy)-4-(2',4'-dichloro-4-ethyl[1,1'-biphenyl]-3-yl)-3, 6-dihydro-2,2,6,6-tetramethyl-2H-pyran-3-one ((N.1.44) CAS 1033760-55-2); 4-(4'-chloro-4-cyclopropyl-2'-fluoro[1,1'-biphenyl]-3-yl)-5,6-dihydro-2,2, 6,6-tetramethyl-5-oxo-2H-pyran-3-yl carbonic acid methyl ester ((N.1.45) CAS 1312337-51-1); 4-(2',4'-dichloro-4-cyclopropyl-[1,1'-biphenyl]-3-yl)-5,6-dihydro-2,2,6,6-tetramethyl-5-oxo-2H-pyran-3-yl carbonic acid methyl ester (N.1.46); 4-(4'-chloro-4-ethyl-2'-fluoro[1,1'-biphenyl]-3-yl)-5,6-dihydro-2,2,6,6-tetramethyl-5-oxo-2H-pyran-3-yl carbonic acid methyl ester ((N.1.47) CAS 1312340-83-2); 4-(2',4'-dichloro-4-ethyl¬[1,1'-biphenyl]-3-yl)-5,6-dihydro-2,2,6,6-tetramethyl-5-oxo-2H-pyran-3-yl carbonic acid methyl ester ((N.1.48) CAS 1033760-58-5); benfuresate (N.1.49), butylate (N.1.50), cycloate (N.1.51), dalapon (N.1.52), dimepiperate (N.1.53), EPTC (N.1.54), esprocarb (N.1.55), ethofumesate (N.1.56), flupropanate (N.1.57), molinate (N.1.58), orbencarb (N.1.59), pebulate (N.1.60), prosulfocarb (N.1.61), TCA (N.1.62), thiobencarb (N.1.63), tiocarbazil (N.1.64), triallate (N.1.65) and vernolate (N.1.66);

N.2 ALS inhibitors: amidosulfuron (N.2.1), azimsulfuron (N.2.2), bensulfuron (N.2.3), bensulfuron-methyl (N.2.4), chlorimuron (N.2.5), chlorimuron-ethyl (N.2.6), chlorsulfuron (N.2.7), cinosulfuron (N.2.8), cyclosulfamuron (N.2.9), ethametsulfuron (N.2.10), ethametsulfuron-methyl (N.2.11), ethoxysulfuron (N.2.12), flazasulfuron (N.2.13), flucetosulfuron (N.2.14), flupyrsulfuron (N.2.15), flupyrsulfuron-methyl-sodium (N.2.16), foramsulfuron (N.2.17), halosulfuron (N.2.18), halosulfuron-methyl (N.2.19), imazosulfuron (N.2.20), iodosulfuron (N.2.21), iodosulfuron-methyl-sodium (N.2.22), iofensulfuron (N.2.23), iofensulfuron-sodium (N.2.24), mesosulfuron (N.2.25), metazosulfuron (N.2.26), metsulfuron (N.2.27), metsulfuron-methyl (N.2.28), nicosulfuron (N.2.29), orthosulfamuron (N.2.30), oxasulfuron (N.2.31), primisulfuron (N.2.32), primisulfuron-methyl (N.2.33), propyrisulfuron (N.2.34), prosulfuron (N.2.35), pyrazosulfuron (N.2.36), pyrazosulfuron-ethyl (N.2.37), rimsulfuron (N.2.38), sulfometuron (N.2.39), sulfometuron-methyl (N.2.40), sulfosulfuron (N.2.41), thifensulfuron (N.2.42), thifensulfuron-methyl (N.2.43), triasulfuron (N.2.44), tribenuron (N.2.45), tribenuron-methyl (N.2.46), trifloxysulfuron (N.2.47), triflusulfuron (N.2.48), triflusulfuron-methyl (N.2.49), tritosulfuron (N.2.50), imazamethabenz (N.2.51), imazamethabenz-methyl (N.2.52), imazamox (N.2.53), imazapic (N.2.54), imazapyr (N.2.55), imazaquin (N.2.56), imazethapyr (N.2.57); cloransulam (N.2.58), cloransulam-methyl (N.2.59), diclosulam (N.2.60), flumetsulam (N.2.61), florasulam (N.2.62), metosulam (N.2.63), penoxsulam (N.2.64), pyrimisulfan (N.2.65) and pyroxsulam (N.2.66); bispyribac (N.2.67), bispyribac-sodium (N.2.68), pyribenzoxim (N.2.69), pyriftalid (N.2.70), pyriminobac (N.2.71), pyriminobac-methyl (N.2.72), pyrithiobac (N.2.73), pyrithiobac-sodium (N.2.74), 4-[[[2-[(4,6-dimethoxy-2-pyrimidinyl)oxy]phenyl]methyl]amino]-benzoic acid-1-methyl¬ethyl ester ((N.2.75) CAS 420138-41-6), 4-[[[2-[(4,6-dimethoxy-2-pyrimidinyl)oxy]phenyl]methyl]amino]-benzoic acid propyl ester ((N.2.76) CAS 420138-40-5), N-(4-bromophenyl)-2-[(4,6-dimethoxy-2-pyrimidinyl)oxy]-benzenemethanamine ((N.2.77) CAS 420138-01-8); flucarbazone (N.2.78), flucarbazone-sodium (N.2.79), propoxycarbazone (N.2.80), propoxycarbazone-sodium (N.2.81), thiencarbazone (N.2.82), thiencarbazone-methyl (N.2.83), triafamone (N.2.84);

N.3 Photosynthesis inhibitors: amicarbazone (N.3.1); chlorotriazine (N.3.2); ametryn (N.3.3), atrazine (N.3.4), chloridazone (N.3.5), cyanazine (N.3.6), desmetryn (N.3.7), dimethametryn (N.3.8), hexazinone (N.3.9), metribuzin (N.3.10), prometon (N.3.11), prometryn (N.3.12), propazine (N.3.13), simazine (N.3.14), simetryn (N.3.15), terbumeton (N.3.16), terbuthylazin (N.3.17), terbutryn (N.3.18), trietazin (N.3.19); chlorobromuron (N.3.20), chlorotoluron (N.3.21), chloroxuron (N.3.22), dimefuron (N.3.23), diuron (N.3.24), fluometuron (N.3.25), isoproturon (N.3.26), isouron (N.3.27), linuron (N.3.28), metamitron (N.3.29), methabenzthiazuron (N.3.30), metobenzuron (N.3.31), metoxuron (N.3.32), monolinuron (N.3.33), neburon (N.3.34), siduron (N.3.35), tebuthiuron (N.3.36), thiadiazuron (N.3.37), desmedipham (N.3.38), karbutilat (N.3.39), phenmedipham (N.3.40), phenmedipham-ethyl (N.3.41), bromofenoxim (N.3.42), bromoxynil (N.3.43) and its salts and esters, ioxynil (N.3.44) and its salts and esters, bromacil (N.3.45), lenacil (N.3.46), terbacil (N.3.47), bentazon (N.3.48), bentazon-sodium (N.3.49), pyridate (N.3.50), pyridafol (N.3.51), pentanochlor (N.3.52), propanil (N.3.53); diquat (N.3.54), diquat-dibromide (N.3.55), paraquat (N.3.56), paraquat-dichloride (N.3.57), paraquat-dimetilsulfate (N.3.58);

N.4 protoporphyrinogen-IX oxidase inhibitors: acifluorfen (N.4.1), acifluorfen-sodium (N.4.2), azafenidin (N.4.3), bencarbazone (N.4.4), benzfendizone (N.4.5), bifenox (N.4.6), butafenacil (N.4.7), carfentrazone (N.4.8), carfentrazone-ethyl (N.4.9), chlormethoxyfen (N.4.10), cinidon-ethyl (N.4.11), fluazolate (N.4.12), flufenpyr (N.4.13), flufenpyr-ethyl (N.4.14), flumiclorac (N.4.15), flumiclorac-pentyl (N.4.16), flumioxazin (N.4.17), fluoroglycofen (N.4.18), fluoroglycofen-ethyl (N.4.19), fluthiacet (N.4.20), fluthiacet-methyl (N.4.21), fomesafen (N.4.22), halosafen (N.4.23), lactofen (N.4.24), oxadiargyl (N.4.25), oxadiazon (N.4.26), oxyfluorfen (N.4.27), pentoxazone (N.4.28), profluazol (N.4.29), pyraclonil (N.4.30), pyraflufen (N.4.31), pyraflufen-ethyl (N.4.32), saflufenacil (N.4.33), sulfentrazone (N.4.34), thidiazimin (N.4.35), tiafenacil (N.4.36), trifludimoxazin (N.4.37), ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate ((N.4.38) CAS 353292-31-6), N-ethyl-3-(2,6-dichloro-4-trifluoro-methylphenoxy)-5-methyl-1H-pyrazole-1-carboxamide ((N.4.39) CAS 452098-92-9), N tetrahydrofurfuryl-3-(2,6-dichloro-4-trifluoromethylphenoxy)-5-methyl-1H-pyrazole-1-carboxamide ((N.4.40) CAS 915396-43-9), N-ethyl-3-(2-chloro-6-fluoro-4-trifluoromethylphenoxy)-5-methyl-1H-pyrazole-1-carboxamide ((N.4.41) CAS 452099-05-7), N tetrahydro¬furfuryl-3-(2-chloro-6-fluoro-4-trifluoro¬methylphenoxy)-5-methyl-1H-pyrazole-1-carboxamide ((N.4.42) CAS 452100-03-7), 3-[7-fluoro-3-oxo-4-(prop-2-ynyl)-3,4-dihydro-2H-benzo[1,4]oxazin-6-yl]-1,5-dimethyl-6-thioxo-[1,3,5]triazinan-2,4-dione ((N.4.43) CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione ((N.4.44) CAS 1300118-96-0), 1-methyl-6-trifluoro¬methyl-3-(2,2,7-tri-fluoro-3-oxo-4-prop-2-ynyl-3,4-dihydro-2H-benzo[1,4]oxazin-6-yl)-1H-pyrimidine-2,4-dione ((N.4.45) CAS 1304113-05-0), methyl (E)-4-[2-chloro-5-[4-chloro-5-(difluoromethoxy)-1H-methyl-pyrazol-3-yl]-4-fluoro-phenoxy]-3-methoxy-but-2-enoate ((N.4.46) CAS 948893-00-3), 3-[7-chloro-5-fluoro-2-(trifluoromethyl)-1H-benzimidazol-4-yl]-1-methyl-6-(trifluoromethyl)-1H-pyrimidine-2,4-dione ((N.4.47) CAS 212754-02-4);

N.5 Bleacher herbicides: beflubutamid (N.5.1), diflufenican (N.5.2), fluridone (N.5.3), flurochloridone (N.5.4), flurtamone (N.5.5), norflurazon (N.5.6), picolinafen (N.5.7), 4-(3-trifluoromethyl¬phenoxy)-2-(4-trifluoromethylphenyl)¬pyrimidine ((N.5.8) CAS 180608-33-7); benzobicyclon (N.5.9), benzofenap (N.5.10), bicyclopyrone (N.5.11), clomazone (N.5.12), fenquintrione (N.5.13), isoxaflutole (N.5.14), mesotrione (N.5.15), pyrasulfotole (N.5.16), pyrazolynate (N.5.17), pyrazoxyfen (N.5.18), sulcotrione (N.5.19), tefuryltrione (N.5.20), tembotrione (N.5.21), tolpyralate (N.5.22), topramezone (N.5.23); aclonifen (N.5.24), amitrole (N.5.25), flumeturon (N.5.26);

N.6 EPSP synthase inhibitors: glyphosate (N.6.1), glyphosate-isopropylammonium (N.6.2), glyposate-potassium (N.6.3), glyphosate-trimesium (sulfosate) (N.6.4); N.7 Glutamine synthase inhibitors: bilanaphos (bialaphos) (N.7.1), bilanaphos-sodium (N.7.2), glufosinate (N.7.3), glufosinate-P (N.7.4), glufosinate-ammonium (N.7.5);

N.8 DHP synthase inhibitors: asulam (N.8.1);

N.9 Mitosis inhibitors: benfluralin (N.9.1), butralin (N.9.2), dinitramine (N.9.3), ethalfluralin (N.9.4), fluchloralin (N.9.5), oryzalin (N.9.6), pendimethalin (N.9.7), prodiamine (N.9.8), trifluralin (N.9.9); amiprophos (N.9.10), amiprophos-methyl (N.9.11), butamiphos (N.9.12); chlorthal (N.9.13), chlorthal-dimethyl (N.9.14), dithiopyr (N.9.15), thiazopyr (N.9.16), propyzamide (N.9.17), tebutam (N.9.18); carbetamide (N.9.19), chlorpropham (N.9.20), flamprop (N.9.21), flamprop-isopropyl (N.9.22), flamprop-methyl (N.9.23), flamprop-M-isopropyl (N.9.24), flamprop-M-methyl (N.9.25), propham (N.9.26);

N.10 VLCFA inhibitors: acetochlor (N.10.1), alachlor (N.10.2), butachlor (N.10.3), dimethachlor (N.10.4), dimethenamid (N.10.5), dimethenamid-P (N.10.6), metazachlor (N.10.7), metolachlor (N.10.8), metolachlor-S(N.10.9), pethoxamid (N.10.10), pretilachlor (N.10.11), propachlor (N.10.12), propisochlor (N.10.13), thenylchlor (N.10.14), flufenacet (N.10.15), mefenacet (N.10.16), diphenamid (N.10.17), naproanilide (N.10.18), napropamide (N.10.19), napropamide-M (N.10.20), fentrazamide (N.10.21), anilofos (N.10.22), cafenstrole (N.10.23), fenoxasulfone (N.10.24), ipfencarbazone (N.10.25), piperophos (N.10.26), pyroxasulfone (N.10.27), isoxazoline compounds of the formulae II.1, II.2, II.3, II.4, II.5, II.6, II.7, II.8 and II.9

II.1

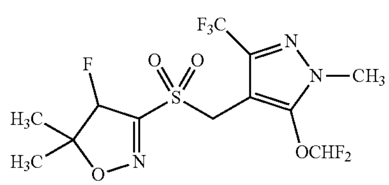

II.2

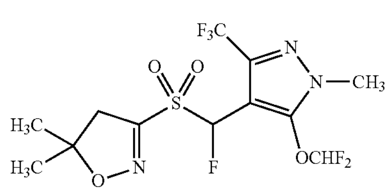

-continued

II.3

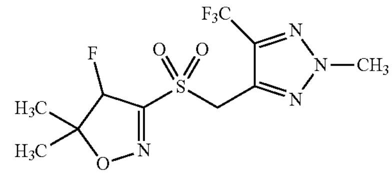

II.4

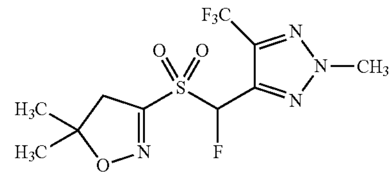

II.5

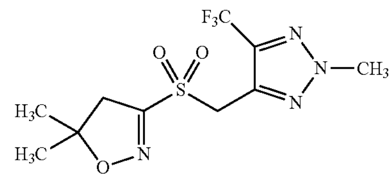

II.6

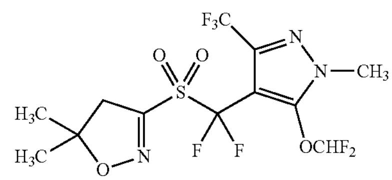

II.7

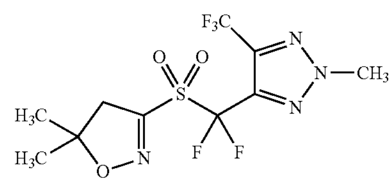

II.8

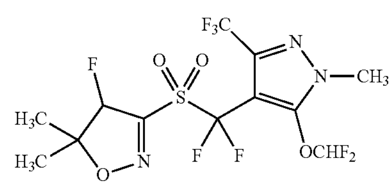

II.9

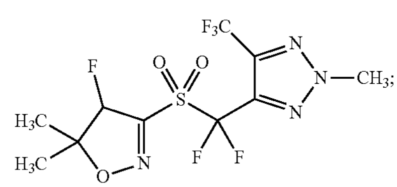

N.11 Cellulose biosynthesis inhibitors: chlorthiamid (N.11.1), dichlobenil (N.11.2), flupoxam (N.11.3), indaziflam (N.11.4), isoxaben (N.11.5), triaziflam (N.11.6), 1-cyclohexyl-5-pentafluorphenyloxy-14-[1,2,4,6]thiatriazin-3-ylamine ((N.11.7) CAS 175899-01-1);

N.12 Decoupler herbicides: dinoseb (N.12.1), dinoterb (N.12.2), DNOC (N.12.3) and its salts;

N.13 Auxinic herbicides: 2,4-D (N.13.1) and its salts and esters, clacyfos (N.13.2), 2,4-DB (N.13.3) and its salts and esters, aminocyclopyrachlor (N.13.4) and its salts and esters, aminopyralid (N.13.5) and its salts such as aminopyralid-dimethylammonium (N.13.6), aminopyralid-tris(2-hydroxypropyl)ammonium (N.13.7) and its esters, benazolin (N.13.8), benazolin-ethyl (N.13.9), chloramben (N.13.10) and its salts and esters, clomeprop (N.13.11), clopyralid (N.13.12) and its salts and esters, dicamba (N.13.13) and its salts and esters, dichlorprop (N.13.14) and its salts and esters, dichlorprop-P (N.13.15) and its salts and esters, fluroxypyr (N.13.16), fluroxypyr-butometyl (N.13.17), fluroxypyr-meptyl (N.13.18), halauxifen (N.13.) and its salts and esters (CAS 943832-60-8); MCPA (N.13.) and its salts and esters, MCPA-thioethyl (N.13.19), MCPB (N.13.20) and its salts and esters, mecoprop (N.13.21) and its salts and esters, mecoprop-P (N.13.22) and its salts and esters, picloram (N.13.23) and its salts and esters, quinclorac (N.13.24), quinmerac (N.13.25), TBA (2,3,6) (N.13.26) and its salts and esters, triclopyr (N.13.27) and its salts and esters, 4-amino-3-chloro-6-(4-chloro-2-fluoro-3-methoxyphenyl)-5-fluoropyridine-2-carboxylic acid (N.13.28), benzyl 4-amino-3-chloro-6-(4-chloro-2-fluoro-3-methoxyphenyl)-5-fluoropyridine-2-carboxylate ((N.13.29) CAS 1390661-72-9);

N.14 Auxin transport inhibitors: diflufenzopyr (N.14.1), diflufenzopyr-sodium (N.14.2), naptalam (N.14.3) and naptalam-sodium (N.14.4);

N.15 Other herbicides: bromobutide (N.15.1), chlorflurenol (N.15.2), chlorflurenol-methyl (N.15.3), cinmethylin (N.15.4), cumyluron (N.15.5), cyclopyrimorate ((N.15.6) CAS 499223-49-3) and its salts and esters, dalapon (N.15.7), dazomet (N.15.8), difenzoquat (N.15.9), difenzoquat-metilsulfate (N.15.10), dimethipin (N.15.11), DSMA (N.15.12), dymron (N.15.13), endothal (N.15.14) and its salts, etobenzanid (N.15.15), flurenol (N.15.16), flurenol-butyl (N.15.17), flurprimidol (N.15.18), fosamine (N.15.19), fosamine-ammonium (N.15.20), indanofan (N.15.21), maleic hydrazide (N.15.22), mefluidide (N.15.23), metam (N.15.24), methiozolin ((N.15.25) CAS 403640-27-7), methyl azide (N.15.26), methyl bromide (N.15.27), methyldymron (N.15.28), methyl iodide (N.15.29), MSMA (N.15.30), oleic acid (N.15.31), oxaziclomefone (N.15.32), pelargonic acid (N.15.33), pyributicarb (N.15.34), quinoclamine (N.15.35), tridiphane (N.15.36);

O) Insecticides from classes O.1 to O.29

O.1 Acetylcholine esterase (AChE) inhibitors: aldicarb (O.1.1), alanycarb (O.1.2), bendiocarb (O.1.3), benfuracarb (O.1.4), butocarboxim (O.1.5), butoxycarboxim (O.1.6), carbaryl (O.1.7), carbofuran (O.1.8), carbosulfan (O.1.9), ethiofencarb (O.1.10), fenobucarb (O.1.11), formetanate (O.1.12), furathiocarb (O.1.13), isoprocarb (O.1.14), methiocarb (O.1.15), methomyl (O.1.16), metolcarb (O.1.17), oxamyl (O.1.18), pirimicarb (O.1.19), propoxur (O.1.20), thiodicarb (O.1.21), thiofanox (O.1.22), trimethacarb (O.1.23), XMC (O.1.24), xylylcarb (O.1.25) and triazamate (O.1.26); acephate (O.1.27), azamethiphos (O.1.28), azinphos-ethyl (O.1.29), azinphosmethyl (O.1.30), cadusafos (O.1.31), chlorethoxyfos (O.1.32), chlorfenvinphos (O.1.33), chlormephos (O.1.34), chlorpyrifos (O.1.35), chlorpyrifos-methyl (O.1.36), coumaphos (O.1.37), cyanophos (O.1.38), demeton-S-methyl (O.1.39), diazinon (O.1.40), dichlorvos/DDVP (O.1.41), dicrotophos (O.1.42), dimethoate (O.1.43), dimethylvinphos (O.1.44), disulfoton (O.1.45), EPN (O.1.46), ethion (O.1.47), ethoprophos (O.1.48), famphur (O.1.49), fenamiphos (O.1.50), fenitrothion (O.1.51), fenthion (O.1.52), fosthiazate (O.1.53), heptenophos (O.1.54), imicyafos (O.1.55), isofenphos (O.1.56), isopropyl 0-(methoxyaminothio-phosphoryl) salicylate (O.1.57), isoxathion (O.1.58), malathion (O.1.59), mecarbam (O.1.60), methamidophos (O.1.61), methidathion (O.1.62), mevinphos (O.1.63), monocrotophos (O.1.64), naled (O.1.65), omethoate (O.1.66), oxydemeton-methyl (O.1.67), parathion (O.1.68), parathion-methyl (O.1.69), phenthoate (O.1.70), phorate (O.1.71), phosalone (O.1.72), phosmet (O.1.73), phosphamidon (O.1.74), phoxim (O.1.75), pirimiphos-methyl (O.1.76), profenofos (O.1.77), propetamphos (O.1.78), prothiofos (O.1.79), pyraclofos (O.1.80), pyridaphenthion (O.1.81), quinalphos (O.1.82), sulfotep (O.1.83), tebupirimfos (O.1.84), temephos (O.1.85), terbufos (O.1.86), tetrachlorvinphos (O.1.87), thiometon (O.1.88), triazophos (O.1.89), trichlorfon (O.1.90), vamidothion (O.1.91);

O.2 GABA-gated chloride channel antagonists: endosulfan (O.2.1), chlordane (O.2.2); ethiprole (O.2.3), fipronil (O.2.4), flufiprole (O.2.5), pyrafluprole (O.2.6), pyriprole (O.2.7);

O.3 Sodium channel modulators: acrinathrin (O.3.1), allethrin (O.3.2), d-cis-trans allethrin (O.3.3), d-trans allethrin (O.3.4), bifenthrin (O.3.5), bioallethrin (O.3.6), bioallethrin S-cylclopentenyl (O.3.7), bioresmethrin (O.3.8), cycloprothrin (O.3.9), cyfluthrin (O.3.10), beta-cyfluthrin (O.3.11), cyhalothrin (O.3.12), lambda-cyhalothrin (O.3.13), gamma-cyhalothrin (O.3.14), cypermethrin (O.3.15), alpha-cypermethrin (O.3.16), beta-cypermethrin (O.3.17), theta-cypermethrin (O.3.18), zeta-cypermethrin (O.3.19), cyphenothrin (O.3.20), deltamethrin (O.3.21), empenthrin (O.3.22), esfenvalerate (O.3.23), etofenprox (O.3.24), fenpropathrin (O.3.25), fenvalerate (O.3.26), flucythrinate (O.3.27), flumethrin (O.3.28), tau-fluvalinate (O.3.29), halfenprox (O.3.30), heptafluthrin (O.3.31), imiprothrin (O.3.32), meperfluthrin (O.3.33), metofluthrin (O.3.34), momfluorothrin (O.3.35), permethrin (O.3.36), phenothrin (O.3.37), prallethrin (O.3.38), profluthrin (O.3.39), pyrethrin (pyrethrum) (O.3.40), resmethrin (O.3.41), silafluofen (O.3.42), tefluthrin (O.3.43), tetramethylfluthrin (O.3.44), tetramethrin (O.3.45), tralomethrin (O.3.46) and transfluthrin (O.3.47); DDT (O.3.48), methoxychlor (O.3.49);

O.4 Nicotinic acetylcholine receptor agonists (nAChR): acetamiprid (O.4.1), clothianidin (O.4.2), cycloxaprid (O.4.3), dinotefuran (O.4.4), imidacloprid (O.4.5), nitenpyram (O.4.6), thiacloprid (O.4.7), thiamethoxam (O.4.8); (2E)-1-[(6-chloropyridin-3-yl)methyl]-N'-nitro-2-pentylidenehydrazinecarboximidamide (O.4.9); 1-[(6-chloropyridin-3-yl)methyl]-7-methyl-8-nitro-5-propoxy-1,2,3,5,6,7-hexahydroimidazo[1,2-a]pyridine (O.4.10); nicotine (O.4.11);

O.5 Nicotinic acetylcholine receptor allosteric activators: spinosad (O.5.1), spinetoram (O.5.2);

O.6 Chloride channel activators: abamectin (O.6.1), emamectin benzoate (O.6.2), ivermectin (O.6.3), lepimectin (O.6.4), milbemectin (O.6.5);

O.7 Juvenile hormone mimics: hydroprene (O.7.1), kinoprene (O.7.2), methoprene (O.7.3); fenoxycarb (O.7.4), pyriproxyfen (O.7.5);

O.8 miscellaneous non-specific (multi-site) inhibitors: methyl bromide (O.8.1) and other alkyl halides; chloropicrin (O.8.2), sulfuryl fluoride (O.8.3), borax (O.8.4), tartar emetic (O.8.5);

O.9 Selective homopteran feeding blockers: pymetrozine (O.9.1), flonicamid (O.9.2);

O.10 Mite growth inhibitors: clofentezine (O.10.1), hexythiazox (O.10.2), diflovidazin (O.10.3); etoxazole (O.10.4);

O.11 Microbial disruptors of insect midgut membranes: the Bt crop proteins: Cry1Ab, Cry1Ac, Cry1Fa, Cry2Ab, mCry3A, Cry3Ab, Cry3Bb, Cry34/35Ab1;

O.12 Inhibitors of mitochondrial ATP synthase: diafenthiuron (O.12.1); azocyclotin (O.12.2), cyhexatin (O.12.3), fenbutatin oxide (O.12.4), propargite (O.12.5), tetradifon (O.12.6);

O.13 Uncouplers of oxidative phosphorylation via disruption of the proton gradient: chlorfenapyr (O.13.1), DNOC (O.13.2), sulfluramid (O.13.3);

O.14 Nicotinic acetylcholine receptor (nAChR) channel blockers: bensultap (O.14.1), cartap hydrochloride (O.14.2), thiocyclam (O.14.3), thiosultap sodium (O.14.4);

O.15 Inhibitors of the chitin biosynthesis type 0: bistrifluron (O.15.1), chlorfluazuron (O.15.2), diflubenzuron (O.15.3), flucycloxuron (O.15.4), flufenoxuron (O.15.5), hexaflumuron (O.15.6), lufenuron (O.15.7), novaluron (O.15.8), noviflumuron (O.15.9), teflubenzuron (O.15.10), triflumuron (O.15.11);

O.16 Inhibitors of the chitin biosynthesis type 1: buprofezin (O.16.1);

O.17 Moulting disruptors: cyromazine (O.17.1);

O.18 Ecdyson receptor agonists: methoxyfenozide (O.18.1), tebufenozide (O.18.2), halofenozide (O.18.3), fufenozide (O.18.4), chromafenozide (O.18.5);

O.19 Octopamin receptor agonists: amitraz (O.19.1);

O.20 Mitochondrial complex III electron transport inhibitors: hydramethylnon (O.20.1), acequinocyl (O.20.2), fluacrypyrim (O.20.3);

O.21 Mitochondrial complex I electron transport inhibitors: fenazaquin (O.21.1), fenpyroximate (O.21.2), pyrimidifen (O.21.3), pyridaben (O.21.4), tebufenpyrad (O.21.5), tolfenpyrad (O.21.6); rotenone (O.21.7);

O.22 Voltage-dependent sodium channel blockers: indoxacarb (O.22.1), metaflumizone (O.22.2), 2-[2-(4-cyanophenyl)-1-[3-(trifluoromethyl)phenyl]-ethylidene]-N-[4-(difluoromethoxy)phenyl]-hydrazinecarboxamide (O.22.3), N-(3-chloro-2-methylphenyl)-2-[(4-chlorophenyl)-[4-[methyl(methylsulfonyl)-amino]phenyl]methylene]-hydrazinecarboxamide (O.22.4);

O.23 Inhibitors of the of acetyl CoA carboxylase: spirodiclofen (O.23.1), spiromesifen (O.23.2), spirotetramat (O.23.3);

O.24 Mitochondrial complex IV electron transport inhibitors: aluminium phosphide (O.24.1), calcium phosphide (O.24.2), phosphine (O.24.3), zinc phosphide (O.24.4), cyanide (O.24.5);

O.25 Mitochondrial complex II electron transport inhibitors: cyenopyrafen (O.25.1), cyflumetofen (O.25.2);

O.26 Ryanodine receptor-modulators: flubendiamide (O.26.1), chlorantraniliprole (O.26.2), cyantraniliprole (O.26.3), cyclaniliprole (O.26.4), tetraniliprole (O.26.5); (R)-3-chloro-N1-{2-methyl-4-[1,2,2,2-tetrafluoro-1-(trifluoromethyl)ethyl]phenyl}-N2-(1-methyl-2-methylsulfonylethyl)phthalamide (O.26.6), (S)-3-chloro-N1-{2-methyl-4-[1,2,2,2-tetrafluoro-1-(trifluoromethyl)ethyl]phenyl}-N2-(1-methyl-2-methylsulfonylethyl)phthalamide (O.26.7), methyl-2-[3,5-dibromo-2-({[3-bromo-1-(3-chloropyridin-2-yl)-1H-pyrazol-5-yl]carbonyl}amino)benzoyl]-1,2-dimethylhydrazinecarboxylate (O.26.8); N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide (O.26.9); N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide (O.26.10); N-[4-chloro-2-[(di-2-propyl-lambda-4-sulfanylidene)carbamoyl]-6-methyl-phenyl]-2-(3-chloro-2-pyridyl)-5-(trifluoromethyl)pyrazole-3-carboxamide (O.26.11); N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide (O.26.12); N-[4,6-dibromo-2-[(diethyl-lambda-4-sulfanylidene)carbamoyl]-phenyl]-2-(3-chloro-2-pyridyl)-5-(tri-fluoromethyl)pyrazole-3-carboxamide (O.26.13); N-[2-(5-amino-1,3,4-thiadiazol-2-yl)-4-chloro-6-methylphenyl]-3-bromo-1-(3-chloro-2-pyridinyl)-1H-pyrazole-5-carboxamide (O.26.14); 3-chloro-1-(3-chloro-2-pyridinyl)-N-[2,4-dichloro-6-[[(1-cyano-1-methylethyl)amino]carbonyl]phenyl]-1H-pyrazole-5-carboxamide (O.26.15); 3-bromo-N-[2,4-dichloro-6-(methylcarbamoyl)phenyl]-1-(3,5-dichloro-2-pyridyl)-1H-pyrazole-5-carboxamide (O.26.16); N-[4-chloro-2-[[(1,1-dimethylethyl)amino]carbonyl]-6-methylphenyl]-1-(3-chloro-2-pyridinyl)-3-(fluoromethoxy)-1H-pyrazole-5-carboxamide (O.26.17); cyhalodiamide (O.26.18);

O.27. insecticidal active compounds of unknown or uncertain mode of action: afidopyropen (O.27.1), afoxolaner (O.27.2), azadirachtin (O.27.3), amidoflumet (O.27.4), benzoximate (O.27.5), bifenazate (O.27.6), broflanilide (O.27.7), bromopropylate (O.27.8), chinomethionat (O.27.9), cryolite (O.27.10), dicloromezotiaz (O.27.11), dicofol (O.27.12), flufenerim (O.27.13), flometoquin (O.27.14), fluensulfone (O.27.15), fluhexafon (O.27.16), fluopyram (O.27.17), flupyradifurone (O.27.18), fluralaner (O.27.19), metoxadiazone (O.27.20), piperonyl butoxide (O.27.21), pyflubumide (O.27.22), pyridalyl (O.27.23), pyrifluquinazon (O.27.24), sulfoxaflor (O.27.25), tioxazafen (O.27.26), triflumezopyrim (O.27.27), 11-(4-chloro-2,6-dimethylphenyl)-12-hydroxy-1,4-dioxa-9-azadispiro[4.2.4.2]-tetradec-11-en-10-one (O.27.28), 3-(4'-fluoro-2,4-dimethylbiphenyl-3-yl)-4-hydroxy-8-oxa-1-azaspiro[4.5]dec-3-en-2-one (O.27.28), 1-[2-fluoro-4-methyl-5-[(2,2,2-trifluoroethyl)sulfinyl]phenyl]-3-(trifluoromethyl)-1H-1,2,4-triazole-5-amine (O.27.29), (E/Z)-N-[1-[(6-chloro-3-pyridyl)methyl]-2-pyridylidene]-2,2,2-trifluoro-acetamide (O.27.31); (E/Z)-N-[1-[(6-chloro-5-fluoro-3-pyridyl)methyl]-2-pyridylidene]-2,2,2-trifluoro-acetamide (O.27.32); (E/Z)-2,2,2-trifluoro-N-[1-[(6-fluoro-3-pyridyl)methyl]-2-pyridylidene]acetamide (O.27.33); (E/Z)-N-[1-[(6-bromo-3-pyridyl)methyl]-2-pyridylidene]-2,2,2-trifluoro-acetamide (O.27.34); (E/Z)-N-[1-[1-(6-chloro-3-pyridyl)ethyl]-2-pyridylidene]-2,2,2-trifluoro-acetamide (O.27.35); (E/Z)-N-[1-[(6-chloro-3-pyridyl)methyl]-2-pyridylidene]-2,2-difluoro-acetamide (O.27.36); (E/Z)-2-chloro-N-[1-[(6-chloro-3-pyridyl)methyl]-2-pyridylidene]-2,2-difluoro-acetamide (O.27.37); (E/Z)-N-[1-[(2-chloropyrimidin-5-yl)methyl]-2-pyridylidene]-2,2,2-trifluoro-acetamide (O.27.38); (E/Z)-N-[1-[(6-chloro-3-pyridyl)methyl]-2-pyridylidene]-2,2,3,3,3-pentafluoro-propanamide (O.27.39); N-[1-[(6-chloro-3-pyridyl)methyl]-2-pyridylidene]-2,2,2-trifluoro-thioacetamide (O.27.40);

N-[1-[(6-chloro-3-pyridyl)methyl]-2-pyridylidene]-2,2,2-trifluoro-N'-isopropyl-acetamidine (O.27.41); fluazaindolizine (O.27.42); 4-[5-(3,5-dichlorophenyl)-5-(trifluoromethyl)-4H-isoxazol-3-yl]-2-methyl-N-(1-oxothietan-3-yl)benzamide (O.27.43); fluxametamide (O.27.44); 5-[3-[2,6-dichloro-4-(3,3-dichloroallyloxy)phenoxy]propoxy]-1H-pyrazole (O.27.45); 3-(benzoylmethylamino)-N-[2-bromo-4-[1,2,2,3,3,3-hexafluoro-1-(trifluoromethyl)propyl]-6-(trifluoromethyl)phenyl]-2-fluoro-benzamide (O.27.46); 3-(benzoylmethylamino)-2-fluoro-N-[2-iodo-4-[1,2,2,2-tetrafluoro-1-(trifluoromethyl)ethyl]-6-(trifluoromethyl)phenyl]-benzamide (O.27.47); N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide (O.27.48); N-[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide (O.27.49); 4-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide (O.27.50); 3-fluoro-N-[2-fluoro-3-[[[2-iodo-4-[1,2,2,2-tetrafluoro-1-(trifluoromethyl)ethyl]-6 (trifluoromethyl)phenyl]amino]carbonyl]phenyl]-N-methyl-benzamide (O.27.51); 2-chloro-N-[3-[[[2-iodo-4-[1,2,2,2-tetrafluoro-1-(tri-fluoromethyl)ethyl]-6-(trifluoromethyl)phenyl]amino]carbonyl]phenyl]-3-pyridine-carboxamide (O.27.52); 4-cyano-N-[2-cyano-5-[[2,6-dibromo-4-[1,2,2,3,3,3-hexafluoro-1-(trifluoromethyl)propyl]phenyl]carbamoyl]phenyl]-2-methyl-benzamide (O.27.53); 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2-fluoro-benzamide (O.27.54); N-[5-[[2-chloro-6-cyano-4-[1,2,2,3,3,3-hexafluoro-1-(trifluoromethyl)propyl]phenyl]carbamoyl]-2-cyano-phenyl]-4-cyano-2-methyl-benzamide (O.27.55); N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide (O.27.56); N-[5-[[2-bromo-6-chloro-4-[1,2,2,3,3,3-hexafluoro-1-(trifluoro-methyl)propyl]phenyl]carbamoyl]-2-cyano-phenyl]-4-cyano-2-methyl-benzamide (O.27.57); 4-cyano-N-[2-cyano-5-[[2,6-dichloro-4-[1,2,2,3,3,3-hexafluoro-1-(trifluoromethyl)propyl]phenyl]carbamoyl]phenyl]-2-methyl-benzamide (O.27.58); 4-cyano-N-[2-cyano-5-[[2,6-dichloro-4-[1,2,2,2-tetrafluoro-1-(trifluoromethyl)ethyl]phenyl]carbamoyl]phenyl]-2-methyl-benzamide (O.27.59); N-[5-[[2-bromo-6-chloro-4-[1,2,2,2-tetrafluoro-1-(trifluoromethyl)ethyl]phenyl]carbamoyl]-2-cyano-phenyl]-4-cyano-2-methyl-benzamide (O.27.60); 2-(1,3-dioxan-2-yl)-6-[2-(3-pyridinyl)-5-thiazolyl]-pyridine; 2-[6-[2-(5-fluoro-3-pyridinyl)-5-thiazolyl]-2-pyridinyl]-pyrimidine (O.27.61); 2-[6-[2-(3-pyridinyl)-5-thiazolyl]-2-pyridinyl]-pyrimidine (O.27.62); N-methylsulfonyl-6-[2-(3-pyridyl)thiazol-5-yl]pyridine-2-carboxamide (O.27.63); N-methylsulfonyl-6-[2-(3-pyridyl)thiazol-5-yl]pyridine-2-carboxamide (O.27.64);

N-ethyl-N-[4-methyl-2-(3-pyridyl)thiazol-5-yl]-3-methylthio-propanamide (O.27.65); N-methyl-N-[4-methyl-2-(3-pyridyl)thiazol-5-yl]-3-methylthio-propanamide (O.27.66); N,2-dimethyl-N-[4-methyl-2-(3-pyridyl)thiazol-5-yl]-3-methylthio-propanamide (O.27.67); N-ethyl-2-methyl-N-[4-methyl-2-(3-pyridyl)thiazol-5-yl]-3-methylthio-propanamide (O.27.68); N-[4-chloro-2-(3-pyridyl)thiazol-5-yl]-N-ethyl-2-methyl-3-methylthio-propanamide (O.2769.); N-[4-chloro-2-(3-pyridyl)thiazol-5-yl]-N,2-dimethyl-3-methylthio-propanamide (O.27.70); N-[4-chloro-2-(3-pyridyl)thiazol-5-yl]-N-methyl-3-methylthio-propanamide (O.27.71); N-[4-chloro-2-(3-pyridyl)thiazol-5-yl]-N-ethyl-3-methylthio-propanamide (O.27.72); 1-[(6-chloro-3-pyridinyl)methyl]-1,2,3,5,6,7-hexahydro-5-methoxy-7-methyl-8-nitro-imidazo[1,2-a]pyridine (O.27.73); 1-[(6-chloropyridin-3-yl)methyl]-7-methyl-8-nitro-1,2,3,5,6,7-hexahydroimidazo[1,2-a]pyridin-5-ol (O.27.74); 1-isopropyl-N,5-dimethyl-N-pyridazin-4-yl-pyrazole-4-carboxamide (O.27.75); 1-(1,2-dimethylpropyl)-N-ethyl-5-methyl-N-pyridazin-4-yl-pyrazole-4-carboxamide (O.27.76); N,5-dimethyl-N-pyridazin-4-yl-1-(2,2,2-trifluoro-1-methyl-ethyl)pyrazole-4-carboxamide (O.27.77); 1-[1-(1-cyanocyclopropyl)eth-yl]-N-ethyl-5-methyl-N-pyridazin-4-yl-pyrazole-4-carboxamide (O.27.78); N-ethyl-1-(2-fluoro-1-methyl-propyl)-5-methyl-N-pyridazin-4-yl-pyrazole-4-carboxamide (O.27.79); 1-(1,2-dimethylpropyl)-N,5-dimethyl-N-pyridazin-4-yl-pyrazole-4-carboxamide (O.27.80); 1-[1-(1-cyanocyclopropyl)ethyl]-N,5-dimethyl-N-pyridazin-4-yl-pyrazole-4-carboxamide (O.27.81); N-methyl-1-(2-fluoro-1-methyl-propyl]-5-methyl-N-pyridazin-4-yl-pyrazole-4-carboxamide (O.27.82); 1-(4,4-difluorocyclohexyl)-N-ethyl-5-methyl-N-pyridazin-4-yl-pyrazole-4-carboxamide (O.27.83); 1-(4,4-difluorocyclohexyl)-N,5-dimethyl-N-pyridazin-4-yl-pyrazole-4-carboxamide (O.27.84), N-(1-methylethyl)-2-(3-pyridinyl)-2H-indazole-4-carboxamide (O.27.85); N-cyclopropyl-2-(3-pyridinyl)-2H-indazole-4-carboxamide (O.27.86); N-cyclohexyl-2-(3-pyridinyl)-2H-indazole-4-carboxamide (O.27.87); 2-(3-pyridinyl)-N-(2,2,2-trifluoroethyl)-2H-indazole-4-carboxamide (O.27.88); 2-(3-pyridinyl)-N-[(tetrahydro-2-furanyl)methyl]-2H-indazole-5-carboxamide (O.27.89); methyl 2-[[2-(3-pyridinyl)-2H-indazol-5-yl]carbonyl]hydrazinecarboxylate (O.27.90); N-[(2,2-di-fluorocyclopropyl)methyl]-2-(3-pyridinyl)-2H-indazole-5-carboxamide (O.27.91); N-(2,2-di-fluoropropyl)-2-(3-pyridinyl)-2H-indazole-5-carboxamide (O.27.92); 2-(3-pyridinyl)-N-(2-pyrimidinylmethyl)-2H-indazole-5-carboxamide (O.27.93); N-[(5-methyl-2-pyrazinyl)methyl]-2-(3-pyridinyl)-2H-indazole-5-carboxamide (O.27.94), N-[3-chloro-1-(3-pyridyl)pyrazol-4-yl]-N-ethyl-3-(3,3,3-trifluoropropylsulfanyl)propanamide (O.27.95); N-[3-chloro-1-(3-pyridyl)pyrazol-4-yl]-N-ethyl-3-(3,3,3-trifluoropropylsulfinyl)propanamide (O.27.96); N-[3-chloro-1-(3-pyridyl)pyrazol-4-yl]-3-[(2,2-difluorocyclopropyl)methylsulfanyl]-N-ethyl-propanamide (O.27.97); N-[3-chloro-1-(3-pyridyl)pyrazol-4-yl]-3-[(2,2-difluorocyclopropyl)methylsulfinyl]-N-ethyl-propanamide (O.27.98); sarolaner (O.27.99), lotilaner (O.27.100), 3-(2-chlorothiazol-5-yl)-8-methyl-5-oxo-6-phenyl-2,3-dihydrothiazolo[3,2-1]pyrimidin-8-ium-7-olate (O.27.101), (3R)-3-(2-chlorothiazol-5-yl)-8-methyl-5-oxo-6-phenyl-2,3-dihydrothiazolo[3,2-1]pyrimidin-8-ium-7-olate (O.27.102), oxazosulfyl (O.27.103), N-[4-chloro-3-[[(phenylmethyl)amino]carbonyl]phenyl]-1-methyl-3-(1,1,2,2,2-pentafluoroethyl)-4-(trifluoromethyl)-1H-pyrazole-5-carboxamide (O.27.104), 2-[2-fluoro-4-methyl-5-(2,2,2-trifluoroethylsulfinyl)phenyl]-5-(trifluoromethyl)-1,2,4-triazol-3-amine (O.27.105), 1-[2,4-dimethyl-5-(2,2,2-trifluoroethylsulfinyl)phenyl]-3-(trifluoromethyl)-1,2,4-triazole (O.27.106) in a weight ratio of from 100:1 to 1:100.

The invention also relates to a method for controlling phytopathogenic harmful fungi using mixtures of at least one compound I and at least one compound II in a weight ratio of from 100:1 to 1:100; to the use of mixtures comprising compounds I and compounds II for controlling phytopathogenic harmful fungi; to agrochemical compositions comprising these mixtures; and to agrochemical compositions further comprising seed.

Practical agricultural experience has shown that the repeated and exclusive application of an individual active compound in the control of harmful fungi leads in many cases to a rapid selection of those fungus strains which have developed natural or adapted resistance against the active compound in question. Effective control of these fungi with the active compound in question is then no longer possible.

To reduce the risk of the selection of resistant fungus strains, mixtures of different active compounds are conventionally employed for controlling harmful fungi. By combining active compounds having different mechanisms of action, it is possible to ensure successful control over a relatively long period of time.

It is an object of the present invention to provide, with a view to effective resistance management and effective control of phytopathogenic harmful fungi, at application rates which are as low as possible, compositions which, at a reduced total amount of active compounds applied, have improved activity against the harmful fungi (synergistic mixtures) and a broadened activty spectrum, in particular for certain indications.

We have accordingly found that this object is achieved by the compositions, defined herein, comprising at least one compound I and at least one compound II.

Moreover, we have found that simultaneous, that is joint or separate, application of a compound I and a compound II or successive application of a compound I and of compound II allows better control of harmful fungi than is possible with the individual compounds alone (synergistic mixtures). Compounds I and/or the compounds II can be present in different crystal modifications, which may differ in biological activity.

The term "compounds I" refers to compounds of formula I.

In the definitions of the variables given above, collective terms are used which are generally representative for the substituents in question. The term "$C_n$-$C_m$" indicates the number of carbon atoms possible in each case in the substituent or substituent moiety in question.

The term "halogen" refers to fluorine, chlorine, bromine and iodine.

The term "$C_1$-$C_6$-alkyl" refers to a straight-chained or branched saturated hydrocarbon group having 1 to 6 carbon atoms, for example methyl, ethyl, propyl, 1-methylethyl, butyl, 1-methylpropyl, 2-methylpropyl, and 1,1-dimethylethyl.

The term "$C_2$-$C_6$-alkenyl" refers to a straight-chain or branched unsaturated hydrocarbon radical having 2 to 6 carbon atoms and a double bond in any position, such as ethenyl, 1-propenyl, 2-propenyl (allyl), 1-methylethenyl, 1-butenyl, 2-butenyl, 3-butenyl, 1-methyl-1-propenyl, 2-methyl-1-propenyl, 1-methyl-2-propenyl, 2-methyl-2-propenyl.

The term "$C_2$-$C_6$-alkynyl" refers to a straight-chain or branched unsaturated hydrocarbon radical having 2 to 6 carbon atoms and containing at least one triple bond, such as ethynyl, 1-propynyl, 2-propynyl (propargyl), 1-butynyl, 2-butynyl, 3-butynyl, 1-methyl-2-propynyl.

The term "$C_1$-$C_6$-haloalkyl" refers to a straight-chained or branched alkyl group having 1 to 6 carbon atoms (as defined above), wherein some or all of the hydrogen atoms in these groups may be replaced by halogen atoms as mentioned above, for example chloromethyl, bromomethyl, dichloromethyl, trichloromethyl, fluoromethyl, difluoromethyl, trifluoromethyl, chlorofluoromethyl, dichlorofluoromethyl, chlorodifluoromethyl, 1-chloroethyl, 1-bromoethyl, 1-fluoroethyl, 2-fluoroethyl, 2,2-difluoroethyl, 2,2,2-trifluoroethyl, 2-chloro-2-fluoroethyl, 2-chloro-2,2-difluoroethyl, 2,2-dichloro-2-fluoroethyl, 2,2,2-trichloroethyl and pentafluoroethyl, 2-fluoropropyl, 3-fluoropropyl, 2,2-difluoropropyl, 2,3-difluoropropyl, 2-chloropropyl, 3-chloropropyl, 2,3-dichloropropyl, 2-bromopropyl, 3-bromopropyl, 3,3,3-trifluoropropyl, 3,3,3-trichloropropyl, $CH_2$—$C_2F5$, $CF_2$—$C_2F5$, $CF(CF_3)_2$, 1-(fluoromethyl)-2-fluoroethyl, 1-(chloromethyl)-2-chloroethyl, 1-(bromomethyl)-2-bromoethyl, 4-fluorobutyl, 4-chlorobutyl, 4-bromobutyl or nonafluorobutyl.

The term "$C_1$-$C_6$-alkoxy" refers to a straight-chain or branched alkyl group having 1 to 6 carbon atoms (as defined above) which is bonded via an oxygen, at any position in the alkyl group, for example methoxy, ethoxy, n-propoxy, 1-methylethoxy, butoxy, 1-methylpropoxy, 2-methylpropoxy or 1,1-dimethylethoxy.

The term "aliphatic" refers to compounds or radicals composed of carbon and hydrogen and which are non-aromatic compounds. An "alicyclic" compound or radical is an organic compound that is both aliphatic and cyclic. They contain one or more all-carbon rings which may be either saturated or unsaturated, but do not have aromatic character.

The terms "cyclic moiety" or "cyclic group" refer to a radical which is an alicyclic ring or an aromatic ring, such as, for example, phenyl or heteroaryl.

The term "and wherein any of the aliphatic or cyclic groups are unsubstituted or substituted with . . . " refers to aliphatic groups, cyclic groups and groups, which contain an aliphatic and a cyclic moiety in one group, such as in, for example, $C_3$-$C_8$-cycloalkyl-$C_1$-$C_4$-alkyl; therefore a group which contains an aliphatic and a cyclic moiety both of these moieties may be substituted or unsubstituted independently of each other.

The term "phenyl" refers to an aromatic ring systems incuding six carbon atoms (commonly referred to as benzene ring).

Agriculturally acceptable salts of the active compounds I, II and III encompass especially the salts of those cations or the acid addition salts of those acids whose cations and anions, respectively, have no adverse effect on the fungicidal action of the active compounds. Suitable cations are thus in particular the ions of the alkali metals, preferably sodium and potassium, of the alkaline earth metals, preferably calcium, magnesium and barium, of the transition metals, preferably manganese, copper, zinc and iron, and also the ammonium ion which, if desired, may carry 1 to 4 $C_1$-$C_4$-alkyl substituents and/or one phenyl or benzyl substituent, preferably diisopropylammonium, tetramethylammonium, tetrabutylammonium, trimethylbenzylammonium, furthermore phosphonium ions, sulfonium ions, preferably tri($C_1$-$C_4$-alkyl)sulfonium, and sulfoxonium ions, preferably tri ($C_1$-$C_4$-alkyl)sulfoxonium. Anions of useful acid addition salts are primarily chloride, bromide, fluoride, hydrogensulfate, sulfate, dihydrogenphosphate, hydrogenphosphate, phosphate, nitrate, bicarbonate, carbonate, hexafluorosilicate, hexafluorophosphate, benzoate, and the anions of $C_1$-$C_4$-alkanoic acids, preferably formate, acetate, propionate and butyrate. They can be formed by reacting a compound I with an acid of the corresponding anion, preferably of hydrochloric acid, hydrobromic acid, sulfuric acid, phosphoric acid or nitric acid.

The scope of the present invention includes mixtures of the (R)- and (S)-isomers and the racemates of compounds I and/or II and/or III having one or more chiral centers. As a result of hindered rotation of asymmetrically substituted groups, atrope isomers of active compounds I and/or II and/or III may be present. They also form part of the subject matter of the invention.

Compounds I and their preparation and their use as fungicidally active compounds have been described in WO 2017/016915 A1.

Compounds of formula I can be accessed e.g. starting from alcohols of type II with nitriles of type III in the presence of an acid in an organic solvent (see for example US 2008/0275242 or WO2005/070917). Preferably, sulfuric acid or a sulfonic acid, in particular triflic acid, are used as acid. Most suitable solvents are hydrocarbons, preferably benzene or dichloromethane. In the following schemes, the optionally substituted phenyl or heteroaryl fromed by $R^7$ and $R^8$ is sketched by a circle named "A":

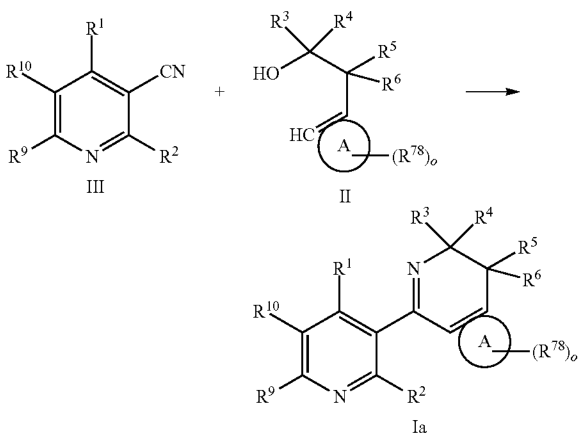

Depending on the nature of the starting materials, the reaction is performed at a temperature from −40° C. to 200° C., in particular from −10° C. to 120° C., more specifically from 0° C. to 100° C., even more specifically from room or ambient temperature (about 23° C.) to 80° C.

Nitriles of type III are either commercially available or can be prepared by a skilled person from the corresponding halides following literature precedures (see, for example Journal of Organic Chemistry, 76(2), 665-668; 2011; Angewandte Chemie, International Edition, 52(38), 10035-10039; 2013; WO2004/013094).

Alcohols of type II can be prepared as described below. A skilled person will realize that compounds of type III can be reacted with organometallic reagents, preferably alkyl Grignard or alkyl-Lithium reagents, in ethereal solvents, preferably THF at low temperatures and under inert conditions to furnish compounds of type II.

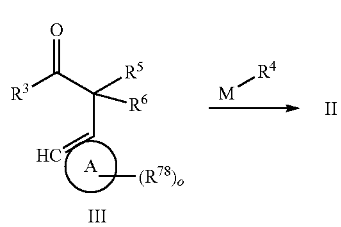

Alternatively, alcohols of type II can be prepared from epoxydes IIIa and compounds VI (see below):

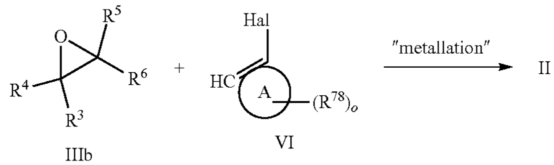

The metallation reaction may preferably be carried out using Lithium-organic compounds, such as for example n-butyl lithium, sec-butyl lithium or tert-butyl lithium to result in an exchange of halogen by lithium. Also suitable is the reaction with magnesium resulting in the formation of the respective Grignard reagents. A further possibility is the use of other Grignard reagents such as isopropyl-magnesium-bromide instead of Mg.

A typical preparation of compounds of type III can be achieved by reacting compounds of type IV with organometallic reagents, preferably alkyl Grignard or alkyl-Lithium reagents, in ethereal solvents, preferably THF at low temperatures and under inert conditions to furnish compounds of type III as previously reported (see for example WO2012051036; WO2011042918).

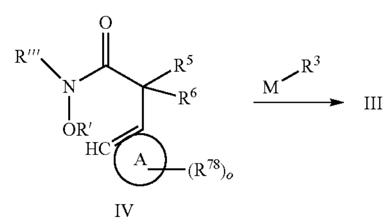

Compounds of type IV can be accessed by reacting a carbonyl compound of type V, preferably a carboxylic acid (X═OH) or an acid chloride (X═Cl), with NH(OR')R", wherein R' and R" are selected from $(C_1-C_4)$-alkyl, most preferably being methyl, in an organic solvent, preferably THF or dichloromethane. Typically the reaction is performed in a range between 0° C. and ambient temperature in the presence of an organic base, preferably $N(C_2H)_3$ or pyridine (see e.g. US 20130324506; Tetrahedron: Asymmetry, 17(4), 508-511; 2006). If X═OH, the addition of an activating reagent, preferably a carbodiimide, may be preferred (see for example ChemMedChem, 7(12), 2101-2112; 2012; 2011038204; Journal of Organic Chemistry, 76(1), 164-169; 2011).

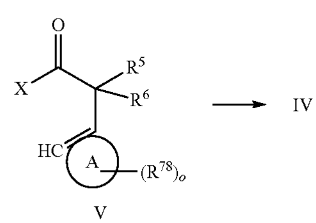

If required, compounds of type V can be prepared from the corresponding aryl halides of type VI (Hal is halogen, preferably Br or 1). As described (Tetrahedron, 68(9), 2113-

2120; 2012; Chemical Communications (Cambridge, United Kingdom), 49(60), 6767-6769; 2013), aryl halides will react with compounds of type VII in the presence of a transition metal catalyst, preferably a copper(I) salt, in an organic solvent, preferably DMF or DMSO, at elevated temperatures. Typically a base. preferably potassium phosphate. is added.

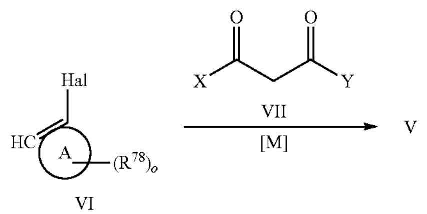

If appropriate, compounds of type II can be prepared as follows. A known or commercially available compound of type VIII can be reacted with an organometallic reagent of type IX, preferably a Grignard or an organolithium reagent, readily prepared by a skilled person. Preferably, the reaction is performed in a temperature range from −78° C. to room temperature under inert conditions in an ethereal solvent.

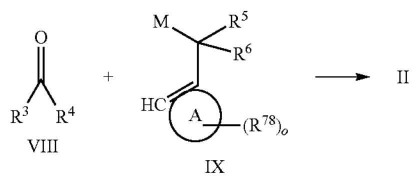

It may be preferred to access compounds I, where $R^5$ and $R^6$ are F (named compounds I-1) from the respective keto compound (named compounds IIA) as follows based on a literature precedent (US 2008/0275242). A skilled person will realize that compounds 1-1 can be formed using a suitable halogenation agent, preferably diethyl aminosulfur trifluoride or phosphorus trihalides in an organic solvent, preferably a chlorinated hydrocarbon such as dichloromethane at, e.g., room temperature. If appropriate, the reaction can be performed at elevated temperatures.

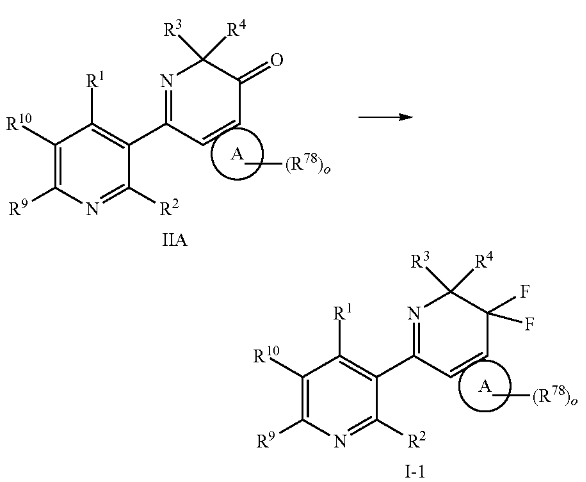

Compounds of type IIA can be accessed by reacting compounds of type 1-2 (where $R^5$ and $R^6$ are halogen substituents (Hal'), in particular bromo) under aqueous or mildly acidic conditions in an organic solvent.

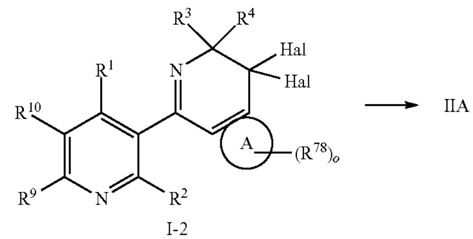

Said compounds 1-2 can be prepared from compounds 1-3 (where $R^5$ and $R^6$ are both hydrogen) by reaction with a halide source, preferably N-bromosuccinimide or 1,3-dibromo-5,5-dimethylhydantoin, in an organic solvent, preferably chlorobenzene or carbon tetrachloride in the presence of an initiator, preferably azo-bis-isobutyronitrile, at elevated temperatures (see for example WO 2008/035379).

I-3

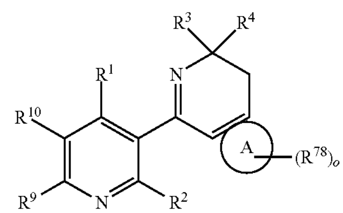

In one embodiment the present invention relates to mixtures comprising as component 1) at least one active compound of the formula I, or an N-oxide, or an agriculturally useful salt thereof, wherein:

$R^1$ is in each case independently selected from hydrogen and $C_1$-$C_6$-alkyl;

$R^2$ is in each case independently selected from hydrogen and $C_1$-$C_6$-alkyl;

$R^3$, $R^4$ are independently selected from $C_1$-$C_6$-alkyl and $C_1$-$C_6$-halogenalkyl;

$R^5$ is halogen;

$R^6$ is halogen;

$R^7$, $R^8$ together with the carbon atoms to which they are bound form a ring A, wherein the ring A is phenyl and wherein the ring A is substituent by $(R^{78})_o$, wherein o is 0, 1, 2 or 3; and $R^{78}$ are independently selected from halogen and $C_1$-$C_6$-alkyl;

$R^9$, $R^{10}$ are independently selected from $C_1$-$C_6$-alkyl, $C_1$-$C_6$-Alkox, and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is in each case independently selected from hydrogen and $C_1$-$C_6$-alkyl;

$R^2$ is in each case independently selected from hydrogen and $C_1$-$C_6$-alkyl;

$R^3$, $R^4$ are independently selected from $C_1$-$C_6$-alkyl and $C_1$-$C_6$-halogenalkyl;

$R^5$ is halogen;

$R^6$ is halogen;

$R^7$, $R^8$ together with the carbon atoms to which they are bound form a ring A, wherein the ring A is phenyl which is unsubstituted;

$R^9$, $R^{10}$ are independently selected from $C_1$-$C_6$-alkyl, $C_1$-$C_6$-Alkox, and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently selected from $C_1$-$C_6$-alkyl and $C_1$-$C_6$-halogenalkyl;

$R^5$ is halogen;

$R^6$ is halogen;

$R^7$, $R^8$ together with the carbon atoms to which they are bound form a ring A, wherein the ring A is phenyl and wherein the ring A is substituent by $(R^{78})_o$, wherein o is 0, 1, 2 or 3; and $R^{78}$ are independently selected from halogen and $C_1$-$C_6$-alkyl;

$R^9$, $R^{10}$ are independently selected from $C_1$-$C_6$-alkyl and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently selected from $C_1$-$C_6$-alkyl and $C_1$-$C_6$-halogenalkyl;

$R^5$ is halogen;

$R^6$ is halogen;

$R^7$, $R^8$ together with the carbon atoms to which they are bound form a ring A, wherein the ring A is phenyl which is unsubstituted;

$R^9$, $R^{10}$ are independently selected from $C_1$-$C_6$-alkyl and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently $C_1$-$C_6$-alkyl;

$R^5$ is halogen;

$R^6$ is halogen;

$R^7$, $R^8$ together with the carbon atoms to which they are bound form a ring A, wherein the ring A is phenyl and wherein the ring A is substituent by $(R^{78})_o$, wherein o is 0, 1, 2 or 3; and $R^{78}$ are independently selected from halogen and $C_1$-$C_6$-alkyl;

$R^9$, $R^{10}$ are independently selected from $C_1$-$C_6$-alkyl and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently $C_1$-$C_6$-alkyl;

$R^5$ is halogen;

$R^6$ is halogen;

$R^7$, $R^8$ together with the carbon atoms to which they are bound form a ring A, wherein the ring A is phenyl which is unsubstituted;

$R^9$, $R^{10}$ are independently selected from $C_1$-$C_6$-alkyl and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently $C_1$-$C_6$-alkyl;

$R^5$ is F;

$R^6$ is F;

$R^7$, $R^8$ together with the carbon atoms to which they are bound form a ring A, wherein the ring A is phenyl and wherein the ring A is substituent by $(R^{78})_o$, wherein o is 0, 1, 2 or 3; and $R^{78}$ are independently selected from halogen and $C_1$-$C_6$-alkyl;

$R^9$, $R^{10}$ are independently selected from $C_1$-$C_6$-alkyl and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently $C_1$-$C_6$-alkyl;

$R^5$ is F;

$R^6$ is F;

$R^7$, $R^8$ together with the carbon atoms to which they are bound form a ring A, wherein the ring A is phenyl which is unsubstituted;

$R^9$, $R^{10}$ are independently selected from $C_1$-$C_6$-alkyl and $C_1$-$C_6$-halogenalkyl.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently $C_1$-$C_6$-alkyl;

$R^5$ is F;

$R^6$ is F;

$R^7$, $R^8$ together with the carbon atoms to which they are bound form a ring A, wherein the ring A is phenyl and wherein the ring A is substituent by $(R^{78})_o$, wherein o is 0, 1, 2 or 3; and $R^{78}$ are independently selected from halogen and $C_1$-$C_6$-alkyl;

$R^9$, $R^{10}$ are independently selected from $CH_3$ and $CHF_2$.

In one embodiment the present invention relates to mixtures comprising as component 1) at least one active compound of the formula I, or an N-oxide, or an agriculturally useful salt thereof, wherein:

$R^1$ is hydrogen;

$R^2$ is hydrogen;

$R^3$, $R^4$ are independently $C_1$-$C_6$-alkyl;

$R^5$ is F;

$R^6$ is F;

$R^7$, $R^8$ together with the carbon atoms to which they are bound form a ring A, wherein the ring A is phenyl which is unsubstituted;

$R^9$, $R^{10}$ are independently selected from $CH_3$ and $CHF_2$.

Particularly preferred active compounds I are selected from the group consisting of compounds I.A to IZA:

I.A: 1-(5,6-dimethyl-3-pyridyl)-4,4-difluoro-3,3-dimethyl-isoquinoline

I.B: 1-[6-(difluoromethyl)-5-methyl-3-pyridyl]-4,4-difluoro-3,3-dimethyl-isoquinoline I.C: 1-[6-(difluoromethyl)-5-methoxy-3-pyridyl]-4,4-difluoro-3,3-dimethyl-isoquinoline I.D: 4,4-difluoro-1-[5-(fluoromethyl)-6-methyl-3-pyridyl]-3,3-dimethyl-isoquinoline I.E: 4,4-difluoro-1-(5-methoxy-6-methyl-3-pyridyl)-3,3-dimethyl-isoquinoline I.F: 4,4-difluoro-1-[6-(fluoromethyl)-5-methyl-3-pyridyl]-3,3-dimethyl-isoquinoline I.G: 1-[5,6-bis(fluoromethyl)-3-pyridyl]-4,4-difluoro-3,3-dimethyl-isoquinoline I.H: 4,4-difluoro-1-[6-(fluoromethyl)-5-methoxy-3-pyridyl]-3,3-dimethyl-isoquinoline I.I: 1-[6-(difluoromethyl)-5-(fluoromethyl)-3-pyridyl]-4,4-difluoro-3,3-dimethyl-isoquinoline I.J: 1-(5,6-dimethyl-3-pyridyl)-4,4,5-trifluoro-3,3-dimethyl-isoquinoline I.K: 4,4,5-trifluoro-1-[5-(fluoromethyl)-6-methyl-3-pyridyl]-3,3-dimethyl-isoquinoline I.L: 4,4,5-trifluoro-1-(5-methoxy-6-methyl-3-pyridyl)-3,3-dimethyl-isoquinoline I.M: 4,4,5-trifluoro-1-[6-(fluoromethyl)-5-methyl-3-pyridyl]-3,3-dimethyl-isoquinoline I.N: 1-[5,6-bis(fluoromethyl)-3-pyridyl]-4,4,5-trifluoro-3,3-dimethyl-isoquinoline I.O: 4,4,5-trifluoro-1-[6-(fluoromethyl)-5-methoxy-3-pyridyl]-3,3-dimethyl-isoquinoline I.P: 1-[6-(difluoromethyl)-5-methyl-3-pyridyl]-4,4,5-trifluoro-3,3-dimethyl-isoquinoline I.Q: 1-[6-(difluoromethyl)-5-(fluoromethyl)-3-pyridyl]-4,4,5-trifluoro-3,3-dimethyl-isoquinoline I.R: 1-[6-(difluoromethyl)-5-methoxy-3-pyridyl]-4,4,5-trifluoro-3,3-dimethyl-isoquinoline I.S: 1-(5,6-dimethyl-3-pyridyl)-4,4,6-trifluoro-3,3-dimethyl-isoquinoline I.T: 4,4,6-trifluoro-1-[5-(fluoromethyl)-6-methyl-3-pyridyl]-3,3-dimethyl-isoquinoline I.U: 4,4,6-trifluoro-1-(5-methoxy-6-methyl-3-pyridyl)-3,3-dimethyl-isoquinoline I.V: 4,4,6-trifluoro-1-[6-(fluoromethyl)-5-methyl-3-pyridyl]-3,3-dimethyl-isoquinoline I.W: 1-[5,6-bis(fluoromethyl)-3-pyridyl]-4,4,6-trifluoro-3,3-dimethyl-isoquinoline I.X: 4,4,6-trifluoro-1-[6-(fluoromethyl)-5-methoxy-3-pyridyl]-3,3-dimethyl-isoquinoline I.Y: 1-[6-(difluoromethyl)-5-methyl-3-pyridyl]-4,4,6-trifluoro-3,3-dimethyl-isoquinoline I.Z: 1-[6-(difluoromethyl)-5-(fluoromethyl)-3-pyridyl]-4,4,6-trifluoro-3,3-dimethyl-isoquinoline I.ZA: 1-[6-(difluoromethyl)-5-methoxy-3-pyridyl]-4,4,6-trifluoro-3,3-dimethyl-isoquinoline.

Preference is also given to mixtures comprising as component 2) at least one active compound selected from inhibitors of complex III at Q, site in group A), more preferably selected from compounds (A.1.1), (A.1.4), (A.1.8), (A.1.10), (A.1.11), (A.1.12), (A.1.14), (A.1.17), (A.1.19), (A.1.25), (A.1.34), (A.1.35), and (A.1.35).

Preference is also given to mixtures comprising as component 2) at least one active compound selected from inhibitors of complex III at Q, site in group A), more preferably selected from compounds (A.1.1), (A.1.4), (A.1.8), (A.1.9), (A.1.10), (A.1.11), (A.1.12), (A.1.14), (A.1.16), (A.1.17).

Preference is also given to mixtures comprising as component 2) at least one active compound selected from inhibitors of complex III at Q, site in group A), more preferably selected from compounds (A.2.1), (A.2.3), (A.2.4) and (A.2.5); particularly selected from (A.2.3), (A.2.4), (A.2.5) and (A.2.6).

Preference is also given to mixtures comprising as component 2) at least one active compound selected from inhibitors of complex II in group A), more preferably selected from compounds (A.3.2), (A.3.3), (A.3.4), (A.3.7), (A.3.8), (A.3.9), (A.3.10), (A.3.11), (A.3.12), (A.3.15), (A.3.16), (A.3.17), (A.3.19), (A.3.21), (A.3.22), (A.3.23), (A.3.28), (A.3.29) and (A.3.31).

Preference is also given to mixtures comprising as component 2) at least one active compound selected from other respiration inhibitors in group A), more preferably selected from compounds (A.4.5).

Preference is also given to mixtures comprising as component 2) at least one active compound selected from C14 demethylase inhibitors in group B), more preferably selected from compounds (B.1.4), (B.1.5), (B.1.8), (B.1.10), (B.1.12), (B.1.15), (B.1.17), (B.1.18), (B.1.21), (B.1.22), (B.1.23), (B.1.25), (B.1.26), (B.1.29), ((B.1.38), (B.1.44) and (B.1.46).

Preference is also given to mixtures comprising as component 2) at least one active compound selected from delta14-reductase inhibitors in group B), more preferably (B.2.4).

Preference is also given to mixtures comprising as component 2) at least one active compound selected from inhibitors of 3-keto reductase in group B), more preferably (B.3.1).

Preference is also given to mixtures comprising as component 2) at least one active compound selected from phenylamides and acyl amino acid fungicides in group C), more preferably selected from compounds (C.1.4), (C.1.5), (C.2.1); particularly (C.1.4)).

Preference is also given to mixtures comprising as component 2) at least one active compound selected from group D), more preferably selected from compounds (D.1.4), (D.1.5), (D.2.3), (D.2.5) and (D.2.6).

Preference is also given to mixtures comprising as component 2) at least one active compound selected from group E), more preferably selected from compounds (E.1.1), (E.1.3), (E.2.2) and (E.2.3).

Preference is also given to mixtures comprising as component 2) at least one active compound selected from group F), more preferably selected from compounds (F.1.2), (F.1.3) and (F.1.5).

Preference is also given to mixtures comprising as component 2) at least one active compound selected from group G), more preferably selected from compounds (G.1.4), (G.3.1) and (G.5.1).

Preference is also given to mixtures comprising as component 2) at least one active compound selected from group H), more preferably selected from compounds (H.1.2), (H.1.4), (H.1.5), (H.1.6), (H.1.7), (H.2.2), (H.2.3), (H.2.5), (H.2.7), (H.3.2), (H.3.4), (H.3.5), (H.3.10), (H.4.2), (H.4.9)); particularly selected from (H.1.5), (H.2.2), (H.2.5), (H.3.2), (H.4.9).

Preference is also given to mixtures comprising as component 2) at least one active compound selected from group 1), more preferably selected from compounds (I.1.1), (I.2.1), (I.2.2), (I.2.3) and (I.2.4).

Preference is also given to mixtures comprising as component 2) at least one active compound selected from group J), more preferably selected from compounds (J.1.2), (J.1.3), (J.1.4), (J.1.5), (J.1.8), (J.1.12).

Preference is also given to mixtures comprising as component 2) at least one active compound selected from group K), more preferably selected from compounds (K.1.13), (K.1.47) and (K.1.54).

Preference is also given to mixtures comprising as pesticide II (component 2) a biopesticide selected from the groups L1), L3) to L5), preferably selected from strains denoted above as (L.1.14), (L.1.15), (L.1.17), (L.1.18), (L.1.19), (L.1.20), (L.1.21), (L.1.25), (L.1.26), (L.1.27), (L.1.32), (L.1.46-L.1.56) (L.3.1); (L.3.9), (L.3.16), (L.3.17), (L.5.1), (L.5.2), (L.5.3), (L.5.4), (L.5.5), (L.5.6), (L.5.7), (L.5.8); (L.4.2), and (L.4.1); even more preferably selected from (L.1.2), (L.1.6), (L.1.7), (L.1.8), (L.1.11), (L.1.12), (L.1.13), (L.1.14), (L.1.15), (L.1.18), (L.1.19), (L.1.20), (L.1.21), (L.3.1); (L.3.9), (L.3.16), (L.3.17), (L.5.1), (L.5.2), (L.5.5), (L.5.6); (L.4.2), and (L.4.1). These mixtures are particularly suitable for treatment of propagation materials, i. e. seed treatment purposes and likewise for soil treatment. These seed treatment mixtures are particularly suitable for crops such as monocotyles (e.g. cereals, corn) as well as dicotyles (e.g. vegetables and leguminous plants such as soybean).

Preference is also given to mixtures comprising as pesticide II (component 2) a biopesticide selected from the groups L1), L3) and L4), preferably selected from strains denoted above as (L1.1), (L.1.2), (L.1.3), (L.1.6), (L.1.7), (L.1.9), (L.1.11), (L.1.12), (L.1.13), (L.1.14), (L.1.15), (L.1.17), (L.1.18), (L.1.22), (L.1.23), (L.1.24), (L.1.25), (L.1.26), (L.1.27), (L.1.46), (L.1.47), (L.1.48), (L.1.49), (L.1.50), (L.1.51), (L.1.52), (L.1.53), (L.1.54), (L.1.55), (L.1.56), (L.2.2); (L.3.2), (L.3.3), (L.3.4), (L.3.5), (L.3.6), (L.3.7), (L.3.8), (L.3.10), (L.3.11), (L.3.12), (L.3.13), (L.3.14), (L.3.15), (L.3.18), (L.3.19); (L.4.2), even more preferably selected from (L.1.2), (L.1.7), (L.1.11), (L.1.13), (L.1.14), (L.1.15), (L.1.18), (L.1.23), (L.3.3), (L.3.4), (L.3.6), (L.3.7), (L.3.8), (L.3.10), (L.3.11), (L.3.12), (L.3.15), and (L.4.2). These mixtures are particularly suitable for foliar and seed treatment.

Preference is also given to mixtures comprising as component 2) at least one active compound selected from group M), more preferably selected from compounds (M.1.6), (M.1.24), (M.1.25), (M.1.28), (M.1.29), (M.1.30).

Preference is also given to mixtures comprising as component 2) at least one active compound selected from group N), more preferably selected from compounds (N.7.3), (N.7.4), (N.7.5), (N.13.13).

Preference is also given to mixtures comprising as component 2) at least one active compound selected from group O), more preferably selected from compounds (O.2.4), (O.4.5), (O.4.7), (O.4.8), (O.5.1), (O.26.2), (O.27.17), (O.27.101), (O.27.102).

Particularly preferred are the following binary mixtures A1-1 to A1-805 listed in Table A1, wherein compounds I (component 1, a group represented by the expression "(I)" consisting of compounds I.A, I.B, I.C) and one pesticide II selected from the groups A) to O) as defined herein (component 2, for example, (A.1.1) or azoxystrobin, in mixture A-1).

TABLE A1

| Mixture | (I) | Compound 2 |
|---|---|---|
| A1-1 | I.A | A.1.1 |
| A1-2 | I.A | A.1.2 |
| A1-3 | I.A | A.1.3 |
| A1-4 | I.A | A.1.4 |

TABLE A1-continued

| Mixture | (I) | Compound 2 |
|---|---|---|
| A1-5 | I.A | A.1.5 |
| A1-6 | I.A | A.1.6 |
| A1-7 | I.A | A.1.7 |
| A1-8 | I.A | A.1.8 |
| A1-9 | I.A | A.1.9 |
| A1-10 | I.A | A.1.10 |
| A1-11 | I.A | A.1.11 |
| A1-12 | I.A | A.1.12 |
| A1-13 | I.A | A.1.13 |
| A1-14 | I.A | A.1.14 |
| A1-15 | I.A | A.1.15 |
| A1-16 | I.A | A.1.16 |
| A1-17 | I.A | A.1.17 |
| A1-18 | I.A | A.1.18 |
| A1-19 | I.A | A.1.19 |
| A1-20 | I.A | A.1.20 |
| A1-21 | I.A | A.1.21 |
| A1-22 | I.A | A.1.21a |
| A1-23 | I.A | A.1.22 |
| A1-24 | I.A | A.1.23 |
| A1-25 | I.A | A.1.24 |
| A1-26 | I.A | A.1.25 |
| A1-27 | I.A | A.1.26 |
| A1-28 | I.A | A.1.27 |
| A1-29 | I.A | A.1.28 |
| A1-30 | I.A | A.1.29 |
| A1-31 | I.A | A.1.30 |
| A1-32 | I.A | A.1.31 |
| A1-33 | I.A | A.1.32 |
| A1-34 | I.A | A.1.33 |
| A1-35 | I.A | A.1.34 |
| A1-36 | I.A | A.1.35 |
| A1-37 | I.A | A.1.36 |
| A1-38 | I.A | A.1.37 |
| A1-39 | I.A | A.1.38 |
| A1-40 | I.A | A.2.1 |
| A1-41 | I.A | A.2.2 |
| A1-42 | I.A | A.2.3 |
| A1-43 | I.A | A.2.4 |
| A1-44 | I.A | A.2.5 |
| A1-45 | I.A | A.3.1 |
| A1-46 | I.A | A.3.2 |
| A1-47 | I.A | A.3.3 |
| A1-48 | I.A | A.3.4 |
| A1-49 | I.A | A.3.5 |
| A1-50 | I.A | A.3.6 |
| A1-51 | I.A | A.3.7 |
| A1-52 | I.A | A.3.8 |
| A1-53 | I.A | A.3.9 |
| A1-54 | I.A | A.3.10 |
| A1-55 | I.A | A.3.11 |
| A1-56 | I.A | A.3.12 |
| A1-57 | I.A | A.3.13 |
| A1-58 | I.A | A.3.14 |
| A1-59 | I.A | A.3.15 |
| A1-60 | I.A | A.3.16 |
| A1-61 | I.A | A.3.17 |
| A1-62 | I.A | A.3.18 |
| A1-63 | I.A | A.3.19 |
| A1-64 | I.A | A.3.20 |
| A1-65 | I.A | A.3.21 |
| A1-66 | I.A | A.3.22 |
| A1-67 | I.A | A.3.23 |
| A1-68 | I.A | A.3.24 |
| A1-69 | I.A | A.3.25 |
| A1-70 | I.A | A.3.26 |
| A1-71 | I.A | A.3.27 |
| A1-72 | I.A | A.3.28 |
| A1-73 | I.A | A.3.29 |
| A1-74 | I.A | A.3.30 |
| A1-75 | I.A | A.3.31 |
| A1-76 | I.A | A.3.32 |
| A1-77 | I.A | A.3.33 |
| A1-78 | I.A | A.3.34 |
| A1-79 | I.A | A.3.35 |
| A1-80 | I.A | A.3.36 |
| A1-81 | I.A | A.3.37 |
| A1-82 | I.A | A.3.38 |

TABLE A1-continued

| Mixture | (I) | Compound 2 |
|---|---|---|
| A1-83 | I.A | A.3.39 |
| A1-84 | I.A | A.4.1 |
| A1-85 | I.A | A.4.2 |
| A1-86 | I.A | A.4.3 |
| A1-87 | I.A | A.4.4 |
| A1-88 | I.A | A.4.5 |
| A1-89 | I.A | A.4.6 |
| A1-90 | I.A | A.4.7 |
| A1-91 | I.A | A.4.8 |
| A1-92 | I.A | A.4.9 |
| A1-93 | I.A | A.4.10 |
| A1-94 | I.A | A.4.11 |
| A1-95 | I.A | A.4.12 |
| A1-96 | I.A | B.1.1 |
| A1-97 | I.A | B.1.2 |
| A1-98 | I.A | B.1.3 |
| A1-99 | I.A | B.1.4 |
| A1-100 | I.A | B.1.5 |
| A1-101 | I.A | B.1.6 |
| A1-102 | I.A | B.1.7 |
| A1-103 | I.A | B.1.8 |
| A1-104 | I.A | B.1.9 |
| A1-105 | I.A | B.1.10 |
| A1-106 | I.A | B.1.11 |
| A1-107 | I.A | B.1.12 |
| A1-108 | I.A | B.1.13 |
| A1-109 | I.A | B.1.14 |
| A1-110 | I.A | B.1.15 |
| A1-111 | I.A | B.1.16 |
| A1-112 | I.A | B.1.17 |
| A1-113 | I.A | B.1.18 |
| A1-114 | I.A | B.1.19 |
| A1-115 | I.A | B.1.20 |
| A1-116 | I.A | B.1.21 |
| A1-117 | I.A | B.1.22 |
| A1-118 | I.A | B.1.23 |
| A1-119 | I.A | B.1.24 |
| A1-120 | I.A | B.1.25 |
| A1-121 | I.A | B.1.26 |
| A1-122 | I.A | B.1.27 |
| A1-123 | I.A | B.1.28 |
| A1-124 | I.A | B.1.29 |
| A1-125 | I.A | B.1.30 |
| A1-126 | I.A | B.1.31 |
| A1-127 | I.A | B.1.32 |
| A1-128 | I.A | B.1.33 |
| A1-129 | I.A | B.1.34 |
| A1-130 | I.A | B.1.35 |
| A1-131 | I.A | B.1.36 |
| A1-132 | I.A | B.1.37 |
| A1-133 | I.A | B.1.38 |
| A1-134 | I.A | B.1.39 |
| A1-135 | I.A | B.1.40 |
| A1-136 | I.A | B.1.41 |
| A1-137 | I.A | B.1.42 |
| A1-138 | I.A | B.1.43 |
| A1-139 | I.A | B.1.44 |
| A1-140 | I.A | B.1.45 |
| A1-141 | I.A | B.1.46 |
| A1-142 | I.A | B.1.47 |
| A1-143 | I.A | B.1.48 |
| A1-144 | I.A | B.1.49 |
| A1-145 | I.A | B.1.50 |
| A1-146 | I.A | B.1.51 |
| A1-147 | I.A | B.1.52 |
| A1-148 | I.A | B.2.1 |
| A1-149 | I.A | B.2.2 |
| A1-150 | I.A | B.2.3 |
| A1-151 | I.A | B.2.4 |
| A1-152 | I.A | B.2.5 |
| A1-153 | I.A | B.2.6 |
| A1-154 | I.A | B.2.7 |
| A1-155 | I.A | B.2.8 |
| A1-156 | I.A | B.3.1 |
| A1-157 | I.A | B.4.1 |
| A1-158 | I.A | C.1.1 |
| A1-159 | I.A | C.1.2 |
| A1-160 | I.A | C.1.3 |

TABLE A1-continued

| Mixture | (I) | Compound 2 |
|---|---|---|
| A1-161 | I.A | C.1.4 |
| A1-162 | I.A | C.1.5 |
| A1-163 | I.A | C.1.6 |
| A1-164 | I.A | C.1.7 |
| A1-165 | I.A | C.2.1 |
| A1-166 | I.A | C.2.2 |
| A1-167 | I.A | C.2.3 |
| A1-168 | I.A | C.2.4 |
| A1-169 | I.A | C.2.5 |
| A1-170 | I.A | C.2.6 |
| A1-171 | I.A | C.2.7 |
| A1-172 | I.A | C.2.8 |
| A1-173 | I.A | D.1.1 |
| A1-174 | I.A | D.1.2 |
| A1-175 | I.A | D.1.3 |
| A1-176 | I.A | D.1.4 |
| A1-177 | I.A | D.1.5 |
| A1-178 | I.A | D.1.6 |
| A1-179 | I.A | D.1.7 |
| A1-180 | I.A | D.1.8 |
| A1-181 | I.A | D.1.9 |
| A1-182 | I.A | D.1.10 |
| A1-183 | I.A | D.1.11 |
| A1-184 | I.A | D.1.12 |
| A1-185 | I.A | D.1.13 |
| A1-186 | I.A | D.1.14 |
| A1-187 | I.A | D.1.15 |
| A1-188 | I.A | D.1.16 |
| A1-189 | I.A | D.2.1 |
| A1-190 | I.A | D.2.2 |
| A1-191 | I.A | D.2.3 |
| A1-192 | I.A | D.2.4 |
| A1-193 | I.A | D.2.5 |
| A1-194 | I.A | D.2.6 |
| A1-195 | I.A | D.2.7 |
| A1-196 | I.A | E.1.1 |
| A1-197 | I.A | E.1.2 |
| A1-198 | I.A | E.1.3 |
| A1-199 | I.A | E.2.1 |
| A1-200 | I.A | E.2.2 |
| A1-201 | I.A | E.2.3 |
| A1-202 | I.A | E.2.4 |
| A1-203 | I.A | E.2.5 |
| A1-204 | I.A | E.2.6 |
| A1-205 | I.A | F.1.1 |
| A1-206 | I.A | F.1.2 |
| A1-207 | I.A | F.1.3 |
| A1-208 | I.A | F.1.4 |
| A1-209 | I.A | F.1.5 |
| A1-210 | I.A | F.2.1 |
| A1-211 | I.A | G.1.1 |
| A1-212 | I.A | G.1.2 |
| A1-213 | I.A | G.1.3 |
| A1-214 | I.A | G.1.4 |
| A1-215 | I.A | G.2.1 |
| A1-216 | I.A | G.2.2 |
| A1-217 | I.A | G.2.3 |
| A1-218 | I.A | G.2.4 |
| A1-219 | I.A | G.2.5 |
| A1-220 | I.A | G.2.6 |
| A1-221 | I.A | G.2.7 |
| A1-222 | I.A | G.3.1 |
| A1-223 | I.A | G.3.2 |
| A1-224 | I.A | G.3.3 |
| A1-225 | I.A | G.3.4 |
| A1-226 | I.A | G.3.5 |
| A1-227 | I.A | G.3.6 |
| A1-228 | I.A | G.3.7 |
| A1-229 | I.A | G.4.1 |
| A1-230 | I.A | G.5.1 |
| A1-231 | I.A | G.5.2 |
| A1-232 | I.A | G.5.3 |
| A1-233 | I.A | G.5.4 |
| A1-234 | I.A | G.5.5 |
| A1-235 | I.A | G.5.6 |
| A1-236 | I.A | G.5.7 |
| A1-237 | I.A | G.5.8 |
| A1-238 | I.A | G.5.9 |

TABLE A1-continued

| Mixture | (I) | Compound 2 |
|---|---|---|
| A1-239 | I.A | G.5.10 |
| A1-240 | I.A | G.5.11 |
| A1-241 | I.A | H.1.1 |
| A1-242 | I.A | H.1.2 |
| A1-243 | I.A | H.1.3 |
| A1-244 | I.A | H.1.4 |
| A1-245 | I.A | H.1.5 |
| A1-246 | I.A | H.1.6 |
| A1-247 | I.A | H.1.7 |
| A1-248 | I.A | H.2.1 |
| A1-249 | I.A | H.2.2 |
| A1-250 | I.A | H.2.3 |
| A1-251 | I.A | H.2.4 |
| A1-252 | I.A | H.2.5 |
| A1-253 | I.A | H.2.6 |
| A1-254 | I.A | H.2.7 |
| A1-255 | I.A | H.2.8 |
| A1-256 | I.A | H.2.9 |
| A1-257 | I.A | H.3.1 |
| A1-258 | I.A | H.3.2 |
| A1-259 | I.A | H.3.3 |
| A1-260 | I.A | H.3.4 |
| A1-261 | I.A | H.3.5 |
| A1-262 | I.A | H.3.6 |
| A1-263 | I.A | H.3.7 |
| A1-264 | I.A | H.3.8 |
| A1-265 | I.A | H.3.9 |
| A1-266 | I.A | H.3.10 |
| A1-267 | I.A | H.3.11 |
| A1-268 | I.A | H.4.1 |
| A1-269 | I.A | H.4.2 |
| A1-270 | I.A | H.4.3 |
| A1-271 | I.A | H.4.4 |
| A1-272 | I.A | H.4.5 |
| A1-273 | I.A | H.4.6 |
| A1-274 | I.A | H.4.7 |
| A1-275 | I.A | H.4.8 |
| A1-276 | I.A | H.4.9 |
| A1-277 | I.A | H.4.10 |
| A1-278 | I.A | I.1.1 |
| A1-279 | I.A | I.1.2 |
| A1-280 | I.A | I.2.1 |
| A1-281 | I.A | I.2.2 |
| A1-282 | I.A | I.2.3 |
| A1-283 | I.A | I.2.4 |
| A1-284 | I.A | I.2.5 |
| A1-285 | I.A | J.1.1 |
| A1-286 | I.A | J.1.2 |
| A1-287 | I.A | J.1.3 |
| A1-288 | I.A | J.1.4 |
| A1-289 | I.A | J.1.5 |
| A1-290 | I.A | J.1.6 |
| A1-291 | I.A | J.1.7 |
| A1-292 | I.A | J.1.8 |
| A1-293 | I.A | J.1.9 |
| A1-294 | I.A | J.1.10 |
| A1-295 | I.A | J.1.11 |
| A1-296 | I.A | J.1.12 |
| A1-297 | I.A | K.1.1 |
| A1-298 | I.A | K.1.2 |
| A1-299 | I.A | K.1.3 |
| A1-300 | I.A | K.1.4 |
| A1-301 | I.A | K.1.5 |
| A1-302 | I.A | K.1.6 |
| A1-303 | I.A | K.1.7 |
| A1-304 | I.A | K.1.8 |
| A1-305 | I.A | K.1.9 |
| A1-306 | I.A | K.1.10 |
| A1-307 | I.A | K.1.11 |
| A1-308 | I.A | K.1.12 |
| A1-309 | I.A | K.1.13 |
| A1-310 | I.A | K.1.14 |
| A1-311 | I.A | K.1.15 |
| A1-312 | I.A | K.1.16 |
| A1-313 | I.A | K.1.17 |
| A1-314 | I.A | K.1.18 |
| A1-315 | I.A | K.1.19 |
| A1-316 | I.A | K.1.20 |

TABLE A1-continued

| Mixture | (I) | Compound 2 |
|---|---|---|
| A1-317 | I.A | K.1.21 |
| A1-318 | I.A | K.1.22 |
| A1-319 | I.A | K.1.23 |
| A1-320 | I.A | K.1.24 |
| A1-321 | I.A | K.1.25 |
| A1-322 | I.A | K.1.26 |
| A1-323 | I.A | K.1.27 |
| A1-324 | I.A | K.1.28 |
| A1-325 | I.A | K.1.29 |
| A1-326 | I.A | K.1.30 |
| A1-327 | I.A | K.1.31 |
| A1-328 | I.A | K.1.32 |
| A1-329 | I.A | K.1.33 |
| A1-330 | I.A | K.1.34 |
| A1-331 | I.A | K.1.35 |
| A1-332 | I.A | K.1.36 |
| A1-333 | I.A | K.1.37 |
| A1-334 | I.A | K.1.38 |
| A1-335 | I.A | K.1.39 |
| A1-336 | I.A | K.1.40 |
| A1-337 | I.A | K.1.41 |
| A1-338 | I.A | K.1.42 |
| A1-339 | I.A | K.1.43 |
| A1-340 | I.A | K.1.44 |
| A1-341 | I.A | K.1.45 |
| A1-342 | I.A | K.1.46 |
| A1-343 | I.A | K.1.47 |
| A1-344 | I.A | K.1.48 |
| A1-345 | I.A | K.1.49 |
| A1-346 | I.A | K.1.50 |
| A1-347 | I.A | K.1.51 |
| A1-348 | I.A | K.1.52 |
| A1-349 | I.A | K.1.53 |
| A1-350 | I.A | K.1.54 |
| A1-351 | I.A | L.1.1 |
| A1-352 | I.A | L.1.2 |
| A1-353 | I.A | L.1.3 |
| A1-354 | I.A | L.1.4 |
| A1-355 | I.A | L.1.5 |
| A1-356 | I.A | L.1.6 |
| A1-357 | I.A | L.1.7 |
| A1-358 | I.A | L.1.8 |
| A1-359 | I.A | L.1.9 |
| A1-360 | I.A | L.1.10 |
| A1-361 | I.A | L.1.11 |
| A1-362 | I.A | L.1.12 |
| A1-363 | I.A | L.1.13 |
| A1-364 | I.A | L.1.14 |
| A1-365 | I.A | L.1.15 |
| A1-366 | I.A | L.1.16 |
| A1-367 | I.A | L.1.17 |
| A1-368 | I.A | L.1.18 |
| A1-369 | I.A | L.1.19 |
| A1-370 | I.A | L.1.20 |
| A1-371 | I.A | L.1.21 |
| A1-372 | I.A | L.1.22 |
| A1-373 | I.A | L.1.23 |
| A1-374 | I.A | L.1.24 |
| A1-375 | I.A | L.1.25 |
| A1-376 | I.A | L.1.26 |
| A1-377 | I.A | L.1.27 |
| A1-378 | I.A | L.1.28 |
| A1-379 | I.A | L.1.29 |
| A1-380 | I.A | L.1.30 |
| A1-381 | I.A | L.1.31 |
| A1-382 | I.A | L.1.32 |
| A1-383 | I.A | L.1.33 |
| A1-384 | I.A | L.1.34 |
| A1-385 | I.A | L.1.35 |
| A1-386 | I.A | L.1.36 |
| A1-387 | I.A | L.1.37 |
| A1-388 | I.A | L.1.38 |
| A1-389 | I.A | L.1.39 |
| A1-390 | I.A | L.1.40 |
| A1-391 | I.A | L.1.41 |
| A1-392 | I.A | L.1.42 |
| A1-393 | I.A | L.1.43 |
| A1-394 | I.A | L.1.44 |

TABLE A1-continued

| Mixture | (I) | Compound 2 |
|---|---|---|
| A1-395 | I.A | L.1.45 |
| A1-396 | I.A | L.1.46 |
| A1-397 | I.A | L.1.47 |
| A1-398 | I.A | L.1.48 |
| A1-399 | I.A | L.1.49 |
| A1-400 | I.A | L.1.50 |
| A1-401 | I.A | L.1.51 |
| A1-402 | I.A | L.1.52 |
| A1-403 | I.A | L.1.53 |
| A1-404 | I.A | L.1.54 |
| A1-405 | I.A | L.1.55 |
| A1-406 | I.A | L.1.56 |
| A1-407 | I.A | L.1.57 |
| A1-408 | I.A | L.1.58 |
| A1-409 | I.A | L.1.59 |
| A1-410 | I.A | M.1.1 |
| A1-411 | I.A | M.1.2 |
| A1-412 | I.A | M.1.3 |
| A1-413 | I.A | M.1.4 |
| A1-414 | I.A | M.1.5 |
| A1-415 | I.A | M.1.6 |
| A1-416 | I.A | M.1.7 |
| A1-417 | I.A | M.1.8 |
| A1-418 | I.A | M.1.9 |
| A1-419 | I.A | M.1.10 |
| A1-420 | I.A | M.1.11 |
| A1-421 | I.A | M.1.12 |
| A1-422 | I.A | M.1.13 |
| A1-423 | I.A | M.1.14 |
| A1-424 | I.A | M.1.15 |
| A1-425 | I.A | M.1.16 |
| A1-426 | I.A | M.1.17 |
| A1-427 | I.A | M.1.18 |
| A1-428 | I.A | M.1.19 |
| A1-429 | I.A | M.1.20 |
| A1-430 | I.A | M.1.21 |
| A1-431 | I.A | M.1.22 |
| A1-432 | I.A | M.1.23 |
| A1-433 | I.A | M.1.24 |
| A1-434 | I.A | M.1.25 |
| A1-435 | I.A | M.1.26 |
| A1-436 | I.A | M.1.27 |
| A1-437 | I.A | M.1.28 |
| A1-438 | I.A | M.1.29 |
| A1-439 | I.A | M.1.30 |
| A1-440 | I.A | M.1.31 |
| A1-441 | I.A | M.1.32 |
| A1-442 | I.A | M.1.33 |
| A1-443 | I.A | M.1.34 |
| A1-444 | I.A | M.1.35 |
| A1-445 | I.A | M.1.36 |
| A1-446 | I.A | O.1.1 |
| A1-447 | I.A | O.1.2 |
| A1-448 | I.A | O.1.3 |
| A1-449 | I.A | O.1.4 |
| A1-450 | I.A | O.1.5 |
| A1-451 | I.A | O.1.6 |
| A1-452 | I.A | O.1.7 |
| A1-453 | I.A | O.1.8 |
| A1-454 | I.A | O.1.9 |
| A1-455 | I.A | O.1.10 |
| A1-456 | I.A | O.1.11 |
| A1-457 | I.A | O.1.12 |
| A1-458 | I.A | O.1.13 |
| A1-459 | I.A | O.1.14 |
| A1-460 | I.A | O.1.15 |
| A1-461 | I.A | O.1.16 |
| A1-462 | I.A | O.1.17 |
| A1-463 | I.A | O.1.18 |
| A1-464 | I.A | O.1.19 |
| A1-465 | I.A | O.1.20 |
| A1-466 | I.A | O.1.21 |
| A1-467 | I.A | O.1.22 |
| A1-468 | I.A | O.1.23 |
| A1-469 | I.A | O.1.24 |
| A1-470 | I.A | O.1.25 |
| A1-471 | I.A | O.1.26 |
| A1-472 | I.A | O.1.27 |

TABLE A1-continued

| Mixture | (I) | Compound 2 |
|---|---|---|
| A1-473 | I.A | O.1.28 |
| A1-474 | I.A | O.1.29 |
| A1-475 | I.A | O.1.30 |
| A1-476 | I.A | O.1.31 |
| A1-477 | I.A | O.1.32 |
| A1-478 | I.A | O.1.33 |
| A1-479 | I.A | O.1.34 |
| A1-480 | I.A | O.1.35 |
| A1-481 | I.A | O.1.36 |
| A1-482 | I.A | O.1.37 |
| A1-483 | I.A | O.1.38 |
| A1-484 | I.A | O.1.39 |
| A1-485 | I.A | O.1.40 |
| A1-486 | I.A | O.1.41 |
| A1-487 | I.A | O.1.42 |
| A1-488 | I.A | O.1.43 |
| A1-489 | I.A | O.1.44 |
| A1-490 | I.A | O.1.45 |
| A1-491 | I.A | O.1.46 |
| A1-492 | I.A | O.1.47 |
| A1-493 | I.A | O.1.48 |
| A1-494 | I.A | O.1.49 |
| A1-495 | I.A | O.1.50 |
| A1-496 | I.A | O.1.51 |
| A1-497 | I.A | O.1.52 |
| A1-498 | I.A | O.1.53 |
| A1-499 | I.A | O.1.54 |
| A1-500 | I.A | O.1.55 |
| A1-501 | I.A | O.1.56 |
| A1-502 | I.A | O.1.57 |
| A1-503 | I.A | O.1.58 |
| A1-504 | I.A | O.1.59 |
| A1-505 | I.A | O.1.60 |
| A1-506 | I.A | O.1.61 |
| A1-507 | I.A | O.1.62 |
| A1-508 | I.A | O.1.63 |
| A1-509 | I.A | O.1.64 |
| A1-510 | I.A | O.1.65 |
| A1-511 | I.A | O.1.66 |
| A1-512 | I.A | O.1.67 |
| A1-513 | I.A | O.1.68 |
| A1-514 | I.A | O.1.69 |
| A1-515 | I.A | O.1.70 |
| A1-516 | I.A | O.1.71 |
| A1-517 | I.A | O.1.72 |
| A1-518 | I.A | O.1.73 |
| A1-519 | I.A | O.1.74 |
| A1-520 | I.A | O.1.75 |
| A1-521 | I.A | O.1.76 |
| A1-522 | I.A | O.1.77 |
| A1-523 | I.A | O.1.78 |
| A1-524 | I.A | O.1.79 |
| A1-525 | I.A | O.1.80 |
| A1-526 | I.A | O.1.81 |
| A1-527 | I.A | O.1.82 |
| A1-528 | I.A | O.1.83 |
| A1-529 | I.A | O.1.84 |
| A1-530 | I.A | O.1.85 |
| A1-531 | I.A | O.1.86 |
| A1-532 | I.A | O.1.87 |
| A1-533 | I.A | O.1.88 |
| A1-534 | I.A | O.1.89 |
| A1-535 | I.A | O.1.90 |
| A1-536 | I.A | O.1.91 |
| A1-537 | I.A | O.2.1 |
| A1-538 | I.A | O.2.2 |
| A1-539 | I.A | O.2.3 |
| A1-540 | I.A | O.2.4 |
| A1-541 | I.A | O.2.5 |
| A1-542 | I.A | O.2.6 |
| A1-543 | I.A | O.2.7 |
| A1-544 | I.A | O.3.1 |
| A1-545 | I.A | O.3.2 |
| A1-546 | I.A | O.3.3 |
| A1-547 | I.A | O.3.4 |
| A1-548 | I.A | O.3.5 |
| A1-549 | I.A | O.3.6 |
| A1-550 | I.A | O.3.7 |

TABLE A1-continued

| Mixture | (I) | Compound 2 |
|---|---|---|
| A1-551 | I.A | O.3.8 |
| A1-552 | I.A | O.3.9 |
| A1-553 | I.A | O.3.10 |
| A1-554 | I.A | O.3.11 |
| A1-555 | I.A | O.3.12 |
| A1-556 | I.A | O.3.13 |
| A1-557 | I.A | O.3.14 |
| A1-558 | I.A | O.3.15 |
| A1-559 | I.A | O.3.16 |
| A1-560 | I.A | O.3.17 |
| A1-561 | I.A | O.3.18 |
| A1-562 | I.A | O.3.19 |
| A1-563 | I.A | O.3.20 |
| A1-564 | I.A | O.3.21 |
| A1-565 | I.A | O.3.22 |
| A1-566 | I.A | O.3.23 |
| A1-567 | I.A | O.3.24 |
| A1-568 | I.A | O.3.25 |
| A1-569 | I.A | O.3.26 |
| A1-570 | I.A | O.3.27 |
| A1-571 | I.A | O.3.28 |
| A1-572 | I.A | O.3.29 |
| A1-573 | I.A | O.3.30 |
| A1-574 | I.A | O.3.31 |
| A1-575 | I.A | O.3.32 |
| A1-576 | I.A | O.3.33 |
| A1-577 | I.A | O.3.34 |
| A1-578 | I.A | O.3.35 |
| A1-579 | I.A | O.3.36 |
| A1-580 | I.A | O.3.37 |
| A1-581 | I.A | O.3.38 |
| A1-582 | I.A | O.3.39 |
| A1-583 | I.A | O.3.40 |
| A1-584 | I.A | O.3.41 |
| A1-585 | I.A | O.3.42 |
| A1-586 | I.A | O.3.43 |
| A1-587 | I.A | O.3.44 |
| A1-588 | I.A | O.3.45 |
| A1-589 | I.A | O.3.46 |
| A1-590 | I.A | O.3.47 |
| A1-591 | I.A | O.3.48 |
| A1-592 | I.A | O.4.1 |
| A1-593 | I.A | O.4.2 |
| A1-594 | I.A | O.4.3 |
| A1-595 | I.A | O.4.4 |
| A1-596 | I.A | O.4.5 |
| A1-597 | I.A | O.4.6 |
| A1-598 | I.A | O.4.7 |
| A1-599 | I.A | O.4.8 |
| A1-600 | I.A | O.4.9 |
| A1-601 | I.A | O.4.10 |
| A1-602 | I.A | O.4.11 |
| A1-603 | I.A | O.5.1 |
| A1-604 | I.A | O.5.2 |
| A1-605 | I.A | O.6.1 |
| A1-606 | I.A | O.6.2 |
| A1-607 | I.A | O.6.3 |
| A1-608 | I.A | O.6.4 |
| A1-609 | I.A | O.6.5 |
| A1-610 | I.A | O.7.1 |
| A1-611 | I.A | O.7.2 |
| A1-612 | I.A | O.7.3 |
| A1-613 | I.A | O.7.4 |
| A1-614 | I.A | O.7.5 |
| A1-615 | I.A | O.8.1 |
| A1-616 | I.A | O.8.2 |
| A1-617 | I.A | O.8.3 |
| A1-618 | I.A | O.8.4 |
| A1-619 | I.A | O.8.5 |
| A1-620 | I.A | O.9.1 |
| A1-621 | I.A | O.9.2 |
| A1-622 | I.A | O.10.1 |
| A1-623 | I.A | O.10.2 |
| A1-624 | I.A | O.10.3 |
| A1-625 | I.A | O.10.4 |
| A1-626 | I.A | O.12.1 |
| A1-627 | I.A | O.12.2 |
| A1-628 | I.A | O.12.3 |
| A1-629 | I.A | O.12.4 |
| A1-630 | I.A | O.12.5 |
| A1-631 | I.A | O.12.6 |
| A1-632 | I.A | O.13.1 |
| A1-633 | I.A | O.13.2 |
| A1-634 | I.A | O.13.3 |
| A1-635 | I.A | O.14.1 |
| A1-636 | I.A | O.14.2 |
| A1-637 | I.A | O.14.3 |
| A1-638 | I.A | O.14.4 |
| A1-639 | I.A | O.15.1 |
| A1-640 | I.A | O.15.2 |
| A1-641 | I.A | O.15.3 |
| A1-642 | I.A | O.15.4 |
| A1-643 | I.A | O.15.5 |
| A1-644 | I.A | O.15.6 |
| A1-645 | I.A | O.15.7 |
| A1-646 | I.A | O.15.8 |
| A1-647 | I.A | O.15.9 |
| A1-648 | I.A | O.15.10 |
| A1-649 | I.A | O.15.11 |
| A1-650 | I.A | O.16.1 |
| A1-651 | I.A | O.17.1 |
| A1-652 | I.A | O.18.1 |
| A1-653 | I.A | O.18.2 |
| A1-654 | I.A | O.18.3 |
| A1-655 | I.A | O.18.4 |
| A1-656 | I.A | O.18.5 |
| A1-657 | I.A | O.19.1 |
| A1-658 | I.A | O.20.1 |
| A1-659 | I.A | O.20.2 |
| A1-660 | I.A | O.20.3 |
| A1-661 | I.A | O.21.1 |
| A1-662 | I.A | O.21.2 |
| A1-663 | I.A | O.21.3 |
| A1-664 | I.A | O.21.4 |
| A1-665 | I.A | O.21.5 |
| A1-666 | I.A | O.21.6 |
| A1-667 | I.A | O.21.7 |
| A1-668 | I.A | O.22.1 |
| A1-669 | I.A | O.22.2 |
| A1-670 | I.A | O.22.3 |
| A1-671 | I.A | O.22.4 |
| A1-672 | I.A | O.23.1 |
| A1-673 | I.A | O.23.2 |
| A1-674 | I.A | O.23.3 |
| A1-675 | I.A | O.24.1 |
| A1-676 | I.A | O.24.2 |
| A1-677 | I.A | O.24.3 |
| A1-678 | I.A | O.24.4 |
| A1-679 | I.A | O.24.5 |
| A1-680 | I.A | O.25.1 |
| A1-681 | I.A | O.25.2 |
| A1-682 | I.A | O.26.1 |
| A1-683 | I.A | O.26.2 |
| A1-684 | I.A | O.26.3 |
| A1-685 | I.A | O.26.4 |
| A1-686 | I.A | O.26.5 |
| A1-687 | I.A | O.26.6 |
| A1-688 | I.A | O.26.7 |
| A1-689 | I.A | O.26.8 |
| A1-690 | I.A | O.26.9 |
| A1-691 | I.A | O.26.10 |
| A1-692 | I.A | O.26.11 |
| A1-693 | I.A | O.26.12 |
| A1-694 | I.A | O.26.13 |
| A1-695 | I.A | O.26.14 |
| A1-696 | I.A | O.26.15 |
| A1-697 | I.A | O.26.16 |
| A1-698 | I.A | O.26.17 |
| A1-699 | I.A | O.26.18 |
| A1-700 | I.A | O.27.1 |
| A1-701 | I.A | O.27.2 |
| A1-702 | I.A | O.27.3 |
| A1-703 | I.A | O.27.4 |
| A1-704 | I.A | O.27.5 |
| A1-705 | I.A | O.27.6 |
| A1-706 | I.A | O.27.7 |

TABLE A1-continued

| Mixture | (I) | Compound 2 |
|---|---|---|
| A1-707 | I.A | O.27.8 |
| A1-708 | I.A | O.27.9 |
| A1-709 | I.A | O.27.10 |
| A1-710 | I.A | O.27.11 |
| A1-711 | I.A | O.27.12 |
| A1-712 | I.A | O.27.13 |
| A1-713 | I.A | O.27.14 |
| A1-714 | I.A | O.27.15 |
| A1-715 | I.A | O.27.16 |
| A1-716 | I.A | O.27.17 |
| A1-717 | I.A | O.27.18 |
| A1-718 | I.A | O.27.19 |
| A1-719 | I.A | O.27.20 |
| A1-720 | I.A | O.27.21 |
| A1-721 | I.A | O.27.22 |
| A1-722 | I.A | O.27.23 |
| A1-723 | I.A | O.27.24 |
| A1-724 | I.A | O.27.25 |
| A1-725 | I.A | O.27.26 |
| A1-726 | I.A | O.27.27 |
| A1-727 | I.A | O.27.28 |
| A1-728 | I.A | O.27.29 |
| A1-729 | I.A | O.27.30 |
| A1-730 | I.A | O.27.31 |
| A1-731 | I.A | O.27.32 |
| A1-732 | I.A | O.27.33 |
| A1-733 | I.A | O.27.34 |
| A1-734 | I.A | O.27.35 |
| A1-735 | I.A | O.27.36 |
| A1-736 | I.A | O.27.37 |
| A1-737 | I.A | O.27.38 |
| A1-738 | I.A | O.27.39 |
| A1-739 | I.A | O.27.40 |
| A1-740 | I.A | O.27.41 |
| A1-741 | I.A | O.27.42 |
| A1-742 | I.A | O.27.43 |
| A1-743 | I.A | O.27.44 |
| A1-744 | I.A | O.27.45 |
| A1-745 | I.A | O.27.46 |
| A1-746 | I.A | O.27.47 |
| A1-747 | I.A | O.27.48 |
| A1-748 | I.A | O.27.49 |
| A1-749 | I.A | O.27.50 |
| A1-750 | I.A | O.27.51 |
| A1-751 | I.A | O.27.52 |
| A1-752 | I.A | O.27.53 |
| A1-753 | I.A | O.27.54 |
| A1-754 | I.A | O.27.55 |
| A1-755 | I.A | O.27.56 |
| A1-756 | I.A | O.27.57 |
| A1-757 | I.A | O.27.58 |
| A1-758 | I.A | O.27.59 |
| A1-759 | I.A | O.27.60 |
| A1-760 | I.A | O.27.61 |
| A1-761 | I.A | O.27.62 |
| A1-762 | I.A | O.27.63 |
| A1-763 | I.A | O.27.64 |
| A1-764 | I.A | O.27.65 |
| A1-765 | I.A | O.27.66 |
| A1-766 | I.A | O.27.67 |
| A1-767 | I.A | O.27.68 |
| A1-768 | I.A | O.27.69 |
| A1-769 | I.A | O.27.70 |
| A1-770 | I.A | O.27.71 |
| A1-771 | I.A | O.27.72 |
| A1-772 | I.A | O.27.73 |
| A1-773 | I.A | O.27.74 |
| A1-774 | I.A | O.27.75 |
| A1-775 | I.A | O.27.76 |
| A1-776 | I.A | O.27.77 |
| A1-777 | I.A | O.27.78 |
| A1-778 | I.A | O.27.79 |
| A1-779 | I.A | O.27.80 |
| A1-780 | I.A | O.27.81 |
| A1-781 | I.A | O.27.82 |
| A1-782 | I.A | O.27.83 |
| A1-783 | I.A | O.27.84 |
| A1-784 | I.A | O.27.85 |

TABLE A1-continued

| Mixture | (I) | Compound 2 |
|---|---|---|
| A1-785 | I.A | O.27.86 |
| A1-786 | I.A | O.27.87 |
| A1-787 | I.A | O.27.88 |
| A1-788 | I.A | O.27.89 |
| A1-789 | I.A | O.27.90 |
| A1-790 | I.A | O.27.91 |
| A1-791 | I.A | O.27.92 |
| A1-792 | I.A | O.27.93 |
| A1-793 | I.A | O.27.94 |
| A1-794 | I.A | O.27.95 |
| A1-795 | I.A | O.27.96 |
| A1-796 | I.A | O.27.97 |
| A1-797 | I.A | O.27.98 |
| A1-798 | I.A | O.27.99 |
| A1-799 | I.A | O.27.100 |
| A1-800 | I.A | O.27.101 |
| A1-801 | I.A | O.27.102 |
| A1-802 | I.A | O.27.103 |
| A1-803 | I.A | O.27.104 |
| A1-804 | I.A | O.27.105 |
| A1-805 | I.A | O.27.106 |

In one embodiment the weight ratio of a compound I to compound II in mixtures A1-1 to A1-805 of Table A is between 100:1 and 1:100, preferably between 50:1 and 1:50, more preferably between 20:1 and 1:20, particularly between 5:1 and 1:5; for example 3:1, 1:1 or 1:3.

Table A2: Mixtures A2-1 to A2-805 are defined as mixtures A1-1 to A1-805 of Table A1, wherein compound I.A in each mixture is replaced with compound I.B; and wherein the weight ratio of compound I.B to compound II is between 100:1 and 1:100, preferably between 50:1 and 1:50, more preferably between 20:1 and 1:20, particularly between 5:1 and 1:5; for example 3:1, 1:1 or 1:3.

Table A3: Mixtures A3-1 to A3-805 are defined as mixtures A1-1 to A1-805 of Table A1, wherein compound I.A in each mixture is replaced with compound I.C; and wherein the weight ratio of compound I.C to compound II is between 100:1 and 1:100, preferably between 50:1 and 1:50, more preferably between 20:1 and 1:20, particularly between 5:1 and 1:5; for example 3:1, 1:1 or 1:3.

For the use in seed treatment particularly preferred are the following binary mixtures A5-1 to A5-93 listed in Table A5, wherein compounds I (component 1, a group represented by the expression "(I)" consisting of compounds I.A, I.B, I.C) and one pesticide II selected from the groups A) to O) as defined herein (component 2, for example, (A.1.1) or azoxystrobin, in mixture A-1).

TABLE A5

| Mixture | (I) | Compound 2 |
|---|---|---|
| A5-1 | I.A | (A.1.1) |
| A5-2 | I.A | (A.1.17) |
| A5-3 | I.A | (A.1.13) |
| A5-4 | I.A | (A.1.14) |
| A5-5 | I.A | (A.1.10) |
| A5-6 | I.A | (A.1.25) |
| A5-7 | I.A | (A.3.19) |
| A5-8 | I.A | (A.3.16) |
| A5-9 | I.A | (A.3.15) |
| A5-10 | I.A | (A.3.7) |
| A5-11 | I.A | (A.3.9) |
| A5-12 | I.A | (A.3.4) |
| A5-13 | I.A | (A.3.28) |
| A5-14 | I.A | (A.3.22) |
| A5-15 | I.A | (A.3.23) |
| A5-16 | I.A | (A.3.31) |
| A5-17 | I.A | (G.5.1) |

TABLE A5-continued

| Mixture | (I) | Compound 2 |
|---|---|---|
| A5-18 | I.A | (C.1.4) |
| A5-19 | I.A | (C.1.5) |
| A5-20 | I.A | (K.1.43) |
| A5-21 | I.A | (K.1.41) |
| A5-22 | I.A | (D.2.2) |
| A5-23 | I.A | (G.3.1) |
| A5-24 | I.A | (G.5.2) |
| A5-25 | I.A | (G.5.3) |
| A5-26 | I.A | (B.1.4) |
| A5-27 | I.A | (B.1.5) |
| A5-28 | I.A | (B.1.23) |
| A5-29 | I.A | (B.1.12) |
| A5-30 | I.A | (D.1.4) |
| A5-31 | I.A | (B.1.15) |
| A5-32 | I.A | (B.1.25) |
| A5-33 | I.A | (B.1.38) |
| A5-34 | I.A | (B.1.28) |
| A5-35 | I.A | (B.1.46) |
| A5-36 | I.A | (B.1.10) |
| A5-37 | I.A | (B.1.26) |
| A5-38 | I.A | (F.1.5) |
| A5-39 | I.A | (A.3.5) |
| A5-40 | I.A | (A.4.12) |
| A5-41 | I.A | (A.4.5) |
| A5-42 | I.A | (H.2.9) |
| A5-43 | I.A | (H.2.7) |
| A5-44 | I.A | (D.1.2) |
| A5-45 | I.A | (D.1.5) |
| A5-46 | I.A | (G.3.7) |
| A5-47 | I.A | (A.3.17) |
| A5-48 | I.A | (B.1.44) |
| A5-49 | I.A | (K.1.52) |
| A5-50 | I.A | (O.2.4) |
| A5-51 | I.A | (O.27.7) |
| A5-52 | I.A | (O.27.76) |
| A5-53 | I.A | (O.4.2) |
| A5-54 | I.A | (O.4.8) |
| A5-55 | I.A | (O.4.1) |
| A5-56 | I.A | (O.4.4) |
| A5-57 | I.A | (O.4.5) |
| A5-58 | I.A | (O.4.7) |
| A5-59 | I.A | (O.27.25) |
| A5-60 | I.A | (O.27.18) |
| A5-61 | I.A | (O.27.11) |
| A5-62 | I.A | (O.27.27) |
| A5-63 | I.A | (O.3.43) |
| A5-64 | I.A | (O.3.5) |
| A5-65 | I.A | (O.3.15) |
| A5-66 | I.A | (O.26.4) |
| A5-67 | I.A | (O.26.5) |
| A5-68 | I.A | (O.1.21) |
| A5-69 | I.A | (O.1.15) |
| A5-70 | I.A | (O.27.41) |
| A5-71 | I.A | (O.1.27) |
| A5-72 | I.A | (O.27.101) |
| A5-73 | I.A | (O.27.103) |
| A5-74 | I.A | (O.27.44) |
| A5-75 | I.A | (O.27.104) |
| A5-76 | I.A | (O.27.63) |
| A5-77 | I.A | (O.27.64) |
| A5-78 | I.A | (O.27.43) |
| A5-79 | I.A | (O.27.95) |
| A5-80 | I.A | (L.3.10) |
| A5-81 | I.A | (O.27.105) |
| A5-82 | I.A | (O.27.106) |
| A5-83 | I.A | (O.1.21) |
| A5-84 | I.A | (O.6.1) |
| A5-85 | I.A | (O.27.26) |
| A5-86 | I.A | (L.3.32) |
| A5-87 | I.A | (L.3.12) |
| A5-88 | I.A | (L.3.3) |
| A5-89 | I.A | (L.1.5) |
| A5-90 | I.A | (O.27.17) |
| A5-91 | I.A | L.3.16) |
| A5-92 | I.A | mixture of Bacillus licheniformis and (L.1.12) |
| A5-93 | I.A | mixture of (L.1.5) and (L.4.8) |

In one embodiment the weight ratio of a compound I to compound II in mixtures A5-1 to A5-92 of Table A5 is between 100:1 and 1:100, preferably between 50:1 and 1:50, more preferably between 20:1 and 1:20, particularly between 5:1 and 1:5; for example 3:1, 1:1 or 1:3.

Table A6: Mixtures A6-1 to A6-92 are defined as mixtures A5-1 to A5-92 of Table A5, wherein compound I.A in each mixture is replaced with compound I.B; and wherein the weight ratio of compound I.B to compound II is between 100:1 and 1:100, preferably between 50:1 and 1:50, more preferably between 20:1 and 1:20, particularly between 5:1 and 1:5; for example 3:1, 1:1 or 1:3.

Table A7: Mixtures A7-1 to A7-92 are defined as mixtures A7-1 to A7-92 of Table A5, wherein compound I.A in each mixture is replaced with compound I.C; and wherein the weight ratio of compound I.C to compound II is between 100:1 and 1:100, preferably between 50:1 and 1:50, more preferably between 20:1 and 1:20, particularly between 5:1 and 1:5; for example 3:1, 1:1 or 1:3.

It may be preferred that the binary mixtures above comprise besides at least one compound I and at least one compound II as component 3) at least one further active compound III, resulting in a ternary mixture. Preferably, the components 1) and 2), or, all three components 1), 2) and 3), in these mixtures are present in a synergistically effective amount.

Accordingly one embodiment relates to ternary mixtures comprising, as active components 1) at least one active compound I as defined or preferably defined herein, or an N-oxide, or an agriculturally useful salt thereof;

and as component 2) at least one active compound II selected from groups A) to O) as defined for component 2) in binary mixtures above, or an N-oxide, or an agriculturally useful salt thereof;

and as component 3) at least one active compound III selected from groups A) to O) as defined for component 2) in binary mixtures above, or an N-oxide, or an agriculturally useful salt thereof;

wherein the at least one active compound III of component 3) is not identical with the at least one active compound II of component 2).

The invention also relates to a method for controlling phytopathogenic harmful fungi using the abovementioned ternary mixtures; to agrochemical compositions comprising these ternary mixtures; and to agrochemical compositions further comprising seed comprising these mixtures.

The active substances referred to as compounds II or III, their preparation and their activity e. g. against harmful fungi is known (cf.: http://www.alanwood.net/pesticides/); these substances are commercially available. The compounds described by IUPAC nomenclature, their preparation and their pesticidal activity are also known (cf. Can. J. Plant Sci. 48(6), 587-94, 1968; EP-A 141 317; EP-A 152 031; EP-A 226 917; EP-A 243 970; EP-A 256 503; EP-A 428 941; EP-A 532 022; EP-A 1 028 125; EP-A 1 035 122; EP-A 1 201 648; EP-A 1 122 244, JP 2002316902; DE 19650197; DE 10021412; DE 102005009458; U.S. Pat. Nos. 3,296,272; 3,325,503; WO 98/46608; WO 99/14187; WO 99/24413; WO 99/27783; WO 00/29404; WO 00/46148; WO 00/65913; WO 01/54501; WO 01/56358; WO 02/22583; WO 02/40431; WO 03/10149; WO 03/11853; WO 03/14103; WO 03/16286; WO 03/53145; WO 03/61388; WO 03/66609; WO 03/74491; WO 04/49804; WO 04/83193; WO 05/120234; WO 05/123689; WO 05/123690; WO 05/63721; WO 05/87772; WO 05/87773; WO 06/15866; WO 06/87325; WO 06/87343; WO 07/82098; WO 07/90624, WO 10/139271, WO 11/028657, WO 12/168188, WO 07/006670, WO 11/77514; WO 13/047749, WO 10/069882, WO 13/047441, WO 03/16303, WO 09/90181, WO 13/007767, WO 13/010862, WO 13/127704, WO 13/024009, WO 13/24010, WO 13/047441, WO 13/162072, WO 13/092224, WO 11/135833, CN 1907024, CN 1456054, CN 103387541, CN 1309897, WO 12/84812, CN 1907024, WO 09094442, WO 14/60177, WO 13/116251, WO 08/013622, WO 15/65922, WO 94/01546, EP 2865265, WO 07/129454, WO 12/165511, WO 11/081174, WO 13/47441).

It is preferred that the ternary mixtures comprise as compounds III fungicidal compounds that are independently of each other selected from the groups A), B), C), D), E), F), G), H), I), J), K) and O).

Preference is also given to ternary mixtures based on binary mixtures disclosed herein, comprising as further component 3) at least one active compound selected from inhibitors of complex II in group A), more preferably selected from compounds (A.1.1), (A.1.4), (A.1.8), (A.1.10), (A.1.11), (A.1.12), (A.1.14), (A.1.17), (A.1.19), (A.1.25), ((A.1.34), (A.1.35), and (A.1.35); particularly selected from (A.1.1), (A.1.4), (A.1.8), (A.1.9), (A.1.13), (A.1.14), (A.1.17), (A.1.24), (A.1.25), (A.1.26), (A.1.27), (A.1.30), (A.1.31), (A.1.32), (A.1.34), (A.1.35) and (A.1.38).

Preference is also given to ternary mixtures based on binary mixtures disclosed herein, comprising as further component 3) at least one active compound selected from inhibitors of complex III at $Q_i$ site in group A), more preferably selected from compounds (A.1.1), (A.1.4), (A.1.8), (A.1.9), (A.1.10), (A.1.11), (A.1.12), (A.1.14), (A.1.16), (A.1.17), A.1.19, A.1.25, A.1.34, A.1.35, A.1.38

Preference is also given to ternary mixtures based on binary mixtures disclosed herein, comprising as further component 3) at least one active compound selected from inhibitors of complex III at Q; site in group A), more preferably selected from compounds (A.2.1), (A.2.3), (A.2.4) and (A.2.5); particularly selected from (A.2.3) (A.2.4) and (A.2.5). (A.2.6)

Preference is also given to ternary mixtures based on binary mixtures disclosed herein, comprising as further component 3) at least one active compound selected from inhibitors of complex II in group A), more preferably selected from compounds (A.3.2), (A.3.3), (A.3.4), (A.3.7), (A.3.8), (A.3.9), (A.3.10), (A.3.11), (A.3.12), (A.3.15), (A.3.16), (A.3.17), (A.3.19), (A.3.21), (A.3.22), (A.3.23), (A.3.28), (A.3.29) and (A.3.31).

Preference is also given to ternary mixtures based on binary mixtures disclosed herein, comprising as further component 3) at least one active compound selected from other respiration inhibitors in group A), more preferably selected from compounds (A.4.5) and (A.4.7).

Preference is also given to ternary mixtures based on binary mixtures disclosed herein, comprising as further component 3) at least one active compound selected from C14 demethylase inhibitors in group B), more preferably selected from compounds (B.1.4), (B.1.5), (B.1.8), (B.1.10), (B.1.12), (B.1.15), (B.1.17), (B.1.18), (B.1.21), (B.1.22), (B.1.23), (B.1.25), (B.1.26), (B.1.29), (B.1.38), (B.1.44) and (B.1.46).

Preference is also given to ternary mixtures based on binary mixtures disclosed herein, comprising as further component 3) at least one active compound selected from delta14-reductase inhibitors in group B), more preferably (B.2.4).

Preference is also given to ternary mixtures based on binary mixtures disclosed herein, comprising as further component 3) at least one active compound selected from inhibitors of 3-keto reductase in group B), more preferably (B.3.1).

Preference is also given to ternary mixtures based on binary mixtures disclosed herein, comprising as further component 3) at least one active compound selected from phenylamides and acyl amino acid fungicides in group C), more preferably selected from compounds (C.1.4), (C.1.5) and (C.2.1); particularly (C.2.1).

Preference is also given to ternary mixtures based on binary mixtures disclosed herein, comprising as further component 3) at least one active compound selected from group D), more preferably selected from compounds (D.1.4), (D.1.5), (D.2.3), (D.2.5) and (D.2.6).

Preference is also given to ternary mixtures based on binary mixtures disclosed herein, comprising as further component 3) at least one active compound selected from group E), more preferably selected from compounds (E.1.1), (E.1.3), (E.2.2) and (E.2.3).

Preference is also given to ternary mixtures based on binary mixtures disclosed herein, comprising as further component 3) at least one active compound selected from group F), more preferably selected from compounds (F.1.2), (F.1.3) and (F.1.5).

Preference is also given to ternary mixtures based on binary mixtures disclosed herein, comprising as further component 3) at least one active compound selected from group G), more preferably selected from compounds (G.1.4), (G.3.1) and (G.5.1).

Preference is also given to ternary mixtures based on binary mixtures disclosed herein, comprising as further component 3) at least one active compound selected from group H), more preferably selected from compounds (H.1.2), (H.1.4), (H.1.5), (H.1.6), (H.1.7), (H.2.2), (H.2.3), (H.2.5), (H.2.7), (H.3.2), (H.3.4), (H.3.5), (H.3.10), (H.4.2), (H.4.9) and (H.4.10); particularly selected from (H.1.5), (H.2.2), (H.2.5), (H.3.2), (H.4.9).

Preference is also given to ternary mixtures based on binary mixtures disclosed herein, comprising as further component 3) at least one active compound selected from group 1), more preferably selected from compounds (1.1.1), (1.1.2), (1.2.1), (1.2.2) (1.2.3) and (1.2.4).

Preference is also given to ternary mixtures based on binary mixtures disclosed herein, comprising as further component 3) at least one active compound selected from group J), more preferably selected from compounds (J.1.2), (J.1.3), (J.1.4), (J.1.5), (J.1.8), (J.1.12).

Preference is also given to ternary mixtures based on binary mixtures disclosed herein, comprising as further component 3) at least one active compound selected from group K), more preferably selected from compounds (K.1.13), (K.1.47) and (K.1.54).

Preference is also given to ternary mixtures based on binary mixtures disclosed herein, comprising as further component 3) a biopesticide selected from the groups L1), L3) to L5), preferably selected from strains denoted above as (L.1.2), (L.1.3), (L.1.4), (L.1.5), (L.1.6), (L.1.7), (L.1.8), (L.1.10), (L.1.11), (L.1.12), (L.1.13), (L.1.14), (L.1.15), (L.1.17), (L.1.18), (L.1.19). (L.1.20). (L.1.21). (L.1.25). (L.1.26). (L.1.27). (L.1.32)?. (L.3.1): (L.3.9). (L.3.16), (L.3.17), (L.5.1), (L.5.2), (L.5.3), (L.5.4), (L.5.5), (L.5.6), (L.5.7), (L.5.8); (L.4.2), and (L.4.1); even more preferably selected from (L.1.2), (L.1.6), (L.1.7), (L.1.8), (L.1.11), (L.1.12), (L.1.13), (L.1.14), (L.1.15), (L.1.18), (L.1.19), (L.1.20), (L.1.21), (L.3.1); (L.3.9), (L.3.16), (L.3.17), (L.5.1), (L.5.2), (L.5.5), (L.5.6); (L.4.2), and (L.4.1). These mixtures are particularly suitable for treatment of propagation materials, i. e. seed treatment purposes and likewise for soil treatment. These seed treatment mixtures are particularly suitable for crops such as monocotyles (e.g. cereals, corn) as well as dicotyles (e.g. vegetables and leguminous plants such as soybean).

Preference is also given to ternary mixtures based on binary mixtures disclosed herein, comprising as further component 3) a biopesticide selected from the groups L1), L3) and L4), preferably selected from strains denoted above as (L1.1), (L.1.2), (L.1.3), (L.1.6), (L.1.7), (L.1.9), (L.1.11), (L.1.12), (L.1.13), (L.1.14), (L.1.15), (L.1.17), (L.1.18), (L.1.22), (L.1.23), (L.1.24), (L.1.25), (L.1.26), (L.1.27), (L.2.2); (L.3.2), (L.3.3), (L.3.4), (L.3.5), (L.3.6), (L.3.7), (L.3.8), (L.3.10), (L.3.11), (L.3.12), (L.3.13), (L.3.14), (L.3.15), (L.3.18), (L.3.19); (L.4.2), even more preferably selected from (L.1.2), (L.1.7), (L.1.11), (L.1.13), (L.1.14), (L.1.15), (L.1.18), (L.1.23), (L.3.3), (L.3.4), (L.3.6), (L.3.7), (L.3.8), (L.3.10), (L.3.11), (L.3.12), (L.3.15), and (L.4.2). These mixtures are particularly suitable for foliar treatment.

Preference is also given to ternary mixtures based on binary mixtures disclosed herein, comprising as further component 3) at least one active compound selected from group M), more preferably selected from compounds (M.1.6), (M.1.24), (M.1.25), (M.1.28), (M.1.29), (M.1.30).

Preference is also given to ternary mixtures based on binary mixtures disclosed herein, comprising as further component 3) at least one active compound selected from group N), more preferably selected from compounds (N.7.3), (N.7.4), (N.7.5), (N.13.13).

Preference is also given to ternary mixtures based on binary mixtures disclosed herein, comprising as further component 3) at least one active compound selected from group 0), more preferably selected from compounds (O.2.4), (O.4.5), (O.4.7), (O.4.8), (O.5.1), (O.26.2, (O.27.17), (O.27.101), (O.27.102).

The present invention relates furthermore to ternary mixtures comprising mixtures A-1 to A-805 as listed in Table A above and as component 3) a compound III from groups A) to 0) as defined above.

Preferred are the following ternary mixtures listed in Tables B1 to B3:

TABLE C

| Component 2 | |
|---|---|
| azoxystrobin | (A.1.1) |
| dimoxystrobin | (A.1.4) |
| fluoxastrobin | (A.1.8) |
| mandestrobin | (A.1.10) |
| metominostrobin | (A.1.11) |
| orysastrobin | (A.1.12) |
| pyraclostrobin | (A.1.14) |
| trifloxystrobin | (A.1.17) |
| pyribencarb | (A.1.19) |
| 1-[2-[[1-(4-chlorophenyl)pyrazol-3-yl]oxymethyl]-3-methyl-phenyl]-4-methyl-tetrazol-5-one | (A.1.25) |
| (Z,2E)-5-[1-(2,4-dichloro¬phenyl)pyrazol-3-yl]oxy-2-methoxyimino-N,3-dimethyl-pent-3-enamide | (A.1.34) |
| (Z,2E) 5 [1(4-chlorophenyl)pyrazol-3-yl]oxy-2-methoxyimino-N,3-dimethyl-pent-3-enamide | (A.1.35) |
| 2-(ortho-((2,5-dimethylphenyl-oxy¬methylen)phenyl)-3-methoxy-acrylic acid methylester | (A.1.38) |
| florylpicoxamid | (A.2.6) |
| benzovindiflupyr | (A.3.2) |

TABLE C-continued

| Component 2 | |
|---|---|
| bixafen | (A.3.3) |
| boscalid | (A.3.4) |
| fluopyram | (A.3.7) |
| flutolanil | (A.3.8) |
| fluxapyroxad | (A.3.9) |
| furametpyr | (A.3.10) |
| isofetamid | (A.3.11) |
| isopyrazam | (A.3.12) |
| penflufen | (A.3.15) |
| penthiopyrad | (A.3.16) |
| pydiflumetofen | (A.3.17) |
| sedaxane | (A.3.19) |
| thifluzamide | (A.3.21) |
| inpyrfluxam | (A.3.22) |
| pyrapropoyne | (A.3.23) |
| fluindapyr | (A.3.28) |
| isoflucypram | (A.3.31) |
| fluazinam | (A.4.5) |
| cyproconazole | (B.1.4) |
| difenoconazole | (B.1.5) |
| epoxiconazole | (B.1.8) |
| fluquinconazole | (B.1.10) |
| flutriafol | (B.1.12) |
| ipconazole | (B.1.15) |
| metconazole | (B.1.17) |
| myclobutanil | (B.1.18) |
| penconazole | (B.1.21) |
| propiconazole | (B.1.22) |
| prothioconazole | (B.1.23) |
| tebuconazole | (B.1.25) |
| tetraconazole | (B.1.26) |
| triticonazole | (B.1.29) |
| mefentrifluconazole | (B.1.38) |
| imazalil | (B.1.44) |
| prochloraz | (B.1.46) |
| fenpropimorph | (B.2.4) |
| fenhexamid | (B.3.1) |
| metalaxyl | (C.1.4) |
| metalaxyl-M | (C.1.5) |
| hymexazole | (C.2.1) |
| thiabendazole | (D.1.4) |
| thiophanate-methyl | (D.1.5) |
| pencycuron | (D.2.3) |
| zoxamide | (D.2.5) |
| metrafenone | (D.2.6) |
| cyprodinil | (E.1.1) |
| pyrimethanil | (E.1.3) |
| kasugamycin | (E.2.2) |
| kasugamycin hydrochloride-hydrate | (E.2.3), |
| iprodione | (F.1.2) |
| procymidone | (F.1.3) |
| fludioxonil | (F.1.5) |
| isoprothiolane | (G.1.4) |
| dimethomorph | (G.3.1) |
| oxathiapiprolin | (G.5.1) |
| copper | (H.1.2) |
| copper acetate | (H.1.3) |
| copper hydroxide | (H.1.4) |
| copper oxychloride | (H.1.5) |
| basic copper sulfate | (H.1.6) |
| sulfur | (H.1.7) |
| mancozeb | (H.2.2) |
| maneb | (H.2.3) |
| metiram | (H.2.5) |
| thiram | (H.2.7) |
| chlorothalonil | (H.3.2) |
| captan | (H.3.4) |
| folpet | (H.3.5) |
| phthalide | (H.3.10) |
| dodine | (H.4.2) |
| dithianon | (H.4.9) |
| validamycin | (I.1.1) |
| pyroquilon | (I.2.1) |
| tricyclazole | (I.2.2) |
| probenazole | (J.1.2) |
| isotianil | (J.1.3) |
| tiadinil | (J.1.4) |

TABLE C-continued

| Component 2 | |
|---|---|
| prohexadione-calcium | (J.1.5) |
| phosphorous acid and its salts | (J.1.8) |
| potassium phosphonate | (J.1.12) |
| fenpyrazamine | (K.1.13) |
| quinofumelin | (K.1.47) |
| aminopyrifen | (K.1.54) |
| B. amyloliquefaciens | (L.1.5) |
| B. pumilus | (L.1.9) |
| B. subtilis | (L.1.12) |
| B. subtilis var. amyloliquefaciens | (L.1.13) |
| Coniothyrium minitans | (L.1.17) |
| Gliocladium roseum | (L.1.23) |
| P. polymyxa | (L.1.32), |
| Trichoderma asperelloides (L.1.46) | (L.1.46) |
| chlormequat | (M.1.6) |
| mepiquat | (M.1.24) |
| mepiquat chloride | (M.1.25) |
| paclobutrazol | (M.1.28) |
| prohexadione | (M.1.29) |
| prohexadione-calcium | (M.1.30) |
| glufosinate | (N.7.3) |
| glufosinate-P | (N.7.4) |
| glufosinate-ammonium | (N.7.5) |
| dicamba | (N.13.13) |
| fipronil | (O.2.4), |
| imidacloprid | (O.4.5) |
| thiacloprid | (O.4.7) |
| thiamethoxam | (O.4.8) |
| spinosad | (O.5.1) |
| chlorantraniliprole | (O.26.2) |
| fluopyram | (O.27.17) |

Table B1: Ternary mixtures B1-1 to B1-7503 comprising as component 1) compound I.A as defined herein and as component 2) and component 3) compounds II and III as defined in each row of the Table B (e.g. mixture B1-15 comprises: I.A as component 1), A.3.2=benzovindiflupyr (see Table C above) as Component 2), and A.1.1=azoxystrobin (see Table C below) as Component 3).

In mixtures B1-1 to B1-7503 of Table B1 according to one embodiment the weight ratio of compound I.A to compound II is between 100:1 and 1:100; and the weight ratio of compound I.A to compound III, is between 100:1 and 1:100.

In mixtures B1-1 to B1-7503 of Table B1 according to one embodiment the weight ratio of compound I.A to compound II is between 100:1 and 1:100; and the weight ratio of compound I.A to compound III, is between 50:1 and 1:50.

In mixtures B1-1 to B1-7503 of Table B1 according to one embodiment the weight ratio of compound I.A to compound II is between 100:1 and 1:100; and the weight ratio of compound I.A to compound III, is between 20:1 and 1:20.

In mixtures B1-1 to B1-7503 of Table B1 according to one embodiment the weight ratio of compound I.A to compound II is between 100:1 and 1:100; and the weight ratio of compound I.A to compound III, is between 5:1 and 1:5.

In mixtures B1-1 to B1-7503 of Table B1 according to one embodiment the weight ratio of compound I.A to compound II is between 100:1 and 1:100; and the weight ratio of compound I.A to compound III is, for example, 3:1, 1:1 or 1:3.

Table B2: Ternary mixtures B2-1 to B2-7503 are defined as mixtures B1-1 to B1-7503 of Table B1 wherein compound I.A in each mixture is replaced with compound I.B.

In mixtures B2-1 to B2-7503 of Table B2 according to one embodiment the weight ratio of compound I.B to compound II is between 100:1 and 1:100; and the weight ratio of compound I.B to compound III, is between 100:1 and 1:100.

In mixtures B2-1 to B2-7503 of Table B2 according to one embodiment the weight ratio of compound I.B to compound II is between 100:1 and 1:100; and the weight ratio of compound I.B to compound III, is between 50:1 and 1:50.

In mixtures B2-1 to B2-7503 of Table B2 according to one embodiment the weight ratio of compound I.B to compound II is between 100:1 and 1:100; and the weight ratio of compound I.B to compound III, is between 20:1 and 1:20.

In mixtures B2-1 to B2-7503 of Table B2 according to one embodiment the weight ratio of compound I.B to compound II is between 100:1 and 1:100; and the weight ratio of compound I.B to compound III, is between 5:1 and 1:5.

In mixtures B2-1 to B2-7503 of Table B2 according to one embodiment the weight ratio of compound I.B to compound II is between 100:1 and 1:100; and the weight ratio of compound I.B to compound III is, for example, 3:1, 1:1 or 1:3.

Table B3: Mixtures B3-1 to B3-7503 are defined as mixtures B1-1 to B1-7503 of Table B1, wherein compound I.A in each mixture is replaced with compound I.C.

In mixtures B3-1 to B3-7503 of Table B3 according to one embodiment the weight ratio of compound I.C to compound II is between 100:1 and 1:100; and the weight ratio of compound I.C to compound III, is between 100:1 and 1:100.

In mixtures B3-1 to B3-7503 of Table B3 according to one embodiment the weight ratio of compound I.C to compound II is between 100:1 and 1:100; and the weight ratio of compound I.C to compound III, is between 50:1 and 1:50.

In mixtures B3-1 to B3-7503 of Table B3 according to one embodiment the weight ratio of compound I.C to compound II is between 100:1 and 1:100; and the weight ratio of compound I.C to compound III, is between 20:1 and 1:20.

In mixtures B3-1 to B3-7503 of Table B3 according to one embodiment the weight ratio of compound I.C to compound II is between 100:1 and 1:100; and the weight ratio of compound I.C to compound III, is between 5:1 and 1:5.

In mixtures B3-1 to B3-7503 of Table B3 according to one embodiment the weight ratio of compound I.C to compound II is between 100:1 and 1:100; and the weight ratio of compound I.C to compound III is, for example, 3:1, 1:1 or 1:3.

TABLE B1

| Mixture | Co 2) | Co3) |
|---|---|---|
| B1-1 | (A.1.1) | (A.1.1) |
| B1-2 | (A.1.4) | (A.1.1) |
| B1-3 | (A.1.8) | (A.1.1) |
| B1-4 | (A.1.10) | (A.1.1) |
| B1-5 | (A.1.11) | (A.1.1) |
| B1-6 | (A.1.12) | (A.1.1) |
| B1-7 | (A.1.14) | (A.1.1) |
| B1-8 | (A.1.17) | (A.1.1) |
| B1-9 | (A.1.19) | (A.1.1) |
| B1-10 | (A.1.25) | (A.1.1) |
| B1-11 | (A.1.34) | (A.1.1) |
| B1-12 | (A.1.35) | (A.1.1) |
| B1-13 | (A.1.38) | (A.1.1) |
| B1-14 | (A.2.6) | (A.1.1) |
| B1-15 | (A.3.2) | (A.1.1) |
| B1-16 | (A.3.3) | (A.1.1) |
| B1-17 | (A.3.4) | (A.1.1) |
| B1-18 | (A.3.7) | (A.1.1) |
| B1-19 | (A.3.8) | (A.1.1) |
| B1-20 | (A.3.9) | (A.1.1) |
| B1-21 | (A.3.10) | (A.1.1) |
| B1-22 | (A.3.11) | (A.1.1) |
| B1-23 | (A.3.12) | (A.1.1) |
| B1-24 | (A.3.15) | (A.1.1) |
| B1-25 | (A.3.16) | (A.1.1) |
| B1-26 | (A.3.17) | (A.1.1) |
| B1-27 | (A.3.19) | (A.1.1) |
| B1-28 | (A.3.21) | (A.1.1) |

TABLE B1-continued

| Mixture | Co 2) | Co3) |
|---|---|---|
| B1-29 | (A.3.22) | (A.1.1) |
| B1-30 | (A.3.23) | (A.1.1) |
| B1-31 | (A.3.28) | (A.1.1) |
| B1-32 | (A.3.31) | (A.1.1) |
| B1-33 | (A.4.5) | (A.1.1) |
| B1-34 | (B.1.4) | (A.1.1) |
| B1-35 | (B.1.5) | (A.1.1) |
| B1-36 | (B.1.8) | (A.1.1) |
| B1-37 | (B.1.10) | (A.1.1) |
| B1-38 | (B.1.12) | (A.1.1) |
| B1-39 | (B.1.15) | (A.1.1) |
| B1-40 | (B.1.17) | (A.1.1) |
| B1-41 | (B.1.18) | (A.1.1) |
| B1-42 | (B.1.21) | (A.1.1) |
| B1-43 | (B.1.22) | (A.1.1) |
| B1-44 | (B.1.23) | (A.1.1) |
| B1-45 | (B.1.25) | (A.1.1) |
| B1-46 | (B.1.26) | (A.1.1) |
| B1-47 | (B.1.29) | (A.1.1) |
| B1-48 | (B.1.38) | (A.1.1) |
| B1-49 | (B.1.44) | (A.1.1) |
| B1-50 | (B.1.46) | (A.1.1) |
| B1-51 | (B.2.4) | (A.1.1) |
| B1-52 | (B.3.1) | (A.1.1) |
| B1-53 | (C.1.4) | (A.1.1) |
| B1-54 | (C.1.5) | (A.1.1) |
| B1-55 | (C.2.1) | (A.1.1) |
| B1-56 | (D.1.4) | (A.1.1) |
| B1-57 | (D.1.5) | (A.1.1) |
| B1-58 | (D.2.3) | (A.1.1) |
| B1-59 | (D.2.5) | (A.1.1) |
| B1-60 | (D.2.6) | (A.1.1) |
| B1-61 | (E.1.1) | (A.1.1) |
| B1-62 | (E.1.3) | (A.1.1) |
| B1-63 | (E.2.2) | (A.1.1) |
| B1-64 | (E.2.3), | (A.1.1) |
| B1-65 | (F.1.2) | (A.1.1) |
| B1-66 | (F.1.3) | (A.1.1) |
| B1-67 | (F.1.5) | (A.1.1) |
| B1-68 | (G.1.4) | (A.1.1) |
| B1-69 | (G.3.1) | (A.1.1) |
| B1-70 | (G.5.1) | (A.1.1) |
| B1-71 | (H.1.2) | (A.1.1) |
| B1-72 | (H.1.3) | (A.1.1) |
| B1-73 | (H.1.4) | (A.1.1) |
| B1-74 | (H.1.5) | (A.1.1) |
| B1-75 | (H.1.6) | (A.1.1) |
| B1-76 | (H.1.7) | (A.1.1) |
| B1-77 | (H.2.2) | (A.1.1) |
| B1-78 | (H.2.3) | (A.1.1) |
| B1-79 | (H.2.5) | (A.1.1) |
| B1-80 | (H.2.7) | (A.1.1) |
| B1-81 | (H.3.2) | (A.1.1) |
| B1-82 | (H.3.4) | (A.1.1) |
| B1-83 | (H.3.5) | (A.1.1) |
| B1-84 | (H.3.10) | (A.1.1) |
| B1-85 | (H.4.2) | (A.1.1) |
| B1-86 | (H.4.9) | (A.1.1) |
| B1-87 | (I.1.1) | (A.1.1) |
| B1-88 | (I.2.1) | (A.1.1) |
| B1-89 | (I.2.2) | (A.1.1) |
| B1-90 | (J.1.2) | (A.1.1) |
| B1-91 | (J.1.3) | (A.1.1) |
| B1-92 | (J.1.4) | (A.1.1) |
| B1-93 | (J.1.5) | (A.1.1) |
| B1-94 | (J.1.8) | (A.1.1) |
| B1-95 | (J.1.12) | (A.1.1) |
| B1-96 | (K.1.13) | (A.1.1) |
| B1-97 | (K.1.47) | (A.1.1) |
| B1-98 | (K.1.54) | (A.1.1) |
| B1-99 | (L.1.5) | (A.1.1) |
| B1-100 | (L.1.9) | (A.1.1) |
| B1-101 | (L.1.12) | (A.1.1) |
| B1-102 | (L.1.13) | (A.1.1) |
| B1-103 | (L.1.17) | (A.1.1) |
| B1-104 | (L.1.23) | (A.1.1) |
| B1-105 | (L.1.32), | (A.1.1) |
| B1-106 | (L.1.46) | (A.1.1) |
| B1-107 | (M.1.6) | (A.1.1) |
| B1-108 | (M.1.24) | (A.1.1) |
| B1-109 | (M.1.25) | (A.1.1) |
| B1-110 | (M.1.28) | (A.1.1) |
| B1-111 | (M.1.29) | (A.1.1) |
| B1-112 | (M.1.30) | (A.1.1) |
| B1-113 | (N.7.3) | (A.1.1) |
| B1-114 | (N.7.4) | (A.1.1) |
| B1-115 | (N.7.5) | (A.1.1) |
| B1-116 | (N.13.13) | (A.1.1) |
| B1-117 | (O.2.4), | (A.1.1) |
| B1-118 | (O.4.5) | (A.1.1) |
| B1-119 | (O.4.7) | (A.1.1) |
| B1-120 | (O.4.8) | (A.1.1) |
| B1-121 | (O.5.1) | (A.1.1) |
| B1-122 | (O.26.2) | (A.1.1) |
| B1-123 | (O.27.17) | (A.1.1) |
| B1-124 | (A.1.1) | (A.1.4) |
| B1-125 | (A.1.4) | (A.1.4) |
| B1-126 | (A.1.8) | (A.1.4) |
| B1-127 | (A.1.10) | (A.1.4) |
| B1-128 | (A.1.11) | (A.1.4) |
| B1-129 | (A.1.12) | (A.1.4) |
| B1-130 | (A.1.14) | (A.1.4) |
| B1-131 | (A.1.17) | (A.1.4) |
| B1-132 | (A.1.19) | (A.1.4) |
| B1-133 | (A.1.25) | (A.1.4) |
| B1-134 | (A.1.34) | (A.1.4) |
| B1-135 | (A.1.35) | (A.1.4) |
| B1-136 | (A.1.38) | (A.1.4) |
| B1-137 | (A.2.6) | (A.1.4) |
| B1-138 | (A.3.2) | (A.1.4) |
| B1-139 | (A.3.3) | (A.1.4) |
| B1-140 | (A.3.4) | (A.1.4) |
| B1-141 | (A.3.7) | (A.1.4) |
| B1-142 | (A.3.8) | (A.1.4) |
| B1-143 | (A.3.9) | (A.1.4) |
| B1-144 | (A.3.10) | (A.1.4) |
| B1-145 | (A.3.11) | (A.1.4) |
| B1-146 | (A.3.12) | (A.1.4) |
| B1-147 | (A.3.15) | (A.1.4) |
| B1-148 | (A.3.16) | (A.1.4) |
| B1-149 | (A.3.17) | (A.1.4) |
| B1-150 | (A.3.19) | (A.1.4) |
| B1-151 | (A.3.21) | (A.1.4) |
| B1-152 | (A.3.22) | (A.1.4) |
| B1-153 | (A.3.23) | (A.1.4) |
| B1-154 | (A.3.28) | (A.1.4) |
| B1-155 | (A.3.31) | (A.1.4) |
| B1-156 | (A.4.5) | (A.1.4) |
| B1-157 | (B.1.4) | (A.1.4) |
| B1-158 | (B.1.5) | (A.1.4) |
| B1-159 | (B.1.8) | (A.1.4) |
| B1-160 | (B.1.10) | (A.1.4) |
| B1-161 | (B.1.12) | (A.1.4) |
| B1-162 | (B.1.15) | (A.1.4) |
| B1-163 | (B.1.17) | (A.1.4) |
| B1-164 | (B.1.18) | (A.1.4) |
| B1-165 | (B.1.21) | (A.1.4) |
| B1-166 | (B.1.22) | (A.1.4) |
| B1-167 | (B.1.23) | (A.1.4) |
| B1-168 | (B.1.25) | (A.1.4) |
| B1-169 | (B.1.26) | (A.1.4) |
| B1-170 | (B.1.29) | (A.1.4) |
| B1-171 | (B.1.38) | (A.1.4) |
| B1-172 | (B.1.44) | (A.1.4) |
| B1-173 | (B.1.46) | (A.1.4) |
| B1-174 | (B.2.4) | (A.1.4) |
| B1-175 | (B.3.1) | (A.1.4) |
| B1-176 | (C.1.4) | (A.1.4) |
| B1-177 | (C.1.5) | (A.1.4) |
| B1-178 | (C.2.1) | (A.1.4) |
| B1-179 | (D.1.4) | (A.1.4) |
| B1-180 | (D.1.5) | (A.1.4) |
| B1-181 | (D.2.3) | (A.1.4) |
| B1-182 | (D.2.5) | (A.1.4) |
| B1-183 | (D.2.6) | (A.1.4) |
| B1-184 | (E.1.1) | (A.1.4) |

TABLE B1-continued

| Mixture | Co 2) | Co3) |
|---|---|---|
| B1-185 | (E.1.3) | (A.1.4) |
| B1-186 | (E.2.2) | (A.1.4) |
| B1-187 | (E.2.3), | (A.1.4) |
| B1-188 | (F.1.2) | (A.1.4) |
| B1-189 | (F.1.3) | (A.1.4) |
| B1-190 | (F.1.5) | (A.1.4) |
| B1-191 | (G.1.4) | (A.1.4) |
| B1-192 | (G.3.1) | (A.1.4) |
| B1-193 | (G.5.1) | (A.1.4) |
| B1-194 | (H.1.2) | (A.1.4) |
| B1-195 | (H.1.3) | (A.1.4) |
| B1-196 | (H.1.4) | (A.1.4) |
| B1-197 | (H.1.5) | (A.1.4) |
| B1-198 | (H.1.6) | (A.1.4) |
| B1-199 | (H.1.7) | (A.1.4) |
| B1-200 | (H.2.2) | (A.1.4) |
| B1-201 | (H.2.3) | (A.1.4) |
| B1-202 | (H.2.5) | (A.1.4) |
| B1-203 | (H.2.7) | (A.1.4) |
| B1-204 | (H.3.2) | (A.1.4) |
| B1-205 | (H.3.4) | (A.1.4) |
| B1-206 | (H.3.5) | (A.1.4) |
| B1-207 | (H.3.10) | (A.1.4) |
| B1-208 | (H.4.2) | (A.1.4) |
| B1-209 | (H.4.9) | (A.1.4) |
| B1-210 | (I.1.1) | (A.1.4) |
| B1-211 | (I.2.1) | (A.1.4) |
| B1-212 | (I.2.2) | (A.1.4) |
| B1-213 | (J.1.2) | (A.1.4) |
| B1-214 | (J.1.3) | (A.1.4) |
| B1-215 | (J.1.4) | (A.1.4) |
| B1-216 | (J.1.5) | (A.1.4) |
| B1-217 | (J.1.8) | (A.1.4) |
| B1-218 | (J.1.12) | (A.1.4) |
| B1-219 | (K.1.13) | (A.1.4) |
| B1-220 | (K.1.47) | (A.1.4) |
| B1-221 | (K.1.54) | (A.1.4) |
| B1-222 | (L.1.5) | (A.1.4) |
| B1-223 | (L.1.9) | (A.1.4) |
| B1-224 | (L.1.12) | (A.1.4) |
| B1-225 | (L.1.13) | (A.1.4) |
| B1-226 | (L.1.17) | (A.1.4) |
| B1-227 | (L.1.23) | (A.1.4) |
| B1-228 | (L.1.32), | (A.1.4) |
| B1-229 | (L.1.46) | (A.1.4) |
| B1-230 | (M.1.6) | (A.1.4) |
| B1-231 | (M.1.24) | (A.1.4) |
| B1-232 | (M.1.25) | (A.1.4) |
| B1-233 | (M.1.28) | (A.1.4) |
| B1-234 | (M.1.29) | (A.1.4) |
| B1-235 | (M.1.30) | (A.1.4) |
| B1-236 | (N.7.3) | (A.1.4) |
| B1-237 | (N.7.4) | (A.1.4) |
| B1-238 | (N.7.5) | (A.1.4) |
| B1-239 | (N.13.13) | (A.1.4) |
| B1-240 | (O.2.4), | (A.1.4) |
| B1-241 | (O.4.5) | (A.1.4) |
| B1-242 | (O.4.7) | (A.1.4) |
| B1-243 | (O.4.8) | (A.1.4) |
| B1-244 | (O.5.1) | (A.1.4) |
| B1-245 | (O.26.2) | (A.1.4) |
| B1-246 | (O.27.17) | (A.1.4) |
| B1-247 | (A.1.1) | (A.1.14) |
| B1-248 | (A.1.4) | (A.1.14) |
| B1-249 | (A.1.8) | (A.1.14) |
| B1-250 | (A.1.10) | (A.1.14) |
| B1-251 | (A.1.11) | (A.1.14) |
| B1-252 | (A.1.12) | (A.1.14) |
| B1-253 | (A.1.14) | (A.1.14) |
| B1-254 | (A.1.17) | (A.1.14) |
| B1-255 | (A.1.19) | (A.1.14) |
| B1-256 | (A.1.25) | (A.1.14) |
| B1-257 | (A.1.34) | (A.1.14) |
| B1-258 | (A.1.35) | (A.1.14) |
| B1-259 | (A.1.38) | (A.1.14) |
| B1-260 | (A.2.6) | (A.1.14) |
| B1-261 | (A.3.2) | (A.1.14) |
| B1-262 | (A.3.3) | (A.1.14) |

TABLE B1-continued

| Mixture | Co 2) | Co3) |
|---|---|---|
| B1-263 | (A.3.4) | (A.1.14) |
| B1-264 | (A.3.7) | (A.1.14) |
| B1-265 | (A.3.8) | (A.1.14) |
| B1-266 | (A.3.9) | (A.1.14) |
| B1-267 | (A.3.10) | (A.1.14) |
| B1-268 | (A.3.11) | (A.1.14) |
| B1-269 | (A.3.12) | (A.1.14) |
| B1-270 | (A.3.15) | (A.1.14) |
| B1-271 | (A.3.16) | (A.1.14) |
| B1-272 | (A.3.17) | (A.1.14) |
| B1-273 | (A.3.19) | (A.1.14) |
| B1-274 | (A.3.21) | (A.1.14) |
| B1-275 | (A.3.22) | (A.1.14) |
| B1-276 | (A.3.23) | (A.1.14) |
| B1-277 | (A.3.28) | (A.1.14) |
| B1-278 | (A.3.31) | (A.1.14) |
| B1-279 | (A.4.5) | (A.1.14) |
| B1-280 | (B.1.4) | (A.1.14) |
| B1-281 | (B.1.5) | (A.1.14) |
| B1-282 | (B.1.8) | (A.1.14) |
| B1-283 | (B.1.10) | (A.1.14) |
| B1-284 | (B.1.12) | (A.1.14) |
| B1-285 | (B.1.15) | (A.1.14) |
| B1-286 | (B.1.17) | (A.1.14) |
| B1-287 | (B.1.18) | (A.1.14) |
| B1-288 | (B.1.21) | (A.1.14) |
| B1-289 | (B.1.22) | (A.1.14) |
| B1-290 | (B.1.23) | (A.1.14) |
| B1-291 | (B.1.25) | (A.1.14) |
| B1-292 | (B.1.26) | (A.1.14) |
| B1-293 | (B.1.29) | (A.1.14) |
| B1-294 | (B.1.38) | (A.1.14) |
| B1-295 | (B.1.44) | (A.1.14) |
| B1-296 | (B.1.46) | (A.1.14) |
| B1-297 | (B.2.4) | (A.1.14) |
| B1-298 | (B.3.1) | (A.1.14) |
| B1-299 | (C.1.4) | (A.1.14) |
| B1-300 | (C.1.5) | (A.1.14) |
| B1-301 | (C.2.1) | (A.1.14) |
| B1-302 | (D.1.4) | (A.1.14) |
| B1-303 | (D.1.5) | (A.1.14) |
| B1-304 | (D.2.3) | (A.1.14) |
| B1-305 | (D.2.5) | (A.1.14) |
| B1-306 | (D.2.6) | (A.1.14) |
| B1-307 | (E.1.1) | (A.1.14) |
| B1-308 | (E.1.3) | (A.1.14) |
| B1-309 | (E.2.2) | (A.1.14) |
| B1-310 | (E.2.3), | (A.1.14) |
| B1-311 | (F.1.2) | (A.1.14) |
| B1-312 | (F.1.3) | (A.1.14) |
| B1-313 | (F.1.5) | (A.1.14) |
| B1-314 | (G.1.4) | (A.1.14) |
| B1-315 | (G.3.1) | (A.1.14) |
| B1-316 | (G.5.1) | (A.1.14) |
| B1-317 | (H.1.2) | (A.1.14) |
| B1-318 | (H.1.3) | (A.1.14) |
| B1-319 | (H.1.4) | (A.1.14) |
| B1-320 | (H.1.5) | (A.1.14) |
| B1-321 | (H.1.6) | (A.1.14) |
| B1-322 | (H.1.7) | (A.1.14) |
| B1-323 | (H.2.2) | (A.1.14) |
| B1-324 | (H.2.3) | (A.1.14) |
| B1-325 | (H.2.5) | (A.1.14) |
| B1-326 | (H.2.7) | (A.1.14) |
| B1-327 | (H.3.2) | (A.1.14) |
| B1-328 | (H.3.4) | (A.1.14) |
| B1-329 | (H.3.5) | (A.1.14) |
| B1-330 | (H.3.10) | (A.1.14) |
| B1-331 | (H.4.2) | (A.1.14) |
| B1-332 | (H.4.9) | (A.1.14) |
| B1-333 | (I.1.1) | (A.1.14) |
| B1-334 | (I.2.1) | (A.1.14) |
| B1-335 | (I.2.2) | (A.1.14) |
| B1-336 | (J.1.2) | (A.1.14) |
| B1-337 | (J.1.3) | (A.1.14) |
| B1-338 | (J.1.4) | (A.1.14) |
| B1-339 | (J.1.5) | (A.1.14) |
| B1-340 | (J.1.8) | (A.1.14) |

TABLE B1-continued

| Mixture | Co 2) | Co3) |
|---|---|---|
| B1-341 | (J.1.12) | (A.1.14) |
| B1-342 | (K.1.13) | (A.1.14) |
| B1-343 | (K.1.47) | (A.1.14) |
| B1-344 | (K.1.54) | (A.1.14) |
| B1-345 | (L.1.5) | (A.1.14) |
| B1-346 | (L.1.9) | (A.1.14) |
| B1-347 | (L.1.12) | (A.1.14) |
| B1-348 | (L.1.13) | (A.1.14) |
| B1-349 | (L.1.17) | (A.1.14) |
| B1-350 | (L.1.23) | (A.1.14) |
| B1-351 | (L.1.32), | (A.1.14) |
| B1-352 | (L.1.46) | (A.1.14) |
| B1-353 | (M.1.6) | (A.1.14) |
| B1-354 | (M.1.24) | (A.1.14) |
| B1-355 | (M.1.25) | (A.1.14) |
| B1-356 | (M.1.28) | (A.1.14) |
| B1-357 | (M.1.29) | (A.1.14) |
| B1-358 | (M.1.30) | (A.1.14) |
| B1-359 | (N.7.3) | (A.1.14) |
| B1-360 | (N.7.4) | (A.1.14) |
| B1-361 | (N.7.5) | (A.1.14) |
| B1-362 | (N.13.13) | (A.1.14) |
| B1-363 | (O.2.4), | (A.1.14) |
| B1-364 | (O.4.5) | (A.1.14) |
| B1-365 | (O.4.7) | (A.1.14) |
| B1-366 | (O.4.8) | (A.1.14) |
| B1-367 | (O.5.1) | (A.1.14) |
| B1-368 | (O.26.2) | (A.1.14) |
| B1-369 | (O.27.17) | (A.1.14) |
| B1-370 | (A.1.1) | (A.1.17) |
| B1-371 | (A.1.4) | (A.1.17) |
| B1-372 | (A.1.8) | (A.1.17) |
| B1-373 | (A.1.10) | (A.1.17) |
| B1-374 | (A.1.11) | (A.1.17) |
| B1-375 | (A.1.12) | (A.1.17) |
| B1-376 | (A.1.14) | (A.1.17) |
| B1-377 | (A.1.17) | (A.1.17) |
| B1-378 | (A.1.19) | (A.1.17) |
| B1-379 | (A.1.25) | (A.1.17) |
| B1-380 | (A.1.34) | (A.1.17) |
| B1-381 | (A.1.35) | (A.1.17) |
| B1-382 | (A.1.38) | (A.1.17) |
| B1-383 | (A.2.6) | (A.1.17) |
| B1-384 | (A.3.2) | (A.1.17) |
| B1-385 | (A.3.3) | (A.1.17) |
| B1-386 | (A.3.4) | (A.1.17) |
| B1-387 | (A.3.7) | (A.1.17) |
| B1-388 | (A.3.8) | (A.1.17) |
| B1-389 | (A.3.9) | (A.1.17) |
| B1-390 | (A.3.10) | (A.1.17) |
| B1-391 | (A.3.11) | (A.1.17) |
| B1-392 | (A.3.12) | (A.1.17) |
| B1-393 | (A.3.15) | (A.1.17) |
| B1-394 | (A.3.16) | (A.1.17) |
| B1-395 | (A.3.17) | (A.1.17) |
| B1-396 | (A.3.19) | (A.1.17) |
| B1-397 | (A.3.21) | (A.1.17) |
| B1-398 | (A.3.22) | (A.1.17) |
| B1-399 | (A.3.23) | (A.1.17) |
| B1-400 | (A.3.28) | (A.1.17) |
| B1-401 | (A.3.31) | (A.1.17) |
| B1-402 | (A.4.5) | (A.1.17) |
| B1-403 | (B.1.4) | (A.1.17) |
| B1-404 | (B.1.5) | (A.1.17) |
| B1-405 | (B.1.8) | (A.1.17) |
| B1-406 | (B.1.10) | (A.1.17) |
| B1-407 | (B.1.12) | (A.1.17) |
| B1-408 | (B.1.15) | (A.1.17) |
| B1-409 | (B.1.17) | (A.1.17) |
| B1-410 | (B.1.18) | (A.1.17) |
| B1-411 | (B.1.21) | (A.1.17) |
| B1-412 | (B.1.22) | (A.1.17) |
| B1-413 | (B.1.23) | (A.1.17) |
| B1-414 | (B.1.25) | (A.1.17) |
| B1-415 | (B.1.26) | (A.1.17) |
| B1-416 | (B.1.29) | (A.1.17) |
| B1-417 | (B.1.38) | (A.1.17) |
| B1-418 | (B.1.44) | (A.1.17) |

TABLE B1-continued

| Mixture | Co 2) | Co3) |
|---|---|---|
| B1-419 | (B.1.46) | (A.1.17) |
| B1-420 | (B.2.4) | (A.1.17) |
| B1-421 | (B.3.1) | (A.1.17) |
| B1-422 | (C.1.4) | (A.1.17) |
| B1-423 | (C.1.5) | (A.1.17) |
| B1-424 | (C.2.1) | (A.1.17) |
| B1-425 | (D.1.4) | (A.1.17) |
| B1-426 | (D.1.5) | (A.1.17) |
| B1-427 | (D.2.3) | (A.1.17) |
| B1-428 | (D.2.5) | (A.1.17) |
| B1-429 | (D.2.6) | (A.1.17) |
| B1-430 | (E.1.1) | (A.1.17) |
| B1-431 | (E.1.3) | (A.1.17) |
| B1-432 | (E.2.2) | (A.1.17) |
| B1-433 | (E.2.3), | (A.1.17) |
| B1-434 | (F.1.2) | (A.1.17) |
| B1-435 | (F.1.3) | (A.1.17) |
| B1-436 | (F.1.5) | (A.1.17) |
| B1-437 | (G.1.4) | (A.1.17) |
| B1-438 | (G.3.1) | (A.1.17) |
| B1-439 | (G.5.1) | (A.1.17) |
| B1-440 | (H.1.2) | (A.1.17) |
| B1-441 | (H.1.3) | (A.1.17) |
| B1-442 | (H.1.4) | (A.1.17) |
| B1-443 | (H.1.5) | (A.1.17) |
| B1-444 | (H.1.6) | (A.1.17) |
| B1-445 | (H.1.7) | (A.1.17) |
| B1-446 | (H.2.2) | (A.1.17) |
| B1-447 | (H.2.3) | (A.1.17) |
| B1-448 | (H.2.5) | (A.1.17) |
| B1-449 | (H.2.7) | (A.1.17) |
| B1-450 | (H.3.2) | (A.1.17) |
| B1-451 | (H.3.4) | (A.1.17) |
| B1-452 | (H.3.5) | (A.1.17) |
| B1-453 | (H.3.10) | (A.1.17) |
| B1-454 | (H.4.2) | (A.1.17) |
| B1-455 | (H.4.9) | (A.1.17) |
| B1-456 | (I.1.1) | (A.1.17) |
| B1-457 | (I.2.1) | (A.1.17) |
| B1-458 | (I.2.2) | (A.1.17) |
| B1-459 | (J.1.2) | (A.1.17) |
| B1-460 | (J.1.3) | (A.1.17) |
| B1-461 | (J.1.4) | (A.1.17) |
| B1-462 | (J.1.5) | (A.1.17) |
| B1-463 | (J.1.8) | (A.1.17) |
| B1-464 | (J.1.12) | (A.1.17) |
| B1-465 | (K.1.13) | (A.1.17) |
| B1-466 | (K.1.47) | (A.1.17) |
| B1-467 | (K.1.54) | (A.1.17) |
| B1-468 | (L.1.5) | (A.1.17) |
| B1-469 | (L.1.9) | (A.1.17) |
| B1-470 | (L.1.12) | (A.1.17) |
| B1-471 | (L.1.13) | (A.1.17) |
| B1-472 | (L.1.17) | (A.1.17) |
| B1-473 | (L.1.23) | (A.1.17) |
| B1-474 | (L.1.32), | (A.1.17) |
| B1-475 | (L.1.46) | (A.1.17) |
| B1-476 | (M.1.6) | (A.1.17) |
| B1-477 | (M.1.24) | (A.1.17) |
| B1-478 | (M.1.25) | (A.1.17) |
| B1-479 | (M.1.28) | (A.1.17) |
| B1-480 | (M.1.29) | (A.1.17) |
| B1-481 | (M.1.30) | (A.1.17) |
| B1-482 | (N.7.3) | (A.1.17) |
| B1-483 | (N.7.4) | (A.1.17) |
| B1-484 | (N.7.5) | (A.1.17) |
| B1-485 | (N.13.13) | (A.1.17) |
| B1-486 | (O.2.4), | (A.1.17) |
| B1-487 | (O.4.5) | (A.1.17) |
| B1-488 | (O.4.7) | (A.1.17) |
| B1-489 | (O.4.8) | (A.1.17) |
| B1-490 | (O.5.1) | (A.1.17) |
| B1-491 | (O.26.2) | (A.1.17) |
| B1-492 | (O.27.17) | (A.1.17) |
| B1-493 | (A.1.1) | (A.1.19) |
| B1-494 | (A.1.4) | (A.1.19) |
| B1-495 | (A.1.8) | (A.1.19) |
| B1-496 | (A.1.10) | (A.1.19) |

TABLE B1-continued

| Mixture | Co 2) | Co3) |
|---|---|---|
| B1-497 | (A.1.11) | (A.1.19) |
| B1-498 | (A.1.12) | (A.1.19) |
| B1-499 | (A.1.14) | (A.1.19) |
| B1-500 | (A.1.17) | (A.1.19) |
| B1-501 | (A.1.19) | (A.1.19) |
| B1-502 | (A.1.25) | (A.1.19) |
| B1-503 | (A.1.34) | (A.1.19) |
| B1-504 | (A.1.35) | (A.1.19) |
| B1-505 | (A.1.38) | (A.1.19) |
| B1-506 | (A.2.6) | (A.1.19) |
| B1-507 | (A.3.2) | (A.1.19) |
| B1-508 | (A.3.3) | (A.1.19) |
| B1-509 | (A.3.4) | (A.1.19) |
| B1-510 | (A.3.7) | (A.1.19) |
| B1-511 | (A.3.8) | (A.1.19) |
| B1-512 | (A.3.9) | (A.1.19) |
| B1-513 | (A.3.10) | (A.1.19) |
| B1-514 | (A.3.11) | (A.1.19) |
| B1-515 | (A.3.12) | (A.1.19) |
| B1-516 | (A.3.15) | (A.1.19) |
| B1-517 | (A.3.16) | (A.1.19) |
| B1-518 | (A.3.17) | (A.1.19) |
| B1-519 | (A.3.19) | (A.1.19) |
| B1-520 | (A.3.21) | (A.1.19) |
| B1-521 | (A.3.22) | (A.1.19) |
| B1-522 | (A.3.23) | (A.1.19) |
| B1-523 | (A.3.28) | (A.1.19) |
| B1-524 | (A.3.31) | (A.1.19) |
| B1-525 | (A.4.5) | (A.1.19) |
| B1-526 | (B.1.4) | (A.1.19) |
| B1-527 | (B.1.5) | (A.1.19) |
| B1-528 | (B.1.8) | (A.1.19) |
| B1-529 | (B.1.10) | (A.1.19) |
| B1-530 | (B.1.12) | (A.1.19) |
| B1-531 | (B.1.15) | (A.1.19) |
| B1-532 | (B.1.17) | (A.1.19) |
| B1-533 | (B.1.18) | (A.1.19) |
| B1-534 | (B.1.21) | (A.1.19) |
| B1-535 | (B.1.22) | (A.1.19) |
| B1-536 | (B.1.23) | (A.1.19) |
| B1-537 | (B.1.25) | (A.1.19) |
| B1-538 | (B.1.26) | (A.1.19) |
| B1-539 | (B.1.29) | (A.1.19) |
| B1-540 | (B.1.38) | (A.1.19) |
| B1-541 | (B.1.44) | (A.1.19) |
| B1-542 | (B.1.46) | (A.1.19) |
| B1-543 | (B.2.4) | (A.1.19) |
| B1-544 | (B.3.1) | (A.1.19) |
| B1-545 | (C.1.4) | (A.1.19) |
| B1-546 | (C.1.5) | (A.1.19) |
| B1-547 | (C.2.1) | (A.1.19) |
| B1-548 | (D.1.4) | (A.1.19) |
| B1-549 | (D.1.5) | (A.1.19) |
| B1-550 | (D.2.3) | (A.1.19) |
| B1-551 | (D.2.5) | (A.1.19) |
| B1-552 | (D.2.6) | (A.1.19) |
| B1-553 | (E.1.1) | (A.1.19) |
| B1-554 | (E.1.3) | (A.1.19) |
| B1-555 | (E.2.2) | (A.1.19) |
| B1-556 | (E.2.3), | (A.1.19) |
| B1-557 | (F.1.2) | (A.1.19) |
| B1-558 | (F.1.3) | (A.1.19) |
| B1-559 | (F.1.5) | (A.1.19) |
| B1-560 | (G.1.4) | (A.1.19) |
| B1-561 | (G.3.1) | (A.1.19) |
| B1-562 | (G.5.1) | (A.1.19) |
| B1-563 | (H.1.2) | (A.1.19) |
| B1-564 | (H.1.3) | (A.1.19) |
| B1-565 | (H.1.4) | (A.1.19) |
| B1-566 | (H.1.5) | (A.1.19) |
| B1-567 | (H.1.6) | (A.1.19) |
| B1-568 | (H.1.7) | (A.1.19) |
| B1-569 | (H.2.2) | (A.1.19) |
| B1-570 | (H.2.3) | (A.1.19) |
| B1-571 | (H.2.5) | (A.1.19) |
| B1-572 | (H.2.7) | (A.1.19) |
| B1-573 | (H.3.2) | (A.1.19) |
| B1-574 | (H.3.4) | (A.1.19) |

TABLE B1-continued

| Mixture | Co 2) | Co3) |
|---|---|---|
| B1-575 | (H.3.5) | (A.1.19) |
| B1-576 | (H.3.10) | (A.1.19) |
| B1-577 | (H.4.2) | (A.1.19) |
| B1-578 | (H.4.9) | (A.1.19) |
| B1-579 | (I.1.1) | (A.1.19) |
| B1-580 | (I.2.1) | (A.1.19) |
| B1-581 | (I.2.2) | (A.1.19) |
| B1-582 | (J.1.2) | (A.1.19) |
| B1-583 | (J.1.3) | (A.1.19) |
| B1-584 | (J.1.4) | (A.1.19) |
| B1-585 | (J.1.5) | (A.1.19) |
| B1-586 | (J.1.8) | (A.1.19) |
| B1-587 | (J.1.12) | (A.1.19) |
| B1-588 | (K.1.13) | (A.1.19) |
| B1-589 | (K.1.47) | (A.1.19) |
| B1-590 | (K.1.54) | (A.1.19) |
| B1-591 | (L.1.5) | (A.1.19) |
| B1-592 | (L.1.9) | (A.1.19) |
| B1-593 | (L.1.12) | (A.1.19) |
| B1-594 | (L.1.13) | (A.1.19) |
| B1-595 | (L.1.17) | (A.1.19) |
| B1-596 | (L.1.23) | (A.1.19) |
| B1-597 | (L.1.32), | (A.1.19) |
| B1-598 | (L.1.46) | (A.1.19) |
| B1-599 | (M.1.6) | (A.1.19) |
| B1-600 | (M.1.24) | (A.1.19) |
| B1-601 | (M.1.25) | (A.1.19) |
| B1-602 | (M.1.28) | (A.1.19) |
| B1-603 | (M.1.29) | (A.1.19) |
| B1-604 | (M.1.30) | (A.1.19) |
| B1-605 | (N.7.3) | (A.1.19) |
| B1-606 | (N.7.4) | (A.1.19) |
| B1-607 | (N.7.5) | (A.1.19) |
| B1-608 | (N.13.13) | (A.1.19) |
| B1-609 | (O.2.4), | (A.1.19) |
| B1-610 | (O.4.5) | (A.1.19) |
| B1-611 | (O.4.7) | (A.1.19) |
| B1-612 | (O.4.8) | (A.1.19) |
| B1-613 | (O.5.1) | (A.1.19) |
| B1-614 | (O.26.2) | (A.1.19) |
| B1-615 | (O.27.17) | (A.1.19) |
| B1-616 | (A.1.1) | (A.1.25) |
| B1-617 | (A.1.4) | (A.1.25) |
| B1-618 | (A.1.8) | (A.1.25) |
| B1-619 | (A.1.10) | (A.1.25) |
| B1-620 | (A.1.11) | (A.1.25) |
| B1-621 | (A.1.12) | (A.1.25) |
| B1-622 | (A.1.14) | (A.1.25) |
| B1-623 | (A.1.17) | (A.1.25) |
| B1-624 | (A.1.19) | (A.1.25) |
| B1-625 | (A.1.25) | (A.1.25) |
| B1-626 | (A.1.34) | (A.1.25) |
| B1-627 | (A.1.35) | (A.1.25) |
| B1-628 | (A.1.38) | (A.1.25) |
| B1-629 | (A.2.6) | (A.1.25) |
| B1-630 | (A.3.2) | (A.1.25) |
| B1-631 | (A.3.3) | (A.1.25) |
| B1-632 | (A.3.4) | (A.1.25) |
| B1-633 | (A.3.7) | (A.1.25) |
| B1-634 | (A.3.8) | (A.1.25) |
| B1-635 | (A.3.9) | (A.1.25) |
| B1-636 | (A.3.10) | (A.1.25) |
| B1-637 | (A.3.11) | (A.1.25) |
| B1-638 | (A.3.12) | (A.1.25) |
| B1-639 | (A.3.15) | (A.1.25) |
| B1-640 | (A.3.16) | (A.1.25) |
| B1-641 | (A.3.17) | (A.1.25) |
| B1-642 | (A.3.19) | (A.1.25) |
| B1-643 | (A.3.21) | (A.1.25) |
| B1-644 | (A.3.22) | (A.1.25) |
| B1-645 | (A.3.23) | (A.1.25) |
| B1-646 | (A.3.28) | (A.1.25) |
| B1-647 | (A.3.31) | (A.1.25) |
| B1-648 | (A.4.5) | (A.1.25) |
| B1-649 | (B.1.4) | (A.1.25) |
| B1-650 | (B.1.5) | (A.1.25) |
| B1-651 | (B.1.8) | (A.1.25) |
| B1-652 | (B.1.10) | (A.1.25) |

TABLE B1-continued

| Mixture | Co 2) | Co3) |
|---|---|---|
| B1-653 | (B.1.12) | (A.1.25) |
| B1-654 | (B.1.15) | (A.1.25) |
| B1-655 | (B.1.17) | (A.1.25) |
| B1-656 | (B.1.18) | (A.1.25) |
| B1-657 | (B.1.21) | (A.1.25) |
| B1-658 | (B.1.22) | (A.1.25) |
| B1-659 | (B.1.23) | (A.1.25) |
| B1-660 | (B.1.25) | (A.1.25) |
| B1-661 | (B.1.26) | (A.1.25) |
| B1-662 | (B.1.29) | (A.1.25) |
| B1-663 | (B.1.38) | (A.1.25) |
| B1-664 | (B.1.44) | (A.1.25) |
| B1-665 | (B.1.46) | (A.1.25) |
| B1-666 | (B.2.4) | (A.1.25) |
| B1-667 | (B.3.1) | (A.1.25) |
| B1-668 | (C.1.4) | (A.1.25) |
| B1-669 | (C.1.5) | (A.1.25) |
| B1-670 | (C.2.1) | (A.1.25) |
| B1-671 | (D.1.4) | (A.1.25) |
| B1-672 | (D.1.5) | (A.1.25) |
| B1-673 | (D.2.3) | (A.1.25) |
| B1-674 | (D.2.5) | (A.1.25) |
| B1-675 | (D.2.6) | (A.1.25) |
| B1-676 | (E.1.1) | (A.1.25) |
| B1-677 | (E.1.3) | (A.1.25) |
| B1-678 | (E.2.2) | (A.1.25) |
| B1-679 | (E.2.3), | (A.1.25) |
| B1-680 | (F.1.2) | (A.1.25) |
| B1-681 | (F.1.3) | (A.1.25) |
| B1-682 | (F.1.5) | (A.1.25) |
| B1-683 | (G.1.4) | (A.1.25) |
| B1-684 | (G.3.1) | (A.1.25) |
| B1-685 | (G.5.1) | (A.1.25) |
| B1-686 | (H.1.2) | (A.1.25) |
| B1-687 | (H.1.3) | (A.1.25) |
| B1-688 | (H.1.4) | (A.1.25) |
| B1-689 | (H.1.5) | (A.1.25) |
| B1-690 | (H.1.6) | (A.1.25) |
| B1-691 | (H.1.7) | (A.1.25) |
| B1-692 | (H.2.2) | (A.1.25) |
| B1-693 | (H.2.3) | (A.1.25) |
| B1-694 | (H.2.5) | (A.1.25) |
| B1-695 | (H.2.7) | (A.1.25) |
| B1-696 | (H.3.2) | (A.1.25) |
| B1-697 | (H.3.4) | (A.1.25) |
| B1-698 | (H.3.5) | (A.1.25) |
| B1-699 | (H.3.10) | (A.1.25) |
| B1-700 | (H.4.2) | (A.1.25) |
| B1-701 | (H.4.9) | (A.1.25) |
| B1-702 | (I.1.1) | (A.1.25) |
| B1-703 | (I.2.1) | (A.1.25) |
| B1-704 | (I.2.2) | (A.1.25) |
| B1-705 | (J.1.2) | (A.1.25) |
| B1-706 | (J.1.3) | (A.1.25) |
| B1-707 | (J.1.4) | (A.1.25) |
| B1-708 | (J.1.5) | (A.1.25) |
| B1-709 | (J.1.8) | (A.1.25) |
| B1-710 | (J.1.12) | (A.1.25) |
| B1-711 | (K.1.13) | (A.1.25) |
| B1-712 | (K.1.47) | (A.1.25) |
| B1-713 | (K.1.54) | (A.1.25) |
| B1-714 | (L.1.5) | (A.1.25) |
| B1-715 | (L.1.9) | (A.1.25) |
| B1-716 | (L.1.12) | (A.1.25) |
| B1-717 | (L.1.13) | (A.1.25) |
| B1-718 | (L.1.17) | (A.1.25) |
| B1-719 | (L.1.23) | (A.1.25) |
| B1-720 | (L.1.32), | (A.1.25) |
| B1-721 | (L.1.46) | (A.1.25) |
| B1-722 | (M.1.6) | (A.1.25) |
| B1-723 | (M.1.24) | (A.1.25) |
| B1-724 | (M.1.25) | (A.1.25) |
| B1-725 | (M.1.28) | (A.1.25) |
| B1-726 | (M.1.29) | (A.1.25) |
| B1-727 | (M.1.30) | (A.1.25) |
| B1-728 | (N.7.3) | (A.1.25) |
| B1-729 | (N.7.4) | (A.1.25) |
| B1-730 | (N.7.5) | (A.1.25) |

TABLE B1-continued

| Mixture | Co 2) | Co3) |
|---|---|---|
| B1-731 | (N.13.13) | (A.1.25) |
| B1-732 | (O.2.4), | (A.1.25) |
| B1-733 | (O.4.5) | (A.1.25) |
| B1-734 | (O.4.7) | (A.1.25) |
| B1-735 | (O.4.8) | (A.1.25) |
| B1-736 | (O.5.1) | (A.1.25) |
| B1-737 | (O.26.2) | (A.1.25) |
| B1-738 | (O.27.17) | (A.1.25) |
| B1-739 | (A.1.1) | (A.1.34) |
| B1-740 | (A.1.4) | (A.1.34) |
| B1-741 | (A.1.8) | (A.1.34) |
| B1-742 | (A.1.10) | (A.1.34) |
| B1-743 | (A.1.11) | (A.1.34) |
| B1-744 | (A.1.12) | (A.1.34) |
| B1-745 | (A.1.14) | (A.1.34) |
| B1-746 | (A.1.17) | (A.1.34) |
| B1-747 | (A.1.19) | (A.1.34) |
| B1-748 | (A.1.25) | (A.1.34) |
| B1-749 | (A.1.34) | (A.1.34) |
| B1-750 | (A.1.35) | (A.1.34) |
| B1-751 | (A.1.38) | (A.1.34) |
| B1-752 | (A.2.6) | (A.1.34) |
| B1-753 | (A.3.2) | (A.1.34) |
| B1-754 | (A.3.3) | (A.1.34) |
| B1-755 | (A.3.4) | (A.1.34) |
| B1-756 | (A.3.7) | (A.1.34) |
| B1-757 | (A.3.8) | (A.1.34) |
| B1-758 | (A.3.9) | (A.1.34) |
| B1-759 | (A.3.10) | (A.1.34) |
| B1-760 | (A.3.11) | (A.1.34) |
| B1-761 | (A.3.12) | (A.1.34) |
| B1-762 | (A.3.15) | (A.1.34) |
| B1-763 | (A.3.16) | (A.1.34) |
| B1-764 | (A.3.17) | (A.1.34) |
| B1-765 | (A.3.19) | (A.1.34) |
| B1-766 | (A.3.21) | (A.1.34) |
| B1-767 | (A.3.22) | (A.1.34) |
| B1-768 | (A.3.23) | (A.1.34) |
| B1-769 | (A.3.28) | (A.1.34) |
| B1-770 | (A.3.31) | (A.1.34) |
| B1-771 | (A.4.5) | (A.1.34) |
| B1-772 | (B.1.4) | (A.1.34) |
| B1-773 | (B.1.5) | (A.1.34) |
| B1-774 | (B.1.8) | (A.1.34) |
| B1-775 | (B.1.10) | (A.1.34) |
| B1-776 | (B.1.12) | (A.1.34) |
| B1-777 | (B.1.15) | (A.1.34) |
| B1-778 | (B.1.17) | (A.1.34) |
| B1-779 | (B.1.18) | (A.1.34) |
| B1-780 | (B.1.21) | (A.1.34) |
| B1-781 | (B.1.22) | (A.1.34) |
| B1-782 | (B.1.23) | (A.1.34) |
| B1-783 | (B.1.25) | (A.1.34) |
| B1-784 | (B.1.26) | (A.1.34) |
| B1-785 | (B.1.29) | (A.1.34) |
| B1-786 | (B.1.38) | (A.1.34) |
| B1-787 | (B.1.44) | (A.1.34) |
| B1-788 | (B.1.46) | (A.1.34) |
| B1-789 | (B.2.4) | (A.1.34) |
| B1-790 | (B.3.1) | (A.1.34) |
| B1-791 | (C.1.4) | (A.1.34) |
| B1-792 | (C.1.5) | (A.1.34) |
| B1-793 | (C.2.1) | (A.1.34) |
| B1-794 | (D.1.4) | (A.1.34) |
| B1-795 | (D.1.5) | (A.1.34) |
| B1-796 | (D.2.3) | (A.1.34) |
| B1-797 | (D.2.5) | (A.1.34) |
| B1-798 | (D.2.6) | (A.1.34) |
| B1-799 | (E.1.1) | (A.1.34) |
| B1-800 | (E.1.3) | (A.1.34) |
| B1-801 | (E.2.2) | (A.1.34) |
| B1-802 | (E.2.3), | (A.1.34) |
| B1-803 | (F.1.2) | (A.1.34) |
| B1-804 | (F.1.3) | (A.1.34) |
| B1-805 | (F.1.5) | (A.1.34) |
| B1-806 | (G.1.4) | (A.1.34) |
| B1-807 | (G.3.1) | (A.1.34) |
| B1-808 | (G.5.1) | (A.1.34) |

TABLE B1-continued

| Mixture | Co 2) | Co3) |
|---|---|---|
| B1-809 | (H.1.2) | (A.1.34) |
| B1-810 | (H.1.3) | (A.1.34) |
| B1-811 | (H.1.4) | (A.1.34) |
| B1-812 | (H.1.5) | (A.1.34) |
| B1-813 | (H.1.6) | (A.1.34) |
| B1-814 | (H.1.7) | (A.1.34) |
| B1-815 | (H.2.2) | (A.1.34) |
| B1-816 | (H.2.3) | (A.1.34) |
| B1-817 | (H.2.5) | (A.1.34) |
| B1-818 | (H.2.7) | (A.1.34) |
| B1-819 | (H.3.2) | (A.1.34) |
| B1-820 | (H.3.4) | (A.1.34) |
| B1-821 | (H.3.5) | (A.1.34) |
| B1-822 | (H.3.10) | (A.1.34) |
| B1-823 | (H.4.2) | (A.1.34) |
| B1-824 | (H.4.9) | (A.1.34) |
| B1-825 | (I.1.1) | (A.1.34) |
| B1-826 | (I.2.1) | (A.1.34) |
| B1-827 | (I.2.2) | (A.1.34) |
| B1-828 | (J.1.2) | (A.1.34) |
| B1-829 | (J.1.3) | (A.1.34) |
| B1-830 | (J.1.4) | (A.1.34) |
| B1-831 | (J.1.5) | (A.1.34) |
| B1-832 | (J.1.8) | (A.1.34) |
| B1-833 | (J.1.12) | (A.1.34) |
| B1-834 | (K.1.13) | (A.1.34) |
| B1-835 | (K.1.47) | (A.1.34) |
| B1-836 | (K.1.54) | (A.1.34) |
| B1-837 | (L.1.5) | (A.1.34) |
| B1-838 | (L.1.9) | (A.1.34) |
| B1-839 | (L.1.12) | (A.1.34) |
| B1-840 | (L.1.13) | (A.1.34) |
| B1-841 | (L.1.17) | (A.1.34) |
| B1-842 | (L.1.23) | (A.1.34) |
| B1-843 | (L.1.32), | (A.1.34) |
| B1-844 | (L.1.46) | (A.1.34) |
| B1-845 | (M.1.6) | (A.1.34) |
| B1-846 | (M.1.24) | (A.1.34) |
| B1-847 | (M.1.25) | (A.1.34) |
| B1-848 | (M.1.28) | (A.1.34) |
| B1-849 | (M.1.29) | (A.1.34) |
| B1-850 | (M.1.30) | (A.1.34) |
| B1-851 | (N.7.3) | (A.1.34) |
| B1-852 | (N.7.4) | (A.1.34) |
| B1-853 | (N.7.5) | (A.1.34) |
| B1-854 | (N.13.13) | (A.1.34) |
| B1-855 | (O.2.4), | (A.1.34) |
| B1-856 | (O.4.5) | (A.1.34) |
| B1-857 | (O.4.7) | (A.1.34) |
| B1-858 | (O.4.8) | (A.1.34) |
| B1-859 | (O.5.1) | (A.1.34) |
| B1-860 | (O.26.2) | (A.1.34) |
| B1-861 | (O.27.17) | (A.1.34) |
| B1-862 | (A.1.1) | (A.1.35) |
| B1-863 | (A.1.4) | (A.1.35) |
| B1-864 | (A.1.8) | (A.1.35) |
| B1-865 | (A.1.10) | (A.1.35) |
| B1-866 | (A.1.11) | (A.1.35) |
| B1-867 | (A.1.12) | (A.1.35) |
| B1-868 | (A.1.14) | (A.1.35) |
| B1-869 | (A.1.17) | (A.1.35) |
| B1-870 | (A.1.19) | (A.1.35) |
| B1-871 | (A.1.25) | (A.1.35) |
| B1-872 | (A.1.34) | (A.1.35) |
| B1-873 | (A.1.35) | (A.1.35) |
| B1-874 | (A.1.38) | (A.1.35) |
| B1-875 | (A.2.6) | (A.1.35) |
| B1-876 | (A.3.2) | (A.1.35) |
| B1-877 | (A.3.3) | (A.1.35) |
| B1-878 | (A.3.4) | (A.1.35) |
| B1-879 | (A.3.7) | (A.1.35) |
| B1-880 | (A.3.8) | (A.1.35) |
| B1-881 | (A.3.9) | (A.1.35) |
| B1-882 | (A.3.10) | (A.1.35) |
| B1-883 | (A.3.11) | (A.1.35) |
| B1-884 | (A.3.12) | (A.1.35) |
| B1-885 | (A.3.15) | (A.1.35) |
| B1-886 | (A.3.16) | (A.1.35) |

TABLE B1-continued

| Mixture | Co 2) | Co3) |
|---|---|---|
| B1-887 | (A.3.17) | (A.1.35) |
| B1-888 | (A.3.19) | (A.1.35) |
| B1-889 | (A.3.21) | (A.1.35) |
| B1-890 | (A.3.22) | (A.1.35) |
| B1-891 | (A.3.23) | (A.1.35) |
| B1-892 | (A.3.28) | (A.1.35) |
| B1-893 | (A.3.31) | (A.1.35) |
| B1-894 | (A.4.5) | (A.1.35) |
| B1-895 | (B.1.4) | (A.1.35) |
| B1-896 | (B.1.5) | (A.1.35) |
| B1-897 | (B.1.8) | (A.1.35) |
| B1-898 | (B.1.10) | (A.1.35) |
| B1-899 | (B.1.12) | (A.1.35) |
| B1-900 | (B.1.15) | (A.1.35) |
| B1-901 | (B.1.17) | (A.1.35) |
| B1-902 | (B.1.18) | (A.1.35) |
| B1-903 | (B.1.21) | (A.1.35) |
| B1-904 | (B.1.22) | (A.1.35) |
| B1-905 | (B.1.23) | (A.1.35) |
| B1-906 | (B.1.25) | (A.1.35) |
| B1-907 | (B.1.26) | (A.1.35) |
| B1-908 | (B.1.29) | (A.1.35) |
| B1-909 | (B.1.38) | (A.1.35) |
| B1-910 | (B.1.44) | (A.1.35) |
| B1-911 | (B.1.46) | (A.1.35) |
| B1-912 | (B.2.4) | (A.1.35) |
| B1-913 | (B.3.1) | (A.1.35) |
| B1-914 | (C.1.4) | (A.1.35) |
| B1-915 | (C.1.5) | (A.1.35) |
| B1-916 | (C.2.1) | (A.1.35) |
| B1-917 | (D.1.4) | (A.1.35) |
| B1-918 | (D.1.5) | (A.1.35) |
| B1-919 | (D.2.3) | (A.1.35) |
| B1-920 | (D.2.5) | (A.1.35) |
| B1-921 | (D.2.6) | (A.1.35) |
| B1-922 | (E.1.1) | (A.1.35) |
| B1-923 | (E.1.3) | (A.1.35) |
| B1-924 | (E.2.2) | (A.1.35) |
| B1-925 | (E.2.3), | (A.1.35) |
| B1-926 | (F.1.2) | (A.1.35) |
| B1-927 | (F.1.3) | (A.1.35) |
| B1-928 | (F.1.5) | (A.1.35) |
| B1-929 | (G.1.4) | (A.1.35) |
| B1-930 | (G.3.1) | (A.1.35) |
| B1-931 | (G.5.1) | (A.1.35) |
| B1-932 | (H.1.2) | (A.1.35) |
| B1-933 | (H.1.3) | (A.1.35) |
| B1-934 | (H.1.4) | (A.1.35) |
| B1-935 | (H.1.5) | (A.1.35) |
| B1-936 | (H.1.6) | (A.1.35) |
| B1-937 | (H.1.7) | (A.1.35) |
| B1-938 | (H.2.2) | (A.1.35) |
| B1-939 | (H.2.3) | (A.1.35) |
| B1-940 | (H.2.5) | (A.1.35) |
| B1-941 | (H.2.7) | (A.1.35) |
| B1-942 | (H.3.2) | (A.1.35) |
| B1-943 | (H.3.4) | (A.1.35) |
| B1-944 | (H.3.5) | (A.1.35) |
| B1-945 | (H.3.10) | (A.1.35) |
| B1-946 | (H.4.2) | (A.1.35) |
| B1-947 | (H.4.9) | (A.1.35) |
| B1-948 | (I.1.1) | (A.1.35) |
| B1-949 | (I.2.1) | (A.1.35) |
| B1-950 | (I.2.2) | (A.1.35) |
| B1-951 | (J.1.2) | (A.1.35) |
| B1-952 | (J.1.3) | (A.1.35) |
| B1-953 | (J.1.4) | (A.1.35) |
| B1-954 | (J.1.5) | (A.1.35) |
| B1-955 | (J.1.8) | (A.1.35) |
| B1-956 | (J.1.12) | (A.1.35) |
| B1-957 | (K.1.13) | (A.1.35) |
| B1-958 | (K.1.47) | (A.1.35) |
| B1-959 | (K.1.54) | (A.1.35) |
| B1-960 | (L.1.5) | (A.1.35) |
| B1-961 | (L.1.9) | (A.1.35) |
| B1-962 | (L.1.12) | (A.1.35) |
| B1-963 | (L.1.13) | (A.1.35) |
| B1-964 | (L.1.17) | (A.1.35) |

TABLE B1-continued

| Mixture | Co 2) | Co3) |
|---|---|---|
| B1-965 | (L.1.23) | (A.1.35) |
| B1-966 | (L.1.32), | (A.1.35) |
| B1-967 | (L.1.46) | (A.1.35) |
| B1-968 | (M.1.6) | (A.1.35) |
| B1-969 | (M.1.24) | (A.1.35) |
| B1-970 | (M.1.25) | (A.1.35) |
| B1-971 | (M.1.28) | (A.1.35) |
| B1-972 | (M.1.29) | (A.1.35) |
| B1-973 | (M.1.30) | (A.1.35) |
| B1-974 | (N.7.3) | (A.1.35) |
| B1-975 | (N.7.4) | (A.1.35) |
| B1-976 | (N.7.5) | (A.1.35) |
| B1-977 | (N.13.13) | (A.1.35) |
| B1-978 | (O.2.4), | (A.1.35) |
| B1-979 | (O.4.5) | (A.1.35) |
| B1-980 | (O.4.7) | (A.1.35) |
| B1-981 | (O.4.8) | (A.1.35) |
| B1-982 | (O.5.1) | (A.1.35) |
| B1-983 | (O.26.2) | (A.1.35) |
| B1-984 | (O.27.17) | (A.1.35) |
| B1-985 | (A.1.1) | (A.1.38) |
| B1-986 | (A.1.4) | (A.1.38) |
| B1-987 | (A.1.8) | (A.1.38) |
| B1-988 | (A.1.10) | (A.1.38) |
| B1-989 | (A.1.11) | (A.1.38) |
| B1-990 | (A.1.12) | (A.1.38) |
| B1-991 | (A.1.14) | (A.1.38) |
| B1-992 | (A.1.17) | (A.1.38) |
| B1-993 | (A.1.19) | (A.1.38) |
| B1-994 | (A.1.25) | (A.1.38) |
| B1-995 | (A.1.34) | (A.1.38) |
| B1-996 | (A.1.35) | (A.1.38) |
| B1-997 | (A.1.38) | (A.1.38) |
| B1-998 | (A.2.6) | (A.1.38) |
| B1-999 | (A.3.2) | (A.1.38) |
| B1-1000 | (A.3.3) | (A.1.38) |
| B1-1001 | (A.3.4) | (A.1.38) |
| B1-1002 | (A.3.7) | (A.1.38) |
| B1-1003 | (A.3.8) | (A.1.38) |
| B1-1004 | (A.3.9) | (A.1.38) |
| B1-1005 | (A.3.10) | (A.1.38) |
| B1-1006 | (A.3.11) | (A.1.38) |
| B1-1007 | (A.3.12) | (A.1.38) |
| B1-1008 | (A.3.15) | (A.1.38) |
| B1-1009 | (A.3.16) | (A.1.38) |
| B1-1010 | (A.3.17) | (A.1.38) |
| B1-1011 | (A.3.19) | (A.1.38) |
| B1-1012 | (A.3.21) | (A.1.38) |
| B1-1013 | (A.3.22) | (A.1.38) |
| B1-1014 | (A.3.23) | (A.1.38) |
| B1-1015 | (A.3.28) | (A.1.38) |
| B1-1016 | (A.3.31) | (A.1.38) |
| B1-1017 | (A.4.5) | (A.1.38) |
| B1-1018 | (B.1.4) | (A.1.38) |
| B1-1019 | (B.1.5) | (A.1.38) |
| B1-1020 | (B.1.8) | (A.1.38) |
| B1-1021 | (B.1.10) | (A.1.38) |
| B1-1022 | (B.1.12) | (A.1.38) |
| B1-1023 | (B.1.15) | (A.1.38) |
| B1-1024 | (B.1.17) | (A.1.38) |
| B1-1025 | (B.1.18) | (A.1.38) |
| B1-1026 | (B.1.21) | (A.1.38) |
| B1-1027 | (B.1.22) | (A.1.38) |
| B1-1028 | (B.1.23) | (A.1.38) |
| B1-1029 | (B.1.25) | (A.1.38) |
| B1-1030 | (B.1.26) | (A.1.38) |
| B1-1031 | (B.1.29) | (A.1.38) |
| B1-1032 | (B.1.38) | (A.1.38) |
| B1-1033 | (B.1.44) | (A.1.38) |
| B1-1034 | (B.1.46) | (A.1.38) |
| B1-1035 | (B.2.4) | (A.1.38) |
| B1-1036 | (B.3.1) | (A.1.38) |
| B1-1037 | (C.1.4) | (A.1.38) |
| B1-1038 | (C.1.5) | (A.1.38) |
| B1-1039 | (C.2.1) | (A.1.38) |
| B1-1040 | (D.1.4) | (A.1.38) |
| B1-1041 | (D.1.5) | (A.1.38) |
| B1-1042 | (D.2.3) | (A.1.38) |

TABLE B1-continued

| Mixture | Co 2) | Co3) |
|---|---|---|
| B1-1043 | (D.2.5) | (A.1.38) |
| B1-1044 | (D.2.6) | (A.1.38) |
| B1-1045 | (E.1.1) | (A.1.38) |
| B1-1046 | (E.1.3) | (A.1.38) |
| B1-1047 | (E.2.2) | (A.1.38) |
| B1-1048 | (E.2.3), | (A.1.38) |
| B1-1049 | (F.1.2) | (A.1.38) |
| B1-1050 | (F.1.3) | (A.1.38) |
| B1-1051 | (F.1.5) | (A.1.38) |
| B1-1052 | (G.1.4) | (A.1.38) |
| B1-1053 | (G.3.1) | (A.1.38) |
| B1-1054 | (G.5.1) | (A.1.38) |
| B1-1055 | (H.1.2) | (A.1.38) |
| B1-1056 | (H.1.3) | (A.1.38) |
| B1-1057 | (H.1.4) | (A.1.38) |
| B1-1058 | (H.1.5) | (A.1.38) |
| B1-1059 | (H.1.6) | (A.1.38) |
| B1-1060 | (H.1.7) | (A.1.38) |
| B1-1061 | (H.2.2) | (A.1.38) |
| B1-1062 | (H.2.3) | (A.1.38) |
| B1-1063 | (H.2.5) | (A.1.38) |
| B1-1064 | (H.2.7) | (A.1.38) |
| B1-1065 | (H.3.2) | (A.1.38) |
| B1-1066 | (H.3.4) | (A.1.38) |
| B1-1067 | (H.3.5) | (A.1.38) |
| B1-1068 | (H.3.10) | (A.1.38) |
| B1-1069 | (H.4.2) | (A.1.38) |
| B1-1070 | (H.4.9) | (A.1.38) |
| B1-1071 | (I.1.1) | (A.1.38) |
| B1-1072 | (I.2.1) | (A.1.38) |
| B1-1073 | (I.2.2) | (A.1.38) |
| B1-1074 | (J.1.2) | (A.1.38) |
| B1-1075 | (J.1.3) | (A.1.38) |
| B1-1076 | (J.1.4) | (A.1.38) |
| B1-1077 | (J.1.5) | (A.1.38) |
| B1-1078 | (J.1.8) | (A.1.38) |
| B1-1079 | (J.1.12) | (A.1.38) |
| B1-1080 | (K.1.13) | (A.1.38) |
| B1-1081 | (K.1.47) | (A.1.38) |
| B1-1082 | (K.1.54) | (A.1.38) |
| B1-1083 | (L.1.5) | (A.1.38) |
| B1-1084 | (L.1.9) | (A.1.38) |
| B1-1085 | (L.1.12) | (A.1.38) |
| B1-1086 | (L.1.13) | (A.1.38) |
| B1-1087 | (L.1.17) | (A.1.38) |
| B1-1088 | (L.1.23) | (A.1.38) |
| B1-1089 | (L.1.32), | (A.1.38) |
| B1-1090 | (L.1.46) | (A.1.38) |
| B1-1091 | (M.1.6) | (A.1.38) |
| B1-1092 | (M.1.24) | (A.1.38) |
| B1-1093 | (M.1.25) | (A.1.38) |
| B1-1094 | (M.1.28) | (A.1.38) |
| B1-1095 | (M.1.29) | (A.1.38) |
| B1-1096 | (M.1.30) | (A.1.38) |
| B1-1097 | (N.7.3) | (A.1.38) |
| B1-1098 | (N.7.4) | (A.1.38) |
| B1-1099 | (N.7.5) | (A.1.38) |
| B1-1100 | (N.13.13) | (A.1.38) |
| B1-1101 | (O.2.4), | (A.1.38) |
| B1-1102 | (O.4.5) | (A.1.38) |
| B1-1103 | (O.4.7) | (A.1.38) |
| B1-1104 | (O.4.8) | (A.1.38) |
| B1-1105 | (O.5.1) | (A.1.38) |
| B1-1106 | (O.26.2) | (A.1.38) |
| B1-1107 | (O.27.17) | (A.1.38) |
| B1-1108 | (A.1.1) | (A.2.6) |
| B1-1109 | (A.1.4) | (A.2.6) |
| B1-1110 | (A.1.8) | (A.2.6) |
| B1-1111 | (A.1.10) | (A.2.6) |
| B1-1112 | (A.1.11) | (A.2.6) |
| B1-1113 | (A.1.12) | (A.2.6) |
| B1-1114 | (A.1.14) | (A.2.6) |
| B1-1115 | (A.1.17) | (A.2.6) |
| B1-1116 | (A.1.19) | (A.2.6) |
| B1-1117 | (A.1.25) | (A.2.6) |
| B1-1118 | (A.1.34) | (A.2.6) |
| B1-1119 | (A.1.35) | (A.2.6) |
| B1-1120 | (A.1.38) | (A.2.6) |

TABLE B1-continued

| Mixture | Co 2) | Co3) |
|---|---|---|
| B1-1121 | (A.2.6) | (A.2.6) |
| B1-1122 | (A.3.2) | (A.2.6) |
| B1-1123 | (A.3.3) | (A.2.6) |
| B1-1124 | (A.3.4) | (A.2.6) |
| B1-1125 | (A.3.7) | (A.2.6) |
| B1-1126 | (A.3.8) | (A.2.6) |
| B1-1127 | (A.3.9) | (A.2.6) |
| B1-1128 | (A.3.10) | (A.2.6) |
| B1-1129 | (A.3.11) | (A.2.6) |
| B1-1130 | (A.3.12) | (A.2.6) |
| B1-1131 | (A.3.15) | (A.2.6) |
| B1-1132 | (A.3.16) | (A.2.6) |
| B1-1133 | (A.3.17) | (A.2.6) |
| B1-1134 | (A.3.19) | (A.2.6) |
| B1-1135 | (A.3.21) | (A.2.6) |
| B1-1136 | (A.3.22) | (A.2.6) |
| B1-1137 | (A.3.23) | (A.2.6) |
| B1-1138 | (A.3.28) | (A.2.6) |
| B1-1139 | (A.3.31) | (A.2.6) |
| B1-1140 | (A.4.5) | (A.2.6) |
| B1-1141 | (B.1.4) | (A.2.6) |
| B1-1142 | (B.1.5) | (A.2.6) |
| B1-1143 | (B.1.8) | (A.2.6) |
| B1-1144 | (B.1.10) | (A.2.6) |
| B1-1145 | (B.1.12) | (A.2.6) |
| B1-1146 | (B.1.15) | (A.2.6) |
| B1-1147 | (B.1.17) | (A.2.6) |
| B1-1148 | (B.1.18) | (A.2.6) |
| B1-1149 | (B.1.21) | (A.2.6) |
| B1-1150 | (B.1.22) | (A.2.6) |
| B1-1151 | (B.1.23) | (A.2.6) |
| B1-1152 | (B.1.25) | (A.2.6) |
| B1-1153 | (B.1.26) | (A.2.6) |
| B1-1154 | (B.1.29) | (A.2.6) |
| B1-1155 | (B.1.38) | (A.2.6) |
| B1-1156 | (B.1.44) | (A.2.6) |
| B1-1157 | (B.1.46) | (A.2.6) |
| B1-1158 | (B.2.4) | (A.2.6) |
| B1-1159 | (B.3.1) | (A.2.6) |
| B1-1160 | (C.1.4) | (A.2.6) |
| B1-1161 | (C.1.5) | (A.2.6) |
| B1-1162 | (C.2.1) | (A.2.6) |
| B1-1163 | (D.1.4) | (A.2.6) |
| B1-1164 | (D.1.5) | (A.2.6) |
| B1-1165 | (D.2.3) | (A.2.6) |
| B1-1166 | (D.2.5) | (A.2.6) |
| B1-1167 | (D.2.6) | (A.2.6) |
| B1-1168 | (E.1.1) | (A.2.6) |
| B1-1169 | (E.1.3) | (A.2.6) |
| B1-1170 | (E.2.2) | (A.2.6) |
| B1-1171 | (E.2.3), | (A.2.6) |
| B1-1172 | (F.1.2) | (A.2.6) |
| B1-1173 | (F.1.3) | (A.2.6) |
| B1-1174 | (F.1.5) | (A.2.6) |
| B1-1175 | (G.1.4) | (A.2.6) |
| B1-1176 | (G.3.1) | (A.2.6) |
| B1-1177 | (G.5.1) | (A.2.6) |
| B1-1178 | (H.1.2) | (A.2.6) |
| B1-1179 | (H.1.3) | (A.2.6) |
| B1-1180 | (H.1.4) | (A.2.6) |
| B1-1181 | (H.1.5) | (A.2.6) |
| B1-1182 | (H.1.6) | (A.2.6) |
| B1-1183 | (H.1.7) | (A.2.6) |
| B1-1184 | (H.2.2) | (A.2.6) |
| B1-1185 | (H.2.3) | (A.2.6) |
| B1-1186 | (H.2.5) | (A.2.6) |
| B1-1187 | (H.2.7) | (A.2.6) |
| B1-1188 | (H.3.2) | (A.2.6) |
| B1-1189 | (H.3.4) | (A.2.6) |
| B1-1190 | (H.3.5) | (A.2.6) |
| B1-1191 | (H.3.10) | (A.2.6) |
| B1-1192 | (H.4.2) | (A.2.6) |
| B1-1193 | (H.4.9) | (A.2.6) |
| B1-1194 | (I.1.1) | (A.2.6) |
| B1-1195 | (I.2.1) | (A.2.6) |
| B1-1196 | (I.2.2) | (A.2.6) |
| B1-1197 | (J.1.2) | (A.2.6) |
| B1-1198 | (J.1.3) | (A.2.6) |
| B1-1199 | (J.1.4) | (A.2.6) |
| B1-1200 | (J.1.5) | (A.2.6) |
| B1-1201 | (J.1.8) | (A.2.6) |
| B1-1202 | (J.1.12) | (A.2.6) |
| B1-1203 | (K.1.13) | (A.2.6) |
| B1-1204 | (K.1.47) | (A.2.6) |
| B1-1205 | (K.1.54) | (A.2.6) |
| B1-1206 | (L.1.5) | (A.2.6) |
| B1-1207 | (L.1.9) | (A.2.6) |
| B1-1208 | (L.1.12) | (A.2.6) |
| B1-1209 | (L.1.13) | (A.2.6) |
| B1-1210 | (L.1.17) | (A.2.6) |
| B1-1211 | (L.1.23) | (A.2.6) |
| B1-1212 | (L.1.32), | (A.2.6) |
| B1-1213 | (L.1.46) | (A.2.6) |
| B1-1214 | (M.1.6) | (A.2.6) |
| B1-1215 | (M.1.24) | (A.2.6) |
| B1-1216 | (M.1.25) | (A.2.6) |
| B1-1217 | (M.1.28) | (A.2.6) |
| B1-1218 | (M.1.29) | (A.2.6) |
| B1-1219 | (M.1.30) | (A.2.6) |
| B1-1220 | (N.7.3) | (A.2.6) |
| B1-1221 | (N.7.4) | (A.2.6) |
| B1-1222 | (N.7.5) | (A.2.6) |
| B1-1223 | (N.13.13) | (A.2.6) |
| B1-1224 | (O.2.4), | (A.2.6) |
| B1-1225 | (O.4.5) | (A.2.6) |
| B1-1226 | (O.4.7) | (A.2.6) |
| B1-1227 | (O.4.8) | (A.2.6) |
| B1-1228 | (O.5.1) | (A.2.6) |
| B1-1229 | (O.26.2) | (A.2.6) |
| B1-1230 | (O.27.17) | (A.2.6) |
| B1-1231 | (A.1.1) | (A.3.4) |
| B1-1232 | (A.1.4) | (A.3.4) |
| B1-1233 | (A.1.8) | (A.3.4) |
| B1-1234 | (A.1.10) | (A.3.4) |
| B1-1235 | (A.1.11) | (A.3.4) |
| B1-1236 | (A.1.12) | (A.3.4) |
| B1-1237 | (A.1.14) | (A.3.4) |
| B1-1238 | (A.1.17) | (A.3.4) |
| B1-1239 | (A.1.19) | (A.3.4) |
| B1-1240 | (A.1.25) | (A.3.4) |
| B1-1241 | (A.1.34) | (A.3.4) |
| B1-1242 | (A.1.35) | (A.3.4) |
| B1-1243 | (A.1.38) | (A.3.4) |
| B1-1244 | (A.2.6) | (A.3.4) |
| B1-1245 | (A.3.2) | (A.3.4) |
| B1-1246 | (A.3.3) | (A.3.4) |
| B1-1247 | (A.3.4) | (A.3.4) |
| B1-1248 | (A.3.7) | (A.3.4) |
| B1-1249 | (A.3.8) | (A.3.4) |
| B1-1250 | (A.3.9) | (A.3.4) |
| B1-1251 | (A.3.10) | (A.3.4) |
| B1-1252 | (A.3.11) | (A.3.4) |
| B1-1253 | (A.3.12) | (A.3.4) |
| B1-1254 | (A.3.15) | (A.3.4) |
| B1-1255 | (A.3.16) | (A.3.4) |
| B1-1256 | (A.3.17) | (A.3.4) |
| B1-1257 | (A.3.19) | (A.3.4) |
| B1-1258 | (A.3.21) | (A.3.4) |
| B1-1259 | (A.3.22) | (A.3.4) |
| B1-1260 | (A.3.23) | (A.3.4) |
| B1-1261 | (A.3.28) | (A.3.4) |
| B1-1262 | (A.3.31) | (A.3.4) |
| B1-1263 | (A.4.5) | (A.3.4) |
| B1-1264 | (B.1.4) | (A.3.4) |
| B1-1265 | (B.1.5) | (A.3.4) |
| B1-1266 | (B.1.8) | (A.3.4) |
| B1-1267 | (B.1.10) | (A.3.4) |
| B1-1268 | (B.1.12) | (A.3.4) |
| B1-1269 | (B.1.15) | (A.3.4) |
| B1-1270 | (B.1.17) | (A.3.4) |
| B1-1271 | (B.1.18) | (A.3.4) |
| B1-1272 | (B.1.21) | (A.3.4) |
| B1-1273 | (B.1.22) | (A.3.4) |
| B1-1274 | (B.1.23) | (A.3.4) |
| B1-1275 | (B.1.25) | (A.3.4) |
| B1-1276 | (B.1.26) | (A.3.4) |

TABLE B1-continued

| Mixture | Co 2) | Co3) |
|---|---|---|
| B1-1277 | (B.1.29) | (A.3.4) |
| B1-1278 | (B.1.38) | (A.3.4) |
| B1-1279 | (B.1.44) | (A.3.4) |
| B1-1280 | (B.1.46) | (A.3.4) |
| B1-1281 | (B.2.4) | (A.3.4) |
| B1-1282 | (B.3.1) | (A.3.4) |
| B1-1283 | (C.1.4) | (A.3.4) |
| B1-1284 | (C.1.5) | (A.3.4) |
| B1-1285 | (C.2.1) | (A.3.4) |
| B1-1286 | (D.1.4) | (A.3.4) |
| B1-1287 | (D.1.5) | (A.3.4) |
| B1-1288 | (D.2.3) | (A.3.4) |
| B1-1289 | (D.2.5) | (A.3.4) |
| B1-1290 | (D.2.6) | (A.3.4) |
| B1-1291 | (E.1.1) | (A.3.4) |
| B1-1292 | (E.1.3) | (A.3.4) |
| B1-1293 | (E.2.2) | (A.3.4) |
| B1-1294 | (E.2.3), | (A.3.4) |
| B1-1295 | (F.1.2) | (A.3.4) |
| B1-1296 | (F.1.3) | (A.3.4) |
| B1-1297 | (F.1.5) | (A.3.4) |
| B1-1298 | (G.1.4) | (A.3.4) |
| B1-1299 | (G.3.1) | (A.3.4) |
| B1-1300 | (G.5.1) | (A.3.4) |
| B1-1301 | (H.1.2) | (A.3.4) |
| B1-1302 | (H.1.3) | (A.3.4) |
| B1-1303 | (H.1.4) | (A.3.4) |
| B1-1304 | (H.1.5) | (A.3.4) |
| B1-1305 | (H.1.6) | (A.3.4) |
| B1-1306 | (H.1.7) | (A.3.4) |
| B1-1307 | (H.2.2) | (A.3.4) |
| B1-1308 | (H.2.3) | (A.3.4) |
| B1-1309 | (H.2.5) | (A.3.4) |
| B1-1310 | (H.2.7) | (A.3.4) |
| B1-1311 | (H.3.2) | (A.3.4) |
| B1-1312 | (H.3.4) | (A.3.4) |
| B1-1313 | (H.3.5) | (A.3.4) |
| B1-1314 | (H.3.10) | (A.3.4) |
| B1-1315 | (H.4.2) | (A.3.4) |
| B1-1316 | (H.4.9) | (A.3.4) |
| B1-1317 | (I.1.1) | (A.3.4) |
| B1-1318 | (I.2.1) | (A.3.4) |
| B1-1319 | (I.2.2) | (A.3.4) |
| B1-1320 | (J.1.2) | (A.3.4) |
| B1-1321 | (J.1.3) | (A.3.4) |
| B1-1322 | (J.1.4) | (A.3.4) |
| B1-1323 | (J.1.5) | (A.3.4) |
| B1-1324 | (J.1.8) | (A.3.4) |
| B1-1325 | (J.1.12) | (A.3.4) |
| B1-1326 | (K.1.13) | (A.3.4) |
| B1-1327 | (K.1.47) | (A.3.4) |
| B1-1328 | (K.1.54) | (A.3.4) |
| B1-1329 | (L.1.5) | (A.3.4) |
| B1-1330 | (L.1.9) | (A.3.4) |
| B1-1331 | (L.1.12) | (A.3.4) |
| B1-1332 | (L.1.13) | (A.3.4) |
| B1-1333 | (L.1.17) | (A.3.4) |
| B1-1334 | (L.1.23) | (A.3.4) |
| B1-1335 | (L.1.32), | (A.3.4) |
| B1-1336 | (L.1.46) | (A.3.4) |
| B1-1337 | (M.1.6) | (A.3.4) |
| B1-1338 | (M.1.24) | (A.3.4) |
| B1-1339 | (M.1.25) | (A.3.4) |
| B1-1340 | (M.1.28) | (A.3.4) |
| B1-1341 | (M.1.29) | (A.3.4) |
| B1-1342 | (M.1.30) | (A.3.4) |
| B1-1343 | (N.7.3) | (A.3.4) |
| B1-1344 | (N.7.4) | (A.3.4) |
| B1-1345 | (N.7.5) | (A.3.4) |
| B1-1346 | (N.13.13) | (A.3.4) |
| B1-1347 | (O.2.4), | (A.3.4) |
| B1-1348 | (O.4.5) | (A.3.4) |
| B1-1349 | (O.4.7) | (A.3.4) |
| B1-1350 | (O.4.8) | (A.3.4) |
| B1-1351 | (O.5.1) | (A.3.4) |
| B1-1352 | (O.26.2) | (A.3.4) |
| B1-1353 | (O.27.17) | (A.3.4) |
| B1-1354 | (A.1.1) | (A.3.7) |

TABLE B1-continued

| Mixture | Co 2) | Co3) |
|---|---|---|
| B1-1355 | (A.1.4) | (A.3.7) |
| B1-1356 | (A.1.8) | (A.3.7) |
| B1-1357 | (A.1.10) | (A.3.7) |
| B1-1358 | (A.1.11) | (A.3.7) |
| B1-1359 | (A.1.12) | (A.3.7) |
| B1-1360 | (A.1.14) | (A.3.7) |
| B1-1361 | (A.1.17) | (A.3.7) |
| B1-1362 | (A.1.19) | (A.3.7) |
| B1-1363 | (A.1.25) | (A.3.7) |
| B1-1364 | (A.1.34) | (A.3.7) |
| B1-1365 | (A.1.35) | (A.3.7) |
| B1-1366 | (A.1.38) | (A.3.7) |
| B1-1367 | (A.2.6) | (A.3.7) |
| B1-1368 | (A.3.2) | (A.3.7) |
| B1-1369 | (A.3.3) | (A.3.7) |
| B1-1370 | (A.3.4) | (A.3.7) |
| B1-1371 | (A.3.7) | (A.3.7) |
| B1-1372 | (A.3.8) | (A.3.7) |
| B1-1373 | (A.3.9) | (A.3.7) |
| B1-1374 | (A.3.10) | (A.3.7) |
| B1-1375 | (A.3.11) | (A.3.7) |
| B1-1376 | (A.3.12) | (A.3.7) |
| B1-1377 | (A.3.15) | (A.3.7) |
| B1-1378 | (A.3.16) | (A.3.7) |
| B1-1379 | (A.3.17) | (A.3.7) |
| B1-1380 | (A.3.19) | (A.3.7) |
| B1-1381 | (A.3.21) | (A.3.7) |
| B1-1382 | (A.3.22) | (A.3.7) |
| B1-1383 | (A.3.23) | (A.3.7) |
| B1-1384 | (A.3.28) | (A.3.7) |
| B1-1385 | (A.3.31) | (A.3.7) |
| B1-1386 | (A.4.5) | (A.3.7) |
| B1-1387 | (B.1.4) | (A.3.7) |
| B1-1388 | (B.1.5) | (A.3.7) |
| B1-1389 | (B.1.8) | (A.3.7) |
| B1-1390 | (B.1.10) | (A.3.7) |
| B1-1391 | (B.1.12) | (A.3.7) |
| B1-1392 | (B.1.15) | (A.3.7) |
| B1-1393 | (B.1.17) | (A.3.7) |
| B1-1394 | (B.1.18) | (A.3.7) |
| B1-1395 | (B.1.21) | (A.3.7) |
| B1-1396 | (B.1.22) | (A.3.7) |
| B1-1397 | (B.1.23) | (A.3.7) |
| B1-1398 | (B.1.25) | (A.3.7) |
| B1-1399 | (B.1.26) | (A.3.7) |
| B1-1400 | (B.1.29) | (A.3.7) |
| B1-1401 | (B.1.38) | (A.3.7) |
| B1-1402 | (B.1.44) | (A.3.7) |
| B1-1403 | (B.1.46) | (A.3.7) |
| B1-1404 | (B.2.4) | (A.3.7) |
| B1-1405 | (B.3.1) | (A.3.7) |
| B1-1406 | (C.1.4) | (A.3.7) |
| B1-1407 | (C.1.5) | (A.3.7) |
| B1-1408 | (C.2.1) | (A.3.7) |
| B1-1409 | (D.1.4) | (A.3.7) |
| B1-1410 | (D.1.5) | (A.3.7) |
| B1-1411 | (D.2.3) | (A.3.7) |
| B1-1412 | (D.2.5) | (A.3.7) |
| B1-1413 | (D.2.6) | (A.3.7) |
| B1-1414 | (E.1.1) | (A.3.7) |
| B1-1415 | (E.1.3) | (A.3.7) |
| B1-1416 | (E.2.2) | (A.3.7) |
| B1-1417 | (E.2.3), | (A.3.7) |
| B1-1418 | (F.1.2) | (A.3.7) |
| B1-1419 | (F.1.3) | (A.3.7) |
| B1-1420 | (F.1.5) | (A.3.7) |
| B1-1421 | (G.1.4) | (A.3.7) |
| B1-1422 | (G.3.1) | (A.3.7) |
| B1-1423 | (G.5.1) | (A.3.7) |
| B1-1424 | (H.1.2) | (A.3.7) |
| B1-1425 | (H.1.3) | (A.3.7) |
| B1-1426 | (H.1.4) | (A.3.7) |
| B1-1427 | (H.1.5) | (A.3.7) |
| B1-1428 | (H.1.6) | (A.3.7) |
| B1-1429 | (H.1.7) | (A.3.7) |
| B1-1430 | (H.2.2) | (A.3.7) |
| B1-1431 | (H.2.3) | (A.3.7) |
| B1-1432 | (H.2.5) | (A.3.7) |

TABLE B1-continued

| Mixture | Co 2) | Co3) |
|---|---|---|
| B1-1433 | (H.2.7) | (A.3.7) |
| B1-1434 | (H.3.2) | (A.3.7) |
| B1-1435 | (H.3.4) | (A.3.7) |
| B1-1436 | (H.3.5) | (A.3.7) |
| B1-1437 | (H.3.10) | (A.3.7) |
| B1-1438 | (H.4.2) | (A.3.7) |
| B1-1439 | (H.4.9) | (A.3.7) |
| B1-1440 | (I.1.1) | (A.3.7) |
| B1-1441 | (I.2.1) | (A.3.7) |
| B1-1442 | (I.2.2) | (A.3.7) |
| B1-1443 | (J.1.2) | (A.3.7) |
| B1-1444 | (J.1.3) | (A.3.7) |
| B1-1445 | (J.1.4) | (A.3.7) |
| B1-1446 | (J.1.5) | (A.3.7) |
| B1-1447 | (J.1.8) | (A.3.7) |
| B1-1448 | (J.1.12) | (A.3.7) |
| B1-1449 | (K.1.13) | (A.3.7) |
| B1-1450 | (K.1.47) | (A.3.7) |
| B1-1451 | (K.1.54) | (A.3.7) |
| B1-1452 | (L.1.5) | (A.3.7) |
| B1-1453 | (L.1.9) | (A.3.7) |
| B1-1454 | (L.1.12) | (A.3.7) |
| B1-1455 | (L.1.13) | (A.3.7) |
| B1-1456 | (L.1.17) | (A.3.7) |
| B1-1457 | (L.1.23) | (A.3.7) |
| B1-1458 | (L.1.32), | (A.3.7) |
| B1-1459 | (L.1.46) | (A.3.7) |
| B1-1460 | (M.1.6) | (A.3.7) |
| B1-1461 | (M.1.24) | (A.3.7) |
| B1-1462 | (M.1.25) | (A.3.7) |
| B1-1463 | (M.1.28) | (A.3.7) |
| B1-1464 | (M.1.29) | (A.3.7) |
| B1-1465 | (M.1.30) | (A.3.7) |
| B1-1466 | (N.7.3) | (A.3.7) |
| B1-1467 | (N.7.4) | (A.3.7) |
| B1-1468 | (N.7.5) | (A.3.7) |
| B1-1469 | (N.13.13) | (A.3.7) |
| B1-1470 | (O.2.4), | (A.3.7) |
| B1-1471 | (O.4.5) | (A.3.7) |
| B1-1472 | (O.4.7) | (A.3.7) |
| B1-1473 | (O.4.8) | (A.3.7) |
| B1-1474 | (O.5.1) | (A.3.7) |
| B1-1475 | (O.26.2) | (A.3.7) |
| B1-1476 | (O.27.17) | (A.3.7) |
| B1-1477 | (A.1.1) | (A.3.9) |
| B1-1478 | (A.1.4) | (A.3.9) |
| B1-1479 | (A.1.8) | (A.3.9) |
| B1-1480 | (A.1.10) | (A.3.9) |
| B1-1481 | (A.1.11) | (A.3.9) |
| B1-1482 | (A.1.12) | (A.3.9) |
| B1-1483 | (A.1.14) | (A.3.9) |
| B1-1484 | (A.1.17) | (A.3.9) |
| B1-1485 | (A.1.19) | (A.3.9) |
| B1-1486 | (A.1.25) | (A.3.9) |
| B1-1487 | (A.1.34) | (A.3.9) |
| B1-1488 | (A.1.35) | (A.3.9) |
| B1-1489 | (A.1.38) | (A.3.9) |
| B1-1490 | (A.2.6) | (A.3.9) |
| B1-1491 | (A.3.2) | (A.3.9) |
| B1-1492 | (A.3.3) | (A.3.9) |
| B1-1493 | (A.3.4) | (A.3.9) |
| B1-1494 | (A.3.7) | (A.3.9) |
| B1-1495 | (A.3.8) | (A.3.9) |
| B1-1496 | (A.3.9) | (A.3.9) |
| B1-1497 | (A.3.10) | (A.3.9) |
| B1-1498 | (A.3.11) | (A.3.9) |
| B1-1499 | (A.3.12) | (A.3.9) |
| B1-1500 | (A.3.15) | (A.3.9) |
| B1-1501 | (A.3.16) | (A.3.9) |
| B1-1502 | (A.3.17) | (A.3.9) |
| B1-1503 | (A.3.19) | (A.3.9) |
| B1-1504 | (A.3.21) | (A.3.9) |
| B1-1505 | (A.3.22) | (A.3.9) |
| B1-1506 | (A.3.23) | (A.3.9) |
| B1-1507 | (A.3.28) | (A.3.9) |
| B1-1508 | (A.3.31) | (A.3.9) |
| B1-1509 | (A.4.5) | (A.3.9) |
| B1-1510 | (B.1.4) | (A.3.9) |

TABLE B1-continued

| Mixture | Co 2) | Co3) |
|---|---|---|
| B1-1511 | (B.1.5) | (A.3.9) |
| B1-1512 | (B.1.8) | (A.3.9) |
| B1-1513 | (B.1.10) | (A.3.9) |
| B1-1514 | (B.1.12) | (A.3.9) |
| B1-1515 | (B.1.15) | (A.3.9) |
| B1-1516 | (B.1.17) | (A.3.9) |
| B1-1517 | (B.1.18) | (A.3.9) |
| B1-1518 | (B.1.21) | (A.3.9) |
| B1-1519 | (B.1.22) | (A.3.9) |
| B1-1520 | (B.1.23) | (A.3.9) |
| B1-1521 | (B.1.25) | (A.3.9) |
| B1-1522 | (B.1.26) | (A.3.9) |
| B1-1523 | (B.1.29) | (A.3.9) |
| B1-1524 | (B.1.38) | (A.3.9) |
| B1-1525 | (B.1.44) | (A.3.9) |
| B1-1526 | (B.1.46) | (A.3.9) |
| B1-1527 | (B.2.4) | (A.3.9) |
| B1-1528 | (B.3.1) | (A.3.9) |
| B1-1529 | (C.1.4) | (A.3.9) |
| B1-1530 | (C.1.5) | (A.3.9) |
| B1-1531 | (C.2.1) | (A.3.9) |
| B1-1532 | (D.1.4) | (A.3.9) |
| B1-1533 | (D.1.5) | (A.3.9) |
| B1-1534 | (D.2.3) | (A.3.9) |
| B1-1535 | (D.2.5) | (A.3.9) |
| B1-1536 | (D.2.6) | (A.3.9) |
| B1-1537 | (E.1.1) | (A.3.9) |
| B1-1538 | (E.1.3) | (A.3.9) |
| B1-1539 | (E.2.2) | (A.3.9) |
| B1-1540 | (E.2.3), | (A.3.9) |
| B1-1541 | (F.1.2) | (A.3.9) |
| B1-1542 | (F.1.3) | (A.3.9) |
| B1-1543 | (F.1.5) | (A.3.9) |
| B1-1544 | (G.1.4) | (A.3.9) |
| B1-1545 | (G.3.1) | (A.3.9) |
| B1-1546 | (G.5.1) | (A.3.9) |
| B1-1547 | (H.1.2) | (A.3.9) |
| B1-1548 | (H.1.3) | (A.3.9) |
| B1-1549 | (H.1.4) | (A.3.9) |
| B1-1550 | (H.1.5) | (A.3.9) |
| B1-1551 | (H.1.6) | (A.3.9) |
| B1-1552 | (H.1.7) | (A.3.9) |
| B1-1553 | (H.2.2) | (A.3.9) |
| B1-1554 | (H.2.3) | (A.3.9) |
| B1-1555 | (H.2.5) | (A.3.9) |
| B1-1556 | (H.2.7) | (A.3.9) |
| B1-1557 | (H.3.2) | (A.3.9) |
| B1-1558 | (H.3.4) | (A.3.9) |
| B1-1559 | (H.3.5) | (A.3.9) |
| B1-1560 | (H.3.10) | (A.3.9) |
| B1-1561 | (H.4.2) | (A.3.9) |
| B1-1562 | (H.4.9) | (A.3.9) |
| B1-1563 | (I.1.1) | (A.3.9) |
| B1-1564 | (I.2.1) | (A.3.9) |
| B1-1565 | (I.2.2) | (A.3.9) |
| B1-1566 | (J.1.2) | (A.3.9) |
| B1-1567 | (J.1.3) | (A.3.9) |
| B1-1568 | (J.1.4) | (A.3.9) |
| B1-1569 | (J.1.5) | (A.3.9) |
| B1-1570 | (J.1.8) | (A.3.9) |
| B1-1571 | (J.1.12) | (A.3.9) |
| B1-1572 | (K.1.13) | (A.3.9) |
| B1-1573 | (K.1.47) | (A.3.9) |
| B1-1574 | (K.1.54) | (A.3.9) |
| B1-1575 | (L.1.5) | (A.3.9) |
| B1-1576 | (L.1.9) | (A.3.9) |
| B1-1577 | (L.1.12) | (A.3.9) |
| B1-1578 | (L.1.13) | (A.3.9) |
| B1-1579 | (L.1.17) | (A.3.9) |
| B1-1580 | (L.1.23) | (A.3.9) |
| B1-1581 | (L.1.32), | (A.3.9) |
| B1-1582 | (L.1.46) | (A.3.9) |
| B1-1583 | (M.1.6) | (A.3.9) |
| B1-1584 | (M.1.24) | (A.3.9) |
| B1-1585 | (M.1.25) | (A.3.9) |
| B1-1586 | (M.1.28) | (A.3.9) |
| B1-1587 | (M.1.29) | (A.3.9) |
| B1-1588 | (M.1.30) | (A.3.9) |

TABLE B1-continued

| Mixture | Co 2) | Co3) |
|---|---|---|
| B1-1589 | (N.7.3) | (A.3.9) |
| B1-1590 | (N.7.4) | (A.3.9) |
| B1-1591 | (N.7.5) | (A.3.9) |
| B1-1592 | (N.13.13) | (A.3.9) |
| B1-1593 | (O.2.4), | (A.3.9) |
| B1-1594 | (O.4.5) | (A.3.9) |
| B1-1595 | (O.4.7) | (A.3.9) |
| B1-1596 | (O.4.8) | (A.3.9) |
| B1-1597 | (O.5.1) | (A.3.9) |
| B1-1598 | (O.26.2) | (A.3.9) |
| B1-1599 | (O.27.17) | (A.3.9) |
| B1-1600 | (A.1.1) | (A.3.10) |
| B1-1601 | (A.1.4) | (A.3.10) |
| B1-1602 | (A.1.8) | (A.3.10) |
| B1-1603 | (A.1.10) | (A.3.10) |
| B1-1604 | (A.1.11) | (A.3.10) |
| B1-1605 | (A.1.12) | (A.3.10) |
| B1-1606 | (A.1.14) | (A.3.10) |
| B1-1607 | (A.1.17) | (A.3.10) |
| B1-1608 | (A.1.19) | (A.3.10) |
| B1-1609 | (A.1.25) | (A.3.10) |
| B1-1610 | (A.1.34) | (A.3.10) |
| B1-1611 | (A.1.35) | (A.3.10) |
| B1-1612 | (A.1.38) | (A.3.10) |
| B1-1613 | (A.2.6) | (A.3.10) |
| B1-1614 | (A.3.2) | (A.3.10) |
| B1-1615 | (A.3.3) | (A.3.10) |
| B1-1616 | (A.3.4) | (A.3.10) |
| B1-1617 | (A.3.7) | (A.3.10) |
| B1-1618 | (A.3.8) | (A.3.10) |
| B1-1619 | (A.3.9) | (A.3.10) |
| B1-1620 | (A.3.10) | (A.3.10) |
| B1-1621 | (A.3.11) | (A.3.10) |
| B1-1622 | (A.3.12) | (A.3.10) |
| B1-1623 | (A.3.15) | (A.3.10) |
| B1-1624 | (A.3.16) | (A.3.10) |
| B1-1625 | (A.3.17) | (A.3.10) |
| B1-1626 | (A.3.19) | (A.3.10) |
| B1-1627 | (A.3.21) | (A.3.10) |
| B1-1628 | (A.3.22) | (A.3.10) |
| B1-1629 | (A.3.23) | (A.3.10) |
| B1-1630 | (A.3.28) | (A.3.10) |
| B1-1631 | (A.3.31) | (A.3.10) |
| B1-1632 | (A.4.5) | (A.3.10) |
| B1-1633 | (B.1.4) | (A.3.10) |
| B1-1634 | (B.1.5) | (A.3.10) |
| B1-1635 | (B.1.8) | (A.3.10) |
| B1-1636 | (B.1.10) | (A.3.10) |
| B1-1637 | (B.1.12) | (A.3.10) |
| B1-1638 | (B.1.15) | (A.3.10) |
| B1-1639 | (B.1.17) | (A.3.10) |
| B1-1640 | (B.1.18) | (A.3.10) |
| B1-1641 | (B.1.21) | (A.3.10) |
| B1-1642 | (B.1.22) | (A.3.10) |
| B1-1643 | (B.1.23) | (A.3.10) |
| B1-1644 | (B.1.25) | (A.3.10) |
| B1-1645 | (B.1.26) | (A.3.10) |
| B1-1646 | (B.1.29) | (A.3.10) |
| B1-1647 | (B.1.38) | (A.3.10) |
| B1-1648 | (B.1.44) | (A.3.10) |
| B1-1649 | (B.1.46) | (A.3.10) |
| B1-1650 | (B.2.4) | (A.3.10) |
| B1-1651 | (B.3.1) | (A.3.10) |
| B1-1652 | (C.1.4) | (A.3.10) |
| B1-1653 | (C.1.5) | (A.3.10) |
| B1-1654 | (C.2.1) | (A.3.10) |
| B1-1655 | (D.1.4) | (A.3.10) |
| B1-1656 | (D.1.5) | (A.3.10) |
| B1-1657 | (D.2.3) | (A.3.10) |
| B1-1658 | (D.2.5) | (A.3.10) |
| B1-1659 | (D.2.6) | (A.3.10) |
| B1-1660 | (E.1.1) | (A.3.10) |
| B1-1661 | (E.1.3) | (A.3.10) |
| B1-1662 | (E.2.2) | (A.3.10) |
| B1-1663 | (E.2.3), | (A.3.10) |
| B1-1664 | (F.1.2) | (A.3.10) |
| B1-1665 | (F.1.3) | (A.3.10) |
| B1-1666 | (F.1.5) | (A.3.10) |

TABLE B1-continued

| Mixture | Co 2) | Co3) |
|---|---|---|
| B1-1667 | (G.1.4) | (A.3.10) |
| B1-1668 | (G.3.1) | (A.3.10) |
| B1-1669 | (G.5.1) | (A.3.10) |
| B1-1670 | (H.1.2) | (A.3.10) |
| B1-1671 | (H.1.3) | (A.3.10) |
| B1-1672 | (H.1.4) | (A.3.10) |
| B1-1673 | (H.1.5) | (A.3.10) |
| B1-1674 | (H.1.6) | (A.3.10) |
| B1-1675 | (H.1.7) | (A.3.10) |
| B1-1676 | (H.2.2) | (A.3.10) |
| B1-1677 | (H.2.3) | (A.3.10) |
| B1-1678 | (H.2.5) | (A.3.10) |
| B1-1679 | (H.2.7) | (A.3.10) |
| B1-1680 | (H.3.2) | (A.3.10) |
| B1-1681 | (H.3.4) | (A.3.10) |
| B1-1682 | (H.3.5) | (A.3.10) |
| B1-1683 | (H.3.10) | (A.3.10) |
| B1-1684 | (H.4.2) | (A.3.10) |
| B1-1685 | (H.4.9) | (A.3.10) |
| B1-1686 | (I.1.1) | (A.3.10) |
| B1-1687 | (I.2.1) | (A.3.10) |
| B1-1688 | (I.2.2) | (A.3.10) |
| B1-1689 | (J.1.2) | (A.3.10) |
| B1-1690 | (J.1.3) | (A.3.10) |
| B1-1691 | (J.1.4) | (A.3.10) |
| B1-1692 | (J.1.5) | (A.3.10) |
| B1-1693 | (J.1.8) | (A.3.10) |
| B1-1694 | (J.1.12) | (A.3.10) |
| B1-1695 | (K.1.13) | (A.3.10) |
| B1-1696 | (K.1.47) | (A.3.10) |
| B1-1697 | (K.1.54) | (A.3.10) |
| B1-1698 | (L.1.5) | (A.3.10) |
| B1-1699 | (L.1.9) | (A.3.10) |
| B1-1700 | (L.1.12) | (A.3.10) |
| B1-1701 | (L.1.13) | (A.3.10) |
| B1-1702 | (L.1.17) | (A.3.10) |
| B1-1703 | (L.1.23) | (A.3.10) |
| B1-1704 | (L.1.32), | (A.3.10) |
| B1-1705 | (L.1.46) | (A.3.10) |
| B1-1706 | (M.1.6) | (A.3.10) |
| B1-1707 | (M.1.24) | (A.3.10) |
| B1-1708 | (M.1.25) | (A.3.10) |
| B1-1709 | (M.1.28) | (A.3.10) |
| B1-1710 | (M.1.29) | (A.3.10) |
| B1-1711 | (M.1.30) | (A.3.10) |
| B1-1712 | (N.7.3) | (A.3.10) |
| B1-1713 | (N.7.4) | (A.3.10) |
| B1-1714 | (N.7.5) | (A.3.10) |
| B1-1715 | (N.13.13) | (A.3.10) |
| B1-1716 | (O.2.4), | (A.3.10) |
| B1-1717 | (O.4.5) | (A.3.10) |
| B1-1718 | (O.4.7) | (A.3.10) |
| B1-1719 | (O.4.8) | (A.3.10) |
| B1-1720 | (O.5.1) | (A.3.10) |
| B1-1721 | (O.26.2) | (A.3.10) |
| B1-1722 | (O.27.17) | (A.3.10) |
| B1-1723 | (A.1.1) | (A.3.16) |
| B1-1724 | (A.1.4) | (A.3.16) |
| B1-1725 | (A.1.8) | (A.3.16) |
| B1-1726 | (A.1.10) | (A.3.16) |
| B1-1727 | (A.1.11) | (A.3.16) |
| B1-1728 | (A.1.12) | (A.3.16) |
| B1-1729 | (A.1.14) | (A.3.16) |
| B1-1730 | (A.1.17) | (A.3.16) |
| B1-1731 | (A.1.19) | (A.3.16) |
| B1-1732 | (A.1.25) | (A.3.16) |
| B1-1733 | (A.1.34) | (A.3.16) |
| B1-1734 | (A.1.35) | (A.3.16) |
| B1-1735 | (A.1.38) | (A.3.16) |
| B1-1736 | (A.2.6) | (A.3.16) |
| B1-1737 | (A.3.2) | (A.3.16) |
| B1-1738 | (A.3.3) | (A.3.16) |
| B1-1739 | (A.3.4) | (A.3.16) |
| B1-1740 | (A.3.7) | (A.3.16) |
| B1-1741 | (A.3.8) | (A.3.16) |
| B1-1742 | (A.3.9) | (A.3.16) |
| B1-1743 | (A.3.10) | (A.3.16) |
| B1-1744 | (A.3.11) | (A.3.16) |

TABLE B1-continued

| Mixture | Co 2) | Co3) |
|---|---|---|
| B1-1745 | (A.3.12) | (A.3.16) |
| B1-1746 | (A.3.15) | (A.3.16) |
| B1-1747 | (A.3.16) | (A.3.16) |
| B1-1748 | (A.3.17) | (A.3.16) |
| B1-1749 | (A.3.19) | (A.3.16) |
| B1-1750 | (A.3.21) | (A.3.16) |
| B1-1751 | (A.3.22) | (A.3.16) |
| B1-1752 | (A.3.23) | (A.3.16) |
| B1-1753 | (A.3.28) | (A.3.16) |
| B1-1754 | (A.3.31) | (A.3.16) |
| B1-1755 | (A.4.5) | (A.3.16) |
| B1-1756 | (B.1.4) | (A.3.16) |
| B1-1757 | (B.1.5) | (A.3.16) |
| B1-1758 | (B.1.8) | (A.3.16) |
| B1-1759 | (B.1.10) | (A.3.16) |
| B1-1760 | (B.1.12) | (A.3.16) |
| B1-1761 | (B.1.15) | (A.3.16) |
| B1-1762 | (B.1.17) | (A.3.16) |
| B1-1763 | (B.1.18) | (A.3.16) |
| B1-1764 | (B.1.21) | (A.3.16) |
| B1-1765 | (B.1.22) | (A.3.16) |
| B1-1766 | (B.1.23) | (A.3.16) |
| B1-1767 | (B.1.25) | (A.3.16) |
| B1-1768 | (B.1.26) | (A.3.16) |
| B1-1769 | (B.1.29) | (A.3.16) |
| B1-1770 | (B.1.38) | (A.3.16) |
| B1-1771 | (B.1.44) | (A.3.16) |
| B1-1772 | (B.1.46) | (A.3.16) |
| B1-1773 | (B.2.4) | (A.3.16) |
| B1-1774 | (B.3.1) | (A.3.16) |
| B1-1775 | (C.1.4) | (A.3.16) |
| B1-1776 | (C.1.5) | (A.3.16) |
| B1-1777 | (C.2.1) | (A.3.16) |
| B1-1778 | (D.1.4) | (A.3.16) |
| B1-1779 | (D.1.5) | (A.3.16) |
| B1-1780 | (D.2.3) | (A.3.16) |
| B1-1781 | (D.2.5) | (A.3.16) |
| B1-1782 | (D.2.6) | (A.3.16) |
| B1-1783 | (E.1.1) | (A.3.16) |
| B1-1784 | (E.1.3) | (A.3.16) |
| B1-1785 | (E.2.2) | (A.3.16) |
| B1-1786 | (E.2.3), | (A.3.16) |
| B1-1787 | (F.1.2) | (A.3.16) |
| B1-1788 | (F.1.3) | (A.3.16) |
| B1-1789 | (F.1.5) | (A.3.16) |
| B1-1790 | (G.1.4) | (A.3.16) |
| B1-1791 | (G.3.1) | (A.3.16) |
| B1-1792 | (G.5.1) | (A.3.16) |
| B1-1793 | (H.1.2) | (A.3.16) |
| B1-1794 | (H.1.3) | (A.3.16) |
| B1-1795 | (H.1.4) | (A.3.16) |
| B1-1796 | (H.1.5) | (A.3.16) |
| B1-1797 | (H.1.6) | (A.3.16) |
| B1-1798 | (H.1.7) | (A.3.16) |
| B1-1799 | (H.2.2) | (A.3.16) |
| B1-1800 | (H.2.3) | (A.3.16) |
| B1-1801 | (H.2.5) | (A.3.16) |
| B1-1802 | (H.2.7) | (A.3.16) |
| B1-1803 | (H.3.2) | (A.3.16) |
| B1-1804 | (H.3.4) | (A.3.16) |
| B1-1805 | (H.3.5) | (A.3.16) |
| B1-1806 | (H.3.10) | (A.3.16) |
| B1-1807 | (H.4.2) | (A.3.16) |
| B1-1808 | (H.4.9) | (A.3.16) |
| B1-1809 | (I.1.1) | (A.3.16) |
| B1-1810 | (I.2.1) | (A.3.16) |
| B1-1811 | (I.2.2) | (A.3.16) |
| B1-1812 | (J.1.2) | (A.3.16) |
| B1-1813 | (J.1.3) | (A.3.16) |
| B1-1814 | (J.1.4) | (A.3.16) |
| B1-1815 | (J.1.5) | (A.3.16) |
| B1-1816 | (J.1.8) | (A.3.16) |
| B1-1817 | (J.1.12) | (A.3.16) |
| B1-1818 | (K.1.13) | (A.3.16) |
| B1-1819 | (K.1.47) | (A.3.16) |
| B1-1820 | (K.1.54) | (A.3.16) |
| B1-1821 | (L.1.5) | (A.3.16) |
| B1-1822 | (L.1.9) | (A.3.16) |

TABLE B1-continued

| Mixture | Co 2) | Co3) |
|---|---|---|
| B1-1823 | (L.1.12) | (A.3.16) |
| B1-1824 | (L.1.13) | (A.3.16) |
| B1-1825 | (L.1.17) | (A.3.16) |
| B1-1826 | (L.1.23) | (A.3.16) |
| B1-1827 | (L.1.32), | (A.3.16) |
| B1-1828 | (L.1.46) | (A.3.16) |
| B1-1829 | (M.1.6) | (A.3.16) |
| B1-1830 | (M.1.24) | (A.3.16) |
| B1-1831 | (M.1.25) | (A.3.16) |
| B1-1832 | (M.1.28) | (A.3.16) |
| B1-1833 | (M.1.29) | (A.3.16) |
| B1-1834 | (M.1.30) | (A.3.16) |
| B1-1835 | (N.7.3) | (A.3.16) |
| B1-1836 | (N.7.4) | (A.3.16) |
| B1-1837 | (N.7.5) | (A.3.16) |
| B1-1838 | (N.13.13) | (A.3.16) |
| B1-1839 | (O.2.4), | (A.3.16) |
| B1-1840 | (O.4.5) | (A.3.16) |
| B1-1841 | (O.4.7) | (A.3.16) |
| B1-1842 | (O.4.8) | (A.3.16) |
| B1-1843 | (O.5.1) | (A.3.16) |
| B1-1844 | (O.26.2) | (A.3.16) |
| B1-1845 | (O.27.17) | (A.3.16) |
| B1-1846 | (A.1.1) | (A.3.17) |
| B1-1847 | (A.1.4) | (A.3.17) |
| B1-1848 | (A.1.8) | (A.3.17) |
| B1-1849 | (A.1.10) | (A.3.17) |
| B1-1850 | (A.1.11) | (A.3.17) |
| B1-1851 | (A.1.12) | (A.3.17) |
| B1-1852 | (A.1.14) | (A.3.17) |
| B1-1853 | (A.1.17) | (A.3.17) |
| B1-1854 | (A.1.19) | (A.3.17) |
| B1-1855 | (A.1.25) | (A.3.17) |
| B1-1856 | (A.1.34) | (A.3.17) |
| B1-1857 | (A.1.35) | (A.3.17) |
| B1-1858 | (A.1.38) | (A.3.17) |
| B1-1859 | (A.2.6) | (A.3.17) |
| B1-1860 | (A.3.2) | (A.3.17) |
| B1-1861 | (A.3.3) | (A.3.17) |
| B1-1862 | (A.3.4) | (A.3.17) |
| B1-1863 | (A.3.7) | (A.3.17) |
| B1-1864 | (A.3.8) | (A.3.17) |
| B1-1865 | (A.3.9) | (A.3.17) |
| B1-1866 | (A.3.10) | (A.3.17) |
| B1-1867 | (A.3.11) | (A.3.17) |
| B1-1868 | (A.3.12) | (A.3.17) |
| B1-1869 | (A.3.15) | (A.3.17) |
| B1-1870 | (A.3.16) | (A.3.17) |
| B1-1871 | (A.3.17) | (A.3.17) |
| B1-1872 | (A.3.19) | (A.3.17) |
| B1-1873 | (A.3.21) | (A.3.17) |
| B1-1874 | (A.3.22) | (A.3.17) |
| B1-1875 | (A.3.23) | (A.3.17) |
| B1-1876 | (A.3.28) | (A.3.17) |
| B1-1877 | (A.3.31) | (A.3.17) |
| B1-1878 | (A.4.5) | (A.3.17) |
| B1-1879 | (B.1.4) | (A.3.17) |
| B1-1880 | (B.1.5) | (A.3.17) |
| B1-1881 | (B.1.8) | (A.3.17) |
| B1-1882 | (B.1.10) | (A.3.17) |
| B1-1883 | (B.1.12) | (A.3.17) |
| B1-1884 | (B.1.15) | (A.3.17) |
| B1-1885 | (B.1.17) | (A.3.17) |
| B1-1886 | (B.1.18) | (A.3.17) |
| B1-1887 | (B.1.21) | (A.3.17) |
| B1-1888 | (B.1.22) | (A.3.17) |
| B1-1889 | (B.1.23) | (A.3.17) |
| B1-1890 | (B.1.25) | (A.3.17) |
| B1-1891 | (B.1.26) | (A.3.17) |
| B1-1892 | (B.1.29) | (A.3.17) |
| B1-1893 | (B.1.38) | (A.3.17) |
| B1-1894 | (B.1.44) | (A.3.17) |
| B1-1895 | (B.1.46) | (A.3.17) |
| B1-1896 | (B.2.4) | (A.3.17) |
| B1-1897 | (B.3.1) | (A.3.17) |
| B1-1898 | (C.1.4) | (A.3.17) |
| B1-1899 | (C.1.5) | (A.3.17) |
| B1-1900 | (C.2.1) | (A.3.17) |

TABLE B1-continued

| Mixture | Co 2) | Co3) |
|---|---|---|
| B1-1901 | (D.1.4) | (A.3.17) |
| B1-1902 | (D.1.5) | (A.3.17) |
| B1-1903 | (D.2.3) | (A.3.17) |
| B1-1904 | (D.2.5) | (A.3.17) |
| B1-1905 | (D.2.6) | (A.3.17) |
| B1-1906 | (E.1.1) | (A.3.17) |
| B1-1907 | (E.1.3) | (A.3.17) |
| B1-1908 | (E.2.2) | (A.3.17) |
| B1-1909 | (E.2.3), | (A.3.17) |
| B1-1910 | (F.1.2) | (A.3.17) |
| B1-1911 | (F.1.3) | (A.3.17) |
| B1-1912 | (F.1.5) | (A.3.17) |
| B1-1913 | (G.1.4) | (A.3.17) |
| B1-1914 | (G.3.1) | (A.3.17) |
| B1-1915 | (G.5.1) | (A.3.17) |
| B1-1916 | (H.1.2) | (A.3.17) |
| B1-1917 | (H.1.3) | (A.3.17) |
| B1-1918 | (H.1.4) | (A.3.17) |
| B1-1919 | (H.1.5) | (A.3.17) |
| B1-1920 | (H.1.6) | (A.3.17) |
| B1-1921 | (H.1.7) | (A.3.17) |
| B1-1922 | (H.2.2) | (A.3.17) |
| B1-1923 | (H.2.3) | (A.3.17) |
| B1-1924 | (H.2.5) | (A.3.17) |
| B1-1925 | (H.2.7) | (A.3.17) |
| B1-1926 | (H.3.2) | (A.3.17) |
| B1-1927 | (H.3.4) | (A.3.17) |
| B1-1928 | (H.3.5) | (A.3.17) |
| B1-1929 | (H.3.10) | (A.3.17) |
| B1-1930 | (H.4.2) | (A.3.17) |
| B1-1931 | (H.4.9) | (A.3.17) |
| B1-1932 | (I.1.1) | (A.3.17) |
| B1-1933 | (I.2.1) | (A.3.17) |
| B1-1934 | (I.2.2) | (A.3.17) |
| B1-1935 | (J.1.2) | (A.3.17) |
| B1-1936 | (J.1.3) | (A.3.17) |
| B1-1937 | (J.1.4) | (A.3.17) |
| B1-1938 | (J.1.5) | (A.3.17) |
| B1-1939 | (J.1.8) | (A.3.17) |
| B1-1940 | (J.1.12) | (A.3.17) |
| B1-1941 | (K.1.13) | (A.3.17) |
| B1-1942 | (K.1.47) | (A.3.17) |
| B1-1943 | (K.1.54) | (A.3.17) |
| B1-1944 | (L.1.5) | (A.3.17) |
| B1-1945 | (L.1.9) | (A.3.17) |
| B1-1946 | (L.1.12) | (A.3.17) |
| B1-1947 | (L.1.13) | (A.3.17) |
| B1-1948 | (L.1.17) | (A.3.17) |
| B1-1949 | (L.1.23) | (A.3.17) |
| B1-1950 | (L.1.32), | (A.3.17) |
| B1-1951 | (L.1.46) | (A.3.17) |
| B1-1952 | (M.1.6) | (A.3.17) |
| B1-1953 | (M.1.24) | (A.3.17) |
| B1-1954 | (M.1.25) | (A.3.17) |
| B1-1955 | (M.1.28) | (A.3.17) |
| B1-1956 | (M.1.29) | (A.3.17) |
| B1-1957 | (M.1.30) | (A.3.17) |
| B1-1958 | (N.7.3) | (A.3.17) |
| B1-1959 | (N.7.4) | (A.3.17) |
| B1-1960 | (N.7.5) | (A.3.17) |
| B1-1961 | (N.13.13) | (A.3.17) |
| B1-1962 | (O.2.4), | (A.3.17) |
| B1-1963 | (O.4.5) | (A.3.17) |
| B1-1964 | (O.4.7) | (A.3.17) |
| B1-1965 | (O.4.8) | (A.3.17) |
| B1-1966 | (O.5.1) | (A.3.17) |
| B1-1967 | (O.26.2) | (A.3.17) |
| B1-1968 | (O.27.17) | (A.3.17) |
| B1-1969 | (A.1.1) | (A.3.22) |
| B1-1970 | (A.1.4) | (A.3.22) |
| B1-1971 | (A.1.8) | (A.3.22) |
| B1-1972 | (A.1.10) | (A.3.22) |
| B1-1973 | (A.1.11) | (A.3.22) |
| B1-1974 | (A.1.12) | (A.3.22) |
| B1-1975 | (A.1.14) | (A.3.22) |
| B1-1976 | (A.1.17) | (A.3.22) |
| B1-1977 | (A.1.19) | (A.3.22) |
| B1-1978 | (A.1.25) | (A.3.22) |

TABLE B1-continued

| Mixture | Co 2) | Co3) |
|---|---|---|
| B1-1979 | (A.1.34) | (A.3.22) |
| B1-1980 | (A.1.35) | (A.3.22) |
| B1-1981 | (A.1.38) | (A.3.22) |
| B1-1982 | (A.2.6) | (A.3.22) |
| B1-1983 | (A.3.2) | (A.3.22) |
| B1-1984 | (A.3.3) | (A.3.22) |
| B1-1985 | (A.3.4) | (A.3.22) |
| B1-1986 | (A.3.7) | (A.3.22) |
| B1-1987 | (A.3.8) | (A.3.22) |
| B1-1988 | (A.3.9) | (A.3.22) |
| B1-1989 | (A.3.10) | (A.3.22) |
| B1-1990 | (A.3.11) | (A.3.22) |
| B1-1991 | (A.3.12) | (A.3.22) |
| B1-1992 | (A.3.15) | (A.3.22) |
| B1-1993 | (A.3.16) | (A.3.22) |
| B1-1994 | (A.3.17) | (A.3.22) |
| B1-1995 | (A.3.19) | (A.3.22) |
| B1-1996 | (A.3.21) | (A.3.22) |
| B1-1997 | (A.3.22) | (A.3.22) |
| B1-1998 | (A.3.23) | (A.3.22) |
| B1-1999 | (A.3.28) | (A.3.22) |
| B1-2000 | (A.3.31) | (A.3.22) |
| B1-2001 | (A.4.5) | (A.3.22) |
| B1-2002 | (B.1.4) | (A.3.22) |
| B1-2003 | (B.1.5) | (A.3.22) |
| B1-2004 | (B.1.8) | (A.3.22) |
| B1-2005 | (B.1.10) | (A.3.22) |
| B1-2006 | (B.1.12) | (A.3.22) |
| B1-2007 | (B.1.15) | (A.3.22) |
| B1-2008 | (B.1.17) | (A.3.22) |
| B1-2009 | (B.1.18) | (A.3.22) |
| B1-2010 | (B.1.21) | (A.3.22) |
| B1-2011 | (B.1.22) | (A.3.22) |
| B1-2012 | (B.1.23) | (A.3.22) |
| B1-2013 | (B.1.25) | (A.3.22) |
| B1-2014 | (B.1.26) | (A.3.22) |
| B1-2015 | (B.1.29) | (A.3.22) |
| B1-2016 | (B.1.38) | (A.3.22) |
| B1-2017 | (B.1.44) | (A.3.22) |
| B1-2018 | (B.1.46) | (A.3.22) |
| B1-2019 | (B.2.4) | (A.3.22) |
| B1-2020 | (B.3.1) | (A.3.22) |
| B1-2021 | (C.1.4) | (A.3.22) |
| B1-2022 | (C.1.5) | (A.3.22) |
| B1-2023 | (C.2.1) | (A.3.22) |
| B1-2024 | (D.1.4) | (A.3.22) |
| B1-2025 | (D.1.5) | (A.3.22) |
| B1-2026 | (D.2.3) | (A.3.22) |
| B1-2027 | (D.2.5) | (A.3.22) |
| B1-2028 | (D.2.6) | (A.3.22) |
| B1-2029 | (E.1.1) | (A.3.22) |
| B1-2030 | (E.1.3) | (A.3.22) |
| B1-2031 | (E.2.2) | (A.3.22) |
| B1-2032 | (E.2.3), | (A.3.22) |
| B1-2033 | (F.1.2) | (A.3.22) |
| B1-2034 | (F.1.3) | (A.3.22) |
| B1-2035 | (F.1.5) | (A.3.22) |
| B1-2036 | (G.1.4) | (A.3.22) |
| B1-2037 | (G.3.1) | (A.3.22) |
| B1-2038 | (G.5.1) | (A.3.22) |
| B1-2039 | (H.1.2) | (A.3.22) |
| B1-2040 | (H.1.3) | (A.3.22) |
| B1-2041 | (H.1.4) | (A.3.22) |
| B1-2042 | (H.1.5) | (A.3.22) |
| B1-2043 | (H.1.6) | (A.3.22) |
| B1-2044 | (H.1.7) | (A.3.22) |
| B1-2045 | (H.2.2) | (A.3.22) |
| B1-2046 | (H.2.3) | (A.3.22) |
| B1-2047 | (H.2.5) | (A.3.22) |
| B1-2048 | (H.2.7) | (A.3.22) |
| B1-2049 | (H.3.2) | (A.3.22) |
| B1-2050 | (H.3.4) | (A.3.22) |
| B1-2051 | (H.3.5) | (A.3.22) |
| B1-2052 | (H.3.10) | (A.3.22) |
| B1-2053 | (H.4.2) | (A.3.22) |
| B1-2054 | (H.4.9) | (A.3.22) |
| B1-2055 | (I.1.1) | (A.3.22) |
| B1-2056 | (I.2.1) | (A.3.22) |

TABLE B1-continued

| Mixture | Co 2) | Co3) |
|---|---|---|
| B1-2057 | (I.2.2) | (A.3.22) |
| B1-2058 | (J.1.2) | (A.3.22) |
| B1-2059 | (J.1.3) | (A.3.22) |
| B1-2060 | (J.1.4) | (A.3.22) |
| B1-2061 | (J.1.5) | (A.3.22) |
| B1-2062 | (J.1.8) | (A.3.22) |
| B1-2063 | (J.1.12) | (A.3.22) |
| B1-2064 | (K.1.13) | (A.3.22) |
| B1-2065 | (K.1.47) | (A.3.22) |
| B1-2066 | (K.1.54) | (A.3.22) |
| B1-2067 | (L.1.5) | (A.3.22) |
| B1-2068 | (L.1.9) | (A.3.22) |
| B1-2069 | (L.1.12) | (A.3.22) |
| B1-2070 | (L.1.13) | (A.3.22) |
| B1-2071 | (L.1.17) | (A.3.22) |
| B1-2072 | (L.1.23) | (A.3.22) |
| B1-2073 | (L.1.32), | (A.3.22) |
| B1-2074 | (L.1.46) | (A.3.22) |
| B1-2075 | (M.1.6) | (A.3.22) |
| B1-2076 | (M.1.24) | (A.3.22) |
| B1-2077 | (M.1.25) | (A.3.22) |
| B1-2078 | (M.1.28) | (A.3.22) |
| B1-2079 | (M.1.29) | (A.3.22) |
| B1-2080 | (M.1.30) | (A.3.22) |
| B1-2081 | (N.7.3) | (A.3.22) |
| B1-2082 | (N.7.4) | (A.3.22) |
| B1-2083 | (N.7.5) | (A.3.22) |
| B1-2084 | (N.13.13) | (A.3.22) |
| B1-2085 | (O.2.4), | (A.3.22) |
| B1-2086 | (O.4.5) | (A.3.22) |
| B1-2087 | (O.4.7) | (A.3.22) |
| B1-2088 | (O.4.8) | (A.3.22) |
| B1-2089 | (O.5.1) | (A.3.22) |
| B1-2090 | (O.26.2) | (A.3.22) |
| B1-2091 | (O.27.17) | (A.3.22) |
| B1-2092 | (A.1.1) | (A.3.23) |
| B1-2093 | (A.1.4) | (A.3.23) |
| B1-2094 | (A.1.8) | (A.3.23) |
| B1-2095 | (A.1.10) | (A.3.23) |
| B1-2096 | (A.1.11) | (A.3.23) |
| B1-2097 | (A.1.12) | (A.3.23) |
| B1-2098 | (A.1.14) | (A.3.23) |
| B1-2099 | (A.1.17) | (A.3.23) |
| B1-2100 | (A.1.19) | (A.3.23) |
| B1-2101 | (A.1.25) | (A.3.23) |
| B1-2102 | (A.1.34) | (A.3.23) |
| B1-2103 | (A.1.35) | (A.3.23) |
| B1-2104 | (A.1.38) | (A.3.23) |
| B1-2105 | (A.2.6) | (A.3.23) |
| B1-2106 | (A.3.2) | (A.3.23) |
| B1-2107 | (A.3.3) | (A.3.23) |
| B1-2108 | (A.3.4) | (A.3.23) |
| B1-2109 | (A.3.7) | (A.3.23) |
| B1-2110 | (A.3.8) | (A.3.23) |
| B1-2111 | (A.3.9) | (A.3.23) |
| B1-2112 | (A.3.10) | (A.3.23) |
| B1-2113 | (A.3.11) | (A.3.23) |
| B1-2114 | (A.3.12) | (A.3.23) |
| B1-2115 | (A.3.15) | (A.3.23) |
| B1-2116 | (A.3.16) | (A.3.23) |
| B1-2117 | (A.3.17) | (A.3.23) |
| B1-2118 | (A.3.19) | (A.3.23) |
| B1-2119 | (A.3.21) | (A.3.23) |
| B1-2120 | (A.3.22) | (A.3.23) |
| B1-2121 | (A.3.23) | (A.3.23) |
| B1-2122 | (A.3.28) | (A.3.23) |
| B1-2123 | (A.3.31) | (A.3.23) |
| B1-2124 | (A.4.5) | (A.3.23) |
| B1-2125 | (B.1.4) | (A.3.23) |
| B1-2126 | (B.1.5) | (A.3.23) |
| B1-2127 | (B.1.8) | (A.3.23) |
| B1-2128 | (B.1.10) | (A.3.23) |
| B1-2129 | (B.1.12) | (A.3.23) |
| B1-2130 | (B.1.15) | (A.3.23) |
| B1-2131 | (B.1.17) | (A.3.23) |
| B1-2132 | (B.1.18) | (A.3.23) |
| B1-2133 | (B.1.21) | (A.3.23) |
| B1-2134 | (B.1.22) | (A.3.23) |

TABLE B1-continued

| Mixture | Co 2) | Co3) |
|---|---|---|
| B1-2135 | (B.1.23) | (A.3.23) |
| B1-2136 | (B.1.25) | (A.3.23) |
| B1-2137 | (B.1.26) | (A.3.23) |
| B1-2138 | (B.1.29) | (A.3.23) |
| B1-2139 | (B.1.38) | (A.3.23) |
| B1-2140 | (B.1.44) | (A.3.23) |
| B1-2141 | (B.1.46) | (A.3.23) |
| B1-2142 | (B.2.4) | (A.3.23) |
| B1-2143 | (B.3.1) | (A.3.23) |
| B1-2144 | (C.1.4) | (A.3.23) |
| B1-2145 | (C.1.5) | (A.3.23) |
| B1-2146 | (C.2.1) | (A.3.23) |
| B1-2147 | (D.1.4) | (A.3.23) |
| B1-2148 | (D.1.5) | (A.3.23) |
| B1-2149 | (D.2.3) | (A.3.23) |
| B1-2150 | (D.2.5) | (A.3.23) |
| B1-2151 | (D.2.6) | (A.3.23) |
| B1-2152 | (E.1.1) | (A.3.23) |
| B1-2153 | (E.1.3) | (A.3.23) |
| B1-2154 | (E.2.2) | (A.3.23) |
| B1-2155 | (E.2.3), | (A.3.23) |
| B1-2156 | (F.1.2) | (A.3.23) |
| B1-2157 | (F.1.3) | (A.3.23) |
| B1-2158 | (F.1.5) | (A.3.23) |
| B1-2159 | (G.1.4) | (A.3.23) |
| B1-2160 | (G.3.1) | (A.3.23) |
| B1-2161 | (G.5.1) | (A.3.23) |
| B1-2162 | (H.1.2) | (A.3.23) |
| B1-2163 | (H.1.3) | (A.3.23) |
| B1-2164 | (H.1.4) | (A.3.23) |
| B1-2165 | (H.1.5) | (A.3.23) |
| B1-2166 | (H.1.6) | (A.3.23) |
| B1-2167 | (H.1.7) | (A.3.23) |
| B1-2168 | (H.2.2) | (A.3.23) |
| B1-2169 | (H.2.3) | (A.3.23) |
| B1-2170 | (H.2.5) | (A.3.23) |
| B1-2171 | (H.2.7) | (A.3.23) |
| B1-2172 | (H.3.2) | (A.3.23) |
| B1-2173 | (H.3.4) | (A.3.23) |
| B1-2174 | (H.3.5) | (A.3.23) |
| B1-2175 | (H.3.10) | (A.3.23) |
| B1-2176 | (H.4.2) | (A.3.23) |
| B1-2177 | (H.4.9) | (A.3.23) |
| B1-2178 | (I.1.1) | (A.3.23) |
| B1-2179 | (I.2.1) | (A.3.23) |
| B1-2180 | (I.2.2) | (A.3.23) |
| B1-2181 | (J.1.2) | (A.3.23) |
| B1-2182 | (J.1.3) | (A.3.23) |
| B1-2183 | (J.1.4) | (A.3.23) |
| B1-2184 | (J.1.5) | (A.3.23) |
| B1-2185 | (J.1.8) | (A.3.23) |
| B1-2186 | (J.1.12) | (A.3.23) |
| B1-2187 | (K.1.13) | (A.3.23) |
| B1-2188 | (K.1.47) | (A.3.23) |
| B1-2189 | (K.1.54) | (A.3.23) |
| B1-2190 | (L.1.5) | (A.3.23) |
| B1-2191 | (L.1.9) | (A.3.23) |
| B1-2192 | (L.1.12) | (A.3.23) |
| B1-2193 | (L.1.13) | (A.3.23) |
| B1-2194 | (L.1.17) | (A.3.23) |
| B1-2195 | (L.1.23) | (A.3.23) |
| B1-2196 | (L.1.32), | (A.3.23) |
| B1-2197 | (L.1.46) | (A.3.23) |
| B1-2198 | (M.1.6) | (A.3.23) |
| B1-2199 | (M.1.24) | (A.3.23) |
| B1-2200 | (M.1.25) | (A.3.23) |
| B1-2201 | (M.1.28) | (A.3.23) |
| B1-2202 | (M.1.29) | (A.3.23) |
| B1-2203 | (M.1.30) | (A.3.23) |
| B1-2204 | (N.7.3) | (A.3.23) |
| B1-2205 | (N.7.4) | (A.3.23) |
| B1-2206 | (N.7.5) | (A.3.23) |
| B1-2207 | (N.13.13) | (A.3.23) |
| B1-2208 | (O.2.4), | (A.3.23) |
| B1-2209 | (O.4.5) | (A.3.23) |
| B1-2210 | (O.4.7) | (A.3.23) |
| B1-2211 | (O.4.8) | (A.3.23) |
| B1-2212 | (O.5.1) | (A.3.23) |

TABLE B1-continued

| Mixture | Co 2) | Co3) |
|---|---|---|
| B1-2213 | (O.26.2) | (A.3.23) |
| B1-2214 | (O.27.17) | (A.3.23) |
| B1-2215 | (A.1.1) | (A.3.28) |
| B1-2216 | (A.1.4) | (A.3.28) |
| B1-2217 | (A.1.8) | (A.3.28) |
| B1-2218 | (A.1.10) | (A.3.28) |
| B1-2219 | (A.1.11) | (A.3.28) |
| B1-2220 | (A.1.12) | (A.3.28) |
| B1-2221 | (A.1.14) | (A.3.28) |
| B1-2222 | (A.1.17) | (A.3.28) |
| B1-2223 | (A.1.19) | (A.3.28) |
| B1-2224 | (A.1.25) | (A.3.28) |
| B1-2225 | (A.1.34) | (A.3.28) |
| B1-2226 | (A.1.35) | (A.3.28) |
| B1-2227 | (A.1.38) | (A.3.28) |
| B1-2228 | (A.2.6) | (A.3.28) |
| B1-2229 | (A.3.2) | (A.3.28) |
| B1-2230 | (A.3.3) | (A.3.28) |
| B1-2231 | (A.3.4) | (A.3.28) |
| B1-2232 | (A.3.7) | (A.3.28) |
| B1-2233 | (A.3.8) | (A.3.28) |
| B1-2234 | (A.3.9) | (A.3.28) |
| B1-2235 | (A.3.10) | (A.3.28) |
| B1-2236 | (A.3.11) | (A.3.28) |
| B1-2237 | (A.3.12) | (A.3.28) |
| B1-2238 | (A.3.15) | (A.3.28) |
| B1-2239 | (A.3.16) | (A.3.28) |
| B1-2240 | (A.3.17) | (A.3.28) |
| B1-2241 | (A.3.19) | (A.3.28) |
| B1-2242 | (A.3.21) | (A.3.28) |
| B1-2243 | (A.3.22) | (A.3.28) |
| B1-2244 | (A.3.23) | (A.3.28) |
| B1-2245 | (A.3.28) | (A.3.28) |
| B1-2246 | (A.3.31) | (A.3.28) |
| B1-2247 | (A.4.5) | (A.3.28) |
| B1-2248 | (B.1.4) | (A.3.28) |
| B1-2249 | (B.1.5) | (A.3.28) |
| B1-2250 | (B.1.8) | (A.3.28) |
| B1-2251 | (B.1.10) | (A.3.28) |
| B1-2252 | (B.1.12) | (A.3.28) |
| B1-2253 | (B.1.15) | (A.3.28) |
| B1-2254 | (B.1.17) | (A.3.28) |
| B1-2255 | (B.1.18) | (A.3.28) |
| B1-2256 | (B.1.21) | (A.3.28) |
| B1-2257 | (B.1.22) | (A.3.28) |
| B1-2258 | (B.1.23) | (A.3.28) |
| B1-2259 | (B.1.25) | (A.3.28) |
| B1-2260 | (B.1.26) | (A.3.28) |
| B1-2261 | (B.1.29) | (A.3.28) |
| B1-2262 | (B.1.38) | (A.3.28) |
| B1-2263 | (B.1.44) | (A.3.28) |
| B1-2264 | (B.1.46) | (A.3.28) |
| B1-2265 | (B.2.4) | (A.3.28) |
| B1-2266 | (B.3.1) | (A.3.28) |
| B1-2267 | (C.1.4) | (A.3.28) |
| B1-2268 | (C.1.5) | (A.3.28) |
| B1-2269 | (C.2.1) | (A.3.28) |
| B1-2270 | (D.1.4) | (A.3.28) |
| B1-2271 | (D.1.5) | (A.3.28) |
| B1-2272 | (D.2.3) | (A.3.28) |
| B1-2273 | (D.2.5) | (A.3.28) |
| B1-2274 | (D.2.6) | (A.3.28) |
| B1-2275 | (E.1.1) | (A.3.28) |
| B1-2276 | (E.1.3) | (A.3.28) |
| B1-2277 | (E.2.2) | (A.3.28) |
| B1-2278 | (E.2.3), | (A.3.28) |
| B1-2279 | (F.1.2) | (A.3.28) |
| B1-2280 | (F.1.3) | (A.3.28) |
| B1-2281 | (F.1.5) | (A.3.28) |
| B1-2282 | (G.1.4) | (A.3.28) |
| B1-2283 | (G.3.1) | (A.3.28) |
| B1-2284 | (G.5.1) | (A.3.28) |
| B1-2285 | (H.1.2) | (A.3.28) |
| B1-2286 | (H.1.3) | (A.3.28) |
| B1-2287 | (H.1.4) | (A.3.28) |
| B1-2288 | (H.1.5) | (A.3.28) |
| B1-2289 | (H.1.6) | (A.3.28) |
| B1-2290 | (H.1.7) | (A.3.28) |

TABLE B1-continued

| Mixture | Co 2) | Co3) |
|---|---|---|
| B1-2291 | (H.2.2) | (A.3.28) |
| B1-2292 | (H.2.3) | (A.3.28) |
| B1-2293 | (H.2.5) | (A.3.28) |
| B1-2294 | (H.2.7) | (A.3.28) |
| B1-2295 | (H.3.2) | (A.3.28) |
| B1-2296 | (H.3.4) | (A.3.28) |
| B1-2297 | (H.3.5) | (A.3.28) |
| B1-2298 | (H.3.10) | (A.3.28) |
| B1-2299 | (H.4.2) | (A.3.28) |
| B1-2300 | (H.4.9) | (A.3.28) |
| B1-2301 | (I.1.1) | (A.3.28) |
| B1-2302 | (I.2.1) | (A.3.28) |
| B1-2303 | (I.2.2) | (A.3.28) |
| B1-2304 | (J.1.2) | (A.3.28) |
| B1-2305 | (J.1.3) | (A.3.28) |
| B1-2306 | (J.1.4) | (A.3.28) |
| B1-2307 | (J.1.5) | (A.3.28) |
| B1-2308 | (J.1.8) | (A.3.28) |
| B1-2309 | (J.1.12) | (A.3.28) |
| B1-2310 | (K.1.13) | (A.3.28) |
| B1-2311 | (K.1.47) | (A.3.28) |
| B1-2312 | (K.1.54) | (A.3.28) |
| B1-2313 | (L.1.5) | (A.3.28) |
| B1-2314 | (L.1.9) | (A.3.28) |
| B1-2315 | (L.1.12) | (A.3.28) |
| B1-2316 | (L.1.13) | (A.3.28) |
| B1-2317 | (L.1.17) | (A.3.28) |
| B1-2318 | (L.1.23) | (A.3.28) |
| B1-2319 | (L.1.32), | (A.3.28) |
| B1-2320 | (L.1.46) | (A.3.28) |
| B1-2321 | (M.1.6) | (A.3.28) |
| B1-2322 | (M.1.24) | (A.3.28) |
| B1-2323 | (M.1.25) | (A.3.28) |
| B1-2324 | (M.1.28) | (A.3.28) |
| B1-2325 | (M.1.29) | (A.3.28) |
| B1-2326 | (M.1.30) | (A.3.28) |
| B1-2327 | (N.7.3) | (A.3.28) |
| B1-2328 | (N.7.4) | (A.3.28) |
| B1-2329 | (N.7.5) | (A.3.28) |
| B1-2330 | (N.13.13) | (A.3.28) |
| B1-2331 | (O.2.4), | (A.3.28) |
| B1-2332 | (O.4.5) | (A.3.28) |
| B1-2333 | (O.4.7) | (A.3.28) |
| B1-2334 | (O.4.8) | (A.3.28) |
| B1-2335 | (O.5.1) | (A.3.28) |
| B1-2336 | (O.26.2) | (A.3.28) |
| B1-2337 | (O.27.17) | (A.3.28) |
| B1-2338 | (A.1.1) | (A.3.31) |
| B1-2339 | (A.1.4) | (A.3.31) |
| B1-2340 | (A.1.8) | (A.3.31) |
| B1-2341 | (A.1.10) | (A.3.31) |
| B1-2342 | (A.1.11) | (A.3.31) |
| B1-2343 | (A.1.12) | (A.3.31) |
| B1-2344 | (A.1.14) | (A.3.31) |
| B1-2345 | (A.1.17) | (A.3.31) |
| B1-2346 | (A.1.19) | (A.3.31) |
| B1-2347 | (A.1.25) | (A.3.31) |
| B1-2348 | (A.1.34) | (A.3.31) |
| B1-2349 | (A.1.35) | (A.3.31) |
| B1-2350 | (A.1.38) | (A.3.31) |
| B1-2351 | (A.2.6) | (A.3.31) |
| B1-2352 | (A.3.2) | (A.3.31) |
| B1-2353 | (A.3.3) | (A.3.31) |
| B1-2354 | (A.3.4) | (A.3.31) |
| B1-2355 | (A.3.7) | (A.3.31) |
| B1-2356 | (A.3.8) | (A.3.31) |
| B1-2357 | (A.3.9) | (A.3.31) |
| B1-2358 | (A.3.10) | (A.3.31) |
| B1-2359 | (A.3.11) | (A.3.31) |
| B1-2360 | (A.3.12) | (A.3.31) |
| B1-2361 | (A.3.15) | (A.3.31) |
| B1-2362 | (A.3.16) | (A.3.31) |
| B1-2363 | (A.3.17) | (A.3.31) |
| B1-2364 | (A.3.19) | (A.3.31) |
| B1-2365 | (A.3.21) | (A.3.31) |
| B1-2366 | (A.3.22) | (A.3.31) |
| B1-2367 | (A.3.23) | (A.3.31) |
| B1-2368 | (A.3.28) | (A.3.31) |

TABLE B1-continued

| Mixture | Co 2) | Co3) |
|---|---|---|
| B1-2369 | (A.3.31) | (A.3.31) |
| B1-2370 | (A.4.5) | (A.3.31) |
| B1-2371 | (B.1.4) | (A.3.31) |
| B1-2372 | (B.1.5) | (A.3.31) |
| B1-2373 | (B.1.8) | (A.3.31) |
| B1-2374 | (B.1.10) | (A.3.31) |
| B1-2375 | (B.1.12) | (A.3.31) |
| B1-2376 | (B.1.15) | (A.3.31) |
| B1-2377 | (B.1.17) | (A.3.31) |
| B1-2378 | (B.1.18) | (A.3.31) |
| B1-2379 | (B.1.21) | (A.3.31) |
| B1-2380 | (B.1.22) | (A.3.31) |
| B1-2381 | (B.1.23) | (A.3.31) |
| B1-2382 | (B.1.25) | (A.3.31) |
| B1-2383 | (B.1.26) | (A.3.31) |
| B1-2384 | (B.1.29) | (A.3.31) |
| B1-2385 | (B.1.38) | (A.3.31) |
| B1-2386 | (B.1.44) | (A.3.31) |
| B1-2387 | (B.1.46) | (A.3.31) |
| B1-2388 | (B.2.4) | (A.3.31) |
| B1-2389 | (B.3.1) | (A.3.31) |
| B1-2390 | (C.1.4) | (A.3.31) |
| B1-2391 | (C.1.5) | (A.3.31) |
| B1-2392 | (C.2.1) | (A.3.31) |
| B1-2393 | (D.1.4) | (A.3.31) |
| B1-2394 | (D.1.5) | (A.3.31) |
| B1-2395 | (D.2.3) | (A.3.31) |
| B1-2396 | (D.2.5) | (A.3.31) |
| B1-2397 | (D.2.6) | (A.3.31) |
| B1-2398 | (E.1.1) | (A.3.31) |
| B1-2399 | (E.1.3) | (A.3.31) |
| B1-2400 | (E.2.2) | (A.3.31) |
| B1-2401 | (E.2.3), | (A.3.31) |
| B1-2402 | (F.1.2) | (A.3.31) |
| B1-2403 | (F.1.3) | (A.3.31) |
| B1-2404 | (F.1.5) | (A.3.31) |
| B1-2405 | (G.1.4) | (A.3.31) |
| B1-2406 | (G.3.1) | (A.3.31) |
| B1-2407 | (G.5.1) | (A.3.31) |
| B1-2408 | (H.1.2) | (A.3.31) |
| B1-2409 | (H.1.3) | (A.3.31) |
| B1-2410 | (H.1.4) | (A.3.31) |
| B1-2411 | (H.1.5) | (A.3.31) |
| B1-2412 | (H.1.6) | (A.3.31) |
| B1-2413 | (H.1.7) | (A.3.31) |
| B1-2414 | (H.2.2) | (A.3.31) |
| B1-2415 | (H.2.3) | (A.3.31) |
| B1-2416 | (H.2.5) | (A.3.31) |
| B1-2417 | (H.2.7) | (A.3.31) |
| B1-2418 | (H.3.2) | (A.3.31) |
| B1-2419 | (H.3.4) | (A.3.31) |
| B1-2420 | (H.3.5) | (A.3.31) |
| B1-2421 | (H.3.10) | (A.3.31) |
| B1-2422 | (H.4.2) | (A.3.31) |
| B1-2423 | (H.4.9) | (A.3.31) |
| B1-2424 | (I.1.1) | (A.3.31) |
| B1-2425 | (I.2.1) | (A.3.31) |
| B1-2426 | (I.2.2) | (A.3.31) |
| B1-2427 | (J.1.2) | (A.3.31) |
| B1-2428 | (J.1.3) | (A.3.31) |
| B1-2429 | (J.1.4) | (A.3.31) |
| B1-2430 | (J.1.5) | (A.3.31) |
| B1-2431 | (J.1.8) | (A.3.31) |
| B1-2432 | (J.1.12) | (A.3.31) |
| B1-2433 | (K.1.13) | (A.3.31) |
| B1-2434 | (K.1.47) | (A.3.31) |
| B1-2435 | (K.1.54) | (A.3.31) |
| B1-2436 | (L.1.5) | (A.3.31) |
| B1-2437 | (L.1.9) | (A.3.31) |
| B1-2438 | (L.1.12) | (A.3.31) |
| B1-2439 | (L.1.13) | (A.3.31) |
| B1-2440 | (L.1.17) | (A.3.31) |
| B1-2441 | (L.1.23) | (A.3.31) |
| B1-2442 | (L.1.32), | (A.3.31) |
| B1-2443 | (L.1.46) | (A.3.31) |
| B1-2444 | (M.1.6) | (A.3.31) |
| B1-2445 | (M.1.24) | (A.3.31) |
| B1-2446 | (M.1.25) | (A.3.31) |

TABLE B1-continued

| Mixture | Co 2) | Co3) |
|---|---|---|
| B1-2447 | (M.1.28) | (A.3.31) |
| B1-2448 | (M.1.29) | (A.3.31) |
| B1-2449 | (M.1.30) | (A.3.31) |
| B1-2450 | (N.7.3) | (A.3.31) |
| B1-2451 | (N.7.4) | (A.3.31) |
| B1-2452 | (N.7.5) | (A.3.31) |
| B1-2453 | (N.13.13) | (A.3.31) |
| B1-2454 | (O.2.4), | (A.3.31) |
| B1-2455 | (O.4.5) | (A.3.31) |
| B1-2456 | (O.4.7) | (A.3.31) |
| B1-2457 | (O.4.8) | (A.3.31) |
| B1-2458 | (O.5.1) | (A.3.31) |
| B1-2459 | (O.26.2) | (A.3.31) |
| B1-2460 | (O.27.17) | (A.3.31) |
| B1-2461 | (A.1.1) | (A.4.5) |
| B1-2462 | (A.1.4) | (A.4.5) |
| B1-2463 | (A.1.8) | (A.4.5) |
| B1-2464 | (A.1.10) | (A.4.5) |
| B1-2465 | (A.1.11) | (A.4.5) |
| B1-2466 | (A.1.12) | (A.4.5) |
| B1-2467 | (A.1.14) | (A.4.5) |
| B1-2468 | (A.1.17) | (A.4.5) |
| B1-2469 | (A.1.19) | (A.4.5) |
| B1-2470 | (A.1.25) | (A.4.5) |
| B1-2471 | (A.1.34) | (A.4.5) |
| B1-2472 | (A.1.35) | (A.4.5) |
| B1-2473 | (A.1.38) | (A.4.5) |
| B1-2474 | (A.2.6) | (A.4.5) |
| B1-2475 | (A.3.2) | (A.4.5) |
| B1-2476 | (A.3.3) | (A.4.5) |
| B1-2477 | (A.3.4) | (A.4.5) |
| B1-2478 | (A.3.7) | (A.4.5) |
| B1-2479 | (A.3.8) | (A.4.5) |
| B1-2480 | (A.3.9) | (A.4.5) |
| B1-2481 | (A.3.10) | (A.4.5) |
| B1-2482 | (A.3.11) | (A.4.5) |
| B1-2483 | (A.3.12) | (A.4.5) |
| B1-2484 | (A.3.15) | (A.4.5) |
| B1-2485 | (A.3.16) | (A.4.5) |
| B1-2486 | (A.3.17) | (A.4.5) |
| B1-2487 | (A.3.19) | (A.4.5) |
| B1-2488 | (A.3.21) | (A.4.5) |
| B1-2489 | (A.3.22) | (A.4.5) |
| B1-2490 | (A.3.23) | (A.4.5) |
| B1-2491 | (A.3.28) | (A.4.5) |
| B1-2492 | (A.3.31) | (A.4.5) |
| B1-2493 | (A.4.5) | (A.4.5) |
| B1-2494 | (B.1.4) | (A.4.5) |
| B1-2495 | (B.1.5) | (A.4.5) |
| B1-2496 | (B.1.8) | (A.4.5) |
| B1-2497 | (B.1.10) | (A.4.5) |
| B1-2498 | (B.1.12) | (A.4.5) |
| B1-2499 | (B.1.15) | (A.4.5) |
| B1-2500 | (B.1.17) | (A.4.5) |
| B1-2501 | (B.1.18) | (A.4.5) |
| B1-2502 | (B.1.21) | (A.4.5) |
| B1-2503 | (B.1.22) | (A.4.5) |
| B1-2504 | (B.1.23) | (A.4.5) |
| B1-2505 | (B.1.25) | (A.4.5) |
| B1-2506 | (B.1.26) | (A.4.5) |
| B1-2507 | (B.1.29) | (A.4.5) |
| B1-2508 | (B.1.38) | (A.4.5) |
| B1-2509 | (B.1.44) | (A.4.5) |
| B1-2510 | (B.1.46) | (A.4.5) |
| B1-2511 | (B.2.4) | (A.4.5) |
| B1-2512 | (B.3.1) | (A.4.5) |
| B1-2513 | (C.1.4) | (A.4.5) |
| B1-2514 | (C.1.5) | (A.4.5) |
| B1-2515 | (C.2.1) | (A.4.5) |
| B1-2516 | (D.1.4) | (A.4.5) |
| B1-2517 | (D.1.5) | (A.4.5) |
| B1-2518 | (D.2.3) | (A.4.5) |
| B1-2519 | (D.2.5) | (A.4.5) |
| B1-2520 | (D.2.6) | (A.4.5) |
| B1-2521 | (E.1.1) | (A.4.5) |
| B1-2522 | (E.1.3) | (A.4.5) |
| B1-2523 | (E.2.2) | (A.4.5) |
| B1-2524 | (E.2.3), | (A.4.5) |

TABLE B1-continued

| Mixture | Co 2) | Co3) |
|---|---|---|
| B1-2525 | (F.1.2) | (A.4.5) |
| B1-2526 | (F.1.3) | (A.4.5) |
| B1-2527 | (F.1.5) | (A.4.5) |
| B1-2528 | (G.1.4) | (A.4.5) |
| B1-2529 | (G.3.1) | (A.4.5) |
| B1-2530 | (G.5.1) | (A.4.5) |
| B1-2531 | (H.1.2) | (A.4.5) |
| B1-2532 | (H.1.3) | (A.4.5) |
| B1-2533 | (H.1.4) | (A.4.5) |
| B1-2534 | (H.1.5) | (A.4.5) |
| B1-2535 | (H.1.6) | (A.4.5) |
| B1-2536 | (H.1.7) | (A.4.5) |
| B1-2537 | (H.2.2) | (A.4.5) |
| B1-2538 | (H.2.3) | (A.4.5) |
| B1-2539 | (H.2.5) | (A.4.5) |
| B1-2540 | (H.2.7) | (A.4.5) |
| B1-2541 | (H.3.2) | (A.4.5) |
| B1-2542 | (H.3.4) | (A.4.5) |
| B1-2543 | (H.3.5) | (A.4.5) |
| B1-2544 | (H.3.10) | (A.4.5) |
| B1-2545 | (H.4.2) | (A.4.5) |
| B1-2546 | (H.4.9) | (A.4.5) |
| B1-2547 | (I.1.1) | (A.4.5) |
| B1-2548 | (I.2.1) | (A.4.5) |
| B1-2549 | (I.2.2) | (A.4.5) |
| B1-2550 | (J.1.2) | (A.4.5) |
| B1-2551 | (J.1.3) | (A.4.5) |
| B1-2552 | (J.1.4) | (A.4.5) |
| B1-2553 | (J.1.5) | (A.4.5) |
| B1-2554 | (J.1.8) | (A.4.5) |
| B1-2555 | (J.1.12) | (A.4.5) |
| B1-2556 | (K.1.13) | (A.4.5) |
| B1-2557 | (K.1.47) | (A.4.5) |
| B1-2558 | (K.1.54) | (A.4.5) |
| B1-2559 | (L.1.5) | (A.4.5) |
| B1-2560 | (L.1.9) | (A.4.5) |
| B1-2561 | (L.1.12) | (A.4.5) |
| B1-2562 | (L.1.13) | (A.4.5) |
| B1-2563 | (L.1.17) | (A.4.5) |
| B1-2564 | (L.1.23) | (A.4.5) |
| B1-2565 | (L.1.32), | (A.4.5) |
| B1-2566 | (L.1.46) | (A.4.5) |
| B1-2567 | (M.1.6) | (A.4.5) |
| B1-2568 | (M.1.24) | (A.4.5) |
| B1-2569 | (M.1.25) | (A.4.5) |
| B1-2570 | (M.1.28) | (A.4.5) |
| B1-2571 | (M.1.29) | (A.4.5) |
| B1-2572 | (M.1.30) | (A.4.5) |
| B1-2573 | (N.7.3) | (A.4.5) |
| B1-2574 | (N.7.4) | (A.4.5) |
| B1-2575 | (N.7.5) | (A.4.5) |
| B1-2576 | (N.13.13) | (A.4.5) |
| B1-2577 | (O.2.4), | (A.4.5) |
| B1-2578 | (O.4.5) | (A.4.5) |
| B1-2579 | (O.4.7) | (A.4.5) |
| B1-2580 | (O.4.8) | (A.4.5) |
| B1-2581 | (O.5.1) | (A.4.5) |
| B1-2582 | (O.26.2) | (A.4.5) |
| B1-2583 | (O.27.17) | (A.4.5) |
| B1-2584 | (A.1.1) | (B.1.5) |
| B1-2585 | (A.1.4) | (B.1.5) |
| B1-2586 | (A.1.8) | (B.1.5) |
| B1-2587 | (A.1.10) | (B.1.5) |
| B1-2588 | (A.1.11) | (B.1.5) |
| B1-2589 | (A.1.12) | (B.1.5) |
| B1-2590 | (A.1.14) | (B.1.5) |
| B1-2591 | (A.1.17) | (B.1.5) |
| B1-2592 | (A.1.19) | (B.1.5) |
| B1-2593 | (A.1.25) | (B.1.5) |
| B1-2594 | (A.1.34) | (B.1.5) |
| B1-2595 | (A.1.35) | (B.1.5) |
| B1-2596 | (A.1.38) | (B.1.5) |
| B1-2597 | (A.2.6) | (B.1.5) |
| B1-2598 | (A.3.2) | (B.1.5) |
| B1-2599 | (A.3.3) | (B.1.5) |
| B1-2600 | (A.3.4) | (B.1.5) |
| B1-2601 | (A.3.7) | (B.1.5) |
| B1-2602 | (A.3.8) | (B.1.5) |

TABLE B1-continued

| Mixture | Co 2) | Co3) |
|---|---|---|
| B1-2603 | (A.3.9) | (B.1.5) |
| B1-2604 | (A.3.10) | (B.1.5) |
| B1-2605 | (A.3.11) | (B.1.5) |
| B1-2606 | (A.3.12) | (B.1.5) |
| B1-2607 | (A.3.15) | (B.1.5) |
| B1-2608 | (A.3.16) | (B.1.5) |
| B1-2609 | (A.3.17) | (B.1.5) |
| B1-2610 | (A.3.19) | (B.1.5) |
| B1-2611 | (A.3.21) | (B.1.5) |
| B1-2612 | (A.3.22) | (B.1.5) |
| B1-2613 | (A.3.23) | (B.1.5) |
| B1-2614 | (A.3.28) | (B.1.5) |
| B1-2615 | (A.3.31) | (B.1.5) |
| B1-2616 | (A.4.5) | (B.1.5) |
| B1-2617 | (B.1.4) | (B.1.5) |
| B1-2618 | (B.1.5) | (B.1.5) |
| B1-2619 | (B.1.8) | (B.1.5) |
| B1-2620 | (B.1.10) | (B.1.5) |
| B1-2621 | (B.1.12) | (B.1.5) |
| B1-2622 | (B.1.15) | (B.1.5) |
| B1-2623 | (B.1.17) | (B.1.5) |
| B1-2624 | (B.1.18) | (B.1.5) |
| B1-2625 | (B.1.21) | (B.1.5) |
| B1-2626 | (B.1.22) | (B.1.5) |
| B1-2627 | (B.1.23) | (B.1.5) |
| B1-2628 | (B.1.25) | (B.1.5) |
| B1-2629 | (B.1.26) | (B.1.5) |
| B1-2630 | (B.1.29) | (B.1.5) |
| B1-2631 | (B.1.38) | (B.1.5) |
| B1-2632 | (B.1.44) | (B.1.5) |
| B1-2633 | (B.1.46) | (B.1.5) |
| B1-2634 | (B.2.4) | (B.1.5) |
| B1-2635 | (B.3.1) | (B.1.5) |
| B1-2636 | (C.1.4) | (B.1.5) |
| B1-2637 | (C.1.5) | (B.1.5) |
| B1-2638 | (C.2.1) | (B.1.5) |
| B1-2639 | (D.1.4) | (B.1.5) |
| B1-2640 | (D.1.5) | (B.1.5) |
| B1-2641 | (D.2.3) | (B.1.5) |
| B1-2642 | (D.2.5) | (B.1.5) |
| B1-2643 | (D.2.6) | (B.1.5) |
| B1-2644 | (E.1.1) | (B.1.5) |
| B1-2645 | (E.1.3) | (B.1.5) |
| B1-2646 | (E.2.2) | (B.1.5) |
| B1-2647 | (E.2.3), | (B.1.5) |
| B1-2648 | (F.1.2) | (B.1.5) |
| B1-2649 | (F.1.3) | (B.1.5) |
| B1-2650 | (F.1.5) | (B.1.5) |
| B1-2651 | (G.1.4) | (B.1.5) |
| B1-2652 | (G.3.1) | (B.1.5) |
| B1-2653 | (G.5.1) | (B.1.5) |
| B1-2654 | (H.1.2) | (B.1.5) |
| B1-2655 | (H.1.3) | (B.1.5) |
| B1-2656 | (H.1.4) | (B.1.5) |
| B1-2657 | (H.1.5) | (B.1.5) |
| B1-2658 | (H.1.6) | (B.1.5) |
| B1-2659 | (H.1.7) | (B.1.5) |
| B1-2660 | (H.2.2) | (B.1.5) |
| B1-2661 | (H.2.3) | (B.1.5) |
| B1-2662 | (H.2.5) | (B.1.5) |
| B1-2663 | (H.2.7) | (B.1.5) |
| B1-2664 | (H.3.2) | (B.1.5) |
| B1-2665 | (H.3.4) | (B.1.5) |
| B1-2666 | (H.3.5) | (B.1.5) |
| B1-2667 | (H.3.10) | (B.1.5) |
| B1-2668 | (H.4.2) | (B.1.5) |
| B1-2669 | (H.4.9) | (B.1.5) |
| B1-2670 | (I.1.1) | (B.1.5) |
| B1-2671 | (I.2.1) | (B.1.5) |
| B1-2672 | (I.2.2) | (B.1.5) |
| B1-2673 | (J.1.2) | (B.1.5) |
| B1-2674 | (J.1.3) | (B.1.5) |
| B1-2675 | (J.1.4) | (B.1.5) |
| B1-2676 | (J.1.5) | (B.1.5) |
| B1-2677 | (J.1.8) | (B.1.5) |
| B1-2678 | (J.1.12) | (B.1.5) |
| B1-2679 | (K.1.13) | (B.1.5) |
| B1-2680 | (K.1.47) | (B.1.5) |

TABLE B1-continued

| Mixture | Co 2) | Co3) |
|---|---|---|
| B1-2681 | (K.1.54) | (B.1.5) |
| B1-2682 | (L.1.5) | (B.1.5) |
| B1-2683 | (L.1.9) | (B.1.5) |
| B1-2684 | (L.1.12) | (B.1.5) |
| B1-2685 | (L.1.13) | (B.1.5) |
| B1-2686 | (L.1.17) | (B.1.5) |
| B1-2687 | (L.1.23) | (B.1.5) |
| B1-2688 | (L.1.32), | (B.1.5) |
| B1-2689 | (L.1.46) | (B.1.5) |
| B1-2690 | (M.1.6) | (B.1.5) |
| B1-2691 | (M.1.24) | (B.1.5) |
| B1-2692 | (M.1.25) | (B.1.5) |
| B1-2693 | (M.1.28) | (B.1.5) |
| B1-2694 | (M.1.29) | (B.1.5) |
| B1-2695 | (M.1.30) | (B.1.5) |
| B1-2696 | (N.7.3) | (B.1.5) |
| B1-2697 | (N.7.4) | (B.1.5) |
| B1-2698 | (N.7.5) | (B.1.5) |
| B1-2699 | (N.13.13) | (B.1.5) |
| B1-2700 | (O.2.4), | (B.1.5) |
| B1-2701 | (O.4.5) | (B.1.5) |
| B1-2702 | (O.4.7) | (B.1.5) |
| B1-2703 | (O.4.8) | (B.1.5) |
| B1-2704 | (O.5.1) | (B.1.5) |
| B1-2705 | (O.26.2) | (B.1.5) |
| B1-2706 | (O.27.17) | (B.1.5) |
| B1-2707 | (A.1.1) | (B.1.23) |
| B1-2708 | (A.1.4) | (B.1.23) |
| B1-2709 | (A.1.8) | (B.1.23) |
| B1-2710 | (A.1.10) | (B.1.23) |
| B1-2711 | (A.1.11) | (B.1.23) |
| B1-2712 | (A.1.12) | (B.1.23) |
| B1-2713 | (A.1.14) | (B.1.23) |
| B1-2714 | (A.1.17) | (B.1.23) |
| B1-2715 | (A.1.19) | (B.1.23) |
| B1-2716 | (A.1.25) | (B.1.23) |
| B1-2717 | (A.1.34) | (B.1.23) |
| B1-2718 | (A.1.35) | (B.1.23) |
| B1-2719 | (A.1.38) | (B.1.23) |
| B1-2720 | (A.2.6) | (B.1.23) |
| B1-2721 | (A.3.2) | (B.1.23) |
| B1-2722 | (A.3.3) | (B.1.23) |
| B1-2723 | (A.3.4) | (B.1.23) |
| B1-2724 | (A.3.7) | (B.1.23) |
| B1-2725 | (A.3.8) | (B.1.23) |
| B1-2726 | (A.3.9) | (B.1.23) |
| B1-2727 | (A.3.10) | (B.1.23) |
| B1-2728 | (A.3.11) | (B.1.23) |
| B1-2729 | (A.3.12) | (B.1.23) |
| B1-2730 | (A.3.15) | (B.1.23) |
| B1-2731 | (A.3.16) | (B.1.23) |
| B1-2732 | (A.3.17) | (B.1.23) |
| B1-2733 | (A.3.19) | (B.1.23) |
| B1-2734 | (A.3.21) | (B.1.23) |
| B1-2735 | (A.3.22) | (B.1.23) |
| B1-2736 | (A.3.23) | (B.1.23) |
| B1-2737 | (A.3.28) | (B.1.23) |
| B1-2738 | (A.3.31) | (B.1.23) |
| B1-2739 | (A.4.5) | (B.1.23) |
| B1-2740 | (B.1.4) | (B.1.23) |
| B1-2741 | (B.1.5) | (B.1.23) |
| B1-2742 | (B.1.8) | (B.1.23) |
| B1-2743 | (B.1.10) | (B.1.23) |
| B1-2744 | (B.1.12) | (B.1.23) |
| B1-2745 | (B.1.15) | (B.1.23) |
| B1-2746 | (B.1.17) | (B.1.23) |
| B1-2747 | (B.1.18) | (B.1.23) |
| B1-2748 | (B.1.21) | (B.1.23) |
| B1-2749 | (B.1.22) | (B.1.23) |
| B1-2750 | (B.1.23) | (B.1.23) |
| B1-2751 | (B.1.25) | (B.1.23) |
| B1-2752 | (B.1.26) | (B.1.23) |
| B1-2753 | (B.1.29) | (B.1.23) |
| B1-2754 | (B.1.38) | (B.1.23) |
| B1-2755 | (B.1.44) | (B.1.23) |
| B1-2756 | (B.1.46) | (B.1.23) |
| B1-2757 | (B.2.4) | (B.1.23) |
| B1-2758 | (B.3.1) | (B.1.23) |

TABLE B1-continued

| Mixture | Co 2) | Co3) |
|---|---|---|
| B1-2759 | (C.1.4) | (B.1.23) |
| B1-2760 | (C.1.5) | (B.1.23) |
| B1-2761 | (C.2.1) | (B.1.23) |
| B1-2762 | (D.1.4) | (B.1.23) |
| B1-2763 | (D.1.5) | (B.1.23) |
| B1-2764 | (D.2.3) | (B.1.23) |
| B1-2765 | (D.2.5) | (B.1.23) |
| B1-2766 | (D.2.6) | (B.1.23) |
| B1-2767 | (E.1.1) | (B.1.23) |
| B1-2768 | (E.1.3) | (B.1.23) |
| B1-2769 | (E.2.2) | (B.1.23) |
| B1-2770 | (E.2.3), | (B.1.23) |
| B1-2771 | (F.1.2) | (B.1.23) |
| B1-2772 | (F.1.3) | (B.1.23) |
| B1-2773 | (F.1.5) | (B.1.23) |
| B1-2774 | (G.1.4) | (B.1.23) |
| B1-2775 | (G.3.1) | (B.1.23) |
| B1-2776 | (G.5.1) | (B.1.23) |
| B1-2777 | (H.1.2) | (B.1.23) |
| B1-2778 | (H.1.3) | (B.1.23) |
| B1-2779 | (H.1.4) | (B.1.23) |
| B1-2780 | (H.1.5) | (B.1.23) |
| B1-2781 | (H.1.6) | (B.1.23) |
| B1-2782 | (H.1.7) | (B.1.23) |
| B1-2783 | (H.2.2) | (B.1.23) |
| B1-2784 | (H.2.3) | (B.1.23) |
| B1-2785 | (H.2.5) | (B.1.23) |
| B1-2786 | (H.2.7) | (B.1.23) |
| B1-2787 | (H.3.2) | (B.1.23) |
| B1-2788 | (H.3.4) | (B.1.23) |
| B1-2789 | (H.3.5) | (B.1.23) |
| B1-2790 | (H.3.10) | (B.1.23) |
| B1-2791 | (H.4.2) | (B.1.23) |
| B1-2792 | (H.4.9) | (B.1.23) |
| B1-2793 | (I.1.1) | (B.1.23) |
| B1-2794 | (I.2.1) | (B.1.23) |
| B1-2795 | (I.2.2) | (B.1.23) |
| B1-2796 | (J.1.2) | (B.1.23) |
| B1-2797 | (J.1.3) | (B.1.23) |
| B1-2798 | (J.1.4) | (B.1.23) |
| B1-2799 | (J.1.5) | (B.1.23) |
| B1-2800 | (J.1.8) | (B.1.23) |
| B1-2801 | (J.1.12) | (B.1.23) |
| B1-2802 | (K.1.13) | (B.1.23) |
| B1-2803 | (K.1.47) | (B.1.23) |
| B1-2804 | (K.1.54) | (B.1.23) |
| B1-2805 | (L.1.5) | (B.1.23) |
| B1-2806 | (L.1.9) | (B.1.23) |
| B1-2807 | (L.1.12) | (B.1.23) |
| B1-2808 | (L.1.13) | (B.1.23) |
| B1-2809 | (L.1.17) | (B.1.23) |
| B1-2810 | (L.1.23) | (B.1.23) |
| B1-2811 | (L.1.32), | (B.1.23) |
| B1-2812 | (L.1.46) | (B.1.23) |
| B1-2813 | (M.1.6) | (B.1.23) |
| B1-2814 | (M.1.24) | (B.1.23) |
| B1-2815 | (M.1.25) | (B.1.23) |
| B1-2816 | (M.1.28) | (B.1.23) |
| B1-2817 | (M.1.29) | (B.1.23) |
| B1-2818 | (M.1.30) | (B.1.23) |
| B1-2819 | (N.7.3) | (B.1.23) |
| B1-2820 | (N.7.4) | (B.1.23) |
| B1-2821 | (N.7.5) | (B.1.23) |
| B1-2822 | (N.13.13) | (B.1.23) |
| B1-2823 | (O.2.4), | (B.1.23) |
| B1-2824 | (O.4.5) | (B.1.23) |
| B1-2825 | (O.4.7) | (B.1.23) |
| B1-2826 | (O.4.8) | (B.1.23) |
| B1-2827 | (O.5.1) | (B.1.23) |
| B1-2828 | (O.26.2) | (B.1.23) |
| B1-2829 | (O.27.17) | (B.1.23) |
| B1-2830 | (A.1.1) | (B.1.25) |
| B1-2831 | (A.1.4) | (B.1.25) |
| B1-2832 | (A.1.8) | (B.1.25) |
| B1-2833 | (A.1.10) | (B.1.25) |
| B1-2834 | (A.1.11) | (B.1.25) |
| B1-2835 | (A.1.12) | (B.1.25) |
| B1-2836 | (A.1.14) | (B.1.25) |

TABLE B1-continued

| Mixture | Co 2) | Co3) |
|---|---|---|
| B1-2837 | (A.1.17) | (B.1.25) |
| B1-2838 | (A.1.19) | (B.1.25) |
| B1-2839 | (A.1.25) | (B.1.25) |
| B1-2840 | (A.1.34) | (B.1.25) |
| B1-2841 | (A.1.35) | (B.1.25) |
| B1-2842 | (A.1.38) | (B.1.25) |
| B1-2843 | (A.2.6) | (B.1.25) |
| B1-2844 | (A.3.2) | (B.1.25) |
| B1-2845 | (A.3.3) | (B.1.25) |
| B1-2846 | (A.3.4) | (B.1.25) |
| B1-2847 | (A.3.7) | (B.1.25) |
| B1-2848 | (A.3.8) | (B.1.25) |
| B1-2849 | (A.3.9) | (B.1.25) |
| B1-2850 | (A.3.10) | (B.1.25) |
| B1-2851 | (A.3.11) | (B.1.25) |
| B1-2852 | (A.3.12) | (B.1.25) |
| B1-2853 | (A.3.15) | (B.1.25) |
| B1-2854 | (A.3.16) | (B.1.25) |
| B1-2855 | (A.3.17) | (B.1.25) |
| B1-2856 | (A.3.19) | (B.1.25) |
| B1-2857 | (A.3.21) | (B.1.25) |
| B1-2858 | (A.3.22) | (B.1.25) |
| B1-2859 | (A.3.23) | (B.1.25) |
| B1-2860 | (A.3.28) | (B.1.25) |
| B1-2861 | (A.3.31) | (B.1.25) |
| B1-2862 | (A.4.5) | (B.1.25) |
| B1-2863 | (B.1.4) | (B.1.25) |
| B1-2864 | (B.1.5) | (B.1.25) |
| B1-2865 | (B.1.8) | (B.1.25) |
| B1-2866 | (B.1.10) | (B.1.25) |
| B1-2867 | (B.1.12) | (B.1.25) |
| B1-2868 | (B.1.15) | (B.1.25) |
| B1-2869 | (B.1.17) | (B.1.25) |
| B1-2870 | (B.1.18) | (B.1.25) |
| B1-2871 | (B.1.21) | (B.1.25) |
| B1-2872 | (B.1.22) | (B.1.25) |
| B1-2873 | (B.1.23) | (B.1.25) |
| B1-2874 | (B.1.25) | (B.1.25) |
| B1-2875 | (B.1.26) | (B.1.25) |
| B1-2876 | (B.1.29) | (B.1.25) |
| B1-2877 | (B.1.38) | (B.1.25) |
| B1-2878 | (B.1.44) | (B.1.25) |
| B1-2879 | (B.1.46) | (B.1.25) |
| B1-2880 | (B.2.4) | (B.1.25) |
| B1-2881 | (B.3.1) | (B.1.25) |
| B1-2882 | (C.1.4) | (B.1.25) |
| B1-2883 | (C.1.5) | (B.1.25) |
| B1-2884 | (C.2.1) | (B.1.25) |
| B1-2885 | (D.1.4) | (B.1.25) |
| B1-2886 | (D.1.5) | (B.1.25) |
| B1-2887 | (D.2.3) | (B.1.25) |
| B1-2888 | (D.2.5) | (B.1.25) |
| B1-2889 | (D.2.6) | (B.1.25) |
| B1-2890 | (E.1.1) | (B.1.25) |
| B1-2891 | (E.1.3) | (B.1.25) |
| B1-2892 | (E.2.2) | (B.1.25) |
| B1-2893 | (E.2.3), | (B.1.25) |
| B1-2894 | (F.1.2) | (B.1.25) |
| B1-2895 | (F.1.3) | (B.1.25) |
| B1-2896 | (F.1.5) | (B.1.25) |
| B1-2897 | (G.1.4) | (B.1.25) |
| B1-2898 | (G.3.1) | (B.1.25) |
| B1-2899 | (G.5.1) | (B.1.25) |
| B1-2900 | (H.1.2) | (B.1.25) |
| B1-2901 | (H.1.3) | (B.1.25) |
| B1-2902 | (H.1.4) | (B.1.25) |
| B1-2903 | (H.1.5) | (B.1.25) |
| B1-2904 | (H.1.6) | (B.1.25) |
| B1-2905 | (H.1.7) | (B.1.25) |
| B1-2906 | (H.2.2) | (B.1.25) |
| B1-2907 | (H.2.3) | (B.1.25) |
| B1-2908 | (H.2.5) | (B.1.25) |
| B1-2909 | (H.2.7) | (B.1.25) |
| B1-2910 | (H.3.2) | (B.1.25) |
| B1-2911 | (H.3.4) | (B.1.25) |
| B1-2912 | (H.3.5) | (B.1.25) |
| B1-2913 | (H.3.10) | (B.1.25) |
| B1-2914 | (H.4.2) | (B.1.25) |

TABLE B1-continued

| Mixture | Co 2) | Co3) |
|---|---|---|
| B1-2915 | (H.4.9) | (B.1.25) |
| B1-2916 | (I.1.1) | (B.1.25) |
| B1-2917 | (I.2.1) | (B.1.25) |
| B1-2918 | (I.2.2) | (B.1.25) |
| B1-2919 | (J.1.2) | (B.1.25) |
| B1-2920 | (J.1.3) | (B.1.25) |
| B1-2921 | (J.1.4) | (B.1.25) |
| B1-2922 | (J.1.5) | (B.1.25) |
| B1-2923 | (J.1.8) | (B.1.25) |
| B1-2924 | (J.1.12) | (B.1.25) |
| B1-2925 | (K.1.13) | (B.1.25) |
| B1-2926 | (K.1.47) | (B.1.25) |
| B1-2927 | (K.1.54) | (B.1.25) |
| B1-2928 | (L.1.5) | (B.1.25) |
| B1-2929 | (L.1.9) | (B.1.25) |
| B1-2930 | (L.1.12) | (B.1.25) |
| B1-2931 | (L.1.13) | (B.1.25) |
| B1-2932 | (L.1.17) | (B.1.25) |
| B1-2933 | (L.1.23) | (B.1.25) |
| B1-2934 | (L.1.32), | (B.1.25) |
| B1-2935 | (L.1.46) | (B.1.25) |
| B1-2936 | (M.1.6) | (B.1.25) |
| B1-2937 | (M.1.24) | (B.1.25) |
| B1-2938 | (M.1.25) | (B.1.25) |
| B1-2939 | (M.1.28) | (B.1.25) |
| B1-2940 | (M.1.29) | (B.1.25) |
| B1-2941 | (M.1.30) | (B.1.25) |
| B1-2942 | (N.7.3) | (B.1.25) |
| B1-2943 | (N.7.4) | (B.1.25) |
| B1-2944 | (N.7.5) | (B.1.25) |
| B1-2945 | (N.13.13) | (B.1.25) |
| B1-2946 | (O.2.4), | (B.1.25) |
| B1-2947 | (O.4.5) | (B.1.25) |
| B1-2948 | (O.4.7) | (B.1.25) |
| B1-2949 | (O.4.8) | (B.1.25) |
| B1-2950 | (O.5.1) | (B.1.25) |
| B1-2951 | (O.26.2) | (B.1.25) |
| B1-2952 | (O.27.17) | (B.1.25) |
| B1-2953 | (A.1.1) | (B.1.26) |
| B1-2954 | (A.1.4) | (B.1.26) |
| B1-2955 | (A.1.8) | (B.1.26) |
| B1-2956 | (A.1.10) | (B.1.26) |
| B1-2957 | (A.1.11) | (B.1.26) |
| B1-2958 | (A.1.12) | (B.1.26) |
| B1-2959 | (A.1.14) | (B.1.26) |
| B1-2960 | (A.1.17) | (B.1.26) |
| B1-2961 | (A.1.19) | (B.1.26) |
| B1-2962 | (A.1.25) | (B.1.26) |
| B1-2963 | (A.1.34) | (B.1.26) |
| B1-2964 | (A.1.35) | (B.1.26) |
| B1-2965 | (A.1.38) | (B.1.26) |
| B1-2966 | (A.2.6) | (B.1.26) |
| B1-2967 | (A.3.2) | (B.1.26) |
| B1-2968 | (A.3.3) | (B.1.26) |
| B1-2969 | (A.3.4) | (B.1.26) |
| B1-2970 | (A.3.7) | (B.1.26) |
| B1-2971 | (A.3.8) | (B.1.26) |
| B1-2972 | (A.3.9) | (B.1.26) |
| B1-2973 | (A.3.10) | (B.1.26) |
| B1-2974 | (A.3.11) | (B.1.26) |
| B1-2975 | (A.3.12) | (B.1.26) |
| B1-2976 | (A.3.15) | (B.1.26) |
| B1-2977 | (A.3.16) | (B.1.26) |
| B1-2978 | (A.3.17) | (B.1.26) |
| B1-2979 | (A.3.19) | (B.1.26) |
| B1-2980 | (A.3.21) | (B.1.26) |
| B1-2981 | (A.3.22) | (B.1.26) |
| B1-2982 | (A.3.23) | (B.1.26) |
| B1-2983 | (A.3.28) | (B.1.26) |
| B1-2984 | (A.3.31) | (B.1.26) |
| B1-2985 | (A.4.5) | (B.1.26) |
| B1-2986 | (B.1.4) | (B.1.26) |
| B1-2987 | (B.1.5) | (B.1.26) |
| B1-2988 | (B.1.8) | (B.1.26) |
| B1-2989 | (B.1.10) | (B.1.26) |
| B1-2990 | (B.1.12) | (B.1.26) |
| B1-2991 | (B.1.15) | (B.1.26) |
| B1-2992 | (B.1.17) | (B.1.26) |

TABLE B1-continued

| Mixture | Co 2) | Co3) |
|---|---|---|
| B1-2993 | (B.1.18) | (B.1.26) |
| B1-2994 | (B.1.21) | (B.1.26) |
| B1-2995 | (B.1.22) | (B.1.26) |
| B1-2996 | (B.1.23) | (B.1.26) |
| B1-2997 | (B.1.25) | (B.1.26) |
| B1-2998 | (B.1.26) | (B.1.26) |
| B1-2999 | (B.1.29) | (B.1.26) |
| B1-3000 | (B.1.38) | (B.1.26) |
| B1-3001 | (B.1.44) | (B.1.26) |
| B1-3002 | (B.1.46) | (B.1.26) |
| B1-3003 | (B.2.4) | (B.1.26) |
| B1-3004 | (B.3.1) | (B.1.26) |
| B1-3005 | (C.1.4) | (B.1.26) |
| B1-3006 | (C.1.5) | (B.1.26) |
| B1-3007 | (C.2.1) | (B.1.26) |
| B1-3008 | (D.1.4) | (B.1.26) |
| B1-3009 | (D.1.5) | (B.1.26) |
| B1-3010 | (D.2.3) | (B.1.26) |
| B1-3011 | (D.2.5) | (B.1.26) |
| B1-3012 | (D.2.6) | (B.1.26) |
| B1-3013 | (E.1.1) | (B.1.26) |
| B1-3014 | (E.1.3) | (B.1.26) |
| B1-3015 | (E.2.2) | (B.1.26) |
| B1-3016 | (E.2.3), | (B.1.26) |
| B1-3017 | (F.1.2) | (B.1.26) |
| B1-3018 | (F.1.3) | (B.1.26) |
| B1-3019 | (F.1.5) | (B.1.26) |
| B1-3020 | (G.1.4) | (B.1.26) |
| B1-3021 | (G.3.1) | (B.1.26) |
| B1-3022 | (G.5.1) | (B.1.26) |
| B1-3023 | (H.1.2) | (B.1.26) |
| B1-3024 | (H.1.3) | (B.1.26) |
| B1-3025 | (H.1.4) | (B.1.26) |
| B1-3026 | (H.1.5) | (B.1.26) |
| B1-3027 | (H.1.6) | (B.1.26) |
| B1-3028 | (H.1.7) | (B.1.26) |
| B1-3029 | (H.2.2) | (B.1.26) |
| B1-3030 | (H.2.3) | (B.1.26) |
| B1-3031 | (H.2.5) | (B.1.26) |
| B1-3032 | (H.2.7) | (B.1.26) |
| B1-3033 | (H.3.2) | (B.1.26) |
| B1-3034 | (H.3.4) | (B.1.26) |
| B1-3035 | (H.3.5) | (B.1.26) |
| B1-3036 | (H.3.10) | (B.1.26) |
| B1-3037 | (H.4.2) | (B.1.26) |
| B1-3038 | (H.4.9) | (B.1.26) |
| B1-3039 | (I.1.1) | (B.1.26) |
| B1-3040 | (I.2.1) | (B.1.26) |
| B1-3041 | (I.2.2) | (B.1.26) |
| B1-3042 | (J.1.2) | (B.1.26) |
| B1-3043 | (J.1.3) | (B.1.26) |
| B1-3044 | (J.1.4) | (B.1.26) |
| B1-3045 | (J.1.5) | (B.1.26) |
| B1-3046 | (J.1.8) | (B.1.26) |
| B1-3047 | (J.1.12) | (B.1.26) |
| B1-3048 | (K.1.13) | (B.1.26) |
| B1-3049 | (K.1.47) | (B.1.26) |
| B1-3050 | (K.1.54) | (B.1.26) |
| B1-3051 | (L.1.5) | (B.1.26) |
| B1-3052 | (L.1.9) | (B.1.26) |
| B1-3053 | (L.1.12) | (B.1.26) |
| B1-3054 | (L.1.13) | (B.1.26) |
| B1-3055 | (L.1.17) | (B.1.26) |
| B1-3056 | (L.1.23) | (B.1.26) |
| B1-3057 | (L.1.32), | (B.1.26) |
| B1-3058 | (L.1.46) | (B.1.26) |
| B1-3059 | (M.1.6) | (B.1.26) |
| B1-3060 | (M.1.24) | (B.1.26) |
| B1-3061 | (M.1.25) | (B.1.26) |
| B1-3062 | (M.1.28) | (B.1.26) |
| B1-3063 | (M.1.29) | (B.1.26) |
| B1-3064 | (M.1.30) | (B.1.26) |
| B1-3065 | (N.7.3) | (B.1.26) |
| B1-3066 | (N.7.4) | (B.1.26) |
| B1-3067 | (N.7.5) | (B.1.26) |
| B1-3068 | (N.13.13) | (B.1.26) |
| B1-3069 | (O.2.4), | (B.1.26) |
| B1-3070 | (O.4.5) | (B.1.26) |

TABLE B1-continued

| Mixture | Co 2) | Co3) |
|---|---|---|
| B1-3071 | (O.4.7) | (B.1.26) |
| B1-3072 | (O.4.8) | (B.1.26) |
| B1-3073 | (O.5.1) | (B.1.26) |
| B1-3074 | (O.26.2) | (B.1.26) |
| B1-3075 | (O.27.17) | (B.1.26) |
| B1-3076 | (A.1.1) | (B.1.29) |
| B1-3077 | (A.1.4) | (B.1.29) |
| B1-3078 | (A.1.8) | (B.1.29) |
| B1-3079 | (A.1.10) | (B.1.29) |
| B1-3080 | (A.1.11) | (B.1.29) |
| B1-3081 | (A.1.12) | (B.1.29) |
| B1-3082 | (A.1.14) | (B.1.29) |
| B1-3083 | (A.1.17) | (B.1.29) |
| B1-3084 | (A.1.19) | (B.1.29) |
| B1-3085 | (A.1.25) | (B.1.29) |
| B1-3086 | (A.1.34) | (B.1.29) |
| B1-3087 | (A.1.35) | (B.1.29) |
| B1-3088 | (A.1.38) | (B.1.29) |
| B1-3089 | (A.2.6) | (B.1.29) |
| B1-3090 | (A.3.2) | (B.1.29) |
| B1-3091 | (A.3.3) | (B.1.29) |
| B1-3092 | (A.3.4) | (B.1.29) |
| B1-3093 | (A.3.7) | (B.1.29) |
| B1-3094 | (A.3.8) | (B.1.29) |
| B1-3095 | (A.3.9) | (B.1.29) |
| B1-3096 | (A.3.10) | (B.1.29) |
| B1-3097 | (A.3.11) | (B.1.29) |
| B1-3098 | (A.3.12) | (B.1.29) |
| B1-3099 | (A.3.15) | (B.1.29) |
| B1-3100 | (A.3.16) | (B.1.29) |
| B1-3101 | (A.3.17) | (B.1.29) |
| B1-3102 | (A.3.19) | (B.1.29) |
| B1-3103 | (A.3.21) | (B.1.29) |
| B1-3104 | (A.3.22) | (B.1.29) |
| B1-3105 | (A.3.23) | (B.1.29) |
| B1-3106 | (A.3.28) | (B.1.29) |
| B1-3107 | (A.3.31) | (B.1.29) |
| B1-3108 | (A.4.5) | (B.1.29) |
| B1-3109 | (B.1.4) | (B.1.29) |
| B1-3110 | (B.1.5) | (B.1.29) |
| B1-3111 | (B.1.8) | (B.1.29) |
| B1-3112 | (B.1.10) | (B.1.29) |
| B1-3113 | (B.1.12) | (B.1.29) |
| B1-3114 | (B.1.15) | (B.1.29) |
| B1-3115 | (B.1.17) | (B.1.29) |
| B1-3116 | (B.1.18) | (B.1.29) |
| B1-3117 | (B.1.21) | (B.1.29) |
| B1-3118 | (B.1.22) | (B.1.29) |
| B1-3119 | (B.1.23) | (B.1.29) |
| B1-3120 | (B.1.25) | (B.1.29) |
| B1-3121 | (B.1.26) | (B.1.29) |
| B1-3122 | (B.1.29) | (B.1.29) |
| B1-3123 | (B.1.38) | (B.1.29) |
| B1-3124 | (B.1.44) | (B.1.29) |
| B1-3125 | (B.1.46) | (B.1.29) |
| B1-3126 | (B.2.4) | (B.1.29) |
| B1-3127 | (B.3.1) | (B.1.29) |
| B1-3128 | (C.1.4) | (B.1.29) |
| B1-3129 | (C.1.5) | (B.1.29) |
| B1-3130 | (C.2.1) | (B.1.29) |
| B1-3131 | (D.1.4) | (B.1.29) |
| B1-3132 | (D.1.5) | (B.1.29) |
| B1-3133 | (D.2.3) | (B.1.29) |
| B1-3134 | (D.2.5) | (B.1.29) |
| B1-3135 | (D.2.6) | (B.1.29) |
| B1-3136 | (E.1.1) | (B.1.29) |
| B1-3137 | (E.1.3) | (B.1.29) |
| B1-3138 | (E.2.2) | (B.1.29) |
| B1-3139 | (E.2.3), | (B.1.29) |
| B1-3140 | (F.1.2) | (B.1.29) |
| B1-3141 | (F.1.3) | (B.1.29) |
| B1-3142 | (F.1.5) | (B.1.29) |
| B1-3143 | (G.1.4) | (B.1.29) |
| B1-3144 | (G.3.1) | (B.1.29) |
| B1-3145 | (G.5.1) | (B.1.29) |
| B1-3146 | (H.1.2) | (B.1.29) |
| B1-3147 | (H.1.3) | (B.1.29) |
| B1-3148 | (H.1.4) | (B.1.29) |

TABLE B1-continued

| Mixture | Co 2) | Co3) |
|---|---|---|
| B1-3149 | (H.1.5) | (B.1.29) |
| B1-3150 | (H.1.6) | (B.1.29) |
| B1-3151 | (H.1.7) | (B.1.29) |
| B1-3152 | (H.2.2) | (B.1.29) |
| B1-3153 | (H.2.3) | (B.1.29) |
| B1-3154 | (H.2.5) | (B.1.29) |
| B1-3155 | (H.2.7) | (B.1.29) |
| B1-3156 | (H.3.2) | (B.1.29) |
| B1-3157 | (H.3.4) | (B.1.29) |
| B1-3158 | (H.3.5) | (B.1.29) |
| B1-3159 | (H.3.10) | (B.1.29) |
| B1-3160 | (H.4.2) | (B.1.29) |
| B1-3161 | (H.4.9) | (B.1.29) |
| B1-3162 | (I.1.1) | (B.1.29) |
| B1-3163 | (I.2.1) | (B.1.29) |
| B1-3164 | (I.2.2) | (B.1.29) |
| B1-3165 | (J.1.2) | (B.1.29) |
| B1-3166 | (J.1.3) | (B.1.29) |
| B1-3167 | (J.1.4) | (B.1.29) |
| B1-3168 | (J.1.5) | (B.1.29) |
| B1-3169 | (J.1.8) | (B.1.29) |
| B1-3170 | (J.1.12) | (B.1.29) |
| B1-3171 | (K.1.13) | (B.1.29) |
| B1-3172 | (K.1.47) | (B.1.29) |
| B1-3173 | (K.1.54) | (B.1.29) |
| B1-3174 | (L.1.5) | (B.1.29) |
| B1-3175 | (L.1.9) | (B.1.29) |
| B1-3176 | (L.1.12) | (B.1.29) |
| B1-3177 | (L.1.13) | (B.1.29) |
| B1-3178 | (L.1.17) | (B.1.29) |
| B1-3179 | (L.1.23) | (B.1.29) |
| B1-3180 | (L.1.32), | (B.1.29) |
| B1-3181 | (L.1.46) | (B.1.29) |
| B1-3182 | (M.1.6) | (B.1.29) |
| B1-3183 | (M.1.24) | (B.1.29) |
| B1-3184 | (M.1.25) | (B.1.29) |
| B1-3185 | (M.1.28) | (B.1.29) |
| B1-3186 | (M.1.29) | (B.1.29) |
| B1-3187 | (M.1.30) | (B.1.29) |
| B1-3188 | (N.7.3) | (B.1.29) |
| B1-3189 | (N.7.4) | (B.1.29) |
| B1-3190 | (N.7.5) | (B.1.29) |
| B1-3191 | (N.13.13) | (B.1.29) |
| B1-3192 | (O.2.4), | (B.1.29) |
| B1-3193 | (O.4.5) | (B.1.29) |
| B1-3194 | (O.4.7) | (B.1.29) |
| B1-3195 | (O.4.8) | (B.1.29) |
| B1-3196 | (O.5.1) | (B.1.29) |
| B1-3197 | (O.26.2) | (B.1.29) |
| B1-3198 | (O.27.17) | (B.1.29) |
| B1-3199 | (A.1.1) | (B.1.38) |
| B1-3200 | (A.1.4) | (B.1.38) |
| B1-3201 | (A.1.8) | (B.1.38) |
| B1-3202 | (A.1.10) | (B.1.38) |
| B1-3203 | (A.1.11) | (B.1.38) |
| B1-3204 | (A.1.12) | (B.1.38) |
| B1-3205 | (A.1.14) | (B.1.38) |
| B1-3206 | (A.1.17) | (B.1.38) |
| B1-3207 | (A.1.19) | (B.1.38) |
| B1-3208 | (A.1.25) | (B.1.38) |
| B1-3209 | (A.1.34) | (B.1.38) |
| B1-3210 | (A.1.35) | (B.1.38) |
| B1-3211 | (A.1.38) | (B.1.38) |
| B1-3212 | (A.2.6) | (B.1.38) |
| B1-3213 | (A.3.2) | (B.1.38) |
| B1-3214 | (A.3.3) | (B.1.38) |
| B1-3215 | (A.3.4) | (B.1.38) |
| B1-3216 | (A.3.7) | (B.1.38) |
| B1-3217 | (A.3.8) | (B.1.38) |
| B1-3218 | (A.3.9) | (B.1.38) |
| B1-3219 | (A.3.10) | (B.1.38) |
| B1-3220 | (A.3.11) | (B.1.38) |
| B1-3221 | (A.3.12) | (B.1.38) |
| B1-3222 | (A.3.15) | (B.1.38) |
| B1-3223 | (A.3.16) | (B.1.38) |
| B1-3224 | (A.3.17) | (B.1.38) |
| B1-3225 | (A.3.19) | (B.1.38) |
| B1-3226 | (A.3.21) | (B.1.38) |

TABLE B1-continued

| Mixture | Co 2) | Co3) |
|---|---|---|
| B1-3227 | (A.3.22) | (B.1.38) |
| B1-3228 | (A.3.23) | (B.1.38) |
| B1-3229 | (A.3.28) | (B.1.38) |
| B1-3230 | (A.3.31) | (B.1.38) |
| B1-3231 | (A.4.5) | (B.1.38) |
| B1-3232 | (B.1.4) | (B.1.38) |
| B1-3233 | (B.1.5) | (B.1.38) |
| B1-3234 | (B.1.8) | (B.1.38) |
| B1-3235 | (B.1.10) | (B.1.38) |
| B1-3236 | (B.1.12) | (B.1.38) |
| B1-3237 | (B.1.15) | (B.1.38) |
| B1-3238 | (B.1.17) | (B.1.38) |
| B1-3239 | (B.1.18) | (B.1.38) |
| B1-3240 | (B.1.21) | (B.1.38) |
| B1-3241 | (B.1.22) | (B.1.38) |
| B1-3242 | (B.1.23) | (B.1.38) |
| B1-3243 | (B.1.25) | (B.1.38) |
| B1-3244 | (B.1.26) | (B.1.38) |
| B1-3245 | (B.1.29) | (B.1.38) |
| B1-3246 | (B.1.38) | (B.1.38) |
| B1-3247 | (B.1.44) | (B.1.38) |
| B1-3248 | (B.1.46) | (B.1.38) |
| B1-3249 | (B.2.4) | (B.1.38) |
| B1-3250 | (B.3.1) | (B.1.38) |
| B1-3251 | (C.1.4) | (B.1.38) |
| B1-3252 | (C.1.5) | (B.1.38) |
| B1-3253 | (C.2.1) | (B.1.38) |
| B1-3254 | (D.1.4) | (B.1.38) |
| B1-3255 | (D.1.5) | (B.1.38) |
| B1-3256 | (D.2.3) | (B.1.38) |
| B1-3257 | (D.2.5) | (B.1.38) |
| B1-3258 | (D.2.6) | (B.1.38) |
| B1-3259 | (E.1.1) | (B.1.38) |
| B1-3260 | (E.1.3) | (B.1.38) |
| B1-3261 | (E.2.2) | (B.1.38) |
| B1-3262 | (E.2.3), | (B.1.38) |
| B1-3263 | (F.1.2) | (B.1.38) |
| B1-3264 | (F.1.3) | (B.1.38) |
| B1-3265 | (F.1.5) | (B.1.38) |
| B1-3266 | (G.1.4) | (B.1.38) |
| B1-3267 | (G.3.1) | (B.1.38) |
| B1-3268 | (G.5.1) | (B.1.38) |
| B1-3269 | (H.1.2) | (B.1.38) |
| B1-3270 | (H.1.3) | (B.1.38) |
| B1-3271 | (H.1.4) | (B.1.38) |
| B1-3272 | (H.1.5) | (B.1.38) |
| B1-3273 | (H.1.6) | (B.1.38) |
| B1-3274 | (H.1.7) | (B.1.38) |
| B1-3275 | (H.2.2) | (B.1.38) |
| B1-3276 | (H.2.3) | (B.1.38) |
| B1-3277 | (H.2.5) | (B.1.38) |
| B1-3278 | (H.2.7) | (B.1.38) |
| B1-3279 | (H.3.2) | (B.1.38) |
| B1-3280 | (H.3.4) | (B.1.38) |
| B1-3281 | (H.3.5) | (B.1.38) |
| B1-3282 | (H.3.10) | (B.1.38) |
| B1-3283 | (H.4.2) | (B.1.38) |
| B1-3284 | (H.4.9) | (B.1.38) |
| B1-3285 | (I.1.1) | (B.1.38) |
| B1-3286 | (I.2.1) | (B.1.38) |
| B1-3287 | (I.2.2) | (B.1.38) |
| B1-3288 | (J.1.2) | (B.1.38) |
| B1-3289 | (J.1.3) | (B.1.38) |
| B1-3290 | (J.1.4) | (B.1.38) |
| B1-3291 | (J.1.5) | (B.1.38) |
| B1-3292 | (J.1.8) | (B.1.38) |
| B1-3293 | (J.1.12) | (B.1.38) |
| B1-3294 | (K.1.13) | (B.1.38) |
| B1-3295 | (K.1.47) | (B.1.38) |
| B1-3296 | (K.1.54) | (B.1.38) |
| B1-3297 | (L.1.5) | (B.1.38) |
| B1-3298 | (L.1.9) | (B.1.38) |
| B1-3299 | (L.1.12) | (B.1.38) |
| B1-3300 | (L.1.13) | (B.1.38) |
| B1-3301 | (L.1.17) | (B.1.38) |
| B1-3302 | (L.1.23) | (B.1.38) |
| B1-3303 | (L.1.32), | (B.1.38) |
| B1-3304 | (L.1.46) | (B.1.38) |

TABLE B1-continued

| Mixture | Co 2) | Co3) |
|---|---|---|
| B1-3305 | (M.1.6) | (B.1.38) |
| B1-3306 | (M.1.24) | (B.1.38) |
| B1-3307 | (M.1.25) | (B.1.38) |
| B1-3308 | (M.1.28) | (B.1.38) |
| B1-3309 | (M.1.29) | (B.1.38) |
| B1-3310 | (M.1.30) | (B.1.38) |
| B1-3311 | (N.7.3) | (B.1.38) |
| B1-3312 | (N.7.4) | (B.1.38) |
| B1-3313 | (N.7.5) | (B.1.38) |
| B1-3314 | (N.13.13) | (B.1.38) |
| B1-3315 | (O.2.4), | (B.1.38) |
| B1-3316 | (O.4.5) | (B.1.38) |
| B1-3317 | (O.4.7) | (B.1.38) |
| B1-3318 | (O.4.8) | (B.1.38) |
| B1-3319 | (O.5.1) | (B.1.38) |
| B1-3320 | (O.26.2) | (B.1.38) |
| B1-3321 | (O.27.17) | (B.1.38) |
| B1-3322 | (A.1.1) | (B.3.1) |
| B1-3323 | (A.1.4) | (B.3.1) |
| B1-3324 | (A.1.8) | (B.3.1) |
| B1-3325 | (A.1.10) | (B.3.1) |
| B1-3326 | (A.1.11) | (B.3.1) |
| B1-3327 | (A.1.12) | (B.3.1) |
| B1-3328 | (A.1.14) | (B.3.1) |
| B1-3329 | (A.1.17) | (B.3.1) |
| B1-3330 | (A.1.19) | (B.3.1) |
| B1-3331 | (A.1.25) | (B.3.1) |
| B1-3332 | (A.1.34) | (B.3.1) |
| B1-3333 | (A.1.35) | (B.3.1) |
| B1-3334 | (A.1.38) | (B.3.1) |
| B1-3335 | (A.2.6) | (B.3.1) |
| B1-3336 | (A.3.2) | (B.3.1) |
| B1-3337 | (A.3.3) | (B.3.1) |
| B1-3338 | (A.3.4) | (B.3.1) |
| B1-3339 | (A.3.7) | (B.3.1) |
| B1-3340 | (A.3.8) | (B.3.1) |
| B1-3341 | (A.3.9) | (B.3.1) |
| B1-3342 | (A.3.10) | (B.3.1) |
| B1-3343 | (A.3.11) | (B.3.1) |
| B1-3344 | (A.3.12) | (B.3.1) |
| B1-3345 | (A.3.15) | (B.3.1) |
| B1-3346 | (A.3.16) | (B.3.1) |
| B1-3347 | (A.3.17) | (B.3.1) |
| B1-3348 | (A.3.19) | (B.3.1) |
| B1-3349 | (A.3.21) | (B.3.1) |
| B1-3350 | (A.3.22) | (B.3.1) |
| B1-3351 | (A.3.23) | (B.3.1) |
| B1-3352 | (A.3.28) | (B.3.1) |
| B1-3353 | (A.3.31) | (B.3.1) |
| B1-3354 | (A.4.5) | (B.3.1) |
| B1-3355 | (B.1.4) | (B.3.1) |
| B1-3356 | (B.1.5) | (B.3.1) |
| B1-3357 | (B.1.8) | (B.3.1) |
| B1-3358 | (B.1.10) | (B.3.1) |
| B1-3359 | (B.1.12) | (B.3.1) |
| B1-3360 | (B.1.15) | (B.3.1) |
| B1-3361 | (B.1.17) | (B.3.1) |
| B1-3362 | (B.1.18) | (B.3.1) |
| B1-3363 | (B.1.21) | (B.3.1) |
| B1-3364 | (B.1.22) | (B.3.1) |
| B1-3365 | (B.1.23) | (B.3.1) |
| B1-3366 | (B.1.25) | (B.3.1) |
| B1-3367 | (B.1.26) | (B.3.1) |
| B1-3368 | (B.1.29) | (B.3.1) |
| B1-3369 | (B.1.38) | (B.3.1) |
| B1-3370 | (B.1.44) | (B.3.1) |
| B1-3371 | (B.1.46) | (B.3.1) |
| B1-3372 | (B.2.4) | (B.3.1) |
| B1-3373 | (B.3.1) | (B.3.1) |
| B1-3374 | (C.1.4) | (B.3.1) |
| B1-3375 | (C.1.5) | (B.3.1) |
| B1-3376 | (C.2.1) | (B.3.1) |
| B1-3377 | (D.1.4) | (B.3.1) |
| B1-3378 | (D.1.5) | (B.3.1) |
| B1-3379 | (D.2.3) | (B.3.1) |
| B1-3380 | (D.2.5) | (B.3.1) |
| B1-3381 | (D.2.6) | (B.3.1) |
| B1-3382 | (E.1.1) | (B.3.1) |

TABLE B1-continued

| Mixture | Co 2) | Co3) |
|---|---|---|
| B1-3383 | (E.1.3) | (B.3.1) |
| B1-3384 | (E.2.2) | (B.3.1) |
| B1-3385 | (E.2.3), | (B.3.1) |
| B1-3386 | (F.1.2) | (B.3.1) |
| B1-3387 | (F.1.3) | (B.3.1) |
| B1-3388 | (F.1.5) | (B.3.1) |
| B1-3389 | (G.1.4) | (B.3.1) |
| B1-3390 | (G.3.1) | (B.3.1) |
| B1-3391 | (G.5.1) | (B.3.1) |
| B1-3392 | (H.1.2) | (B.3.1) |
| B1-3393 | (H.1.3) | (B.3.1) |
| B1-3394 | (H.1.4) | (B.3.1) |
| B1-3395 | (H.1.5) | (B.3.1) |
| B1-3396 | (H.1.6) | (B.3.1) |
| B1-3397 | (H.1.7) | (B.3.1) |
| B1-3398 | (H.2.2) | (B.3.1) |
| B1-3399 | (H.2.3) | (B.3.1) |
| B1-3400 | (H.2.5) | (B.3.1) |
| B1-3401 | (H.2.7) | (B.3.1) |
| B1-3402 | (H.3.2) | (B.3.1) |
| B1-3403 | (H.3.4) | (B.3.1) |
| B1-3404 | (H.3.5) | (B.3.1) |
| B1-3405 | (H.3.10) | (B.3.1) |
| B1-3406 | (H.4.2) | (B.3.1) |
| B1-3407 | (H.4.9) | (B.3.1) |
| B1-3408 | (I.1.1) | (B.3.1) |
| B1-3409 | (I.2.1) | (B.3.1) |
| B1-3410 | (I.2.2) | (B.3.1) |
| B1-3411 | (J.1.2) | (B.3.1) |
| B1-3412 | (J.1.3) | (B.3.1) |
| B1-3413 | (J.1.4) | (B.3.1) |
| B1-3414 | (J.1.5) | (B.3.1) |
| B1-3415 | (J.1.8) | (B.3.1) |
| B1-3416 | (J.1.12) | (B.3.1) |
| B1-3417 | (K.1.13) | (B.3.1) |
| B1-3418 | (K.1.47) | (B.3.1) |
| B1-3419 | (K.1.54) | (B.3.1) |
| B1-3420 | (L.1.5) | (B.3.1) |
| B1-3421 | (L.1.9) | (B.3.1) |
| B1-3422 | (L.1.12) | (B.3.1) |
| B1-3423 | (L.1.13) | (B.3.1) |
| B1-3424 | (L.1.17) | (B.3.1) |
| B1-3425 | (L.1.23) | (B.3.1) |
| B1-3426 | (L.1.32), | (B.3.1) |
| B1-3427 | (L.1.46) | (B.3.1) |
| B1-3428 | (M.1.6) | (B.3.1) |
| B1-3429 | (M.1.24) | (B.3.1) |
| B1-3430 | (M.1.25) | (B.3.1) |
| B1-3431 | (M.1.28) | (B.3.1) |
| B1-3432 | (M.1.29) | (B.3.1) |
| B1-3433 | (M.1.30) | (B.3.1) |
| B1-3434 | (N.7.3) | (B.3.1) |
| B1-3435 | (N.7.4) | (B.3.1) |
| B1-3436 | (N.7.5) | (B.3.1) |
| B1-3437 | (N.13.13) | (B.3.1) |
| B1-3438 | (O.2.4), | (B.3.1) |
| B1-3439 | (O.4.5) | (B.3.1) |
| B1-3440 | (O.4.7) | (B.3.1) |
| B1-3441 | (O.4.8) | (B.3.1) |
| B1-3442 | (O.5.1) | (B.3.1) |
| B1-3443 | (O.26.2) | (B.3.1) |
| B1-3444 | (O.27.17) | (B.3.1) |
| B1-3445 | (A.1.1) | (C.2.1) |
| B1-3446 | (A.1.4) | (C.2.1) |
| B1-3447 | (A.1.8) | (C.2.1) |
| B1-3448 | (A.1.10) | (C.2.1) |
| B1-3449 | (A.1.11) | (C.2.1) |
| B1-3450 | (A.1.12) | (C.2.1) |
| B1-3451 | (A.1.14) | (C.2.1) |
| B1-3452 | (A.1.17) | (C.2.1) |
| B1-3453 | (A.1.19) | (C.2.1) |
| B1-3454 | (A.1.25) | (C.2.1) |
| B1-3455 | (A.1.34) | (C.2.1) |
| B1-3456 | (A.1.35) | (C.2.1) |
| B1-3457 | (A.1.38) | (C.2.1) |
| B1-3458 | (A.2.6) | (C.2.1) |
| B1-3459 | (A.3.2) | (C.2.1) |
| B1-3460 | (A.3.3) | (C.2.1) |

TABLE B1-continued

| Mixture | Co 2) | Co3) |
|---|---|---|
| B1-3461 | (A.3.4) | (C.2.1) |
| B1-3462 | (A.3.7) | (C.2.1) |
| B1-3463 | (A.3.8) | (C.2.1) |
| B1-3464 | (A.3.9) | (C.2.1) |
| B1-3465 | (A.3.10) | (C.2.1) |
| B1-3466 | (A.3.11) | (C.2.1) |
| B1-3467 | (A.3.12) | (C.2.1) |
| B1-3468 | (A.3.15) | (C.2.1) |
| B1-3469 | (A.3.16) | (C.2.1) |
| B1-3470 | (A.3.17) | (C.2.1) |
| B1-3471 | (A.3.19) | (C.2.1) |
| B1-3472 | (A.3.21) | (C.2.1) |
| B1-3473 | (A.3.22) | (C.2.1) |
| B1-3474 | (A.3.23) | (C.2.1) |
| B1-3475 | (A.3.28) | (C.2.1) |
| B1-3476 | (A.3.31) | (C.2.1) |
| B1-3477 | (A.4.5) | (C.2.1) |
| B1-3478 | (B.1.4) | (C.2.1) |
| B1-3479 | (B.1.5) | (C.2.1) |
| B1-3480 | (B.1.8) | (C.2.1) |
| B1-3481 | (B.1.10) | (C.2.1) |
| B1-3482 | (B.1.12) | (C.2.1) |
| B1-3483 | (B.1.15) | (C.2.1) |
| B1-3484 | (B.1.17) | (C.2.1) |
| B1-3485 | (B.1.18) | (C.2.1) |
| B1-3486 | (B.1.21) | (C.2.1) |
| B1-3487 | (B.1.22) | (C.2.1) |
| B1-3488 | (B.1.23) | (C.2.1) |
| B1-3489 | (B.1.25) | (C.2.1) |
| B1-3490 | (B.1.26) | (C.2.1) |
| B1-3491 | (B.1.29) | (C.2.1) |
| B1-3492 | (B.1.38) | (C.2.1) |
| B1-3493 | (B.1.44) | (C.2.1) |
| B1-3494 | (B.1.46) | (C.2.1) |
| B1-3495 | (B.2.4) | (C.2.1) |
| B1-3496 | (B.3.1) | (C.2.1) |
| B1-3497 | (C.1.4) | (C.2.1) |
| B1-3498 | (C.1.5) | (C.2.1) |
| B1-3499 | (C.2.1) | (C.2.1) |
| B1-3500 | (D.1.4) | (C.2.1) |
| B1-3501 | (D.1.5) | (C.2.1) |
| B1-3502 | (D.2.3) | (C.2.1) |
| B1-3503 | (D.2.5) | (C.2.1) |
| B1-3504 | (D.2.6) | (C.2.1) |
| B1-3505 | (E.1.1) | (C.2.1) |
| B1-3506 | (E.1.3) | (C.2.1) |
| B1-3507 | (E.2.2) | (C.2.1) |
| B1-3508 | (E.2.3), | (C.2.1) |
| B1-3509 | (F.1.2) | (C.2.1) |
| B1-3510 | (F.1.3) | (C.2.1) |
| B1-3511 | (F.1.5) | (C.2.1) |
| B1-3512 | (G.1.4) | (C.2.1) |
| B1-3513 | (G.3.1) | (C.2.1) |
| B1-3514 | (G.5.1) | (C.2.1) |
| B1-3515 | (H.1.2) | (C.2.1) |
| B1-3516 | (H.1.3) | (C.2.1) |
| B1-3517 | (H.1.4) | (C.2.1) |
| B1-3518 | (H.1.5) | (C.2.1) |
| B1-3519 | (H.1.6) | (C.2.1) |
| B1-3520 | (H.1.7) | (C.2.1) |
| B1-3521 | (H.2.2) | (C.2.1) |
| B1-3522 | (H.2.3) | (C.2.1) |
| B1-3523 | (H.2.5) | (C.2.1) |
| B1-3524 | (H.2.7) | (C.2.1) |
| B1-3525 | (H.3.2) | (C.2.1) |
| B1-3526 | (H.3.4) | (C.2.1) |
| B1-3527 | (H.3.5) | (C.2.1) |
| B1-3528 | (H.3.10) | (C.2.1) |
| B1-3529 | (H.4.2) | (C.2.1) |
| B1-3530 | (H.4.9) | (C.2.1) |
| B1-3531 | (I.1.1) | (C.2.1) |
| B1-3532 | (I.2.1) | (C.2.1) |
| B1-3533 | (I.2.2) | (C.2.1) |
| B1-3534 | (J.1.2) | (C.2.1) |
| B1-3535 | (J.1.3) | (C.2.1) |
| B1-3536 | (J.1.4) | (C.2.1) |
| B1-3537 | (J.1.5) | (C.2.1) |
| B1-3538 | (J.1.8) | (C.2.1) |

TABLE B1-continued

| Mixture | Co 2) | Co3) |
|---|---|---|
| B1-3539 | (J.1.12) | (C.2.1) |
| B1-3540 | (K.1.13) | (C.2.1) |
| B1-3541 | (K.1.47) | (C.2.1) |
| B1-3542 | (K.1.54) | (C.2.1) |
| B1-3543 | (L.1.5) | (C.2.1) |
| B1-3544 | (L.1.9) | (C.2.1) |
| B1-3545 | (L.1.12) | (C.2.1) |
| B1-3546 | (L.1.13) | (C.2.1) |
| B1-3547 | (L.1.17) | (C.2.1) |
| B1-3548 | (L.1.23) | (C.2.1) |
| B1-3549 | (L.1.32), | (C.2.1) |
| B1-3550 | (L.1.46) | (C.2.1) |
| B1-3551 | (M.1.6) | (C.2.1) |
| B1-3552 | (M.1.24) | (C.2.1) |
| B1-3553 | (M.1.25) | (C.2.1) |
| B1-3554 | (M.1.28) | (C.2.1) |
| B1-3555 | (M.1.29) | (C.2.1) |
| B1-3556 | (M.1.30) | (C.2.1) |
| B1-3557 | (N.7.3) | (C.2.1) |
| B1-3558 | (N.7.4) | (C.2.1) |
| B1-3559 | (N.7.5) | (C.2.1) |
| B1-3560 | (N.13.13) | (C.2.1) |
| B1-3561 | (O.2.4), | (C.2.1) |
| B1-3562 | (O.4.5) | (C.2.1) |
| B1-3563 | (O.4.7) | (C.2.1) |
| B1-3564 | (O.4.8) | (C.2.1) |
| B1-3565 | (O.5.1) | (C.2.1) |
| B1-3566 | (O.26.2) | (C.2.1) |
| B1-3567 | (O.27.17) | (C.2.1) |
| B1-3568 | (A.1.1) | (D.1.5) |
| B1-3569 | (A.1.4) | (D.1.5) |
| B1-3570 | (A.1.8) | (D.1.5) |
| B1-3571 | (A.1.10) | (D.1.5) |
| B1-3572 | (A.1.11) | (D.1.5) |
| B1-3573 | (A.1.12) | (D.1.5) |
| B1-3574 | (A.1.14) | (D.1.5) |
| B1-3575 | (A.1.17) | (D.1.5) |
| B1-3576 | (A.1.19) | (D.1.5) |
| B1-3577 | (A.1.25) | (D.1.5) |
| B1-3578 | (A.1.34) | (D.1.5) |
| B1-3579 | (A.1.35) | (D.1.5) |
| B1-3580 | (A.1.38) | (D.1.5) |
| B1-3581 | (A.2.6) | (D.1.5) |
| B1-3582 | (A.3.2) | (D.1.5) |
| B1-3583 | (A.3.3) | (D.1.5) |
| B1-3584 | (A.3.4) | (D.1.5) |
| B1-3585 | (A.3.7) | (D.1.5) |
| B1-3586 | (A.3.8) | (D.1.5) |
| B1-3587 | (A.3.9) | (D.1.5) |
| B1-3588 | (A.3.10) | (D.1.5) |
| B1-3589 | (A.3.11) | (D.1.5) |
| B1-3590 | (A.3.12) | (D.1.5) |
| B1-3591 | (A.3.15) | (D.1.5) |
| B1-3592 | (A.3.16) | (D.1.5) |
| B1-3593 | (A.3.17) | (D.1.5) |
| B1-3594 | (A.3.19) | (D.1.5) |
| B1-3595 | (A.3.21) | (D.1.5) |
| B1-3596 | (A.3.22) | (D.1.5) |
| B1-3597 | (A.3.23) | (D.1.5) |
| B1-3598 | (A.3.28) | (D.1.5) |
| B1-3599 | (A.3.31) | (D.1.5) |
| B1-3600 | (A.4.5) | (D.1.5) |
| B1-3601 | (B.1.4) | (D.1.5) |
| B1-3602 | (B.1.5) | (D.1.5) |
| B1-3603 | (B.1.8) | (D.1.5) |
| B1-3604 | (B.1.10) | (D.1.5) |
| B1-3605 | (B.1.12) | (D.1.5) |
| B1-3606 | (B.1.15) | (D.1.5) |
| B1-3607 | (B.1.17) | (D.1.5) |
| B1-3608 | (B.1.18) | (D.1.5) |
| B1-3609 | (B.1.21) | (D.1.5) |
| B1-3610 | (B.1.22) | (D.1.5) |
| B1-3611 | (B.1.23) | (D.1.5) |
| B1-3612 | (B.1.25) | (D.1.5) |
| B1-3613 | (B.1.26) | (D.1.5) |
| B1-3614 | (B.1.29) | (D.1.5) |
| B1-3615 | (B.1.38) | (D.1.5) |
| B1-3616 | (B.1.44) | (D.1.5) |

TABLE B1-continued

| Mixture | Co 2) | Co3) |
|---|---|---|
| B1-3617 | (B.1.46) | (D.1.5) |
| B1-3618 | (B.2.4) | (D.1.5) |
| B1-3619 | (B.3.1) | (D.1.5) |
| B1-3620 | (C.1.4) | (D.1.5) |
| B1-3621 | (C.1.5) | (D.1.5) |
| B1-3622 | (C.2.1) | (D.1.5) |
| B1-3623 | (D.1.4) | (D.1.5) |
| B1-3624 | (D.1.5) | (D.1.5) |
| B1-3625 | (D.2.3) | (D.1.5) |
| B1-3626 | (D.2.5) | (D.1.5) |
| B1-3627 | (D.2.6) | (D.1.5) |
| B1-3628 | (E.1.1) | (D.1.5) |
| B1-3629 | (E.1.3) | (D.1.5) |
| B1-3630 | (E.2.2) | (D.1.5) |
| B1-3631 | (E.2.3), | (D.1.5) |
| B1-3632 | (F.1.2) | (D.1.5) |
| B1-3633 | (F.1.3) | (D.1.5) |
| B1-3634 | (F.1.5) | (D.1.5) |
| B1-3635 | (G.1.4) | (D.1.5) |
| B1-3636 | (G.3.1) | (D.1.5) |
| B1-3637 | (G.5.1) | (D.1.5) |
| B1-3638 | (H.1.2) | (D.1.5) |
| B1-3639 | (H.1.3) | (D.1.5) |
| B1-3640 | (H.1.4) | (D.1.5) |
| B1-3641 | (H.1.5) | (D.1.5) |
| B1-3642 | (H.1.6) | (D.1.5) |
| B1-3643 | (H.1.7) | (D.1.5) |
| B1-3644 | (H.2.2) | (D.1.5) |
| B1-3645 | (H.2.3) | (D.1.5) |
| B1-3646 | (H.2.5) | (D.1.5) |
| B1-3647 | (H.2.7) | (D.1.5) |
| B1-3648 | (H.3.2) | (D.1.5) |
| B1-3649 | (H.3.4) | (D.1.5) |
| B1-3650 | (H.3.5) | (D.1.5) |
| B1-3651 | (H.3.10) | (D.1.5) |
| B1-3652 | (H.4.2) | (D.1.5) |
| B1-3653 | (H.4.9) | (D.1.5) |
| B1-3654 | (I.1.1) | (D.1.5) |
| B1-3655 | (I.2.1) | (D.1.5) |
| B1-3656 | (I.2.2) | (D.1.5) |
| B1-3657 | (J.1.2) | (D.1.5) |
| B1-3658 | (J.1.3) | (D.1.5) |
| B1-3659 | (J.1.4) | (D.1.5) |
| B1-3660 | (J.1.5) | (D.1.5) |
| B1-3661 | (J.1.8) | (D.1.5) |
| B1-3662 | (J.1.12) | (D.1.5) |
| B1-3663 | (K.1.13) | (D.1.5) |
| B1-3664 | (K.1.47) | (D.1.5) |
| B1-3665 | (K.1.54) | (D.1.5) |
| B1-3666 | (L.1.5) | (D.1.5) |
| B1-3667 | (L.1.9) | (D.1.5) |
| B1-3668 | (L.1.12) | (D.1.5) |
| B1-3669 | (L.1.13) | (D.1.5) |
| B1-3670 | (L.1.17) | (D.1.5) |
| B1-3671 | (L.1.23) | (D.1.5) |
| B1-3672 | (L.1.32), | (D.1.5) |
| B1-3673 | (L.1.46) | (D.1.5) |
| B1-3674 | (M.1.6) | (D.1.5) |
| B1-3675 | (M.1.24) | (D.1.5) |
| B1-3676 | (M.1.25) | (D.1.5) |
| B1-3677 | (M.1.28) | (D.1.5) |
| B1-3678 | (M.1.29) | (D.1.5) |
| B1-3679 | (M.1.30) | (D.1.5) |
| B1-3680 | (N.7.3) | (D.1.5) |
| B1-3681 | (N.7.4) | (D.1.5) |
| B1-3682 | (N.7.5) | (D.1.5) |
| B1-3683 | (N.13.13) | (D.1.5) |
| B1-3684 | (O.2.4), | (D.1.5) |
| B1-3685 | (O.4.5) | (D.1.5) |
| B1-3686 | (O.4.7) | (D.1.5) |
| B1-3687 | (O.4.8) | (D.1.5) |
| B1-3688 | (O.5.1) | (D.1.5) |
| B1-3689 | (O.26.2) | (D.1.5) |
| B1-3690 | (O.27.17) | (D.1.5) |
| B1-3691 | (A.1.1) | (E.1.3) |
| B1-3692 | (A.1.4) | (E.1.3) |
| B1-3693 | (A.1.8) | (E.1.3) |
| B1-3694 | (A.1.10) | (E.1.3) |

TABLE B1-continued

| Mixture | Co 2) | Co3) |
|---|---|---|
| B1-3695 | (A.1.11) | (E.1.3) |
| B1-3696 | (A.1.12) | (E.1.3) |
| B1-3697 | (A.1.14) | (E.1.3) |
| B1-3698 | (A.1.17) | (E.1.3) |
| B1-3699 | (A.1.19) | (E.1.3) |
| B1-3700 | (A.1.25) | (E.1.3) |
| B1-3701 | (A.1.34) | (E.1.3) |
| B1-3702 | (A.1.35) | (E.1.3) |
| B1-3703 | (A.1.38) | (E.1.3) |
| B1-3704 | (A.2.6) | (E.1.3) |
| B1-3705 | (A.3.2) | (E.1.3) |
| B1-3706 | (A.3.3) | (E.1.3) |
| B1-3707 | (A.3.4) | (E.1.3) |
| B1-3708 | (A.3.7) | (E.1.3) |
| B1-3709 | (A.3.8) | (E.1.3) |
| B1-3710 | (A.3.9) | (E.1.3) |
| B1-3711 | (A.3.10) | (E.1.3) |
| B1-3712 | (A.3.11) | (E.1.3) |
| B1-3713 | (A.3.12) | (E.1.3) |
| B1-3714 | (A.3.15) | (E.1.3) |
| B1-3715 | (A.3.16) | (E.1.3) |
| B1-3716 | (A.3.17) | (E.1.3) |
| B1-3717 | (A.3.19) | (E.1.3) |
| B1-3718 | (A.3.21) | (E.1.3) |
| B1-3719 | (A.3.22) | (E.1.3) |
| B1-3720 | (A.3.23) | (E.1.3) |
| B1-3721 | (A.3.28) | (E.1.3) |
| B1-3722 | (A.3.31) | (E.1.3) |
| B1-3723 | (A.4.5) | (E.1.3) |
| B1-3724 | (B.1.4) | (E.1.3) |
| B1-3725 | (B.1.5) | (E.1.3) |
| B1-3726 | (B.1.8) | (E.1.3) |
| B1-3727 | (B.1.10) | (E.1.3) |
| B1-3728 | (B.1.12) | (E.1.3) |
| B1-3729 | (B.1.15) | (E.1.3) |
| B1-3730 | (B.1.17) | (E.1.3) |
| B1-3731 | (B.1.18) | (E.1.3) |
| B1-3732 | (B.1.21) | (E.1.3) |
| B1-3733 | (B.1.22) | (E.1.3) |
| B1-3734 | (B.1.23) | (E.1.3) |
| B1-3735 | (B.1.25) | (E.1.3) |
| B1-3736 | (B.1.26) | (E.1.3) |
| B1-3737 | (B.1.29) | (E.1.3) |
| B1-3738 | (B.1.38) | (E.1.3) |
| B1-3739 | (B.1.44) | (E.1.3) |
| B1-3740 | (B.1.46) | (E.1.3) |
| B1-3741 | (B.2.4) | (E.1.3) |
| B1-3742 | (B.3.1) | (E.1.3) |
| B1-3743 | (C.1.4) | (E.1.3) |
| B1-3744 | (C.1.5) | (E.1.3) |
| B1-3745 | (C.2.1) | (E.1.3) |
| B1-3746 | (D.1.4) | (E.1.3) |
| B1-3747 | (D.1.5) | (E.1.3) |
| B1-3748 | (D.2.3) | (E.1.3) |
| B1-3749 | (D.2.5) | (E.1.3) |
| B1-3750 | (D.2.6) | (E.1.3) |
| B1-3751 | (E.1.1) | (E.1.3) |
| B1-3752 | (E.1.3) | (E.1.3) |
| B1-3753 | (E.2.2) | (E.1.3) |
| B1-3754 | (E.2.3), | (E.1.3) |
| B1-3755 | (F.1.2) | (E.1.3) |
| B1-3756 | (F.1.3) | (E.1.3) |
| B1-3757 | (F.1.5) | (E.1.3) |
| B1-3758 | (G.1.4) | (E.1.3) |
| B1-3759 | (G.3.1) | (E.1.3) |
| B1-3760 | (G.5.1) | (E.1.3) |
| B1-3761 | (H.1.2) | (E.1.3) |
| B1-3762 | (H.1.3) | (E.1.3) |
| B1-3763 | (H.1.4) | (E.1.3) |
| B1-3764 | (H.1.5) | (E.1.3) |
| B1-3765 | (H.1.6) | (E.1.3) |
| B1-3766 | (H.1.7) | (E.1.3) |
| B1-3767 | (H.2.2) | (E.1.3) |
| B1-3768 | (H.2.3) | (E.1.3) |
| B1-3769 | (H.2.5) | (E.1.3) |
| B1-3770 | (H.2.7) | (E.1.3) |
| B1-3771 | (H.3.2) | (E.1.3) |
| B1-3772 | (H.3.4) | (E.1.3) |

TABLE B1-continued

| Mixture | Co 2) | Co3) |
|---|---|---|
| B1-3773 | (H.3.5) | (E.1.3) |
| B1-3774 | (H.3.10) | (E.1.3) |
| B1-3775 | (H.4.2) | (E.1.3) |
| B1-3776 | (H.4.9) | (E.1.3) |
| B1-3777 | (I.1.1) | (E.1.3) |
| B1-3778 | (I.2.1) | (E.1.3) |
| B1-3779 | (I.2.2) | (E.1.3) |
| B1-3780 | (J.1.2) | (E.1.3) |
| B1-3781 | (J.1.3) | (E.1.3) |
| B1-3782 | (J.1.4) | (E.1.3) |
| B1-3783 | (J.1.5) | (E.1.3) |
| B1-3784 | (J.1.8) | (E.1.3) |
| B1-3785 | (J.1.12) | (E.1.3) |
| B1-3786 | (K.1.13) | (E.1.3) |
| B1-3787 | (K.1.47) | (E.1.3) |
| B1-3788 | (K.1.54) | (E.1.3) |
| B1-3789 | (L.1.5) | (E.1.3) |
| B1-3790 | (L.1.9) | (E.1.3) |
| B1-3791 | (L.1.12) | (E.1.3) |
| B1-3792 | (L.1.13) | (E.1.3) |
| B1-3793 | (L.1.17) | (E.1.3) |
| B1-3794 | (L.1.23) | (E.1.3) |
| B1-3795 | (L.1.32), | (E.1.3) |
| B1-3796 | (L.1.46) | (E.1.3) |
| B1-3797 | (M.1.6) | (E.1.3) |
| B1-3798 | (M.1.24) | (E.1.3) |
| B1-3799 | (M.1.25) | (E.1.3) |
| B1-3800 | (M.1.28) | (E.1.3) |
| B1-3801 | (M.1.29) | (E.1.3) |
| B1-3802 | (M.1.30) | (E.1.3) |
| B1-3803 | (N.7.3) | (E.1.3) |
| B1-3804 | (N.7.4) | (E.1.3) |
| B1-3805 | (N.7.5) | (E.1.3) |
| B1-3806 | (N.13.13) | (E.1.3) |
| B1-3807 | (O.2.4), | (E.1.3) |
| B1-3808 | (O.4.5) | (E.1.3) |
| B1-3809 | (O.4.7) | (E.1.3) |
| B1-3810 | (O.4.8) | (E.1.3) |
| B1-3811 | (O.5.1) | (E.1.3) |
| B1-3812 | (O.26.2) | (E.1.3) |
| B1-3813 | (O.27.17) | (E.1.3) |
| B1-3814 | (A.1.1) | (F.1.2) |
| B1-3815 | (A.1.4) | (F.1.2) |
| B1-3816 | (A.1.8) | (F.1.2) |
| B1-3817 | (A.1.10) | (F.1.2) |
| B1-3818 | (A.1.11) | (F.1.2) |
| B1-3819 | (A.1.12) | (F.1.2) |
| B1-3820 | (A.1.14) | (F.1.2) |
| B1-3821 | (A.1.17) | (F.1.2) |
| B1-3822 | (A.1.19) | (F.1.2) |
| B1-3823 | (A.1.25) | (F.1.2) |
| B1-3824 | (A.1.34) | (F.1.2) |
| B1-3825 | (A.1.35) | (F.1.2) |
| B1-3826 | (A.1.38) | (F.1.2) |
| B1-3827 | (A.2.6) | (F.1.2) |
| B1-3828 | (A.3.2) | (F.1.2) |
| B1-3829 | (A.3.3) | (F.1.2) |
| B1-3830 | (A.3.4) | (F.1.2) |
| B1-3831 | (A.3.7) | (F.1.2) |
| B1-3832 | (A.3.8) | (F.1.2) |
| B1-3833 | (A.3.9) | (F.1.2) |
| B1-3834 | (A.3.10) | (F.1.2) |
| B1-3835 | (A.3.11) | (F.1.2) |
| B1-3836 | (A.3.12) | (F.1.2) |
| B1-3837 | (A.3.15) | (F.1.2) |
| B1-3838 | (A.3.16) | (F.1.2) |
| B1-3839 | (A.3.17) | (F.1.2) |
| B1-3840 | (A.3.19) | (F.1.2) |
| B1-3841 | (A.3.21) | (F.1.2) |
| B1-3842 | (A.3.22) | (F.1.2) |
| B1-3843 | (A.3.23) | (F.1.2) |
| B1-3844 | (A.3.28) | (F.1.2) |
| B1-3845 | (A.3.31) | (F.1.2) |
| B1-3846 | (A.4.5) | (F.1.2) |
| B1-3847 | (B.1.4) | (F.1.2) |
| B1-3848 | (B.1.5) | (F.1.2) |
| B1-3849 | (B.1.8) | (F.1.2) |
| B1-3850 | (B.1.10) | (F.1.2) |

TABLE B1-continued

| Mixture | Co 2) | Co3) |
|---|---|---|
| B1-3851 | (B.1.12) | (F.1.2) |
| B1-3852 | (B.1.15) | (F.1.2) |
| B1-3853 | (B.1.17) | (F.1.2) |
| B1-3854 | (B.1.18) | (F.1.2) |
| B1-3855 | (B.1.21) | (F.1.2) |
| B1-3856 | (B.1.22) | (F.1.2) |
| B1-3857 | (B.1.23) | (F.1.2) |
| B1-3858 | (B.1.25) | (F.1.2) |
| B1-3859 | (B.1.26) | (F.1.2) |
| B1-3860 | (B.1.29) | (F.1.2) |
| B1-3861 | (B.1.38) | (F.1.2) |
| B1-3862 | (B.1.44) | (F.1.2) |
| B1-3863 | (B.1.46) | (F.1.2) |
| B1-3864 | (B.2.4) | (F.1.2) |
| B1-3865 | (B.3.1) | (F.1.2) |
| B1-3866 | (C.1.4) | (F.1.2) |
| B1-3867 | (C.1.5) | (F.1.2) |
| B1-3868 | (C.2.1) | (F.1.2) |
| B1-3869 | (D.1.4) | (F.1.2) |
| B1-3870 | (D.1.5) | (F.1.2) |
| B1-3871 | (D.2.3) | (F.1.2) |
| B1-3872 | (D.2.5) | (F.1.2) |
| B1-3873 | (D.2.6) | (F.1.2) |
| B1-3874 | (E.1.1) | (F.1.2) |
| B1-3875 | (E.1.3) | (F.1.2) |
| B1-3876 | (E.2.2) | (F.1.2) |
| B1-3877 | (E.2.3), | (F.1.2) |
| B1-3878 | (F.1.2) | (F.1.2) |
| B1-3879 | (F.1.3) | (F.1.2) |
| B1-3880 | (F.1.5) | (F.1.2) |
| B1-3881 | (G.1.4) | (F.1.2) |
| B1-3882 | (G.3.1) | (F.1.2) |
| B1-3883 | (G.5.1) | (F.1.2) |
| B1-3884 | (H.1.2) | (F.1.2) |
| B1-3885 | (H.1.3) | (F.1.2) |
| B1-3886 | (H.1.4) | (F.1.2) |
| B1-3887 | (H.1.5) | (F.1.2) |
| B1-3888 | (H.1.6) | (F.1.2) |
| B1-3889 | (H.1.7) | (F.1.2) |
| B1-3890 | (H.2.2) | (F.1.2) |
| B1-3891 | (H.2.3) | (F.1.2) |
| B1-3892 | (H.2.5) | (F.1.2) |
| B1-3893 | (H.2.7) | (F.1.2) |
| B1-3894 | (H.3.2) | (F.1.2) |
| B1-3895 | (H.3.4) | (F.1.2) |
| B1-3896 | (H.3.5) | (F.1.2) |
| B1-3897 | (H.3.10) | (F.1.2) |
| B1-3898 | (H.4.2) | (F.1.2) |
| B1-3899 | (H.4.9) | (F.1.2) |
| B1-3900 | (I.1.1) | (F.1.2) |
| B1-3901 | (I.2.1) | (F.1.2) |
| B1-3902 | (I.2.2) | (F.1.2) |
| B1-3903 | (J.1.2) | (F.1.2) |
| B1-3904 | (J.1.3) | (F.1.2) |
| B1-3905 | (J.1.4) | (F.1.2) |
| B1-3906 | (J.1.5) | (F.1.2) |
| B1-3907 | (J.1.8) | (F.1.2) |
| B1-3908 | (J.1.12) | (F.1.2) |
| B1-3909 | (K.1.13) | (F.1.2) |
| B1-3910 | (K.1.47) | (F.1.2) |
| B1-3911 | (K.1.54) | (F.1.2) |
| B1-3912 | (L.1.5) | (F.1.2) |
| B1-3913 | (L.1.9) | (F.1.2) |
| B1-3914 | (L.1.12) | (F.1.2) |
| B1-3915 | (L.1.13) | (F.1.2) |
| B1-3916 | (L.1.17) | (F.1.2) |
| B1-3917 | (L.1.23) | (F.1.2) |
| B1-3918 | (L.1.32), | (F.1.2) |
| B1-3919 | (L.1.46) | (F.1.2) |
| B1-3920 | (M.1.6) | (F.1.2) |
| B1-3921 | (M.1.24) | (F.1.2) |
| B1-3922 | (M.1.25) | (F.1.2) |
| B1-3923 | (M.1.28) | (F.1.2) |
| B1-3924 | (M.1.29) | (F.1.2) |
| B1-3925 | (M.1.30) | (F.1.2) |
| B1-3926 | (N.7.3) | (F.1.2) |
| B1-3927 | (N.7.4) | (F.1.2) |
| B1-3928 | (N.7.5) | (F.1.2) |

TABLE B1-continued

| Mixture | Co 2) | Co3) |
|---|---|---|
| B1-3929 | (N.13.13) | (F.1.2) |
| B1-3930 | (O.2.4), | (F.1.2) |
| B1-3931 | (O.4.5) | (F.1.2) |
| B1-3932 | (O.4.7) | (F.1.2) |
| B1-3933 | (O.4.8) | (F.1.2) |
| B1-3934 | (O.5.1) | (F.1.2) |
| B1-3935 | (O.26.2) | (F.1.2) |
| B1-3936 | (O.27.17) | (F.1.2) |
| B1-3937 | (A.1.1) | (F.1.5) |
| B1-3938 | (A.1.4) | (F.1.5) |
| B1-3939 | (A.1.8) | (F.1.5) |
| B1-3940 | (A.1.10) | (F.1.5) |
| B1-3941 | (A.1.11) | (F.1.5) |
| B1-3942 | (A.1.12) | (F.1.5) |
| B1-3943 | (A.1.14) | (F.1.5) |
| B1-3944 | (A.1.17) | (F.1.5) |
| B1-3945 | (A.1.19) | (F.1.5) |
| B1-3946 | (A.1.25) | (F.1.5) |
| B1-3947 | (A.1.34) | (F.1.5) |
| B1-3948 | (A.1.35) | (F.1.5) |
| B1-3949 | (A.1.38) | (F.1.5) |
| B1-3950 | (A.2.6) | (F.1.5) |
| B1-3951 | (A.3.2) | (F.1.5) |
| B1-3952 | (A.3.3) | (F.1.5) |
| B1-3953 | (A.3.4) | (F.1.5) |
| B1-3954 | (A.3.7) | (F.1.5) |
| B1-3955 | (A.3.8) | (F.1.5) |
| B1-3956 | (A.3.9) | (F.1.5) |
| B1-3957 | (A.3.10) | (F.1.5) |
| B1-3958 | (A.3.11) | (F.1.5) |
| B1-3959 | (A.3.12) | (F.1.5) |
| B1-3960 | (A.3.15) | (F.1.5) |
| B1-3961 | (A.3.16) | (F.1.5) |
| B1-3962 | (A.3.17) | (F.1.5) |
| B1-3963 | (A.3.19) | (F.1.5) |
| B1-3964 | (A.3.21) | (F.1.5) |
| B1-3965 | (A.3.22) | (F.1.5) |
| B1-3966 | (A.3.23) | (F.1.5) |
| B1-3967 | (A.3.28) | (F.1.5) |
| B1-3968 | (A.3.31) | (F.1.5) |
| B1-3969 | (A.4.5) | (F.1.5) |
| B1-3970 | (B.1.4) | (F.1.5) |
| B1-3971 | (B.1.5) | (F.1.5) |
| B1-3972 | (B.1.8) | (F.1.5) |
| B1-3973 | (B.1.10) | (F.1.5) |
| B1-3974 | (B.1.12) | (F.1.5) |
| B1-3975 | (B.1.15) | (F.1.5) |
| B1-3976 | (B.1.17) | (F.1.5) |
| B1-3977 | (B.1.18) | (F.1.5) |
| B1-3978 | (B.1.21) | (F.1.5) |
| B1-3979 | (B.1.22) | (F.1.5) |
| B1-3980 | (B.1.23) | (F.1.5) |
| B1-3981 | (B.1.25) | (F.1.5) |
| B1-3982 | (B.1.26) | (F.1.5) |
| B1-3983 | (B.1.29) | (F.1.5) |
| B1-3984 | (B.1.38) | (F.1.5) |
| B1-3985 | (B.1.44) | (F.1.5) |
| B1-3986 | (B.1.46) | (F.1.5) |
| B1-3987 | (B.2.4) | (F.1.5) |
| B1-3988 | (B.3.1) | (F.1.5) |
| B1-3989 | (C.1.4) | (F.1.5) |
| B1-3990 | (C.1.5) | (F.1.5) |
| B1-3991 | (C.2.1) | (F.1.5) |
| B1-3992 | (D.1.4) | (F.1.5) |
| B1-3993 | (D.1.5) | (F.1.5) |
| B1-3994 | (D.2.3) | (F.1.5) |
| B1-3995 | (D.2.5) | (F.1.5) |
| B1-3996 | (D.2.6) | (F.1.5) |
| B1-3997 | (E.1.1) | (F.1.5) |
| B1-3998 | (E.1.3) | (F.1.5) |
| B1-3999 | (E.2.2) | (F.1.5) |
| B1-4000 | (E.2.3), | (F.1.5) |
| B1-4001 | (F.1.2) | (F.1.5) |
| B1-4002 | (F.1.3) | (F.1.5) |
| B1-4003 | (F.1.5) | (F.1.5) |
| B1-4004 | (G.1.4) | (F.1.5) |
| B1-4005 | (G.3.1) | (F.1.5) |
| B1-4006 | (G.5.1) | (F.1.5) |

TABLE B1-continued

| Mixture | Co 2) | Co3) |
|---|---|---|
| B1-4007 | (H.1.2) | (F.1.5) |
| B1-4008 | (H.1.3) | (F.1.5) |
| B1-4009 | (H.1.4) | (F.1.5) |
| B1-4010 | (H.1.5) | (F.1.5) |
| B1-4011 | (H.1.6) | (F.1.5) |
| B1-4012 | (H.1.7) | (F.1.5) |
| B1-4013 | (H.2.2) | (F.1.5) |
| B1-4014 | (H.2.3) | (F.1.5) |
| B1-4015 | (H.2.5) | (F.1.5) |
| B1-4016 | (H.2.7) | (F.1.5) |
| B1-4017 | (H.3.2) | (F.1.5) |
| B1-4018 | (H.3.4) | (F.1.5) |
| B1-4019 | (H.3.5) | (F.1.5) |
| B1-4020 | (H.3.10) | (F.1.5) |
| B1-4021 | (H.4.2) | (F.1.5) |
| B1-4022 | (H.4.9) | (F.1.5) |
| B1-4023 | (I.1.1) | (F.1.5) |
| B1-4024 | (I.2.1) | (F.1.5) |
| B1-4025 | (I.2.2) | (F.1.5) |
| B1-4026 | (J.1.2) | (F.1.5) |
| B1-4027 | (J.1.3) | (F.1.5) |
| B1-4028 | (J.1.4) | (F.1.5) |
| B1-4029 | (J.1.5) | (F.1.5) |
| B1-4030 | (J.1.8) | (F.1.5) |
| B1-4031 | (J.1.12) | (F.1.5) |
| B1-4032 | (K.1.13) | (F.1.5) |
| B1-4033 | (K.1.47) | (F.1.5) |
| B1-4034 | (K.1.54) | (F.1.5) |
| B1-4035 | (L.1.5) | (F.1.5) |
| B1-4036 | (L.1.9) | (F.1.5) |
| B1-4037 | (L.1.12) | (F.1.5) |
| B1-4038 | (L.1.13) | (F.1.5) |
| B1-4039 | (L.1.17) | (F.1.5) |
| B1-4040 | (L.1.23) | (F.1.5) |
| B1-4041 | (L.1.32), | (F.1.5) |
| B1-4042 | (L.1.46) | (F.1.5) |
| B1-4043 | (M.1.6) | (F.1.5) |
| B1-4044 | (M.1.24) | (F.1.5) |
| B1-4045 | (M.1.25) | (F.1.5) |
| B1-4046 | (M.1.28) | (F.1.5) |
| B1-4047 | (M.1.29) | (F.1.5) |
| B1-4048 | (M.1.30) | (F.1.5) |
| B1-4049 | (N.7.3) | (F.1.5) |
| B1-4050 | (N.7.4) | (F.1.5) |
| B1-4051 | (N.7.5) | (F.1.5) |
| B1-4052 | (N.13.13) | (F.1.5) |
| B1-4053 | (O.2.4), | (F.1.5) |
| B1-4054 | (O.4.5) | (F.1.5) |
| B1-4055 | (O.4.7) | (F.1.5) |
| B1-4056 | (O.4.8) | (F.1.5) |
| B1-4057 | (O.5.1) | (F.1.5) |
| B1-4058 | (O.26.2) | (F.1.5) |
| B1-4059 | (O.27.17) | (F.1.5) |
| B1-4060 | (A.1.1) | (G.1.4) |
| B1-4061 | (A.1.4) | (G.1.4) |
| B1-4062 | (A.1.8) | (G.1.4) |
| B1-4063 | (A.1.10) | (G.1.4) |
| B1-4064 | (A.1.11) | (G.1.4) |
| B1-4065 | (A.1.12) | (G.1.4) |
| B1-4066 | (A.1.14) | (G.1.4) |
| B1-4067 | (A.1.17) | (G.1.4) |
| B1-4068 | (A.1.19) | (G.1.4) |
| B1-4069 | (A.1.25) | (G.1.4) |
| B1-4070 | (A.1.34) | (G.1.4) |
| B1-4071 | (A.1.35) | (G.1.4) |
| B1-4072 | (A.1.38) | (G.1.4) |
| B1-4073 | (A.2.6) | (G.1.4) |
| B1-4074 | (A.3.2) | (G.1.4) |
| B1-4075 | (A.3.3) | (G.1.4) |
| B1-4076 | (A.3.4) | (G.1.4) |
| B1-4077 | (A.3.7) | (G.1.4) |
| B1-4078 | (A.3.8) | (G.1.4) |
| B1-4079 | (A.3.9) | (G.1.4) |
| B1-4080 | (A.3.10) | (G.1.4) |
| B1-4081 | (A.3.11) | (G.1.4) |
| B1-4082 | (A.3.12) | (G.1.4) |
| B1-4083 | (A.3.15) | (G.1.4) |
| B1-4084 | (A.3.16) | (G.1.4) |

TABLE B1-continued

| Mixture | Co 2) | Co3) |
|---|---|---|
| B1-4085 | (A.3.17) | (G.1.4) |
| B1-4086 | (A.3.19) | (G.1.4) |
| B1-4087 | (A.3.21) | (G.1.4) |
| B1-4088 | (A.3.22) | (G.1.4) |
| B1-4089 | (A.3.23) | (G.1.4) |
| B1-4090 | (A.3.28) | (G.1.4) |
| B1-4091 | (A.3.31) | (G.1.4) |
| B1-4092 | (A.4.5) | (G.1.4) |
| B1-4093 | (B.1.4) | (G.1.4) |
| B1-4094 | (B.1.5) | (G.1.4) |
| B1-4095 | (B.1.8) | (G.1.4) |
| B1-4096 | (B.1.10) | (G.1.4) |
| B1-4097 | (B.1.12) | (G.1.4) |
| B1-4098 | (B.1.15) | (G.1.4) |
| B1-4099 | (B.1.17) | (G.1.4) |
| B1-4100 | (B.1.18) | (G.1.4) |
| B1-4101 | (B.1.21) | (G.1.4) |
| B1-4102 | (B.1.22) | (G.1.4) |
| B1-4103 | (B.1.23) | (G.1.4) |
| B1-4104 | (B.1.25) | (G.1.4) |
| B1-4105 | (B.1.26) | (G.1.4) |
| B1-4106 | (B.1.29) | (G.1.4) |
| B1-4107 | (B.1.38) | (G.1.4) |
| B1-4108 | (B.1.44) | (G.1.4) |
| B1-4109 | (B.1.46) | (G.1.4) |
| B1-4110 | (B.2.4) | (G.1.4) |
| B1-4111 | (B.3.1) | (G.1.4) |
| B1-4112 | (C.1.4) | (G.1.4) |
| B1-4113 | (C.1.5) | (G.1.4) |
| B1-4114 | (C.2.1) | (G.1.4) |
| B1-4115 | (D.1.4) | (G.1.4) |
| B1-4116 | (D.1.5) | (G.1.4) |
| B1-4117 | (D.2.3) | (G.1.4) |
| B1-4118 | (D.2.5) | (G.1.4) |
| B1-4119 | (D.2.6) | (G.1.4) |
| B1-4120 | (E.1.1) | (G.1.4) |
| B1-4121 | (E.1.3) | (G.1.4) |
| B1-4122 | (E.2.2) | (G.1.4) |
| B1-4123 | (E.2.3), | (G.1.4) |
| B1-4124 | (F.1.2) | (G.1.4) |
| B1-4125 | (F.1.3) | (G.1.4) |
| B1-4126 | (F.1.5) | (G.1.4) |
| B1-4127 | (G.1.4) | (G.1.4) |
| B1-4128 | (G.3.1) | (G.1.4) |
| B1-4129 | (G.5.1) | (G.1.4) |
| B1-4130 | (H.1.2) | (G.1.4) |
| B1-4131 | (H.1.3) | (G.1.4) |
| B1-4132 | (H.1.4) | (G.1.4) |
| B1-4133 | (H.1.5) | (G.1.4) |
| B1-4134 | (H.1.6) | (G.1.4) |
| B1-4135 | (H.1.7) | (G.1.4) |
| B1-4136 | (H.2.2) | (G.1.4) |
| B1-4137 | (H.2.3) | (G.1.4) |
| B1-4138 | (H.2.5) | (G.1.4) |
| B1-4139 | (H.2.7) | (G.1.4) |
| B1-4140 | (H.3.2) | (G.1.4) |
| B1-4141 | (H.3.4) | (G.1.4) |
| B1-4142 | (H.3.5) | (G.1.4) |
| B1-4143 | (H.3.10) | (G.1.4) |
| B1-4144 | (H.4.2) | (G.1.4) |
| B1-4145 | (H.4.9) | (G.1.4) |
| B1-4146 | (I.1.1) | (G.1.4) |
| B1-4147 | (I.2.1) | (G.1.4) |
| B1-4148 | (I.2.2) | (G.1.4) |
| B1-4149 | (J.1.2) | (G.1.4) |
| B1-4150 | (J.1.3) | (G.1.4) |
| B1-4151 | (J.1.4) | (G.1.4) |
| B1-4152 | (J.1.5) | (G.1.4) |
| B1-4153 | (J.1.8) | (G.1.4) |
| B1-4154 | (J.1.12) | (G.1.4) |
| B1-4155 | (K.1.13) | (G.1.4) |
| B1-4156 | (K.1.47) | (G.1.4) |
| B1-4157 | (K.1.54) | (G.1.4) |
| B1-4158 | (L.1.5) | (G.1.4) |
| B1-4159 | (L.1.9) | (G.1.4) |
| B1-4160 | (L.1.12) | (G.1.4) |
| B1-4161 | (L.1.13) | (G.1.4) |
| B1-4162 | (L.1.17) | (G.1.4) |

TABLE B1-continued

| Mixture | Co 2) | Co3) |
|---|---|---|
| B1-4163 | (L.1.23) | (G.1.4) |
| B1-4164 | (L.1.32), | (G.1.4) |
| B1-4165 | (L.1.46) | (G.1.4) |
| B1-4166 | (M.1.6) | (G.1.4) |
| B1-4167 | (M.1.24) | (G.1.4) |
| B1-4168 | (M.1.25) | (G.1.4) |
| B1-4169 | (M.1.28) | (G.1.4) |
| B1-4170 | (M.1.29) | (G.1.4) |
| B1-4171 | (M.1.30) | (G.1.4) |
| B1-4172 | (N.7.3) | (G.1.4) |
| B1-4173 | (N.7.4) | (G.1.4) |
| B1-4174 | (N.7.5) | (G.1.4) |
| B1-4175 | (N.13.13) | (G.1.4) |
| B1-4176 | (O.2.4), | (G.1.4) |
| B1-4177 | (O.4.5) | (G.1.4) |
| B1-4178 | (O.4.7) | (G.1.4) |
| B1-4179 | (O.4.8) | (G.1.4) |
| B1-4180 | (O.5.1) | (G.1.4) |
| B1-4181 | (O.26.2) | (G.1.4) |
| B1-4182 | (O.27.17) | (G.1.4) |
| B1-4183 | (A.1.1) | (G.5.1) |
| B1-4184 | (A.1.4) | (G.5.1) |
| B1-4185 | (A.1.8) | (G.5.1) |
| B1-4186 | (A.1.10) | (G.5.1) |
| B1-4187 | (A.1.11) | (G.5.1) |
| B1-4188 | (A.1.12) | (G.5.1) |
| B1-4189 | (A.1.14) | (G.5.1) |
| B1-4190 | (A.1.17) | (G.5.1) |
| B1-4191 | (A.1.19) | (G.5.1) |
| B1-4192 | (A.1.25) | (G.5.1) |
| B1-4193 | (A.1.34) | (G.5.1) |
| B1-4194 | (A.1.35) | (G.5.1) |
| B1-4195 | (A.1.38) | (G.5.1) |
| B1-4196 | (A.2.6) | (G.5.1) |
| B1-4197 | (A.3.2) | (G.5.1) |
| B1-4198 | (A.3.3) | (G.5.1) |
| B1-4199 | (A.3.4) | (G.5.1) |
| B1-4200 | (A.3.7) | (G.5.1) |
| B1-4201 | (A.3.8) | (G.5.1) |
| B1-4202 | (A.3.9) | (G.5.1) |
| B1-4203 | (A.3.10) | (G.5.1) |
| B1-4204 | (A.3.11) | (G.5.1) |
| B1-4205 | (A.3.12) | (G.5.1) |
| B1-4206 | (A.3.15) | (G.5.1) |
| B1-4207 | (A.3.16) | (G.5.1) |
| B1-4208 | (A.3.17) | (G.5.1) |
| B1-4209 | (A.3.19) | (G.5.1) |
| B1-4210 | (A.3.21) | (G.5.1) |
| B1-4211 | (A.3.22) | (G.5.1) |
| B1-4212 | (A.3.23) | (G.5.1) |
| B1-4213 | (A.3.28) | (G.5.1) |
| B1-4214 | (A.3.31) | (G.5.1) |
| B1-4215 | (A.4.5) | (G.5.1) |
| B1-4216 | (B.1.4) | (G.5.1) |
| B1-4217 | (B.1.5) | (G.5.1) |
| B1-4218 | (B.1.8) | (G.5.1) |
| B1-4219 | (B.1.10) | (G.5.1) |
| B1-4220 | (B.1.12) | (G.5.1) |
| B1-4221 | (B.1.15) | (G.5.1) |
| B1-4222 | (B.1.17) | (G.5.1) |
| B1-4223 | (B.1.18) | (G.5.1) |
| B1-4224 | (B.1.21) | (G.5.1) |
| B1-4225 | (B.1.22) | (G.5.1) |
| B1-4226 | (B.1.23) | (G.5.1) |
| B1-4227 | (B.1.25) | (G.5.1) |
| B1-4228 | (B.1.26) | (G.5.1) |
| B1-4229 | (B.1.29) | (G.5.1) |
| B1-4230 | (B.1.38) | (G.5.1) |
| B1-4231 | (B.1.44) | (G.5.1) |
| B1-4232 | (B.1.46) | (G.5.1) |
| B1-4233 | (B.2.4) | (G.5.1) |
| B1-4234 | (B.3.1) | (G.5.1) |
| B1-4235 | (C.1.4) | (G.5.1) |
| B1-4236 | (C.1.5) | (G.5.1) |
| B1-4237 | (C.2.1) | (G.5.1) |
| B1-4238 | (D.1.4) | (G.5.1) |
| B1-4239 | (D.1.5) | (G.5.1) |
| B1-4240 | (D.2.3) | (G.5.1) |

TABLE B1-continued

| Mixture | Co 2) | Co3) |
|---|---|---|
| B1-4241 | (D.2.5) | (G.5.1) |
| B1-4242 | (D.2.6) | (G.5.1) |
| B1-4243 | (E.1.1) | (G.5.1) |
| B1-4244 | (E.1.3) | (G.5.1) |
| B1-4245 | (E.2.2) | (G.5.1) |
| B1-4246 | (E.2.3), | (G.5.1) |
| B1-4247 | (F.1.2) | (G.5.1) |
| B1-4248 | (F.1.3) | (G.5.1) |
| B1-4249 | (F.1.5) | (G.5.1) |
| B1-4250 | (G.1.4) | (G.5.1) |
| B1-4251 | (G.3.1) | (G.5.1) |
| B1-4252 | (G.5.1) | (G.5.1) |
| B1-4253 | (H.1.2) | (G.5.1) |
| B1-4254 | (H.1.3) | (G.5.1) |
| B1-4255 | (H.1.4) | (G.5.1) |
| B1-4256 | (H.1.5) | (G.5.1) |
| B1-4257 | (H.1.6) | (G.5.1) |
| B1-4258 | (H.1.7) | (G.5.1) |
| B1-4259 | (H.2.2) | (G.5.1) |
| B1-4260 | (H.2.3) | (G.5.1) |
| B1-4261 | (H.2.5) | (G.5.1) |
| B1-4262 | (H.2.7) | (G.5.1) |
| B1-4263 | (H.3.2) | (G.5.1) |
| B1-4264 | (H.3.4) | (G.5.1) |
| B1-4265 | (H.3.5) | (G.5.1) |
| B1-4266 | (H.3.10) | (G.5.1) |
| B1-4267 | (H.4.2) | (G.5.1) |
| B1-4268 | (H.4.9) | (G.5.1) |
| B1-4269 | (I.1.1) | (G.5.1) |
| B1-4270 | (I.2.1) | (G.5.1) |
| B1-4271 | (I.2.2) | (G.5.1) |
| B1-4272 | (J.1.2) | (G.5.1) |
| B1-4273 | (J.1.3) | (G.5.1) |
| B1-4274 | (J.1.4) | (G.5.1) |
| B1-4275 | (J.1.5) | (G.5.1) |
| B1-4276 | (J.1.8) | (G.5.1) |
| B1-4277 | (J.1.12) | (G.5.1) |
| B1-4278 | (K.1.13) | (G.5.1) |
| B1-4279 | (K.1.47) | (G.5.1) |
| B1-4280 | (K.1.54) | (G.5.1) |
| B1-4281 | (L.1.5) | (G.5.1) |
| B1-4282 | (L.1.9) | (G.5.1) |
| B1-4283 | (L.1.12) | (G.5.1) |
| B1-4284 | (L.1.13) | (G.5.1) |
| B1-4285 | (L.1.17) | (G.5.1) |
| B1-4286 | (L.1.23) | (G.5.1) |
| B1-4287 | (L.1.32), | (G.5.1) |
| B1-4288 | (L.1.46) | (G.5.1) |
| B1-4289 | (M.1.6) | (G.5.1) |
| B1-4290 | (M.1.24) | (G.5.1) |
| B1-4291 | (M.1.25) | (G.5.1) |
| B1-4292 | (M.1.28) | (G.5.1) |
| B1-4293 | (M.1.29) | (G.5.1) |
| B1-4294 | (M.1.30) | (G.5.1) |
| B1-4295 | (N.7.3) | (G.5.1) |
| B1-4296 | (N.7.4) | (G.5.1) |
| B1-4297 | (N.7.5) | (G.5.1) |
| B1-4298 | (N.13.13) | (G.5.1) |
| B1-4299 | (O.2.4), | (G.5.1) |
| B1-4300 | (O.4.5) | (G.5.1) |
| B1-4301 | (O.4.7) | (G.5.1) |
| B1-4302 | (O.4.8) | (G.5.1) |
| B1-4303 | (O.5.1) | (G.5.1) |
| B1-4304 | (O.26.2) | (G.5.1) |
| B1-4305 | (O.27.17) | (G.5.1) |
| B1-4306 | (A.1.1) | (H.3.2) |
| B1-4307 | (A.1.4) | (H.3.2) |
| B1-4308 | (A.1.8) | (H.3.2) |
| B1-4309 | (A.1.10) | (H.3.2) |
| B1-4310 | (A.1.11) | (H.3.2) |
| B1-4311 | (A.1.12) | (H.3.2) |
| B1-4312 | (A.1.14) | (H.3.2) |
| B1-4313 | (A.1.17) | (H.3.2) |
| B1-4314 | (A.1.19) | (H.3.2) |
| B1-4315 | (A.1.25) | (H.3.2) |
| B1-4316 | (A.1.34) | (H.3.2) |
| B1-4317 | (A.1.35) | (H.3.2) |
| B1-4318 | (A.1.38) | (H.3.2) |
| B1-4319 | (A.2.6) | (H.3.2) |
| B1-4320 | (A.3.2) | (H.3.2) |
| B1-4321 | (A.3.3) | (H.3.2) |
| B1-4322 | (A.3.4) | (H.3.2) |
| B1-4323 | (A.3.7) | (H.3.2) |
| B1-4324 | (A.3.8) | (H.3.2) |
| B1-4325 | (A.3.9) | (H.3.2) |
| B1-4326 | (A.3.10) | (H.3.2) |
| B1-4327 | (A.3.11) | (H.3.2) |
| B1-4328 | (A.3.12) | (H.3.2) |
| B1-4329 | (A.3.15) | (H.3.2) |
| B1-4330 | (A.3.16) | (H.3.2) |
| B1-4331 | (A.3.17) | (H.3.2) |
| B1-4332 | (A.3.19) | (H.3.2) |
| B1-4333 | (A.3.21) | (H.3.2) |
| B1-4334 | (A.3.22) | (H.3.2) |
| B1-4335 | (A.3.23) | (H.3.2) |
| B1-4336 | (A.3.28) | (H.3.2) |
| B1-4337 | (A.3.31) | (H.3.2) |
| B1-4338 | (A.4.5) | (H.3.2) |
| B1-4339 | (B.1.4) | (H.3.2) |
| B1-4340 | (B.1.5) | (H.3.2) |
| B1-4341 | (B.1.8) | (H.3.2) |
| B1-4342 | (B.1.10) | (H.3.2) |
| B1-4343 | (B.1.12) | (H.3.2) |
| B1-4344 | (B.1.15) | (H.3.2) |
| B1-4345 | (B.1.17) | (H.3.2) |
| B1-4346 | (B.1.18) | (H.3.2) |
| B1-4347 | (B.1.21) | (H.3.2) |
| B1-4348 | (B.1.22) | (H.3.2) |
| B1-4349 | (B.1.23) | (H.3.2) |
| B1-4350 | (B.1.25) | (H.3.2) |
| B1-4351 | (B.1.26) | (H.3.2) |
| B1-4352 | (B.1.29) | (H.3.2) |
| B1-4353 | (B.1.38) | (H.3.2) |
| B1-4354 | (B.1.44) | (H.3.2) |
| B1-4355 | (B.1.46) | (H.3.2) |
| B1-4356 | (B.2.4) | (H.3.2) |
| B1-4357 | (B.3.1) | (H.3.2) |
| B1-4358 | (C.1.4) | (H.3.2) |
| B1-4359 | (C.1.5) | (H.3.2) |
| B1-4360 | (C.2.1) | (H.3.2) |
| B1-4361 | (D.1.4) | (H.3.2) |
| B1-4362 | (D.1.5) | (H.3.2) |
| B1-4363 | (D.2.3) | (H.3.2) |
| B1-4364 | (D.2.5) | (H.3.2) |
| B1-4365 | (D.2.6) | (H.3.2) |
| B1-4366 | (E.1.1) | (H.3.2) |
| B1-4367 | (E.1.3) | (H.3.2) |
| B1-4368 | (E.2.2) | (H.3.2) |
| B1-4369 | (E.2.3), | (H.3.2) |
| B1-4370 | (F.1.2) | (H.3.2) |
| B1-4371 | (F.1.3) | (H.3.2) |
| B1-4372 | (F.1.5) | (H.3.2) |
| B1-4373 | (G.1.4) | (H.3.2) |
| B1-4374 | (G.3.1) | (H.3.2) |
| B1-4375 | (G.5.1) | (H.3.2) |
| B1-4376 | (H.1.2) | (H.3.2) |
| B1-4377 | (H.1.3) | (H.3.2) |
| B1-4378 | (H.1.4) | (H.3.2) |
| B1-4379 | (H.1.5) | (H.3.2) |
| B1-4380 | (H.1.6) | (H.3.2) |
| B1-4381 | (H.1.7) | (H.3.2) |
| B1-4382 | (H.2.2) | (H.3.2) |
| B1-4383 | (H.2.3) | (H.3.2) |
| B1-4384 | (H.2.5) | (H.3.2) |
| B1-4385 | (H.2.7) | (H.3.2) |
| B1-4386 | (H.3.2) | (H.3.2) |
| B1-4387 | (H.3.4) | (H.3.2) |
| B1-4388 | (H.3.5) | (H.3.2) |
| B1-4389 | (H.3.10) | (H.3.2) |
| B1-4390 | (H.4.2) | (H.3.2) |
| B1-4391 | (H.4.9) | (H.3.2) |
| B1-4392 | (I.1.1) | (H.3.2) |
| B1-4393 | (I.2.1) | (H.3.2) |
| B1-4394 | (I.2.2) | (H.3.2) |
| B1-4395 | (J.1.2) | (H.3.2) |
| B1-4396 | (J.1.3) | (H.3.2) |

TABLE B1-continued

| Mixture | Co 2) | Co3) |
|---|---|---|
| B1-4397 | (J.1.4) | (H.3.2) |
| B1-4398 | (J.1.5) | (H.3.2) |
| B1-4399 | (J.1.8) | (H.3.2) |
| B1-4400 | (J.1.12) | (H.3.2) |
| B1-4401 | (K.1.13) | (H.3.2) |
| B1-4402 | (K.1.47) | (H.3.2) |
| B1-4403 | (K.1.54) | (H.3.2) |
| B1-4404 | (L.1.5) | (H.3.2) |
| B1-4405 | (L.1.9) | (H.3.2) |
| B1-4406 | (L.1.12) | (H.3.2) |
| B1-4407 | (L.1.13) | (H.3.2) |
| B1-4408 | (L.1.17) | (H.3.2) |
| B1-4409 | (L.1.23) | (H.3.2) |
| B1-4410 | (L.1.32), | (H.3.2) |
| B1-4411 | (L.1.46) | (H.3.2) |
| B1-4412 | (M.1.6) | (H.3.2) |
| B1-4413 | (M.1.24) | (H.3.2) |
| B1-4414 | (M.1.25) | (H.3.2) |
| B1-4415 | (M.1.28) | (H.3.2) |
| B1-4416 | (M.1.29) | (H.3.2) |
| B1-4417 | (M.1.30) | (H.3.2) |
| B1-4418 | (N.7.3) | (H.3.2) |
| B1-4419 | (N.7.4) | (H.3.2) |
| B1-4420 | (N.7.5) | (H.3.2) |
| B1-4421 | (N.13.13) | (H.3.2) |
| B1-4422 | (O.2.4), | (H.3.2) |
| B1-4423 | (O.4.5) | (H.3.2) |
| B1-4424 | (O.4.7) | (H.3.2) |
| B1-4425 | (O.4.8) | (H.3.2) |
| B1-4426 | (O.5.1) | (H.3.2) |
| B1-4427 | (O.26.2) | (H.3.2) |
| B1-4428 | (O.27.17) | (H.3.2) |
| B1-4429 | (A.1.1) | (I.1.1) |
| B1-4430 | (A.1.4) | (I.1.1) |
| B1-4431 | (A.1.8) | (I.1.1) |
| B1-4432 | (A.1.10) | (I.1.1) |
| B1-4433 | (A.1.11) | (I.1.1) |
| B1-4434 | (A.1.12) | (I.1.1) |
| B1-4435 | (A.1.14) | (I.1.1) |
| B1-4436 | (A.1.17) | (I.1.1) |
| B1-4437 | (A.1.19) | (I.1.1) |
| B1-4438 | (A.1.25) | (I.1.1) |
| B1-4439 | (A.1.34) | (I.1.1) |
| B1-4440 | (A.1.35) | (I.1.1) |
| B1-4441 | (A.1.38) | (I.1.1) |
| B1-4442 | (A.2.6) | (I.1.1) |
| B1-4443 | (A.3.2) | (I.1.1) |
| B1-4444 | (A.3.3) | (I.1.1) |
| B1-4445 | (A.3.4) | (I.1.1) |
| B1-4446 | (A.3.7) | (I.1.1) |
| B1-4447 | (A.3.8) | (I.1.1) |
| B1-4448 | (A.3.9) | (I.1.1) |
| B1-4449 | (A.3.10) | (I.1.1) |
| B1-4450 | (A.3.11) | (I.1.1) |
| B1-4451 | (A.3.12) | (I.1.1) |
| B1-4452 | (A.3.15) | (I.1.1) |
| B1-4453 | (A.3.16) | (I.1.1) |
| B1-4454 | (A.3.17) | (I.1.1) |
| B1-4455 | (A.3.19) | (I.1.1) |
| B1-4456 | (A.3.21) | (I.1.1) |
| B1-4457 | (A.3.22) | (I.1.1) |
| B1-4458 | (A.3.23) | (I.1.1) |
| B1-4459 | (A.3.28) | (I.1.1) |
| B1-4460 | (A.3.31) | (I.1.1) |
| B1-4461 | (A.4.5) | (I.1.1) |
| B1-4462 | (B.1.4) | (I.1.1) |
| B1-4463 | (B.1.5) | (I.1.1) |
| B1-4464 | (B.1.8) | (I.1.1) |
| B1-4465 | (B.1.10) | (I.1.1) |
| B1-4466 | (B.1.12) | (I.1.1) |
| B1-4467 | (B.1.15) | (I.1.1) |
| B1-4468 | (B.1.17) | (I.1.1) |
| B1-4469 | (B.1.18) | (I.1.1) |
| B1-4470 | (B.1.21) | (I.1.1) |
| B1-4471 | (B.1.22) | (I.1.1) |
| B1-4472 | (B.1.23) | (I.1.1) |
| B1-4473 | (B.1.25) | (I.1.1) |
| B1-4474 | (B.1.26) | (I.1.1) |

TABLE B1-continued

| Mixture | Co 2) | Co3) |
|---|---|---|
| B1-4475 | (B.1.29) | (I.1.1) |
| B1-4476 | (B.1.38) | (I.1.1) |
| B1-4477 | (B.1.44) | (I.1.1) |
| B1-4478 | (B.1.46) | (I.1.1) |
| B1-4479 | (B.2.4) | (I.1.1) |
| B1-4480 | (B.3.1) | (I.1.1) |
| B1-4481 | (C.1.4) | (I.1.1) |
| B1-4482 | (C.1.5) | (I.1.1) |
| B1-4483 | (C.2.1) | (I.1.1) |
| B1-4484 | (D.1.4) | (I.1.1) |
| B1-4485 | (D.1.5) | (I.1.1) |
| B1-4486 | (D.2.3) | (I.1.1) |
| B1-4487 | (D.2.5) | (I.1.1) |
| B1-4488 | (D.2.6) | (I.1.1) |
| B1-4489 | (E.1.1) | (I.1.1) |
| B1-4490 | (E.1.3) | (I.1.1) |
| B1-4491 | (E.2.2) | (I.1.1) |
| B1-4492 | (E.2.3), | (I.1.1) |
| B1-4493 | (F.1.2) | (I.1.1) |
| B1-4494 | (F.1.3) | (I.1.1) |
| B1-4495 | (F.1.5) | (I.1.1) |
| B1-4496 | (G.1.4) | (I.1.1) |
| B1-4497 | (G.3.1) | (I.1.1) |
| B1-4498 | (G.5.1) | (I.1.1) |
| B1-4499 | (H.1.2) | (I.1.1) |
| B1-4500 | (H.1.3) | (I.1.1) |
| B1-4501 | (H.1.4) | (I.1.1) |
| B1-4502 | (H.1.5) | (I.1.1) |
| B1-4503 | (H.1.6) | (I.1.1) |
| B1-4504 | (H.1.7) | (I.1.1) |
| B1-4505 | (H.2.2) | (I.1.1) |
| B1-4506 | (H.2.3) | (I.1.1) |
| B1-4507 | (H.2.5) | (I.1.1) |
| B1-4508 | (H.2.7) | (I.1.1) |
| B1-4509 | (H.3.2) | (I.1.1) |
| B1-4510 | (H.3.4) | (I.1.1) |
| B1-4511 | (H.3.5) | (I.1.1) |
| B1-4512 | (H.3.10) | (I.1.1) |
| B1-4513 | (H.4.2) | (I.1.1) |
| B1-4514 | (H.4.9) | (I.1.1) |
| B1-4515 | (I.1.1) | (I.1.1) |
| B1-4516 | (I.2.1) | (I.1.1) |
| B1-4517 | (I.2.2) | (I.1.1) |
| B1-4518 | (J.1.2) | (I.1.1) |
| B1-4519 | (J.1.3) | (I.1.1) |
| B1-4520 | (J.1.4) | (I.1.1) |
| B1-4521 | (J.1.5) | (I.1.1) |
| B1-4522 | (J.1.8) | (I.1.1) |
| B1-4523 | (J.1.12) | (I.1.1) |
| B1-4524 | (K.1.13) | (I.1.1) |
| B1-4525 | (K.1.47) | (I.1.1) |
| B1-4526 | (K.1.54) | (I.1.1) |
| B1-4527 | (L.1.5) | (I.1.1) |
| B1-4528 | (L.1.9) | (I.1.1) |
| B1-4529 | (L.1.12) | (I.1.1) |
| B1-4530 | (L.1.13) | (I.1.1) |
| B1-4531 | (L.1.17) | (I.1.1) |
| B1-4532 | (L.1.23) | (I.1.1) |
| B1-4533 | (L.1.32), | (I.1.1) |
| B1-4534 | (L.1.46) | (I.1.1) |
| B1-4535 | (M.1.6) | (I.1.1) |
| B1-4536 | (M.1.24) | (I.1.1) |
| B1-4537 | (M.1.25) | (I.1.1) |
| B1-4538 | (M.1.28) | (I.1.1) |
| B1-4539 | (M.1.29) | (I.1.1) |
| B1-4540 | (M.1.30) | (I.1.1) |
| B1-4541 | (N.7.3) | (I.1.1) |
| B1-4542 | (N.7.4) | (I.1.1) |
| B1-4543 | (N.7.5) | (I.1.1) |
| B1-4544 | (N.13.13) | (I.1.1) |
| B1-4545 | (O.2.4), | (I.1.1) |
| B1-4546 | (O.4.5) | (I.1.1) |
| B1-4547 | (O.4.7) | (I.1.1) |
| B1-4548 | (O.4.8) | (I.1.1) |
| B1-4549 | (O.5.1) | (I.1.1) |
| B1-4550 | (O.26.2) | (I.1.1) |
| B1-4551 | (O.27.17) | (I.1.1) |
| B1-4552 | (A.1.1) | (I.2.1) |

TABLE B1-continued

| Mixture | Co 2) | Co3) |
|---|---|---|
| B1-4553 | (A.1.4) | (I.2.1) |
| B1-4554 | (A.1.8) | (I.2.1) |
| B1-4555 | (A.1.10) | (I.2.1) |
| B1-4556 | (A.1.11) | (I.2.1) |
| B1-4557 | (A.1.12) | (I.2.1) |
| B1-4558 | (A.1.14) | (I.2.1) |
| B1-4559 | (A.1.17) | (I.2.1) |
| B1-4560 | (A.1.19) | (I.2.1) |
| B1-4561 | (A.1.25) | (I.2.1) |
| B1-4562 | (A.1.34) | (I.2.1) |
| B1-4563 | (A.1.35) | (I.2.1) |
| B1-4564 | (A.1.38) | (I.2.1) |
| B1-4565 | (A.2.6) | (I.2.1) |
| B1-4566 | (A.3.2) | (I.2.1) |
| B1-4567 | (A.3.3) | (I.2.1) |
| B1-4568 | (A.3.4) | (I.2.1) |
| B1-4569 | (A.3.7) | (I.2.1) |
| B1-4570 | (A.3.8) | (I.2.1) |
| B1-4571 | (A.3.9) | (I.2.1) |
| B1-4572 | (A.3.10) | (I.2.1) |
| B1-4573 | (A.3.11) | (I.2.1) |
| B1-4574 | (A.3.12) | (I.2.1) |
| B1-4575 | (A.3.15) | (I.2.1) |
| B1-4576 | (A.3.16) | (I.2.1) |
| B1-4577 | (A.3.17) | (I.2.1) |
| B1-4578 | (A.3.19) | (I.2.1) |
| B1-4579 | (A.3.21) | (I.2.1) |
| B1-4580 | (A.3.22) | (I.2.1) |
| B1-4581 | (A.3.23) | (I.2.1) |
| B1-4582 | (A.3.28) | (I.2.1) |
| B1-4583 | (A.3.31) | (I.2.1) |
| B1-4584 | (A.4.5) | (I.2.1) |
| B1-4585 | (B.1.4) | (I.2.1) |
| B1-4586 | (B.1.5) | (I.2.1) |
| B1-4587 | (B.1.8) | (I.2.1) |
| B1-4588 | (B.1.10) | (I.2.1) |
| B1-4589 | (B.1.12) | (I.2.1) |
| B1-4590 | (B.1.15) | (I.2.1) |
| B1-4591 | (B.1.17) | (I.2.1) |
| B1-4592 | (B.1.18) | (I.2.1) |
| B1-4593 | (B.1.21) | (I.2.1) |
| B1-4594 | (B.1.22) | (I.2.1) |
| B1-4595 | (B.1.23) | (I.2.1) |
| B1-4596 | (B.1.25) | (I.2.1) |
| B1-4597 | (B.1.26) | (I.2.1) |
| B1-4598 | (B.1.29) | (I.2.1) |
| B1-4599 | (B.1.38) | (I.2.1) |
| B1-4600 | (B.1.44) | (I.2.1) |
| B1-4601 | (B.1.46) | (I.2.1) |
| B1-4602 | (B.2.4) | (I.2.1) |
| B1-4603 | (B.3.1) | (I.2.1) |
| B1-4604 | (C.1.4) | (I.2.1) |
| B1-4605 | (C.1.5) | (I.2.1) |
| B1-4606 | (C.2.1) | (I.2.1) |
| B1-4607 | (D.1.4) | (I.2.1) |
| B1-4608 | (D.1.5) | (I.2.1) |
| B1-4609 | (D.2.3) | (I.2.1) |
| B1-4610 | (D.2.5) | (I.2.1) |
| B1-4611 | (D.2.6) | (I.2.1) |
| B1-4612 | (E.1.1) | (I.2.1) |
| B1-4613 | (E.1.3) | (I.2.1) |
| B1-4614 | (E.2.2) | (I.2.1) |
| B1-4615 | (E.2.3), | (I.2.1) |
| B1-4616 | (F.1.2) | (I.2.1) |
| B1-4617 | (F.1.3) | (I.2.1) |
| B1-4618 | (F.1.5) | (I.2.1) |
| B1-4619 | (G.1.4) | (I.2.1) |
| B1-4620 | (G.3.1) | (I.2.1) |
| B1-4621 | (G.5.1) | (I.2.1) |
| B1-4622 | (H.1.2) | (I.2.1) |
| B1-4623 | (H.1.3) | (I.2.1) |
| B1-4624 | (H.1.4) | (I.2.1) |
| B1-4625 | (H.1.5) | (I.2.1) |
| B1-4626 | (H.1.6) | (I.2.1) |
| B1-4627 | (H.1.7) | (I.2.1) |
| B1-4628 | (H.2.2) | (I.2.1) |
| B1-4629 | (H.2.3) | (I.2.1) |
| B1-4630 | (H.2.5) | (I.2.1) |

TABLE B1-continued

| Mixture | Co 2) | Co3) |
|---|---|---|
| B1-4631 | (H.2.7) | (I.2.1) |
| B1-4632 | (H.3.2) | (I.2.1) |
| B1-4633 | (H.3.4) | (I.2.1) |
| B1-4634 | (H.3.5) | (I.2.1) |
| B1-4635 | (H.3.10) | (I.2.1) |
| B1-4636 | (H.4.2) | (I.2.1) |
| B1-4637 | (H.4.9) | (I.2.1) |
| B1-4638 | (I.1.1) | (I.2.1) |
| B1-4639 | (I.2.1) | (I.2.1) |
| B1-4640 | (I.2.2) | (I.2.1) |
| B1-4641 | (J.1.2) | (I.2.1) |
| B1-4642 | (J.1.3) | (I.2.1) |
| B1-4643 | (J.1.4) | (I.2.1) |
| B1-4644 | (J.1.5) | (I.2.1) |
| B1-4645 | (J.1.8) | (I.2.1) |
| B1-4646 | (J.1.12) | (I.2.1) |
| B1-4647 | (K.1.13) | (I.2.1) |
| B1-4648 | (K.1.47) | (I.2.1) |
| B1-4649 | (K.1.54) | (I.2.1) |
| B1-4650 | (L.1.5) | (I.2.1) |
| B1-4651 | (L.1.9) | (I.2.1) |
| B1-4652 | (L.1.12) | (I.2.1) |
| B1-4653 | (L.1.13) | (I.2.1) |
| B1-4654 | (L.1.17) | (I.2.1) |
| B1-4655 | (L.1.23) | (I.2.1) |
| B1-4656 | (L.1.32), | (I.2.1) |
| B1-4657 | (L.1.46) | (I.2.1) |
| B1-4658 | (M.1.6) | (I.2.1) |
| B1-4659 | (M.1.24) | (I.2.1) |
| B1-4660 | (M.1.25) | (I.2.1) |
| B1-4661 | (M.1.28) | (I.2.1) |
| B1-4662 | (M.1.29) | (I.2.1) |
| B1-4663 | (M.1.30) | (I.2.1) |
| B1-4664 | (N.7.3) | (I.2.1) |
| B1-4665 | (N.7.4) | (I.2.1) |
| B1-4666 | (N.7.5) | (I.2.1) |
| B1-4667 | (N.13.13) | (I.2.1) |
| B1-4668 | (O.2.4), | (I.2.1) |
| B1-4669 | (O.4.5) | (I.2.1) |
| B1-4670 | (O.4.7) | (I.2.1) |
| B1-4671 | (O.4.8) | (I.2.1) |
| B1-4672 | (O.5.1) | (I.2.1) |
| B1-4673 | (O.26.2) | (I.2.1) |
| B1-4674 | (O.27.17) | (I.2.1) |
| B1-4675 | (A.1.1) | (I.2.2) |
| B1-4676 | (A.1.4) | (I.2.2) |
| B1-4677 | (A.1.8) | (I.2.2) |
| B1-4678 | (A.1.10) | (I.2.2) |
| B1-4679 | (A.1.11) | (I.2.2) |
| B1-4680 | (A.1.12) | (I.2.2) |
| B1-4681 | (A.1.14) | (I.2.2) |
| B1-4682 | (A.1.17) | (I.2.2) |
| B1-4683 | (A.1.19) | (I.2.2) |
| B1-4684 | (A.1.25) | (I.2.2) |
| B1-4685 | (A.1.34) | (I.2.2) |
| B1-4686 | (A.1.35) | (I.2.2) |
| B1-4687 | (A.1.38) | (I.2.2) |
| B1-4688 | (A.2.6) | (I.2.2) |
| B1-4689 | (A.3.2) | (I.2.2) |
| B1-4690 | (A.3.3) | (I.2.2) |
| B1-4691 | (A.3.4) | (I.2.2) |
| B1-4692 | (A.3.7) | (I.2.2) |
| B1-4693 | (A.3.8) | (I.2.2) |
| B1-4694 | (A.3.9) | (I.2.2) |
| B1-4695 | (A.3.10) | (I.2.2) |
| B1-4696 | (A.3.11) | (I.2.2) |
| B1-4697 | (A.3.12) | (I.2.2) |
| B1-4698 | (A.3.15) | (I.2.2) |
| B1-4699 | (A.3.16) | (I.2.2) |
| B1-4700 | (A.3.17) | (I.2.2) |
| B1-4701 | (A.3.19) | (I.2.2) |
| B1-4702 | (A.3.21) | (I.2.2) |
| B1-4703 | (A.3.22) | (I.2.2) |
| B1-4704 | (A.3.23) | (I.2.2) |
| B1-4705 | (A.3.28) | (I.2.2) |
| B1-4706 | (A.3.31) | (I.2.2) |
| B1-4707 | (A.4.5) | (I.2.2) |
| B1-4708 | (B.1.4) | (I.2.2) |

TABLE B1-continued

| Mixture | Co 2) | Co3) |
|---|---|---|
| B1-4709 | (B.1.5) | (I.2.2) |
| B1-4710 | (B.1.8) | (I.2.2) |
| B1-4711 | (B.1.10) | (I.2.2) |
| B1-4712 | (B.1.12) | (I.2.2) |
| B1-4713 | (B.1.15) | (I.2.2) |
| B1-4714 | (B.1.17) | (I.2.2) |
| B1-4715 | (B.1.18) | (I.2.2) |
| B1-4716 | (B.1.21) | (I.2.2) |
| B1-4717 | (B.1.22) | (I.2.2) |
| B1-4718 | (B.1.23) | (I.2.2) |
| B1-4719 | (B.1.25) | (I.2.2) |
| B1-4720 | (B.1.26) | (I.2.2) |
| B1-4721 | (B.1.29) | (I.2.2) |
| B1-4722 | (B.1.38) | (I.2.2) |
| B1-4723 | (B.1.44) | (I.2.2) |
| B1-4724 | (B.1.46) | (I.2.2) |
| B1-4725 | (B.2.4) | (I.2.2) |
| B1-4726 | (B.3.1) | (I.2.2) |
| B1-4727 | (C.1.4) | (I.2.2) |
| B1-4728 | (C.1.5) | (I.2.2) |
| B1-4729 | (C.2.1) | (I.2.2) |
| B1-4730 | (D.1.4) | (I.2.2) |
| B1-4731 | (D.1.5) | (I.2.2) |
| B1-4732 | (D.2.3) | (I.2.2) |
| B1-4733 | (D.2.5) | (I.2.2) |
| B1-4734 | (D.2.6) | (I.2.2) |
| B1-4735 | (E.1.1) | (I.2.2) |
| B1-4736 | (E.1.3) | (I.2.2) |
| B1-4737 | (E.2.2) | (I.2.2) |
| B1-4738 | (E.2.3), | (I.2.2) |
| B1-4739 | (F.1.2) | (I.2.2) |
| B1-4740 | (F.1.3) | (I.2.2) |
| B1-4741 | (F.1.5) | (I.2.2) |
| B1-4742 | (G.1.4) | (I.2.2) |
| B1-4743 | (G.3.1) | (I.2.2) |
| B1-4744 | (G.5.1) | (I.2.2) |
| B1-4745 | (H.1.2) | (I.2.2) |
| B1-4746 | (H.1.3) | (I.2.2) |
| B1-4747 | (H.1.4) | (I.2.2) |
| B1-4748 | (H.1.5) | (I.2.2) |
| B1-4749 | (H.1.6) | (I.2.2) |
| B1-4750 | (H.1.7) | (I.2.2) |
| B1-4751 | (H.2.2) | (I.2.2) |
| B1-4752 | (H.2.3) | (I.2.2) |
| B1-4753 | (H.2.5) | (I.2.2) |
| B1-4754 | (H.2.7) | (I.2.2) |
| B1-4755 | (H.3.2) | (I.2.2) |
| B1-4756 | (H.3.4) | (I.2.2) |
| B1-4757 | (H.3.5) | (I.2.2) |
| B1-4758 | (H.3.10) | (I.2.2) |
| B1-4759 | (H.4.2) | (I.2.2) |
| B1-4760 | (H.4.9) | (I.2.2) |
| B1-4761 | (I.1.1) | (I.2.2) |
| B1-4762 | (I.2.1) | (I.2.2) |
| B1-4763 | (I.2.2) | (I.2.2) |
| B1-4764 | (J.1.2) | (I.2.2) |
| B1-4765 | (J.1.3) | (I.2.2) |
| B1-4766 | (J.1.4) | (I.2.2) |
| B1-4767 | (J.1.5) | (I.2.2) |
| B1-4768 | (J.1.8) | (I.2.2) |
| B1-4769 | (J.1.12) | (I.2.2) |
| B1-4770 | (K.1.13) | (I.2.2) |
| B1-4771 | (K.1.47) | (I.2.2) |
| B1-4772 | (K.1.54) | (I.2.2) |
| B1-4773 | (L.1.5) | (I.2.2) |
| B1-4774 | (L.1.9) | (I.2.2) |
| B1-4775 | (L.1.12) | (I.2.2) |
| B1-4776 | (L.1.13) | (I.2.2) |
| B1-4777 | (L.1.17) | (I.2.2) |
| B1-4778 | (L.1.23) | (I.2.2) |
| B1-4779 | (L.1.32), | (I.2.2) |
| B1-4780 | (L.1.46) | (I.2.2) |
| B1-4781 | (M.1.6) | (I.2.2) |
| B1-4782 | (M.1.24) | (I.2.2) |
| B1-4783 | (M.1.25) | (I.2.2) |
| B1-4784 | (M.1.28) | (I.2.2) |
| B1-4785 | (M.1.29) | (I.2.2) |
| B1-4786 | (M.1.30) | (I.2.2) |

TABLE B1-continued

| Mixture | Co 2) | Co3) |
|---|---|---|
| B1-4787 | (N.7.3) | (I.2.2) |
| B1-4788 | (N.7.4) | (I.2.2) |
| B1-4789 | (N.7.5) | (I.2.2) |
| B1-4790 | (N.13.13) | (I.2.2) |
| B1-4791 | (O.2.4), | (I.2.2) |
| B1-4792 | (O.4.5) | (I.2.2) |
| B1-4793 | (O.4.7) | (I.2.2) |
| B1-4794 | (O.4.8) | (I.2.2) |
| B1-4795 | (O.5.1) | (I.2.2) |
| B1-4796 | (O.26.2) | (I.2.2) |
| B1-4797 | (O.27.17) | (I.2.2) |
| B1-4798 | (A.1.1) | (J.1.2) |
| B1-4799 | (A.1.4) | (J.1.2) |
| B1-4800 | (A.1.8) | (J.1.2) |
| B1-4801 | (A.1.10) | (J.1.2) |
| B1-4802 | (A.1.11) | (J.1.2) |
| B1-4803 | (A.1.12) | (J.1.2) |
| B1-4804 | (A.1.14) | (J.1.2) |
| B1-4805 | (A.1.17) | (J.1.2) |
| B1-4806 | (A.1.19) | (J.1.2) |
| B1-4807 | (A.1.25) | (J.1.2) |
| B1-4808 | (A.1.34) | (J.1.2) |
| B1-4809 | (A.1.35) | (J.1.2) |
| B1-4810 | (A.1.38) | (J.1.2) |
| B1-4811 | (A.2.6) | (J.1.2) |
| B1-4812 | (A.3.2) | (J.1.2) |
| B1-4813 | (A.3.3) | (J.1.2) |
| B1-4814 | (A.3.4) | (J.1.2) |
| B1-4815 | (A.3.7) | (J.1.2) |
| B1-4816 | (A.3.8) | (J.1.2) |
| B1-4817 | (A.3.9) | (J.1.2) |
| B1-4818 | (A.3.10) | (J.1.2) |
| B1-4819 | (A.3.11) | (J.1.2) |
| B1-4820 | (A.3.12) | (J.1.2) |
| B1-4821 | (A.3.15) | (J.1.2) |
| B1-4822 | (A.3.16) | (J.1.2) |
| B1-4823 | (A.3.17) | (J.1.2) |
| B1-4824 | (A.3.19) | (J.1.2) |
| B1-4825 | (A.3.21) | (J.1.2) |
| B1-4826 | (A.3.22) | (J.1.2) |
| B1-4827 | (A.3.23) | (J.1.2) |
| B1-4828 | (A.3.28) | (J.1.2) |
| B1-4829 | (A.3.31) | (J.1.2) |
| B1-4830 | (A.4.5) | (J.1.2) |
| B1-4831 | (B.1.4) | (J.1.2) |
| B1-4832 | (B.1.5) | (J.1.2) |
| B1-4833 | (B.1.8) | (J.1.2) |
| B1-4834 | (B.1.10) | (J.1.2) |
| B1-4835 | (B.1.12) | (J.1.2) |
| B1-4836 | (B.1.15) | (J.1.2) |
| B1-4837 | (B.1.17) | (J.1.2) |
| B1-4838 | (B.1.18) | (J.1.2) |
| B1-4839 | (B.1.21) | (J.1.2) |
| B1-4840 | (B.1.22) | (J.1.2) |
| B1-4841 | (B.1.23) | (J.1.2) |
| B1-4842 | (B.1.25) | (J.1.2) |
| B1-4843 | (B.1.26) | (J.1.2) |
| B1-4844 | (B.1.29) | (J.1.2) |
| B1-4845 | (B.1.38) | (J.1.2) |
| B1-4846 | (B.1.44) | (J.1.2) |
| B1-4847 | (B.1.46) | (J.1.2) |
| B1-4848 | (B.2.4) | (J.1.2) |
| B1-4849 | (B.3.1) | (J.1.2) |
| B1-4850 | (C.1.4) | (J.1.2) |
| B1-4851 | (C.1.5) | (J.1.2) |
| B1-4852 | (C.2.1) | (J.1.2) |
| B1-4853 | (D.1.4) | (J.1.2) |
| B1-4854 | (D.1.5) | (J.1.2) |
| B1-4855 | (D.2.3) | (J.1.2) |
| B1-4856 | (D.2.5) | (J.1.2) |
| B1-4857 | (D.2.6) | (J.1.2) |
| B1-4858 | (E.1.1) | (J.1.2) |
| B1-4859 | (E.1.3) | (J.1.2) |
| B1-4860 | (E.2.2) | (J.1.2) |
| B1-4861 | (E.2.3), | (J.1.2) |
| B1-4862 | (F.1.2) | (J.1.2) |
| B1-4863 | (F.1.3) | (J.1.2) |
| B1-4864 | (F.1.5) | (J.1.2) |

TABLE B1-continued

| Mixture | Co 2) | Co3) |
|---|---|---|
| B1-4865 | (G.1.4) | (J.1.2) |
| B1-4866 | (G.3.1) | (J.1.2) |
| B1-4867 | (G.5.1) | (J.1.2) |
| B1-4868 | (H.1.2) | (J.1.2) |
| B1-4869 | (H.1.3) | (J.1.2) |
| B1-4870 | (H.1.4) | (J.1.2) |
| B1-4871 | (H.1.5) | (J.1.2) |
| B1-4872 | (H.1.6) | (J.1.2) |
| B1-4873 | (H.1.7) | (J.1.2) |
| B1-4874 | (H.2.2) | (J.1.2) |
| B1-4875 | (H.2.3) | (J.1.2) |
| B1-4876 | (H.2.5) | (J.1.2) |
| B1-4877 | (H.2.7) | (J.1.2) |
| B1-4878 | (H.3.2) | (J.1.2) |
| B1-4879 | (H.3.4) | (J.1.2) |
| B1-4880 | (H.3.5) | (J.1.2) |
| B1-4881 | (H.3.10) | (J.1.2) |
| B1-4882 | (H.4.2) | (J.1.2) |
| B1-4883 | (H.4.9) | (J.1.2) |
| B1-4884 | (I.1.1) | (J.1.2) |
| B1-4885 | (I.2.1) | (J.1.2) |
| B1-4886 | (I.2.2) | (J.1.2) |
| B1-4887 | (J.1.2) | (J.1.2) |
| B1-4888 | (J.1.3) | (J.1.2) |
| B1-4889 | (J.1.4) | (J.1.2) |
| B1-4890 | (J.1.5) | (J.1.2) |
| B1-4891 | (J.1.8) | (J.1.2) |
| B1-4892 | (J.1.12) | (J.1.2) |
| B1-4893 | (K.1.13) | (J.1.2) |
| B1-4894 | (K.1.47) | (J.1.2) |
| B1-4895 | (K.1.54) | (J.1.2) |
| B1-4896 | (L.1.5) | (J.1.2) |
| B1-4897 | (L.1.9) | (J.1.2) |
| B1-4898 | (L.1.12) | (J.1.2) |
| B1-4899 | (L.1.13) | (J.1.2) |
| B1-4900 | (L.1.17) | (J.1.2) |
| B1-4901 | (L.1.23) | (J.1.2) |
| B1-4902 | (L.1.32), | (J.1.2) |
| B1-4903 | (L.1.46) | (J.1.2) |
| B1-4904 | (M.1.6) | (J.1.2) |
| B1-4905 | (M.1.24) | (J.1.2) |
| B1-4906 | (M.1.25) | (J.1.2) |
| B1-4907 | (M.1.28) | (J.1.2) |
| B1-4908 | (M.1.29) | (J.1.2) |
| B1-4909 | (M.1.30) | (J.1.2) |
| B1-4910 | (N.7.3) | (J.1.2) |
| B1-4911 | (N.7.4) | (J.1.2) |
| B1-4912 | (N.7.5) | (J.1.2) |
| B1-4913 | (N.13.13) | (J.1.2) |
| B1-4914 | (O.2.4), | (J.1.2) |
| B1-4915 | (O.4.5) | (J.1.2) |
| B1-4916 | (O.4.7) | (J.1.2) |
| B1-4917 | (O.4.8) | (J.1.2) |
| B1-4918 | (O.5.1) | (J.1.2) |
| B1-4919 | (O.26.2) | (J.1.2) |
| B1-4920 | (O.27.17) | (J.1.2) |
| B1-4921 | (A.1.1) | (J.1.3) |
| B1-4922 | (A.1.4) | (J.1.3) |
| B1-4923 | (A.1.8) | (J.1.3) |
| B1-4924 | (A.1.10) | (J.1.3) |
| B1-4925 | (A.1.11) | (J.1.3) |
| B1-4926 | (A.1.12) | (J.1.3) |
| B1-4927 | (A.1.14) | (J.1.3) |
| B1-4928 | (A.1.17) | (J.1.3) |
| B1-4929 | (A.1.19) | (J.1.3) |
| B1-4930 | (A.1.25) | (J.1.3) |
| B1-4931 | (A.1.34) | (J.1.3) |
| B1-4932 | (A.1.35) | (J.1.3) |
| B1-4933 | (A.1.38) | (J.1.3) |
| B1-4934 | (A.2.6) | (J.1.3) |
| B1-4935 | (A.3.2) | (J.1.3) |
| B1-4936 | (A.3.3) | (J.1.3) |
| B1-4937 | (A.3.4) | (J.1.3) |
| B1-4938 | (A.3.7) | (J.1.3) |
| B1-4939 | (A.3.8) | (J.1.3) |
| B1-4940 | (A.3.9) | (J.1.3) |
| B1-4941 | (A.3.10) | (J.1.3) |
| B1-4942 | (A.3.11) | (J.1.3) |

TABLE B1-continued

| Mixture | Co 2) | Co3) |
|---|---|---|
| B1-4943 | (A.3.12) | (J.1.3) |
| B1-4944 | (A.3.15) | (J.1.3) |
| B1-4945 | (A.3.16) | (J.1.3) |
| B1-4946 | (A.3.17) | (J.1.3) |
| B1-4947 | (A.3.19) | (J.1.3) |
| B1-4948 | (A.3.21) | (J.1.3) |
| B1-4949 | (A.3.22) | (J.1.3) |
| B1-4950 | (A.3.23) | (J.1.3) |
| B1-4951 | (A.3.28) | (J.1.3) |
| B1-4952 | (A.3.31) | (J.1.3) |
| B1-4953 | (A.4.5) | (J.1.3) |
| B1-4954 | (B.1.4) | (J.1.3) |
| B1-4955 | (B.1.5) | (J.1.3) |
| B1-4956 | (B.1.8) | (J.1.3) |
| B1-4957 | (B.1.10) | (J.1.3) |
| B1-4958 | (B.1.12) | (J.1.3) |
| B1-4959 | (B.1.15) | (J.1.3) |
| B1-4960 | (B.1.17) | (J.1.3) |
| B1-4961 | (B.1.18) | (J.1.3) |
| B1-4962 | (B.1.21) | (J.1.3) |
| B1-4963 | (B.1.22) | (J.1.3) |
| B1-4964 | (B.1.23) | (J.1.3) |
| B1-4965 | (B.1.25) | (J.1.3) |
| B1-4966 | (B.1.26) | (J.1.3) |
| B1-4967 | (B.1.29) | (J.1.3) |
| B1-4968 | (B.1.38) | (J.1.3) |
| B1-4969 | (B.1.44) | (J.1.3) |
| B1-4970 | (B.1.46) | (J.1.3) |
| B1-4971 | (B.2.4) | (J.1.3) |
| B1-4972 | (B.3.1) | (J.1.3) |
| B1-4973 | (C.1.4) | (J.1.3) |
| B1-4974 | (C.1.5) | (J.1.3) |
| B1-4975 | (C.2.1) | (J.1.3) |
| B1-4976 | (D.1.4) | (J.1.3) |
| B1-4977 | (D.1.5) | (J.1.3) |
| B1-4978 | (D.2.3) | (J.1.3) |
| B1-4979 | (D.2.5) | (J.1.3) |
| B1-4980 | (D.2.6) | (J.1.3) |
| B1-4981 | (E.1.1) | (J.1.3) |
| B1-4982 | (E.1.3) | (J.1.3) |
| B1-4983 | (E.2.2) | (J.1.3) |
| B1-4984 | (E.2.3), | (J.1.3) |
| B1-4985 | (F.1.2) | (J.1.3) |
| B1-4986 | (F.1.3) | (J.1.3) |
| B1-4987 | (F.1.5) | (J.1.3) |
| B1-4988 | (G.1.4) | (J.1.3) |
| B1-4989 | (G.3.1) | (J.1.3) |
| B1-4990 | (G.5.1) | (J.1.3) |
| B1-4991 | (H.1.2) | (J.1.3) |
| B1-4992 | (H.1.3) | (J.1.3) |
| B1-4993 | (H.1.4) | (J.1.3) |
| B1-4994 | (H.1.5) | (J.1.3) |
| B1-4995 | (H.1.6) | (J.1.3) |
| B1-4996 | (H.1.7) | (J.1.3) |
| B1-4997 | (H.2.2) | (J.1.3) |
| B1-4998 | (H.2.3) | (J.1.3) |
| B1-4999 | (H.2.5) | (J.1.3) |
| B1-5000 | (H.2.7) | (J.1.3) |
| B1-5001 | (H.3.2) | (J.1.3) |
| B1-5002 | (H.3.4) | (J.1.3) |
| B1-5003 | (H.3.5) | (J.1.3) |
| B1-5004 | (H.3.10) | (J.1.3) |
| B1-5005 | (H.4.2) | (J.1.3) |
| B1-5006 | (H.4.9) | (J.1.3) |
| B1-5007 | (I.1.1) | (J.1.3) |
| B1-5008 | (I.2.1) | (J.1.3) |
| B1-5009 | (I.2.2) | (J.1.3) |
| B1-5010 | (J.1.2) | (J.1.3) |
| B1-5011 | (J.1.3) | (J.1.3) |
| B1-5012 | (J.1.4) | (J.1.3) |
| B1-5013 | (J.1.5) | (J.1.3) |
| B1-5014 | (J.1.8) | (J.1.3) |
| B1-5015 | (J.1.12) | (J.1.3) |
| B1-5016 | (K.1.13) | (J.1.3) |
| B1-5017 | (K.1.47) | (J.1.3) |
| B1-5018 | (K.1.54) | (J.1.3) |
| B1-5019 | (L.1.5) | (J.1.3) |
| B1-5020 | (L.1.9) | (J.1.3) |

TABLE B1-continued

| Mixture | Co 2) | Co3) |
|---|---|---|
| B1-5021 | (L.1.12) | (J.1.3) |
| B1-5022 | (L.1.13) | (J.1.3) |
| B1-5023 | (L.1.17) | (J.1.3) |
| B1-5024 | (L.1.23) | (J.1.3) |
| B1-5025 | (L.1.32), | (J.1.3) |
| B1-5026 | (L.1.46) | (J.1.3) |
| B1-5027 | (M.1.6) | (J.1.3) |
| B1-5028 | (M.1.24) | (J.1.3) |
| B1-5029 | (M.1.25) | (J.1.3) |
| B1-5030 | (M.1.28) | (J.1.3) |
| B1-5031 | (M.1.29) | (J.1.3) |
| B1-5032 | (M.1.30) | (J.1.3) |
| B1-5033 | (N.7.3) | (J.1.3) |
| B1-5034 | (N.7.4) | (J.1.3) |
| B1-5035 | (N.7.5) | (J.1.3) |
| B1-5036 | (N.13.13) | (J.1.3) |
| B1-5037 | (O.2.4), | (J.1.3) |
| B1-5038 | (O.4.5) | (J.1.3) |
| B1-5039 | (O.4.7) | (J.1.3) |
| B1-5040 | (O.4.8) | (J.1.3) |
| B1-5041 | (O.5.1) | (J.1.3) |
| B1-5042 | (O.26.2) | (J.1.3) |
| B1-5043 | (O.27.17) | (J.1.3) |
| B1-5044 | (A.1.1) | (J.1.4) |
| B1-5045 | (A.1.4) | (J.1.4) |
| B1-5046 | (A.1.8) | (J.1.4) |
| B1-5047 | (A.1.10) | (J.1.4) |
| B1-5048 | (A.1.11) | (J.1.4) |
| B1-5049 | (A.1.12) | (J.1.4) |
| B1-5050 | (A.1.14) | (J.1.4) |
| B1-5051 | (A.1.17) | (J.1.4) |
| B1-5052 | (A.1.19) | (J.1.4) |
| B1-5053 | (A.1.25) | (J.1.4) |
| B1-5054 | (A.1.34) | (J.1.4) |
| B1-5055 | (A.1.35) | (J.1.4) |
| B1-5056 | (A.1.38) | (J.1.4) |
| B1-5057 | (A.2.6) | (J.1.4) |
| B1-5058 | (A.3.2) | (J.1.4) |
| B1-5059 | (A.3.3) | (J.1.4) |
| B1-5060 | (A.3.4) | (J.1.4) |
| B1-5061 | (A.3.7) | (J.1.4) |
| B1-5062 | (A.3.8) | (J.1.4) |
| B1-5063 | (A.3.9) | (J.1.4) |
| B1-5064 | (A.3.10) | (J.1.4) |
| B1-5065 | (A.3.11) | (J.1.4) |
| B1-5066 | (A.3.12) | (J.1.4) |
| B1-5067 | (A.3.15) | (J.1.4) |
| B1-5068 | (A.3.16) | (J.1.4) |
| B1-5069 | (A.3.17) | (J.1.4) |
| B1-5070 | (A.3.19) | (J.1.4) |
| B1-5071 | (A.3.21) | (J.1.4) |
| B1-5072 | (A.3.22) | (J.1.4) |
| B1-5073 | (A.3.23) | (J.1.4) |
| B1-5074 | (A.3.28) | (J.1.4) |
| B1-5075 | (A.3.31) | (J.1.4) |
| B1-5076 | (A.4.5) | (J.1.4) |
| B1-5077 | (B.1.4) | (J.1.4) |
| B1-5078 | (B.1.5) | (J.1.4) |
| B1-5079 | (B.1.8) | (J.1.4) |
| B1-5080 | (B.1.10) | (J.1.4) |
| B1-5081 | (B.1.12) | (J.1.4) |
| B1-5082 | (B.1.15) | (J.1.4) |
| B1-5083 | (B.1.17) | (J.1.4) |
| B1-5084 | (B.1.18) | (J.1.4) |
| B1-5085 | (B.1.21) | (J.1.4) |
| B1-5086 | (B.1.22) | (J.1.4) |
| B1-5087 | (B.1.23) | (J.1.4) |
| B1-5088 | (B.1.25) | (J.1.4) |
| B1-5089 | (B.1.26) | (J.1.4) |
| B1-5090 | (B.1.29) | (J.1.4) |
| B1-5091 | (B.1.38) | (J.1.4) |
| B1-5092 | (B.1.44) | (J.1.4) |
| B1-5093 | (B.1.46) | (J.1.4) |
| B1-5094 | (B.2.4) | (J.1.4) |
| B1-5095 | (B.3.1) | (J.1.4) |
| B1-5096 | (C.1.4) | (J.1.4) |
| B1-5097 | (C.1.5) | (J.1.4) |
| B1-5098 | (C.2.1) | (J.1.4) |

TABLE B1-continued

| Mixture | Co 2) | Co3) |
|---|---|---|
| B1-5099 | (D.1.4) | (J.1.4) |
| B1-5100 | (D.1.5) | (J.1.4) |
| B1-5101 | (D.2.3) | (J.1.4) |
| B1-5102 | (D.2.5) | (J.1.4) |
| B1-5103 | (D.2.6) | (J.1.4) |
| B1-5104 | (E.1.1) | (J.1.4) |
| B1-5105 | (E.1.3) | (J.1.4) |
| B1-5106 | (E.2.2) | (J.1.4) |
| B1-5107 | (E.2.3), | (J.1.4) |
| B1-5108 | (F.1.2) | (J.1.4) |
| B1-5109 | (F.1.3) | (J.1.4) |
| B1-5110 | (F.1.5) | (J.1.4) |
| B1-5111 | (G.1.4) | (J.1.4) |
| B1-5112 | (G.3.1) | (J.1.4) |
| B1-5113 | (G.5.1) | (J.1.4) |
| B1-5114 | (H.1.2) | (J.1.4) |
| B1-5115 | (H.1.3) | (J.1.4) |
| B1-5116 | (H.1.4) | (J.1.4) |
| B1-5117 | (H.1.5) | (J.1.4) |
| B1-5118 | (H.1.6) | (J.1.4) |
| B1-5119 | (H.1.7) | (J.1.4) |
| B1-5120 | (H.2.2) | (J.1.4) |
| B1-5121 | (H.2.3) | (J.1.4) |
| B1-5122 | (H.2.5) | (J.1.4) |
| B1-5123 | (H.2.7) | (J.1.4) |
| B1-5124 | (H.3.2) | (J.1.4) |
| B1-5125 | (H.3.4) | (J.1.4) |
| B1-5126 | (H.3.5) | (J.1.4) |
| B1-5127 | (H.3.10) | (J.1.4) |
| B1-5128 | (H.4.2) | (J.1.4) |
| B1-5129 | (H.4.9) | (J.1.4) |
| B1-5130 | (I.1.1) | (J.1.4) |
| B1-5131 | (I.2.1) | (J.1.4) |
| B1-5132 | (I.2.2) | (J.1.4) |
| B1-5133 | (J.1.2) | (J.1.4) |
| B1-5134 | (J.1.3) | (J.1.4) |
| B1-5135 | (J.1.4) | (J.1.4) |
| B1-5136 | (J.1.5) | (J.1.4) |
| B1-5137 | (J.1.8) | (J.1.4) |
| B1-5138 | (J.1.12) | (J.1.4) |
| B1-5139 | (K.1.13) | (J.1.4) |
| B1-5140 | (K.1.47) | (J.1.4) |
| B1-5141 | (K.1.54) | (J.1.4) |
| B1-5142 | (L.1.5) | (J.1.4) |
| B1-5143 | (L.1.9) | (J.1.4) |
| B1-5144 | (L.1.12) | (J.1.4) |
| B1-5145 | (L.1.13) | (J.1.4) |
| B1-5146 | (L.1.17) | (J.1.4) |
| B1-5147 | (L.1.23) | (J.1.4) |
| B1-5148 | (L.1.32), | (J.1.4) |
| B1-5149 | (L.1.46) | (J.1.4) |
| B1-5150 | (M.1.6) | (J.1.4) |
| B1-5151 | (M.1.24) | (J.1.4) |
| B1-5152 | (M.1.25) | (J.1.4) |
| B1-5153 | (M.1.28) | (J.1.4) |
| B1-5154 | (M.1.29) | (J.1.4) |
| B1-5155 | (M.1.30) | (J.1.4) |
| B1-5156 | (N.7.3) | (J.1.4) |
| B1-5157 | (N.7.4) | (J.1.4) |
| B1-5158 | (N.7.5) | (J.1.4) |
| B1-5159 | (N.13.13) | (J.1.4) |
| B1-5160 | (O.2.4), | (J.1.4) |
| B1-5161 | (O.4.5) | (J.1.4) |
| B1-5162 | (O.4.7) | (J.1.4) |
| B1-5163 | (O.4.8) | (J.1.4) |
| B1-5164 | (O.5.1) | (J.1.4) |
| B1-5165 | (O.26.2) | (J.1.4) |
| B1-5166 | (O.27.17) | (J.1.4) |
| B1-5167 | (A.1.1) | (J.1.5) |
| B1-5168 | (A.1.4) | (J.1.5) |
| B1-5169 | (A.1.8) | (J.1.5) |
| B1-5170 | (A.1.10) | (J.1.5) |
| B1-5171 | (A.1.11) | (J.1.5) |
| B1-5172 | (A.1.12) | (J.1.5) |
| B1-5173 | (A.1.14) | (J.1.5) |
| B1-5174 | (A.1.17) | (J.1.5) |
| B1-5175 | (A.1.19) | (J.1.5) |
| B1-5176 | (A.1.25) | (J.1.5) |

TABLE B1-continued

| Mixture | Co 2) | Co3) |
|---|---|---|
| B1-5177 | (A.1.34) | (J.1.5) |
| B1-5178 | (A.1.35) | (J.1.5) |
| B1-5179 | (A.1.38) | (J.1.5) |
| B1-5180 | (A.2.6) | (J.1.5) |
| B1-5181 | (A.3.2) | (J.1.5) |
| B1-5182 | (A.3.3) | (J.1.5) |
| B1-5183 | (A.3.4) | (J.1.5) |
| B1-5184 | (A.3.7) | (J.1.5) |
| B1-5185 | (A.3.8) | (J.1.5) |
| B1-5186 | (A.3.9) | (J.1.5) |
| B1-5187 | (A.3.10) | (J.1.5) |
| B1-5188 | (A.3.11) | (J.1.5) |
| B1-5189 | (A.3.12) | (J.1.5) |
| B1-5190 | (A.3.15) | (J.1.5) |
| B1-5191 | (A.3.16) | (J.1.5) |
| B1-5192 | (A.3.17) | (J.1.5) |
| B1-5193 | (A.3.19) | (J.1.5) |
| B1-5194 | (A.3.21) | (J.1.5) |
| B1-5195 | (A.3.22) | (J.1.5) |
| B1-5196 | (A.3.23) | (J.1.5) |
| B1-5197 | (A.3.28) | (J.1.5) |
| B1-5198 | (A.3.31) | (J.1.5) |
| B1-5199 | (A.4.5) | (J.1.5) |
| B1-5200 | (B.1.4) | (J.1.5) |
| B1-5201 | (B.1.5) | (J.1.5) |
| B1-5202 | (B.1.8) | (J.1.5) |
| B1-5203 | (B.1.10) | (J.1.5) |
| B1-5204 | (B.1.12) | (J.1.5) |
| B1-5205 | (B.1.15) | (J.1.5) |
| B1-5206 | (B.1.17) | (J.1.5) |
| B1-5207 | (B.1.18) | (J.1.5) |
| B1-5208 | (B.1.21) | (J.1.5) |
| B1-5209 | (B.1.22) | (J.1.5) |
| B1-5210 | (B.1.23) | (J.1.5) |
| B1-5211 | (B.1.25) | (J.1.5) |
| B1-5212 | (B.1.26) | (J.1.5) |
| B1-5213 | (B.1.29) | (J.1.5) |
| B1-5214 | (B.1.38) | (J.1.5) |
| B1-5215 | (B.1.44) | (J.1.5) |
| B1-5216 | (B.1.46) | (J.1.5) |
| B1-5217 | (B.2.4) | (J.1.5) |
| B1-5218 | (B.3.1) | (J.1.5) |
| B1-5219 | (C.1.4) | (J.1.5) |
| B1-5220 | (C.1.5) | (J.1.5) |
| B1-5221 | (C.2.1) | (J.1.5) |
| B1-5222 | (D.1.4) | (J.1.5) |
| B1-5223 | (D.1.5) | (J.1.5) |
| B1-5224 | (D.2.3) | (J.1.5) |
| B1-5225 | (D.2.5) | (J.1.5) |
| B1-5226 | (D.2.6) | (J.1.5) |
| B1-5227 | (E.1.1) | (J.1.5) |
| B1-5228 | (E.1.3) | (J.1.5) |
| B1-5229 | (E.2.2) | (J.1.5) |
| B1-5230 | (E.2.3), | (J.1.5) |
| B1-5231 | (F.1.2) | (J.1.5) |
| B1-5232 | (F.1.3) | (J.1.5) |
| B1-5233 | (F.1.5) | (J.1.5) |
| B1-5234 | (G.1.4) | (J.1.5) |
| B1-5235 | (G.3.1) | (J.1.5) |
| B1-5236 | (G.5.1) | (J.1.5) |
| B1-5237 | (H.1.2) | (J.1.5) |
| B1-5238 | (H.1.3) | (J.1.5) |
| B1-5239 | (H.1.4) | (J.1.5) |
| B1-5240 | (H.1.5) | (J.1.5) |
| B1-5241 | (H.1.6) | (J.1.5) |
| B1-5242 | (H.1.7) | (J.1.5) |
| B1-5243 | (H.2.2) | (J.1.5) |
| B1-5244 | (H.2.3) | (J.1.5) |
| B1-5245 | (H.2.5) | (J.1.5) |
| B1-5246 | (H.2.7) | (J.1.5) |
| B1-5247 | (H.3.2) | (J.1.5) |
| B1-5248 | (H.3.4) | (J.1.5) |
| B1-5249 | (H.3.5) | (J.1.5) |
| B1-5250 | (H.3.10) | (J.1.5) |
| B1-5251 | (H.4.2) | (J.1.5) |
| B1-5252 | (H.4.9) | (J.1.5) |
| B1-5253 | (I.1.1) | (J.1.5) |
| B1-5254 | (I.2.1) | (J.1.5) |

TABLE B1-continued

| Mixture | Co 2) | Co3) |
|---|---|---|
| B1-5255 | (I.2.2) | (J.1.5) |
| B1-5256 | (J.1.2) | (J.1.5) |
| B1-5257 | (J.1.3) | (J.1.5) |
| B1-5258 | (J.1.4) | (J.1.5) |
| B1-5259 | (J.1.5) | (J.1.5) |
| B1-5260 | (J.1.8) | (J.1.5) |
| B1-5261 | (J.1.12) | (J.1.5) |
| B1-5262 | (K.1.13) | (J.1.5) |
| B1-5263 | (K.1.47) | (J.1.5) |
| B1-5264 | (K.1.54) | (J.1.5) |
| B1-5265 | (L.1.5) | (J.1.5) |
| B1-5266 | (L.1.9) | (J.1.5) |
| B1-5267 | (L.1.12) | (J.1.5) |
| B1-5268 | (L.1.13) | (J.1.5) |
| B1-5269 | (L.1.17) | (J.1.5) |
| B1-5270 | (L.1.23) | (J.1.5) |
| B1-5271 | (L.1.32), | (J.1.5) |
| B1-5272 | (L.1.46) | (J.1.5) |
| B1-5273 | (M.1.6) | (J.1.5) |
| B1-5274 | (M.1.24) | (J.1.5) |
| B1-5275 | (M.1.25) | (J.1.5) |
| B1-5276 | (M.1.28) | (J.1.5) |
| B1-5277 | (M.1.29) | (J.1.5) |
| B1-5278 | (M.1.30) | (J.1.5) |
| B1-5279 | (N.7.3) | (J.1.5) |
| B1-5280 | (N.7.4) | (J.1.5) |
| B1-5281 | (N.7.5) | (J.1.5) |
| B1-5282 | (N.13.13) | (J.1.5) |
| B1-5283 | (O.2.4), | (J.1.5) |
| B1-5284 | (O.4.5) | (J.1.5) |
| B1-5285 | (O.4.7) | (J.1.5) |
| B1-5286 | (O.4.8) | (J.1.5) |
| B1-5287 | (O.5.1) | (J.1.5) |
| B1-5288 | (O.26.2) | (J.1.5) |
| B1-5289 | (O.27.17) | (J.1.5) |
| B1-5290 | (A.1.1) | (J.1.8) |
| B1-5291 | (A.1.4) | (J.1.8) |
| B1-5292 | (A.1.8) | (J.1.8) |
| B1-5293 | (A.1.10) | (J.1.8) |
| B1-5294 | (A.1.11) | (J.1.8) |
| B1-5295 | (A.1.12) | (J.1.8) |
| B1-5296 | (A.1.14) | (J.1.8) |
| B1-5297 | (A.1.17) | (J.1.8) |
| B1-5298 | (A.1.19) | (J.1.8) |
| B1-5299 | (A.1.25) | (J.1.8) |
| B1-5300 | (A.1.34) | (J.1.8) |
| B1-5301 | (A.1.35) | (J.1.8) |
| B1-5302 | (A.1.38) | (J.1.8) |
| B1-5303 | (A.2.6) | (J.1.8) |
| B1-5304 | (A.3.2) | (J.1.8) |
| B1-5305 | (A.3.3) | (J.1.8) |
| B1-5306 | (A.3.4) | (J.1.8) |
| B1-5307 | (A.3.7) | (J.1.8) |
| B1-5308 | (A.3.8) | (J.1.8) |
| B1-5309 | (A.3.9) | (J.1.8) |
| B1-5310 | (A.3.10) | (J.1.8) |
| B1-5311 | (A.3.11) | (J.1.8) |
| B1-5312 | (A.3.12) | (J.1.8) |
| B1-5313 | (A.3.15) | (J.1.8) |
| B1-5314 | (A.3.16) | (J.1.8) |
| B1-5315 | (A.3.17) | (J.1.8) |
| B1-5316 | (A.3.19) | (J.1.8) |
| B1-5317 | (A.3.21) | (J.1.8) |
| B1-5318 | (A.3.22) | (J.1.8) |
| B1-5319 | (A.3.23) | (J.1.8) |
| B1-5320 | (A.3.28) | (J.1.8) |
| B1-5321 | (A.3.31) | (J.1.8) |
| B1-5322 | (A.4.5) | (J.1.8) |
| B1-5323 | (B.1.4) | (J.1.8) |
| B1-5324 | (B.1.5) | (J.1.8) |
| B1-5325 | (B.1.8) | (J.1.8) |
| B1-5326 | (B.1.10) | (J.1.8) |
| B1-5327 | (B.1.12) | (J.1.8) |
| B1-5328 | (B.1.15) | (J.1.8) |
| B1-5329 | (B.1.17) | (J.1.8) |
| B1-5330 | (B.1.18) | (J.1.8) |
| B1-5331 | (B.1.21) | (J.1.8) |
| B1-5332 | (B.1.22) | (J.1.8) |

TABLE B1-continued

| Mixture | Co 2) | Co3) |
|---|---|---|
| B1-5333 | (B.1.23) | (J.1.8) |
| B1-5334 | (B.1.25) | (J.1.8) |
| B1-5335 | (B.1.26) | (J.1.8) |
| B1-5336 | (B.1.29) | (J.1.8) |
| B1-5337 | (B.1.38) | (J.1.8) |
| B1-5338 | (B.1.44) | (J.1.8) |
| B1-5339 | (B.1.46) | (J.1.8) |
| B1-5340 | (B.2.4) | (J.1.8) |
| B1-5341 | (B.3.1) | (J.1.8) |
| B1-5342 | (C.1.4) | (J.1.8) |
| B1-5343 | (C.1.5) | (J.1.8) |
| B1-5344 | (C.2.1) | (J.1.8) |
| B1-5345 | (D.1.4) | (J.1.8) |
| B1-5346 | (D.1.5) | (J.1.8) |
| B1-5347 | (D.2.3) | (J.1.8) |
| B1-5348 | (D.2.5) | (J.1.8) |
| B1-5349 | (D.2.6) | (J.1.8) |
| B1-5350 | (E.1.1) | (J.1.8) |
| B1-5351 | (E.1.3) | (J.1.8) |
| B1-5352 | (E.2.2) | (J.1.8) |
| B1-5353 | (E.2.3), | (J.1.8) |
| B1-5354 | (F.1.2) | (J.1.8) |
| B1-5355 | (F.1.3) | (J.1.8) |
| B1-5356 | (F.1.5) | (J.1.8) |
| B1-5357 | (G.1.4) | (J.1.8) |
| B1-5358 | (G.3.1) | (J.1.8) |
| B1-5359 | (G.5.1) | (J.1.8) |
| B1-5360 | (H.1.2) | (J.1.8) |
| B1-5361 | (H.1.3) | (J.1.8) |
| B1-5362 | (H.1.4) | (J.1.8) |
| B1-5363 | (H.1.5) | (J.1.8) |
| B1-5364 | (H.1.6) | (J.1.8) |
| B1-5365 | (H.1.7) | (J.1.8) |
| B1-5366 | (H.2.2) | (J.1.8) |
| B1-5367 | (H.2.3) | (J.1.8) |
| B1-5368 | (H.2.5) | (J.1.8) |
| B1-5369 | (H.2.7) | (J.1.8) |
| B1-5370 | (H.3.2) | (J.1.8) |
| B1-5371 | (H.3.4) | (J.1.8) |
| B1-5372 | (H.3.5) | (J.1.8) |
| B1-5373 | (H.3.10) | (J.1.8) |
| B1-5374 | (H.4.2) | (J.1.8) |
| B1-5375 | (H.4.9) | (J.1.8) |
| B1-5376 | (I.1.1) | (J.1.8) |
| B1-5377 | (I.2.1) | (J.1.8) |
| B1-5378 | (I.2.2) | (J.1.8) |
| B1-5379 | (J.1.2) | (J.1.8) |
| B1-5380 | (J.1.3) | (J.1.8) |
| B1-5381 | (J.1.4) | (J.1.8) |
| B1-5382 | (J.1.5) | (J.1.8) |
| B1-5383 | (J.1.8) | (J.1.8) |
| B1-5384 | (J.1.12) | (J.1.8) |
| B1-5385 | (K.1.13) | (J.1.8) |
| B1-5386 | (K.1.47) | (J.1.8) |
| B1-5387 | (K.1.54) | (J.1.8) |
| B1-5388 | (L.1.5) | (J.1.8) |
| B1-5389 | (L.1.9) | (J.1.8) |
| B1-5390 | (L.1.12) | (J.1.8) |
| B1-5391 | (L.1.13) | (J.1.8) |
| B1-5392 | (L.1.17) | (J.1.8) |
| B1-5393 | (L.1.23) | (J.1.8) |
| B1-5394 | (L.1.32), | (J.1.8) |
| B1-5395 | (L.1.46) | (J.1.8) |
| B1-5396 | (M.1.6) | (J.1.8) |
| B1-5397 | (M.1.24) | (J.1.8) |
| B1-5398 | (M.1.25) | (J.1.8) |
| B1-5399 | (M.1.28) | (J.1.8) |
| B1-5400 | (M.1.29) | (J.1.8) |
| B1-5401 | (M.1.30) | (J.1.8) |
| B1-5402 | (N.7.3) | (J.1.8) |
| B1-5403 | (N.7.4) | (J.1.8) |
| B1-5404 | (N.7.5) | (J.1.8) |
| B1-5405 | (N.13.13) | (J.1.8) |
| B1-5406 | (O.2.4), | (J.1.8) |
| B1-5407 | (O.4.5) | (J.1.8) |
| B1-5408 | (O.4.7) | (J.1.8) |
| B1-5409 | (O.4.8) | (J.1.8) |
| B1-5410 | (O.5.1) | (J.1.8) |

TABLE B1-continued

| Mixture | Co 2) | Co3) |
|---|---|---|
| B1-5411 | (O.26.2) | (J.1.8) |
| B1-5412 | (O.27.17) | (J.1.8) |
| B1-5413 | (A.1.1) | (J.1.12) |
| B1-5414 | (A.1.4) | (J.1.12) |
| B1-5415 | (A.1.8) | (J.1.12) |
| B1-5416 | (A.1.10) | (J.1.12) |
| B1-5417 | (A.1.11) | (J.1.12) |
| B1-5418 | (A.1.12) | (J.1.12) |
| B1-5419 | (A.1.14) | (J.1.12) |
| B1-5420 | (A.1.17) | (J.1.12) |
| B1-5421 | (A.1.19) | (J.1.12) |
| B1-5422 | (A.1.25) | (J.1.12) |
| B1-5423 | (A.1.34) | (J.1.12) |
| B1-5424 | (A.1.35) | (J.1.12) |
| B1-5425 | (A.1.38) | (J.1.12) |
| B1-5426 | (A.2.6) | (J.1.12) |
| B1-5427 | (A.3.2) | (J.1.12) |
| B1-5428 | (A.3.3) | (J.1.12) |
| B1-5429 | (A.3.4) | (J.1.12) |
| B1-5430 | (A.3.7) | (J.1.12) |
| B1-5431 | (A.3.8) | (J.1.12) |
| B1-5432 | (A.3.9) | (J.1.12) |
| B1-5433 | (A.3.10) | (J.1.12) |
| B1-5434 | (A.3.11) | (J.1.12) |
| B1-5435 | (A.3.12) | (J.1.12) |
| B1-5436 | (A.3.15) | (J.1.12) |
| B1-5437 | (A.3.16) | (J.1.12) |
| B1-5438 | (A.3.17) | (J.1.12) |
| B1-5439 | (A.3.19) | (J.1.12) |
| B1-5440 | (A.3.21) | (J.1.12) |
| B1-5441 | (A.3.22) | (J.1.12) |
| B1-5442 | (A.3.23) | (J.1.12) |
| B1-5443 | (A.3.28) | (J.1.12) |
| B1-5444 | (A.3.31) | (J.1.12) |
| B1-5445 | (A.4.5) | (J.1.12) |
| B1-5446 | (B.1.4) | (J.1.12) |
| B1-5447 | (B.1.5) | (J.1.12) |
| B1-5448 | (B.1.8) | (J.1.12) |
| B1-5449 | (B.1.10) | (J.1.12) |
| B1-5450 | (B.1.12) | (J.1.12) |
| B1-5451 | (B.1.15) | (J.1.12) |
| B1-5452 | (B.1.17) | (J.1.12) |
| B1-5453 | (B.1.18) | (J.1.12) |
| B1-5454 | (B.1.21) | (J.1.12) |
| B1-5455 | (B.1.22) | (J.1.12) |
| B1-5456 | (B.1.23) | (J.1.12) |
| B1-5457 | (B.1.25) | (J.1.12) |
| B1-5458 | (B.1.26) | (J.1.12) |
| B1-5459 | (B.1.29) | (J.1.12) |
| B1-5460 | (B.1.38) | (J.1.12) |
| B1-5461 | (B.1.44) | (J.1.12) |
| B1-5462 | (B.1.46) | (J.1.12) |
| B1-5463 | (B.2.4) | (J.1.12) |
| B1-5464 | (B.3.1) | (J.1.12) |
| B1-5465 | (C.1.4) | (J.1.12) |
| B1-5466 | (C.1.5) | (J.1.12) |
| B1-5467 | (C.2.1) | (J.1.12) |
| B1-5468 | (D.1.4) | (J.1.12) |
| B1-5469 | (D.1.5) | (J.1.12) |
| B1-5470 | (D.2.3) | (J.1.12) |
| B1-5471 | (D.2.5) | (J.1.12) |
| B1-5472 | (D.2.6) | (J.1.12) |
| B1-5473 | (E.1.1) | (J.1.12) |
| B1-5474 | (E.1.3) | (J.1.12) |
| B1-5475 | (E.2.2) | (J.1.12) |
| B1-5476 | (E.2.3), | (J.1.12) |
| B1-5477 | (F.1.2) | (J.1.12) |
| B1-5478 | (F.1.3) | (J.1.12) |
| B1-5479 | (F.1.5) | (J.1.12) |
| B1-5480 | (G.1.4) | (J.1.12) |
| B1-5481 | (G.3.1) | (J.1.12) |
| B1-5482 | (G.5.1) | (J.1.12) |
| B1-5483 | (H.1.2) | (J.1.12) |
| B1-5484 | (H.1.3) | (J.1.12) |
| B1-5485 | (H.1.4) | (J.1.12) |
| B1-5486 | (H.1.5) | (J.1.12) |
| B1-5487 | (H.1.6) | (J.1.12) |
| B1-5488 | (H.1.7) | (J.1.12) |

TABLE B1-continued

| Mixture | Co 2) | Co3) |
|---|---|---|
| B1-5489 | (H.2.2) | (J.1.12) |
| B1-5490 | (H.2.3) | (J.1.12) |
| B1-5491 | (H.2.5) | (J.1.12) |
| B1-5492 | (H.2.7) | (J.1.12) |
| B1-5493 | (H.3.2) | (J.1.12) |
| B1-5494 | (H.3.4) | (J.1.12) |
| B1-5495 | (H.3.5) | (J.1.12) |
| B1-5496 | (H.3.10) | (J.1.12) |
| B1-5497 | (H.4.2) | (J.1.12) |
| B1-5498 | (H.4.9) | (J.1.12) |
| B1-5499 | (I.1.1) | (J.1.12) |
| B1-5500 | (I.2.1) | (J.1.12) |
| B1-5501 | (I.2.2) | (J.1.12) |
| B1-5502 | (J.1.2) | (J.1.12) |
| B1-5503 | (J.1.3) | (J.1.12) |
| B1-5504 | (J.1.4) | (J.1.12) |
| B1-5505 | (J.1.5) | (J.1.12) |
| B1-5506 | (J.1.8) | (J.1.12) |
| B1-5507 | (J.1.12) | (J.1.12) |
| B1-5508 | (K.1.13) | (J.1.12) |
| B1-5509 | (K.1.47) | (J.1.12) |
| B1-5510 | (K.1.54) | (J.1.12) |
| B1-5511 | (L.1.5) | (J.1.12) |
| B1-5512 | (L.1.9) | (J.1.12) |
| B1-5513 | (L.1.12) | (J.1.12) |
| B1-5514 | (L.1.13) | (J.1.12) |
| B1-5515 | (L.1.17) | (J.1.12) |
| B1-5516 | (L.1.23) | (J.1.12) |
| B1-5517 | (L.1.32), | (J.1.12) |
| B1-5518 | (L.1.46) | (J.1.12) |
| B1-5519 | (M.1.6) | (J.1.12) |
| B1-5520 | (M.1.24) | (J.1.12) |
| B1-5521 | (M.1.25) | (J.1.12) |
| B1-5522 | (M.1.28) | (J.1.12) |
| B1-5523 | (M.1.29) | (J.1.12) |
| B1-5524 | (M.1.30) | (J.1.12) |
| B1-5525 | (N.7.3) | (J.1.12) |
| B1-5526 | (N.7.4) | (J.1.12) |
| B1-5527 | (N.7.5) | (J.1.12) |
| B1-5528 | (N.13.13) | (J.1.12) |
| B1-5529 | (O.2.4), | (J.1.12) |
| B1-5530 | (O.4.5) | (J.1.12) |
| B1-5531 | (O.4.7) | (J.1.12) |
| B1-5532 | (O.4.8) | (J.1.12) |
| B1-5533 | (O.5.1) | (J.1.12) |
| B1-5534 | (O.26.2) | (J.1.12) |
| B1-5535 | (O.27.17) | (J.1.12) |
| B1-5536 | (A.1.1) | (K.1.47) |
| B1-5537 | (A.1.4) | (K.1.47) |
| B1-5538 | (A.1.8) | (K.1.47) |
| B1-5539 | (A.1.10) | (K.1.47) |
| B1-5540 | (A.1.11) | (K.1.47) |
| B1-5541 | (A.1.12) | (K.1.47) |
| B1-5542 | (A.1.14) | (K.1.47) |
| B1-5543 | (A.1.17) | (K.1.47) |
| B1-5544 | (A.1.19) | (K.1.47) |
| B1-5545 | (A.1.25) | (K.1.47) |
| B1-5546 | (A.1.34) | (K.1.47) |
| B1-5547 | (A.1.35) | (K.1.47) |
| B1-5548 | (A.1.38) | (K.1.47) |
| B1-5549 | (A.2.6) | (K.1.47) |
| B1-5550 | (A.3.2) | (K.1.47) |
| B1-5551 | (A.3.3) | (K.1.47) |
| B1-5552 | (A.3.4) | (K.1.47) |
| B1-5553 | (A.3.7) | (K.1.47) |
| B1-5554 | (A.3.8) | (K.1.47) |
| B1-5555 | (A.3.9) | (K.1.47) |
| B1-5556 | (A.3.10) | (K.1.47) |
| B1-5557 | (A.3.11) | (K.1.47) |
| B1-5558 | (A.3.12) | (K.1.47) |
| B1-5559 | (A.3.15) | (K.1.47) |
| B1-5560 | (A.3.16) | (K.1.47) |
| B1-5561 | (A.3.17) | (K.1.47) |
| B1-5562 | (A.3.19) | (K.1.47) |
| B1-5563 | (A.3.21) | (K.1.47) |
| B1-5564 | (A.3.22) | (K.1.47) |
| B1-5565 | (A.3.23) | (K.1.47) |
| B1-5566 | (A.3.28) | (K.1.47) |

TABLE B1-continued

| Mixture | Co 2) | Co3) |
|---|---|---|
| B1-5567 | (A.3.31) | (K.1.47) |
| B1-5568 | (A.4.5) | (K.1.47) |
| B1-5569 | (B.1.4) | (K.1.47) |
| B1-5570 | (B.1.5) | (K.1.47) |
| B1-5571 | (B.1.8) | (K.1.47) |
| B1-5572 | (B.1.10) | (K.1.47) |
| B1-5573 | (B.1.12) | (K.1.47) |
| B1-5574 | (B.1.15) | (K.1.47) |
| B1-5575 | (B.1.17) | (K.1.47) |
| B1-5576 | (B.1.18) | (K.1.47) |
| B1-5577 | (B.1.21) | (K.1.47) |
| B1-5578 | (B.1.22) | (K.1.47) |
| B1-5579 | (B.1.23) | (K.1.47) |
| B1-5580 | (B.1.25) | (K.1.47) |
| B1-5581 | (B.1.26) | (K.1.47) |
| B1-5582 | (B.1.29) | (K.1.47) |
| B1-5583 | (B.1.38) | (K.1.47) |
| B1-5584 | (B.1.44) | (K.1.47) |
| B1-5585 | (B.1.46) | (K.1.47) |
| B1-5586 | (B.2.4) | (K.1.47) |
| B1-5587 | (B.3.1) | (K.1.47) |
| B1-5588 | (C.1.4) | (K.1.47) |
| B1-5589 | (C.1.5) | (K.1.47) |
| B1-5590 | (C.2.1) | (K.1.47) |
| B1-5591 | (D.1.4) | (K.1.47) |
| B1-5592 | (D.1.5) | (K.1.47) |
| B1-5593 | (D.2.3) | (K.1.47) |
| B1-5594 | (D.2.5) | (K.1.47) |
| B1-5595 | (D.2.6) | (K.1.47) |
| B1-5596 | (E.1.1) | (K.1.47) |
| B1-5597 | (E.1.3) | (K.1.47) |
| B1-5598 | (E.2.2) | (K.1.47) |
| B1-5599 | (E.2.3), | (K.1.47) |
| B1-5600 | (F.1.2) | (K.1.47) |
| B1-5601 | (F.1.3) | (K.1.47) |
| B1-5602 | (F.1.5) | (K.1.47) |
| B1-5603 | (G.1.4) | (K.1.47) |
| B1-5604 | (G.3.1) | (K.1.47) |
| B1-5605 | (G.5.1) | (K.1.47) |
| B1-5606 | (H.1.2) | (K.1.47) |
| B1-5607 | (H.1.3) | (K.1.47) |
| B1-5608 | (H.1.4) | (K.1.47) |
| B1-5609 | (H.1.5) | (K.1.47) |
| B1-5610 | (H.1.6) | (K.1.47) |
| B1-5611 | (H.1.7) | (K.1.47) |
| B1-5612 | (H.2.2) | (K.1.47) |
| B1-5613 | (H.2.3) | (K.1.47) |
| B1-5614 | (H.2.5) | (K.1.47) |
| B1-5615 | (H.2.7) | (K.1.47) |
| B1-5616 | (H.3.2) | (K.1.47) |
| B1-5617 | (H.3.4) | (K.1.47) |
| B1-5618 | (H.3.5) | (K.1.47) |
| B1-5619 | (H.3.10) | (K.1.47) |
| B1-5620 | (H.4.2) | (K.1.47) |
| B1-5621 | (H.4.9) | (K.1.47) |
| B1-5622 | (I.1.1) | (K.1.47) |
| B1-5623 | (I.2.1) | (K.1.47) |
| B1-5624 | (I.2.2) | (K.1.47) |
| B1-5625 | (J.1.2) | (K.1.47) |
| B1-5626 | (J.1.3) | (K.1.47) |
| B1-5627 | (J.1.4) | (K.1.47) |
| B1-5628 | (J.1.5) | (K.1.47) |
| B1-5629 | (J.1.8) | (K.1.47) |
| B1-5630 | (J.1.12) | (K.1.47) |
| B1-5631 | (K.1.13) | (K.1.47) |
| B1-5632 | (K.1.47) | (K.1.47) |
| B1-5633 | (K.1.54) | (K.1.47) |
| B1-5634 | (L.1.5) | (K.1.47) |
| B1-5635 | (L.1.9) | (K.1.47) |
| B1-5636 | (L.1.12) | (K.1.47) |
| B1-5637 | (L.1.13) | (K.1.47) |
| B1-5638 | (L.1.17) | (K.1.47) |
| B1-5639 | (L.1.23) | (K.1.47) |
| B1-5640 | (L.1.32), | (K.1.47) |
| B1-5641 | (L.1.46) | (K.1.47) |
| B1-5642 | (M.1.6) | (K.1.47) |
| B1-5643 | (M.1.24) | (K.1.47) |
| B1-5644 | (M.1.25) | (K.1.47) |

TABLE B1-continued

| Mixture | Co 2) | Co3) |
|---|---|---|
| B1-5645 | (M.1.28) | (K.1.47) |
| B1-5646 | (M.1.29) | (K.1.47) |
| B1-5647 | (M.1.30) | (K.1.47) |
| B1-5648 | (N.7.3) | (K.1.47) |
| B1-5649 | (N.7.4) | (K.1.47) |
| B1-5650 | (N.7.5) | (K.1.47) |
| B1-5651 | (N.13.13) | (K.1.47) |
| B1-5652 | (O.2.4), | (K.1.47) |
| B1-5653 | (O.4.5) | (K.1.47) |
| B1-5654 | (O.4.7) | (K.1.47) |
| B1-5655 | (O.4.8) | (K.1.47) |
| B1-5656 | (O.5.1) | (K.1.47) |
| B1-5657 | (O.26.2) | (K.1.47) |
| B1-5658 | (O.27.17) | (K.1.47) |
| B1-5659 | (A.1.1) | (K.1.54) |
| B1-5660 | (A.1.4) | (K.1.54) |
| B1-5661 | (A.1.8) | (K.1.54) |
| B1-5662 | (A.1.10) | (K.1.54) |
| B1-5663 | (A.1.11) | (K.1.54) |
| B1-5664 | (A.1.12) | (K.1.54) |
| B1-5665 | (A.1.14) | (K.1.54) |
| B1-5666 | (A.1.17) | (K.1.54) |
| B1-5667 | (A.1.19) | (K.1.54) |
| B1-5668 | (A.1.25) | (K.1.54) |
| B1-5669 | (A.1.34) | (K.1.54) |
| B1-5670 | (A.1.35) | (K.1.54) |
| B1-5671 | (A.1.38) | (K.1.54) |
| B1-5672 | (A.2.6) | (K.1.54) |
| B1-5673 | (A.3.2) | (K.1.54) |
| B1-5674 | (A.3.3) | (K.1.54) |
| B1-5675 | (A.3.4) | (K.1.54) |
| B1-5676 | (A.3.7) | (K.1.54) |
| B1-5677 | (A.3.8) | (K.1.54) |
| B1-5678 | (A.3.9) | (K.1.54) |
| B1-5679 | (A.3.10) | (K.1.54) |
| B1-5680 | (A.3.11) | (K.1.54) |
| B1-5681 | (A.3.12) | (K.1.54) |
| B1-5682 | (A.3.15) | (K.1.54) |
| B1-5683 | (A.3.16) | (K.1.54) |
| B1-5684 | (A.3.17) | (K.1.54) |
| B1-5685 | (A.3.19) | (K.1.54) |
| B1-5686 | (A.3.21) | (K.1.54) |
| B1-5687 | (A.3.22) | (K.1.54) |
| B1-5688 | (A.3.23) | (K.1.54) |
| B1-5689 | (A.3.28) | (K.1.54) |
| B1-5690 | (A.3.31) | (K.1.54) |
| B1-5691 | (A.4.5) | (K.1.54) |
| B1-5692 | (B.1.4) | (K.1.54) |
| B1-5693 | (B.1.5) | (K.1.54) |
| B1-5694 | (B.1.8) | (K.1.54) |
| B1-5695 | (B.1.10) | (K.1.54) |
| B1-5696 | (B.1.12) | (K.1.54) |
| B1-5697 | (B.1.15) | (K.1.54) |
| B1-5698 | (B.1.17) | (K.1.54) |
| B1-5699 | (B.1.18) | (K.1.54) |
| B1-5700 | (B.1.21) | (K.1.54) |
| B1-5701 | (B.1.22) | (K.1.54) |
| B1-5702 | (B.1.23) | (K.1.54) |
| B1-5703 | (B.1.25) | (K.1.54) |
| B1-5704 | (B.1.26) | (K.1.54) |
| B1-5705 | (B.1.29) | (K.1.54) |
| B1-5706 | (B.1.38) | (K.1.54) |
| B1-5707 | (B.1.44) | (K.1.54) |
| B1-5708 | (B.1.46) | (K.1.54) |
| B1-5709 | (B.2.4) | (K.1.54) |
| B1-5710 | (B.3.1) | (K.1.54) |
| B1-5711 | (C.1.4) | (K.1.54) |
| B1-5712 | (C.1.5) | (K.1.54) |
| B1-5713 | (C.2.1) | (K.1.54) |
| B1-5714 | (D.1.4) | (K.1.54) |
| B1-5715 | (D.1.5) | (K.1.54) |
| B1-5716 | (D.2.3) | (K.1.54) |
| B1-5717 | (D.2.5) | (K.1.54) |
| B1-5718 | (D.2.6) | (K.1.54) |
| B1-5719 | (E.1.1) | (K.1.54) |
| B1-5720 | (E.1.3) | (K.1.54) |
| B1-5721 | (E.2.2) | (K.1.54) |
| B1-5722 | (E.2.3), | (K.1.54) |

TABLE B1-continued

| Mixture | Co 2) | Co3) |
|---|---|---|
| B1-5723 | (F.1.2) | (K.1.54) |
| B1-5724 | (F.1.3) | (K.1.54) |
| B1-5725 | (F.1.5) | (K.1.54) |
| B1-5726 | (G.1.4) | (K.1.54) |
| B1-5727 | (G.3.1) | (K.1.54) |
| B1-5728 | (G.5.1) | (K.1.54) |
| B1-5729 | (H.1.2) | (K.1.54) |
| B1-5730 | (H.1.3) | (K.1.54) |
| B1-5731 | (H.1.4) | (K.1.54) |
| B1-5732 | (H.1.5) | (K.1.54) |
| B1-5733 | (H.1.6) | (K.1.54) |
| B1-5734 | (H.1.7) | (K.1.54) |
| B1-5735 | (H.2.2) | (K.1.54) |
| B1-5736 | (H.2.3) | (K.1.54) |
| B1-5737 | (H.2.5) | (K.1.54) |
| B1-5738 | (H.2.7) | (K.1.54) |
| B1-5739 | (H.3.2) | (K.1.54) |
| B1-5740 | (H.3.4) | (K.1.54) |
| B1-5741 | (H.3.5) | (K.1.54) |
| B1-5742 | (H.3.10) | (K.1.54) |
| B1-5743 | (H.4.2) | (K.1.54) |
| B1-5744 | (H.4.9) | (K.1.54) |
| B1-5745 | (I.1.1) | (K.1.54) |
| B1-5746 | (I.2.1) | (K.1.54) |
| B1-5747 | (I.2.2) | (K.1.54) |
| B1-5748 | (J.1.2) | (K.1.54) |
| B1-5749 | (J.1.3) | (K.1.54) |
| B1-5750 | (J.1.4) | (K.1.54) |
| B1-5751 | (J.1.5) | (K.1.54) |
| B1-5752 | (J.1.8) | (K.1.54) |
| B1-5753 | (J.1.12) | (K.1.54) |
| B1-5754 | (K.1.13) | (K.1.54) |
| B1-5755 | (K.1.47) | (K.1.54) |
| B1-5756 | (K.1.54) | (K.1.54) |
| B1-5757 | (L.1.5) | (K.1.54) |
| B1-5758 | (L.1.9) | (K.1.54) |
| B1-5759 | (L.1.12) | (K.1.54) |
| B1-5760 | (L.1.13) | (K.1.54) |
| B1-5761 | (L.1.17) | (K.1.54) |
| B1-5762 | (L.1.23) | (K.1.54) |
| B1-5763 | (L.1.32), | (K.1.54) |
| B1-5764 | (L.1.46) | (K.1.54) |
| B1-5765 | (M.1.6) | (K.1.54) |
| B1-5766 | (M.1.24) | (K.1.54) |
| B1-5767 | (M.1.25) | (K.1.54) |
| B1-5768 | (M.1.28) | (K.1.54) |
| B1-5769 | (M.1.29) | (K.1.54) |
| B1-5770 | (M.1.30) | (K.1.54) |
| B1-5771 | (N.7.3) | (K.1.54) |
| B1-5772 | (N.7.4) | (K.1.54) |
| B1-5773 | (N.7.5) | (K.1.54) |
| B1-5774 | (N.13.13) | (K.1.54) |
| B1-5775 | (O.2.4), | (K.1.54) |
| B1-5776 | (O.4.5) | (K.1.54) |
| B1-5777 | (O.4.7) | (K.1.54) |
| B1-5778 | (O.4.8) | (K.1.54) |
| B1-5779 | (O.5.1) | (K.1.54) |
| B1-5780 | (O.26.2) | (K.1.54) |
| B1-5781 | (O.27.17) | (K.1.54) |
| B1-5782 | (A.1.1) | (M.1.24) |
| B1-5783 | (A.1.4) | (M.1.24) |
| B1-5784 | (A.1.8) | (M.1.24) |
| B1-5785 | (A.1.10) | (M.1.24) |
| B1-5786 | (A.1.11) | (M.1.24) |
| B1-5787 | (A.1.12) | (M.1.24) |
| B1-5788 | (A.1.14) | (M.1.24) |
| B1-5789 | (A.1.17) | (M.1.24) |
| B1-5790 | (A.1.19) | (M.1.24) |
| B1-5791 | (A.1.25) | (M.1.24) |
| B1-5792 | (A.1.34) | (M.1.24) |
| B1-5793 | (A.1.35) | (M.1.24) |
| B1-5794 | (A.1.38) | (M.1.24) |
| B1-5795 | (A.2.6) | (M.1.24) |
| B1-5796 | (A.3.2) | (M.1.24) |
| B1-5797 | (A.3.3) | (M.1.24) |
| B1-5798 | (A.3.4) | (M.1.24) |
| B1-5799 | (A.3.7) | (M.1.24) |
| B1-5800 | (A.3.8) | (M.1.24) |

TABLE B1-continued

| Mixture | Co 2) | Co3) |
|---|---|---|
| B1-5801 | (A.3.9) | (M.1.24) |
| B1-5802 | (A.3.10) | (M.1.24) |
| B1-5803 | (A.3.11) | (M.1.24) |
| B1-5804 | (A.3.12) | (M.1.24) |
| B1-5805 | (A.3.15) | (M.1.24) |
| B1-5806 | (A.3.16) | (M.1.24) |
| B1-5807 | (A.3.17) | (M.1.24) |
| B1-5808 | (A.3.19) | (M.1.24) |
| B1-5809 | (A.3.21) | (M.1.24) |
| B1-5810 | (A.3.22) | (M.1.24) |
| B1-5811 | (A.3.23) | (M.1.24) |
| B1-5812 | (A.3.28) | (M.1.24) |
| B1-5813 | (A.3.31) | (M.1.24) |
| B1-5814 | (A.4.5) | (M.1.24) |
| B1-5815 | (B.1.4) | (M.1.24) |
| B1-5816 | (B.1.5) | (M.1.24) |
| B1-5817 | (B.1.8) | (M.1.24) |
| B1-5818 | (B.1.10) | (M.1.24) |
| B1-5819 | (B.1.12) | (M.1.24) |
| B1-5820 | (B.1.15) | (M.1.24) |
| B1-5821 | (B.1.17) | (M.1.24) |
| B1-5822 | (B.1.18) | (M.1.24) |
| B1-5823 | (B.1.21) | (M.1.24) |
| B1-5824 | (B.1.22) | (M.1.24) |
| B1-5825 | (B.1.23) | (M.1.24) |
| B1-5826 | (B.1.25) | (M.1.24) |
| B1-5827 | (B.1.26) | (M.1.24) |
| B1-5828 | (B.1.29) | (M.1.24) |
| B1-5829 | (B.1.38) | (M.1.24) |
| B1-5830 | (B.1.44) | (M.1.24) |
| B1-5831 | (B.1.46) | (M.1.24) |
| B1-5832 | (B.2.4) | (M.1.24) |
| B1-5833 | (B.3.1) | (M.1.24) |
| B1-5834 | (C.1.4) | (M.1.24) |
| B1-5835 | (C.1.5) | (M.1.24) |
| B1-5836 | (C.2.1) | (M.1.24) |
| B1-5837 | (D.1.4) | (M.1.24) |
| B1-5838 | (D.1.5) | (M.1.24) |
| B1-5839 | (D.2.3) | (M.1.24) |
| B1-5840 | (D.2.5) | (M.1.24) |
| B1-5841 | (D.2.6) | (M.1.24) |
| B1-5842 | (E.1.1) | (M.1.24) |
| B1-5843 | (E.1.3) | (M.1.24) |
| B1-5844 | (E.2.2) | (M.1.24) |
| B1-5845 | (E.2.3), | (M.1.24) |
| B1-5846 | (F.1.2) | (M.1.24) |
| B1-5847 | (F.1.3) | (M.1.24) |
| B1-5848 | (F.1.5) | (M.1.24) |
| B1-5849 | (G.1.4) | (M.1.24) |
| B1-5850 | (G.3.1) | (M.1.24) |
| B1-5851 | (G.5.1) | (M.1.24) |
| B1-5852 | (H.1.2) | (M.1.24) |
| B1-5853 | (H.1.3) | (M.1.24) |
| B1-5854 | (H.1.4) | (M.1.24) |
| B1-5855 | (H.1.5) | (M.1.24) |
| B1-5856 | (H.1.6) | (M.1.24) |
| B1-5857 | (H.1.7) | (M.1.24) |
| B1-5858 | (H.2.2) | (M.1.24) |
| B1-5859 | (H.2.3) | (M.1.24) |
| B1-5860 | (H.2.5) | (M.1.24) |
| B1-5861 | (H.2.7) | (M.1.24) |
| B1-5862 | (H.3.2) | (M.1.24) |
| B1-5863 | (H.3.4) | (M.1.24) |
| B1-5864 | (H.3.5) | (M.1.24) |
| B1-5865 | (H.3.10) | (M.1.24) |
| B1-5866 | (H.4.2) | (M.1.24) |
| B1-5867 | (H.4.9) | (M.1.24) |
| B1-5868 | (I.1.1) | (M.1.24) |
| B1-5869 | (I.2.1) | (M.1.24) |
| B1-5870 | (I.2.2) | (M.1.24) |
| B1-5871 | (J.1.2) | (M.1.24) |
| B1-5872 | (J.1.3) | (M.1.24) |
| B1-5873 | (J.1.4) | (M.1.24) |
| B1-5874 | (J.1.5) | (M.1.24) |
| B1-5875 | (J.1.8) | (M.1.24) |
| B1-5876 | (J.1.12) | (M.1.24) |
| B1-5877 | (K.1.13) | (M.1.24) |
| B1-5878 | (K.1.47) | (M.1.24) |

TABLE B1-continued

| Mixture | Co 2) | Co3) |
|---|---|---|
| B1-5879 | (K.1.54) | (M.1.24) |
| B1-5880 | (L.1.5) | (M.1.24) |
| B1-5881 | (L.1.9) | (M.1.24) |
| B1-5882 | (L.1.12) | (M.1.24) |
| B1-5883 | (L.1.13) | (M.1.24) |
| B1-5884 | (L.1.17) | (M.1.24) |
| B1-5885 | (L.1.23) | (M.1.24) |
| B1-5886 | (L.1.32), | (M.1.24) |
| B1-5887 | (L.1.46) | (M.1.24) |
| B1-5888 | (M.1.6) | (M.1.24) |
| B1-5889 | (M.1.24) | (M.1.24) |
| B1-5890 | (M.1.25) | (M.1.24) |
| B1-5891 | (M.1.28) | (M.1.24) |
| B1-5892 | (M.1.29) | (M.1.24) |
| B1-5893 | (M.1.30) | (M.1.24) |
| B1-5894 | (N.7.3) | (M.1.24) |
| B1-5895 | (N.7.4) | (M.1.24) |
| B1-5896 | (N.7.5) | (M.1.24) |
| B1-5897 | (N.13.13) | (M.1.24) |
| B1-5898 | (O.2.4), | (M.1.24) |
| B1-5899 | (O.4.5) | (M.1.24) |
| B1-5900 | (O.4.7) | (M.1.24) |
| B1-5901 | (O.4.8) | (M.1.24) |
| B1-5902 | (O.5.1) | (M.1.24) |
| B1-5903 | (O.26.2) | (M.1.24) |
| B1-5904 | (O.27.17) | (M.1.24) |
| B1-5905 | (A.1.1) | (M.1.25) |
| B1-5906 | (A.1.4) | (M.1.25) |
| B1-5907 | (A.1.8) | (M.1.25) |
| B1-5908 | (A.1.10) | (M.1.25) |
| B1-5909 | (A.1.11) | (M.1.25) |
| B1-5910 | (A.1.12) | (M.1.25) |
| B1-5911 | (A.1.14) | (M.1.25) |
| B1-5912 | (A.1.17) | (M.1.25) |
| B1-5913 | (A.1.19) | (M.1.25) |
| B1-5914 | (A.1.25) | (M.1.25) |
| B1-5915 | (A.1.34) | (M.1.25) |
| B1-5916 | (A.1.35) | (M.1.25) |
| B1-5917 | (A.1.38) | (M.1.25) |
| B1-5918 | (A.2.6) | (M.1.25) |
| B1-5919 | (A.3.2) | (M.1.25) |
| B1-5920 | (A.3.3) | (M.1.25) |
| B1-5921 | (A.3.4) | (M.1.25) |
| B1-5922 | (A.3.7) | (M.1.25) |
| B1-5923 | (A.3.8) | (M.1.25) |
| B1-5924 | (A.3.9) | (M.1.25) |
| B1-5925 | (A.3.10) | (M.1.25) |
| B1-5926 | (A.3.11) | (M.1.25) |
| B1-5927 | (A.3.12) | (M.1.25) |
| B1-5928 | (A.3.15) | (M.1.25) |
| B1-5929 | (A.3.16) | (M.1.25) |
| B1-5930 | (A.3.17) | (M.1.25) |
| B1-5931 | (A.3.19) | (M.1.25) |
| B1-5932 | (A.3.21) | (M.1.25) |
| B1-5933 | (A.3.22) | (M.1.25) |
| B1-5934 | (A.3.23) | (M.1.25) |
| B1-5935 | (A.3.28) | (M.1.25) |
| B1-5936 | (A.3.31) | (M.1.25) |
| B1-5937 | (A.4.5) | (M.1.25) |
| B1-5938 | (B.1.4) | (M.1.25) |
| B1-5939 | (B.1.5) | (M.1.25) |
| B1-5940 | (B.1.8) | (M.1.25) |
| B1-5941 | (B.1.10) | (M.1.25) |
| B1-5942 | (B.1.12) | (M.1.25) |
| B1-5943 | (B.1.15) | (M.1.25) |
| B1-5944 | (B.1.17) | (M.1.25) |
| B1-5945 | (B.1.18) | (M.1.25) |
| B1-5946 | (B.1.21) | (M.1.25) |
| B1-5947 | (B.1.22) | (M.1.25) |
| B1-5948 | (B.1.23) | (M.1.25) |
| B1-5949 | (B.1.25) | (M.1.25) |
| B1-5950 | (B.1.26) | (M.1.25) |
| B1-5951 | (B.1.29) | (M.1.25) |
| B1-5952 | (B.1.38) | (M.1.25) |
| B1-5953 | (B.1.44) | (M.1.25) |
| B1-5954 | (B.1.46) | (M.1.25) |
| B1-5955 | (B.2.4) | (M.1.25) |
| B1-5956 | (B.3.1) | (M.1.25) |

TABLE B1-continued

| Mixture | Co 2) | Co3) |
|---|---|---|
| B1-5957 | (C.1.4) | (M.1.25) |
| B1-5958 | (C.1.5) | (M.1.25) |
| B1-5959 | (C.2.1) | (M.1.25) |
| B1-5960 | (D.1.4) | (M.1.25) |
| B1-5961 | (D.1.5) | (M.1.25) |
| B1-5962 | (D.2.3) | (M.1.25) |
| B1-5963 | (D.2.5) | (M.1.25) |
| B1-5964 | (D.2.6) | (M.1.25) |
| B1-5965 | (E.1.1) | (M.1.25) |
| B1-5966 | (E.1.3) | (M.1.25) |
| B1-5967 | (E.2.2) | (M.1.25) |
| B1-5968 | (E.2.3), | (M.1.25) |
| B1-5969 | (F.1.2) | (M.1.25) |
| B1-5970 | (F.1.3) | (M.1.25) |
| B1-5971 | (F.1.5) | (M.1.25) |
| B1-5972 | (G.1.4) | (M.1.25) |
| B1-5973 | (G.3.1) | (M.1.25) |
| B1-5974 | (G.5.1) | (M.1.25) |
| B1-5975 | (H.1.2) | (M.1.25) |
| B1-5976 | (H.1.3) | (M.1.25) |
| B1-5977 | (H.1.4) | (M.1.25) |
| B1-5978 | (H.1.5) | (M.1.25) |
| B1-5979 | (H.1.6) | (M.1.25) |
| B1-5980 | (H.1.7) | (M.1.25) |
| B1-5981 | (H.2.2) | (M.1.25) |
| B1-5982 | (H.2.3) | (M.1.25) |
| B1-5983 | (H.2.5) | (M.1.25) |
| B1-5984 | (H.2.7) | (M.1.25) |
| B1-5985 | (H.3.2) | (M.1.25) |
| B1-5986 | (H.3.4) | (M.1.25) |
| B1-5987 | (H.3.5) | (M.1.25) |
| B1-5988 | (H.3.10) | (M.1.25) |
| B1-5989 | (H.4.2) | (M.1.25) |
| B1-5990 | (H.4.9) | (M.1.25) |
| B1-5991 | (I.1.1) | (M.1.25) |
| B1-5992 | (I.2.1) | (M.1.25) |
| B1-5993 | (I.2.2) | (M.1.25) |
| B1-5994 | (J.1.2) | (M.1.25) |
| B1-5995 | (J.1.3) | (M.1.25) |
| B1-5996 | (J.1.4) | (M.1.25) |
| B1-5997 | (J.1.5) | (M.1.25) |
| B1-5998 | (J.1.8) | (M.1.25) |
| B1-5999 | (J.1.12) | (M.1.25) |
| B1-6000 | (K.1.13) | (M.1.25) |
| B1-6001 | (K.1.47) | (M.1.25) |
| B1-6002 | (K.1.54) | (M.1.25) |
| B1-6003 | (L.1.5) | (M.1.25) |
| B1-6004 | (L.1.9) | (M.1.25) |
| B1-6005 | (L.1.12) | (M.1.25) |
| B1-6006 | (L.1.13) | (M.1.25) |
| B1-6007 | (L.1.17) | (M.1.25) |
| B1-6008 | (L.1.23) | (M.1.25) |
| B1-6009 | (L.1.32), | (M.1.25) |
| B1-6010 | (L.1.46) | (M.1.25) |
| B1-6011 | (M.1.6) | (M.1.25) |
| B1-6012 | (M.1.24) | (M.1.25) |
| B1-6013 | (M.1.25) | (M.1.25) |
| B1-6014 | (M.1.28) | (M.1.25) |
| B1-6015 | (M.1.29) | (M.1.25) |
| B1-6016 | (M.1.30) | (M.1.25) |
| B1-6017 | (N.7.3) | (M.1.25) |
| B1-6018 | (N.7.4) | (M.1.25) |
| B1-6019 | (N.7.5) | (M.1.25) |
| B1-6020 | (N.13.13) | (M.1.25) |
| B1-6021 | (O.2.4), | (M.1.25) |
| B1-6022 | (O.4.5) | (M.1.25) |
| B1-6023 | (O.4.7) | (M.1.25) |
| B1-6024 | (O.4.8) | (M.1.25) |
| B1-6025 | (O.5.1) | (M.1.25) |
| B1-6026 | (O.26.2) | (M.1.25) |
| B1-6027 | (O.27.17) | (M.1.25) |
| B1-6028 | (A.1.1) | (M.1.29) |
| B1-6029 | (A.1.4) | (M.1.29) |
| B1-6030 | (A.1.8) | (M.1.29) |
| B1-6031 | (A.1.10) | (M.1.29) |
| B1-6032 | (A.1.11) | (M.1.29) |
| B1-6033 | (A.1.12) | (M.1.29) |
| B1-6034 | (A.1.14) | (M.1.29) |

TABLE B1-continued

| Mixture | Co 2) | Co3) |
|---|---|---|
| B1-6035 | (A.1.17) | (M.1.29) |
| B1-6036 | (A.1.19) | (M.1.29) |
| B1-6037 | (A.1.25) | (M.1.29) |
| B1-6038 | (A.1.34) | (M.1.29) |
| B1-6039 | (A.1.35) | (M.1.29) |
| B1-6040 | (A.1.38) | (M.1.29) |
| B1-6041 | (A.2.6) | (M.1.29) |
| B1-6042 | (A.3.2) | (M.1.29) |
| B1-6043 | (A.3.3) | (M.1.29) |
| B1-6044 | (A.3.4) | (M.1.29) |
| B1-6045 | (A.3.7) | (M.1.29) |
| B1-6046 | (A.3.8) | (M.1.29) |
| B1-6047 | (A.3.9) | (M.1.29) |
| B1-6048 | (A.3.10) | (M.1.29) |
| B1-6049 | (A.3.11) | (M.1.29) |
| B1-6050 | (A.3.12) | (M.1.29) |
| B1-6051 | (A.3.15) | (M.1.29) |
| B1-6052 | (A.3.16) | (M.1.29) |
| B1-6053 | (A.3.17) | (M.1.29) |
| B1-6054 | (A.3.19) | (M.1.29) |
| B1-6055 | (A.3.21) | (M.1.29) |
| B1-6056 | (A.3.22) | (M.1.29) |
| B1-6057 | (A.3.23) | (M.1.29) |
| B1-6058 | (A.3.28) | (M.1.29) |
| B1-6059 | (A.3.31) | (M.1.29) |
| B1-6060 | (A.4.5) | (M.1.29) |
| B1-6061 | (B.1.4) | (M.1.29) |
| B1-6062 | (B.1.5) | (M.1.29) |
| B1-6063 | (B.1.8) | (M.1.29) |
| B1-6064 | (B.1.10) | (M.1.29) |
| B1-6065 | (B.1.12) | (M.1.29) |
| B1-6066 | (B.1.15) | (M.1.29) |
| B1-6067 | (B.1.17) | (M.1.29) |
| B1-6068 | (B.1.18) | (M.1.29) |
| B1-6069 | (B.1.21) | (M.1.29) |
| B1-6070 | (B.1.22) | (M.1.29) |
| B1-6071 | (B.1.23) | (M.1.29) |
| B1-6072 | (B.1.25) | (M.1.29) |
| B1-6073 | (B.1.26) | (M.1.29) |
| B1-6074 | (B.1.29) | (M.1.29) |
| B1-6075 | (B.1.38) | (M.1.29) |
| B1-6076 | (B.1.44) | (M.1.29) |
| B1-6077 | (B.1.46) | (M.1.29) |
| B1-6078 | (B.2.4) | (M.1.29) |
| B1-6079 | (B.3.1) | (M.1.29) |
| B1-6080 | (C.1.4) | (M.1.29) |
| B1-6081 | (C.1.5) | (M.1.29) |
| B1-6082 | (C.2.1) | (M.1.29) |
| B1-6083 | (D.1.4) | (M.1.29) |
| B1-6084 | (D.1.5) | (M.1.29) |
| B1-6085 | (D.2.3) | (M.1.29) |
| B1-6086 | (D.2.5) | (M.1.29) |
| B1-6087 | (D.2.6) | (M.1.29) |
| B1-6088 | (E.1.1) | (M.1.29) |
| B1-6089 | (E.1.3) | (M.1.29) |
| B1-6090 | (E.2.2) | (M.1.29) |
| B1-6091 | (E.2.3), | (M.1.29) |
| B1-6092 | (F.1.2) | (M.1.29) |
| B1-6093 | (F.1.3) | (M.1.29) |
| B1-6094 | (F.1.5) | (M.1.29) |
| B1-6095 | (G.1.4) | (M.1.29) |
| B1-6096 | (G.3.1) | (M.1.29) |
| B1-6097 | (G.5.1) | (M.1.29) |
| B1-6098 | (H.1.2) | (M.1.29) |
| B1-6099 | (H.1.3) | (M.1.29) |
| B1-6100 | (H.1.4) | (M.1.29) |
| B1-6101 | (H.1.5) | (M.1.29) |
| B1-6102 | (H.1.6) | (M.1.29) |
| B1-6103 | (H.1.7) | (M.1.29) |
| B1-6104 | (H.2.2) | (M.1.29) |
| B1-6105 | (H.2.3) | (M.1.29) |
| B1-6106 | (H.2.5) | (M.1.29) |
| B1-6107 | (H.2.7) | (M.1.29) |
| B1-6108 | (H.3.2) | (M.1.29) |
| B1-6109 | (H.3.4) | (M.1.29) |
| B1-6110 | (H.3.5) | (M.1.29) |
| B1-6111 | (H.3.10) | (M.1.29) |
| B1-6112 | (H.4.2) | (M.1.29) |

TABLE B1-continued

| Mixture | Co 2) | Co3) |
|---|---|---|
| B1-6113 | (H.4.9) | (M.1.29) |
| B1-6114 | (I.1.1) | (M.1.29) |
| B1-6115 | (I.2.1) | (M.1.29) |
| B1-6116 | (I.2.2) | (M.1.29) |
| B1-6117 | (J.1.2) | (M.1.29) |
| B1-6118 | (J.1.3) | (M.1.29) |
| B1-6119 | (J.1.4) | (M.1.29) |
| B1-6120 | (J.1.5) | (M.1.29) |
| B1-6121 | (J.1.8) | (M.1.29) |
| B1-6122 | (J.1.12) | (M.1.29) |
| B1-6123 | (K.1.13) | (M.1.29) |
| B1-6124 | (K.1.47) | (M.1.29) |
| B1-6125 | (K.1.54) | (M.1.29) |
| B1-6126 | (L.1.5) | (M.1.29) |
| B1-6127 | (L.1.9) | (M.1.29) |
| B1-6128 | (L.1.12) | (M.1.29) |
| B1-6129 | (L.1.13) | (M.1.29) |
| B1-6130 | (L.1.17) | (M.1.29) |
| B1-6131 | (L.1.23) | (M.1.29) |
| B1-6132 | (L.1.32), | (M.1.29) |
| B1-6133 | (L.1.46) | (M.1.29) |
| B1-6134 | (M.1.6) | (M.1.29) |
| B1-6135 | (M.1.24) | (M.1.29) |
| B1-6136 | (M.1.25) | (M.1.29) |
| B1-6137 | (M.1.28) | (M.1.29) |
| B1-6138 | (M.1.29) | (M.1.29) |
| B1-6139 | (M.1.30) | (M.1.29) |
| B1-6140 | (N.7.3) | (M.1.29) |
| B1-6141 | (N.7.4) | (M.1.29) |
| B1-6142 | (N.7.5) | (M.1.29) |
| B1-6143 | (N.13.13) | (M.1.29) |
| B1-6144 | (O.2.4), | (M.1.29) |
| B1-6145 | (O.4.5) | (M.1.29) |
| B1-6146 | (O.4.7) | (M.1.29) |
| B1-6147 | (O.4.8) | (M.1.29) |
| B1-6148 | (O.5.1) | (M.1.29) |
| B1-6149 | (O.26.2) | (M.1.29) |
| B1-6150 | (O.27.17) | (M.1.29) |
| B1-6151 | (A.1.1) | (M.1.30) |
| B1-6152 | (A.1.4) | (M.1.30) |
| B1-6153 | (A.1.8) | (M.1.30) |
| B1-6154 | (A.1.10) | (M.1.30) |
| B1-6155 | (A.1.11) | (M.1.30) |
| B1-6156 | (A.1.12) | (M.1.30) |
| B1-6157 | (A.1.14) | (M.1.30) |
| B1-6158 | (A.1.17) | (M.1.30) |
| B1-6159 | (A.1.19) | (M.1.30) |
| B1-6160 | (A.1.25) | (M.1.30) |
| B1-6161 | (A.1.34) | (M.1.30) |
| B1-6162 | (A.1.35) | (M.1.30) |
| B1-6163 | (A.1.38) | (M.1.30) |
| B1-6164 | (A.2.6) | (M.1.30) |
| B1-6165 | (A.3.2) | (M.1.30) |
| B1-6166 | (A.3.3) | (M.1.30) |
| B1-6167 | (A.3.4) | (M.1.30) |
| B1-6168 | (A.3.7) | (M.1.30) |
| B1-6169 | (A.3.8) | (M.1.30) |
| B1-6170 | (A.3.9) | (M.1.30) |
| B1-6171 | (A.3.10) | (M.1.30) |
| B1-6172 | (A.3.11) | (M.1.30) |
| B1-6173 | (A.3.12) | (M.1.30) |
| B1-6174 | (A.3.15) | (M.1.30) |
| B1-6175 | (A.3.16) | (M.1.30) |
| B1-6176 | (A.3.17) | (M.1.30) |
| B1-6177 | (A.3.19) | (M.1.30) |
| B1-6178 | (A.3.21) | (M.1.30) |
| B1-6179 | (A.3.22) | (M.1.30) |
| B1-6180 | (A.3.23) | (M.1.30) |
| B1-6181 | (A.3.28) | (M.1.30) |
| B1-6182 | (A.3.31) | (M.1.30) |
| B1-6183 | (A.4.5) | (M.1.30) |
| B1-6184 | (B.1.4) | (M.1.30) |
| B1-6185 | (B.1.5) | (M.1.30) |
| B1-6186 | (B.1.8) | (M.1.30) |
| B1-6187 | (B.1.10) | (M.1.30) |
| B1-6188 | (B.1.12) | (M.1.30) |
| B1-6189 | (B.1.15) | (M.1.30) |
| B1-6190 | (B.1.17) | (M.1.30) |

TABLE B1-continued

| Mixture | Co 2) | Co3) |
|---|---|---|
| B1-6191 | (B.1.18) | (M.1.30) |
| B1-6192 | (B.1.21) | (M.1.30) |
| B1-6193 | (B.1.22) | (M.1.30) |
| B1-6194 | (B.1.23) | (M.1.30) |
| B1-6195 | (B.1.25) | (M.1.30) |
| B1-6196 | (B.1.26) | (M.1.30) |
| B1-6197 | (B.1.29) | (M.1.30) |
| B1-6198 | (B.1.38) | (M.1.30) |
| B1-6199 | (B.1.44) | (M.1.30) |
| B1-6200 | (B.1.46) | (M.1.30) |
| B1-6201 | (B.2.4) | (M.1.30) |
| B1-6202 | (B.3.1) | (M.1.30) |
| B1-6203 | (C.1.4) | (M.1.30) |
| B1-6204 | (C.1.5) | (M.1.30) |
| B1-6205 | (C.2.1) | (M.1.30) |
| B1-6206 | (D.1.4) | (M.1.30) |
| B1-6207 | (D.1.5) | (M.1.30) |
| B1-6208 | (D.2.3) | (M.1.30) |
| B1-6209 | (D.2.5) | (M.1.30) |
| B1-6210 | (D.2.6) | (M.1.30) |
| B1-6211 | (E.1.1) | (M.1.30) |
| B1-6212 | (E.1.3) | (M.1.30) |
| B1-6213 | (E.2.2) | (M.1.30) |
| B1-6214 | (E.2.3), | (M.1.30) |
| B1-6215 | (F.1.2) | (M.1.30) |
| B1-6216 | (F.1.3) | (M.1.30) |
| B1-6217 | (F.1.5) | (M.1.30) |
| B1-6218 | (G.1.4) | (M.1.30) |
| B1-6219 | (G.3.1) | (M.1.30) |
| B1-6220 | (G.5.1) | (M.1.30) |
| B1-6221 | (H.1.2) | (M.1.30) |
| B1-6222 | (H.1.3) | (M.1.30) |
| B1-6223 | (H.1.4) | (M.1.30) |
| B1-6224 | (H.1.5) | (M.1.30) |
| B1-6225 | (H.1.6) | (M.1.30) |
| B1-6226 | (H.1.7) | (M.1.30) |
| B1-6227 | (H.2.2) | (M.1.30) |
| B1-6228 | (H.2.3) | (M.1.30) |
| B1-6229 | (H.2.5) | (M.1.30) |
| B1-6230 | (H.2.7) | (M.1.30) |
| B1-6231 | (H.3.2) | (M.1.30) |
| B1-6232 | (H.3.4) | (M.1.30) |
| B1-6233 | (H.3.5) | (M.1.30) |
| B1-6234 | (H.3.10) | (M.1.30) |
| B1-6235 | (H.4.2) | (M.1.30) |
| B1-6236 | (H.4.9) | (M.1.30) |
| B1-6237 | (I.1.1) | (M.1.30) |
| B1-6238 | (I.2.1) | (M.1.30) |
| B1-6239 | (I.2.2) | (M.1.30) |
| B1-6240 | (J.1.2) | (M.1.30) |
| B1-6241 | (J.1.3) | (M.1.30) |
| B1-6242 | (J.1.4) | (M.1.30) |
| B1-6243 | (J.1.5) | (M.1.30) |
| B1-6244 | (J.1.8) | (M.1.30) |
| B1-6245 | (J.1.12) | (M.1.30) |
| B1-6246 | (K.1.13) | (M.1.30) |
| B1-6247 | (K.1.47) | (M.1.30) |
| B1-6248 | (K.1.54) | (M.1.30) |
| B1-6249 | (L.1.5) | (M.1.30) |
| B1-6250 | (L.1.9) | (M.1.30) |
| B1-6251 | (L.1.12) | (M.1.30) |
| B1-6252 | (L.1.13) | (M.1.30) |
| B1-6253 | (L.1.17) | (M.1.30) |
| B1-6254 | (L.1.23) | (M.1.30) |
| B1-6255 | (L.1.32), | (M.1.30) |
| B1-6256 | (L.1.46) | (M.1.30) |
| B1-6257 | (M.1.6) | (M.1.30) |
| B1-6258 | (M.1.24) | (M.1.30) |
| B1-6259 | (M.1.25) | (M.1.30) |
| B1-6260 | (M.1.28) | (M.1.30) |
| B1-6261 | (M.1.29) | (M.1.30) |
| B1-6262 | (M.1.30) | (M.1.30) |
| B1-6263 | (N.7.3) | (M.1.30) |
| B1-6264 | (N.7.4) | (M.1.30) |
| B1-6265 | (N.7.5) | (M.1.30) |
| B1-6266 | (N.13.13) | (M.1.30) |
| B1-6267 | (O.2.4), | (M.1.30) |
| B1-6268 | (O.4.5) | (M.1.30) |

TABLE B1-continued

| Mixture | Co 2) | Co3) |
|---|---|---|
| B1-6269 | (O.4.7) | (M.1.30) |
| B1-6270 | (O.4.8) | (M.1.30) |
| B1-6271 | (O.5.1) | (M.1.30) |
| B1-6272 | (O.26.2) | (M.1.30) |
| B1-6273 | (O.27.17) | (M.1.30) |
| B1-6274 | (A.1.1) | (N.7.3) |
| B1-6275 | (A.1.4) | (N.7.3) |
| B1-6276 | (A.1.8) | (N.7.3) |
| B1-6277 | (A.1.10) | (N.7.3) |
| B1-6278 | (A.1.11) | (N.7.3) |
| B1-6279 | (A.1.12) | (N.7.3) |
| B1-6280 | (A.1.14) | (N.7.3) |
| B1-6281 | (A.1.17) | (N.7.3) |
| B1-6282 | (A.1.19) | (N.7.3) |
| B1-6283 | (A.1.25) | (N.7.3) |
| B1-6284 | (A.1.34) | (N.7.3) |
| B1-6285 | (A.1.35) | (N.7.3) |
| B1-6286 | (A.1.38) | (N.7.3) |
| B1-6287 | (A.2.6) | (N.7.3) |
| B1-6288 | (A.3.2) | (N.7.3) |
| B1-6289 | (A.3.3) | (N.7.3) |
| B1-6290 | (A.3.4) | (N.7.3) |
| B1-6291 | (A.3.7) | (N.7.3) |
| B1-6292 | (A.3.8) | (N.7.3) |
| B1-6293 | (A.3.9) | (N.7.3) |
| B1-6294 | (A.3.10) | (N.7.3) |
| B1-6295 | (A.3.11) | (N.7.3) |
| B1-6296 | (A.3.12) | (N.7.3) |
| B1-6297 | (A.3.15) | (N.7.3) |
| B1-6298 | (A.3.16) | (N.7.3) |
| B1-6299 | (A.3.17) | (N.7.3) |
| B1-6300 | (A.3.19) | (N.7.3) |
| B1-6301 | (A.3.21) | (N.7.3) |
| B1-6302 | (A.3.22) | (N.7.3) |
| B1-6303 | (A.3.23) | (N.7.3) |
| B1-6304 | (A.3.28) | (N.7.3) |
| B1-6305 | (A.3.31) | (N.7.3) |
| B1-6306 | (A.4.5) | (N.7.3) |
| B1-6307 | (B.1.4) | (N.7.3) |
| B1-6308 | (B.1.5) | (N.7.3) |
| B1-6309 | (B.1.8) | (N.7.3) |
| B1-6310 | (B.1.10) | (N.7.3) |
| B1-6311 | (B.1.12) | (N.7.3) |
| B1-6312 | (B.1.15) | (N.7.3) |
| B1-6313 | (B.1.17) | (N.7.3) |
| B1-6314 | (B.1.18) | (N.7.3) |
| B1-6315 | (B.1.21) | (N.7.3) |
| B1-6316 | (B.1.22) | (N.7.3) |
| B1-6317 | (B.1.23) | (N.7.3) |
| B1-6318 | (B.1.25) | (N.7.3) |
| B1-6319 | (B.1.26) | (N.7.3) |
| B1-6320 | (B.1.29) | (N.7.3) |
| B1-6321 | (B.1.38) | (N.7.3) |
| B1-6322 | (B.1.44) | (N.7.3) |
| B1-6323 | (B.1.46) | (N.7.3) |
| B1-6324 | (B.2.4) | (N.7.3) |
| B1-6325 | (B.3.1) | (N.7.3) |
| B1-6326 | (C.1.4) | (N.7.3) |
| B1-6327 | (C.1.5) | (N.7.3) |
| B1-6328 | (C.2.1) | (N.7.3) |
| B1-6329 | (D.1.4) | (N.7.3) |
| B1-6330 | (D.1.5) | (N.7.3) |
| B1-6331 | (D.2.3) | (N.7.3) |
| B1-6332 | (D.2.5) | (N.7.3) |
| B1-6333 | (D.2.6) | (N.7.3) |
| B1-6334 | (E.1.1) | (N.7.3) |
| B1-6335 | (E.1.3) | (N.7.3) |
| B1-6336 | (E.2.2) | (N.7.3) |
| B1-6337 | (E.2.3), | (N.7.3) |
| B1-6338 | (F.1.2) | (N.7.3) |
| B1-6339 | (F.1.3) | (N.7.3) |
| B1-6340 | (F.1.5) | (N.7.3) |
| B1-6341 | (G.1.4) | (N.7.3) |
| B1-6342 | (G.3.1) | (N.7.3) |
| B1-6343 | (G.5.1) | (N.7.3) |
| B1-6344 | (H.1.2) | (N.7.3) |
| B1-6345 | (H.1.3) | (N.7.3) |
| B1-6346 | (H.1.4) | (N.7.3) |

TABLE B1-continued

| Mixture | Co 2) | Co3) |
|---|---|---|
| B1-6347 | (H.1.5) | (N.7.3) |
| B1-6348 | (H.1.6) | (N.7.3) |
| B1-6349 | (H.1.7) | (N.7.3) |
| B1-6350 | (H.2.2) | (N.7.3) |
| B1-6351 | (H.2.3) | (N.7.3) |
| B1-6352 | (H.2.5) | (N.7.3) |
| B1-6353 | (H.2.7) | (N.7.3) |
| B1-6354 | (H.3.2) | (N.7.3) |
| B1-6355 | (H.3.4) | (N.7.3) |
| B1-6356 | (H.3.5) | (N.7.3) |
| B1-6357 | (H.3.10) | (N.7.3) |
| B1-6358 | (H.4.2) | (N.7.3) |
| B1-6359 | (H.4.9) | (N.7.3) |
| B1-6360 | (I.1.1) | (N.7.3) |
| B1-6361 | (I.2.1) | (N.7.3) |
| B1-6362 | (I.2.2) | (N.7.3) |
| B1-6363 | (J.1.2) | (N.7.3) |
| B1-6364 | (J.1.3) | (N.7.3) |
| B1-6365 | (J.1.4) | (N.7.3) |
| B1-6366 | (J.1.5) | (N.7.3) |
| B1-6367 | (J.1.8) | (N.7.3) |
| B1-6368 | (J.1.12) | (N.7.3) |
| B1-6369 | (K.1.13) | (N.7.3) |
| B1-6370 | (K.1.47) | (N.7.3) |
| B1-6371 | (K.1.54) | (N.7.3) |
| B1-6372 | (L.1.5) | (N.7.3) |
| B1-6373 | (L.1.9) | (N.7.3) |
| B1-6374 | (L.1.12) | (N.7.3) |
| B1-6375 | (L.1.13) | (N.7.3) |
| B1-6376 | (L.1.17) | (N.7.3) |
| B1-6377 | (L.1.23) | (N.7.3) |
| B1-6378 | (L.1.32), | (N.7.3) |
| B1-6379 | (L.1.46) | (N.7.3) |
| B1-6380 | (M.1.6) | (N.7.3) |
| B1-6381 | (M.1.24) | (N.7.3) |
| B1-6382 | (M.1.25) | (N.7.3) |
| B1-6383 | (M.1.28) | (N.7.3) |
| B1-6384 | (M.1.29) | (N.7.3) |
| B1-6385 | (M.1.30) | (N.7.3) |
| B1-6386 | (N.7.3) | (N.7.3) |
| B1-6387 | (N.7.4) | (N.7.3) |
| B1-6388 | (N.7.5) | (N.7.3) |
| B1-6389 | (N.13.13) | (N.7.3) |
| B1-6390 | (O.2.4), | (N.7.3) |
| B1-6391 | (O.4.5) | (N.7.3) |
| B1-6392 | (O.4.7) | (N.7.3) |
| B1-6393 | (O.4.8) | (N.7.3) |
| B1-6394 | (O.5.1) | (N.7.3) |
| B1-6395 | (O.26.2) | (N.7.3) |
| B1-6396 | (O.27.17) | (N.7.3) |
| B1-6397 | (A.1.1) | (N.7.4) |
| B1-6398 | (A.1.4) | (N.7.4) |
| B1-6399 | (A.1.8) | (N.7.4) |
| B1-6400 | (A.1.10) | (N.7.4) |
| B1-6401 | (A.1.11) | (N.7.4) |
| B1-6402 | (A.1.12) | (N.7.4) |
| B1-6403 | (A.1.14) | (N.7.4) |
| B1-6404 | (A.1.17) | (N.7.4) |
| B1-6405 | (A.1.19) | (N.7.4) |
| B1-6406 | (A.1.25) | (N.7.4) |
| B1-6407 | (A.1.34) | (N.7.4) |
| B1-6408 | (A.1.35) | (N.7.4) |
| B1-6409 | (A.1.38) | (N.7.4) |
| B1-6410 | (A.2.6) | (N.7.4) |
| B1-6411 | (A.3.2) | (N.7.4) |
| B1-6412 | (A.3.3) | (N.7.4) |
| B1-6413 | (A.3.4) | (N.7.4) |
| B1-6414 | (A.3.7) | (N.7.4) |
| B1-6415 | (A.3.8) | (N.7.4) |
| B1-6416 | (A.3.9) | (N.7.4) |
| B1-6417 | (A.3.10) | (N.7.4) |
| B1-6418 | (A.3.11) | (N.7.4) |
| B1-6419 | (A.3.12) | (N.7.4) |
| B1-6420 | (A.3.15) | (N.7.4) |
| B1-6421 | (A.3.16) | (N.7.4) |
| B1-6422 | (A.3.17) | (N.7.4) |
| B1-6423 | (A.3.19) | (N.7.4) |
| B1-6424 | (A.3.21) | (N.7.4) |

TABLE B1-continued

| Mixture | Co 2) | Co3) |
|---|---|---|
| B1-6425 | (A.3.22) | (N.7.4) |
| B1-6426 | (A.3.23) | (N.7.4) |
| B1-6427 | (A.3.28) | (N.7.4) |
| B1-6428 | (A.3.31) | (N.7.4) |
| B1-6429 | (A.4.5) | (N.7.4) |
| B1-6430 | (B.1.4) | (N.7.4) |
| B1-6431 | (B.1.5) | (N.7.4) |
| B1-6432 | (B.1.8) | (N.7.4) |
| B1-6433 | (B.1.10) | (N.7.4) |
| B1-6434 | (B.1.12) | (N.7.4) |
| B1-6435 | (B.1.15) | (N.7.4) |
| B1-6436 | (B.1.17) | (N.7.4) |
| B1-6437 | (B.1.18) | (N.7.4) |
| B1-6438 | (B.1.21) | (N.7.4) |
| B1-6439 | (B.1.22) | (N.7.4) |
| B1-6440 | (B.1.23) | (N.7.4) |
| B1-6441 | (B.1.25) | (N.7.4) |
| B1-6442 | (B.1.26) | (N.7.4) |
| B1-6443 | (B.1.29) | (N.7.4) |
| B1-6444 | (B.1.38) | (N.7.4) |
| B1-6445 | (B.1.44) | (N.7.4) |
| B1-6446 | (B.1.46) | (N.7.4) |
| B1-6447 | (B.2.4) | (N.7.4) |
| B1-6448 | (B.3.1) | (N.7.4) |
| B1-6449 | (C.1.4) | (N.7.4) |
| B1-6450 | (C.1.5) | (N.7.4) |
| B1-6451 | (C.2.1) | (N.7.4) |
| B1-6452 | (D.1.4) | (N.7.4) |
| B1-6453 | (D.1.5) | (N.7.4) |
| B1-6454 | (D.2.3) | (N.7.4) |
| B1-6455 | (D.2.5) | (N.7.4) |
| B1-6456 | (D.2.6) | (N.7.4) |
| B1-6457 | (E.1.1) | (N.7.4) |
| B1-6458 | (E.1.3) | (N.7.4) |
| B1-6459 | (E.2.2) | (N.7.4) |
| B1-6460 | (E.2.3), | (N.7.4) |
| B1-6461 | (F.1.2) | (N.7.4) |
| B1-6462 | (F.1.3) | (N.7.4) |
| B1-6463 | (F.1.5) | (N.7.4) |
| B1-6464 | (G.1.4) | (N.7.4) |
| B1-6465 | (G.3.1) | (N.7.4) |
| B1-6466 | (G.5.1) | (N.7.4) |
| B1-6467 | (H.1.2) | (N.7.4) |
| B1-6468 | (H.1.3) | (N.7.4) |
| B1-6469 | (H.1.4) | (N.7.4) |
| B1-6470 | (H.1.5) | (N.7.4) |
| B1-6471 | (H.1.6) | (N.7.4) |
| B1-6472 | (H.1.7) | (N.7.4) |
| B1-6473 | (H.2.2) | (N.7.4) |
| B1-6474 | (H.2.3) | (N.7.4) |
| B1-6475 | (H.2.5) | (N.7.4) |
| B1-6476 | (H.2.7) | (N.7.4) |
| B1-6477 | (H.3.2) | (N.7.4) |
| B1-6478 | (H.3.4) | (N.7.4) |
| B1-6479 | (H.3.5) | (N.7.4) |
| B1-6480 | (H.3.10) | (N.7.4) |
| B1-6481 | (H.4.2) | (N.7.4) |
| B1-6482 | (H.4.9) | (N.7.4) |
| B1-6483 | (I.1.1) | (N.7.4) |
| B1-6484 | (I.2.1) | (N.7.4) |
| B1-6485 | (I.2.2) | (N.7.4) |
| B1-6486 | (J.1.2) | (N.7.4) |
| B1-6487 | (J.1.3) | (N.7.4) |
| B1-6488 | (J.1.4) | (N.7.4) |
| B1-6489 | (J.1.5) | (N.7.4) |
| B1-6490 | (J.1.8) | (N.7.4) |
| B1-6491 | (J.1.12) | (N.7.4) |
| B1-6492 | (K.1.13) | (N.7.4) |
| B1-6493 | (K.1.47) | (N.7.4) |
| B1-6494 | (K.1.54) | (N.7.4) |
| B1-6495 | (L.1.5) | (N.7.4) |
| B1-6496 | (L.1.9) | (N.7.4) |
| B1-6497 | (L.1.12) | (N.7.4) |
| B1-6498 | (L.1.13) | (N.7.4) |
| B1-6499 | (L.1.17) | (N.7.4) |
| B1-6500 | (L.1.23) | (N.7.4) |
| B1-6501 | (L.1.32), | (N.7.4) |
| B1-6502 | (L.1.46) | (N.7.4) |

TABLE B1-continued

| Mixture | Co 2) | Co3) |
|---|---|---|
| B1-6503 | (M.1.6) | (N.7.4) |
| B1-6504 | (M.1.24) | (N.7.4) |
| B1-6505 | (M.1.25) | (N.7.4) |
| B1-6506 | (M.1.28) | (N.7.4) |
| B1-6507 | (M.1.29) | (N.7.4) |
| B1-6508 | (M.1.30) | (N.7.4) |
| B1-6509 | (N.7.3) | (N.7.4) |
| B1-6510 | (N.7.4) | (N.7.4) |
| B1-6511 | (N.7.5) | (N.7.4) |
| B1-6512 | (N.13.13) | (N.7.4) |
| B1-6513 | (O.2.4), | (N.7.4) |
| B1-6514 | (O.4.5) | (N.7.4) |
| B1-6515 | (O.4.7) | (N.7.4) |
| B1-6516 | (O.4.8) | (N.7.4) |
| B1-6517 | (O.5.1) | (N.7.4) |
| B1-6518 | (O.26.2) | (N.7.4) |
| B1-6519 | (O.27.17) | (N.7.4) |
| B1-6520 | (A.1.1) | (N.7.5) |
| B1-6521 | (A.1.4) | (N.7.5) |
| B1-6522 | (A.1.8) | (N.7.5) |
| B1-6523 | (A.1.10) | (N.7.5) |
| B1-6524 | (A.1.11) | (N.7.5) |
| B1-6525 | (A.1.12) | (N.7.5) |
| B1-6526 | (A.1.14) | (N.7.5) |
| B1-6527 | (A.1.17) | (N.7.5) |
| B1-6528 | (A.1.19) | (N.7.5) |
| B1-6529 | (A.1.25) | (N.7.5) |
| B1-6530 | (A.1.34) | (N.7.5) |
| B1-6531 | (A.1.35) | (N.7.5) |
| B1-6532 | (A.1.38) | (N.7.5) |
| B1-6533 | (A.2.6) | (N.7.5) |
| B1-6534 | (A.3.2) | (N.7.5) |
| B1-6535 | (A.3.3) | (N.7.5) |
| B1-6536 | (A.3.4) | (N.7.5) |
| B1-6537 | (A.3.7) | (N.7.5) |
| B1-6538 | (A.3.8) | (N.7.5) |
| B1-6539 | (A.3.9) | (N.7.5) |
| B1-6540 | (A.3.10) | (N.7.5) |
| B1-6541 | (A.3.11) | (N.7.5) |
| B1-6542 | (A.3.12) | (N.7.5) |
| B1-6543 | (A.3.15) | (N.7.5) |
| B1-6544 | (A.3.16) | (N.7.5) |
| B1-6545 | (A.3.17) | (N.7.5) |
| B1-6546 | (A.3.19) | (N.7.5) |
| B1-6547 | (A.3.21) | (N.7.5) |
| B1-6548 | (A.3.22) | (N.7.5) |
| B1-6549 | (A.3.23) | (N.7.5) |
| B1-6550 | (A.3.28) | (N.7.5) |
| B1-6551 | (A.3.31) | (N.7.5) |
| B1-6552 | (A.4.5) | (N.7.5) |
| B1-6553 | (B.1.4) | (N.7.5) |
| B1-6554 | (B.1.5) | (N.7.5) |
| B1-6555 | (B.1.8) | (N.7.5) |
| B1-6556 | (B.1.10) | (N.7.5) |
| B1-6557 | (B.1.12) | (N.7.5) |
| B1-6558 | (B.1.15) | (N.7.5) |
| B1-6559 | (B.1.17) | (N.7.5) |
| B1-6560 | (B.1.18) | (N.7.5) |
| B1-6561 | (B.1.21) | (N.7.5) |
| B1-6562 | (B.1.22) | (N.7.5) |
| B1-6563 | (B.1.23) | (N.7.5) |
| B1-6564 | (B.1.25) | (N.7.5) |
| B1-6565 | (B.1.26) | (N.7.5) |
| B1-6566 | (B.1.29) | (N.7.5) |
| B1-6567 | (B.1.38) | (N.7.5) |
| B1-6568 | (B.1.44) | (N.7.5) |
| B1-6569 | (B.1.46) | (N.7.5) |
| B1-6570 | (B.2.4) | (N.7.5) |
| B1-6571 | (B.3.1) | (N.7.5) |
| B1-6572 | (C.1.4) | (N.7.5) |
| B1-6573 | (C.1.5) | (N.7.5) |
| B1-6574 | (C.2.1) | (N.7.5) |
| B1-6575 | (D.1.4) | (N.7.5) |
| B1-6576 | (D.1.5) | (N.7.5) |
| B1-6577 | (D.2.3) | (N.7.5) |
| B1-6578 | (D.2.5) | (N.7.5) |
| B1-6579 | (D.2.6) | (N.7.5) |
| B1-6580 | (E.1.1) | (N.7.5) |

TABLE B1-continued

| Mixture | Co 2) | Co3) |
|---|---|---|
| B1-6581 | (E.1.3) | (N.7.5) |
| B1-6582 | (E.2.2) | (N.7.5) |
| B1-6583 | (E.2.3), | (N.7.5) |
| B1-6584 | (F.1.2) | (N.7.5) |
| B1-6585 | (F.1.3) | (N.7.5) |
| B1-6586 | (F.1.5) | (N.7.5) |
| B1-6587 | (G.1.4) | (N.7.5) |
| B1-6588 | (G.3.1) | (N.7.5) |
| B1-6589 | (G.5.1) | (N.7.5) |
| B1-6590 | (H.1.2) | (N.7.5) |
| B1-6591 | (H.1.3) | (N.7.5) |
| B1-6592 | (H.1.4) | (N.7.5) |
| B1-6593 | (H.1.5) | (N.7.5) |
| B1-6594 | (H.1.6) | (N.7.5) |
| B1-6595 | (H.1.7) | (N.7.5) |
| B1-6596 | (H.2.2) | (N.7.5) |
| B1-6597 | (H.2.3) | (N.7.5) |
| B1-6598 | (H.2.5) | (N.7.5) |
| B1-6599 | (H.2.7) | (N.7.5) |
| B1-6600 | (H.3.2) | (N.7.5) |
| B1-6601 | (H.3.4) | (N.7.5) |
| B1-6602 | (H.3.5) | (N.7.5) |
| B1-6603 | (H.3.10) | (N.7.5) |
| B1-6604 | (H.4.2) | (N.7.5) |
| B1-6605 | (H.4.9) | (N.7.5) |
| B1-6606 | (I.1.1) | (N.7.5) |
| B1-6607 | (I.2.1) | (N.7.5) |
| B1-6608 | (I.2.2) | (N.7.5) |
| B1-6609 | (J.1.2) | (N.7.5) |
| B1-6610 | (J.1.3) | (N.7.5) |
| B1-6611 | (J.1.4) | (N.7.5) |
| B1-6612 | (J.1.5) | (N.7.5) |
| B1-6613 | (J.1.8) | (N.7.5) |
| B1-6614 | (J.1.12) | (N.7.5) |
| B1-6615 | (K.1.13) | (N.7.5) |
| B1-6616 | (K.1.47) | (N.7.5) |
| B1-6617 | (K.1.54) | (N.7.5) |
| B1-6618 | (L.1.5) | (N.7.5) |
| B1-6619 | (L.1.9) | (N.7.5) |
| B1-6620 | (L.1.12) | (N.7.5) |
| B1-6621 | (L.1.13) | (N.7.5) |
| B1-6622 | (L.1.17) | (N.7.5) |
| B1-6623 | (L.1.23) | (N.7.5) |
| B1-6624 | (L.1.32), | (N.7.5) |
| B1-6625 | (L.1.46) | (N.7.5) |
| B1-6626 | (M.1.6) | (N.7.5) |
| B1-6627 | (M.1.24) | (N.7.5) |
| B1-6628 | (M.1.25) | (N.7.5) |
| B1-6629 | (M.1.28) | (N.7.5) |
| B1-6630 | (M.1.29) | (N.7.5) |
| B1-6631 | (M.1.30) | (N.7.5) |
| B1-6632 | (N.7.3) | (N.7.5) |
| B1-6633 | (N.7.4) | (N.7.5) |
| B1-6634 | (N.7.5) | (N.7.5) |
| B1-6635 | (N.13.13) | (N.7.5) |
| B1-6636 | (O.2.4), | (N.7.5) |
| B1-6637 | (O.4.5) | (N.7.5) |
| B1-6638 | (O.4.7) | (N.7.5) |
| B1-6639 | (O.4.8) | (N.7.5) |
| B1-6640 | (O.5.1) | (N.7.5) |
| B1-6641 | (O.26.2) | (N.7.5) |
| B1-6642 | (O.27.17) | (N.7.5) |
| B1-6643 | (A.1.1) | (O.2.4) |
| B1-6644 | (A.1.4) | (O.2.4) |
| B1-6645 | (A.1.8) | (O.2.4) |
| B1-6646 | (A.1.10) | (O.2.4) |
| B1-6647 | (A.1.11) | (O.2.4) |
| B1-6648 | (A.1.12) | (O.2.4) |
| B1-6649 | (A.1.14) | (O.2.4) |
| B1-6650 | (A.1.17) | (O.2.4) |
| B1-6651 | (A.1.19) | (O.2.4) |
| B1-6652 | (A.1.25) | (O.2.4) |
| B1-6653 | (A.1.34) | (O.2.4) |
| B1-6654 | (A.1.35) | (O.2.4) |
| B1-6655 | (A.1.38) | (O.2.4) |
| B1-6656 | (A.2.6) | (O.2.4) |
| B1-6657 | (A.3.2) | (O.2.4) |
| B1-6658 | (A.3.3) | (O.2.4) |

TABLE B1-continued

| Mixture | Co 2) | Co3) |
|---|---|---|
| B1-6659 | (A.3.4) | (O.2.4) |
| B1-6660 | (A.3.7) | (O.2.4) |
| B1-6661 | (A.3.8) | (O.2.4) |
| B1-6662 | (A.3.9) | (O.2.4) |
| B1-6663 | (A.3.10) | (O.2.4) |
| B1-6664 | (A.3.11) | (O.2.4) |
| B1-6665 | (A.3.12) | (O.2.4) |
| B1-6666 | (A.3.15) | (O.2.4) |
| B1-6667 | (A.3.16) | (O.2.4) |
| B1-6668 | (A.3.17) | (O.2.4) |
| B1-6669 | (A.3.19) | (O.2.4) |
| B1-6670 | (A.3.21) | (O.2.4) |
| B1-6671 | (A.3.22) | (O.2.4) |
| B1-6672 | (A.3.23) | (O.2.4) |
| B1-6673 | (A.3.28) | (O.2.4) |
| B1-6674 | (A.3.31) | (O.2.4) |
| B1-6675 | (A.4.5) | (O.2.4) |
| B1-6676 | (B.1.4) | (O.2.4) |
| B1-6677 | (B.1.5) | (O.2.4) |
| B1-6678 | (B.1.8) | (O.2.4) |
| B1-6679 | (B.1.10) | (O.2.4) |
| B1-6680 | (B.1.12) | (O.2.4) |
| B1-6681 | (B.1.15) | (O.2.4) |
| B1-6682 | (B.1.17) | (O.2.4) |
| B1-6683 | (B.1.18) | (O.2.4) |
| B1-6684 | (B.1.21) | (O.2.4) |
| B1-6685 | (B.1.22) | (O.2.4) |
| B1-6686 | (B.1.23) | (O.2.4) |
| B1-6687 | (B.1.25) | (O.2.4) |
| B1-6688 | (B.1.26) | (O.2.4) |
| B1-6689 | (B.1.29) | (O.2.4) |
| B1-6690 | (B.1.38) | (O.2.4) |
| B1-6691 | (B.1.44) | (O.2.4) |
| B1-6692 | (B.1.46) | (O.2.4) |
| B1-6693 | (B.2.4) | (O.2.4) |
| B1-6694 | (B.3.1) | (O.2.4) |
| B1-6695 | (C.1.4) | (O.2.4) |
| B1-6696 | (C.1.5) | (O.2.4) |
| B1-6697 | (C.2.1) | (O.2.4) |
| B1-6698 | (D.1.4) | (O.2.4) |
| B1-6699 | (D.1.5) | (O.2.4) |
| B1-6700 | (D.2.3) | (O.2.4) |
| B1-6701 | (D.2.5) | (O.2.4) |
| B1-6702 | (D.2.6) | (O.2.4) |
| B1-6703 | (E.1.1) | (O.2.4) |
| B1-6704 | (E.1.3) | (O.2.4) |
| B1-6705 | (E.2.2) | (O.2.4) |
| B1-6706 | (E.2.3), | (O.2.4) |
| B1-6707 | (F.1.2) | (O.2.4) |
| B1-6708 | (F.1.3) | (O.2.4) |
| B1-6709 | (F.1.5) | (O.2.4) |
| B1-6710 | (G.1.4) | (O.2.4) |
| B1-6711 | (G.3.1) | (O.2.4) |
| B1-6712 | (G.5.1) | (O.2.4) |
| B1-6713 | (H.1.2) | (O.2.4) |
| B1-6714 | (H.1.3) | (O.2.4) |
| B1-6715 | (H.1.4) | (O.2.4) |
| B1-6716 | (H.1.5) | (O.2.4) |
| B1-6717 | (H.1.6) | (O.2.4) |
| B1-6718 | (H.1.7) | (O.2.4) |
| B1-6719 | (H.2.2) | (O.2.4) |
| B1-6720 | (H.2.3) | (O.2.4) |
| B1-6721 | (H.2.5) | (O.2.4) |
| B1-6722 | (H.2.7) | (O.2.4) |
| B1-6723 | (H.3.2) | (O.2.4) |
| B1-6724 | (H.3.4) | (O.2.4) |
| B1-6725 | (H.3.5) | (O.2.4) |
| B1-6726 | (H.3.10) | (O.2.4) |
| B1-6727 | (H.4.2) | (O.2.4) |
| B1-6728 | (H.4.9) | (O.2.4) |
| B1-6729 | (I.1.1) | (O.2.4) |
| B1-6730 | (I.2.1) | (O.2.4) |
| B1-6731 | (I.2.2) | (O.2.4) |
| B1-6732 | (J.1.2) | (O.2.4) |
| B1-6733 | (J.1.3) | (O.2.4) |
| B1-6734 | (J.1.4) | (O.2.4) |
| B1-6735 | (J.1.5) | (O.2.4) |
| B1-6736 | (J.1.8) | (O.2.4) |

TABLE B1-continued

| Mixture | Co 2) | Co3) |
|---|---|---|
| B1-6737 | (J.1.12) | (O.2.4) |
| B1-6738 | (K.1.13) | (O.2.4) |
| B1-6739 | (K.1.47) | (O.2.4) |
| B1-6740 | (K.1.54) | (O.2.4) |
| B1-6741 | (L.1.5) | (O.2.4) |
| B1-6742 | (L.1.9) | (O.2.4) |
| B1-6743 | (L.1.12) | (O.2.4) |
| B1-6744 | (L.1.13) | (O.2.4) |
| B1-6745 | (L.1.17) | (O.2.4) |
| B1-6746 | (L.1.23) | (O.2.4) |
| B1-6747 | (L.1.32), | (O.2.4) |
| B1-6748 | (L.1.46) | (O.2.4) |
| B1-6749 | (M.1.6) | (O.2.4) |
| B1-6750 | (M.1.24) | (O.2.4) |
| B1-6751 | (M.1.25) | (O.2.4) |
| B1-6752 | (M.1.28) | (O.2.4) |
| B1-6753 | (M.1.29) | (O.2.4) |
| B1-6754 | (M.1.30) | (O.2.4) |
| B1-6755 | (N.7.3) | (O.2.4) |
| B1-6756 | (N.7.4) | (O.2.4) |
| B1-6757 | (N.7.5) | (O.2.4) |
| B1-6758 | (N.13.13) | (O.2.4) |
| B1-6759 | (O.2.4), | (O.2.4) |
| B1-6760 | (O.4.5) | (O.2.4) |
| B1-6761 | (O.4.7) | (O.2.4) |
| B1-6762 | (O.4.8) | (O.2.4) |
| B1-6763 | (O.5.1) | (O.2.4) |
| B1-6764 | (O.26.2) | (O.2.4) |
| B1-6765 | (O.27.17) | (O.2.4) |
| B1-6766 | (A.1.1) | (O.4.5) |
| B1-6767 | (A.1.4) | (O.4.5) |
| B1-6768 | (A.1.8) | (O.4.5) |
| B1-6769 | (A.1.10) | (O.4.5) |
| B1-6770 | (A.1.11) | (O.4.5) |
| B1-6771 | (A.1.12) | (O.4.5) |
| B1-6772 | (A.1.14) | (O.4.5) |
| B1-6773 | (A.1.17) | (O.4.5) |
| B1-6774 | (A.1.19) | (O.4.5) |
| B1-6775 | (A.1.25) | (O.4.5) |
| B1-6776 | (A.1.34) | (O.4.5) |
| B1-6777 | (A.1.35) | (O.4.5) |
| B1-6778 | (A.1.38) | (O.4.5) |
| B1-6779 | (A.2.6) | (O.4.5) |
| B1-6780 | (A.3.2) | (O.4.5) |
| B1-6781 | (A.3.3) | (O.4.5) |
| B1-6782 | (A.3.4) | (O.4.5) |
| B1-6783 | (A.3.7) | (O.4.5) |
| B1-6784 | (A.3.8) | (O.4.5) |
| B1-6785 | (A.3.9) | (O.4.5) |
| B1-6786 | (A.3.10) | (O.4.5) |
| B1-6787 | (A.3.11) | (O.4.5) |
| B1-6788 | (A.3.12) | (O.4.5) |
| B1-6789 | (A.3.15) | (O.4.5) |
| B1-6790 | (A.3.16) | (O.4.5) |
| B1-6791 | (A.3.17) | (O.4.5) |
| B1-6792 | (A.3.19) | (O.4.5) |
| B1-6793 | (A.3.21) | (O.4.5) |
| B1-6794 | (A.3.22) | (O.4.5) |
| B1-6795 | (A.3.23) | (O.4.5) |
| B1-6796 | (A.3.28) | (O.4.5) |
| B1-6797 | (A.3.31) | (O.4.5) |
| B1-6798 | (A.4.5) | (O.4.5) |
| B1-6799 | (B.1.4) | (O.4.5) |
| B1-6800 | (B.1.5) | (O.4.5) |
| B1-6801 | (B.1.8) | (O.4.5) |
| B1-6802 | (B.1.10) | (O.4.5) |
| B1-6803 | (B.1.12) | (O.4.5) |
| B1-6804 | (B.1.15) | (O.4.5) |
| B1-6805 | (B.1.17) | (O.4.5) |
| B1-6806 | (B.1.18) | (O.4.5) |
| B1-6807 | (B.1.21) | (O.4.5) |
| B1-6808 | (B.1.22) | (O.4.5) |
| B1-6809 | (B.1.23) | (O.4.5) |
| B1-6810 | (B.1.25) | (O.4.5) |
| B1-6811 | (B.1.26) | (O.4.5) |
| B1-6812 | (B.1.29) | (O.4.5) |
| B1-6813 | (B.1.38) | (O.4.5) |
| B1-6814 | (B.1.44) | (O.4.5) |

TABLE B1-continued

| Mixture | Co 2) | Co3) |
|---|---|---|
| B1-6815 | (B.1.46) | (O.4.5) |
| B1-6816 | (B.2.4) | (O.4.5) |
| B1-6817 | (B.3.1) | (O.4.5) |
| B1-6818 | (C.1.4) | (O.4.5) |
| B1-6819 | (C.1.5) | (O.4.5) |
| B1-6820 | (C.2.1) | (O.4.5) |
| B1-6821 | (D.1.4) | (O.4.5) |
| B1-6822 | (D.1.5) | (O.4.5) |
| B1-6823 | (D.2.3) | (O.4.5) |
| B1-6824 | (D.2.5) | (O.4.5) |
| B1-6825 | (D.2.6) | (O.4.5) |
| B1-6826 | (E.1.1) | (O.4.5) |
| B1-6827 | (E.1.3) | (O.4.5) |
| B1-6828 | (E.2.2) | (O.4.5) |
| B1-6829 | (E.2.3), | (O.4.5) |
| B1-6830 | (F.1.2) | (O.4.5) |
| B1-6831 | (F.1.3) | (O.4.5) |
| B1-6832 | (F.1.5) | (O.4.5) |
| B1-6833 | (G.1.4) | (O.4.5) |
| B1-6834 | (G.3.1) | (O.4.5) |
| B1-6835 | (G.5.1) | (O.4.5) |
| B1-6836 | (H.1.2) | (O.4.5) |
| B1-6837 | (H.1.3) | (O.4.5) |
| B1-6838 | (H.1.4) | (O.4.5) |
| B1-6839 | (H.1.5) | (O.4.5) |
| B1-6840 | (H.1.6) | (O.4.5) |
| B1-6841 | (H.1.7) | (O.4.5) |
| B1-6842 | (H.2.2) | (O.4.5) |
| B1-6843 | (H.2.3) | (O.4.5) |
| B1-6844 | (H.2.5) | (O.4.5) |
| B1-6845 | (H.2.7) | (O.4.5) |
| B1-6846 | (H.3.2) | (O.4.5) |
| B1-6847 | (H.3.4) | (O.4.5) |
| B1-6848 | (H.3.5) | (O.4.5) |
| B1-6849 | (H.3.10) | (O.4.5) |
| B1-6850 | (H.4.2) | (O.4.5) |
| B1-6851 | (H.4.9) | (O.4.5) |
| B1-6852 | (I.1.1) | (O.4.5) |
| B1-6853 | (I.2.1) | (O.4.5) |
| B1-6854 | (I.2.2) | (O.4.5) |
| B1-6855 | (J.1.2) | (O.4.5) |
| B1-6856 | (J.1.3) | (O.4.5) |
| B1-6857 | (J.1.4) | (O.4.5) |
| B1-6858 | (J.1.5) | (O.4.5) |
| B1-6859 | (J.1.8) | (O.4.5) |
| B1-6860 | (J.1.12) | (O.4.5) |
| B1-6861 | (K.1.13) | (O.4.5) |
| B1-6862 | (K.1.47) | (O.4.5) |
| B1-6863 | (K.1.54) | (O.4.5) |
| B1-6864 | (L.1.5) | (O.4.5) |
| B1-6865 | (L.1.9) | (O.4.5) |
| B1-6866 | (L.1.12) | (O.4.5) |
| B1-6867 | (L.1.13) | (O.4.5) |
| B1-6868 | (L.1.17) | (O.4.5) |
| B1-6869 | (L.1.23) | (O.4.5) |
| B1-6870 | (L.1.32), | (O.4.5) |
| B1-6871 | (L.1.46) | (O.4.5) |
| B1-6872 | (M.1.6) | (O.4.5) |
| B1-6873 | (M.1.24) | (O.4.5) |
| B1-6874 | (M.1.25) | (O.4.5) |
| B1-6875 | (M.1.28) | (O.4.5) |
| B1-6876 | (M.1.29) | (O.4.5) |
| B1-6877 | (M.1.30) | (O.4.5) |
| B1-6878 | (N.7.3) | (O.4.5) |
| B1-6879 | (N.7.4) | (O.4.5) |
| B1-6880 | (N.7.5) | (O.4.5) |
| B1-6881 | (N.13.13) | (O.4.5) |
| B1-6882 | (O.2.4), | (O.4.5) |
| B1-6883 | (O.4.5) | (O.4.5) |
| B1-6884 | (O.4.7) | (O.4.5) |
| B1-6885 | (O.4.8) | (O.4.5) |
| B1-6886 | (O.5.1) | (O.4.5) |
| B1-6887 | (O.26.2) | (O.4.5) |
| B1-6888 | (O.27.17) | (O.4.5) |
| B1-6889 | (A.1.1) | (O.4.7) |
| B1-6890 | (A.1.4) | (O.4.7) |
| B1-6891 | (A.1.8) | (O.4.7) |
| B1-6892 | (A.1.10) | (O.4.7) |

TABLE B1-continued

| Mixture | Co 2) | Co3) |
|---|---|---|
| B1-6893 | (A.1.11) | (O.4.7) |
| B1-6894 | (A.1.12) | (O.4.7) |
| B1-6895 | (A.1.14) | (O.4.7) |
| B1-6896 | (A.1.17) | (O.4.7) |
| B1-6897 | (A.1.19) | (O.4.7) |
| B1-6898 | (A.1.25) | (O.4.7) |
| B1-6899 | (A.1.34) | (O.4.7) |
| B1-6900 | (A.1.35) | (O.4.7) |
| B1-6901 | (A.1.38) | (O.4.7) |
| B1-6902 | (A.2.6) | (O.4.7) |
| B1-6903 | (A.3.2) | (O.4.7) |
| B1-6904 | (A.3.3) | (O.4.7) |
| B1-6905 | (A.3.4) | (O.4.7) |
| B1-6906 | (A.3.7) | (O.4.7) |
| B1-6907 | (A.3.8) | (O.4.7) |
| B1-6908 | (A.3.9) | (O.4.7) |
| B1-6909 | (A.3.10) | (O.4.7) |
| B1-6910 | (A.3.11) | (O.4.7) |
| B1-6911 | (A.3.12) | (O.4.7) |
| B1-6912 | (A.3.15) | (O.4.7) |
| B1-6913 | (A.3.16) | (O.4.7) |
| B1-6914 | (A.3.17) | (O.4.7) |
| B1-6915 | (A.3.19) | (O.4.7) |
| B1-6916 | (A.3.21) | (O.4.7) |
| B1-6917 | (A.3.22) | (O.4.7) |
| B1-6918 | (A.3.23) | (O.4.7) |
| B1-6919 | (A.3.28) | (O.4.7) |
| B1-6920 | (A.3.31) | (O.4.7) |
| B1-6921 | (A.4.5) | (O.4.7) |
| B1-6922 | (B.1.4) | (O.4.7) |
| B1-6923 | (B.1.5) | (O.4.7) |
| B1-6924 | (B.1.8) | (O.4.7) |
| B1-6925 | (B.1.10) | (O.4.7) |
| B1-6926 | (B.1.12) | (O.4.7) |
| B1-6927 | (B.1.15) | (O.4.7) |
| B1-6928 | (B.1.17) | (O.4.7) |
| B1-6929 | (B.1.18) | (O.4.7) |
| B1-6930 | (B.1.21) | (O.4.7) |
| B1-6931 | (B.1.22) | (O.4.7) |
| B1-6932 | (B.1.23) | (O.4.7) |
| B1-6933 | (B.1.25) | (O.4.7) |
| B1-6934 | (B.1.26) | (O.4.7) |
| B1-6935 | (B.1.29) | (O.4.7) |
| B1-6936 | (B.1.38) | (O.4.7) |
| B1-6937 | (B.1.44) | (O.4.7) |
| B1-6938 | (B.1.46) | (O.4.7) |
| B1-6939 | (B.2.4) | (O.4.7) |
| B1-6940 | (B.3.1) | (O.4.7) |
| B1-6941 | (C.1.4) | (O.4.7) |
| B1-6942 | (C.1.5) | (O.4.7) |
| B1-6943 | (C.2.1) | (O.4.7) |
| B1-6944 | (D.1.4) | (O.4.7) |
| B1-6945 | (D.1.5) | (O.4.7) |
| B1-6946 | (D.2.3) | (O.4.7) |
| B1-6947 | (D.2.5) | (O.4.7) |
| B1-6948 | (D.2.6) | (O.4.7) |
| B1-6949 | (E.1.1) | (O.4.7) |
| B1-6950 | (E.1.3) | (O.4.7) |
| B1-6951 | (E.2.2) | (O.4.7) |
| B1-6952 | (E.2.3), | (O.4.7) |
| B1-6953 | (F.1.2) | (O.4.7) |
| B1-6954 | (F.1.3) | (O.4.7) |
| B1-6955 | (F.1.5) | (O.4.7) |
| B1-6956 | (G.1.4) | (O.4.7) |
| B1-6957 | (G.3.1) | (O.4.7) |
| B1-6958 | (G.5.1) | (O.4.7) |
| B1-6959 | (H.1.2) | (O.4.7) |
| B1-6960 | (H.1.3) | (O.4.7) |
| B1-6961 | (H.1.4) | (O.4.7) |
| B1-6962 | (H.1.5) | (O.4.7) |
| B1-6963 | (H.1.6) | (O.4.7) |
| B1-6964 | (H.1.7) | (O.4.7) |
| B1-6965 | (H.2.2) | (O.4.7) |
| B1-6966 | (H.2.3) | (O.4.7) |
| B1-6967 | (H.2.5) | (O.4.7) |
| B1-6968 | (H.2.7) | (O.4.7) |
| B1-6969 | (H.3.2) | (O.4.7) |
| B1-6970 | (H.3.4) | (O.4.7) |

TABLE B1-continued

| Mixture | Co 2) | Co3) |
|---|---|---|
| B1-6971 | (H.3.5) | (O.4.7) |
| B1-6972 | (H.3.10) | (O.4.7) |
| B1-6973 | (H.4.2) | (O.4.7) |
| B1-6974 | (H.4.9) | (O.4.7) |
| B1-6975 | (I.1.1) | (O.4.7) |
| B1-6976 | (I.2.1) | (O.4.7) |
| B1-6977 | (I.2.2) | (O.4.7) |
| B1-6978 | (J.1.2) | (O.4.7) |
| B1-6979 | (J.1.3) | (O.4.7) |
| B1-6980 | (J.1.4) | (O.4.7) |
| B1-6981 | (J.1.5) | (O.4.7) |
| B1-6982 | (J.1.8) | (O.4.7) |
| B1-6983 | (J.1.12) | (O.4.7) |
| B1-6984 | (K.1.13) | (O.4.7) |
| B1-6985 | (K.1.47) | (O.4.7) |
| B1-6986 | (K.1.54) | (O.4.7) |
| B1-6987 | (L.1.5) | (O.4.7) |
| B1-6988 | (L.1.9) | (O.4.7) |
| B1-6989 | (L.1.12) | (O.4.7) |
| B1-6990 | (L.1.13) | (O.4.7) |
| B1-6991 | (L.1.17) | (O.4.7) |
| B1-6992 | (L.1.23) | (O.4.7) |
| B1-6993 | (L.1.32), | (O.4.7) |
| B1-6994 | (L.1.46) | (O.4.7) |
| B1-6995 | (M.1.6) | (O.4.7) |
| B1-6996 | (M.1.24) | (O.4.7) |
| B1-6997 | (M.1.25) | (O.4.7) |
| B1-6998 | (M.1.28) | (O.4.7) |
| B1-6999 | (M.1.29) | (O.4.7) |
| B1-7000 | (M.1.30) | (O.4.7) |
| B1-7001 | (N.7.3) | (O.4.7) |
| B1-7002 | (N.7.4) | (O.4.7) |
| B1-7003 | (N.7.5) | (O.4.7) |
| B1-7004 | (N.13.13) | (O.4.7) |
| B1-7005 | (O.2.4), | (O.4.7) |
| B1-7006 | (O.4.5) | (O.4.7) |
| B1-7007 | (O.4.7) | (O.4.7) |
| B1-7008 | (O.4.8) | (O.4.7) |
| B1-7009 | (O.5.1) | (O.4.7) |
| B1-7010 | (O.26.2) | (O.4.7) |
| B1-7011 | (O.27.17) | (O.4.7) |
| B1-7012 | (A.1.1) | (O.4.8) |
| B1-7013 | (A.1.4) | (O.4.8) |
| B1-7014 | (A.1.8) | (O.4.8) |
| B1-7015 | (A.1.10) | (O.4.8) |
| B1-7016 | (A.1.11) | (O.4.8) |
| B1-7017 | (A.1.12) | (O.4.8) |
| B1-7018 | (A.1.14) | (O.4.8) |
| B1-7019 | (A.1.17) | (O.4.8) |
| B1-7020 | (A.1.19) | (O.4.8) |
| B1-7021 | (A.1.25) | (O.4.8) |
| B1-7022 | (A.1.34) | (O.4.8) |
| B1-7023 | (A.1.35) | (O.4.8) |
| B1-7024 | (A.1.38) | (O.4.8) |
| B1-7025 | (A.2.6) | (O.4.8) |
| B1-7026 | (A.3.2) | (O.4.8) |
| B1-7027 | (A.3.3) | (O.4.8) |
| B1-7028 | (A.3.4) | (O.4.8) |
| B1-7029 | (A.3.7) | (O.4.8) |
| B1-7030 | (A.3.8) | (O.4.8) |
| B1-7031 | (A.3.9) | (O.4.8) |
| B1-7032 | (A.3.10) | (O.4.8) |
| B1-7033 | (A.3.11) | (O.4.8) |
| B1-7034 | (A.3.12) | (O.4.8) |
| B1-7035 | (A.3.15) | (O.4.8) |
| B1-7036 | (A.3.16) | (O.4.8) |
| B1-7037 | (A.3.17) | (O.4.8) |
| B1-7038 | (A.3.19) | (O.4.8) |
| B1-7039 | (A.3.21) | (O.4.8) |
| B1-7040 | (A.3.22) | (O.4.8) |
| B1-7041 | (A.3.23) | (O.4.8) |
| B1-7042 | (A.3.28) | (O.4.8) |
| B1-7043 | (A.3.31) | (O.4.8) |
| B1-7044 | (A.4.5) | (O.4.8) |
| B1-7045 | (B.1.4) | (O.4.8) |
| B1-7046 | (B.1.5) | (O.4.8) |
| B1-7047 | (B.1.8) | (O.4.8) |
| B1-7048 | (B.1.10) | (O.4.8) |

TABLE B1-continued

| Mixture | Co 2) | Co3) |
|---|---|---|
| B1-7049 | (B.1.12) | (O.4.8) |
| B1-7050 | (B.1.15) | (O.4.8) |
| B1-7051 | (B.1.17) | (O.4.8) |
| B1-7052 | (B.1.18) | (O.4.8) |
| B1-7053 | (B.1.21) | (O.4.8) |
| B1-7054 | (B.1.22) | (O.4.8) |
| B1-7055 | (B.1.23) | (O.4.8) |
| B1-7056 | (B.1.25) | (O.4.8) |
| B1-7057 | (B.1.26) | (O.4.8) |
| B1-7058 | (B.1.29) | (O.4.8) |
| B1-7059 | (B.1.38) | (O.4.8) |
| B1-7060 | (B.1.44) | (O.4.8) |
| B1-7061 | (B.1.46) | (O.4.8) |
| B1-7062 | (B.2.4) | (O.4.8) |
| B1-7063 | (B.3.1) | (O.4.8) |
| B1-7064 | (C.1.4) | (O.4.8) |
| B1-7065 | (C.1.5) | (O.4.8) |
| B1-7066 | (C.2.1) | (O.4.8) |
| B1-7067 | (D.1.4) | (O.4.8) |
| B1-7068 | (D.1.5) | (O.4.8) |
| B1-7069 | (D.2.3) | (O.4.8) |
| B1-7070 | (D.2.5) | (O.4.8) |
| B1-7071 | (D.2.6) | (O.4.8) |
| B1-7072 | (E.1.1) | (O.4.8) |
| B1-7073 | (E.1.3) | (O.4.8) |
| B1-7074 | (E.2.2) | (O.4.8) |
| B1-7075 | (E.2.3), | (O.4.8) |
| B1-7076 | (F.1.2) | (O.4.8) |
| B1-7077 | (F.1.3) | (O.4.8) |
| B1-7078 | (F.1.5) | (O.4.8) |
| B1-7079 | (G.1.4) | (O.4.8) |
| B1-7080 | (G.3.1) | (O.4.8) |
| B1-7081 | (G.5.1) | (O.4.8) |
| B1-7082 | (H.1.2) | (O.4.8) |
| B1-7083 | (H.1.3) | (O.4.8) |
| B1-7084 | (H.1.4) | (O.4.8) |
| B1-7085 | (H.1.5) | (O.4.8) |
| B1-7086 | (H.1.6) | (O.4.8) |
| B1-7087 | (H.1.7) | (O.4.8) |
| B1-7088 | (H.2.2) | (O.4.8) |
| B1-7089 | (H.2.3) | (O.4.8) |
| B1-7090 | (H.2.5) | (O.4.8) |
| B1-7091 | (H.2.7) | (O.4.8) |
| B1-7092 | (H.3.2) | (O.4.8) |
| B1-7093 | (H.3.4) | (O.4.8) |
| B1-7094 | (H.3.5) | (O.4.8) |
| B1-7095 | (H.3.10) | (O.4.8) |
| B1-7096 | (H.4.2) | (O.4.8) |
| B1-7097 | (H.4.9) | (O.4.8) |
| B1-7098 | (I.1.1) | (O.4.8) |
| B1-7099 | (I.2.1) | (O.4.8) |
| B1-7100 | (I.2.2) | (O.4.8) |
| B1-7101 | (J.1.2) | (O.4.8) |
| B1-7102 | (J.1.3) | (O.4.8) |
| B1-7103 | (J.1.4) | (O.4.8) |
| B1-7104 | (J.1.5) | (O.4.8) |
| B1-7105 | (J.1.8) | (O.4.8) |
| B1-7106 | (J.1.12) | (O.4.8) |
| B1-7107 | (K.1.13) | (O.4.8) |
| B1-7108 | (K.1.47) | (O.4.8) |
| B1-7109 | (K.1.54) | (O.4.8) |
| B1-7110 | (L.1.5) | (O.4.8) |
| B1-7111 | (L.1.9) | (O.4.8) |
| B1-7112 | (L.1.12) | (O.4.8) |
| B1-7113 | (L.1.13) | (O.4.8) |
| B1-7114 | (L.1.17) | (O.4.8) |
| B1-7115 | (L.1.23) | (O.4.8) |
| B1-7116 | (L.1.32), | (O.4.8) |
| B1-7117 | (L.1.46) | (O.4.8) |
| B1-7118 | (M.1.6) | (O.4.8) |
| B1-7119 | (M.1.24) | (O.4.8) |
| B1-7120 | (M.1.25) | (O.4.8) |
| B1-7121 | (M.1.28) | (O.4.8) |
| B1-7122 | (M.1.29) | (O.4.8) |
| B1-7123 | (M.1.30) | (O.4.8) |
| B1-7124 | (N.7.3) | (O.4.8) |
| B1-7125 | (N.7.4) | (O.4.8) |
| B1-7126 | (N.7.5) | (O.4.8) |

TABLE B1-continued

| Mixture | Co 2) | Co3) |
|---|---|---|
| B1-7127 | (N.13.13) | (O.4.8) |
| B1-7128 | (O.2.4), | (O.4.8) |
| B1-7129 | (O.4.5) | (O.4.8) |
| B1-7130 | (O.4.7) | (O.4.8) |
| B1-7131 | (O.4.8) | (O.4.8) |
| B1-7132 | (O.5.1) | (O.4.8) |
| B1-7133 | (O.26.2) | (O.4.8) |
| B1-7134 | (O.27.17) | (O.4.8) |
| B1-7135 | (A.1.1) | (O.5.1) |
| B1-7136 | (A.1.4) | (O.5.1) |
| B1-7137 | (A.1.8) | (O.5.1) |
| B1-7138 | (A.1.10) | (O.5.1) |
| B1-7139 | (A.1.11) | (O.5.1) |
| B1-7140 | (A.1.12) | (O.5.1) |
| B1-7141 | (A.1.14) | (O.5.1) |
| B1-7142 | (A.1.17) | (O.5.1) |
| B1-7143 | (A.1.19) | (O.5.1) |
| B1-7144 | (A.1.25) | (O.5.1) |
| B1-7145 | (A.1.34) | (O.5.1) |
| B1-7146 | (A.1.35) | (O.5.1) |
| B1-7147 | (A.1.38) | (O.5.1) |
| B1-7148 | (A.2.6) | (O.5.1) |
| B1-7149 | (A.3.2) | (O.5.1) |
| B1-7150 | (A.3.3) | (O.5.1) |
| B1-7151 | (A.3.4) | (O.5.1) |
| B1-7152 | (A.3.7) | (O.5.1) |
| B1-7153 | (A.3.8) | (O.5.1) |
| B1-7154 | (A.3.9) | (O.5.1) |
| B1-7155 | (A.3.10) | (O.5.1) |
| B1-7156 | (A.3.11) | (O.5.1) |
| B1-7157 | (A.3.12) | (O.5.1) |
| B1-7158 | (A.3.15) | (O.5.1) |
| B1-7159 | (A.3.16) | (O.5.1) |
| B1-7160 | (A.3.17) | (O.5.1) |
| B1-7161 | (A.3.19) | (O.5.1) |
| B1-7162 | (A.3.21) | (O.5.1) |
| B1-7163 | (A.3.22) | (O.5.1) |
| B1-7164 | (A.3.23) | (O.5.1) |
| B1-7165 | (A.3.28) | (O.5.1) |
| B1-7166 | (A.3.31) | (O.5.1) |
| B1-7167 | (A.4.5) | (O.5.1) |
| B1-7168 | (B.1.4) | (O.5.1) |
| B1-7169 | (B.1.5) | (O.5.1) |
| B1-7170 | (B.1.8) | (O.5.1) |
| B1-7171 | (B.1.10) | (O.5.1) |
| B1-7172 | (B.1.12) | (O.5.1) |
| B1-7173 | (B.1.15) | (O.5.1) |
| B1-7174 | (B.1.17) | (O.5.1) |
| B1-7175 | (B.1.18) | (O.5.1) |
| B1-7176 | (B.1.21) | (O.5.1) |
| B1-7177 | (B.1.22) | (O.5.1) |
| B1-7178 | (B.1.23) | (O.5.1) |
| B1-7179 | (B.1.25) | (O.5.1) |
| B1-7180 | (B.1.26) | (O.5.1) |
| B1-7181 | (B.1.29) | (O.5.1) |
| B1-7182 | (B.1.38) | (O.5.1) |
| B1-7183 | (B.1.44) | (O.5.1) |
| B1-7184 | (B.1.46) | (O.5.1) |
| B1-7185 | (B.2.4) | (O.5.1) |
| B1-7186 | (B.3.1) | (O.5.1) |
| B1-7187 | (C.1.4) | (O.5.1) |
| B1-7188 | (C.1.5) | (O.5.1) |
| B1-7189 | (C.2.1) | (O.5.1) |
| B1-7190 | (D.1.4) | (O.5.1) |
| B1-7191 | (D.1.5) | (O.5.1) |
| B1-7192 | (D.2.3) | (O.5.1) |
| B1-7193 | (D.2.5) | (O.5.1) |
| B1-7194 | (D.2.6) | (O.5.1) |
| B1-7195 | (E.1.1) | (O.5.1) |
| B1-7196 | (E.1.3) | (O.5.1) |
| B1-7197 | (E.2.2) | (O.5.1) |
| B1-7198 | (E.2.3), | (O.5.1) |
| B1-7199 | (F.1.2) | (O.5.1) |
| B1-7200 | (F.1.3) | (O.5.1) |
| B1-7201 | (F.1.5) | (O.5.1) |
| B1-7202 | (G.1.4) | (O.5.1) |
| B1-7203 | (G.3.1) | (O.5.1) |
| B1-7204 | (G.5.1) | (O.5.1) |

TABLE B1-continued

| Mixture | Co 2) | Co3) |
|---|---|---|
| B1-7205 | (H.1.2) | (O.5.1) |
| B1-7206 | (H.1.3) | (O.5.1) |
| B1-7207 | (H.1.4) | (O.5.1) |
| B1-7208 | (H.1.5) | (O.5.1) |
| B1-7209 | (H.1.6) | (O.5.1) |
| B1-7210 | (H.1.7) | (O.5.1) |
| B1-7211 | (H.2.2) | (O.5.1) |
| B1-7212 | (H.2.3) | (O.5.1) |
| B1-7213 | (H.2.5) | (O.5.1) |
| B1-7214 | (H.2.7) | (O.5.1) |
| B1-7215 | (H.3.2) | (O.5.1) |
| B1-7216 | (H.3.4) | (O.5.1) |
| B1-7217 | (H.3.5) | (O.5.1) |
| B1-7218 | (H.3.10) | (O.5.1) |
| B1-7219 | (H.4.2) | (O.5.1) |
| B1-7220 | (H.4.9) | (O.5.1) |
| B1-7221 | (I.1.1) | (O.5.1) |
| B1-7222 | (I.2.1) | (O.5.1) |
| B1-7223 | (I.2.2) | (O.5.1) |
| B1-7224 | (J.1.2) | (O.5.1) |
| B1-7225 | (J.1.3) | (O.5.1) |
| B1-7226 | (J.1.4) | (O.5.1) |
| B1-7227 | (J.1.5) | (O.5.1) |
| B1-7228 | (J.1.8) | (O.5.1) |
| B1-7229 | (J.1.12) | (O.5.1) |
| B1-7230 | (K.1.13) | (O.5.1) |
| B1-7231 | (K.1.47) | (O.5.1) |
| B1-7232 | (K.1.54) | (O.5.1) |
| B1-7233 | (L.1.5) | (O.5.1) |
| B1-7234 | (L.1.9) | (O.5.1) |
| B1-7235 | (L.1.12) | (O.5.1) |
| B1-7236 | (L.1.13) | (O.5.1) |
| B1-7237 | (L.1.17) | (O.5.1) |
| B1-7238 | (L.1.23) | (O.5.1) |
| B1-7239 | (L.1.32), | (O.5.1) |
| B1-7240 | (L.1.46) | (O.5.1) |
| B1-7241 | (M.1.6) | (O.5.1) |
| B1-7242 | (M.1.24) | (O.5.1) |
| B1-7243 | (M.1.25) | (O.5.1) |
| B1-7244 | (M.1.28) | (O.5.1) |
| B1-7245 | (M.1.29) | (O.5.1) |
| B1-7246 | (M.1.30) | (O.5.1) |
| B1-7247 | (N.7.3) | (O.5.1) |
| B1-7248 | (N.7.4) | (O.5.1) |
| B1-7249 | (N.7.5) | (O.5.1) |
| B1-7250 | (N.13.13) | (O.5.1) |
| B1-7251 | (O.2.4), | (O.5.1) |
| B1-7252 | (O.4.5) | (O.5.1) |
| B1-7253 | (O.4.7) | (O.5.1) |
| B1-7254 | (O.4.8) | (O.5.1) |
| B1-7255 | (O.5.1) | (O.5.1) |
| B1-7256 | (O.26.2) | (O.5.1) |
| B1-7257 | (O.27.17) | (O.5.1) |
| B1-7258 | (A.1.1) | (O.26.2) |
| B1-7259 | (A.1.4) | (O.26.2) |
| B1-7260 | (A.1.8) | (O.26.2) |
| B1-7261 | (A.1.10) | (O.26.2) |
| B1-7262 | (A.1.11) | (O.26.2) |
| B1-7263 | (A.1.12) | (O.26.2) |
| B1-7264 | (A.1.14) | (O.26.2) |
| B1-7265 | (A.1.17) | (O.26.2) |
| B1-7266 | (A.1.19) | (O.26.2) |
| B1-7267 | (A.1.25) | (O.26.2) |
| B1-7268 | (A.1.34) | (O.26.2) |
| B1-7269 | (A.1.35) | (O.26.2) |
| B1-7270 | (A.1.38) | (O.26.2) |
| B1-7271 | (A.2.6) | (O.26.2) |
| B1-7272 | (A.3.2) | (O.26.2) |
| B1-7273 | (A.3.3) | (O.26.2) |
| B1-7274 | (A.3.4) | (O.26.2) |
| B1-7275 | (A.3.7) | (O.26.2) |
| B1-7276 | (A.3.8) | (O.26.2) |
| B1-7277 | (A.3.9) | (O.26.2) |
| B1-7278 | (A.3.10) | (O.26.2) |
| B1-7279 | (A.3.11) | (O.26.2) |
| B1-7280 | (A.3.12) | (O.26.2) |
| B1-7281 | (A.3.15) | (O.26.2) |
| B1-7282 | (A.3.16) | (O.26.2) |

TABLE B1-continued

| Mixture | Co 2) | Co3) |
|---|---|---|
| B1-7283 | (A.3.17) | (O.26.2) |
| B1-7284 | (A.3.19) | (O.26.2) |
| B1-7285 | (A.3.21) | (O.26.2) |
| B1-7286 | (A.3.22) | (O.26.2) |
| B1-7287 | (A.3.23) | (O.26.2) |
| B1-7288 | (A.3.28) | (O.26.2) |
| B1-7289 | (A.3.31) | (O.26.2) |
| B1-7290 | (A.4.5) | (O.26.2) |
| B1-7291 | (B.1.4) | (O.26.2) |
| B1-7292 | (B.1.5) | (O.26.2) |
| B1-7293 | (B.1.8) | (O.26.2) |
| B1-7294 | (B.1.10) | (O.26.2) |
| B1-7295 | (B.1.12) | (O.26.2) |
| B1-7296 | (B.1.15) | (O.26.2) |
| B1-7297 | (B.1.17) | (O.26.2) |
| B1-7298 | (B.1.18) | (O.26.2) |
| B1-7299 | (B.1.21) | (O.26.2) |
| B1-7300 | (B.1.22) | (O.26.2) |
| B1-7301 | (B.1.23) | (O.26.2) |
| B1-7302 | (B.1.25) | (O.26.2) |
| B1-7303 | (B.1.26) | (O.26.2) |
| B1-7304 | (B.1.29) | (O.26.2) |
| B1-7305 | (B.1.38) | (O.26.2) |
| B1-7306 | (B.1.44) | (O.26.2) |
| B1-7307 | (B.1.46) | (O.26.2) |
| B1-7308 | (B.2.4) | (O.26.2) |
| B1-7309 | (B.3.1) | (O.26.2) |
| B1-7310 | (C.1.4) | (O.26.2) |
| B1-7311 | (C.1.5) | (O.26.2) |
| B1-7312 | (C.2.1) | (O.26.2) |
| B1-7313 | (D.1.4) | (O.26.2) |
| B1-7314 | (D.1.5) | (O.26.2) |
| B1-7315 | (D.2.3) | (O.26.2) |
| B1-7316 | (D.2.5) | (O.26.2) |
| B1-7317 | (D.2.6) | (O.26.2) |
| B1-7318 | (E.1.1) | (O.26.2) |
| B1-7319 | (E.1.3) | (O.26.2) |
| B1-7320 | (E.2.2) | (O.26.2) |
| B1-7321 | (E.2.3), | (O.26.2) |
| B1-7322 | (F.1.2) | (O.26.2) |
| B1-7323 | (F.1.3) | (O.26.2) |
| B1-7324 | (F.1.5) | (O.26.2) |
| B1-7325 | (G.1.4) | (O.26.2) |
| B1-7326 | (G.3.1) | (O.26.2) |
| B1-7327 | (G.5.1) | (O.26.2) |
| B1-7328 | (H.1.2) | (O.26.2) |
| B1-7329 | (H.1.3) | (O.26.2) |
| B1-7330 | (H.1.4) | (O.26.2) |
| B1-7331 | (H.1.5) | (O.26.2) |
| B1-7332 | (H.1.6) | (O.26.2) |
| B1-7333 | (H.1.7) | (O.26.2) |
| B1-7334 | (H.2.2) | (O.26.2) |
| B1-7335 | (H.2.3) | (O.26.2) |
| B1-7336 | (H.2.5) | (O.26.2) |
| B1-7337 | (H.2.7) | (O.26.2) |
| B1-7338 | (H.3.2) | (O.26.2) |
| B1-7339 | (H.3.4) | (O.26.2) |
| B1-7340 | (H.3.5) | (O.26.2) |
| B1-7341 | (H.3.10) | (O.26.2) |
| B1-7342 | (H.4.2) | (O.26.2) |
| B1-7343 | (H.4.9) | (O.26.2) |
| B1-7344 | (I.1.1) | (O.26.2) |
| B1-7345 | (I.2.1) | (O.26.2) |
| B1-7346 | (I.2.2) | (O.26.2) |
| B1-7347 | (J.1.2) | (O.26.2) |
| B1-7348 | (J.1.3) | (O.26.2) |
| B1-7349 | (J.1.4) | (O.26.2) |
| B1-7350 | (J.1.5) | (O.26.2) |
| B1-7351 | (J.1.8) | (O.26.2) |
| B1-7352 | (J.1.12) | (O.26.2) |
| B1-7353 | (K.1.13) | (O.26.2) |
| B1-7354 | (K.1.47) | (O.26.2) |
| B1-7355 | (K.1.54) | (O.26.2) |
| B1-7356 | (L.1.5) | (O.26.2) |
| B1-7357 | (L.1.9) | (O.26.2) |
| B1-7358 | (L.1.12) | (O.26.2) |
| B1-7359 | (L.1.13) | (O.26.2) |
| B1-7360 | (L.1.17) | (O.26.2) |

TABLE B1-continued

| Mixture | Co 2) | Co3) |
|---|---|---|
| B1-7361 | (L.1.23) | (O.26.2) |
| B1-7362 | (L.1.32), | (O.26.2) |
| B1-7363 | (L.1.46) | (O.26.2) |
| B1-7364 | (M.1.6) | (O.26.2) |
| B1-7365 | (M.1.24) | (O.26.2) |
| B1-7366 | (M.1.25) | (O.26.2) |
| B1-7367 | (M.1.28) | (O.26.2) |
| B1-7368 | (M.1.29) | (O.26.2) |
| B1-7369 | (M.1.30) | (O.26.2) |
| B1-7370 | (N.7.3) | (O.26.2) |
| B1-7371 | (N.7.4) | (O.26.2) |
| B1-7372 | (N.7.5) | (O.26.2) |
| B1-7373 | (N.13.13) | (O.26.2) |
| B1-7374 | (O.2.4), | (O.26.2) |
| B1-7375 | (O.4.5) | (O.26.2) |
| B1-7376 | (O.4.7) | (O.26.2) |
| B1-7377 | (O.4.8) | (O.26.2) |
| B1-7378 | (O.5.1) | (O.26.2) |
| B1-7379 | (O.26.2) | (O.26.2) |
| B1-7380 | (O.27.17) | (O.26.2) |
| B1-7381 | (A.1.1) | (O.27.17) |
| B1-7382 | (A.1.4) | (O.27.17) |
| B1-7383 | (A.1.8) | (O.27.17) |
| B1-7384 | (A.1.10) | (O.27.17) |
| B1-7385 | (A.1.11) | (O.27.17) |
| B1-7386 | (A.1.12) | (O.27.17) |
| B1-7387 | (A.1.14) | (O.27.17) |
| B1-7388 | (A.1.17) | (O.27.17) |
| B1-7389 | (A.1.19) | (O.27.17) |
| B1-7390 | (A.1.25) | (O.27.17) |
| B1-7391 | (A.1.34) | (O.27.17) |
| B1-7392 | (A.1.35) | (O.27.17) |
| B1-7393 | (A.1.38) | (O.27.17) |
| B1-7394 | (A.2.6) | (O.27.17) |
| B1-7395 | (A.3.2) | (O.27.17) |
| B1-7396 | (A.3.3) | (O.27.17) |
| B1-7397 | (A.3.4) | (O.27.17) |
| B1-7398 | (A.3.7) | (O.27.17) |
| B1-7399 | (A.3.8) | (O.27.17) |
| B1-7400 | (A.3.9) | (O.27.17) |
| B1-7401 | (A.3.10) | (O.27.17) |
| B1-7402 | (A.3.11) | (O.27.17) |
| B1-7403 | (A.3.12) | (O.27.17) |
| B1-7404 | (A.3.15) | (O.27.17) |
| B1-7405 | (A.3.16) | (O.27.17) |
| B1-7406 | (A.3.17) | (O.27.17) |
| B1-7407 | (A.3.19) | (O.27.17) |
| B1-7408 | (A.3.21) | (O.27.17) |
| B1-7409 | (A.3.22) | (O.27.17) |
| B1-7410 | (A.3.23) | (O.27.17) |
| B1-7411 | (A.3.28) | (O.27.17) |
| B1-7412 | (A.3.31) | (O.27.17) |
| B1-7413 | (A.4.5) | (O.27.17) |
| B1-7414 | (B.1.4) | (O.27.17) |
| B1-7415 | (B.1.5) | (O.27.17) |
| B1-7416 | (B.1.8) | (O.27.17) |
| B1-7417 | (B.1.10) | (O.27.17) |
| B1-7418 | (B.1.12) | (O.27.17) |
| B1-7419 | (B.1.15) | (O.27.17) |
| B1-7420 | (B.1.17) | (O.27.17) |
| B1-7421 | (B.1.18) | (O.27.17) |
| B1-7422 | (B.1.21) | (O.27.17) |
| B1-7423 | (B.1.22) | (O.27.17) |
| B1-7424 | (B.1.23) | (O.27.17) |
| B1-7425 | (B.1.25) | (O.27.17) |
| B1-7426 | (B.1.26) | (O.27.17) |
| B1-7427 | (B.1.29) | (O.27.17) |
| B1-7428 | (B.1.38) | (O.27.17) |
| B1-7429 | (B.1.44) | (O.27.17) |
| B1-7430 | (B.1.46) | (O.27.17) |
| B1-7431 | (B.2.4) | (O.27.17) |
| B1-7432 | (B.3.1) | (O.27.17) |
| B1-7433 | (C.1.4) | (O.27.17) |
| B1-7434 | (C.1.5) | (O.27.17) |
| B1-7435 | (C.2.1) | (O.27.17) |
| B1-7436 | (D.1.4) | (O.27.17) |
| B1-7437 | (D.1.5) | (O.27.17) |
| B1-7438 | (D.2.3) | (O.27.17) |

TABLE B1-continued

| Mixture | Co 2) | Co3) |
|---|---|---|
| B1-7439 | (D.2.5) | (O.27.17) |
| B1-7440 | (D.2.6) | (O.27.17) |
| B1-7441 | (E.1.1) | (O.27.17) |
| B1-7442 | (E.1.3) | (O.27.17) |
| B1-7443 | (E.2.2) | (O.27.17) |
| B1-7444 | (E.2.3), | (O.27.17) |
| B1-7445 | (F.1.2) | (O.27.17) |
| B1-7446 | (F.1.3) | (O.27.17) |
| B1-7447 | (F.1.5) | (O.27.17) |
| B1-7448 | (G.1.4) | (O.27.17) |
| B1-7449 | (G.3.1) | (O.27.17) |
| B1-7450 | (G.5.1) | (O.27.17) |
| B1-7451 | (H.1.2) | (O.27.17) |
| B1-7452 | (H.1.3) | (O.27.17) |
| B1-7453 | (H.1.4) | (O.27.17) |
| B1-7454 | (H.1.5) | (O.27.17) |
| B1-7455 | (H.1.6) | (O.27.17) |
| B1-7456 | (H.1.7) | (O.27.17) |
| B1-7457 | (H.2.2) | (O.27.17) |
| B1-7458 | (H.2.3) | (O.27.17) |
| B1-7459 | (H.2.5) | (O.27.17) |
| B1-7460 | (H.2.7) | (O.27.17) |
| B1-7461 | (H.3.2) | (O.27.17) |
| B1-7462 | (H.3.4) | (O.27.17) |
| B1-7463 | (H.3.5) | (O.27.17) |
| B1-7464 | (H.3.10) | (O.27.17) |
| B1-7465 | (H.4.2) | (O.27.17) |
| B1-7466 | (H.4.9) | (O.27.17) |
| B1-7467 | (1-1.1) | (O.27.17) |
| B1-7468 | (I.2.1) | (O.27.17) |
| B1-7469 | (I.2.2) | (O.27.17) |
| B1-7470 | (J.1.2) | (O.27.17) |
| B1-7471 | (J.1.3) | (O.27.17) |
| B1-7472 | (J.1.4) | (O.27.17) |
| B1-7473 | (J.1.5) | (O.27.17) |
| B1-7474 | (J.1.8) | (O.27.17) |
| B1-7475 | (J.1.12) | (O.27.17) |
| B1-7476 | (K.1.13) | (O.27.17) |
| B1-7477 | (K.1.47) | (O.27.17) |
| B1-7478 | (K.1.54) | (O.27.17) |
| B1-7479 | (L.1.5) | (O.27.17) |
| B1-7480 | (L.1.9) | (O.27.17) |
| B1-7481 | (L.1.12) | (O.27.17) |
| B1-7482 | (L.1.13) | (O.27.17) |
| B1-7483 | (L.1.17) | (O.27.17) |
| B1-7484 | (L.1.23) | (O.27.17) |
| B1-7485 | (L.1.32), | (O.27.17) |
| B1-7486 | (L.1.46) | (O.27.17) |
| B1-7487 | (M.1.6) | (O.27.17) |
| B1-7488 | (M.1.24) | (O.27.17) |
| B1-7489 | (M.1.25) | (O.27.17) |
| B1-7490 | (M.1.28) | (O.27.17) |
| B1-7491 | (M.1.29) | (O.27.17) |
| B1-7492 | (M.1.30) | (O.27.17) |
| B1-7493 | (N.7.3) | (O.27.17) |
| B1-7494 | (N.7.4) | (O.27.17) |
| B1-7495 | (N.7.5) | (O.27.17) |
| B1-7496 | (N.13.13) | (O.27.17) |
| B1-7497 | (O.2.4), | (O.27.17) |
| B1-7498 | (O.4.5) | (O.27.17) |
| B1-7499 | (O.4.7) | (O.27.17) |
| B1-7500 | (O.4.8) | (O.27.17) |
| B1-7501 | (O.5.1) | (O.27.17) |
| B1-7502 | (O.26.2) | (O.27.17) |
| B1-7503 | (O.27.17) | (O.27.17) |

Table B4: Ternary mixtures B4-1 to B4-2436 comprising as component 1) compound I.A as defined herein and as component 2) and component 3) compounds II and III as defined in each row of the Table B (e.g. mixture B1-15 comprises: I.A as component 1), A.3.2=benzovindiflupyr (see Table C above) as Component 2), and A.1.1=azoxystrobin (see Table C below) as Component 3).

In mixtures B4-1 to B4-2436 of Table B4 according to one embodiment the weight ratio of compound I.A to compound II is between 100:1 and 1:100; and the weight ratio of compound I.A to compound III, is between 100:1 and 1:100.

In mixtures B4-1 to B4-2436 of Table B4 according to one embodiment the weight ratio of compound I.A to compound II is between 100:1 and 1:100; and the weight ratio of compound I.A to compound III, is between 50:1 and 1:50.

In mixtures B4-1 to B4-2436 of Table B4 according to one embodiment the weight ratio of compound I.A to compound II is between 100:1 and 1:100; and the weight ratio of compound I.A to compound III, is between 20:1 and 1:20.

In mixtures B4-1 to B4-2436 of Table B4 according to one embodiment the weight ratio of compound I.A to compound II is between 100:1 and 1:100; and the weight ratio of compound I.A to compound III, is between 5:1 and 1:5.

In mixtures B4-1 to B4-2436 of Table B4 according to one embodiment the weight ratio of compound I.A to compound II is between 100:1 and 1:100; and the weight ratio of compound I.A to compound III is, for example, 3:1, 1:1 or 1:3.

Table B5: Ternary mixtures B5-1 to B5-2436 are defined as mixtures B4-1 to B4-2436 of Table B4 wherein compound I.A in each mixture is replaced with compound I.B.

In mixtures B5-1 to B5-2436 of Table B5 according to one embodiment the weight ratio of compound I.B to compound II is between 100:1 and 1:100; and the weight ratio of compound I.B to compound III, is between 100:1 and 1:100.

In mixtures B5-1 to B5-2436 of Table B5 according to one embodiment the weight ratio of compound I.B to compound II is between 100:1 and 1:100; and the weight ratio of compound I.B to compound III, is between 50:1 and 1:50.

In mixtures B5-1 to B5-2436 of Table B5 according to one embodiment the weight ratio of compound I.B to compound II is between 100:1 and 1:100; and the weight ratio of compound I.B to compound III, is between 20:1 and 1:20.

In mixtures B5-1 to B5-2436 of Table B5 according to one embodiment the weight ratio of compound I.B to compound II is between 100:1 and 1:100; and the weight ratio of compound I.B to compound III, is between 5:1 and 1:5.

In mixtures B5-1 to B5-2436 of Table B5 according to one embodiment the weight ratio of compound I.B to compound II is between 100:1 and 1:100; and the weight ratio of compound I.B to compound III is, for example, 3:1, 1:1 or 1:3.

Table B6: Mixtures 66-1 to B6-2436 of Table B6 are defined as mixtures 64-1 to B4-2436 of Table B4, wherein compound I.A in each mixture is replaced with compound I.C.

In mixtures 66-1 to B6-2436 of Table B6 according to one embodiment the weight ratio of compound I.C to compound II is between 100:1 and 1:100; and the weight ratio of compound I.C to compound III, is between 100:1 and 1:100.

In mixtures 66-1 to B6-2436 of Table B6 according to one embodiment the weight ratio of compound I.C to compound II is between 100:1 and 1:100; and the weight ratio of compound I.C to compound III, is between 50:1 and 1:50.

In mixtures 66-1 to B6-2436 of Table B6 according to one embodiment the weight ratio of compound I.C to compound II is between 100:1 and 1:100; and the weight ratio of compound I.C to compound III, is between 20:1 and 1:20.

In mixtures 66-1 to B6-2436 of Table B6 according to one embodiment the weight ratio of compound I.C to compound II is between 100:1 and 1:100; and the weight ratio of compound I.C to compound III, is between 5:1 and 1:5.

In mixtures 66-1 to B6-2436 of Table B6 according to one embodiment the weight ratio of compound I.C to compound II is between 100:1 and 1:100; and the weight ratio of compound I.C to compound III is, for example, 3:1, 1:1 or 1:3.

TABLE B 4

| Mixture | Co 2) | Co3) |
|---|---|---|
| B4-1 | (A.1.1)c | (O.2.4) |
| B4-2 | (A.1.17) | (O.2.4) |
| B4-3 | (A.1.13) | (O.2.4) |
| B4-4 | (A.1.14) | (O.2.4) |
| B4-5 | (A.1.10) | (O.2.4) |
| B4-6 | (A.1.25) | (O.2.4) |
| B4-7 | (A.3.19) | (O.2.4) |
| B4-8 | (A.3.16) | (O.2.4) |
| B4-9 | (A.3.15) | (O.2.4) |
| B4-10 | (A.3.7) | (O.2.4) |
| B4-11 | (A.3.9) | (O.2.4) |
| B4-12 | (A.3.4) | (O.2.4) |
| B4-13 | (A.3.28) | (O.2.4) |
| B4-14 | (A.3.22) | (O.2.4) |
| B4-15 | (A.3.23) | (O.2.4) |
| B4-16 | (A.3.31) | (O.2.4) |
| B4-17 | (G.5.1) | (O.2.4) |
| B4-18 | (C.1.4) | (O.2.4) |
| B4-19 | (C.1.5) | (O.2.4) |
| B4-20 | (K.1.43) | (O.2.4) |
| B4-21 | (K.1.41) | (O.2.4) |
| B4-22 | (D.2.2) | (O.2.4) |
| B4-23 | (G.3.1) | (O.2.4) |
| B4-24 | (G.5.2) | (O.2.4) |
| B4-25 | (G.5.3) | (O.2.4) |
| B4-26 | (B.1.4) | (O.2.4) |
| B4-27 | (B.1.5) | (O.2.4) |
| B4-28 | (B.1.23) | (O.2.4) |
| B4-29 | (B.1.12) | (O.2.4) |
| B4-30 | (D.1.4) | (O.2.4) |
| B4-31 | (B.1.15) | (O.2.4) |
| B4-32 | (B.1.25) | (O.2.4) |
| B4-33 | (B.1.38) | (O.2.4) |
| B4-34 | (B.1.28) | (O.2.4) |
| B4-35 | (B.1.46) | (O.2.4) |
| B4-36 | (B.1.10) | (O.2.4) |
| B4-37 | (B.1.26) | (O.2.4) |
| B4-38 | (F.1.5) | (O.2.4) |
| B4-39 | (A.3.5) | (O.2.4) |
| B4-40 | (A.4.12) | (O.2.4) |
| B4-41 | (A.4.5) | (O.2.4) |
| B4-42 | (H.2.9) | (O.2.4) |
| B4-43 | (H.2.7) | (O.2.4) |
| B4-44 | (D.1.2) | (O.2.4) |
| B4-45 | (D.1.5) | (O.2.4) |
| B4-46 | (G.3.7) | (O.2.4) |
| B4-47 | (A.3.17) | (O.2.4) |
| B4-48 | (B.1.44) | (O.2.4) |
| B4-49 | (A.1.1) | (O.27.7) |
| B4-50 | (A.1.17) | (O.27.7) |
| B4-51 | (A.1.13) | (O.27.7) |
| B4-52 | (A.1.14) | (O.27.7) |
| B4-53 | (A.1.10) | (O.27.7) |
| B4-54 | (A.1.25) | (O.27.7) |
| B4-55 | (A.3.19) | (O.27.7) |
| B4-56 | (A.3.16) | (O.27.7) |
| B4-57 | (A.3.15) | (O.27.7) |
| B4-58 | (A.3.7) | (O.27.7) |
| B4-59 | (A.3.9) | (O.27.7) |
| B4-60 | (A.3.4) | (O.27.7) |
| B4-61 | (A.3.28) | (O.27.7) |
| B4-62 | (A.3.22) | (O.27.7) |
| B4-63 | (A.3.23) | (O.27.7) |
| B4-64 | (A.3.31) | (O.27.7) |
| B4-65 | (G.5.1) | (O.27.7) |
| B4-66 | (C.1.4) | (O.27.7) |
| B4-67 | (C.1.5) | (O.27.7) |
| B4-68 | (K.1.43) | (O.27.7) |
| B4-69 | (K.1.41) | (O.27.7) |
| B4-70 | (D.2.2) | (O.27.7) |
| B4-71 | (G.3.1) | (O.27.7) |
| B4-72 | (G.5.2) | (O.27.7) |
| B4-73 | (G.5.3) | (O.27.7) |

TABLE B 4-continued

| Mixture | Co 2) | Co3) |
|---|---|---|
| B4-74 | (B.1.4) | (O.27.7) |
| B4-75 | (B.1.5) | (O.27.7) |
| B4-76 | (B.1.23) | (O.27.7) |
| B4-77 | (B.1.12) | (O.27.7) |
| B4-78 | (D.1.4) | (O.27.7) |
| B4-79 | (B.1.15) | (O.27.7) |
| B4-80 | (B.1.25) | (O.27.7) |
| B4-81 | (B.1.38) | (O.27.7) |
| B4-82 | (B.1.28) | (O.27.7) |
| B4-83 | (B.1.46) | (O.27.7) |
| B4-84 | (B.1.10) | (O.27.7) |
| B4-85 | (B.1.26) | (O.27.7) |
| B4-86 | (F.1.5) | (O.27.7) |
| B4-87 | (A.3.5) | (O.27.7) |
| B4-88 | (A.4.12) | (O.27.7) |
| B4-89 | (A.4.5) | (O.27.7) |
| B4-90 | (H.2.9) | (O.27.7) |
| B4-91 | (H.2.7) | (O.27.7) |
| B4-92 | (D.1.2) | (O.27.7) |
| B4-93 | (D.1.5) | (O.27.7) |
| B4-94 | (G.3.7) | (O.27.7) |
| B4-95 | (A.3.17) | (O.27.7) |
| B4-96 | (B.1.44) | (O.27.7) |
| B4-97 | (A.1.1) | (O.27.76) |
| B4-98 | (A.1.17) | (O.27.76) |
| B4-99 | (A.1.13) | (O.27.76) |
| B4-100 | (A.1.14) | (O.27.76) |
| B4-101 | (A.1.10) | (O.27.76) |
| B4-102 | (A.1.25) | (O.27.76) |
| B4-103 | (A.3.19) | (O.27.76) |
| B4-104 | (A.3.16) | (O.27.76) |
| B4-105 | (A.3.15) | (O.27.76) |
| B4-106 | (A.3.7) | (O.27.76) |
| B4-107 | (A.3.9) | (O.27.76) |
| B4-108 | (A.3.4) | (O.27.76) |
| B4-109 | (A.3.28) | (O.27.76) |
| B4-110 | (A.3.22) | (O.27.76) |
| B4-111 | (A.3.23) | (O.27.76) |
| B4-112 | (A.3.31) | (O.27.76) |
| B4-113 | (G.5.1) | (O.27.76) |
| B4-114 | (C.1.4) | (O.27.76) |
| B4-115 | (C.1.5) | (O.27.76) |
| B4-116 | (K.1.43) | (O.27.76) |
| B4-117 | (K.1.41) | (O.27.76) |
| B4-118 | (D.2.2) | (O.27.76) |
| B4-119 | (G.3.1) | (O.27.76) |
| B4-120 | (G.5.2) | (O.27.76) |
| B4-121 | (G.5.3) | (O.27.76) |
| B4-122 | (B.1.4) | (O.27.76) |
| B4-123 | (B.1.5) | (O.27.76) |
| B4-124 | (B.1.23) | (O.27.76) |
| B4-125 | (B.1.12) | (O.27.76) |
| B4-126 | (D.1.4) | (O.27.76) |
| B4-127 | (B.1.15) | (O.27.76) |
| B4-128 | (B.1.25) | (O.27.76) |
| B4-129 | (B.1.38) | (O.27.76) |
| B4-130 | (B.1.28) | (O.27.76) |
| B4-131 | (B.1.46) | (O.27.76) |
| B4-132 | (B.1.10) | (O.27.76) |
| B4-133 | (B.1.26) | (O.27.76) |
| B4-134 | (F.1.5) | (O.27.76) |
| B4-135 | (A.3.5) | (O.27.76) |
| B4-136 | (A.4.12) | (O.27.76) |
| B4-137 | (A.4.5) | (O.27.76) |
| B4-138 | (H.2.9) | (O.27.76) |
| B4-139 | (H.2.7) | (O.27.76) |
| B4-140 | (D.1.2) | (O.27.76) |
| B4-141 | (D.1.5) | (O.27.76) |
| B4-142 | (G.3.7) | (O.27.76) |
| B4-143 | (A.3.17) | (O.27.76) |
| B4-144 | (B.1.44) | (O.27.76) |
| B4-145 | (A.1.1) | (O.4.2) |
| B4-146 | (A.1.17) | (O.4.2) |
| B4-147 | (A.1.13) | (O.4.2) |
| B4-148 | (A.1.14) | (O.4.2) |
| B4-149 | (A.1.10) | (O.4.2) |
| B4-150 | (A.1.25) | (O.4.2) |
| B4-151 | (A.3.19) | (O.4.2) |

TABLE B 4-continued

| Mixture | Co 2) | Co3) |
|---|---|---|
| B4-152 | (A.3.16) | (O.4.2) |
| B4-153 | (A.3.15) | (O.4.2) |
| B4-154 | (A.3.7) | (O.4.2) |
| B4-155 | (A.3.9) | (O.4.2) |
| B4-156 | (A.3.4) | (O.4.2) |
| B4-157 | (A.3.28) | (O.4.2) |
| B4-158 | (A.3.22) | (O.4.2) |
| B4-159 | (A.3.23) | (O.4.2) |
| B4-160 | (A.3.31) | (O.4.2) |
| B4-161 | (G.5.1) | (O.4.2) |
| B4-162 | (C.1.4) | (O.4.2) |
| B4-163 | (C.1.5) | (O.4.2) |
| B4-164 | (K.1.43) | (O.4.2) |
| B4-165 | (K.1.41) | (O.4.2) |
| B4-166 | (D.2.2) | (O.4.2) |
| B4-167 | (G.3.1) | (O.4.2) |
| B4-168 | (G.5.2) | (O.4.2) |
| B4-169 | (G.5.3) | (O.4.2) |
| B4-170 | (B.1.4) | (O.4.2) |
| B4-171 | (B.1.5) | (O.4.2) |
| B4-172 | (B.1.23) | (O.4.2) |
| B4-173 | (B.1.12) | (O.4.2) |
| B4-174 | (D.1.4) | (O.4.2) |
| B4-175 | (B.1.15) | (O.4.2) |
| B4-176 | (B.1.25) | (O.4.2) |
| B4-177 | (B.1.38) | (O.4.2) |
| B4-178 | (B.1.28) | (O.4.2) |
| B4-179 | (B.1.46) | (O.4.2) |
| B4-180 | (B.1.10) | (O.4.2) |
| B4-181 | (B.1.26) | (O.4.2) |
| B4-182 | (F.1.5) | (O.4.2) |
| B4-183 | (A.3.5) | (O.4.2) |
| B4-184 | (A.4.12) | (O.4.2) |
| B4-185 | (A.4.5) | (O.4.2) |
| B4-186 | (H.2.9) | (O.4.2) |
| B4-187 | (H.2.7) | (O.4.2) |
| B4-188 | (D.1.2) | (O.4.2) |
| B4-189 | (D.1.5) | (O.4.2) |
| B4-190 | (G.3.7) | (O.4.2) |
| B4-191 | (A.3.17) | (O.4.2) |
| B4-192 | (B.1.44) | (O.4.2) |
| B4-193 | (A.1.1) | (O.4.8) |
| B4-194 | (A.1.17) | (O.4.8) |
| B4-195 | (A.1.13) | (O.4.8) |
| B4-196 | (A.1.14) | (O.4.8) |
| B4-197 | (A.1.10) | (O.4.8) |
| B4-198 | (A.1.25) | (O.4.8) |
| B4-199 | (A.3.19) | (O.4.8) |
| B4-200 | (A.3.16) | (O.4.8) |
| B4-201 | (A.3.15) | (O.4.8) |
| B4-202 | (A.3.7) | (O.4.8) |
| B4-203 | (A.3.9) | (O.4.8) |
| B4-204 | (A.3.4) | (O.4.8) |
| B4-205 | (A.3.28) | (O.4.8) |
| B4-206 | (A.3.22) | (O.4.8) |
| B4-207 | (A.3.23) | (O.4.8) |
| B4-208 | (A.3.31) | (O.4.8) |
| B4-209 | (G.5.1) | (O.4.8) |
| B4-210 | (C.1.4) | (O.4.8) |
| B4-211 | (C.1.5) | (O.4.8) |
| B4-212 | (K.1.43) | (O.4.8) |
| B4-213 | (K.1.41) | (O.4.8) |
| B4-214 | (D.2.2) | (O.4.8) |
| B4-215 | (G.3.1) | (O.4.8) |
| B4-216 | (G.5.2) | (O.4.8) |
| B4-217 | (G.5.3) | (O.4.8) |
| B4-218 | (B.1.4) | (O.4.8) |
| B4-219 | (B.1.5) | (O.4.8) |
| B4-220 | (B.1.23) | (O.4.8) |
| B4-221 | (B.1.12) | (O.4.8) |
| B4-222 | (D.1.4) | (O.4.8) |
| B4-223 | (B.1.15) | (O.4.8) |
| B4-224 | (B.1.25) | (O.4.8) |
| B4-225 | (B.1.38) | (O.4.8) |
| B4-226 | (B.1.28) | (O.4.8) |
| B4-227 | (B.1.46) | (O.4.8) |
| B4-228 | (B.1.10) | (O.4.8) |
| B4-229 | (B.1.26) | (O.4.8) |

TABLE B 4-continued

| Mixture | Co 2) | Co3) |
|---|---|---|
| B4-230 | (F.1.5) | (O.4.8) |
| B4-231 | (A.3.5) | (O.4.8) |
| B4-232 | (A.4.12) | (O.4.8) |
| B4-233 | (A.4.5) | (O.4.8) |
| B4-234 | (H.2.9) | (O.4.8) |
| B4-235 | (H.2.7) | (O.4.8) |
| B4-236 | (D.1.2) | (O.4.8) |
| B4-237 | (D.1.5) | (O.4.8) |
| B4-238 | (G.3.7) | (O.4.8) |
| B4-239 | (A.3.17) | (O.4.8) |
| B4-240 | (B.1.44) | (O.4.8) |
| B4-241 | (A.1.1) | (O.4.1) |
| B4-242 | (A.1.17) | (O.4.1) |
| B4-243 | (A.1.13) | (O.4.1) |
| B4-244 | (A.1.14) | (O.4.1) |
| B4-245 | (A.1.10) | (O.4.1) |
| B4-246 | (A.1.25) | (O.4.1) |
| B4-247 | (A.3.19) | (O.4.1) |
| B4-248 | (A.3.16) | (O.4.1) |
| B4-249 | (A.3.15) | (O.4.1) |
| B4-250 | (A.3.7) | (O.4.1) |
| B4-251 | (A.3.9) | (O.4.1) |
| B4-252 | (A.3.4) | (O.4.1) |
| B4-253 | (A.3.28) | (O.4.1) |
| B4-254 | (A.3.22) | (O.4.1) |
| B4-255 | (A.3.23) | (O.4.1) |
| B4-256 | (A.3.31) | (O.4.1) |
| B4-257 | (G.5.1) | (O.4.1) |
| B4-258 | (C.1.4) | (O.4.1) |
| B4-259 | (C.1.5) | (O.4.1) |
| B4-260 | (K.1.43) | (O.4.1) |
| B4-261 | (K.1.41) | (O.4.1) |
| B4-262 | (D.2.2) | (O.4.1) |
| B4-263 | (G.3.1) | (O.4.1) |
| B4-264 | (G.5.2) | (O.4.1) |
| B4-265 | (G.5.3) | (O.4.1) |
| B4-266 | (B.1.4) | (O.4.1) |
| B4-267 | (B.1.5) | (O.4.1) |
| B4-268 | (B.1.23) | (O.4.1) |
| B4-269 | (B.1.12) | (O.4.1) |
| B4-270 | (D.1.4) | (O.4.1) |
| B4-271 | (B.1.15) | (O.4.1) |
| B4-272 | (B.1.25) | (O.4.1) |
| B4-273 | (B.1.38) | (O.4.1) |
| B4-274 | (B.1.28) | (O.4.1) |
| B4-275 | (B.1.46) | (O.4.1) |
| B4-276 | (B.1.10) | (O.4.1) |
| B4-277 | (B.1.26) | (O.4.1) |
| B4-278 | (F.1.5) | (O.4.1) |
| B4-279 | (A.3.5) | (O.4.1) |
| B4-280 | (A.4.12) | (O.4.1) |
| B4-281 | (A.4.5) | (O.4.1) |
| B4-282 | (H.2.9) | (O.4.1) |
| B4-283 | (H.2.7) | (O.4.1) |
| B4-284 | (D.1.2) | (O.4.1) |
| B4-285 | (D.1.5) | (O.4.1) |
| B4-286 | (G.3.7) | (O.4.1) |
| B4-287 | (A.3.17) | (O.4.1) |
| B4-288 | (B.1.44) | (O.4.1) |
| B4-289 | (A.1.1) | (O.4.4) |
| B4-290 | (A.1.17) | (O.4.4) |
| B4-291 | (A.1.13) | (O.4.4) |
| B4-292 | (A.1.14) | (O.4.4) |
| B4-293 | (A.1.10) | (O.4.4) |
| B4-294 | (A.1.25) | (O.4.4) |
| B4-295 | (A.3.19) | (O.4.4) |
| B4-296 | (A.3.16) | (O.4.4) |
| B4-297 | (A.3.15) | (O.4.4) |
| B4-298 | (A.3.7) | (O.4.4) |
| B4-299 | (A.3.9) | (O.4.4) |
| B4-300 | (A.3.4) | (O.4.4) |
| B4-301 | (A.3.28) | (O.4.4) |
| B4-302 | (A.3.22) | (O.4.4) |
| B4-303 | (A.3.23) | (O.4.4) |
| B4-304 | (A.3.31) | (O.4.4) |
| B4-305 | (G.5.1) | (O.4.4) |
| B4-306 | (C.1.4) | (O.4.4) |
| B4-307 | (C.1.5) | (O.4.4) |

TABLE B 4-continued

| Mixture | Co 2) | Co3) |
|---|---|---|
| B4-308 | (K.1.43) | (O.4.4) |
| B4-309 | (K.1.41) | (O.4.4) |
| B4-310 | (D.2.2) | (O.4.4) |
| B4-311 | (G.3.1) | (O.4.4) |
| B4-312 | (G.5.2) | (O.4.4) |
| B4-313 | (G.5.3) | (O.4.4) |
| B4-314 | (B.1.4) | (O.4.4) |
| B4-315 | (B.1.5) | (O.4.4) |
| B4-316 | (B.1.23) | (O.4.4) |
| B4-317 | (B.1.12) | (O.4.4) |
| B4-318 | (D.1.4) | (O.4.4) |
| B4-319 | (B.1.15) | (O.4.4) |
| B4-320 | (B.1.25) | (O.4.4) |
| B4-321 | (B.1.38) | (O.4.4) |
| B4-322 | (B.1.28) | (O.4.4) |
| B4-323 | (B.1.46) | (O.4.4) |
| B4-324 | (B.1.10) | (O.4.4) |
| B4-325 | (B.1.26) | (O.4.4) |
| B4-326 | (F.1.5) | (O.4.4) |
| B4-327 | (A.3.5) | (O.4.4) |
| B4-328 | (A.4.12) | (O.4.4) |
| B4-329 | (A.4.5) | (O.4.4) |
| B4-330 | (H.2.9) | (O.4.4) |
| B4-331 | (H.2.7) | (O.4.4) |
| B4-332 | (D.1.2) | (O.4.4) |
| B4-333 | (D.1.5) | (O.4.4) |
| B4-334 | (G.3.7) | (O.4.4) |
| B4-335 | (A.3.17) | (O.4.4) |
| B4-336 | (B.1.44) | (O.4.4) |
| B4-337 | (A.1.1) | (O.4.5) |
| B4-338 | (A.1.17) | (O.4.5) |
| B4-339 | (A.1.13) | (O.4.5) |
| B4-340 | (A.1.14) | (O.4.5) |
| B4-341 | (A.1.10) | (O.4.5) |
| B4-342 | (A.1.25) | (O.4.5) |
| B4-343 | (A.3.19) | (O.4.5) |
| B4-344 | (A.3.16) | (O.4.5) |
| B4-345 | (A.3.15) | (O.4.5) |
| B4-346 | (A.3.7) | (O.4.5) |
| B4-347 | (A.3.9) | (O.4.5) |
| B4-348 | (A.3.4) | (O.4.5) |
| B4-349 | (A.3.28) | (O.4.5) |
| B4-350 | (A.3.22) | (O.4.5) |
| B4-351 | (A.3.23) | (O.4.5) |
| B4-352 | (A.3.31) | (O.4.5) |
| B4-353 | (G.5.1) | (O.4.5) |
| B4-354 | (C.1.4) | (O.4.5) |
| B4-355 | (C.1.5) | (O.4.5) |
| B4-356 | (K.1.43) | (O.4.5) |
| B4-357 | (K.1.41) | (O.4.5) |
| B4-358 | (D.2.2) | (O.4.5) |
| B4-359 | (G.3.1) | (O.4.5) |
| B4-360 | (G.5.2) | (O.4.5) |
| B4-361 | (G.5.3) | (O.4.5) |
| B4-362 | (B.1.4) | (O.4.5) |
| B4-363 | (B.1.5) | (O.4.5) |
| B4-364 | (B.1.23) | (O.4.5) |
| B4-365 | (B.1.12) | (O.4.5) |
| B4-366 | (D.1.4) | (O.4.5) |
| B4-367 | (B.1.15) | (O.4.5) |
| B4-368 | (B.1.25) | (O.4.5) |
| B4-369 | (B.1.38) | (O.4.5) |
| B4-370 | (B.1.28) | (O.4.5) |
| B4-371 | (B.1.46) | (O.4.5) |
| B4-372 | (B.1.10) | (O.4.5) |
| B4-373 | (B.1.26) | (O.4.5) |
| B4-374 | (F.1.5) | (O.4.5) |
| B4-375 | (A.3.5) | (O.4.5) |
| B4-376 | (A.4.12) | (O.4.5) |
| B4-377 | (A.4.5) | (O.4.5) |
| B4-378 | (H.2.9) | (O.4.5) |
| B4-379 | (H.2.7) | (O.4.5) |
| B4-380 | (D.1.2) | (O.4.5) |
| B4-381 | (D.1.5) | (O.4.5) |
| B4-382 | (G.3.7) | (O.4.5) |
| B4-383 | (A.3.17) | (O.4.5) |
| B4-384 | (B.1.44) | (O.4.5) |
| B4-385 | (A.1.1) | (O.4.7) |

TABLE B 4-continued

| Mixture | Co 2) | Co3) |
|---|---|---|
| B4-386 | (A.1.17) | (O.4.7) |
| B4-387 | (A.1.13) | (O.4.7) |
| B4-388 | (A.1.14) | (O.4.7) |
| B4-389 | (A.1.10) | (O.4.7) |
| B4-390 | (A.1.25) | (O.4.7) |
| B4-391 | (A.3.19) | (O.4.7) |
| B4-392 | (A.3.16) | (O.4.7) |
| B4-393 | (A.3.15) | (O.4.7) |
| B4-394 | (A.3.7) | (O.4.7) |
| B4-395 | (A.3.9) | (O.4.7) |
| B4-396 | (A.3.4) | (O.4.7) |
| B4-397 | (A.3.28) | (O.4.7) |
| B4-398 | (A.3.22) | (O.4.7) |
| B4-399 | (A.3.23) | (O.4.7) |
| B4-400 | (A.3.31) | (O.4.7) |
| B4-401 | (G.5.1) | (O.4.7) |
| B4-402 | (C.1.4) | (O.4.7) |
| B4-403 | (C.1.5) | (O.4.7) |
| B4-404 | (K.1.43) | (O.4.7) |
| B4-405 | (K.1.41) | (O.4.7) |
| B4-406 | (D.2.2) | (O.4.7) |
| B4-407 | (G.3.1) | (O.4.7) |
| B4-408 | (G.5.2) | (O.4.7) |
| B4-409 | (G.5.3) | (O.4.7) |
| B4-410 | (B.1.4) | (O.4.7) |
| B4-411 | (B.1.5) | (O.4.7) |
| B4-412 | (B.1.23) | (O.4.7) |
| B4-413 | (B.1.12) | (O.4.7) |
| B4-414 | (D.1.4) | (O.4.7) |
| B4-415 | (B.1.15) | (O.4.7) |
| B4-416 | (B.1.25) | (O.4.7) |
| B4-417 | (B.1.38) | (O.4.7) |
| B4-418 | (B.1.28) | (O.4.7) |
| B4-419 | (B.1.46) | (O.4.7) |
| B4-420 | (B.1.10) | (O.4.7) |
| B4-421 | (B.1.26) | (O.4.7) |
| B4-422 | (F.1.5) | (O.4.7) |
| B4-423 | (A.3.5) | (O.4.7) |
| B4-424 | (A.4.12) | (O.4.7) |
| B4-425 | (A.4.5) | (O.4.7) |
| B4-426 | (H.2.9) | (O.4.7) |
| B4-427 | (H.2.7) | (O.4.7) |
| B4-428 | (D.1.2) | (O.4.7) |
| B4-429 | (D.1.5) | (O.4.7) |
| B4-430 | (G.3.7) | (O.4.7) |
| B4-431 | (A.3.17) | (O.4.7) |
| B4-432 | (B.1.44) | (O.4.7) |
| B4-433 | (A.1.1) | (O.27.25) |
| B4-434 | (A.1.17) | (O.27.25) |
| B4-435 | (A.1.13) | (O.27.25) |
| B4-436 | (A.1.14) | (O.27.25) |
| B4-437 | (A.1.10) | (O.27.25) |
| B4-438 | (A.1.25) | (O.27.25) |
| B4-439 | (A.3.19) | (O.27.25) |
| B4-440 | (A.3.16) | (O.27.25) |
| B4-441 | (A.3.15) | (O.27.25) |
| B4-442 | (A.3.7) | (O.27.25) |
| B4-443 | (A.3.9) | (O.27.25) |
| B4-444 | (A.3.4) | (O.27.25) |
| B4-445 | (A.3.28) | (O.27.25) |
| B4-446 | (A.3.22) | (O.27.25) |
| B4-447 | (A.3.23) | (O.27.25) |
| B4-448 | (A.3.31) | (O.27.25) |
| B4-449 | (G.5.1) | (O.27.25) |
| B4-450 | (C.1.4) | (O.27.25) |
| B4-451 | (C.1.5) | (O.27.25) |
| B4-452 | (K.1.43) | (O.27.25) |
| B4-453 | (K.1.41) | (O.27.25) |
| B4-454 | (D.2.2) | (O.27.25) |
| B4-455 | (G.3.1) | (O.27.25) |
| B4-456 | (G.5.2) | (O.27.25) |
| B4-457 | (G.5.3) | (O.27.25) |
| B4-458 | (B.1.4) | (O.27.25) |
| B4-459 | (B.1.5) | (O.27.25) |
| B4-460 | (B.1.23) | (O.27.25) |
| B4-461 | (B.1.12) | (O.27.25) |
| B4-462 | (D.1.4) | (O.27.25) |
| B4-463 | (B.1.15) | (O.27.25) |

TABLE B 4-continued

| Mixture | Co 2) | Co3) |
|---|---|---|
| B4-464 | (B.1.25) | (O.27.25) |
| B4-465 | (B.1.38) | (O.27.25) |
| B4-466 | (B.1.28) | (O.27.25) |
| B4-467 | (B.1.46) | (O.27.25) |
| B4-468 | (B.1.10) | (O.27.25) |
| B4-469 | (B.1.26) | (O.27.25) |
| B4-470 | (F.1.5) | (O.27.25) |
| B4-471 | (A.3.5) | (O.27.25) |
| B4-472 | (A.4.12) | (O.27.25) |
| B4-473 | (A.4.5) | (O.27.25) |
| B4-474 | (H.2.9) | (O.27.25) |
| B4-475 | (H.2.7) | (O.27.25) |
| B4-476 | (D.1.2) | (O.27.25) |
| B4-477 | (D.1.5) | (O.27.25) |
| B4-478 | (G.3.7) | (O.27.25) |
| B4-479 | (A.3.17) | (O.27.25) |
| B4-480 | (B.1.44) | (O.27.25) |
| B4-481 | (A.1.1) | (O.27.18) |
| B4-482 | (A.1.17) | (O.27.18) |
| B4-483 | (A.1.13) | (O.27.18) |
| B4-484 | (A.1.14) | (O.27.18) |
| B4-485 | (A.1.10) | (O.27.18) |
| B4-486 | (A.1.25) | (O.27.18) |
| B4-487 | (A.3.19) | (O.27.18) |
| B4-488 | (A.3.16) | (O.27.18) |
| B4-489 | (A.3.15) | (O.27.18) |
| B4-490 | (A.3.7) | (O.27.18) |
| B4-491 | (A.3.9) | (O.27.18) |
| B4-492 | (A.3.4) | (O.27.18) |
| B4-493 | (A.3.28) | (O.27.18) |
| B4-494 | (A.3.22) | (O.27.18) |
| B4-495 | (A.3.23) | (O.27.18) |
| B4-496 | (A.3.31) | (O.27.18) |
| B4-497 | (G.5.1) | (O.27.18) |
| B4-498 | (C.1.4) | (O.27.18) |
| B4-499 | (C.1.5) | (O.27.18) |
| B4-500 | (K.1.43) | (O.27.18) |
| B4-501 | (K.1.41) | (O.27.18) |
| B4-502 | (D.2.2) | (O.27.18) |
| B4-503 | (G.3.1) | (O.27.18) |
| B4-504 | (G.5.2) | (O.27.18) |
| B4-505 | (G.5.3) | (O.27.18) |
| B4-506 | (B.1.4) | (O.27.18) |
| B4-507 | (B.1.5) | (O.27.18) |
| B4-508 | (B.1.23) | (O.27.18) |
| B4-509 | (B.1.12) | (O.27.18) |
| B4-510 | (D.1.4) | (O.27.18) |
| B4-511 | (B.1.15) | (O.27.18) |
| B4-512 | (B.1.25) | (O.27.18) |
| B4-513 | (B.1.38) | (O.27.18) |
| B4-514 | (B.1.28) | (O.27.18) |
| B4-515 | (B.1.46) | (O.27.18) |
| B4-516 | (B.1.10) | (O.27.18) |
| B4-517 | (B.1.26) | (O.27.18) |
| B4-518 | (F.1.5) | (O.27.18) |
| B4-519 | (A.3.5) | (O.27.18) |
| B4-520 | (A.4.12) | (O.27.18) |
| B4-521 | (A.4.5) | (O.27.18) |
| B4-522 | (H.2.9) | (O.27.18) |
| B4-523 | (H.2.7) | (O.27.18) |
| B4-524 | (D.1.2) | (O.27.18) |
| B4-525 | (D.1.5) | (O.27.18) |
| B4-526 | (G.3.7) | (O.27.18) |
| B4-527 | (A.3.17) | (O.27.18) |
| B4-528 | (B.1.44) | (O.27.18) |
| B4-529 | (A.1.1) | (O.27.11) |
| B4-530 | (A.1.17) | (O.27.11) |
| B4-531 | (A.1.13) | (O.27.11) |
| B4-532 | (A.1.14) | (O.27.11) |
| B4-533 | (A.1.10) | (O.27.11) |
| B4-534 | (A.1.25) | (O.27.11) |
| B4-535 | (A.3.19) | (O.27.11) |
| B4-536 | (A.3.16) | (O.27.11) |
| B4-537 | (A.3.15) | (O.27.11) |
| B4-538 | (A.3.7) | (O.27.11) |
| B4-539 | (A.3.9) | (O.27.11) |
| B4-540 | (A.3.4) | (O.27.11) |
| B4-541 | (A.3.28) | (O.27.11) |

TABLE B 4-continued

| Mixture | Co 2) | Co3) |
|---|---|---|
| B4-542 | (A.3.22) | (O.27.11) |
| B4-543 | (A.3.23) | (O.27.11) |
| B4-544 | (A.3.31) | (O.27.11) |
| B4-545 | (G.5.1) | (O.27.11) |
| B4-546 | (C.1.4) | (O.27.11) |
| B4-547 | (C.1.5) | (O.27.11) |
| B4-548 | (K.1.43) | (O.27.11) |
| B4-549 | (K.1.41) | (O.27.11) |
| B4-550 | (D.2.2) | (O.27.11) |
| B4-551 | (G.3.1) | (O.27.11) |
| B4-552 | (G.5.2) | (O.27.11) |
| B4-553 | (G.5.3) | (O.27.11) |
| B4-554 | (B.1.4) | (O.27.11) |
| B4-555 | (B.1.5) | (O.27.11) |
| B4-556 | (B.1.23) | (O.27.11) |
| B4-557 | (B.1.12) | (O.27.11) |
| B4-558 | (D.1.4) | (O.27.11) |
| B4-559 | (B.1.15) | (O.27.11) |
| B4-560 | (B.1.25) | (O.27.11) |
| B4-561 | (B.1.38) | (O.27.11) |
| B4-562 | (B.1.28) | (O.27.11) |
| B4-563 | (B.1.46) | (O.27.11) |
| B4-564 | (B.1.10) | (O.27.11) |
| B4-565 | (B.1.26) | (O.27.11) |
| B4-566 | (F.1.5) | (O.27.11) |
| B4-567 | (A.3.5) | (O.27.11) |
| B4-568 | (A.4.12) | (O.27.11) |
| B4-569 | (A.4.5) | (O.27.11) |
| B4-570 | (H.2.9) | (O.27.11) |
| B4-571 | (H.2.7) | (O.27.11) |
| B4-572 | (D.1.2) | (O.27.11) |
| B4-573 | (D.1.5) | (O.27.11) |
| B4-574 | (G.3.7) | (O.27.11) |
| B4-575 | (A.3.17) | (O.27.11) |
| B4-576 | (B.1.44) | (O.27.11) |
| B4-577 | (A.1.1) | (O.27.27) |
| B4-578 | (A.1.17) | (O.27.27) |
| B4-579 | (A.1.13) | (O.27.27) |
| B4-580 | (A.1.14) | (O.27.27) |
| B4-581 | (A.1.10) | (O.27.27) |
| B4-582 | (A.1.25) | (O.27.27) |
| B4-583 | (A.3.19) | (O.27.27) |
| B4-584 | (A.3.16) | (O.27.27) |
| B4-585 | (A.3.15) | (O.27.27) |
| B4-586 | (A.3.7) | (O.27.27) |
| B4-587 | (A.3.9) | (O.27.27) |
| B4-588 | (A.3.4) | (O.27.27) |
| B4-589 | (A.3.28) | (O.27.27) |
| B4-590 | (A.3.22) | (O.27.27) |
| B4-591 | (A.3.23) | (O.27.27) |
| B4-592 | (A.3.31) | (O.27.27) |
| B4-593 | (G.5.1) | (O.27.27) |
| B4-594 | (C.1.4) | (O.27.27) |
| B4-595 | (C.1.5) | (O.27.27) |
| B4-596 | (K.1.43) | (O.27.27) |
| B4-597 | (K.1.41) | (O.27.27) |
| B4-598 | (D.2.2) | (O.27.27) |
| B4-599 | (G.3.1) | (O.27.27) |
| B4-600 | (G.5.2) | (O.27.27) |
| B4-601 | (G.5.3) | (O.27.27) |
| B4-602 | (B.1.4) | (O.27.27) |
| B4-603 | (B.1.5) | (O.27.27) |
| B4-604 | (B.1.23) | (O.27.27) |
| B4-605 | (B.1.12) | (O.27.27) |
| B4-606 | (D.1.4) | (O.27.27) |
| B4-607 | (B.1.15) | (O.27.27) |
| B4-608 | (B.1.25) | (O.27.27) |
| B4-609 | (B.1.38) | (O.27.27) |
| B4-610 | (B.1.28) | (O.27.27) |
| B4-611 | (B.1.46) | (O.27.27) |
| B4-612 | (B.1.10) | (O.27.27) |
| B4-613 | (B.1.26) | (O.27.27) |
| B4-614 | (F.1.5) | (O.27.27) |
| B4-615 | (A.3.5) | (O.27.27) |
| B4-616 | (A.4.12) | (O.27.27) |
| B4-617 | (A.4.5) | (O.27.27) |
| B4-618 | (H.2.9) | (O.27.27) |
| B4-619 | (H.2.7) | (O.27.27) |

TABLE B 4-continued

| Mixture | Co 2) | Co3) |
|---|---|---|
| B4-620 | (D.1.2) | (O.27.27) |
| B4-621 | (D.1.5) | (O.27.27) |
| B4-622 | (G.3.7) | (O.27.27) |
| B4-623 | (A.3.17) | (O.27.27) |
| B4-624 | (B.1.44) | (O.27.27) |
| B4-625 | (A.1.1) | (O.3.43) |
| B4-626 | (A.1.17) | (O.3.43) |
| B4-627 | (A.1.13) | (O.3.43) |
| B4-628 | (A.1.14) | (O.3.43) |
| B4-629 | (A.1.10) | (O.3.43) |
| B4-630 | (A.1.25) | (O.3.43) |
| B4-631 | (A.3.19) | (O.3.43) |
| B4-632 | (A.3.16) | (O.3.43) |
| B4-633 | (A.3.15) | (O.3.43) |
| B4-634 | (A.3.7) | (O.3.43) |
| B4-635 | (A.3.9) | (O.3.43) |
| B4-636 | (A.3.4) | (O.3.43) |
| B4-637 | (A.3.28) | (O.3.43) |
| B4-638 | (A.3.22) | (O.3.43) |
| B4-639 | (A.3.23) | (O.3.43) |
| B4-640 | (A.3.31) | (O.3.43) |
| B4-641 | (G.5.1) | (O.3.43) |
| B4-642 | (C.1.4) | (O.3.43) |
| B4-643 | (C.1.5) | (O.3.43) |
| B4-644 | (K.1.43) | (O.3.43) |
| B4-645 | (K.1.41) | (O.3.43) |
| B4-646 | (D.2.2) | (O.3.43) |
| B4-647 | (G.3.1) | (O.3.43) |
| B4-648 | (G.5.2) | (O.3.43) |
| B4-649 | (G.5.3) | (O.3.43) |
| B4-650 | (B.1.4) | (O.3.43) |
| B4-651 | (B.1.5) | (O.3.43) |
| B4-652 | (B.1.23) | (O.3.43) |
| B4-653 | (B.1.12) | (O.3.43) |
| B4-654 | (D.1.4) | (O.3.43) |
| B4-655 | (B.1.15) | (O.3.43) |
| B4-656 | (B.1.25) | (O.3.43) |
| B4-657 | (B.1.38) | (O.3.43) |
| B4-658 | (B.1.28) | (O.3.43) |
| B4-659 | (B.1.46) | (O.3.43) |
| B4-660 | (B.1.10) | (O.3.43) |
| B4-661 | (B.1.26) | (O.3.43) |
| B4-662 | (F.1.5) | (O.3.43) |
| B4-663 | (A.3.5) | (O.3.43) |
| B4-664 | (A.4.12) | (O.3.43) |
| B4-665 | (A.4.5) | (O.3.43) |
| B4-666 | (H.2.9) | (O.3.43) |
| B4-667 | (H.2.7) | (O.3.43) |
| B4-668 | (D.1.2) | (O.3.43) |
| B4-669 | (D.1.5) | (O.3.43) |
| B4-670 | (G.3.7) | (O.3.43) |
| B4-671 | (A.3.17) | (O.3.43) |
| B4-672 | (B.1.44) | (O.3.43) |
| B4-673 | (A.1.1) | (O.3.5) |
| B4-674 | (A.1.17) | (O.3.5) |
| B4-675 | (A.1.13) | (O.3.5) |
| B4-676 | (A.1.14) | (O.3.5) |
| B4-677 | (A.1.10) | (O.3.5) |
| B4-678 | (A.1.25) | (O.3.5) |
| B4-679 | (A.3.19) | (O.3.5) |
| B4-680 | (A.3.16) | (O.3.5) |
| B4-681 | (A.3.15) | (O.3.5) |
| B4-682 | (A.3.7) | (O.3.5) |
| B4-683 | (A.3.9) | (O.3.5) |
| B4-684 | (A.3.4) | (O.3.5) |
| B4-685 | (A.3.28) | (O.3.5) |
| B4-686 | (A.3.22) | (O.3.5) |
| B4-687 | (A.3.23) | (O.3.5) |
| B4-688 | (A.3.31) | (O.3.5) |
| B4-689 | (G.5.1) | (O.3.5) |
| B4-690 | (C.1.4) | (O.3.5) |
| B4-691 | (C.1.5) | (O.3.5) |
| B4-692 | (K.1.43) | (O.3.5) |
| B4-693 | (K.1.41) | (O.3.5) |
| B4-694 | (D.2.2) | (O.3.5) |
| B4-695 | (G.3.1) | (O.3.5) |
| B4-696 | (G.5.2) | (O.3.5) |
| B4-697 | (G.5.3) | (O.3.5) |

TABLE B 4-continued

| Mixture | Co 2) | Co3) |
|---|---|---|
| B4-698 | (B.1.4) | (O.3.5) |
| B4-699 | (B.1.5) | (O.3.5) |
| B4-700 | (B.1.23) | (O.3.5) |
| B4-701 | (B.1.12) | (O.3.5) |
| B4-702 | (D.1.4) | (O.3.5) |
| B4-703 | (B.1.15) | (O.3.5) |
| B4-704 | (B.1.25) | (O.3.5) |
| B4-705 | (B.1.38) | (O.3.5) |
| B4-706 | (B.1.28) | (O.3.5) |
| B4-707 | (B.1.46) | (O.3.5) |
| B4-708 | (B.1.10) | (O.3.5) |
| B4-709 | (B.1.26) | (O.3.5) |
| B4-710 | (F.1.5) | (O.3.5) |
| B4-711 | (A.3.5) | (O.3.5) |
| B4-712 | (A.4.12) | (O.3.5) |
| B4-713 | (A.4.5) | (O.3.5) |
| B4-714 | (H.2.9) | (O.3.5) |
| B4-715 | (H.2.7) | (O.3.5) |
| B4-716 | (D.1.2) | (O.3.5) |
| B4-717 | (D.1.5) | (O.3.5) |
| B4-718 | (G.3.7) | (O.3.5) |
| B4-719 | (A.3.17) | (O.3.5) |
| B4-720 | (B.1.44) | (O.3.5) |
| B4-721 | (A.1.1) | (O.3.15) |
| B4-722 | (A.1.17) | (O.3.15) |
| B4-723 | (A.1.13) | (O.3.15) |
| B4-724 | (A.1.14) | (O.3.15) |
| B4-725 | (A.1.10) | (O.3.15) |
| B4-726 | (A.1.25) | (O.3.15) |
| B4-727 | (A.3.19) | (O.3.15) |
| B4-728 | (A.3.16) | (O.3.15) |
| B4-729 | (A.3.15) | (O.3.15) |
| B4-730 | (A.3.7) | (O.3.15) |
| B4-731 | (A.3.9) | (O.3.15) |
| B4-732 | (A.3.4) | (O.3.15) |
| B4-733 | (A.3.28) | (O.3.15) |
| B4-734 | (A.3.22) | (O.3.15) |
| B4-735 | (A.3.23) | (O.3.15) |
| B4-736 | (A.3.31) | (O.3.15) |
| B4-737 | (G.5.1) | (O.3.15) |
| B4-738 | (C.1.4) | (O.3.15) |
| B4-739 | (C.1.5) | (O.3.15) |
| B4-740 | (K.1.43) | (O.3.15) |
| B4-741 | (K.1.41) | (O.3.15) |
| B4-742 | (D.2.2) | (O.3.15) |
| B4-743 | (G.3.1) | (O.3.15) |
| B4-744 | (G.5.2) | (O.3.15) |
| B4-745 | (G.5.3) | (O.3.15) |
| B4-746 | (B.1.4) | (O.3.15) |
| B4-747 | (B.1.5) | (O.3.15) |
| B4-748 | (B.1.23) | (O.3.15) |
| B4-749 | (B.1.12) | (O.3.15) |
| B4-750 | (D.1.4) | (O.3.15) |
| B4-751 | (B.1.15) | (O.3.15) |
| B4-752 | (B.1.25) | (O.3.15) |
| B4-753 | (B.1.38) | (O.3.15) |
| B4-754 | (B.1.28) | (O.3.15) |
| B4-755 | (B.1.46) | (O.3.15) |
| B4-756 | (B.1.10) | (O.3.15) |
| B4-757 | (B.1.26) | (O.3.15) |
| B4-758 | (F.1.5) | (O.3.15) |
| B4-759 | (A.3.5) | (O.3.15) |
| B4-760 | (A.4.12) | (O.3.15) |
| B4-761 | (A.4.5) | (O.3.15) |
| B4-762 | (H.2.9) | (O.3.15) |
| B4-763 | (H.2.7) | (O.3.15) |
| B4-764 | (D.1.2) | (O.3.15) |
| B4-765 | (D.1.5) | (O.3.15) |
| B4-766 | (G.3.7) | (O.3.15) |
| B4-767 | (A.3.17) | (O.3.15) |
| B4-768 | (B.1.44) | (O.3.15) |
| B4-769 | (A.1.1) | (O.26.4) |
| B4-770 | (A.1.17) | (O.26.4) |
| B4-771 | (A.1.13) | (O.26.4) |
| B4-772 | (A.1.14) | (O.26.4) |
| B4-773 | (A.1.10) | (O.26.4) |
| B4-774 | (A.1.25) | (O.26.4) |
| B4-775 | (A.3.19) | (O.26.4) |

TABLE B 4-continued

| Mixture | Co 2) | Co3) |
|---|---|---|
| B4-776 | (A.3.16) | (O.26.4) |
| B4-777 | (A.3.15) | (O.26.4) |
| B4-778 | (A.3.7) | (O.26.4) |
| B4-779 | (A.3.9) | (O.26.4) |
| B4-780 | (A.3.4) | (O.26.4) |
| B4-781 | (A.3.28) | (O.26.4) |
| B4-782 | (A.3.22) | (O.26.4) |
| B4-783 | (A.3.23) | (O.26.4) |
| B4-784 | (A.3.31) | (O.26.4) |
| B4-785 | (G.5.1) | (O.26.4) |
| B4-786 | (C.1.4) | (O.26.4) |
| B4-787 | (C.1.5) | (O.26.4) |
| B4-788 | (K.1.43) | (O.26.4) |
| B4-789 | (K.1.41) | (O.26.4) |
| B4-790 | (D.2.2) | (O.26.4) |
| B4-791 | (G.3.1) | (O.26.4) |
| B4-792 | (G.5.2) | (O.26.4) |
| B4-793 | (G.5.3) | (O.26.4) |
| B4-794 | (B.1.4) | (O.26.4) |
| B4-795 | (B.1.5) | (O.26.4) |
| B4-796 | (B.1.23) | (O.26.4) |
| B4-797 | (B.1.12) | (O.26.4) |
| B4-798 | (D.1.4) | (O.26.4) |
| B4-799 | (B.1.15) | (O.26.4) |
| B4-800 | (B.1.25) | (O.26.4) |
| B4-801 | (B.1.38) | (O.26.4) |
| B4-802 | (B.1.28) | (O.26.4) |
| B4-803 | (B.1.46) | (O.26.4) |
| B4-804 | (B.1.10) | (O.26.4) |
| B4-805 | (B.1.26) | (O.26.4) |
| B4-806 | (F.1.5) | (O.26.4) |
| B4-807 | (A.3.5) | (O.26.4) |
| B4-808 | (A.4.12) | (O.26.4) |
| B4-809 | (A.4.5) | (O.26.4) |
| B4-810 | (H.2.9) | (O.26.4) |
| B4-811 | (H.2.7) | (O.26.4) |
| B4-812 | (D.1.2) | (O.26.4) |
| B4-813 | (D.1.5) | (O.26.4) |
| B4-814 | (G.3.7) | (O.26.4) |
| B4-815 | (A.3.17) | (O.26.4) |
| B4-816 | (B.1.44) | (O.26.4) |
| B4-817 | (A.1.1) | (O.26.5) |
| B4-818 | (A.1.17) | (O.26.5) |
| B4-819 | (A.1.13) | (O.26.5) |
| B4-820 | (A.1.14) | (O.26.5) |
| B4-821 | (A.1.10) | (O.26.5) |
| B4-822 | (A.1.25) | (O.26.5) |
| B4-823 | (A.3.19) | (O.26.5) |
| B4-824 | (A.3.16) | (O.26.5) |
| B4-825 | (A.3.15) | (O.26.5) |
| B4-826 | (A.3.7) | (O.26.5) |
| B4-827 | (A.3.9) | (O.26.5) |
| B4-828 | (A.3.4) | (O.26.5) |
| B4-829 | (A.3.28) | (O.26.5) |
| B4-830 | (A.3.22) | (O.26.5) |
| B4-831 | (A.3.23) | (O.26.5) |
| B4-832 | (A.3.31) | (O.26.5) |
| B4-833 | (G.5.1) | (O.26.5) |
| B4-834 | (C.1.4) | (O.26.5) |
| B4-835 | (C.1.5) | (O.26.5) |
| B4-836 | (K.1.43) | (O.26.5) |
| B4-837 | (K.1.41) | (O.26.5) |
| B4-838 | (D.2.2) | (O.26.5) |
| B4-839 | (G.3.1) | (O.26.5) |
| B4-840 | (G.5.2) | (O.26.5) |
| B4-841 | (G.5.3) | (O.26.5) |
| B4-842 | (B.1.4) | (O.26.5) |
| B4-843 | (B.1.5) | (O.26.5) |
| B4-844 | (B.1.23) | (O.26.5) |
| B4-845 | (B.1.12) | (O.26.5) |
| B4-846 | (D.1.4) | (O.26.5) |
| B4-847 | (B.1.15) | (O.26.5) |
| B4-848 | (B.1.25) | (O.26.5) |
| B4-849 | (B.1.38) | (O.26.5) |
| B4-850 | (B.1.28) | (O.26.5) |
| B4-851 | (B.1.46) | (O.26.5) |
| B4-852 | (B.1.10) | (O.26.5) |
| B4-853 | (B.1.26) | (O.26.5) |

TABLE B 4-continued

| Mixture | Co 2) | Co3) |
|---|---|---|
| B4-854 | (F.1.5) | (O.26.5) |
| B4-855 | (A.3.5) | (O.26.5) |
| B4-856 | (A.4.12) | (O.26.5) |
| B4-857 | (A.4.5) | (O.26.5) |
| B4-858 | (H.2.9) | (O.26.5) |
| B4-859 | (H.2.7) | (O.26.5) |
| B4-860 | (D.1.2) | (O.26.5) |
| B4-861 | (D.1.5) | (O.26.5) |
| B4-862 | (G.3.7) | (O.26.5) |
| B4-863 | (A.3.17) | (O.26.5) |
| B4-864 | (B.1.44) | (O.26.5) |
| B4-865 | (A.1.1) | (O.1.21) |
| B4-866 | (A.1.17) | (O.1.21) |
| B4-867 | (A.1.13) | (O.1.21) |
| B4-868 | (A.1.14) | (O.1.21) |
| B4-869 | (A.1.10) | (O.1.21) |
| B4-870 | (A.1.25) | (O.1.21) |
| B4-871 | (A.3.19) | (O.1.21) |
| B4-872 | (A.3.16) | (O.1.21) |
| B4-873 | (A.3.15) | (O.1.21) |
| B4-874 | (A.3.7) | (O.1.21) |
| B4-875 | (A.3.9) | (O.1.21) |
| B4-876 | (A.3.4) | (O.1.21) |
| B4-877 | (A.3.28) | (O.1.21) |
| B4-878 | (A.3.22) | (O.1.21) |
| B4-879 | (A.3.23) | (O.1.21) |
| B4-880 | (A.3.31) | (O.1.21) |
| B4-881 | (G.5.1) | (O.1.21) |
| B4-882 | (C.1.4) | (O.1.21) |
| B4-883 | (C.1.5) | (O.1.21) |
| B4-884 | (K.1.43) | (O.1.21) |
| B4-885 | (K.1.41) | (O.1.21) |
| B4-886 | (D.2.2) | (O.1.21) |
| B4-887 | (G.3.1) | (O.1.21) |
| B4-888 | (G.5.2) | (O.1.21) |
| B4-889 | (G.5.3) | (O.1.21) |
| B4-890 | (B.1.4) | (O.1.21) |
| B4-891 | (B.1.5) | (O.1.21) |
| B4-892 | (B.1.23) | (O.1.21) |
| B4-893 | (B.1.12) | (O.1.21) |
| B4-894 | (D.1.4) | (O.1.21) |
| B4-895 | (B.1.15) | (O.1.21) |
| B4-896 | (B.1.25) | (O.1.21) |
| B4-897 | (B.1.38) | (O.1.21) |
| B4-898 | (B.1.28) | (O.1.21) |
| B4-899 | (B.1.46) | (O.1.21) |
| B4-900 | (B.1.10) | (O.1.21) |
| B4-901 | (B.1.26) | (O.1.21) |
| B4-902 | (F.1.5) | (O.1.21) |
| B4-903 | (A.3.5) | (O.1.21) |
| B4-904 | (A.4.12) | (O.1.21) |
| B4-905 | (A.4.5) | (O.1.21) |
| B4-906 | (H.2.9) | (O.1.21) |
| B4-907 | (H.2.7) | (O.1.21) |
| B4-908 | (D.1.2) | (O.1.21) |
| B4-909 | (D.1.5) | (O.1.21) |
| B4-910 | (G.3.7) | (O.1.21) |
| B4-911 | (A.3.17) | (O.1.21) |
| B4-912 | (B.1.44) | (O.1.21) |
| B4-913 | (A.1.1) | (O.1.15) |
| B4-914 | (A.1.17) | (O.1.15) |
| B4-915 | (A.1.13) | (O.1.15) |
| B4-916 | (A.1.14) | (O.1.15) |
| B4-917 | (A.1.10) | (O.1.15) |
| B4-918 | (A.1.25) | (O.1.15) |
| B4-919 | (A.3.19) | (O.1.15) |
| B4-920 | (A.3.16) | (O.1.15) |
| B4-921 | (A.3.15) | (O.1.15) |
| B4-922 | (A.3.7) | (O.1.15) |
| B4-923 | (A.3.9) | (O.1.15) |
| B4-924 | (A.3.4) | (O.1.15) |
| B4-925 | (A.3.28) | (O.1.15) |
| B4-926 | (A.3.22) | (O.1.15) |
| B4-927 | (A.3.23) | (O.1.15) |
| B4-928 | (A.3.31) | (O.1.15) |
| B4-929 | (G.5.1) | (O.1.15) |
| B4-930 | (C.1.4) | (O.1.15) |
| B4-931 | (C.1.5) | (O.1.15) |

TABLE B 4-continued

| Mixture | Co 2) | Co3) |
|---|---|---|
| B4-932 | (K.1.43) | (O.1.15) |
| B4-933 | (K.1.41) | (O.1.15) |
| B4-934 | (D.2.2) | (O.1.15) |
| B4-935 | (G.3.1) | (O.1.15) |
| B4-936 | (G.5.2) | (O.1.15) |
| B4-937 | (G.5.3) | (O.1.15) |
| B4-938 | (B.1.4) | (O.1.15) |
| B4-939 | (B.1.5) | (O.1.15) |
| B4-940 | (B.1.23) | (O.1.15) |
| B4-941 | (B.1.12) | (O.1.15) |
| B4-942 | (D.1.4) | (O.1.15) |
| B4-943 | (B.1.15) | (O.1.15) |
| B4-944 | (B.1.25) | (O.1.15) |
| B4-945 | (B.1.38) | (O.1.15) |
| B4-946 | (B.1.28) | (O.1.15) |
| B4-947 | (B.1.46) | (O.1.15) |
| B4-948 | (B.1.10) | (O.1.15) |
| B4-949 | (B.1.26) | (O.1.15) |
| B4-950 | (F.1.5) | (O.1.15) |
| B4-951 | (A.3.5) | (O.1.15) |
| B4-952 | (A.4.12) | (O.1.15) |
| B4-953 | (A.4.5) | (O.1.15) |
| B4-954 | (H.2.9) | (O.1.15) |
| B4-955 | (H.2.7) | (O.1.15) |
| B4-956 | (D.1.2) | (O.1.15) |
| B4-957 | (D.1.5) | (O.1.15) |
| B4-958 | (G.3.7) | (O.1.15) |
| B4-959 | (A.3.17) | (O.1.15) |
| B4-960 | (B.1.44) | (O.1.15) |
| B4-961 | (A.1.1) | (O.27.41) |
| B4-962 | (A.1.17) | (O.27.41) |
| B4-963 | (A.1.13) | (O.27.41) |
| B4-964 | (A.1.14) | (O.27.41) |
| B4-965 | (A.1.10) | (O.27.41) |
| B4-966 | (A.1.25) | (O.27.41) |
| B4-967 | (A.3.19) | (O.27.41) |
| B4-968 | (A.3.16) | (O.27.41) |
| B4-969 | (A.3.15) | (O.27.41) |
| B4-970 | (A.3.7) | (O.27.41) |
| B4-971 | (A.3.9) | (O.27.41) |
| B4-972 | (A.3.4) | (O.27.41) |
| B4-973 | (A.3.28) | (O.27.41) |
| B4-974 | (A.3.22) | (O.27.41) |
| B4-975 | (A.3.23) | (O.27.41) |
| B4-976 | (A.3.31) | (O.27.41) |
| B4-977 | (G.5.1) | (O.27.41) |
| B4-978 | (C.1.4) | (O.27.41) |
| B4-979 | (C.1.5) | (O.27.41) |
| B4-980 | (K.1.43) | (O.27.41) |
| B4-981 | (K.1.41) | (O.27.41) |
| B4-982 | (D.2.2) | (O.27.41) |
| B4-983 | (G.3.1) | (O.27.41) |
| B4-984 | (G.5.2) | (O.27.41) |
| B4-985 | (G.5.3) | (O.27.41) |
| B4-986 | (B.1.4) | (O.27.41) |
| B4-987 | (B.1.5) | (O.27.41) |
| B4-988 | (B.1.23) | (O.27.41) |
| B4-989 | (B.1.12) | (O.27.41) |
| B4-990 | (D.1.4) | (O.27.41) |
| B4-991 | (B.1.15) | (O.27.41) |
| B4-992 | (B.1.25) | (O.27.41) |
| B4-993 | (B.1.38) | (O.27.41) |
| B4-994 | (B.1.28) | (O.27.41) |
| B4-995 | (B.1.46) | (O.27.41) |
| B4-996 | (B.1.10) | (O.27.41) |
| B4-997 | (B.1.26) | (O.27.41) |
| B4-998 | (F.1.5) | (O.27.41) |
| B4-999 | (A.3.5) | (O.27.41) |
| B4-1000 | (A.4.12) | (O.27.41) |
| B4-1001 | (A.4.5) | (O.27.41) |
| B4-1002 | (H.2.9) | (O.27.41) |
| B4-1003 | (H.2.7) | (O.27.41) |
| B4-1004 | (D.1.2) | (O.27.41) |
| B4-1005 | (D.1.5) | (O.27.41) |
| B4-1006 | (G.3.7) | (O.27.41) |
| B4-1007 | (A.3.17) | (O.27.41) |
| B4-1008 | (B.1.44) | (O.27.41) |
| B4-1009 | (A.1.1) | (O.1.27) |

TABLE B 4-continued

| Mixture | Co 2) | Co3) |
|---|---|---|
| B4-1010 | (A.1.17) | (O.1.27) |
| B4-1011 | (A.1.13) | (O.1.27) |
| B4-1012 | (A.1.14) | (O.1.27) |
| B4-1013 | (A.1.10) | (O.1.27) |
| B4-1014 | (A.1.25) | (O.1.27) |
| B4-1015 | (A.3.19) | (O.1.27) |
| B4-1016 | (A.3.16) | (O.1.27) |
| B4-1017 | (A.3.15) | (O.1.27) |
| B4-1018 | (A.3.7) | (O.1.27) |
| B4-1019 | (A.3.9) | (O.1.27) |
| B4-1020 | (A.3.4) | (O.1.27) |
| B4-1021 | (A.3.28) | (O.1.27) |
| B4-1022 | (A.3.22) | (O.1.27) |
| B4-1023 | (A.3.23) | (O.1.27) |
| B4-1024 | (A.3.31) | (O.1.27) |
| B4-1025 | (G.5.1) | (O.1.27) |
| B4-1026 | (C.1.4) | (O.1.27) |
| B4-1027 | (C.1.5) | (O.1.27) |
| B4-1028 | (K.1.43) | (O.1.27) |
| B4-1029 | (K.1.41) | (O.1.27) |
| B4-1030 | (D.2.2) | (O.1.27) |
| B4-1031 | (G.3.1) | (O.1.27) |
| B4-1032 | (G.5.2) | (O.1.27) |
| B4-1033 | (G.5.3) | (O.1.27) |
| B4-1034 | (B.1.4) | (O.1.27) |
| B4-1035 | (B.1.5) | (O.1.27) |
| B4-1036 | (B.1.23) | (O.1.27) |
| B4-1037 | (B.1.12) | (O.1.27) |
| B4-1038 | (D.1.4) | (O.1.27) |
| B4-1039 | (B.1.15) | (O.1.27) |
| B4-1040 | (B.1.25) | (O.1.27) |
| B4-1041 | (B.1.38) | (O.1.27) |
| B4-1042 | (B.1.28) | (O.1.27) |
| B4-1043 | (B.1.46) | (O.1.27) |
| B4-1044 | (B.1.10) | (O.1.27) |
| B4-1045 | (B.1.26) | (O.1.27) |
| B4-1046 | (F.1.5) | (O.1.27) |
| B4-1047 | (A.3.5) | (O.1.27) |
| B4-1048 | (A.4.12) | (O.1.27) |
| B4-1049 | (A.4.5) | (O.1.27) |
| B4-1050 | (H.2.9) | (O.1.27) |
| B4-1051 | (H.2.7) | (O.1.27) |
| B4-1052 | (D.1.2) | (O.1.27) |
| B4-1053 | (D.1.5) | (O.1.27) |
| B4-1054 | (G.3.7) | (O.1.27) |
| B4-1055 | (A.3.17) | (O.1.27) |
| B4-1056 | (B.1.44) | (O.1.27) |
| B4-1057 | (A.1.1) | (O.27.101) |
| B4-1058 | (A.1.17) | (O.27.101) |
| B4-1059 | (A.1.13) | (O.27.101) |
| B4-1060 | (A.1.14) | (O.27.101) |
| B4-1061 | (A.1.10) | (O.27.101) |
| B4-1062 | (A.1.25) | (O.27.101) |
| B4-1063 | (A.3.19) | (O.27.101) |
| B4-1064 | (A.3.16) | (O.27.101) |
| B4-1065 | (A.3.15) | (O.27.101) |
| B4-1066 | (A.3.7) | (O.27.101) |
| B4-1067 | (A.3.9) | (O.27.101) |
| B4-1068 | (A.3.4) | (O.27.101) |
| B4-1069 | (A.3.28) | (O.27.101) |
| B4-1070 | (A.3.22) | (O.27.101) |
| B4-1071 | (A.3.23) | (O.27.101) |
| B4-1072 | (A.3.31) | (O.27.101) |
| B4-1073 | (G.5.1) | (O.27.101) |
| B4-1074 | (C.1.4) | (O.27.101) |
| B4-1075 | (C.1.5) | (O.27.101) |
| B4-1076 | (K.1.43) | (O.27.101) |
| B4-1077 | (K.1.41) | (O.27.101) |
| B4-1078 | (D.2.2) | (O.27.101) |
| B4-1079 | (G.3.1) | (O.27.101) |
| B4-1080 | (G.5.2) | (O.27.101) |
| B4-1081 | (G.5.3) | (O.27.101) |
| B4-1082 | (B.1.4) | (O.27.101) |
| B4-1083 | (B.1.5) | (O.27.101) |
| B4-1084 | (B.1.23) | (O.27.101) |
| B4-1085 | (B.1.12) | (O.27.101) |
| B4-1086 | (D.1.4) | (O.27.101) |
| B4-1087 | (B.1.15) | (O.27.101) |
| B4-1088 | (B.1.25) | (O.27.101) |
| B4-1089 | (B.1.38) | (O.27.101) |
| B4-1090 | (B.1.28) | (O.27.101) |
| B4-1091 | (B.1.46) | (O.27.101) |
| B4-1092 | (B.1.10) | (O.27.101) |
| B4-1093 | (B.1.26) | (O.27.101) |
| B4-1094 | (F.1.5) | (O.27.101) |
| B4-1095 | (A.3.5) | (O.27.101) |
| B4-1096 | (A.4.12) | (O.27.101) |
| B4-1097 | (A.4.5) | (O.27.101) |
| B4-1098 | (H.2.9) | (O.27.101) |
| B4-1099 | (H.2.7) | (O.27.101) |
| B4-1100 | (D.1.2) | (O.27.101) |
| B4-1101 | (D.1.5) | (O.27.101) |
| B4-1102 | (G.3.7) | (O.27.101) |
| B4-1103 | (A.3.17) | (O.27.101) |
| B4-1104 | (B.1.44) | (O.27.101) |
| B4-1105 | (A.1.1) | (O.27.103) |
| B4-1106 | (A.1.17) | (O.27.103) |
| B4-1107 | (A.1.13) | (O.27.103) |
| B4-1108 | (A.1.14) | (O.27.103) |
| B4-1109 | (A.1.10) | (O.27.103) |
| B4-1110 | (A.1.25) | (O.27.103) |
| B4-1111 | (A.3.19) | (O.27.103) |
| B4-1112 | (A.3.16) | (O.27.103) |
| B4-1113 | (A.3.15) | (O.27.103) |
| B4-1114 | (A.3.7) | (O.27.103) |
| B4-1115 | (A.3.9) | (O.27.103) |
| B4-1116 | (A.3.4) | (O.27.103) |
| B4-1117 | (A.3.28) | (O.27.103) |
| B4-1118 | (A.3.22) | (O.27.103) |
| B4-1119 | (A.3.23) | (O.27.103) |
| B4-1120 | (A.3.31) | (O.27.103) |
| B4-1121 | (G.5.1) | (O.27.103) |
| B4-1122 | (C.1.4) | (O.27.103) |
| B4-1123 | (C.1.5) | (O.27.103) |
| B4-1124 | (K.1.43) | (O.27.103) |
| B4-1125 | (K.1.41) | (O.27.103) |
| B4-1126 | (D.2.2) | (O.27.103) |
| B4-1127 | (G.3.1) | (O.27.103) |
| B4-1128 | (G.5.2) | (O.27.103) |
| B4-1129 | (G.5.3) | (O.27.103) |
| B4-1130 | (B.1.4) | (O.27.103) |
| B4-1131 | (B.1.5) | (O.27.103) |
| B4-1132 | (B.1.23) | (O.27.103) |
| B4-1133 | (B.1.12) | (O.27.103) |
| B4-1134 | (D.1.4) | (O.27.103) |
| B4-1135 | (B.1.15) | (O.27.103) |
| B4-1136 | (B.1.25) | (O.27.103) |
| B4-1137 | (B.1.38) | (O.27.103) |
| B4-1138 | (B.1.28) | (O.27.103) |
| B4-1139 | (B.1.46) | (O.27.103) |
| B4-1140 | (B.1.10) | (O.27.103) |
| B4-1141 | (B.1.26) | (O.27.103) |
| B4-1142 | (F.1.5) | (O.27.103) |
| B4-1143 | (A.3.5) | (O.27.103) |
| B4-1144 | (A.4.12) | (O.27.103) |
| B4-1145 | (A.4.5) | (O.27.103) |
| B4-1146 | (H.2.9) | (O.27.103) |
| B4-1147 | (H.2.7) | (O.27.103) |
| B4-1148 | (D.1.2) | (O.27.103) |
| B4-1149 | (D.1.5) | (O.27.103) |
| B4-1150 | (G.3.7) | (O.27.103) |
| B4-1151 | (A.3.17) | (O.27.103) |
| B4-1152 | (B.1.44) | (O.27.103) |
| B4-1153 | (A.1.1) | (O.27.44) |
| B4-1154 | (A.1.17) | (O.27.44) |
| B4-1155 | (A.1.13) | (O.27.44) |
| B4-1156 | (A.1.14) | (O.27.44) |
| B4-1157 | (A.1.10) | (O.27.44) |
| B4-1158 | (A.1.25) | (O.27.44) |
| B4-1159 | (A.3.19) | (O.27.44) |
| B4-1160 | (A.3.16) | (O.27.44) |
| B4-1161 | (A.3.15) | (O.27.44) |
| B4-1162 | (A.3.7) | (O.27.44) |
| B4-1163 | (A.3.9) | (O.27.44) |
| B4-1164 | (A.3.4) | (O.27.44) |
| B4-1165 | (A.3.28) | (O.27.44) |

TABLE B 4-continued

| Mixture | Co 2) | Co3) |
|---|---|---|
| B4-1166 | (A.3.22) | (O.27.44) |
| B4-1167 | (A.3.23) | (O.27.44) |
| B4-1168 | (A.3.31) | (O.27.44) |
| B4-1169 | (G.5.1) | (O.27.44) |
| B4-1170 | (C.1.4) | (O.27.44) |
| B4-1171 | (C.1.5) | (O.27.44) |
| B4-1172 | (K.1.43) | (O.27.44) |
| B4-1173 | (K.1.41) | (O.27.44) |
| B4-1174 | (D.2.2) | (O.27.44) |
| B4-1175 | (G.3.1) | (O.27.44) |
| B4-1176 | (G.5.2) | (O.27.44) |
| B4-1177 | (G.5.3) | (O.27.44) |
| B4-1178 | (B.1.4) | (O.27.44) |
| B4-1179 | (B.1.5) | (O.27.44) |
| B4-1180 | (B.1.23) | (O.27.44) |
| B4-1181 | (B.1.12) | (O.27.44) |
| B4-1182 | (D.1.4) | (O.27.44) |
| B4-1183 | (B.1.15) | (O.27.44) |
| B4-1184 | (B.1.25) | (O.27.44) |
| B4-1185 | (B.1.38) | (O.27.44) |
| B4-1186 | (B.1.28) | (O.27.44) |
| B4-1187 | (B.1.46) | (O.27.44) |
| B4-1188 | (B.1.10) | (O.27.44) |
| B4-1189 | (B.1.26) | (O.27.44) |
| B4-1190 | (F.1.5) | (O.27.44) |
| B4-1191 | (A.3.5) | (O.27.44) |
| B4-1192 | (A.4.12) | (O.27.44) |
| B4-1193 | (A.4.5) | (O.27.44) |
| B4-1194 | (H.2.9) | (O.27.44) |
| B4-1195 | (H.2.7) | (O.27.44) |
| B4-1196 | (D.1.2) | (O.27.44) |
| B4-1197 | (D.1.5) | (O.27.44) |
| B4-1198 | (G.3.7) | (O.27.44) |
| B4-1199 | (A.3.17) | (O.27.44) |
| B4-1200 | (B.1.44) | (O.27.44) |
| B4-1201 | (A.1.1) | (O.27.104) |
| B4-1202 | (A.1.17) | (O.27.104) |
| B4-1203 | (A.1.13) | (O.27.104) |
| B4-1204 | (A.1.14) | (O.27.104) |
| B4-1205 | (A.1.10) | (O.27.104) |
| B4-1206 | (A.1.25) | (O.27.104) |
| B4-1207 | (A.3.19) | (O.27.104) |
| B4-1208 | (A.3.16) | (O.27.104) |
| B4-1209 | (A.3.15) | (O.27.104) |
| B4-1210 | (A.3.7) | (O.27.104) |
| B4-1211 | (A.3.9) | (O.27.104) |
| B4-1212 | (A.3.4) | (O.27.104) |
| B4-1213 | (A.3.28) | (O.27.104) |
| B4-1214 | (A.3.22) | (O.27.104) |
| B4-1215 | (A.3.23) | (O.27.104) |
| B4-1216 | (A.3.31) | (O.27.104) |
| B4-1217 | (G.5.1) | (O.27.104) |
| B4-1218 | (C.1.4) | (O.27.104) |
| B4-1219 | (C.1.5) | (O.27.104) |
| B4-1220 | (K.1.43) | (O.27.104) |
| B4-1221 | (K.1.41) | (O.27.104) |
| B4-1222 | (D.2.2) | (O.27.104) |
| B4-1223 | (G.3.1) | (O.27.104) |
| B4-1224 | (G.5.2) | (O.27.104) |
| B4-1225 | (G.5.3) | (O.27.104) |
| B4-1226 | (B.1.4) | (O.27.104) |
| B4-1227 | (B.1.5) | (O.27.104) |
| B4-1228 | (B.1.23) | (O.27.104) |
| B4-1229 | (B.1.12) | (O.27.104) |
| B4-1230 | (D.1.4) | (O.27.104) |
| B4-1231 | (B.1.15) | (O.27.104) |
| B4-1232 | (B.1.25) | (O.27.104) |
| B4-1233 | (B.1.38) | (O.27.104) |
| B4-1234 | (B.1.28) | (O.27.104) |
| B4-1235 | (B.1.46) | (O.27.104) |
| B4-1236 | (B.1.10) | (O.27.104) |
| B4-1237 | (B.1.26) | (O.27.104) |
| B4-1238 | (F.1.5) | (O.27.104) |
| B4-1239 | (A.3.5) | (O.27.104) |
| B4-1240 | (A.4.12) | (O.27.104) |
| B4-1241 | (A.4.5) | (O.27.104) |
| B4-1242 | (H.2.9) | (O.27.104) |
| B4-1243 | (H.2.7) | (O.27.104) |

TABLE B 4-continued

| Mixture | Co 2) | Co3) |
|---|---|---|
| B4-1244 | (D.1.2) | (O.27.104) |
| B4-1245 | (D.1.5) | (O.27.104) |
| B4-1246 | (G.3.7) | (O.27.104) |
| B4-1247 | (A.3.17) | (O.27.104) |
| B4-1248 | (B.1.44) | (O.27.104) |
| B4-1249 | (A.1.1) | (O.27.63) |
| B4-1250 | (A.1.17) | (O.27.63) |
| B4-1251 | (A.1.13) | (O.27.63) |
| B4-1252 | (A.1.14) | (O.27.63) |
| B4-1253 | (A.1.10) | (O.27.63) |
| B4-1254 | (A.1.25) | (O.27.63) |
| B4-1255 | (A.3.19) | (O.27.63) |
| B4-1256 | (A.3.16) | (O.27.63) |
| B4-1257 | (A.3.15) | (O.27.63) |
| B4-1258 | (A.3.7) | (O.27.63) |
| B4-1259 | (A.3.9) | (O.27.63) |
| B4-1260 | (A.3.4) | (O.27.63) |
| B4-1261 | (A.3.28) | (O.27.63) |
| B4-1262 | (A.3.22) | (O.27.63) |
| B4-1263 | (A.3.23) | (O.27.63) |
| B4-1264 | (A.3.31) | (O.27.63) |
| B4-1265 | (G.5.1) | (O.27.63) |
| B4-1266 | (C.1.4) | (O.27.63) |
| B4-1267 | (C.1.5) | (O.27.63) |
| B4-1268 | (K.1.43) | (O.27.63) |
| B4-1269 | (K.1.41) | (O.27.63) |
| B4-1270 | (D.2.2) | (O.27.63) |
| B4-1271 | (G.3.1) | (O.27.63) |
| B4-1272 | (G.5.2) | (O.27.63) |
| B4-1273 | (G.5.3) | (O.27.63) |
| B4-1274 | (B.1.4) | (O.27.63) |
| B4-1275 | (B.1.5) | (O.27.63) |
| B4-1276 | (B.1.23) | (O.27.63) |
| B4-1277 | (B.1.12) | (O.27.63) |
| B4-1278 | (D.1.4) | (O.27.63) |
| B4-1279 | (B.1.15) | (O.27.63) |
| B4-1280 | (B.1.25) | (O.27.63) |
| B4-1281 | (B.1.38) | (O.27.63) |
| B4-1282 | (B.1.28) | (O.27.63) |
| B4-1283 | (B.1.46) | (O.27.63) |
| B4-1284 | (B.1.10) | (O.27.63) |
| B4-1285 | (B.1.26) | (O.27.63) |
| B4-1286 | (F.1.5) | (O.27.63) |
| B4-1287 | (A.3.5) | (O.27.63) |
| B4-1288 | (A.4.12) | (O.27.63) |
| B4-1289 | (A.4.5) | (O.27.63) |
| B4-1290 | (H.2.9) | (O.27.63) |
| B4-1291 | (H.2.7) | (O.27.63) |
| B4-1292 | (D.1.2) | (O.27.63) |
| B4-1293 | (D.1.5) | (O.27.63) |
| B4-1294 | (G.3.7) | (O.27.63) |
| B4-1295 | (A.3.17) | (O.27.63) |
| B4-1296 | (B.1.44) | (O.27.63) |
| B4-1297 | (A.1.1) | (O.27.64) |
| B4-1298 | (A.1.17) | (O.27.64) |
| B4-1299 | (A.1.13) | (O.27.64) |
| B4-1300 | (A.1.14) | (O.27.64) |
| B4-1301 | (A.1.10) | (O.27.64) |
| B4-1302 | (A.1.25) | (O.27.64) |
| B4-1303 | (A.3.19) | (O.27.64) |
| B4-1304 | (A.3.16) | (O.27.64) |
| B4-1305 | (A.3.15) | (O.27.64) |
| B4-1306 | (A.3.7) | (O.27.64) |
| B4-1307 | (A.3.9) | (O.27.64) |
| B4-1308 | (A.3.4) | (O.27.64) |
| B4-1309 | (A.3.28) | (O.27.64) |
| B4-1310 | (A.3.22) | (O.27.64) |
| B4-1311 | (A.3.23) | (O.27.64) |
| B4-1312 | (A.3.31) | (O.27.64) |
| B4-1313 | (G.5.1) | (O.27.64) |
| B4-1314 | (C.1.4) | (O.27.64) |
| B4-1315 | (C.1.5) | (O.27.64) |
| B4-1316 | (K.1.43) | (O.27.64) |
| B4-1317 | (K.1.41) | (O.27.64) |
| B4-1318 | (D.2.2) | (O.27.64) |
| B4-1319 | (G.3.1) | (O.27.64) |
| B4-1320 | (G.5.2) | (O.27.64) |
| B4-1321 | (G.5.3) | (O.27.64) |

TABLE B 4-continued

| Mixture | Co 2) | Co3) |
|---|---|---|
| B4-1322 | (B.1.4) | (O.27.64) |
| B4-1323 | (B.1.5) | (O.27.64) |
| B4-1324 | (B.1.23) | (O.27.64) |
| B4-1325 | (B.1.12) | (O.27.64) |
| B4-1326 | (D.1.4) | (O.27.64) |
| B4-1327 | (B.1.15) | (O.27.64) |
| B4-1328 | (B.1.25) | (O.27.64) |
| B4-1329 | (B.1.38) | (O.27.64) |
| B4-1330 | (B.1.28) | (O.27.64) |
| B4-1331 | (B.1.46) | (O.27.64) |
| B4-1332 | (B.1.10) | (O.27.64) |
| B4-1333 | (B.1.26) | (O.27.64) |
| B4-1334 | (F.1.5) | (O.27.64) |
| B4-1335 | (A.3.5) | (O.27.64) |
| B4-1336 | (A.4.12) | (O.27.64) |
| B4-1337 | (A.4.5) | (O.27.64) |
| B4-1338 | (H.2.9) | (O.27.64) |
| B4-1339 | (H.2.7) | (O.27.64) |
| B4-1340 | (D.1.2) | (O.27.64) |
| B4-1341 | (D.1.5) | (O.27.64) |
| B4-1342 | (G.3.7) | (O.27.64) |
| B4-1343 | (A.3.17) | (O.27.64) |
| B4-1344 | (B.1.44) | (O.27.64) |
| B4-1345 | (A.1.1) | (O.27.43) |
| B4-1346 | (A.1.17) | (O.27.43) |
| B4-1347 | (A.1.13) | (O.27.43) |
| B4-1348 | (A.1.14) | (O.27.43) |
| B4-1349 | (A.1.10) | (O.27.43) |
| B4-1350 | (A.1.25) | (O.27.43) |
| B4-1351 | (A.3.19) | (O.27.43) |
| B4-1352 | (A.3.16) | (O.27.43) |
| B4-1353 | (A.3.15) | (O.27.43) |
| B4-1354 | (A.3.7) | (O.27.43) |
| B4-1355 | (A.3.9) | (O.27.43) |
| B4-1356 | (A.3.4) | (O.27.43) |
| B4-1357 | (A.3.28) | (O.27.43) |
| B4-1358 | (A.3.22) | (O.27.43) |
| B4-1359 | (A.3.23) | (O.27.43) |
| B4-1360 | (A.3.31) | (O.27.43) |
| B4-1361 | (G.5.1) | (O.27.43) |
| B4-1362 | (C.1.4) | (O.27.43) |
| B4-1363 | (C.1.5) | (O.27.43) |
| B4-1364 | (K.1.43) | (O.27.43) |
| B4-1365 | (K.1.41) | (O.27.43) |
| B4-1366 | (D.2.2) | (O.27.43) |
| B4-1367 | (G.3.1) | (O.27.43) |
| B4-1368 | (G.5.2) | (O.27.43) |
| B4-1369 | (G.5.3) | (O.27.43) |
| B4-1370 | (B.1.4) | (O.27.43) |
| B4-1371 | (B.1.5) | (O.27.43) |
| B4-1372 | (B.1.23) | (O.27.43) |
| B4-1373 | (B.1.12) | (O.27.43) |
| B4-1374 | (D.1.4) | (O.27.43) |
| B4-1375 | (B.1.15) | (O.27.43) |
| B4-1376 | (B.1.25) | (O.27.43) |
| B4-1377 | (B.1.38) | (O.27.43) |
| B4-1378 | (B.1.28) | (O.27.43) |
| B4-1379 | (B.1.46) | (O.27.43) |
| B4-1380 | (B.1.10) | (O.27.43) |
| B4-1381 | (B.1.26) | (O.27.43) |
| B4-1382 | (F.1.5) | (O.27.43) |
| B4-1383 | (A.3.5) | (O.27.43) |
| B4-1384 | (A.4.12) | (O.27.43) |
| B4-1385 | (A.4.5) | (O.27.43) |
| B4-1386 | (H.2.9) | (O.27.43) |
| B4-1387 | (H.2.7) | (O.27.43) |
| B4-1388 | (D.1.2) | (O.27.43) |
| B4-1389 | (D.1.5) | (O.27.43) |
| B4-1390 | (G.3.7) | (O.27.43) |
| B4-1391 | (A.3.17) | (O.27.43) |
| B4-1392 | (B.1.44) | (O.27.43) |
| B4-1393 | (A.1.1) | (O.27.95) |
| B4-1394 | (A.1.17) | (O.27.95) |
| B4-1395 | (A.1.13) | (O.27.95) |
| B4-1396 | (A.1.14) | (O.27.95) |
| B4-1397 | (A.1.10) | (O.27.95) |
| B4-1398 | (A.1.25) | (O.27.95) |
| B4-1399 | (A.3.19) | (O.27.95) |

TABLE B 4-continued

| Mixture | Co 2) | Co3) |
|---|---|---|
| B4-1400 | (A.3.16) | (O.27.95) |
| B4-1401 | (A.3.15) | (O.27.95) |
| B4-1402 | (A.3.7) | (O.27.95) |
| B4-1403 | (A.3.9) | (O.27.95) |
| B4-1404 | (A.3.4) | (O.27.95) |
| B4-1405 | (A.3.28) | (O.27.95) |
| B4-1406 | (A.3.22) | (O.27.95) |
| B4-1407 | (A.3.23) | (O.27.95) |
| B4-1408 | (A.3.31) | (O.27.95) |
| B4-1409 | (G.5.1) | (O.27.95) |
| B4-1410 | (C.1.4) | (O.27.95) |
| B4-1411 | (C.1.5) | (O.27.95) |
| B4-1412 | (K.1.43) | (O.27.95) |
| B4-1413 | (K.1.41) | (O.27.95) |
| B4-1414 | (D.2.2) | (O.27.95) |
| B4-1415 | (G.3.1) | (O.27.95) |
| B4-1416 | (G.5.2) | (O.27.95) |
| B4-1417 | (G.5.3) | (O.27.95) |
| B4-1418 | (B.1.4) | (O.27.95) |
| B4-1419 | (B.1.5) | (O.27.95) |
| B4-1420 | (B.1.23) | (O.27.95) |
| B4-1421 | (B.1.12) | (O.27.95) |
| B4-1422 | (D.1.4) | (O.27.95) |
| B4-1423 | (B.1.15) | (O.27.95) |
| B4-1424 | (B.1.25) | (O.27.95) |
| B4-1425 | (B.1.38) | (O.27.95) |
| B4-1426 | (B.1.28) | (O.27.95) |
| B4-1427 | (B.1.46) | (O.27.95) |
| B4-1428 | (B.1.10) | (O.27.95) |
| B4-1429 | (B.1.26) | (O.27.95) |
| B4-1430 | (F.1.5) | (O.27.95) |
| B4-1431 | (A.3.5) | (O.27.95) |
| B4-1432 | (A.4.12) | (O.27.95) |
| B4-1433 | (A.4.5) | (O.27.95) |
| B4-1434 | (H.2.9) | (O.27.95) |
| B4-1435 | (H.2.7) | (O.27.95) |
| B4-1436 | (D.1.2) | (O.27.95) |
| B4-1437 | (D.1.5) | (O.27.95) |
| B4-1438 | (G.3.7) | (O.27.95) |
| B4-1439 | (A.3.17) | (O.27.95) |
| B4-1440 | (B.1.44) | (O.27.95) |
| B4-1441 | (A.1.1) | (L.3.10) |
| B4-1442 | (A.1.17) | (L.3.10) |
| B4-1443 | (A.1.13) | (L.3.10) |
| B4-1444 | (A.1.14) | (L.3.10) |
| B4-1445 | (A.1.10) | (L.3.10) |
| B4-1446 | (A.1.25) | (L.3.10) |
| B4-1447 | (A.3.19) | (L.3.10) |
| B4-1448 | (A.3.16) | (L.3.10) |
| B4-1449 | (A.3.15) | (L.3.10) |
| B4-1450 | (A.3.7) | (L.3.10) |
| B4-1451 | (A.3.9) | (L.3.10) |
| B4-1452 | (A.3.4) | (L.3.10) |
| B4-1453 | (A.3.28) | (L.3.10) |
| B4-1454 | (A.3.22) | (L.3.10) |
| B4-1455 | (A.3.23) | (L.3.10) |
| B4-1456 | (A.3.31) | (L.3.10) |
| B4-1457 | (G.5.1) | (L.3.10) |
| B4-1458 | (C.1.4) | (L.3.10) |
| B4-1459 | (C.1.5) | (L.3.10) |
| B4-1460 | (K.1.43) | (L.3.10) |
| B4-1461 | (K.1.41) | (L.3.10) |
| B4-1462 | (D.2.2) | (L.3.10) |
| B4-1463 | (G.3.1) | (L.3.10) |
| B4-1464 | (G.5.2) | (L.3.10) |
| B4-1465 | (G.5.3) | (L.3.10) |
| B4-1466 | (B.1.4) | (L.3.10) |
| B4-1467 | (B.1.5) | (L.3.10) |
| B4-1468 | (B.1.23) | (L.3.10) |
| B4-1469 | (B.1.12) | (L.3.10) |
| B4-1470 | (D.1.4) | (L.3.10) |
| B4-1471 | (B.1.15) | (L.3.10) |
| B4-1472 | (B.1.25) | (L.3.10) |
| B4-1473 | (B.1.38) | (L.3.10) |
| B4-1474 | (B.1.28) | (L.3.10) |
| B4-1475 | (B.1.46) | (L.3.10) |
| B4-1476 | (B.1.10) | (L.3.10) |
| B4-1477 | (B.1.26) | (L.3.10) |

TABLE B 4-continued

| Mixture | Co 2) | Co3) |
|---|---|---|
| B4-1478 | (F.1.5) | (L.3.10) |
| B4-1479 | (A.3.5) | (L.3.10) |
| B4-1480 | (A.4.12) | (L.3.10) |
| B4-1481 | (A.4.5) | (L.3.10) |
| B4-1482 | (H.2.9) | (L.3.10) |
| B4-1483 | (H.2.7) | (L.3.10) |
| B4-1484 | (D.1.2) | (L.3.10) |
| B4-1485 | (D.1.5) | (L.3.10) |
| B4-1486 | (G.3.7) | (L.3.10) |
| B4-1487 | (A.3.17) | (L.3.10) |
| B4-1488 | (B.1.44) | (L.3.10) |
| B4-1489 | (A.1.1) | (O.27.105) |
| B4-1490 | (A.1.17) | (O.27.105) |
| B4-1491 | (A.1.13) | (O.27.105) |
| B4-1492 | (A.1.14) | (O.27.105) |
| B4-1493 | (A.1.10) | (O.27.105) |
| B4-1494 | (A.1.25) | (O.27.105) |
| B4-1495 | (A.3.19) | (O.27.105) |
| B4-1496 | (A.3.16) | (O.27.105) |
| B4-1497 | (A.3.15) | (O.27.105) |
| B4-1498 | (A.3.7) | (O.27.105) |
| B4-1499 | (A.3.9) | (O.27.105) |
| B4-1500 | (A.3.4) | (O.27.105) |
| B4-1501 | (A.3.28) | (O.27.105) |
| B4-1502 | (A.3.22) | (O.27.105) |
| B4-1503 | (A.3.23) | (O.27.105) |
| B4-1504 | (A.3.31) | (O.27.105) |
| B4-1505 | (G.5.1) | (O.27.105) |
| B4-1506 | (C.1.4) | (O.27.105) |
| B4-1507 | (C.1.5) | (O.27.105) |
| B4-1508 | (K.1.43) | (O.27.105) |
| B4-1509 | (K.1.41) | (O.27.105) |
| B4-1510 | (D.2.2) | (O.27.105) |
| B4-1511 | (G.3.1) | (O.27.105) |
| B4-1512 | (G.5.2) | (O.27.105) |
| B4-1513 | (G.5.3) | (O.27.105) |
| B4-1514 | (B.1.4) | (O.27.105) |
| B4-1515 | (B.1.5) | (O.27.105) |
| B4-1516 | (B.1.23) | (O.27.105) |
| B4-1517 | (B.1.12) | (O.27.105) |
| B4-1518 | (D.1.4) | (O.27.105) |
| B4-1519 | (B.1.15) | (O.27.105) |
| B4-1520 | (B.1.25) | (O.27.105) |
| B4-1521 | (B.1.38) | (O.27.105) |
| B4-1522 | (B.1.28) | (O.27.105) |
| B4-1523 | (B.1.46) | (O.27.105) |
| B4-1524 | (B.1.10) | (O.27.105) |
| B4-1525 | (B.1.26) | (O.27.105) |
| B4-1526 | (F.1.5) | (O.27.105) |
| B4-1527 | (A.3.5) | (O.27.105) |
| B4-1528 | (A.4.12) | (O.27.105) |
| B4-1529 | (A.4.5) | (O.27.105) |
| B4-1530 | (H.2.9) | (O.27.105) |
| B4-1531 | (H.2.7) | (O.27.105) |
| B4-1532 | (D.1.2) | (O.27.105) |
| B4-1533 | (D.1.5) | (O.27.105) |
| B4-1534 | (G.3.7) | (O.27.105) |
| B4-1535 | (A.3.17) | (O.27.105) |
| B4-1536 | (B.1.44) | (O.27.105) |
| B4-1537 | (A.1.1) | (O.27.106) |
| B4-1538 | (A.1.17) | (O.27.106) |
| B4-1539 | (A.1.13) | (O.27.106) |
| B4-1540 | (A.1.14) | (O.27.106) |
| B4-1541 | (A.1.10) | (O.27.106) |
| B4-1542 | (A.1.25) | (O.27.106) |
| B4-1543 | (A.3.19) | (O.27.106) |
| B4-1544 | (A.3.16) | (O.27.106) |
| B4-1545 | (A.3.15) | (O.27.106) |
| B4-1546 | (A.3.7) | (O.27.106) |
| B4-1547 | (A.3.9) | (O.27.106) |
| B4-1548 | (A.3.4) | (O.27.106) |
| B4-1549 | (A.3.28) | (O.27.106) |
| B4-1550 | (A.3.22) | (O.27.106) |
| B4-1551 | (A.3.23) | (O.27.106) |
| B4-1552 | (A.3.31) | (O.27.106) |
| B4-1553 | (G.5.1) | (O.27.106) |
| B4-1554 | (C.1.4) | (O.27.106) |
| B4-1555 | (C.1.5) | (O.27.106) |

TABLE B 4-continued

| Mixture | Co 2) | Co3) |
|---|---|---|
| B4-1556 | (K.1.43) | (O.27.106) |
| B4-1557 | (K.1.41) | (O.27.106) |
| B4-1558 | (D.2.2) | (O.27.106) |
| B4-1559 | (G.3.1) | (O.27.106) |
| B4-1560 | (G.5.2) | (O.27.106) |
| B4-1561 | (G.5.3) | (O.27.106) |
| B4-1562 | (B.1.4) | (O.27.106) |
| B4-1563 | (B.1.5) | (O.27.106) |
| B4-1564 | (B.1.23) | (O.27.106) |
| B4-1565 | (B.1.12) | (O.27.106) |
| B4-1566 | (D.1.4) | (O.27.106) |
| B4-1567 | (B.1.15) | (O.27.106) |
| B4-1568 | (B.1.25) | (O.27.106) |
| B4-1569 | (B.1.38) | (O.27.106) |
| B4-1570 | (B.1.28) | (O.27.106) |
| B4-1571 | (B.1.46) | (O.27.106) |
| B4-1572 | (B.1.10) | (O.27.106) |
| B4-1573 | (B.1.26) | (O.27.106) |
| B4-1574 | (F.1.5) | (O.27.106) |
| B4-1575 | (A.3.5) | (O.27.106) |
| B4-1576 | (A.4.12) | (O.27.106) |
| B4-1577 | (A.4.5) | (O.27.106) |
| B4-1578 | (H.2.9) | (O.27.106) |
| B4-1579 | (H.2.7) | (O.27.106) |
| B4-1580 | (D.1.2) | (O.27.106) |
| B4-1581 | (D.1.5) | (O.27.106) |
| B4-1582 | (G.3.7) | (O.27.106) |
| B4-1583 | (A.3.17) | (O.27.106) |
| B4-1584 | (B.1.44) | (O.27.106) |
| B4-1585 | (A.1.1) | (O.1.21) |
| B4-1586 | (A.1.17) | (O.1.21) |
| B4-1587 | (A.1.13) | (O.1.21) |
| B4-1588 | (A.1.14) | (O.1.21) |
| B4-1589 | (A.1.10) | (O.1.21) |
| B4-1590 | (A.1.25) | (O.1.21) |
| B4-1591 | (A.3.19) | (O.1.21) |
| B4-1592 | (A.3.16) | (O.1.21) |
| B4-1593 | (A.3.15) | (O.1.21) |
| B4-1594 | (A.3.7) | (O.1.21) |
| B4-1595 | (A.3.9) | (O.1.21) |
| B4-1596 | (A.3.4) | (O.1.21) |
| B4-1597 | (A.3.28) | (O.1.21) |
| B4-1598 | (A.3.22) | (O.1.21) |
| B4-1599 | (A.3.23) | (O.1.21) |
| B4-1600 | (A.3.31) | (O.1.21) |
| B4-1601 | (G.5.1) | (O.1.21) |
| B4-1602 | (C.1.4) | (O.1.21) |
| B4-1603 | (C.1.5) | (O.1.21) |
| B4-1604 | (K.1.43) | (O.1.21) |
| B4-1605 | (K.1.41) | (O.1.21) |
| B4-1606 | (D.2.2) | (O.1.21) |
| B4-1607 | (G.3.1) | (O.1.21) |
| B4-1608 | (G.5.2) | (O.1.21) |
| B4-1609 | (G.5.3) | (O.1.21) |
| B4-1610 | (B.1.4) | (O.1.21) |
| B4-1611 | (B.1.5) | (O.1.21) |
| B4-1612 | (B.1.23) | (O.1.21) |
| B4-1613 | (B.1.12) | (O.1.21) |
| B4-1614 | (D.1.4) | (O.1.21) |
| B4-1615 | (B.1.15) | (O.1.21) |
| B4-1616 | (B.1.25) | (O.1.21) |
| B4-1617 | (B.1.38) | (O.1.21) |
| B4-1618 | (B.1.28) | (O.1.21) |
| B4-1619 | (B.1.46) | (O.1.21) |
| B4-1620 | (B.1.10) | (O.1.21) |
| B4-1621 | (B.1.26) | (O.1.21) |
| B4-1622 | (F.1.5) | (O.1.21) |
| B4-1623 | (A.3.5) | (O.1.21) |
| B4-1624 | (A.4.12) | (O.1.21) |
| B4-1625 | (A.4.5) | (O.1.21) |
| B4-1626 | (H.2.9) | (O.1.21) |
| B4-1627 | (H.2.7) | (O.1.21) |
| B4-1628 | (D.1.2) | (O.1.21) |
| B4-1629 | (D.1.5) | (O.1.21) |
| B4-1630 | (G.3.7) | (O.1.21) |
| B4-1631 | (A.3.17) | (O.1.21) |
| B4-1632 | (B.1.44) | (O.1.21) |
| B4-1633 | (A.1.1) | (O.6.1) |

TABLE B 4-continued

| Mixture | Co 2) | Co3) |
|---|---|---|
| B4-1634 | (A.1.17) | (O.6.1) |
| B4-1635 | (A.1.13) | (O.6.1) |
| B4-1636 | (A.1.14) | (O.6.1) |
| B4-1637 | (A.1.10) | (O.6.1) |
| B4-1638 | (A.1.25) | (O.6.1) |
| B4-1639 | (A.3.19) | (O.6.1) |
| B4-1640 | (A.3.16) | (O.6.1) |
| B4-1641 | (A.3.15) | (O.6.1) |
| B4-1642 | (A.3.7) | (O.6.1) |
| B4-1643 | (A.3.9) | (O.6.1) |
| B4-1644 | (A.3.4) | (O.6.1) |
| B4-1645 | (A.3.28) | (O.6.1) |
| B4-1646 | (A.3.22) | (O.6.1) |
| B4-1647 | (A.3.23) | (O.6.1) |
| B4-1648 | (A.3.31) | (O.6.1) |
| B4-1649 | (G.5.1) | (O.6.1) |
| B4-1650 | (C.1.4) | (O.6.1) |
| B4-1651 | (C.1.5) | (O.6.1) |
| B4-1652 | (K.1.43) | (O.6.1) |
| B4-1653 | (K.1.41) | (O.6.1) |
| B4-1654 | (D.2.2) | (O.6.1) |
| B4-1655 | (G.3.1) | (O.6.1) |
| B4-1656 | (G.5.2) | (O.6.1) |
| B4-1657 | (G.5.3) | (O.6.1) |
| B4-1658 | (B.1.4) | (O.6.1) |
| B4-1659 | (B.1.5) | (O.6.1) |
| B4-1660 | (B.1.23) | (O.6.1) |
| B4-1661 | (B.1.12) | (O.6.1) |
| B4-1662 | (D.1.4) | (O.6.1) |
| B4-1663 | (B.1.15) | (O.6.1) |
| B4-1664 | (B.1.25) | (O.6.1) |
| B4-1665 | (B.1.38) | (O.6.1) |
| B4-1666 | (B.1.28) | (O.6.1) |
| B4-1667 | (B.1.46) | (O.6.1) |
| B4-1668 | (B.1.10) | (O.6.1) |
| B4-1669 | (B.1.26) | (O.6.1) |
| B4-1670 | (F.1.5) | (O.6.1) |
| B4-1671 | (A.3.5) | (O.6.1) |
| B4-1672 | (A.4.12) | (O.6.1) |
| B4-1673 | (A.4.5) | (O.6.1) |
| B4-1674 | (H.2.9) | (O.6.1) |
| B4-1675 | (H.2.7) | (O.6.1) |
| B4-1676 | (D.1.2) | (O.6.1) |
| B4-1677 | (D.1.5) | (O.6.1) |
| B4-1678 | (G.3.7) | (O.6.1) |
| B4-1679 | (A.3.17) | (O.6.1) |
| B4-1680 | (B.1.44) | (O.6.1) |
| B4-1681 | (A.1.1) | (O.27.26) |
| B4-1682 | (A.1.17) | (O.27.26) |
| B4-1683 | (A.1.13) | (O.27.26) |
| B4-1684 | (A.1.14) | (O.27.26) |
| B4-1685 | (A.1.10) | (O.27.26) |
| B4-1686 | (A.1.25) | (O.27.26) |
| B4-1687 | (A.3.19) | (O.27.26) |
| B4-1688 | (A.3.16) | (O.27.26) |
| B4-1689 | (A.3.15) | (O.27.26) |
| B4-1690 | (A.3.7) | (O.27.26) |
| B4-1691 | (A.3.9) | (O.27.26) |
| B4-1692 | (A.3.4) | (O.27.26) |
| B4-1693 | (A.3.28) | (O.27.26) |
| B4-1694 | (A.3.22) | (O.27.26) |
| B4-1695 | (A.3.23) | (O.27.26) |
| B4-1696 | (A.3.31) | (O.27.26) |
| B4-1697 | (G.5.1) | (O.27.26) |
| B4-1698 | (C.1.4) | (O.27.26) |
| B4-1699 | (C.1.5) | (O.27.26) |
| B4-1700 | (K.1.43) | (O.27.26) |
| B4-1701 | (K.1.41) | (O.27.26) |
| B4-1702 | (D.2.2) | (O.27.26) |
| B4-1703 | (G.3.1) | (O.27.26) |
| B4-1704 | (G.5.2) | (O.27.26) |
| B4-1705 | (G.5.3) | (O.27.26) |
| B4-1706 | (B.1.4) | (O.27.26) |
| B4-1707 | (B.1.5) | (O.27.26) |
| B4-1708 | (B.1.23) | (O.27.26) |
| B4-1709 | (B.1.12) | (O.27.26) |
| B4-1710 | (D.1.4) | (O.27.26) |
| B4-1711 | (B.1.15) | (O.27.26) |

TABLE B 4-continued

| Mixture | Co 2) | Co3) |
|---|---|---|
| B4-1712 | (B.1.25) | (O.27.26) |
| B4-1713 | (B.1.38) | (O.27.26) |
| B4-1714 | (B.1.28) | (O.27.26) |
| B4-1715 | (B.1.46) | (O.27.26) |
| B4-1716 | (B.1.10) | (O.27.26) |
| B4-1717 | (B.1.26) | (O.27.26) |
| B4-1718 | (F.1.5) | (O.27.26) |
| B4-1719 | (A.3.5) | (O.27.26) |
| B4-1720 | (A.4.12) | (O.27.26) |
| B4-1721 | (A.4.5) | (O.27.26) |
| B4-1722 | (H.2.9) | (O.27.26) |
| B4-1723 | (H.2.7) | (O.27.26) |
| B4-1724 | (D.1.2) | (O.27.26) |
| B4-1725 | (D.1.5) | (O.27.26) |
| B4-1726 | (G.3.7) | (O.27.26) |
| B4-1727 | (A.3.17) | (O.27.26) |
| B4-1728 | (B.1.44) | (O.27.26) |
| B4-1729 | (A.1.1) | (L.3.32) |
| B4-1730 | (A.1.17) | (L.3.32) |
| B4-1731 | (A.1.13) | (L.3.32) |
| B4-1732 | (A.1.14) | (L.3.32) |
| B4-1733 | (A.1.10) | (L.3.32) |
| B4-1734 | (A.1.25) | (L.3.32) |
| B4-1735 | (A.3.19) | (L.3.32) |
| B4-1736 | (A.3.16) | (L.3.32) |
| B4-1737 | (A.3.15) | (L.3.32) |
| B4-1738 | (A.3.7) | (L.3.32) |
| B4-1739 | (A.3.9) | (L.3.32) |
| B4-1740 | (A.3.4) | (L.3.32) |
| B4-1741 | (A.3.28) | (L.3.32) |
| B4-1742 | (A.3.22) | (L.3.32) |
| B4-1743 | (A.3.23) | (L.3.32) |
| B4-1744 | (A.3.31) | (L.3.32) |
| B4-1745 | (G.5.1) | (L.3.32) |
| B4-1746 | (C.1.4) | (L.3.32) |
| B4-1747 | (C.1.5) | (L.3.32) |
| B4-1748 | (K.1.43) | (L.3.32) |
| B4-1749 | (K.1.41) | (L.3.32) |
| B4-1750 | (D.2.2) | (L.3.32) |
| B4-1751 | (G.3.1) | (L.3.32) |
| B4-1752 | (G.5.2) | (L.3.32) |
| B4-1753 | (G.5.3) | (L.3.32) |
| B4-1754 | (B.1.4) | (L.3.32) |
| B4-1755 | (B.1.5) | (L.3.32) |
| B4-1756 | (B.1.23) | (L.3.32) |
| B4-1757 | (B.1.12) | (L.3.32) |
| B4-1758 | (D.1.4) | (L.3.32) |
| B4-1759 | (B.1.15) | (L.3.32) |
| B4-1760 | (B.1.25) | (L.3.32) |
| B4-1761 | (B.1.38) | (L.3.32) |
| B4-1762 | (B.1.28) | (L.3.32) |
| B4-1763 | (B.1.46) | (L.3.32) |
| B4-1764 | (B.1.10) | (L.3.32) |
| B4-1765 | (B.1.26) | (L.3.32) |
| B4-1766 | (F.1.5) | (L.3.32) |
| B4-1767 | (A.3.5) | (L.3.32) |
| B4-1768 | (A.4.12) | (L.3.32) |
| B4-1769 | (A.4.5) | (L.3.32) |
| B4-1770 | (H.2.9) | (L.3.32) |
| B4-1771 | (H.2.7) | (L.3.32) |
| B4-1772 | (D.1.2) | (L.3.32) |
| B4-1773 | (D.1.5) | (L.3.32) |
| B4-1774 | (G.3.7) | (L.3.32) |
| B4-1775 | (A.3.17) | (L.3.32) |
| B4-1776 | (B.1.44) | (L.3.32) |
| B4-1777 | (A.1.1) | (L.3.12) |
| B4-1778 | (A.1.17) | (L.3.12) |
| B4-1779 | (A.1.13) | (L.3.12) |
| B4-1780 | (A.1.14) | (L.3.12) |
| B4-1781 | (A.1.10) | (L.3.12) |
| B4-1782 | (A.1.25) | (L.3.12) |
| B4-1783 | (A.3.19) | (L.3.12) |
| B4-1784 | (A.3.16) | (L.3.12) |
| B4-1785 | (A.3.15) | (L.3.12) |
| B4-1786 | (A.3.7) | (L.3.12) |
| B4-1787 | (A.3.9) | (L.3.12) |
| B4-1788 | (A.3.4) | (L.3.12) |
| B4-1789 | (A.3.28) | (L.3.12) |

TABLE B 4-continued

| Mixture | Co 2) | Co3) |
|---|---|---|
| B4-1790 | (A.3.22) | (L.3.12) |
| B4-1791 | (A.3.23) | (L.3.12) |
| B4-1792 | (A.3.31) | (L.3.12) |
| B4-1793 | (G.5.1) | (L.3.12) |
| B4-1794 | (C.1.4) | (L.3.12) |
| B4-1795 | (C.1.5) | (L.3.12) |
| B4-1796 | (K.1.43) | (L.3.12) |
| B4-1797 | (K.1.41) | (L.3.12) |
| B4-1798 | (D.2.2) | (L.3.12) |
| B4-1799 | (G.3.1) | (L.3.12) |
| B4-1800 | (G.5.2) | (L.3.12) |
| B4-1801 | (G.5.3) | (L.3.12) |
| B4-1802 | (B.1.4) | (L.3.12) |
| B4-1803 | (B.1.5) | (L.3.12) |
| B4-1804 | (B.1.23) | (L.3.12) |
| B4-1805 | (B.1.12) | (L.3.12) |
| B4-1806 | (D.1.4) | (L.3.12) |
| B4-1807 | (B.1.15) | (L.3.12) |
| B4-1808 | (B.1.25) | (L.3.12) |
| B4-1809 | (B.1.38) | (L.3.12) |
| B4-1810 | (B.1.28) | (L.3.12) |
| B4-1811 | (B.1.46) | (L.3.12) |
| B4-1812 | (B.1.10) | (L.3.12) |
| B4-1813 | (B.1.26) | (L.3.12) |
| B4-1814 | (F.1.5) | (L.3.12) |
| B4-1815 | (A.3.5) | (L.3.12) |
| B4-1816 | (A.4.12) | (L.3.12) |
| B4-1817 | (A.4.5) | (L.3.12) |
| B4-1818 | (H.2.9) | (L.3.12) |
| B4-1819 | (H.2.7) | (L.3.12) |
| B4-1820 | (D.1.2) | (L.3.12) |
| B4-1821 | (D.1.5) | (L.3.12) |
| B4-1822 | (G.3.7) | (L.3.12) |
| B4-1823 | (A.3.17) | (L.3.12) |
| B4-1824 | (B.1.44) | (L.3.12) |
| B4-1825 | (A.1.1) | (L.3.3) |
| B4-1826 | (A.1.17) | (L.3.3) |
| B4-1827 | (A.1.13) | (L.3.3) |
| B4-1828 | (A.1.14) | (L.3.3) |
| B4-1829 | (A.1.10) | (L.3.3) |
| B4-1830 | (A.1.25) | (L.3.3) |
| B4-1831 | (A.3.19) | (L.3.3) |
| B4-1832 | (A.3.16) | (L.3.3) |
| B4-1833 | (A.3.15) | (L.3.3) |
| B4-1834 | (A.3.7) | (L.3.3) |
| B4-1835 | (A.3.9) | (L.3.3) |
| B4-1836 | (A.3.4) | (L.3.3) |
| B4-1837 | (A.3.28) | (L.3.3) |
| B4-1838 | (A.3.22) | (L.3.3) |
| B4-1839 | (A.3.23) | (L.3.3) |
| B4-1840 | (A.3.31) | (L.3.3) |
| B4-1841 | (G.5.1) | (L.3.3) |
| B4-1842 | (C.1.4) | (L.3.3) |
| B4-1843 | (C.1.5) | (L.3.3) |
| B4-1844 | (K.1.43) | (L.3.3) |
| B4-1845 | (K.1.41) | (L.3.3) |
| B4-1846 | (D.2.2) | (L.3.3) |
| B4-1847 | (G.3.1) | (L.3.3) |
| B4-1848 | (G.5.2) | (L.3.3) |
| B4-1849 | (G.5.3) | (L.3.3) |
| B4-1850 | (B.1.4) | (L.3.3) |
| B4-1851 | (B.1.5) | (L.3.3) |
| B4-1852 | (B.1.23) | (L.3.3) |
| B4-1853 | (B.1.12) | (L.3.3) |
| B4-1854 | (D.1.4) | (L.3.3) |
| B4-1855 | (B.1.15) | (L.3.3) |
| B4-1856 | (B.1.25) | (L.3.3) |
| B4-1857 | (B.1.38) | (L.3.3) |
| B4-1858 | (B.1.28) | (L.3.3) |
| B4-1859 | (B.1.46) | (L.3.3) |
| B4-1860 | (B.1.10) | (L.3.3) |
| B4-1861 | (B.1.26) | (L.3.3) |
| B4-1862 | (F.1.5) | (L.3.3) |
| B4-1863 | (A.3.5) | (L.3.3) |
| B4-1864 | (A.4.12) | (L.3.3) |
| B4-1865 | (A.4.5) | (L.3.3) |
| B4-1866 | (H.2.9) | (L.3.3) |
| B4-1867 | (H.2.7) | (L.3.3) |

TABLE B 4-continued

| Mixture | Co 2) | Co3) |
|---|---|---|
| B4-1868 | (D.1.2) | (L.3.3) |
| B4-1869 | (D.1.5) | (L.3.3) |
| B4-1870 | (G.3.7) | (L.3.3) |
| B4-1871 | (A.3.17) | (L.3.3) |
| B4-1872 | (B.1.44) | (L.3.3) |
| B4-1873 | (A.1.1) | (L.1.5) |
| B4-1874 | (A.1.17) | (L.1.5) |
| B4-1875 | (A.1.13) | (L.1.5) |
| B4-1876 | (A.1.14) | (L.1.5) |
| B4-1877 | (A.1.10) | (L.1.5) |
| B4-1878 | (A.1.25) | (L.1.5) |
| B4-1879 | (A.3.19) | (L.1.5) |
| B4-1880 | (A.3.16) | (L.1.5) |
| B4-1881 | (A.3.15) | (L.1.5) |
| B4-1882 | (A.3.7) | (L.1.5) |
| B4-1883 | (A.3.9) | (L.1.5) |
| B4-1884 | (A.3.4) | (L.1.5) |
| B4-1885 | (A.3.28) | (L.1.5) |
| B4-1886 | (A.3.22) | (L.1.5) |
| B4-1887 | (A.3.23) | (L.1.5) |
| B4-1888 | (A.3.31) | (L.1.5) |
| B4-1889 | (G.5.1) | (L.1.5) |
| B4-1890 | (C.1.4) | (L.1.5) |
| B4-1891 | (C.1.5) | (L.1.5) |
| B4-1892 | (K.1.43) | (L.1.5) |
| B4-1893 | (K.1.41) | (L.1.5) |
| B4-1894 | (D.2.2) | (L.1.5) |
| B4-1895 | (G.3.1) | (L.1.5) |
| B4-1896 | (G.5.2) | (L.1.5) |
| B4-1897 | (G.5.3) | (L.1.5) |
| B4-1898 | (B.1.4) | (L.1.5) |
| B4-1899 | (B.1.5) | (L.1.5) |
| B4-1900 | (B.1.23) | (L.1.5) |
| B4-1901 | (B.1.12) | (L.1.5) |
| B4-1902 | (D.1.4) | (L.1.5) |
| B4-1903 | (B.1.15) | (L.1.5) |
| B4-1904 | (B.1.25) | (L.1.5) |
| B4-1905 | (B.1.38) | (L.1.5) |
| B4-1906 | (B.1.28) | (L.1.5) |
| B4-1907 | (B.1.46) | (L.1.5) |
| B4-1908 | (B.1.10) | (L.1.5) |
| B4-1909 | (B.1.26) | (L.1.5) |
| B4-1910 | (F.1.5) | (L.1.5) |
| B4-1911 | (A.3.5) | (L.1.5) |
| B4-1912 | (A.4.12) | (L.1.5) |
| B4-1913 | (A.4.5) | (L.1.5) |
| B4-1914 | (H.2.9) | (L.1.5) |
| B4-1915 | (H.2.7) | (L.1.5) |
| B4-1916 | (D.1.2) | (L.1.5) |
| B4-1917 | (D.1.5) | (L.1.5) |
| B4-1918 | (G.3.7) | (L.1.5) |
| B4-1919 | (A.3.17) | (L.1.5) |
| B4-1920 | (B.1.44) | (L.1.5) |
| B4-1921 | (A.1.1) | (O.27.17) |
| B4-1922 | (A.1.17) | (O.27.17) |
| B4-1923 | (A.1.13) | (O.27.17) |
| B4-1924 | (A.1.14) | (O.27.17) |
| B4-1925 | (A.1.10) | (O.27.17) |
| B4-1926 | (A.1.25) | (O.27.17) |
| B4-1927 | (A.3.19) | (O.27.17) |
| B4-1928 | (A.3.16) | (O.27.17) |
| B4-1929 | (A.3.15) | (O.27.17) |
| B4-1930 | (A.3.7) | (O.27.17) |
| B4-1931 | (A.3.9) | (O.27.17) |
| B4-1932 | (A.3.4) | (O.27.17) |
| B4-1933 | (A.3.28) | (O.27.17) |
| B4-1934 | (A.3.22) | (O.27.17) |
| B4-1935 | (A.3.23) | (O.27.17) |
| B4-1936 | (A.3.31) | (O.27.17) |
| B4-1937 | (G.5.1) | (O.27.17) |
| B4-1938 | (C.1.4) | (O.27.17) |
| B4-1939 | (C.1.5) | (O.27.17) |
| B4-1940 | (K.1.43) | (O.27.17) |
| B4-1941 | (K.1.41) | (O.27.17) |
| B4-1942 | (D.2.2) | (O.27.17) |
| B4-1943 | (G.3.1) | (O.27.17) |
| B4-1944 | (G.5.2) | (O.27.17) |
| B4-1945 | (G.5.3) | (O.27.17) |

TABLE B 4-continued

| Mixture | Co 2) | Co3) |
|---|---|---|
| B4-1946 | (B.1.4) | (O.27.17) |
| B4-1947 | (B.1.5) | (O.27.17) |
| B4-1948 | (B.1.23) | (O.27.17) |
| B4-1949 | (B.1.12) | (O.27.17) |
| B4-1950 | (D.1.4) | (O.27.17) |
| B4-1951 | (B.1.15) | (O.27.17) |
| B4-1952 | (B.1.25) | (O.27.17) |
| B4-1953 | (B.1.38) | (O.27.17) |
| B4-1954 | (B.1.28) | (O.27.17) |
| B4-1955 | (B.1.46) | (O.27.17) |
| B4-1956 | (B.1.10) | (O.27.17) |
| B4-1957 | (B.1.26) | (O.27.17) |
| B4-1958 | (F.1.5) | (O.27.17) |
| B4-1959 | (A.3.5) | (O.27.17) |
| B4-1960 | (A.4.12) | (O.27.17) |
| B4-1961 | (A.4.5) | (O.27.17) |
| B4-1962 | (H.2.9) | (O.27.17) |
| B4-1963 | (H.2.7) | (O.27.17) |
| B4-1964 | (D.1.2) | (O.27.17) |
| B4-1965 | (D.1.5) | (O.27.17) |
| B4-1966 | (G.3.7) | (O.27.17) |
| B4-1967 | (A.3.17) | (O.27.17) |
| B4-1968 | (B.1.44) | (O.27.17) |
| B4-1969 | (A.1.1) | L.3.16) |
| B4-1970 | (A.1.17) | L.3.16) |
| B4-1971 | (A.1.13) | L.3.16) |
| B4-1972 | (A.1.14) | L.3.16) |
| B4-1973 | (A.1.10) | L.3.16) |
| B4-1974 | (A.1.25) | L.3.16) |
| B4-1975 | (A.3.19) | L.3.16) |
| B4-1976 | (A.3.16) | L.3.16) |
| B4-1977 | (A.3.15) | L.3.16) |
| B4-1978 | (A.3.7) | L.3.16) |
| B4-1979 | (A.3.9) | L.3.16) |
| B4-1980 | (A.3.4) | L.3.16) |
| B4-1981 | (A.3.28) | L.3.16) |
| B4-1982 | (A.3.22) | L.3.16) |
| B4-1983 | (A.3.23) | L.3.16) |
| B4-1984 | (A.3.31) | L.3.16) |
| B4-1985 | (G.5.1) | L.3.16) |
| B4-1986 | (C.1.4) | L.3.16) |
| B4-1987 | (C.1.5) | L.3.16) |
| B4-1988 | (K.1.43) | L.3.16) |
| B4-1989 | (K.1.41) | L.3.16) |
| B4-1990 | (D.2.2) | L.3.16) |
| B4-1991 | (G.3.1) | L.3.16) |
| B4-1992 | (G.5.2) | L.3.16) |
| B4-1993 | (G.5.3) | L.3.16) |
| B4-1994 | (B.1.4) | L.3.16) |
| B4-1995 | (B.1.5) | L.3.16) |
| B4-1996 | (B.1.23) | L.3.16) |
| B4-1997 | (B.1.12) | L.3.16) |
| B4-1998 | (D.1.4) | L.3.16) |
| B4-1999 | (B.1.15) | L.3.16) |
| B4-2000 | (B.1.25) | L.3.16) |
| B4-2001 | (B.1.38) | L.3.16) |
| B4-2002 | (B.1.28) | L.3.16) |
| B4-2003 | (B.1.46) | L.3.16) |
| B4-2004 | (B.1.10) | L.3.16) |
| B4-2005 | (B.1.26) | L.3.16) |
| B4-2006 | (F.1.5) | L.3.16) |
| B4-2007 | (A.3.5) | L.3.16) |
| B4-2008 | (A.4.12) | L.3.16) |
| B4-2009 | (A.4.5) | L.3.16) |
| B4-2010 | (H.2.9) | L.3.16) |
| B4-2011 | (H.2.7) | L.3.16) |
| B4-2012 | (D.1.2) | L.3.16) |
| B4-2013 | (D.1.5) | L.3.16) |
| B4-2014 | (G.3.7) | L.3.16) |
| B4-2015 | (A.3.17) | L.3.16) |
| B4-2016 | (B.1.44) | L.3.16) |
| B4-2017 | (A.1.1) | mixture of Bacillus licheniformis and (L.1.12) |
| B4-2018 | (A.1.17) | mixture of Bacillus licheniformis and (L.1.12) |
| B4-2019 | (A.1.13) | mixture of Bacillus licheniformis and (L.1.12) |

TABLE B 4-continued

| Mixture | Co 2) | Co3) |
|---|---|---|
| B4-2020 | (A.1.14) | mixture of Bacillus licheniformis and (L.1.12) |
| B4-2021 | (A.1.10) | mixture of Bacillus licheniformis and (L.1.12) |
| B4-2022 | (A.1.25) | mixture of Bacillus licheniformis and (L.1.12) |
| B4-2023 | (A.3.19) | mixture of Bacillus licheniformis and (L.1.12) |
| B4-2024 | (A.3.16) | mixture of Bacillus licheniformis and (L.1.12) |
| B4-2025 | (A.3.15) | mixture of Bacillus licheniformis and (L.1.12) |
| B4-2026 | (A.3.7) | mixture of Bacillus licheniformis and (L.1.12) |
| B4-2027 | (A.3.9) | mixture of Bacillus licheniformis and (L.1.12) |
| B4-2028 | (A.3.4) | mixture of Bacillus licheniformis and (L.1.12) |
| B4-2029 | (A.3.28) | mixture of Bacillus licheniformis and (L.1.12) |
| B4-2030 | (A.3.22) | mixture of Bacillus licheniformis and (L.1.12) |
| B4-2031 | (A.3.23) | mixture of Bacillus licheniformis and (L.1.12) |
| B4-2032 | (A.3.31) | mixture of Bacillus licheniformis and (L.1.12) |
| B4-2033 | (G.5.1) | mixture of Bacillus licheniformis and (L.1.12) |
| B4-2034 | (C.1.4) | mixture of Bacillus licheniformis and (L.1.12) |
| B4-2035 | (C.1.5) | mixture of Bacillus licheniformis and (L.1.12) |
| B4-2036 | (K.1.43) | mixture of Bacillus licheniformis and (L.1.12) |
| B4-2037 | (K.1.41) | mixture of Bacillus licheniformis and (L.1.12) |
| B4-2038 | (D.2.2) | mixture of Bacillus licheniformis and (L.1.12) |
| B4-2039 | (G.3.1) | mixture of Bacillus licheniformis and (L.1.12) |
| B4-2040 | (G.5.2) | mixture of Bacillus licheniformis and (L.1.12) |
| B4-2041 | (G.5.3) | mixture of Bacillus licheniformis and (L.1.12) |
| B4-2042 | (B.1.4) | mixture of Bacillus licheniformis and (L.1.12) |
| B4-2043 | (B.1.5) | mixture of Bacillus licheniformis and (L.1.12) |
| B4-2044 | (B.1.23) | mixture of Bacillus licheniformis and (L.1.12) |
| B4-2045 | (B.1.12) | mixture of Bacillus licheniformis and (L.1.12) |
| B4-2046 | (D.1.4) | mixture of Bacillus licheniformis and (L.1.12) |
| B4-2047 | (B.1.15) | mixture of Bacillus licheniformis and (L.1.12) |
| B4-2048 | (B.1.25) | mixture of Bacillus licheniformis and (L.1.12) |
| B4-2049 | (B.1.38) | mixture of Bacillus licheniformis and (L.1.12) |
| B4-2050 | (B.1.28) | mixture of Bacillus licheniformis and (L.1.12) |
| B4-2051 | (B.1.46) | mixture of Bacillus licheniformis and (L.1.12) |
| B4-2052 | (B.1.10) | mixture of Bacillus licheniformis and (L.1.12) |
| B4-2053 | (B.1.26) | mixture of Bacillus licheniformis and (L.1.12) |
| B4-2054 | (F.1.5) | mixture of Bacillus licheniformis and (L.1.12) |
| B4-2055 | (A.3.5) | mixture of Bacillus licheniformis and (L.1.12) |
| B4-2056 | (A.4.12) | mixture of Bacillus licheniformis and (L.1.12) |
| B4-2057 | (A.4.5) | mixture of Bacillus licheniformis and (L.1.12) |
| B4-2058 | (H.2.9) | mixture of Bacillus licheniformis and (L.1.12) |

TABLE B 4-continued

| Mixture | Co 2) | Co3) |
|---|---|---|
| B4-2059 | (H.2.7) | mixture of Bacillus licheniformis and (L.1.12) |
| B4-2060 | (D.1.2) | mixture of Bacillus licheniformis and (L.1.12) |
| B4-2061 | (D.1.5) | mixture of Bacillus licheniformis and (L.1.12) |
| B4-2062 | (G.3.7) | mixture of Bacillus licheniformis and (L.1.12) |
| B4-2063 | (A.3.17) | mixture of Bacillus licheniformis and (L.1.12) |
| B4-2064 | (B.1.44) | mixture of Bacillus licheniformis and (L.1.12) |
| B4-2065 | (A.1.1) | (O.27.105) |
| B4-2066 | (A.1.17) | (O.27.105) |
| B4-2067 | (A.1.13) | (O.27.105) |
| B4-2068 | (A.1.14) | (O.27.105) |
| B4-2069 | (A.1.10) | (O.27.105) |
| B4-2070 | (A.1.25) | (O.27.105) |
| B4-2071 | (A.3.19) | (O.27.105) |
| B4-2072 | (A.3.16) | (O.27.105) |
| B4-2073 | (A.3.15) | (O.27.105) |
| B4-2074 | (A.3.7) | (O.27.105) |
| B4-2075 | (A.3.9) | (O.27.105) |
| B4-2076 | (A.3.4) | (O.27.105) |
| B4-2077 | (A.3.28) | (O.27.105) |
| B4-2078 | (A.3.22) | (O.27.105) |
| B4-2079 | (A.3.23) | (O.27.105) |
| B4-2080 | (A.3.31) | (O.27.105) |
| B4-2081 | (G.5.1) | (O.27.105) |
| B4-2082 | (C.1.4) | (O.27.105) |
| B4-2083 | (C.1.5) | (O.27.105) |
| B4-2084 | (K.1.43) | (O.27.105) |
| B4-2085 | (K.1.41) | (O.27.105) |
| B4-2086 | (D.2.2) | (O.27.105) |
| B4-2087 | (G.3.1) | (O.27.105) |
| B4-2088 | (G.5.2) | (O.27.105) |
| B4-2089 | (G.5.3) | (O.27.105) |
| B4-2090 | (B.1.4) | (O.27.105) |
| B4-2091 | (B.1.5) | (O.27.105) |
| B4-2092 | (B.1.23) | (O.27.105) |
| B4-2093 | (B.1.12) | (O.27.105) |
| B4-2094 | (D.1.4) | (O.27.105) |
| B4-2095 | (B.1.15) | (O.27.105) |
| B4-2096 | (B.1.25) | (O.27.105) |
| B4-2097 | (B.1.38) | (O.27.105) |
| B4-2098 | (B.1.28) | (O.27.105) |
| B4-2099 | (B.1.46) | (O.27.105) |
| B4-2100 | (B.1.10) | (O.27.105) |
| B4-2101 | (B.1.26) | (O.27.105) |
| B4-2102 | (F.1.5) | (O.27.105) |
| B4-2103 | (A.3.5) | (O.27.105) |
| B4-2104 | (A.4.12) | (O.27.105) |
| B4-2105 | (A.4.5) | (O.27.105) |
| B4-2106 | (H.2.9) | (O.27.105) |
| B4-2107 | (H.2.7) | (O.27.105) |
| B4-2108 | (D.1.2) | (O.27.105) |
| B4-2109 | (D.1.5) | (O.27.105) |
| B4-2110 | (G.3.7) | (O.27.105) |
| B4-2111 | (A.3.17) | (O.27.105) |
| B4-2112 | (B.1.44) | (O.27.105) |
| B4-2113 | (A.1.1) | mixture of (L.1.5) and (L.4.8) |
| B4-2114 | (A.1.17) | mixture of (L.1.5) and (L.4.8) |
| B4-2115 | (A.1.13) | mixture of (L.1.5) and (L.4.8) |
| B4-2116 | (A.1.14) | mixture of (L.1.5) and (L.4.8) |
| B4-2117 | (A.1.10) | mixture of (L.1.5) and (L.4.8) |
| B4-2118 | (A.1.25) | mixture of (L.1.5) and (L.4.8) |
| B4-2119 | (A.3.19) | mixture of (L.1.5) and (L.4.8) |
| B4-2120 | (A.3.16) | mixture of (L.1.5) and (L.4.8) |
| B4-2121 | (A.3.15) | mixture of (L.1.5) and (L.4.8) |
| B4-2122 | (A.3.7) | mixture of (L.1.5) and (L.4.8) |
| B4-2123 | (A.3.9) | mixture of (L.1.5) and (L.4.8) |
| B4-2124 | (A.3.4) | mixture of (L.1.5) and (L.4.8) |
| B4-2125 | (A.3.28) | mixture of (L.1.5) and (L.4.8) |
| B4-2126 | (A.3.22) | mixture of (L.1.5) and (L.4.8) |
| B4-2127 | (A.3.23) | mixture of (L.1.5) and (L.4.8) |
| B4-2128 | (A.3.31) | mixture of (L.1.5) and (L.4.8) |
| B4-2129 | (G.5.1) | mixture of (L.1.5) and (L.4.8) |
| B4-2130 | (C.1.4) | mixture of (L.1.5) and (L.4.8) |
| B4-2131 | (C.1.5) | mixture of (L.1.5) and (L.4.8) |
| B4-2132 | (K.1.43) | mixture of (L.1.5) and (L.4.8) |
| B4-2133 | (K.1.41) | mixture of (L.1.5) and (L.4.8) |
| B4-2134 | (D.2.2) | mixture of (L.1.5) and (L.4.8) |
| B4-2135 | (G.3.1) | mixture of (L.1.5) and (L.4.8) |
| B4-2136 | (G.5.2) | mixture of (L.1.5) and (L.4.8) |
| B4-2137 | (G.5.3) | mixture of (L.1.5) and (L.4.8) |
| B4-2138 | (B.1.4) | mixture of (L.1.5) and (L.4.8) |
| B4-2139 | (B.1.5) | mixture of (L.1.5) and (L.4.8) |
| B4-2140 | (B.1.23) | mixture of (L.1.5) and (L.4.8) |
| B4-2141 | (B.1.12) | mixture of (L.1.5) and (L.4.8) |
| B4-2142 | (D.1.4) | mixture of (L.1.5) and (L.4.8) |
| B4-2143 | (B.1.15) | mixture of (L.1.5) and (L.4.8) |
| B4-2144 | (B.1.25) | mixture of (L.1.5) and (L.4.8) |
| B4-2145 | (B.1.38) | mixture of (L.1.5) and (L.4.8) |
| B4-2146 | (B.1.28) | mixture of (L.1.5) and (L.4.8) |
| B4-2147 | (B.1.46) | mixture of (L.1.5) and (L.4.8) |
| B4-2148 | (B.1.10) | mixture of (L.1.5) and (L.4.8) |
| B4-2149 | (B.1.26) | mixture of (L.1.5) and (L.4.8) |
| B4-2150 | (F.1.5) | mixture of (L.1.5) and (L.4.8) |
| B4-2151 | (A.3.5) | mixture of (L.1.5) and (L.4.8) |
| B4-2152 | (A.4.12) | mixture of (L.1.5) and (L.4.8) |
| B4-2153 | (A.4.5) | mixture of (L.1.5) and (L.4.8) |
| B4-2154 | (H.2.9) | mixture of (L.1.5) and (L.4.8) |
| B4-2155 | (H.2.7) | mixture of (L.1.5) and (L.4.8) |
| B4-2156 | (D.1.2) | mixture of (L.1.5) and (L.4.8) |
| B4-2157 | (D.1.5) | mixture of (L.1.5) and (L.4.8) |
| B4-2158 | (G.3.7) | mixture of (L.1.5) and (L.4.8) |
| B4-2159 | (A.3.17) | mixture of (L.1.5) and (L.4.8) |
| B4-2160 | (B.1.44) | mixture of (L.1.5) and (L.4.8) |
| B4-2161 | (O.2.4) | (O.1.21) |
| B4-2162 | (O.27.7) | (O.1.21) |
| B4-2163 | (O.27.76) | (O.1.21) |
| B4-2164 | (O.4.2) | (O.1.21) |
| B4-2165 | (O.4.8) | (O.1.21) |
| B4-2166 | (O.4.1) | (O.1.21) |
| B4-2167 | (O.4.4) | (O.1.21) |
| B4-2168 | (O.4.5) | (O.1.21) |
| B4-2169 | (O.4.7) | (O.1.21) |
| B4-2170 | (O.27.25) | (O.1.21) |
| B4-2171 | (O.27.18) | (O.1.21) |
| B4-2172 | (O.27.11) | (O.1.21) |
| B4-2173 | (O.27.27) | (O.1.21) |
| B4-2174 | (O.3.43) | (O.1.21) |
| B4-2175 | (O.3.5) | (O.1.21) |
| B4-2176 | (O.3.15) | (O.1.21) |
| B4-2177 | (O.26.4) | (O.1.21) |
| B4-2178 | (O.26.5) | (O.1.21) |
| B4-2179 | (O.1.21) | (O.1.21) |
| B4-2180 | (O.1.15) | (O.1.21) |
| B4-2181 | (O.27.41) | (O.1.21) |
| B4-2182 | (O.1.27) | (O.1.21) |
| B4-2183 | (O.27.101) | (O.1.21) |
| B4-2184 | (O.27.103) | (O.1.21) |
| B4-2185 | (O.27.44) | (O.1.21) |
| B4-2186 | (O.27.104) | (O.1.21) |
| B4-2187 | (O.27.63) | (O.1.21) |
| B4-2188 | (O.27.64) | (O.1.21) |
| B4-2189 | (O.27.43) | (O.1.21) |
| B4-2190 | (O.27.95) | (O.1.21) |
| B4-2191 | (L.3.10) | (O.1.21) |
| B4-2192 | (O.27.105) | (O.1.21) |
| B4-2193 | (O.27.106) | (O.1.21) |
| B4-2194 | (O.2.4) | (O.6.1) |
| B4-2195 | (O.27.7) | (O.6.1) |
| B4-2196 | (O.27.76) | (O.6.1) |
| B4-2197 | (O.4.2) | (O.6.1) |
| B4-2198 | (O.4.8) | (O.6.1) |
| B4-2199 | (O.4.1) | (O.6.1) |
| B4-2200 | (O.4.4) | (O.6.1) |
| B4-2201 | (O.4.5) | (O.6.1) |
| B4-2202 | (O.4.7) | (O.6.1) |
| B4-2203 | (O.27.25) | (O.6.1) |
| B4-2204 | (O.27.18) | (O.6.1) |
| B4-2205 | (O.27.11) | (O.6.1) |
| B4-2206 | (O.27.27) | (O.6.1) |
| B4-2207 | (O.3.43) | (O.6.1) |
| B4-2208 | (O.3.5) | (O.6.1) |

TABLE B 4-continued

| Mixture | Co 2) | Co3) |
|---|---|---|
| B4-2209 | (O.3.15) | (O.6.1) |
| B4-2210 | (O.26.4) | (O.6.1) |
| B4-2211 | (O.26.5) | (O.6.1) |
| B4-2212 | (O.1.21) | (O.6.1) |
| B4-2213 | (O.1.15) | (O.6.1) |
| B4-2214 | (O.27.41) | (O.6.1) |
| B4-2215 | (O.1.27) | (O.6.1) |
| B4-2216 | (O.27.101) | (O.6.1) |
| B4-2217 | (O.27.103) | (O.6.1) |
| B4-2218 | (O.27.44) | (O.6.1) |
| B4-2219 | (O.27.104) | (O.6.1) |
| B4-2220 | (O.27.63) | (O.6.1) |
| B4-2221 | (O.27.64) | (O.6.1) |
| B4-2222 | (O.27.43) | (O.6.1) |
| B4-2223 | (O.27.95) | (O.6.1) |
| B4-2224 | (L.3.10) | (O.6.1) |
| B4-2225 | (O.27.105) | (O.6.1) |
| B4-2226 | (O.27.106) | (O.6.1) |
| B4-2227 | (O.2.4) | (O.27.26) |
| B4-2228 | (O.27.7) | (O.27.26) |
| B4-2229 | (O.27.76) | (O.27.26) |
| B4-2230 | (O.4.2) | (O.27.26) |
| B4-2231 | (O.4.8) | (O.27.26) |
| B4-2232 | (O.4.1) | (O.27.26) |
| B4-2233 | (O.4.4) | (O.27.26) |
| B4-2234 | (O.4.5) | (O.27.26) |
| B4-2235 | (O.4.7) | (O.27.26) |
| B4-2236 | (O.27.25) | (O.27.26) |
| B4-2237 | (O.27.18) | (O.27.26) |
| B4-2238 | (O.27.11) | (O.27.26) |
| B4-2239 | (O.27.27) | (O.27.26) |
| B4-2240 | (O.3.43) | (O.27.26) |
| B4-2241 | (O.3.5) | (O.27.26) |
| B4-2242 | (O.3.15) | (O.27.26) |
| B4-2243 | (O.26.4) | (O.27.26) |
| B4-2244 | (O.26.5) | (O.27.26) |
| B4-2245 | (O.1.21) | (O.27.26) |
| B4-2246 | (O.1.15) | (O.27.26) |
| B4-2247 | (O.27.41) | (O.27.26) |
| B4-2248 | (O.1.27) | (O.27.26) |
| B4-2249 | (O.27.101) | (O.27.26) |
| B4-2250 | (O.27.103) | (O.27.26) |
| B4-2251 | (O.27.44) | (O.27.26) |
| B4-2252 | (O.27.104) | (O.27.26) |
| B4-2253 | (O.27.63) | (O.27.26) |
| B4-2254 | (O.27.64) | (O.27.26) |
| B4-2255 | (O.27.43) | (O.27.26) |
| B4-2256 | (O.27.95) | (O.27.26) |
| B4-2257 | (L.3.10) | (O.27.26) |
| B4-2258 | (O.27.105) | (O.27.26) |
| B4-2259 | (O.27.106) | (O.27.26) |
| B4-2260 | (O.2.4) | (L.3.32) |
| B4-2261 | (O.27.7) | (L.3.32) |
| B4-2262 | (O.27.76) | (L.3.32) |
| B4-2263 | (O.4.2) | (L.3.32) |
| B4-2264 | (O.4.8) | (L.3.32) |
| B4-2265 | (O.4.1) | (L.3.32) |
| B4-2266 | (O.4.4) | (L.3.32) |
| B4-2267 | (O.4.5) | (L.3.32) |
| B4-2268 | (O.4.7) | (L.3.32) |
| B4-2269 | (O.27.25) | (L.3.32) |
| B4-2270 | (O.27.18) | (L.3.32) |
| B4-2271 | (O.27.11) | (L.3.32) |
| B4-2272 | (O.27.27) | (L.3.32) |
| B4-2273 | (O.3.43) | (L.3.32) |
| B4-2274 | (O.3.5) | (L.3.32) |
| B4-2275 | (O.3.15) | (L.3.32) |
| B4-2276 | (O.26.4) | (L.3.32) |
| B4-2277 | (O.26.5) | (L.3.32) |
| B4-2278 | (O.1.21) | (L.3.32) |
| B4-2279 | (O.1.15) | (L.3.32) |
| B4-2280 | (O.27.41) | (L.3.32) |
| B4-2281 | (O.1.27) | (L.3.32) |
| B4-2282 | (O.27.101) | (L.3.32) |
| B4-2283 | (O.27.103) | (L.3.32) |
| B4-2284 | (O.27.44) | (L.3.32) |
| B4-2285 | (O.27.104) | (L.3.32) |
| B4-2286 | (O.27.63) | (L.3.32) |
| B4-2287 | (O.27.64) | (L.3.32) |
| B4-2288 | (O.27.43) | (L.3.32) |
| B4-2289 | (O.27.95) | (L.3.32) |
| B4-2290 | (L.3.10) | (L.3.32) |
| B4-2291 | (O.27.105) | (L.3.32) |
| B4-2292 | (O.27.106) | (L.3.32) |
| B4-2293 | (O.2.4) | (L.3.12) |
| B4-2294 | (O.27.7) | (L.3.12) |
| B4-2295 | (O.27.76) | (L.3.12) |
| B4-2296 | (O.4.2) | (L.3.12) |
| B4-2297 | (O.4.8) | (L.3.12) |
| B4-2298 | (O.4.1) | (L.3.12) |
| B4-2299 | (O.4.4) | (L.3.12) |
| B4-2300 | (O.4.5) | (L.3.12) |
| B4-2301 | (O.4.7) | (L.3.12) |
| B4-2302 | (O.27.25) | (L.3.12) |
| B4-2303 | (O.27.18) | (L.3.12) |
| B4-2304 | (O.27.11) | (L.3.12) |
| B4-2305 | (O.27.27) | (L.3.12) |
| B4-2306 | (O.3.43) | (L.3.12) |
| B4-2307 | (O.3.5) | (L.3.12) |
| B4-2308 | (O.3.15) | (L.3.12) |
| B4-2309 | (O.26.4) | (L.3.12) |
| B4-2310 | (O.26.5) | (L.3.12) |
| B4-2311 | (O.1.21) | (L.3.12) |
| B4-2312 | (O.1.15) | (L.3.12) |
| B4-2313 | (O.27.41) | (L.3.12) |
| B4-2314 | (O.1.27) | (L.3.12) |
| B4-2315 | (O.27.101) | (L.3.12) |
| B4-2316 | (O.27.103) | (L.3.12) |
| B4-2317 | (O.27.44) | (L.3.12) |
| B4-2318 | (O.27.104) | (L.3.12) |
| B4-2319 | (O.27.63) | (L.3.12) |
| B4-2320 | (O.27.64) | (L.3.12) |
| B4-2321 | (O.27.43) | (L.3.12) |
| B4-2322 | (O.27.95) | (L.3.12) |
| B4-2323 | (L.3.10) | (L.3.12) |
| B4-2324 | (O.27.105) | (L.3.12) |
| B4-2325 | (O.27.106) | (L.3.12) |
| B4-2326 | (O.2.4) | (L.3.3) |
| B4-2327 | (O.27.7) | (L.3.3) |
| B4-2328 | (O.27.76) | (L.3.3) |
| B4-2329 | (O.4.2) | (L.3.3) |
| B4-2330 | (O.4.8) | (L.3.3) |
| B4-2331 | (O.4.1) | (L.3.3) |
| B4-2332 | (O.4.4) | (L.3.3) |
| B4-2333 | (O.4.5) | (L.3.3) |
| B4-2334 | (O.4.7) | (L.3.3) |
| B4-2335 | (O.27.25) | (L.3.3) |
| B4-2336 | (O.27.18) | (L.3.3) |
| B4-2337 | (O.27.11) | (L.3.3) |
| B4-2338 | (O.27.27) | (L.3.3) |
| B4-2339 | (O.3.43) | (L.3.3) |
| B4-2340 | (O.3.5) | (L.3.3) |
| B4-2341 | (O.3.15) | (L.3.3) |
| B4-2342 | (O.26.4) | (L.3.3) |
| B4-2343 | (O.26.5) | (L.3.3) |
| B4-2344 | (O.1.21) | (L.3.3) |
| B4-2345 | (O.1.15) | (L.3.3) |
| B4-2346 | (O.27.41) | (L.3.3) |
| B4-2347 | (O.1.27) | (L.3.3) |
| B4-2348 | (O.27.101) | (L.3.3) |
| B4-2349 | (O.27.103) | (L.3.3) |
| B4-2350 | (O.27.44) | (L.3.3) |
| B4-2351 | (O.27.104) | (L.3.3) |
| B4-2352 | (O.27.63) | (L.3.3) |
| B4-2353 | (O.27.64) | (L.3.3) |
| B4-2354 | (O.27.43) | (L.3.3) |
| B4-2355 | (O.27.95) | (L.3.3) |
| B4-2356 | (L.3.10) | (L.3.3) |
| B4-2357 | (O.27.105) | (L.3.3) |
| B4-2358 | (O.27.106) | (L.3.3) |
| B4-2359 | (O.2.4) | (L.1.5) |
| B4-2360 | (O.27.7) | (L.1.5) |
| B4-2361 | (O.27.76) | (L.1.5) |
| B4-2362 | (O.4.2) | (L.1.5) |
| B4-2363 | (O.4.8) | (L.1.5) |
| B4-2364 | (O.4.1) | (L.1.5) |

TABLE B 4-continued

| Mixture | Co 2) | Co3) |
|---|---|---|
| B4-2365 | (O.4.4) | (L.1.5) |
| B4-2366 | (O.4.5) | (L.1.5) |
| B4-2367 | (O.4.7) | (L.1.5) |
| B4-2368 | (O.27.25) | (L.1.5) |
| B4-2369 | (O.27.18) | (L.1.5) |
| B4-2370 | (O.27.11) | (L.1.5) |
| B4-2371 | (O.27.27) | (L.1.5) |
| B4-2372 | (O.3.43) | (L.1.5) |
| B4-2373 | (O.3.5) | (L.1.5) |
| B4-2374 | (O.3.15) | (L.1.5) |
| B4-2375 | (O.26.4) | (L.1.5) |
| B4-2376 | (O.26.5) | (L.1.5) |
| B4-2377 | (O.1.21) | (L.1.5) |
| B4-2378 | (O.1.15) | (L.1.5) |
| B4-2379 | (O.27.41) | (L.1.5) |
| B4-2380 | (O.1.27) | (L.1.5) |
| B4-2381 | (O.27.101) | (L.1.5) |
| B4-2382 | (O.27.103) | (L.1.5) |
| B4-2383 | (O.27.44) | (L.1.5) |
| B4-2384 | (O.27.104) | (L.1.5) |
| B4-2385 | (O.27.63) | (L.1.5) |
| B4-2386 | (O.27.64) | (L.1.5) |
| B4-2387 | (O.27.43) | (L.1.5) |
| B4-2388 | (O.27.95) | (L.1.5) |
| B4-2389 | (L.3.10) | (L.1.5) |
| B4-2390 | (O.27.105) | (L.1.5) |
| B4-2391 | (O.27.106) | (L.1.5) |
| B4-2392 | (O.2.4) | (O.27.17) |
| B4-2393 | (O.27.7) | (O.27.17) |
| B4-2394 | (O.27.76) | (O.27.17) |
| B4-2395 | (O.4.2) | (O.27.17) |
| B4-2396 | (O.4.8) | (O.27.17) |
| B4-2397 | (O.4.1) | (O.27.17) |
| B4-2398 | (O.4.4) | (O.27.17) |
| B4-2399 | (O.4.5) | (O.27.17) |
| B4-2400 | (O.4.7) | (O.27.17) |
| B4-2401 | (O.27.25) | (O.27.17) |
| B4-2402 | (O.27.18) | (O.27.17) |
| B4-2403 | (O.27.11) | (O.27.17) |
| B4-2404 | (O.27.27) | (O.27.17) |
| B4-2405 | (O.3.43) | (O.27.17) |
| B4-2406 | (O.3.5) | (O.27.17) |
| B4-2407 | (O.3.15) | (O.27.17) |
| B4-2408 | (O.26.4) | (O.27.17) |
| B4-2409 | (O.26.5) | (O.27.17) |
| B4-2410 | (O.1.21) | (O.27.17) |
| B4-2411 | (O.1.15) | (O.27.17) |
| B4-2412 | (O.27.41) | (O.27.17) |
| B4-2413 | (O.1.27) | (O.27.17) |
| B4-2414 | (O.27.101) | (O.27.17) |
| B4-2415 | (O.27.103) | (O.27.17) |
| B4-2416 | (O.27.44) | (O.27.17) |
| B4-2417 | (O.27.104) | (O.27.17) |
| B4-2418 | (O.27.63) | (O.27.17) |
| B4-2419 | (O.27.64) | (O.27.17) |
| B4-2420 | (O.27.43) | (O.27.17) |
| B4-2421 | (O.27.95) | (O.27.17) |
| B4-2422 | (L.3.10) | (O.27.17) |
| B4-2423 | (O.27.105) | (O.27.17) |
| B4-2424 | (O.27.106) | (O.27.17) |
| B4-2425 | (O.2.4) | L.3.16) |
| B4-2426 | (O.27.7) | L.3.16) |
| B4-2427 | (O.27.76) | L.3.16) |
| B4-2428 | (O.4.2) | L.3.16) |
| B4-2429 | (O.4.8) | L.3.16) |
| B4-2430 | (O.4.1) | L.3.16) |
| B4-2431 | (O.4.4) | L.3.16) |
| B4-2432 | (O.4.5) | L.3.16) |
| B4-2433 | (O.4.7) | L.3.16) |
| B4-2434 | (O.27.25) | L.3.16) |
| B4-2435 | (O.27.18) | L.3.16) |
| B4-2436 | (O.27.11) | L.3.16) |
| B4-2437 | (O.27.27) | L.3.16) |
| B4-2438 | (O.3.43) | L.3.16) |
| B4-2439 | (O.3.5) | L.3.16) |
| B4-2440 | (O.3.15) | L.3.16) |
| B4-2441 | (O.26.4) | L.3.16) |
| B4-2442 | (O.26.5) | L.3.16) |

TABLE B 4-continued

| Mixture | Co 2) | Co3) |
|---|---|---|
| B4-2443 | (O.1.21) | L.3.16) |
| B4-2444 | (O.1.15) | L.3.16) |
| B4-2445 | (O.27.41) | L.3.16) |
| B4-2446 | (O.1.27) | L.3.16) |
| B4-2447 | (O.27.101) | L.3.16) |
| B4-2448 | (O.27.103) | L.3.16) |
| B4-2449 | (O.27.44) | L.3.16) |
| B4-2450 | (O.27.104) | L.3.16) |
| B4-2451 | (O.27.63) | L.3.16) |
| B4-2452 | (O.27.64) | L.3.16) |
| B4-2453 | (O.27.43) | L.3.16) |
| B4-2454 | (O.27.95) | L.3.16) |
| B4-2455 | (L.3.10) | L.3.16) |
| B4-2456 | (O.27.105) | L.3.16) |
| B4-2457 | (O.27.106) | L.3.16) |
| B4-2458 | (O.2.4) | mixture of Bacillus licheniformis and (L.1.12) |
| B4-2459 | (O.27.7) | mixture of Bacillus licheniformis and (L.1.12) |
| B4-2460 | (O.27.76) | mixture of Bacillus licheniformis and (L.1.12) |
| B4-2461 | (O.4.2) | mixture of Bacillus licheniformis and (L.1.12) |
| B4-2462 | (O.4.8) | mixture of Bacillus licheniformis and (L.1.12) |
| B4-2463 | (O.4.1) | mixture of Bacillus licheniformis and (L.1.12) |
| B4-2464 | (O.4.4) | mixture of Bacillus licheniformis and (L.1.12) |
| B4-2465 | (O.4.5) | mixture of Bacillus licheniformis and (L.1.12) |
| B4-2466 | (O.4.7) | mixture of Bacillus licheniformis and (L.1.12) |
| B4-2467 | (O.27.25) | mixture of Bacillus licheniformis and (L.1.12) |
| B4-2468 | (O.27.18) | mixture of Bacillus licheniformis and (L.1.12) |
| B4-2469 | (O.27.11) | mixture of Bacillus licheniformis and (L.1.12) |
| B4-2470 | (O.27.27) | mixture of Bacillus licheniformis and (L.1.12) |
| B4-2471 | (O.3.43) | mixture of Bacillus licheniformis and (L.1.12) |
| B4-2472 | (O.3.5) | mixture of Bacillus licheniformis and (L.1.12) |
| B4-2473 | (O.3.15) | mixture of Bacillus licheniformis and (L.1.12) |
| B4-2474 | (O.26.4) | mixture of Bacillus licheniformis and (L.1.12) |
| B4-2475 | (O.26.5) | mixture of Bacillus licheniformis and (L.1.12) |
| B4-2476 | (O.1.21) | mixture of Bacillus licheniformis and (L.1.12) |
| B4-2477 | (O.1.15) | mixture of Bacillus licheniformis and (L.1.12) |
| B4-2478 | (O.27.41) | mixture of Bacillus licheniformis and (L.1.12) |
| B4-2479 | (O.1.27) | mixture of Bacillus licheniformis and (L.1.12) |
| B4-2480 | (O.27.101) | mixture of Bacillus licheniformis and (L.1.12) |
| B4-2481 | (O.27.103) | mixture of Bacillus licheniformis and (L.1.12) |
| B4-2482 | (O.27.44) | mixture of Bacillus licheniformis and (L.1.12) |
| B4-2483 | (O.27.104) | mixture of Bacillus licheniformis and (L.1.12) |
| B4-2484 | (O.27.63) | mixture of Bacillus licheniformis and (L.1.12) |
| B4-2485 | (O.27.64) | mixture of Bacillus licheniformis and (L.1.12) |
| B4-2486 | (O.27.43) | mixture of Bacillus licheniformis and (L.1.12) |
| B4-2487 | (O.27.95) | mixture of Bacillus licheniformis and (L.1.12) |
| B4-2488 | (L.3.10) | mixture of Bacillus licheniformis and (L.1.12) |

TABLE B 4-continued

| Mixture | Co 2) | Co3) |
|---|---|---|
| B4-2489 | (O.27.105) | mixture of Bacillus licheniformis and (L.1.12) |
| B4-2490 | (O.27.106) | mixture of Bacillus licheniformis and (L.1.12) |
| B4-2491 | (O.2.4) | (O.27.105) |
| B4-2492 | (O.27.7) | (O.27.105) |
| B4-2493 | (O.27.76) | (O.27.105) |
| B4-2494 | (O.4.2) | (O.27.105) |
| B4-2495 | (O.4.8) | (O.27.105) |
| B4-2496 | (O.4.1) | (O.27.105) |
| B4-2497 | (O.4.4) | (O.27.105) |
| B4-2498 | (O.4.5) | (O.27.105) |
| B4-2499 | (O.4.7) | (O.27.105) |
| B4-2500 | (O.27.25) | (O.27.105) |
| B4-2501 | (O.27.18) | (O.27.105) |
| B4-2502 | (O.27.11) | (O.27.105) |
| B4-2503 | (O.27.27) | (O.27.105) |
| B4-2504 | (O.3.43) | (O.27.105) |
| B4-2505 | (O.3.5) | (O.27.105) |
| B4-2506 | (O.3.15) | (O.27.105) |
| B4-2507 | (O.26.4) | (O.27.105) |
| B4-2508 | (O.26.5) | (O.27.105) |
| B4-2509 | (O.1.21) | (O.27.105) |
| B4-2510 | (O.1.15) | (O.27.105) |
| B4-2511 | (O.27.41) | (O.27.105) |
| B4-2512 | (O.1.27) | (O.27.105) |
| B4-2513 | (O.27.101) | (O.27.105) |
| B4-2514 | (O.27.103) | (O.27.105) |
| B4-2515 | (O.27.44) | (O.27.105) |
| B4-2516 | (O.27.104) | (O.27.105) |
| B4-2517 | (O.27.63) | (O.27.105) |
| B4-2518 | (O.27.64) | (O.27.105) |
| B4-2519 | (O.27.43) | (O.27.105) |
| B4-2520 | (O.27.95) | (O.27.105) |
| B4-2521 | (L.3.10) | (O.27.105) |
| B4-2522 | (O.27.105) | (O.27.105) |
| B4-2523 | (O.27.106) | (O.27.105) |
| B4-2524 | (O.2.4) | mixture of (L.1.5) and (L.4.8) |
| B4-2525 | (O.27.7) | mixture of (L.1.5) and (L.4.8) |
| B4-2526 | (O.27.76) | mixture of (L.1.5) and (L.4.8) |
| B4-2527 | (O.4.2) | mixture of (L.1.5) and (L.4.8) |
| B4-2528 | (O.4.8) | mixture of (L.1.5) and (L.4.8) |
| B4-2529 | (O.4.1) | mixture of (L.1.5) and (L.4.8) |
| B4-2530 | (O.4.4) | mixture of (L.1.5) and (L.4.8) |
| B4-2531 | (O.4.5) | mixture of (L.1.5) and (L.4.8) |
| B4-2532 | (O.4.7) | mixture of (L.1.5) and (L.4.8) |
| B4-2533 | (O.27.25) | mixture of (L.1.5) and (L.4.8) |
| B4-2534 | (O.27.18) | mixture of (L.1.5) and (L.4.8) |
| B4-2535 | (O.27.11) | mixture of (L.1.5) and (L.4.8) |
| B4-2536 | (O.27.27) | mixture of (L.1.5) and (L.4.8) |
| B4-2537 | (O.3.43) | mixture of (L.1.5) and (L.4.8) |
| B4-2538 | (O.3.5) | mixture of (L.1.5) and (L.4.8) |
| B4-2539 | (O.3.15) | mixture of (L.1.5) and (L.4.8) |
| B4-2540 | (O.26.4) | mixture of (L.1.5) and (L.4.8) |
| B4-2541 | (O.26.5) | mixture of (L.1.5) and (L.4.8) |
| B4-2542 | (O.1.21) | mixture of (L.1.5) and (L.4.8) |
| B4-2543 | (O.1.15) | mixture of (L.1.5) and (L.4.8) |
| B4-2544 | (O.27.41) | mixture of (L.1.5) and (L.4.8) |
| B4-2545 | (O.1.27) | mixture of (L.1.5) and (L.4.8) |
| B4-2546 | (O.27.101) | mixture of (L.1.5) and (L.4.8) |
| B4-2547 | (O.27.103) | mixture of (L.1.5) and (L.4.8) |
| B4-2548 | (O.27.44) | mixture of (L.1.5) and (L.4.8) |
| B4-2549 | (O.27.104) | mixture of (L.1.5) and (L.4.8) |
| B4-2550 | (O.27.63) | mixture of (L.1.5) and (L.4.8) |
| B4-2551 | (O.27.64) | mixture of (L.1.5) and (L.4.8) |
| B4-2552 | (O.27.43) | mixture of (L.1.5) and (L.4.8) |
| B4-2553 | (O.27.95) | mixture of (L.1.5) and (L.4.8) |
| B4-2554 | (L.3.10) | mixture of (L.1.5) and (L.4.8) |
| B4-2555 | (O.27.106) | mixture of (L.1.5) and (L.4.8) |
| B4-2556 | (O.27.106) | mixture of (L.1.5) and (L.4.8) |

The binary and ternary mixtures and agrochemical compositions thereof according to the invention can, in the use form as fungicides, also be present together with further active substances, e. g. with herbicides, insecticides, growth regulators, fungicides or else with fertilizers, as pre-mix or, if appropriate, not until immeadiately prior to use (tank mix).

Mixing the active compounds I, II and III and the compositions comprising the mixtures, respectively, in the use form as fungicides with other fungicides results in many cases in an expansion of the fungicidal spectrum of activity being obtained or in a prevention of fungicide resistance development. Furthermore, in many cases, synergistic effects are obtained.

The compounds of the formula I or compositions comprising said compounds according to the invention and the mixtures comprising said compounds and compositions, respectively, are suitable as fungicides. They are distinguished by an outstanding effectiveness against a broad spectrum of phytopathogenic fungi, including soil-borne fungi, which derive especially from the following classes or are closely related to any of them: Ascomycota (Ascomycetes), for example, but not limited to the genus Cocholiobolus, *Colletotrichum, Fusarium, Microdochium, Penicillium, Phoma*, Magnaporte, Zymoseptoria, and Pseudocercosporella; Basdiomycota (Basidiomycetes), for example, but not limited to the genus Phakospora, *Puccinia, Rhizoctonia, Sphacelotheca*, Tilletia, Typhula, and *Ustilago*; Chytridiomycota (Chytridiomycetes), for example, but not limited to the genus Chytridiales, and *Synchytrium*; Deuteromycetes (syn. Fungi imperfecti), for example, but not limited to the genus *Ascochyta, Diplodia, Erysiphe, Fusarium, Phomopsis*, and *Pyrenophora*; Peronosporomycetes (syn. Oomycetes), for example but not limited to the genus *Peronospora, Pythium, Phytophthora*; Plasmodiophoromycetes, for example but not limited to the genus Plasmodiophora; Zygomycetes, for example, but not limited to the genus *Rhizopus*.

Some of the compounds of the formula I and the compositions according to the invention are systemically effective and they can be used in crop protection as foliar fungicides, fungicides for seed dressing and soil fungicides. Moreover, they are suitable for controlling harmful fungi, which inter alia occur in wood or roots of plants.

The compounds I and the compositions according to the invention are particularly important in the control of a multitude of phytopathogenic fungi on various cultivated plants, such as cereals, e. g. wheat, rye, barley, triticale, oats or rice; beet, e. g. sugar beet or fodder beet; fruits, such as pomes, stone fruits or soft fruits, e. g. apples, pears, plums, peaches, almonds, cherries, strawberries, raspberries, blackberries or gooseberries; leguminous plants, such as lentils, peas, alfalfa or soybeans; oil plants, such as rape, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grapefruits or mandarins; vegetables, such as spinach, lettuce, asparagus, cabbages, carrots, onions, tomatoes, potatoes, cucurbits or paprika; lauraceous plants, such as avocados, cinnamon or camphor; energy and raw material plants, such as corn, soybean, rape, sugar cane or oil palm; corn; tobacco; nuts; coffee; tea; bananas; vines (table grapes and grape juice grape vines); hop; turf; sweet leaf (also called *Stevia*); natural rubber plants or ornamental and forestry plants, such as flowers, shrubs, broad-leaved trees or evergreens, e. g. conifers; and on the plant propagation material, such as seeds, and the crop material of these plants.

Preferably, compounds I and compositions thereof, respectively are used for controlling a multitude of fungi on field crops, such as potatoes sugar beets, tobacco, wheat, rye, barley, oats, rice, corn, cotton, soybeans, rape, legumes, sunflowers, coffee or sugar cane; fruits; vines; ornamentals; or vegetables, such as cucumbers, tomatoes, beans or squashes.

The term "plant propagation material" is to be understood to denote all the generative parts of the plant such as seeds and vegetative plant material such as cuttings and tubers (e. g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil. These young plants may also be protected before transplantation by a total or partial treatment by immersion or pouring.

Preferably, treatment of plant propagation materials with compounds I and compositions thereof, respectively, is used for controlling a multitude of fungi on cereals, such as wheat, rye, barley and oats; rice, corn, cotton and soybeans.

The term "cultivated plants" is to be understood as including plants which have been modified by breeding, mutagenesis or genetic engineering including but not limiting to agricultural biotech products on the market or in development (cf. http://cera-gmc.org/, see GM crop database therein).

The compounds I, and mixtures comprising them, and agrochemical compositions thereof, respectively, are particularly suitable for controlling the following plant diseases:

Albugo spp. (white rust) on ornamentals, vegetables (e. g. *A. candida*) and sunflowers (e. g. *A. tragopogonis*); *Alternaria* spp. (*Alternaria* leaf spot) on vegetables, rape (A. brassicola or *brassicae*), sugar beets (*A. tenuis*), fruits, rice, soybeans, potatoes (e. g. *A. solani* or *A. alternata*), tomatoes (e. g. *A. solani* or *A. alternata*) and wheat; *Aphanomyces* spp. on sugar beets and vegetables; Ascochytaspp. on cereals and vegetables, e. g. *A. tritici* (anthracnose) on wheat and A. hordeion barley; *Bipolaris* and *Drechslera* spp. (teleomorph: *Cochliobolus* spp.), e. g. Southern leaf blight (*D. maydis*) or Northern leaf blight (B. zeicola) on corn, e. g. spot blotch (*B. sorokiniana*) on cereals and e. g. B. oryzaeon rice and turfs; Blumeria (formerly *Erysiphe*) *graminis* (powdery mildew) on cereals (e. g. on wheat or barley); *Botrytis cinerea* (teleomorph: Botryotinia fuckeliana: grey mold) on fruits and berries (e. g. strawberries), vegetables (e. g. lettuce, carrots, celery and cabbages), rape, flowers, vines, forestry plants and wheat; *Bremialactucae* (downy mildew) on lettuce; Ceratocystis (syn. *Ophiostoma*) spp. (rot or wilt) on broad-leaved trees and evergreens, e. g. C. ulmi (Dutch elm disease) on elms; *Cercospora* spp. (*Cercospora* leaf spots) on corn (e. g. Gray leaf spot: *C. zeae-maydis*), rice, sugar beets (e. g. *C. beticola*), sugar cane, vegetables, coffee, soybeans (e. g. C. sojina or *C. kikuchii*) and rice; *Cladosporium* spp. on tomatoes (e. g. C. fulvum leaf mold) and cereals, e. g. *C. herbarum* (black ear) on wheat; *Claviceps purpurea* (ergot) on cereals; *Cochliobolus* (anamorph: *Helminthosporium* of *Bipolaris*) spp. (leaf spots) on corn (*C. carbonum*), cereals (e. g. *C. sativus*, anamorph: *B. sorokiniana*) and rice (e. g. *C. miyabeanus*, anamorph: *H. oryzae*); *Colletotrichum* (teleomorph: *Glomerella*) spp. (anthracnose) on cotton (e. g. C. gossypih), corn (e. g. C. graminicola: Anthracnose stalk rot), soft fruits, potatoes (e. g. C. coccodes: black dot), beans (e. g. *C. lindemuthianum*) and soybeans (e. g. *C. truncatum* or C. gloeosporioides); Corticium spp., e. g. C. sasakii (sheath blight) on rice; *Corynespora* cassicola (leaf spots) on soybeans and ornamentals; Cycloconium spp., e. g. C. oleaginum on olive trees; Cylindrocarpon spp. (e. g. fruit tree canker or young vine decline, teleomorph: *Nectria* or Neonectria spp.) on fruit trees, vines (e. g. C. liriodendri, teleomorph: Neonectria liriodendrt: Black Foot Disease) and ornamentals; Dematophora (teleomorph: Rosellinia) necatrix (root and stem rot) on soybeans; *Diaporthe* spp., e. g. *D. phaseolorum* (damping off) on soybeans; *Drechslera* (syn. *Helminthosporium*, teleomorph: *Pyrenophora*) spp. on corn, cereals, such as barley (e. g. *D. teres*, net blotch) and wheat (e. g. *D. tritici-repentis*: tan spot), rice and turf; Esca (dieback, apoplexy) on vines, caused by Formitiporia (syn. Phellinus) *punctata, F. mediterranea*, Phaeomoniella chlamydospora (earlier *Phaeoacremonium chlamydosporum*), *Phaeoacremonium aleophilum* and/or *Botryosphaeria obtusa; Elsinoe* spp. on pome fruits (E. pyri), soft fruits (E. veneta: anthracnose) and vines (E. ampelina: anthracnose); Entyloma *oryzae* (leaf smut) on rice; *Epicoccum* spp. (black mold) on wheat; *Erysiphe* spp. (powdery mildew) on sugar beets (*E. betae*), vegetables (e. g. *E. pisi*), such as cucurbits (e. g. *E. cichoracearum*), cabbages, rape (e. g. E. cruciferarum); Eutypa lata (Eutypa canker or dieback, anamorph: Cytosporina lata, syn. Libertella blepharis) on fruit trees, vines and ornamental woods; *Exserohilum* (syn. *Helminthosporium*) spp. on corn (e. g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e. g. wheat or barley), *F. oxysporum* on tomatoes, *F. solani* (f. sp. glycines now syn. *F. virguliforme*) and F. tucumaniae and *F. brasiliense* each causing sudden death syndrome on soybeans, and F. verticillioides on corn; Gaeumannomyces-graminis (take-all) on cereals (e. g. wheat or barley) and corn; *Gibberella* spp. on cereals (e. g. *G. zeae*) and rice (e. g. *G. fujikuroi*: Bakanae disease); *Glomerella cingulata* on vines, pome fruits and other plants and G. gossypiion cotton; Grainstaining complex on rice; *Guignardia bidwellii* (black rot) on vines; *Gymnosporangium* spp. on rosaceous plants and junipers, e. g. G. sabinae (rust) on pears; *Helminthosporium* spp. (syn. *Drechslera*, teleomorph: *Cochliobolus*) on corn, cereals and rice; *Hemileia* spp., e. g. *H. vastatrix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; Microdochium (syn. *Fusarium*) *nivale* (pink snow mold) on cereals (e. g. wheat or barley); *Microsphaera diffusa* (powdery mildew) on soybeans; Monilinia spp., e. g. *M. laxa, M. fructicola* and *M. fructigena* (bloom and twig blight, brown rot) on stone fruits and other rosaceous plants; *Mycosphaerella* spp. on cereals, bananas, soft fruits and ground nuts, such as e. g. *M. graminicola* (anamorph: *Septoria tritici, Septoria* blotch) on wheat or *M. fijiensis* (black Sigatoka disease) on bananas; *Peronospora* spp. (downy mildew) on cabbage (e. g. *P. brassicae*), rape (e. g. *P. parasitica*), onions (e. g. P. destructor), tobacco (*P. tabacina*) and soybeans (e. g. *P. manshurica*); *Phakopsora* pachyrhiziand *P. meibomiae* (soybean rust) on soybeans; Phialophora spp. e. g. on vines (e. g. *P. tracheiphila* and P. tetraspora) and soybeans (e. g. *P. gregata*: stem rot); *Phoma* lingam (root and stem rot) on rape and cabbage and *P. betae* (root rot, leaf spot and damping-off) on sugar beets; Phomopsisspp. on sunflowers, vines (e. g. *P. viticola*: can and leaf spot) and soybeans (e. g. stem rot: *P. phaseoli*, teleomorph: *Diaporthe phaseolorum*); Physoderma *maydis* (brown spots) on corn; *Phytophthora* spp. (wilt, root, leaf, fruit and stem root) on various plants, such as paprika and cucurbits (e. g. *P. capsici*), soybeans (e. g. *P. megasperma*, syn. *P. sojae*), potatoes and tomatoes (e. g. *P. infestans*: late blight) and broad-leaved trees (e. g. *P. ramorum*: sudden oak death); Plasmodiophora *brassicae* (club root) on cabbage, rape, radish and other plants; Plasmopara spp., e. g. *P. viticola* (grapevine downy mildew) on vines and *P. halstedii* on sunflowers; *Podosphaera* spp. (powdery mildew) on rosaceous plants, hop, pome and soft fruits, e. g. *P. leucotricha* on apples; *Polymyxa* spp., e. g. on cereals, such as barley and wheat (*P. graminis*) and sugar beets (*P. betae*) and thereby transmitted viral diseases; Pseudocercosporella herpotrichoides (eyespot, teleomorph: *Tapesia yallundae*) on cereals, e. g. wheat or barley; *Pseudoperonospora* (downy mildew) on various plants, e. g. P. cubensison cucurbits or P. humili on hop; Pseudopezicula *tracheiphila* (red fire disease or ‚rotbrenner', anamorph: Phialophora) on vines; *Puccinia* spp. (rusts) on various plants, e. g. P. triticina (brown or leaf rust), *P. striiformis* (stripe or yellow rust), *P. hordei* (dwarf rust), *P. graminis* (stem or black rust) or *P. recondita* (brown or leaf rust) on cereals, such as e. g. wheat, barley or rye, *P. kuehnii*(orange rust) on sugar cane and P. asparagion asparagus; *Pyrenophora* (anamorph: *Drechslera*) *tritici*-repentis (tan spot) on wheat or *P. teres* (net blotch) on barley; *Pyricularia* spp., e. g. *P. oryzae* (teleomorph: Magnaporthegrisea, rice blast) on rice and *P. grisea* on turf and cereals; *Pythium* spp. (damping-off) on turf, rice, corn, wheat, cotton, rape, sunflowers, soybeans, sugar beets, vegetables and various other plants (e. g. *P. ultimum* or *P. aphanidermatum*); Ramularia spp., e. g. R. collo-*cygni*(Ramularia leaf spots, Physiological leaf spots) on barley and *R. beticola* on sugar beets; *Rhizoctonia* spp. on cotton, rice, potatoes, turf, corn, rape, potatoes, sugar beets, vegetables and various other plants, e. g. *R. solani* (root and stem rot) on soybeans, *R. solani*(sheath blight) on rice or *R. cerealis* (*Rhizoctonia* spring blight) on wheat or barley; *Rhizopus* stolonifer (black mold, soft rot) on strawberries, carrots, cabbage, vines and tomatoes; *Rhynchosporium secalis* (scald) on barley, rye and triticale; Sarocladium *oryzae* and S. attenuatum (sheath rot) on rice; *Sclerotinia* spp. (stem rot or white mold) on vegetables and field crops, such as rape, sunflowers (e. g. *S. sclerotiorum*) and soybeans (e. g. *S. rolfsii* or *S. sclerotiorum*); *Septoria* spp. on various plants, e. g. S. glycines (brown spot) on soybeans, *S. tritici*(*Septoria* blotch) on wheat and S. (syn. *Stagonospora*) *nodorum* (*Stagonospora* blotch) on cereals; Uncinula (syn. *Erysiphe*) necator (powdery mildew, anamorph: Oidium tuckern) on vines; Setospaeria spp. (leaf blight) on corn (e. g. *S. turcicum*, syn. *Helminthosporium turcicum*) and turf; Sphacelotheca spp. (smut) on corn, (e. g. *S. reiliana*: head smut), sorghum und sugar cane; Sphaerotheca fuliginea (powdery mildew) on cucurbits; Spongospora *subterranea* (powdery scab) on potatoes and thereby transmitted viral diseases; Stagonosporaspp. on cereals, e. g. *S. nodorum* (*Stagonospora* blotch, teleomorph: *Leptosphaeria* [syn. Phaeosphaeria]*nodorum*) on wheat; *Synchytrium* endobioticum on potatoes (potato wart disease); Taphrina spp., e. g. T. deformans (leaf curl disease) on peaches and *T. pruni* (plum pocket) on plums; Thielaviopsis spp. (black root rot) on tobacco, pome fruits, vegetables, soybeans and cotton, e. g. *T. basicola* (syn. *Chalara elegans*); Tilletia spp. (common bunt or stinking smut) on cereals, such as e. g. *T. tritici* (syn. T. caries, wheat bunt) and T. controversa (dwarf bunt) on wheat; Typhula *incarnata* (grey snow mold) on barley or wheat; Urocystis spp., e. g. *U. occulta* (stem smut) on rye; Uromycesspp. (rust) on vegetables, such as beans (e. g. *U. appendiculatus*, syn. *U. phaseoli*) and sugar beets (e. g. *U. betae*); *Ustilago* spp. (loose smut) on cereals (e. g. *U. nuda* and U. avaenae), corn (e. g. *U. maydis*: corn smut) and sugar cane; *Venturia* spp. (scab) on apples (e. g. *V. inaequalis*) and pears; and *Verticillium* spp. (wilt) on various plants, such as fruits and ornamentals, vines, soft fruits, vegetables and field crops, e. g. *V. dahliae* on strawberries, rape, potatoes and tomatoes.

In a preferred embodiment the compounds I, their mixtures with other active compounds as defined herein and compositions thereof, respectively, are particularly suitable for controlling the following plant diseases: *Puccinia* spp. (rusts) on various plants, for example, but not limited to P. triticina (brown or leaf rust), *P. striiformis* (stripe or yellow rust), *P. hordei* (dwarf rust), *P. graminis* (stem or black rust) or *P. recondita* (brown or leaf rust) on cereals, such as e. g. wheat, barley or rye and Phakopsoraceae spp. on various plants, in particular *Phakopsora pachyrhizi* and *P. meibomiae* (soybean rust) on soybeans.

The compounds I, and mixtures comprising them, and agrochemical compositions thereof, respectively, are particularly suitable for controlling the following plant diseases relating especially to seed:

*Alternaria* spp. (seed borne diseases) on corn and wheat; *Aspergillus* ssp. (seed borne diseases) on corn; *Claviceps purpurea* (ergot) on cereals; *Cochliobolus* (anamorph: *Helminthosporium* of *Bipolaris*) spp. (leaf spots) on corn (*C. carbonum*), cereals (e. g. *C. sativus*); *Colletotrichum* (teleomorph: *Glomerella*) spp. (anthracnose) on corn; *Fusarium* (teleomorph: *Gibberella*) spp. (wilt, root or stem rot) such as *F. graminearum* or *F. culmorum* (root rot, scab or head blight) on cereals (e. g. wheat or barley), F. avenacuem on corn and wheat, *F. oxysporum* on corn, *F. proliferatum* on corn, F. subglutians on corn, F. temperatum on corn, *F. solani*(f. sp. glycines now syn. *F. virguliforme*) causing sudden death syndrome on soybeans, and F. verticillioides on corn; Gaeumannomycesgraminis (take-all) on cereals (e. g. wheat or barley) and corn; *Helminthosporium* spp. (syn. *Drechslera*, teleomorph: *Cochliobolus*) on corn; Microdochium (syn. *Fusarium*) *nivale* (pink snow mold) on cereals (e. g. wheat or barley); Penicillum ssp. (seed borne diseases) on corn; *Phoma* lingam (root and stem rot) on rape and cabbage; Phomopsisspp. on soybeans (e. g. stem rot: *P. phaseoli*, teleomorph: *Diaporthe phaseolorum*); *Phytophthora* spp. (wilt, root, leaf, fruit and stem root) soybeans (e. g. *P. sojae*); *Puccinia* spp. (rusts) e. g. *P. striiformis* (stripe or yellow rust), *P. graminis* (stem or black rust) on cereals, such as e. g. wheat, barley or rye; *Pyrenophora* (anamorph: *Drechslera*) *graminea* (barley leaf stripe) on barley or *P. teres* (net blotch) on barley; *Pythium* spp. (damping-off) e. g. *P. ultimum* on corn, *P. aphanidermatum* on soybean, *P. arrhenomanes* on wheat P. irregularon wheat; *Rhizoctonia* spp. on cotton, rice, potatoes, turf, corn, rape, potatoes, sugar beets, vegetables and various other plants, e. g. *R. solani* (root and stem rot) on soybeans, *R. solani*(sheath blight) on rice or R. cereal/s (*Rhizoctonia* spring blight) on wheat or barley; *Sclerotinia* spp. (stem rot or white mold) on soybeans (e. g. *S. rolfsii* or *S. sclerotiorum*); Sphacelotheca spp. (smut) on corn, (e. g. *S. reiliana*: head smut); Tilletia ssp. Such as Tilletia caries (wheat bunt) and T. controversa (dwarf bunt) on wheat; Typhula *incarnata* (grey snow mold) on barley or wheat; Urocystis spp., e. g. *U. occulta* (stem smut) on rye; *Ustilago* spp. (loose smut) on cereals (e. g. *U. nuda*), wheat (e.g. U. lingam).

In a preferred embodiment the compounds I, their mixtures with other active compounds as defined herein and compositions thereof, respectively, are particularly suitable for controlling the following plant diseases:

*Alternaria* spp. (seed borne diseases) on corn and wheat; *Aspergillus* ssp. (seed borne diseases) on corn; *Fusarium* (teleomorph: *Gibberella*) spp. (wilt, root or stem rot) such as *F. graminearum* or *F. culmorum* (root rot, scab or head blight) on cereals (e. g. wheat or barley), F. avenacuem on corn and wheat, *F. oxysporum* on corn, *F. proliferatum* on corn, F. subglutians on corn, *F. solani*(f. sp. glycines now syn. *F. virguliforme*) causing sudden death syndrome on soybeans, and F. verticillioideson corn; Gaeumannomyces-graminis (take-all) on cereals (e. g. wheat or barley) and corn; Microdochium (syn. *Fusarium*) *nivale* (pink snow mold) on cereals (e. g. wheat or barley); Penicillum ssp. (seed borne diseases) on corn; *Phoma* lingam (root and stem rot) on rape and cabbage; *Phytophthora* spp. (wilt, root, leaf, fruit and stem root) soybeans (e. g. *P. sojae*); *Pyrenophora* (anamorph: *Drechslera*) *graminea* (barley leaf stripe) on barley or *Pythium* spp. (damping-off) e. g. *P. ultimum* on corn, *P. aphanidermatum* on soybean, *P. arrhenomanes* on wheat P. irregular on wheat; *Rhizoctonia* spp. on cotton, rice, potatoes, turf, corn, rape, potatoes, sugar beets, vegetables and various other plants, e. g. *R. solani*(root and stem rot) on soybeans, *R. solani*(sheath blight) on rice or *R. cerealis* (*Rhizoctonia* spring blight) on wheat or barley; *Sclerotinia* spp. (stem rot or white mold) on soybeans (e. g. *S. rolfsii* or *S. sclerotiorum*); Sphacelotheca spp. (smut) on corn, (e. g. *S. reiliana*: head smut); Tilletia ssp. Such as Tilletia caries (wheat bunt) and T. controversa (dwarf bunt) on wheat; *Ustilago* spp. (loose smut) on cereals (e. g. *U. nuda*), wheat (e.g. U. lingam).

In a most preferred embodiment the compounds I, their mixtures with other active compounds as defined herein and compositions thereof, respectively, are particularly suitable for controlling the following plant diseases:

*Fusarium* (teleomorph: *Gibberella*) spp. (wilt, root or stem rot) such as *F. graminearum* or *F. culmorum* (root rot, scab or head blight) on cereals (e. g. wheat or barley), *F. solani*(f. sp. glycines now syn. *F. virguliforme*) causing sudden death syndrome on soybeans; Microdochium (syn. *Fusarium*) *nivale* (pink snow mold) on cereals (e. g. wheat or barley); *Pythium* spp. (damping-off) e. g. *P. ultimum* on corn; *Rhizoctonia* spp. on cotton, rice, potatoes, turf, corn, rape, potatoes, sugar beets, vegetables and various other plants, e. g. *R. solani*(root and stem rot) on soybeans, *R. solani*(sheath blight) on rice or *R. cerealis* (*Rhizoctonia* spring blight) on wheat or barley; Sphacelotheca spp. (smut) on corn, (e. g. *S. reiliana*: head smut); Tilletia ssp. Such as Tilletia caries (wheat bunt) and T. controversa (dwarf bunt) on wheat.

Mixtures A1-1 to A1-805 as defined above are suitable for controlling grey mold und white mold diseases especially *Botrytis* species (*Botrytis* spp.) and *Sclerotinia* species (*Sclerotinia* spp.).

Mixtures A2-1 to A2-805 as defined above are suitable for controlling grey mold und white mold diseases especially *Botrytis* species (*Botrytis* spp.) and *Sclerotinia* species (*Sclerotinia* spp.).

Mixtures A3-1 to A3-805 as defined above are suitable for controlling grey mold und white mold diseases especially *Botrytis* species (*Botrytis* spp.) and *Sclerotinia* species (*Sclerotinia* spp.).

Mixtures A1-1 to A1-805 as defined above are suitable for controlling rice leaf, neck, collar and panicle blast especially *Pyricularia* grisae formerly *oryzae* as well as Brown spot (*Cochliobolus miyabeanus* formerly *Helminthosporium oryzae; Drechslera oryzae; Bipolaris oryzae*), Dirty Panicle comprising Cercopsora *oryzae*; Curvularia lunata, Trichoconis padwickii, Sarocladium *oryzae, Fusarium semitectum*, Sheath Blight (*Rhizoctonia solani*=*Thanatephorus cucumeris* (aka Corticium sasakii), Bakanae disease (*Fusarium fujikuroi*=Giberella *fujikuroi*).

Mixtures A2-1 to A2-805 as defined above are suitable for controlling rice leaf, neck, collar and panicle blast especially *Pyricularia* grisae formerly *oryzae* as well as Brown spot (*Cochliobolus miyabeanus* formerly *Helminthosporium oryzae; Drechslera oryzae; Bipolaris oryzae*), Dirty Panicle comprising Cercopsora *oryzae*; Curvularia lunata, Trichoconis padwickii, Sarocladium *oryzae, Fusarium semitectum*, Sheath Blight (*Rhizoctonia solani*=*Thanatephorus cucumeris* (aka Corticium sasakii), Bakanae disease (*Fusarium fujikuroi*=Giberella *fujikuroi*).

Mixtures A3-1 to A3-805 as defined above are suitable for controlling rice leaf, neck, collar and panicle blast especially *Pyricularia* grisae formerly *oryzae* as well as Brown spot (*Cochliobolus miyabeanus* formerly *Helminthosporium oryzae; Drechslera oryzae; Bipolaris oryzae*), Dirty Panicle comprising Cercopsora *oryzae*; Curvularia lunata, Trichoconis padwickii, Sarocladium *oryzae, Fusarium semitectum*, Sheath Blight (*Rhizoctonia solani*=*Thanatephorus cucumeris* (aka Corticium sasakii), Bakanae disease (*Fusarium fujikuroi*=Giberella *fujikuroi*).

Mixtures A1-1 to A1-805 as defined above are suitable for controlling pomefruit and stonefruit diseases especially *Venturia* spp., Monilinia spp., *Monilia* spp., *Alternaria* spp., Diplocarpon *mali*=*Marssonina coronaria.*

Mixtures A2-1 to A2-805 as defined above are suitable for controlling pomefruit and stonefruit diseases especially *Venturia* spp., Monilinia spp., *Monilia* spp., *Alternaria* spp., Diplocarpon *mali*=*Marssonina coronaria.*

Mixtures A3-1 to A3-805 as defined above are suitable for controlling pomefruit and stonefruit diseases especially *Venturia* spp., Monilinia spp., *Monilia* spp., *Alternaria* spp., Diplocarpon *mali*=*Marssonina coronaria.*

Mixtures A1-1 to A1-805 as defined above are suitable for controlling *Rhizoctonia* diseases especially *Rhizoctonia* solani in several crops like turf, cereals, as well as potato and leafy vegetables.

Mixtures A2-1 to A2-805 as defined above are suitable for controlling *Rhizoctonia* diseases especially *Rhizoctonia* solani in several crops like turf, cereals, as well as potato and leafy vegetables.

Mixtures A3-1 to A3-805 as defined above are suitable for controlling *Rhizoctonia* diseases especially *Rhizoctonia* solani in several crops like turf, cereals, as well as potato and leafy vegetables.

Mixtures A1-1 to A1-805 as defined above are suitable for controlling storage disease complexes in pome and stonefruits especially Gloeosporium spp., *Penicillium* spp., *Botrytis* spp., *Monilia* and Monilinia spp., Sphaeropsis spp., Neofabraea spp., *Mucor* spp.

Mixtures A2-1 to A2-805 as defined above are suitable for controlling storage disease complexes in pome and stonefruits especially Gloeosporium spp., *Penicillium* spp., *Botrytis* spp., *Monilia* and Monilinia spp., Sphaeropsis spp., Neofabraea spp., *Mucor* spp.

Mixtures A3-1 to A3-805 as defined above are suitable for controlling storage disease complexes in pome and stonefruits especially Gloeosporium spp., *Penicillium* spp., *Botrytis* spp., *Monilia* and Monilinia spp., Sphaeropsis spp., Neofabraea spp., *Mucor* spp.

Mixtures A1-1 to A1-805 as defined above are suitable for controlling different soil and seedborne pathogen especially like *Fusarium* species (*Fusarium* spp. Like *F. culmorum, F. graminearum*), snow mold Microdochium *nivale, Cochliobolus* spp., *Ustilago* spp., *Septoria* spp., *Pyrenophora* spp., *Cladosporium* spp., *Rhynchosporium* spp., Tilletia spp. and *Rhizoctonia solani*).

Mixtures A2-1 to A2-805 as defined above are suitable for controlling different soil and seedborne pathogen especially like *Fusarium* species (*Fusarium* spp. Like *F. culmorum, F. graminearum*), snow mold Microdochium *nivale*

*Cochliobolus* spp., *Ustilago* spp., *Septoria* spp., *Pyrenophora* spp., *Cladosporium* spp., *Rhynchosporium* spp., Tilletia spp. and *Rhizoctonia solani*).

Mixtures A3-1 to A3-805 as defined above are suitable for controlling different soil and seedborne pathogen especially like *Fusarium* species (*Fusarium* spp. Like *F. culmorum, F. graminearum*), snow mold Microdochium *nivale Cochliobolus* spp., *Ustilago* spp., *Septoria* spp., *Pyrenophora* spp., *Cladosporium* spp., *Rhynchosporium* spp., Tilletia spp. and *Rhizoctonia solani*).

Mixtures B1-1 to B1-7503 as defined above are suitable for controlling grey mold und white mold diseases especially *Botrytis* species (*Botrytis* spp.) and *Sclerotinia* species (*Sclerotinia* spp.).

Mixtures B2-1 to B2-7503 as defined above are suitable for controlling grey mold und white mold diseases especially *Botrytis* species (*Botrytis* spp.) and *Sclerotinia* species (*Sclerotinia* spp.).

Mixtures B3-1 to B3-7503 as defined above are suitable for controlling grey mold und white mold diseases especially *Botrytis* species (*Botrytis* spp.) and *Sclerotinia* species (*Sclerotinia* spp.).

Mixtures B1-1 to B1-7503 as defined above are suitable for controlling rice leaf, neck, collar and panicle blast especially *Pyricularia* grisae formerly *oryzae* as well as Brown spot (*Cochliobolus miyabeanus* formerly *Helminthosporium oryzae; Drechslera oryzae; Bipolaris oryzae*), Dirty Panicle comprising Cercopsora *oryzae*; Curvularia lunata, Trichoconis padwickii, Sarocladium *oryzae, Fusarium semitectum*, Sheath Blight (*Rhizoctonia solani*=*Thanatephorus cucumeris* (aka Corticium sasakii), Bakanae disease (*Fusarium fujikuroi*=Giberella fujikuro).

Mixtures B2-1 to B2-7503 as defined above are suitable for controlling rice leaf, neck, collar and panicle blast especially especially Pyriculariagrisae formerly *oryzae* as well as Brown spot (*Cochliobolus miyabeanus* formerly *Helminthosporium oryzae; Drechslera oryzae; Bipolaris oryzae*), Dirty Panicle comprising Cercopsora *oryzae*; Curvularia lunata, Trichoconis padwickii, Sarocladium *oryzae, Fusarium semitectum*, Sheath Blight (*Rhizoctonia solani*=*Thanatephorus cucumeris* (aka Corticium sasakii), Bakanae disease (*Fusarium fujikuroi*=Giberella *fujikuroi*).

Mixtures B3-1 to B3-7503 as defined above are suitable for controlling rice leaf, neck, collar and panicle blast especially *Pyricularia* grisae formerly *oryzae* as well as Brown spot (*Cochliobolus miyabeanus* formerly *Helminthosporium oryzae; Drechslera oryzae; Bipolaris oryzae*), Dirty Panicle comprising Cercopsora *oryzae*; Curvularia lunata, Trichoconis padwickii, Sarocladium *oryzae, Fusarium semitectum*, Sheath Blight (*Rhizoctonia solani*=*Thanatephorus cucumeris* (aka Corticium sasakii), Bakanae disease (*Fusarium fujikuroi*=Giberella *fujikuroi*).

Mixtures B1-1 to B1-7503 as defined above are suitable for controlling pomefruit and stonefruit diseases especially *Venturia* spp., Monilinia spp., *Monilia* spp., *Alternaria* spp., Diplocarpon *mali*=*Marssonina coronaria.*

Mixtures B2-1 to B2-7503 as defined above are suitable for controlling pomefruit and stonefruit diseases especially *Venturia* spp., Monilinia spp., *Monilia* spp., *Alternaria* spp., Diplocarpon *mali*=*Marssonina coronaria.*

Mixtures B3-1 to B3-7503 as defined above are suitable for controlling pomefruit and stonefruit diseases especially *Venturia* spp., Monilinia spp., *Monilia* spp., *Alternaria* spp., Diplocarpon *mali*=*Marssonina coronaria.*

Mixtures B1-1 to B1-7503 as defined above are suitable for controlling *Rhizoctonia* diseases especially *Rhizoctonia* solani in several crops like turf, cereals, as well as potato and leafy vegetables.

Mixtures B2-1 to B2-7503 as defined above are suitable for controlling *Rhizoctonia* diseases especially *Rhizoctonia* solani in several crops like turf, cereals, as well as potato and leafy vegetables.

Mixtures B3-1 to B3-7503 as defined above are suitable for controlling *Rhizoctonia* diseases especially *Rhizoctonia* solani in several crops like turf, cereals, as well as potato and leafy vegetables.

Mixtures B1-1 to B1-7503 as defined above are suitable for controlling storage disease complexes in pome and stonefruits especially Gloeosporium spp., *Penicillium* spp., *Botrytis* spp., *Monilia* and Monilinia spp., Sphaeropsis spp., Neofabraea spp., *Mucor* spp..

Mixtures B2-1 to B2-7503 as defined above are suitable for controlling storage disease complexes in pome and stonefruits especially Gloeosporium spp., *Penicillium* spp., *Botrytis* spp., *Monilia* and Monilinia spp., Sphaeropsis spp., Neofabraea spp., *Mucor* spp..

Mixtures B3-1 to B3-7503 as defined above are suitable for controlling storage disease complexes in pome and stonefruits especially Gloeosporium spp., *Penicillium* spp., *Botrytis* spp., *Monilia* and Monilinia spp., Sphaeropsis spp., Neofabraea spp., *Mucor* spp..

Mixtures B1-1 to B1-7503 as defined above are suitable for controlling different soil and seedborne pathogen especially like *Fusarium* species (*Fusarium* spp. Like *F. culmorum, F. graminearum*), snow mold Microdochium *nivale, Cochliobolus* spp., *Ustilago* spp., *Septoria* spp., *Pyrenophora* spp., *Cladosporium* spp., *Rhynchosporium* spp., Tilletia spp. and *Rhizoctonia solani*).

Mixtures B2-1 to B2-7503 as defined above are suitable for controlling different soil and seedborne pathogen especially like *Fusarium* species (*Fusarium* spp. Like *F. culmorum, F. graminearum*), snow mold Microdochium *nivale Cochliobolus* spp., *Ustilago* spp., *Septoria* spp., *Pyrenophora* spp., *Cladosporium* spp., *Rhynchosporium* spp., Tilletia spp. and *Rhizoctonia solani*).

Mixtures B3-1 to B3-7503 as defined above are suitable for controlling different soil and seedborne pathogen especially like *Fusarium* species (*Fusarium* spp. like *F. culmorum, F. graminearum*), snow mold Microdochium *nivale, Cochliobolus* spp., *Ustilago* spp., *Septoria* spp., *Pyrenophora* spp., *Cladosporium* spp., *Rhynchosporium* spp., Tilletia spp. and *Rhizoctonia solani*).

The compounds I and compositions thereof, respectively, are also suitable for controlling harmful fungi in the protection of stored products or harvest and in the protection of materials.

The term "protection of materials" is to be understood to denote the protection of technical and non-living materials, such as adhesives, glues, wood, paper and paperboard, textiles, leather, paint dispersions, plastics, cooling lubricants, fiber or fabrics, against the infestation and destruction by harmful microorganisms, such as fungi and bacteria. As to the protection of wood and other materials, the particular attention is paid to the following harmful fungi: Ascomycetes such as *Ophiostoma* spp., Ceratocystisspp., *Aureobasidium pullulans*, Sclerophoma spp., *Chaetomium* spp., *Humicola* spp., Petriella spp., Trichurus spp.; Basidiomycetes such as Coniophora spp., *Coriolus* spp., Gloeophyllum spp., Lentinus spp., Pleurotus spp., Poria spp., Serpula spp.

and Tyromyces spp., Deuteromycetes such as *Aspergillus* spp., *Cladosporium* spp., *Penicillium* spp., *Trichoderma* spp., *Alternaria* spp., Paecilomycesspp. and Zygomycetes such as Mucorspp., and in addition in the protection of stored products and harvest the following yeast fungi are worthy of note: *Candida* spp. and *Saccharomyces cerevisae.*

The method of treatment according to the invention can also be used in the field of protecting stored products or harvest against attack of fungi and microorganisms. According to the present invention, the term "stored products" is understood to denote natural substances of plant or animal origin and their processed forms, which have been taken from the natural life cycle and for which long-term protection is desired. Stored products of crop plant origin, such as plants or parts thereof, for example stalks, leafs, tubers, seeds, fruits or grains, can be protected in the freshly harvested state or in processed form, such as pre-dried, moistened, comminuted, ground, pressed or roasted, which process is also known as post-harvest treatment. Also falling under the definition of stored products is timber, whether in the form of crude timber, such as construction timber, electricity pylons and barriers, or in the form of finished articles, such as furniture or objects made from wood. Stored products of animal origin are hides, leather, furs, hairs and the like. The combinations according the present invention can prevent disadvantageous effects such as decay, discoloration or mold. Preferably "stored products" is understood to denote natural substances of plant origin and their processed forms, more preferably fruits and their processed forms, such as pomes, stone fruits, soft fruits and citrus fruits and their processed forms.

The compounds I and compositions thereof, respectively, may be used for improving the health of a plant. The invention also relates to a method for improving plant health by treating a plant, its propagation material and/or the locus where the plant is growing or is to grow with an effective amount of compounds I and compositions thereof, respectively.

The term "plant health" is to be understood to denote a condition of the plant and/or its products which is determined by several indicators alone or in combination with each other such as yield (e. g. increased biomass and/or increased content of valuable ingredients), plant vigor (e. g. improved plant growth and/or greener leaves ("greening effect")), quality (e. g. improved content or composition of certain ingredients) and tolerance to abiotic and/or biotic stress. The above identified indicators for the health condition of a plant may be interdependent or may result from each other.

The compounds of formula I can be present in different crystal modifications whose biological activity may differ. They are likewise subject matter of the present invention.

The compounds I are employed as such or in form of compositions by treating the fungi or the plants, plant propagation materials, such as seeds, soil, surfaces, materials or rooms to be protected from fungal attack with a fungicidally effective amount of the active substances. The application can be carried out both before and after the infection of the plants, plant propagation materials, such as seeds, soil, surfaces, materials or rooms by the fungi.

Plant propagation materials may be treated with compounds I as such or a composition comprising at least one compound I prophylactically either at or before planting or transplanting.

The invention also relates to agrochemical compositions comprising an auxiliary and at least one compound I according to the invention.

An agrochemical composition comprises a fungicidally effective amount of a compound I. The term "effective amount" denotes an amount of the composition or of the compounds I, which is sufficient for controlling harmful fungi on cultivated plants or in the protection of materials and which does not result in a substantial damage to the treated plants. Such an amount can vary in a broad range and is dependent on various factors, such as the fungal species to be controlled, the treated cultivated plant or material, the climatic conditions and the specific compound I used.

The compounds I, their N-oxides and salts can be converted into customary types of agrochemical compositions, e. g. solutions, emulsions, suspensions, dusts, powders, pastes, granules, pressings, capsules, and mixtures thereof. Examples for composition types are suspensions (e. g. SC, OD, FS), emulsifiable concentrates (e. g. EC), emulsions (e. g. EW, EO, ES, ME), capsules (e. g. CS, ZC), pastes, pastilles, wettable powders or dusts (e. g. WP, SP, WS, DP, DS), pressings (e. g. BR, TB, DT), granules (e. g. WG, SG, GR, FG, GG, MG), insecticidal articles (e. g. LN), as well as gel formulations for the treatment of plant propagation materials such as seeds (e. g. GF). These and further compositions types are defined in the "Catalogue of pesticide formulation types and international coding system", Technical Monograph No. 2, $6^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

The binary or ternary mixtures of active compounds described herein can be prepared as compositions comprising besides the active ingredients at least one inert ingredient (auxiliary) by usual means, e. g. by the means given herein for the compositions of compounds I. Concerning usual ingredients of such compositions reference is made to the explanations given for the compositions containing compounds I.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e. g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e. g. ethanol, propanol, butanol, benzyl alcohol, cyclohexanol; glycols; DMSO; ketones, e. g. cyclohexanone; esters, e. g. lactates, carbonates, fatty acid esters, gamma-butyrolactone; fatty acids; phosphonates; amines; amides, e. g. N-methyl pyrrolidone, fatty acid dimethyl amides; and mixtures thereof.

Suitable solid carriers or fillers are mineral earths, e. g. silicates, silica gels, talc, kaolins, limestone, lime, chalk, clays, dolomite, diatomaceous earth, bentonite, calcium sulfate, magnesium sulfate, magnesium oxide; polysaccharides, e. g. cellulose, starch; fertilizers, e. g. ammonium sulfate, ammonium phosphate, ammonium nitrate, ureas; products of vegetable origin, e. g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol.1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylaryl sulfonates, diphenyl sulfonates, alpha-olefin sulfonates, lignin sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkyl naphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinyl pyrrolidone, vinyl alcohols, or vinyl acetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B—C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinyl amines or polyethylene amines.

Suitable adjuvants are compounds, which have a negligible or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are polysaccharides (e. g. xanthan gum, carboxymethyl cellulose), inorganic clays (organically modified or unmodified), polycarboxylates, and silicates.

Suitable bactericides are bronopol and isothiazolinone derivatives such as alkyliso-thiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e. g. in red, blue, or green) are pigments of low water solubility and water-soluble dyes. Examples are inorganic colorants (e. g. iron oxide, titan oxide, iron hexacyanoferrate) and organic colorants (e. g. alizarin-, azo- and phthalocyanine colorants).

Suitable tackifiers or binders are polyvinyl pyrrolidones, polyvinyl acetates, polyvinyl alcohols, polyacrylates, biological or synthetic waxes, and cellulose ethers.

Examples for composition types and their preparation are:

i) Water-Soluble Concentrates (SL, LS)

10-60 wt % of a compound I and 5-15 wt % wetting agent (e. g. alcohol alkoxylates) are dissolved in water and/or in a water-soluble solvent (e. g. alcohols) ad 100 wt %. The active compound dissolves upon dilution with water.

ii) Dispersible Concentrates (DC)

5-25 wt % of a compound I and 1-10 wt % dispersant (e. g. polyvinyl pyrrolidone) are dissolved in organic solvent (e. g. cyclohexanone) ad 100 wt %. Dilution with water gives a dispersion.

iii) Emulsifiable Concentrates (EC)

15-70 wt % of a compound I and 5-10 wt % emulsifiers (e. g. calcium dodecylbenzenesulfonate and castor oil ethoxylate) are dissolved in water-insoluble organic solvent (e. g. aromatic hydrocarbon) ad 100 wt %. Dilution with water gives an emulsion.

iv) Emulsions (EW, EO, ES)

5-40 wt % of a compound I and 1-10 wt % emulsifiers (e. g. calcium dodecylbenzenesulfonate and castor oil ethoxylate) are dissolved in 20-40 wt % water-insoluble organic solvent (e. g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of a compound I are comminuted with addition of 2-10 wt % dispersants and wetting agents (e. g. sodium lignosulfonate and alcohol ethoxylate), 0.1-2 wt % thickener (e. g. xanthan gum) and water ad 100 wt % to give a fine active compound suspension. Dilution with water gives a stable suspension of the active substance. For FS type composition up to 40 wt % binder (e. g. polyvinyl alcohol) is added.

vi) Water-Dispersible Granules and Water-Soluble Granules (WG, SG)

50-80 wt % of a compound I are ground finely with addition of dispersants and wetting agents (e. g. sodium lignosulfonate and alcohol ethoxylate) ad 100 wt % and prepared as water-dispersible or water-soluble granules by means of technical appliances (e. g. extrusion, spray tower, fluidized bed). Dilution with water gives a stable dispersion or solution of the active substance.

vii) Water-Dispersible Powders and Water-Soluble Powders (WP, SP, WS)

50-80 wt % of a compound I are ground in a rotor-stator mill with addition of 1-5 wt % dispersants (e. g. sodium lignosulfonate), 1-3 wt % wetting agents (e. g. alcohol ethoxylate) and solid carrier (e. g. silica gel) ad 100 wt %. Dilution with water gives a stable dispersion or solution of the active substance.

viii) Gel (GW, GF)

In an agitated ball mill, 5-25 wt % of a compound I are comminuted with addition of 3-10 wt % dispersants (e. g. sodium lignosulfonate), 1-5 wt % thickener (e. g. carboxymethyl cellulose) and water ad 100 wt % to give a fine suspension of the active substance. Dilution with water gives a stable suspension of the active substance.

ix) Microemulsion (ME)

5-20 wt % of a compound I are added to 5-30 wt % organic solvent blend (e. g. fatty acid dimethyl amide and cyclohexanone), 10-25 wt % surfactant blend (e. g. alcohol ethoxylate and arylphenol ethoxylate), and water ad 100%. This mixture is stirred for 1 h to produce spontaneously a thermodynamically stable microemulsion.

x) Microcapsules (CS)

An oil phase comprising 5-50 wt % of a compound I, 0-40 wt % water insoluble organic solvent (e. g. aromatic hydrocarbon), 2-15 wt % acrylic monomers (e. g. methylmethacrylate, methacrylic acid and a di- or triacrylate) are dispersed into an aqueous solution of a protective colloid (e. g. polyvinyl alcohol). Radical polymerization results in the formation of poly(meth)acrylate microcapsules. Alternatively, an oil phase comprising 5-50 wt % of a compound I according to the invention, 0-40 wt % water insoluble organic solvent (e. g. aromatic hydrocarbon), and an isocyanate monomer (e. g. diphenylmethene-4,4'-diisocyanatae) are dispersed into an aqueous solution of a protective colloid (e. g. polyvinyl alcohol). The addition of a polyamine (e. g. hexamethylenediamine) results in the formation of polyurea microcapsules. The monomers amount to 1-10 wt %. The wt % relate to the total CS composition.

xi) Dustable Powders (DP, DS)

1-10 wt % of a compound I are ground finely and mixed intimately with solid carrier (e. g. finely divided kaolin) ad 100 wt %.

xii) Granules (GR, FG)

0.5-30 wt % of a compound I is ground finely and associated with solid carrier (e. g. silicate) ad 100 wt %. Granulation is achieved by extrusion, spray-drying or fluidized bed.

xiii) Ultra-Low Volume Liquids (UL) 1-50 wt % of a compound I are dissolved in organic solvent (e. g. aromatic hydrocarbon) ad 100 wt %.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The agrochemical compositions generally comprise between 0.01 and 95%, preferably between 0.1 and 90%, more preferably between 1 and 70%, and in particular between 10 and 60%, by weight of active substance. The active substances are employed in a purity of from 90% to 100%, preferably from 95% to 100% (according to NMR spectrum).

For the purposes of treatment of plant propagation materials, particularly seeds, solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC), and gels (GF) are usually employed. The compositions in question give, after two-to-tenfold dilution, active compound concentrations of from 0.01 to 60% by weight, preferably from 0.1 to 40%, in the ready-to-use preparations. Application can be carried out before or during sowing. Methods for applying compound I and compositions thereof, respectively, onto plant propagation material, especially seeds, include dressing, coating, pelleting, dusting, and soaking as well as in-furrow application methods. Preferably, compound I or the compositions thereof, respectively, are applied on to the plant propagation material by a method such that germination is not induced, e. g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.05 to 0.9 kg per ha, and in particular from 0.1 to 0.75 kg per ha.

In treatment of plant propagation materials such as seeds, e. g. by dusting, coating or drenching seed, amounts of active compound of from 0.1 to 1000 g, preferably from 1 to 1000 g, more preferably from 1 to 100 g and most preferably from 5 to 100 g, per 100 kilogram of plant propagation material (preferably seeds) are generally required.

When used in the protection of materials or stored products, the amount of active compound applied depends on the kind of application area and on the desired effect. Amounts customarily applied in the protection of materials are 0.001 g to 2 kg, preferably 0.005 g to 1 kg, of active compound per cubic meter of treated material.

Various types of oils, wetters, adjuvants, fertilizer, or micronutrients, and further pesticides (e. g. herbicides, insecticides, fungicides, growth regulators, safeners, biopesticides) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

A pesticide is generally a chemical or biological agent (such as pestidal active ingredient, compound, composition, virus, bacterium, antimicrobial or disinfectant) that through its effect deters, incapacitates, kills or otherwise discourages pests. Target pests can include insects, plant pathogens, weeds, mollusks, birds, mammals, fish, nematodes (roundworms), and microbes that destroy property, cause nuisance, spread disease or are vectors for disease. The term "pesticide" includes also plant growth regulators that alter the expected growth, flowering, or reproduction rate of plants; defoliants that cause leaves or other foliage to drop from a plant, usually to facilitate harvest; desiccants that promote drying of living tissues, such as unwanted plant tops; plant activators that activate plant physiology for defense of against certain pests; safeners that reduce unwanted herbicidal action of pesticides on crop plants; and plant growth promoters that affect plant physiology e.g. to increase plant growth, biomass, yield or any other quality parameter of the harvestable goods of a crop plant.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary or ternary mixture may be mixed by the user himself in a spray tank or any other kind of vessel used for applications (e. g. seed treater drums, seed pelleting machinery, knapsack sprayer) and further auxiliaries may be added, if appropriate.

Consequently, one embodiment of the invention is a kit for preparing a usable pesticidal composition, the kit comprising a) a composition comprising component 1) as defined herein and at least one auxiliary; and b) a composition comprising component 2) as defined herein and at least one auxiliary; and optionally c) a composition comprising at least one auxiliary and optionally a further active component 3) as defined herein.

Mixing the compounds I or the compositions comprising them in the use form as fungicides with other fungicides results in many cases in an expansion of the fungicidal spectrum of activity being obtained or in a prevention of fungicide resistance development. Furthermore, in many cases, synergistic effects are obtained.

The present invention furthermore relates to agrochemical compositions comprising a mixture of at least one compound I (component 1) and at least one further active compound useful for plant protection, e. g. selected from the groups A) to O) (component 2), in particular one further fungicide, e. g. one or more fungicide from the groups A) to K), as described above, and if desired one suitable solvent or solid carrier. Those mixtures are of particular interest, since many of them at the same application rate show higher efficiencies against harmful fungi. Furthermore, combating harmful fungi with a mixture of compounds 1 and at least one fungicide from groups A) to K), as described above, is more efficient than combating those fungi with individual compounds I or individual fungicides from groups A) to K).

By applying compounds I together with at least one active compound from groups A) to O) a synergistic effect can be obtained, i.e. more than simple addition of the individual effects is obtained (synergistic mixtures).

This can be obtained by applying the compounds I and at least one further active compound simultaneously, either jointly (e. g. as tank-mix) or seperately, or in succession, wherein the time interval between the individual applications is selected to ensure that the active compound applied first still occurs at the site of action in a sufficient amount at the time of application of the further active substance(s). The order of application is not essential for working of the present invention.

When applying compound I and a pesticide II sequentially the time between both applications may vary e. g. between 2 hours to 7 days. Also a broader range is possible ranging from 0.25 hour to 30 days, preferably from 0.5 hour to 14 days, particularly from 1 hour to 7 days or from 1.5 hours to 5 days, even more preferred from 2 hours to 1 day.

In the binary mixtures and compositions according to the invention the weight ratio of the component 1) and the component 2) generally depends from the properties of the active components used, usually it is in the range of from 1:10000 to 10000:1, often it is in the range of from 1:100 to 100:1, regularly in the range of from 1:50 to 50:1, preferably in the range of from 1:20 to 20:1, more preferably in the range of from 1:5 to 5:1 and in particular in the range of from 1:2 to 2:1.

According to a further embodiment of the binary mixtures and compositions, the weight ratio of the component 1) and the component 2) usually is in the range of from 1000:1 to 1:1, often in the range of from 100:1 to 1:1, regularly in the range of from 50:1 to 1:1, preferably in the range of from 20:1 to 1:1, more preferably in the range of from 5:1 to 1:1 and in particular in the range of from 2:1 to 1:1.

According to a further embodiments of the binary mixtures and compositions, the weight ratio of the component 1) and the component 2) usually is in the range of from 1:1 to 1:1000, often in the range of from 1:1 to 1:100, regularly in the range of from 1:1 to 1:50, preferably in the range of from 1:1 to 1:20, more preferably in the range of from 1:1 to 1:5 and in particular in the range of from 1:1 to 1:2.

In the ternary mixtures, i.e. compositions according to the invention comprising the component 1) and component 2) and a compound III (component 3), the weight ratio of component 1) and component 2) is in the range of from 1:100 to 100:1, regularly in the range of from 1:50 to 50:1, preferably in the range of from 1:20 to 20:1, more preferably in the range of from 1:5 to 5:1 and in particular in the range of from 1:2 to 2:1, and the weight ratio of component 1) and component 3) is in the range of from 1:100 to 100:1, regularly in the range of from 1:50 to 50:1, preferably in the range of from 1:20 to 20:1, more preferably in the range of from 1:5 to 5:1 and in particular in the range of from 1:2 to 2:1.

Any further active components are, if desired, added in a ratio of from 20:1 to 1:20 to the component 1).

These ratios are also suitable for inventive mixtures applied by seed treatment.

The fungicidal action of the mixtures according to the invention can be shown by the tests described below.

The visually determined percentages of infected leaf areas are converted into efficacies in % of the untreated control.

The efficacy (E) is calculated as follows using Abbot's formula:

$$E=(1-\alpha/\beta)\cdot 100$$

α corresponds to the fungicidal infection of the treated plants in % and

β corresponds to the fungicidal infection of the untreated (control) plants in %

An efficacy of 0 means that the infection level of the treated plants corresponds to that of the untreated control plants; an efficacy of 100 means that the treated plants were not infected.

The expected efficacies of active compound combinations may be determined using Colby's formula (Colby, S. R. "Calculating synergistic and antagonistic responses of herbicide combinations", Weeds, 15, pp. 20-22, 1967) and compared with the observed efficacies.

Colby's formula:

$$E=x+y-x\cdot y/100$$

E expected efficacy, expressed in % of the untreated control, when using the mixture of the active compounds A and B at the concentrations a and b x efficacy, expressed in % of the untreated control, when using the active compound A at the concentration a y efficacy, expressed in % of the untreated control, when using the active compound B at the concentration b.

Microtest

The active compounds were formulated separately as a stock solution having a concentration of 10000 ppm in dimethyl sulfoxide.

The products sulfur and mandestrobin were used as commercial finished formulations and diluted with water to the stated concentration of the active compound.

Example 1—Activity Against the Grey Mold *Botrytis* Cineres in the Microtiterplate Test The stock solutions were mixed according to the ratio, pipetted onto a micro titer plate (MTP) and diluted with water to the stated concentrations. A spore suspension of Botrci *cinerea* in an aqueous biomalt or yeast-bactopeptone-sodiumacetate solution was then added. The plates were placed in a water vapor-saturated chamber at a temperature of 18° C. Using an absorption photometer, the MTPs were measured at 405 nm 7 days after the inoculation.

| Active compound/active mixture | Concentration (ppm) | Mix-ture | Observed efficacy |
|---|---|---|---|
| 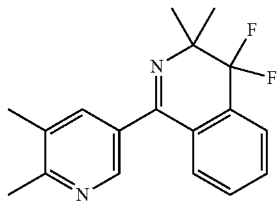 [SMILES: Cc1cc(C2=NC(C)(C)C(F)(F)c3ccccc32)cnc1C] | 16 | — | 19 |
| | 4 | — | 16 |
| | 1 | — | 13 |
| | 0.25 | — | 13 |
| Compound 1-1 | | | |
| 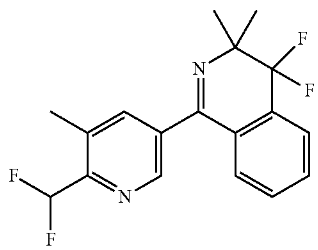 [SMILES: Cc1cc(C2=NC(C)(C)C(F)(F)c3ccccc32)cnc1C(F)F] | 16 | — | 31 |
| | 4 | — | 19 |
| | 1 | — | 15 |
| Compound 1-2 | | | |
| 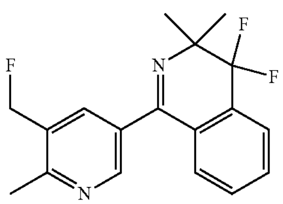 [SMILES: Cc1ncc(C2=NC(C)(C)C(F)(F)c3ccccc32)cc1CF] | 16 | — | 19 |
| | 4 | — | 9 |
| | 1 | — | 6 |
| Compound 1-3 | | | |
| 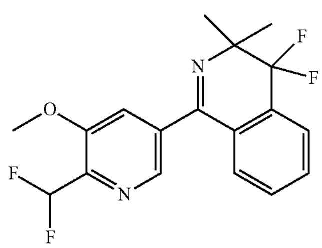 [SMILES: COc1cc(C2=NC(C)(C)C(F)(F)c3ccccc32)cnc1C(F)F] | 16 | — | 41 |
| | 4 | — | 21 |
| | 1 | — | 12 |
| Compound 1-4 | | | |
| Azoxystrobin | 0.063 | — | 5 |
| Boscalid | 1 | — | 63 |
| Cyprodinil | 4 | — | 53 |
| Difenoconazol | 0.25 | — | 21 |
| Dimoxystrobin | 0.25 | — | 12 |
| | 0.063 | — | 0 |
| Dithianon | 0.25 | — | 4 |
| Florylpicoxamid | 1 | — | 12 |
| | 0.25 | — | 2 |
| Fluindapyr | 0.25 | — | 30 |
| Fluxapyroxad | 0.063 | — | 28 |
| Imazalil | 1 | — | 54 |
| Inpyrfluxam | 0.25 | — | 44 |
| Isofetamid | 1 | — | 68 |
| Isoflucypram | 0.25 | — | 59 |
| Mefentrifluconazol | 0.016 | — | 10 |
| Mepanipyrim | 4 | — | 72 |
| | 1 | — | 63 |
| Metalaxyl | 4 | — | 19 |
| Metrafenon | 16 | — | 18 |
| | 4 | — | 3 |
| Probenazol | 63 | — | 22 |
| Pyrapropyon | 16 | — | 71 |

-continued

| Active compound/active mixture | Concentration (ppm) | Mix-ture | Observed efficacy |
|---|---|---|---|
| 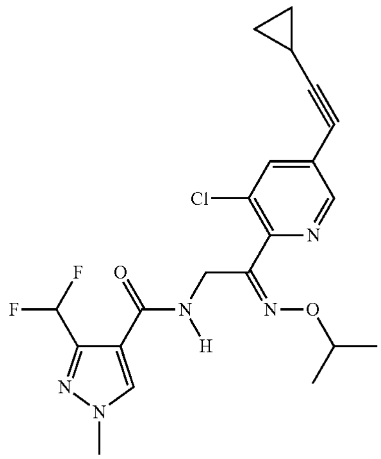 [SMILES: CC(C)O/N=C(/CNC(=O)c1cn(C)nc1C(F)F)c1ncc(C#CC2CC2)cc1Cl] | 4 | — | 35 |
| Pyroquilon | 1 | — | 2 |
| Pyrimethanil | 4 | — | 72 |
| | 1 | — | 50 |
| Quinofumelin | 1 | — | 30 |
| Tetraconazol | 0.063 | — | 5 |
| Thifluzamid | 4 | — | 37 |
| Tiadinil | 63 | — | 19 |
| | 16 | — | 6 |
| Tricyclazol | 4 | — | 2 |
| Trifloxystrobin | 0.063 | — | 4 |

| Mixture | Concentration (ppm) | Mixture | Observed efficacy | Calculated efficacy according to Colby (%) |
|---|---|---|---|---|
| Compound 1-1 | 4 | 4:1 | 88 | 69 |
| Boscalid | 1 | | | |
| Compound 1-1 | 16 | 16:1 | 95 | 70 |
| Boscalid | 1 | | | |
| Compound 1-1 | 4 | 1:1 | 99 | 60 |
| Cyprodinil | 4 | | | |
| Compound 1-1 | 1 | 1:4 | 100 | 59 |
| Cyprodinil | 4 | | | |
| Compound 1-1 | 16 | 4:1 | 100 | 62 |
| Cyprodinil | 4 | | | |
| Compound 1-1 | 16 | 63:1 | 100 | 37 |
| Difenoconazol | 0.25 | | | |
| Compound 1-1 | 16 | 63:1 | 52 | 29 |
| Dimoxystrobin | 0.25 | | | |
| Compound 1-1 | 16 | 16:1 | 70 | 29 |
| Florylpicoxamid | 1 | | | |
| Compound 1-1 | 16 | 63:1 | 84 | 43 |
| Fluindapyr | 0.25 | | | |
| Compound 1-1 | 16 | 250:1 | 75 | 42 |
| Fluxapyroxad | 0.063 | | | |
| Compound 1-1 | 4 | 63:1 | 66 | 40 |
| Fluxapyroxad | 0.063 | | | |
| Compound 1-1 | 4 | 16:1 | 80 | 53 |
| Inpyrfluxam | 0.25 | | | |
| Compound 1-1 | 16 | 63:1 | 91 | 55 |
| Inpyrfluxam | 0.25 | | | |
| Compound 1-1 | 16 | 16:1 | 93 | 74 |
| Isofetamid | 1 | | | |
| Compound 1-1 | 4 | 16:1 | 86 | 65 |
| Isoflucypram | 0.25 | | | |
| Compound 1-1 | 16 | 63:1 | 95 | 67 |
| Isoflucypram | 0.25 | | | |
| Compound 1-1 | 16 | 4:1 | 100 | 77 |
| Mepanipyrim | 4 | | | |
| Compound 1-1 | 4 | 1:1 | 100 | 76 |
| Mepanipyrim | 4 | | | |

-continued
| Mixture | Concentration (ppm) | Mixture | Observed efficacy | Calculated efficacy according to Colby (%) |
|---|---|---|---|---|
| Compound 1-1 | 16 | 16:1 | 98 | 70 |
| Mepanipyrim | 1 | | | |
| Compound 1-1 | 4 | 1:1 | 57 | 32 |
| Metalaxyl | 4 | | | |
| Compound 1-1 | 16 | 1:4 | 96 | 37 |
| Probenazol | 63 | | | |
| Compound 1-1 | 4 | 1:16 | 89 | 35 |
| Probenazol | 63 | | | |
| Compound 1-1 | 4 | 1:4 | 94 | 75 |
| Pyrapropyon | 16 | | | |
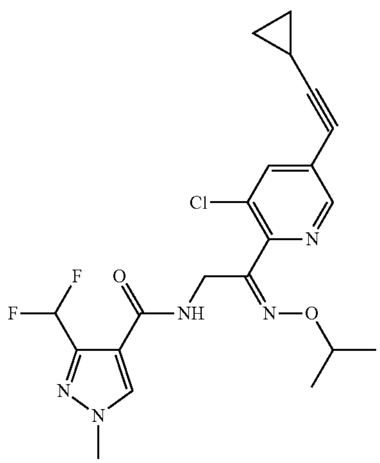 [SMILES: CC(C)O/N=C(/CNC(=O)c1cn(C)nc1C(F)F)c1ncc(C#CC2CC2)cc1Cl]
| | | | | |
|---|---|---|---|---|
| Compound 1-1 | 0.25 | 1:16 | 70 | 43 |
| Pyrapropyon | 4 | | | |
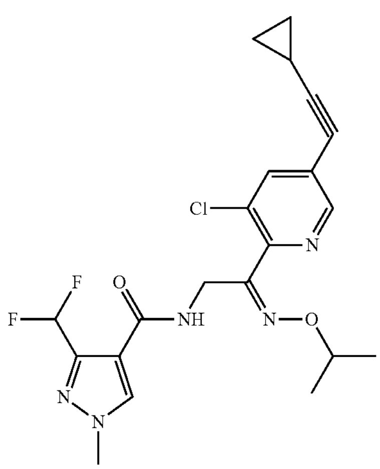 [SMILES: CC(C)O/N=C(/CNC(=O)c1cn(C)nc1C(F)F)c1ncc(C#CC2CC2)cc1Cl]
| | | | | |
|---|---|---|---|---|
| Compound 1-1 | 4 | 1:1 | 99 | 76 |
| Pyrapropyon | 4 | | | |

-continued

| Mixture | Concentration (ppm) | Mixture | Observed efficacy | Calculated efficacy according to Colby (%) |
|---|---|---|---|---|
| 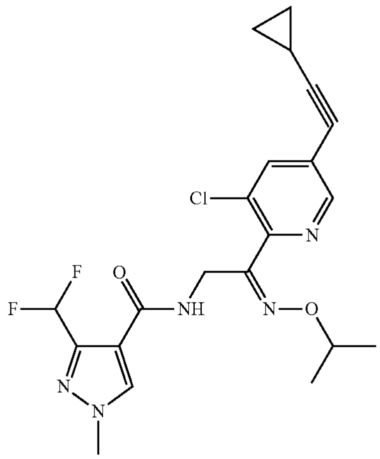 [SMILES: CC(C)O/N=C(/CNC(=O)c1cn(C)nc1C(F)F)c1ncc(C#CC2CC2)cc1Cl] | | | | |
| Compound 1-1 | 4 | 1:1 | 96 | 77 |
| Pyrimethanil | 4 | | | |
| Compound 1-1 | 16 | 4:1 | 100 | 78 |
| Pyrimethanil | 4 | | | |
| Compound 1-1 | 1 | 1:4 | 99 | 76 |
| Pyrimethanil | 4 | | | |
| Compound 1-1 | 16 | 16:1 | 79 | 43 |
| Quinofumelin | 1 | | | |
| Compound 1-1 | 16 | 4:1 | 79 | 49 |
| Thifluzamid | 4 | | | |
| Compound 1-1 | 16 | 1:4 | 97 | 35 |
| Tiadinil | 63 | | | |
| Compound 1-1 | 16 | 1:1 | 79 | 24 |
| Tiadinil | 16 | | | |
| Compound 1-1 | 16 | 250:1 | 47 | 23 |
| Trifloxystrobin | 0.063 | | | |

| Active compound/active mixture | Concentration (ppm) | Mixture | Observed efficacy | Calculated efficacy according to Colby (%) |
|---|---|---|---|---|
| Compound 1-2 | 16 | 250:1 | 58 | 34 |
| Azoxystrobin | 0.063 | | | |
| Compound 1-2 | 16 | 16:1 | 92 | 74 |
| Boscalid | 1 | | | |
| Compound 1-2 | 16 | 4:1 | 100 | 67 |
| Cyprodinil | 4 | | | |
| Compound 1-2 | 4 | 1:1 | 100 | 62 |
| Cyprodinil | 4 | | | |
| Compound 1-2 | 16 | 63:1 | 64 | 39 |
| Dimoxystrobin | 0.25 | | | |
| Compound 1-2 | 16 | 250:1 | 83 | 31 |
| Dimoxystrobin | 0.063 | | | |
| Compound 1-2 | 16 | 16:1 | 80 | 39 |
| Florylpicoxamid | 1 | | | |
| Compound 1-2 | 16 | 63:1 | 62 | 32 |
| Florylpicoxamid | 0.25 | | | |
| Compound 1-2 | 4 | 16:1 | 62 | 43 |
| Fluindapyr | 0.25 | | | |
| Compound 1-2 | 16 | 63:1 | 84 | 51 |
| Fluindapyr | 0.25 | | | |
| Compound 1-2 | 16 | 250:1 | 80 | 50 |
| Fluxapyroxad | 0.063 | | | |
| Compound 1-2 | 4 | 63:1 | 57 | 41 |
| Fluxapyroxad | 0.063 | | | |
| Compound 1-2 | 16 | 16:1 | 100 | 68 |
| Imazalil | 1 | | | |
| Compound 1-2 | 4 | 4:1 | 100 | 62 |
| Imazalil | 1 | | | |

-continued

| Active compound/active mixture | Concentration (ppm) | Mixture | Observed efficacy | Calculated efficacy according to Colby (%) |
|---|---|---|---|---|
| Compound 1-2 | 4 | 16:1 | 80 | 54 |
| Inpyrfluxam | 0.25 | | | |
| Compound 1-2 | 16 | 63:1 | 88 | 61 |
| Inpyrfluxam | 0.25 | | | |
| Compound 1-2 | 4 | 16:1 | 84 | 67 |
| Isoflucypram | 0.25 | | | |
| Compound 1-2 | 16 | 63:1 | 92 | 71 |
| Isoflucypram | 0.25 | | | |
| Compound 1-2 | 16 | 4:1 | 100 | 80 |
| Mepanipyrim | 4 | | | |
| Compound 1-2 | 4 | 1:1 | 100 | 77 |
| Mepanipyrim | 4 | | | |
| Compound 1-2 | 16 | 16:1 | 94 | 74 |
| Mepanipyrim | 1 | | | |
| Compound 1-2 | 4 | 1:4 | 51 | 33 |
| Metrafenon | 16 | | | |
| Compound 1-2 | 16 | 4:1 | 62 | 32 |
| Metrafenon | 4 | | | |
| Compound 1-2 | 16 | 1:4 | 93 | 46 |
| Probenazol | 63 | | | |
| Compound 1-2 | 4 | 1:16 | 85 | 37 |
| Probenazol | 63 | | | |
| Compound 1-2 | 16 | 1:1 | 99 | 80 |
| Pyrapropyon | 16 | | | |

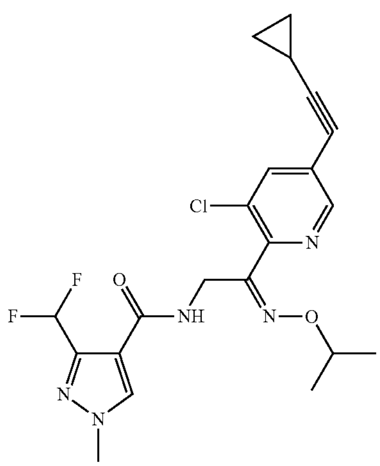 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-2 | 4 | 1:1 | 100 | 77 |
| Pyrimethanil | 4 | | | |
| Compound 1-2 | 1 | 1:4 | 100 | 76 |
| Pyrimethanil | 4 | | | |
| Compound 1-2 | 16 | 4:1 | 100 | 81 |
| Pyrimethanil | 4 | | | |
| Compound 1-2 | 16 | 16:1 | 85 | 51 |
| Quinofumelin | 1 | | | |
| Compound 1-2 | 4 | 1:1 | 72 | 49 |
| Thifluzamid | 4 | | | |
| Compound 1-2 | 16 | 1:4 | 88 | 44 |
| Tiadinil | 63 | | | |
| Compound 1-2 | 4 | 1:16 | 55 | 34 |
| Tiadinil | 63 | | | |
| Compound 1-2 | 16 | 1:1 | 76 | 34 |
| Tiadinil | 16 | | | |

| Active compound/active mixture | Concentration (ppm) | Mixture | Observed efficacy | Calculated efficacy according to Colby (%) |
|---|---|---|---|---|
| Compound 1-3 | 4 | 4:1 | 86 | 66 |
| Boscalid | 1 | | | |
| Compound 1-3 | 16 | 16:1 | 92 | 70 |
| Boscalid | 1 | | | |

-continued

| Active compound/active mixture | Concentration (ppm) | Mixture | Observed efficacy | Calculated efficacy according to Colby (%) |
|---|---|---|---|---|
| Compound 1-3 | 4 | 1:1 | 99 | 57 |
| Cyprodinil | 4 | | | |
| Compound 1-3 | 1 | 1:4 | 96 | 56 |
| Cyprodinil | 4 | | | |
| Compound 1-3 | 16 | 4:1 | 100 | 62 |
| Cyprodinil | 4 | | | |
| Compound 1-3 | 16 | 63:1 | 52 | 29 |
| Dimoxystrobin | 0.25 | | | |
| Compound 1-3 | 16 | 16:1 | 55 | 29 |
| Florylpicoxamid | 1 | | | |
| Compound 1-3 | 4 | 16:1 | 62 | 36 |
| Fluindapyr | 0.25 | | | |
| Compound 1-3 | 16 | 63:1 | 82 | 43 |
| Fluindapyr | 0.25 | | | |
| Compound 1-3 | 16 | 250:1 | 74 | 42 |
| Fluxapyroxad | 0.063 | | | |
| Compound 1-3 | 4 | 63:1 | 53 | 34 |
| Fluxapyroxad | 0.063 | | | |
| Compound 1-3 | 16 | 16:1 | 92 | 63 |
| Imazalil | 1 | | | |
| Compound 1-3 | 4 | 4:1 | 98 | 58 |
| Imazalil | 1 | | | |
| Compound 1-3 | 4 | 16:1 | 79 | 49 |
| Inpyrfluxam | 0.25 | | | |
| Compound 1-3 | 16 | 63:1 | 85 | 55 |
| Inpyrfluxam | 0.25 | | | |
| Compound 1-3 | 4 | 16:1 | 85 | 63 |
| Isoflucypram | 0.25 | | | |
| Compound 1-3 | 4 | 1:1 | 100 | 74 |
| Mepanipyrim | 4 | | | |
| Compound 1-3 | 16 | 1:4 | 93 | 37 |
| Probenazol | 63 | | | |
| Compound 1-3 | 4 | 1:16 | 90 | 29 |
| Probenazol | 63 | | | |
| Compound 1-3 | 16 | 1:1 | 99 | 76 |
| Pyrapropyon | 16 | | | |

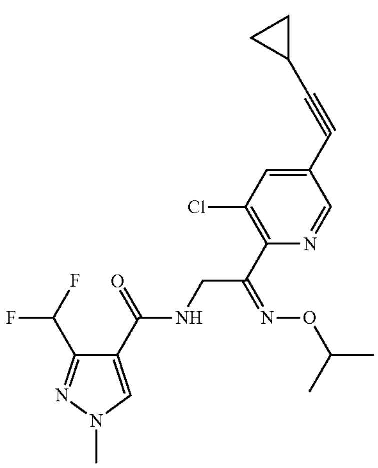 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-3 | 4 | 1:1 | 100 | 75 |
| Pyrimethanil | 4 | | | |
| Compound 1-3 | 1 | 1:4 | 99 | 74 |
| Pyrimethanil | 4 | | | |
| Compound 1-3 | 16 | 4:1 | 100 | 78 |
| Pyrimethanil | 4 | | | |
| Compound 1-3 | 16 | 16:1 | 78 | 43 |
| Quinofumelin | 1 | | | |
| Compound 1-3 | 16 | 1:4 | 87 | 35 |
| Tiadinil | 63 | | | |
| Compound 1-3 | 4 | 1:16 | 57 | 27 |
| Tiadinil | 63 | | | |
| Compound 1-3 | 16 | 1:1 | 81 | 24 |
| Tiadinil | 16 | | | |

| Active compound/active mixture | Concentration (ppm) | Mixture | Observed efficacy | Calculated efficacy according to Colby (%) |
|---|---|---|---|---|
| Compound 1-4 | 4 | 250:1 | 48 | 25 |
| Azoxystrobin | 0.063 | | | |
| Compound 1-4 | 4 | 1:1 | 100 | 63 |
| Cyprodinil | 4 | | | |
| Compound 1-4 | 1 | 1:4 | 100 | 58 |
| Cyprodinil | 4 | | | |
| Compound 1-4 | 16 | 4:1 | 99 | 72 |
| Cyprodinil | 4 | | | |
| Compound 1-4 | 16 | 63:1 | 97 | 43 |
| Dithianon | 0.25 | | | |
| Compound 1-4 | 16 | 16:1 | 82 | 47 |
| Florylpicoxamid | 1 | | | |
| Compound 1-4 | 16 | 63:1 | 61 | 42 |
| Florylpicoxamid | 0.25 | | | |
| Compound 1-4 | 16 | 63:1 | 84 | 58 |
| Fluindapyr | 0.25 | | | |
| Compound 1-4 | 16 | 250:1 | 81 | 57 |
| Fluxapyroxad | 0.063 | | | |
| Compound 1-4 | 16 | 63:1 | 88 | 66 |
| Inpyrfluxam | 0.25 | | | |
| Compound 1-4 | 4 | 4:1 | 93 | 71 |
| Mepanipyrim | 1 | | | |
| Compound 1-4 | 4 | 250:1 | 47 | 29 |
| Mefentrifluconazol | 0.016 | | | |
| Compound 1-4 | 4 | 1:1 | 100 | 78 |
| Mepanipyrim | 4 | | | |
| Compound 1-4 | 16 | 16:1 | 98 | 78 |
| Mepanipyrim | 1 | | | |
| Compound 1-4 | 16 | 1:4 | 88 | 54 |
| Probenazol | 63 | | | |
| Compound 1-4 | 4 | 1:16 | 81 | 39 |
| Probenazol | 63 | | | |
| Compound 1-4 | 4 | 1:1 | 76 | 49 |
| Pyrapropyon | 4 | | | |

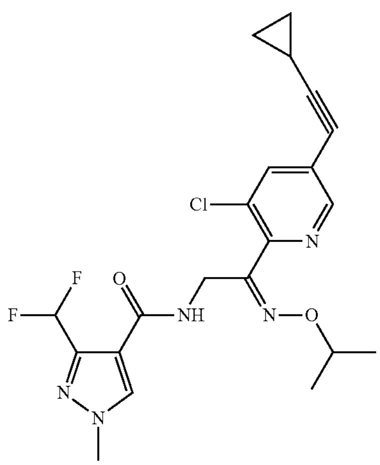 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-4 | 4 | 1:1 | 100 | 78 |
| Pyrimethanil | 4 | | | |
| Compound 1-4 | 1 | 1:4 | 100 | 75 |
| Pyrimethanil | 4 | | | |
| Compound 1-4 | 4 | 4:1 | 99 | 60 |
| Pyrimethanil | 1 | | | |
| Compound 1-4 | 4 | 4:1 | 44 | 23 |
| Pyroquilon | 1 | | | |
| Compound 1-4 | 16 | 16:1 | 85 | 58 |
| Quinofumelin | 1 | | | |
| Compound 1-4 | 4 | 250:1 | 44 | 25 |
| Tetraconazol | 0.063 | | | |
| Compound 1-4 | 16 | 4:1 | 82 | 63 |
| Thifluzamid | 4 | | | |
| Compound 1-4 | 16 | 1:4 | 91 | 52 |
| Tiadinil | 63 | | | |
| Compound 1-4 | 4 | 1:16 | 55 | 37 |
| Tiadinil | 63 | | | |

-continued

| Active compound/active mixture | Concentration (ppm) | Mixture | Observed efficacy | Calculated efficacy according to Colby (%) |
|---|---|---|---|---|
| Compound 1-4 | 16 | 1:1 | 77 | 44 |
| Tiadinil | 16 | | | |
| Compound 1-4 | 4 | 1:1 | 42 | 23 |
| Tricyclazol | 4 | | | |
| Compound 1-4 | 4 | 250:1 | 49 | 25 |
| Trifloxystrobin | 0.063 | | | |

Example 2—Activity Against Rice Blast Pyricularla *Oryzae* in the Microtiterplate Test The stock solutions were mixed according to the ratio, pipetted onto a micro titer plate (MTP) and diluted with water to the stated concentrations. A spore suspension of *Pyricularia oryzae* in an aqueous biomalt or yeast-bacto-peptone-glycerine solution was then added. The plates were placed in a water vapor-saturated chamber at a temperature of 18° C. Using an absorption photometer, the MTPs were measured at 405 nm 7 days after the inoculation

| Active compound/active mixture | Concentration (ppm) | Mixture | Observed efficacy |
|---|---|---|---|
| Compound 1-1 | 4 | — | 53 |
| 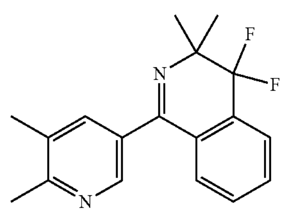 [SMILES: Cc1cc(C2=NC(C)(C)C(F)(F)c3ccccc32)cnc1C] | 1 | — | 24 |
| | 0.25 | — | 23 |
| Compound 1-2 | 1 | — | 32 |
| 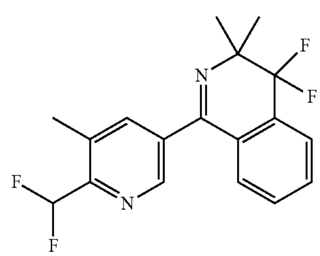 [SMILES: Cc1cc(C2=NC(C)(C)C(F)(F)c3ccccc32)cnc1C(F)F] | 0.25 | — | 20 |
| | 0.063 | — | 14 |
| Compound 1-3 | 4 | — | 52 |
| 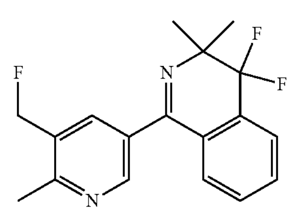 [SMILES: Cc1ncc(C2=NC(C)(C)C(F)(F)c3ccccc32)cc1CF] | 1 | — | 26 |
| | 0.025 | — | 20 |
| Compound 1-4 | 4 | — | 42 |
| 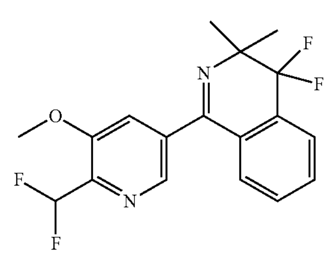 [SMILES: COc1cc(C2=NC(C)(C)C(F)(F)c3ccccc32)cnc1C(F)F] | 1 | — | 29 |
| | 0.25 | — | 23 |
| | 0.063 | — | 18 |

-continued

| Active compound/active mixture | Concentration (ppm) | Mixture | Observed efficacy |
|---|---|---|---|
| Aminopyrifen | 0.016 | — | 36 |
| | 0.004 | — | 6 |
| | 0.001 | — | 0 |
| Azoxystrobin | 0.016 | — | 44 |
| | 0.004 | — | 4 |
| Boscalid | 4 | — | 10 |
| | 0.25 | — | 2 |
| Cyprodinil | 4 | — | 61 |
| | 1 | — | 50 |
| Difenoconazol | 0.25 | — | 11 |
| | 0.063 | — | 2 |
| Dimoxystrobin | 0.016 | — | 35 |
| Dithianon | 0.25 | — | 36 |
| | 0.063 | — | 14 |
| Florylpicoxamid | 0.016 | — | 49 |
| Fluazinam | 0.063 | — | 6 |
| Fludioxonil | 0.063 | — | 40 |
| | 0.016 | — | 35 |
| | 0.004 | — | 16 |
| Fluindapyr | 1 | — | 41 |
| Fluopyram | 0.25 | — | 7 |
| Fluxapyroxad | 0.063 | — | 8 |
| Imazalil | 1 | — | 20 |
| Isofetamid | 4 | — | 10 |
| | 1 | — | 1 |
| Isoflucypram | 1 | — | 14 |
| Mandestrobin | 1 | — | 9 |
| Mefentrifluconazol | 0.016 | — | 7 |
| Mepanipyrim | 4 | — | 64 |
| | 1 | — | 45 |
| | 0.25 | — | 3 |
| Metalaxyl | 4 | — | 11 |
| | 1 | — | 4 |
| Methyltetraprol | 0.016 | — | 24 |
| Metiram | 4 | — | 8 |
| Metrafenon | 4 | — | 7 |
| | 1 | — | 2 |
| 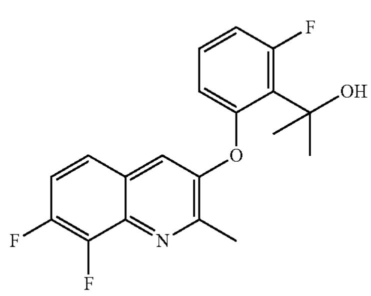 [SMILES: Cc1nc2c(F)c(F)ccc2cc1Oc1cccc(F)c1C(C)(C)O] | 4 | — | 50 |
| Probenazol | 16 | — | 12 |
| | 4 | — | 2 |
| Prohexadion-ca | 63 | — | 8 |
| Prothioconazol | 0.25 | — | 12 |
| Pydiflumetofen | 1 | — | 44 |
| Pyraclostrobin | 0.004 | — | 14 |
| | 0.001 | — | 4 |
| Pyrapropyon | 16 | — | 4 |

-continued

| Active compound/active mixture | Concentration (ppm) | Mixture | Observed efficacy |
|---|---|---|---|
| 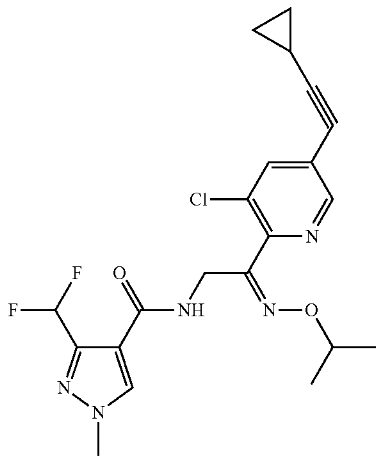 [SMILES: CC(C)O/N=C(/CNC(=O)c1cn(C)nc1C(F)F)c1ncc(C#CC2CC2)cc1Cl] | 4 | — | 1 |
| Pyroquilon | 1 | — | 7 |
| Quinofumelin | 1 | — | 34 |
| Sulfur | 4 | — | 54 |
| Tetraconazol | 0.063 | — | 7 |
| Tiadinil | 63 | — | 21 |
| | 16 | — | 10 |
| | 4 | — | 2 |
| Thifluzamid | 4 | — | 16 |
| | 1 | — | 2 |
| Tricyclazol | 4 | — | 6 |
| Trfloxystrobin | 0.016 | — | 23 |
| | 0.004 | — | 8 |
| Triticonazol | 1 | — | 10 |
| Validamycin | 63 | — | 10 |

| Active compound/active mixture | Concentration (ppm) | Mixture | Observed efficacy | Calculated efficacy according to Colby (%) |
|---|---|---|---|---|
| Compound 1-1 | 4 | 1000:1 | 93 | 56 |
| Aminopyrifen | 0.004 | | | |
| Compound 1-1 | 4 | 250:1 | 98 | 70 |
| Aminopyrifen | 0.016 | | | |
| Compound 1-1 | 4 | 4000:1 | 74 | 53 |
| Aminopyrifen | 0.001 | | | |
| Compound 1-1 | 4 | 250:1 | 92 | 73 |
| Azoxystrobin | 0.016 | | | |
| Compound 1-1 | 1 | 63:1 | 83 | 57 |
| Azoxystrobin | 0.016 | | | |
| Compound 1-1 | 4 | 1000:1 | 76 | 54 |
| Azoxystrobin | 0.004 | | | |
| Compound 1-1 | 4 | 1:1 | 84 | 58 |
| Boscalid | 4 | | | |
| Compound 1-1 | 4 | 16:1 | 73 | 54 |
| Boscalid | 0.25 | | | |
| Compound 1-1 | 1 | 1:4 | 93 | 70 |
| Cyprodinil | 4 | | | |
| Compound 1-1 | 4 | 4:1 | 94 | 76 |
| Cyprodinil | 1 | | | |
| Compound 1-1 | 4 | 63:1 | 79 | 54 |
| Difenoconazol | 0.063 | | | |
| Compound 1-1 | 4 | 16:1 | 83 | 58 |
| Difenoconazol | 0.25 | | | |
| Compound 1-1 | 1 | 63:1 | 73 | 51 |
| Dimoxystrobin | 0.016 | | | |
| Compound 1-1 | 0.25 | 16:1 | 68 | 50 |
| Dimoxystrobin | 0.016 | | | |
| Compound 1-1 | 1 | 4:1 | 100 | 51 |
| Dithianon | 0.25 | | | |

-continued

| Active compound/active mixture | Concentration (ppm) | Mixture | Observed efficacy | Calculated efficacy according to Colby (%) |
|---|---|---|---|---|
| Compound 1-1 | 4 | 16:1 | 100 | 70 |
| Dithianon | 0.25 | | | |
| Compound 1-1 | 4 | 63:1 | 84 | 59 |
| Dithianon | 0.063 | | | |
| Compound 1-1 | 0.25 | 16:1 | 93 | 61 |
| Florylpicoxamid | 0.016 | | | |
| Compound 1-1 | 0.063 | 4:1 | 90 | 60 |
| Florylpicoxamid | 0.016 | | | |
| Compound 1-1 | 1 | 63:1 | 90 | 61 |
| Florylpicoxamid | 0.016 | | | |
| Compound 1-1 | 1 | 16:1 | 58 | 28 |
| Fluazinam | 0.063 | | | |
| Compound 1-1 | 4 | 63:1 | 100 | 72 |
| Fludioxonil | 0.063 | | | |
| Compound 1-1 | 1 | 16:1 | 100 | 55 |
| Fludioxonil | 0.063 | | | |
| Compound 1-1 | 4 | 250:1 | 100 | 69 |
| Fludioxonil | 0.016 | | | |
| Compound 1-1 | 4 | 16:1 | 83 | 56 |
| Fluopyram | 0.25 | | | |
| Compound 1-1 | 4 | 63:1 | 85 | 56 |
| Fluxapyroxad | 0.063 | | | |
| Compound 1-1 | 4 | 4:1 | 84 | 62 |
| Imazalil | 1 | | | |
| Compound 1-1 | 4 | 4:1 | 90 | 53 |
| Isofetamid | 1 | | | |
| Compound 1-1 | 4 | 1:1 | 97 | 58 |
| Isofetamid | 4 | | | |
| Compound 1-1 | 4 | 4:1 | 79 | 60 |
| Isoflucypram | 1 | | | |
| Compound 1-1 | 4 | 4:1 | 88 | 67 |
| Mandestrobin | 1 | | | |
| Compound 1-1 | 4 | 16:1 | 75 | 54 |
| Mepanipyrim | 0.25 | | | |
| Compound 1-1 | 4 | 4:1 | 73 | 55 |
| Metalaxyl | 1 | | | |
| Compound 1-1 | 4 | 250:1 | 86 | 64 |
| Methyltetraprol | 0.016 | | | |
| Compound 1-1 | 4 | 1:1 | 83 | 56 |
| Metrafenon | 4 | | | |
| Compound 1-1 | 4 | 1:4 | 87 | 58 |
| Probenazol | 16 | | | |
| Compound 1-1 | 1 | 1:16 | 70 | 33 |
| Probenazol | 16 | | | |
| Compound 1-1 | 4 | 1:16 | 76 | 56 |
| Prohexadion-ca | 63 | | | |
| Compound 1-1 | 4 | 1000:1 | 84 | 59 |
| Pyraclostrobin | 0.004 | | | |
| Compound 1-1 | 1 | 250:1 | 63 | 34 |
| Pyraclostrobin | 0.004 | | | |
| Compound 1-1 | 4 | 1:4 | 93 | 55 |
| Pyrapropyon | 16 | | | |

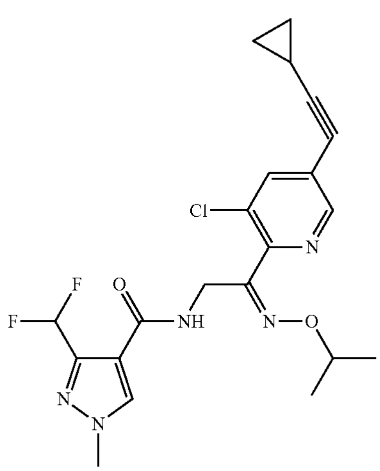 [SMILES: CC(C)O/N=C(/CNC(=O)c1cn(C)nc1C(F)F)c1ncc(C#CC2CC2)cc1Cl]

-continued

| Active compound/active mixture | Concentration (ppm) | Mixture | Observed efficacy | Calculated efficacy according to Colby (%) |
|---|---|---|---|---|
| Compound 1-1 | 1 | 1:16 | 75 | 27 |
| Pyrapropyon | 16 | | | |

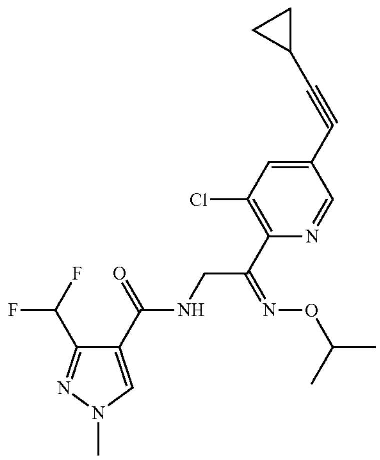 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-1 | 1 | 1:1 | 71 | 50 |
| Quinofumelin | 1 | | | |
| Compound 1-1 | 4 | 1:1 | 93 | 60 |
| Thifluzamid | 4 | | | |
| Compound 1-1 | 4 | 1:4 | 98 | 58 |
| Tiadinil | 16 | | | |
| Compound 1-1 | 4 | 1:16 | 98 | 63 |
| Tiadinil | 63 | | | |
| Compound 1-1 | 4 | 1:1 | 74 | 54 |
| Tiadinil | 4 | | | |
| Compound 1-1 | 4 | 250:1 | 83 | 64 |
| Trifloxystrobin | 0.016 | | | |
| Compound 1-1 | 1 | 63:1 | 67 | 41 |
| Trifloxystrobin | 0.016 | | | |
| Compound 1-1 | 4 | 1:16 | 77 | 57 |
| Validamycin | 63 | | | |

| Active compound/active mixture | Concentration (ppm) | Mixture | Observed efficacy | Calculated efficacy according to Colby (%) |
|---|---|---|---|---|
| Compound 1-2 | 1 | 250:1 | 66 | 37 |
| Aminopyrifen | 0.004 | | | |
| Compound 1-2 | 1 | 63:1 | 87 | 62 |
| Azoxystrobin | 0.016 | | | |
| Compound 1-2 | 1 | 1:4 | 93 | 74 |
| Cyprodinil | 4 | | | |
| Compound 1-2 | 0.25 | 16:1 | 71 | 48 |
| Dimoxystrobin | 0.016 | | | |
| Compound 1-2 | 1 | 4:1 | 93 | 56 |
| Dithianon | 0.25 | | | |
| Compound 1-2 | 0.25 | 16:1 | 88 | 59 |
| Florylpicoxamid | 0.016 | | | |
| Compound 1-2 | 1 | 63:1 | 100 | 56 |
| Florylpicoxamid | 0.016 | | | |
| Compound 1-2 | 0.063 | 1:1 | 89 | 56 |
| Fluazinam | 0.063 | | | |
| Compound 1-2 | 1 | 63:1 | 55 | 36 |
| Fludioxonil | 0.016 | | | |
| Compound 1-2 | 1 | 16:1 | 100 | 60 |
| Fludioxonil | 0.063 | | | |
| Compound 1-2 | 1 | 250:1 | 96 | 38 |
| Fludioxonil | 0.004 | | | |

-continued
| Active compound/active mixture | Concentration (ppm) | Mixture | Observed efficacy | Calculated efficacy according to Colby (%) |
|---|---|---|---|---|
| Compound 1-2 | 1 | 1:1 | 59 | 33 |
| Isofetamid | 1 | | | |
| Compound 1-2 | 1 | 1:4 | 88 | 37 |
| Metrafenon | 4 | | | |
| Compound 1-2 | 1 | 1:4 | 89 | 66 |
| 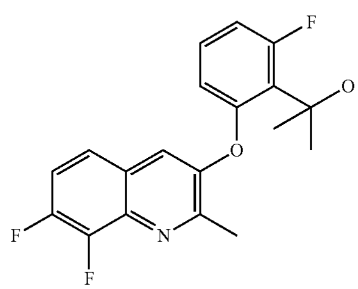 [SMILES: Cc1nc2c(F)c(F)ccc2cc1Oc1cccc(F)c1C(C)(C)O] | 4 | | | |
| Compound 1-2 | 1 | 1:4 | 65 | 33 |
| Probenazol | 4 | | | |
| Compound 1-2 | 1 | 1:16 | 88 | 41 |
| Probenazol | 16 | | | |
| Compound 1-2 | 1 | 250:1 | 89 | 42 |
| Pyraclostrobin | 0.004 | | | |
| Compound 1-2 | 1 | 1:4 | 55 | 33 |
| Pyrapropyon | 4 | | | |
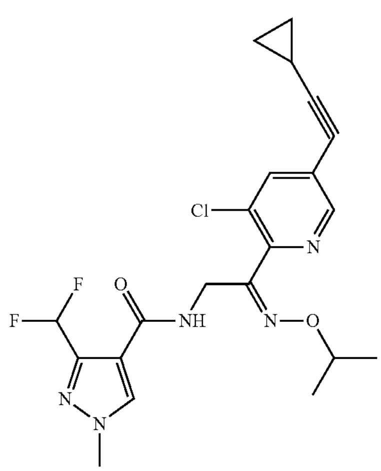 [SMILES: CC(C)O/N=C(/CNC(=O)c1cn(C)nc1C(F)F)c1ncc(C#CC2CC2)cc1Cl]

-continued

| Active compound/active mixture | Concentration (ppm) | Mixture | Observed efficacy | Calculated efficacy according to Colby (%) |
|---|---|---|---|---|
| Compound 1-2 | 1 | 1:16 | 80 | 35 |
| Pyrapropyon | 16 | | | |

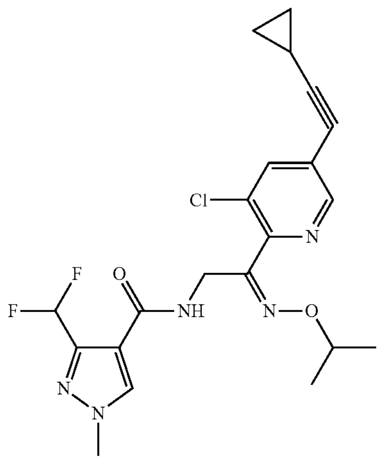 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-2 | 1 | 1:1 | 74 | 56 |
| Quinofumelin | 1 | | | |
| Compound 1-2 | 1 | 1:4 | 100 | 69 |
| Sulfur | 4 | | | |
| Compound 1-2 | 0.25 | 1:16 | 98 | 63 |
| Sulfur | 4 | | | |
| Compound 1-2 | 1 | 1:4 | 62 | 34 |
| Tiadinil | 4 | | | |
| Compound 1-2 | 1 | 1:16 | 98 | 39 |
| Tiadinil | 16 | | | |
| Compound 1-2 | 1 | 250:1 | 90 | 48 |
| Trifloxystrobin | 0.016 | | | |

| Active compound/active mixture | Concentration (ppm) | Mixture | Observed efficacy | Calculated efficacy according to Colby (%) |
|---|---|---|---|---|
| Compound 1-3 | 4 | 1000:1 | 86 | 55 |
| Aminopyrifen | 0.004 | | | |
| Compound 1-3 | 4 | 250:1 | 99 | 69 |
| Aminopyrifen | 0.016 | | | |
| Compound 1-3 | 4 | 250:1 | 92 | 73 |
| Azoxystrobin | 0.016 | | | |
| Compound 1-3 | 1 | 63:1 | 84 | 58 |
| Azoxystrobin | 0.016 | | | |
| Compound 1-3 | 4 | 1:1 | 79 | 57 |
| Boscalid | 4 | | | |
| Compound 1-3 | 1 | 1:4 | 93 | 71 |
| Cyprodinil | 4 | | | |
| Compound 1-3 | 4 | 16:1 | 80 | 57 |
| Difenoconazol | 0.25 | | | |
| Compound 1-3 | 4 | 16:1 | 92 | 69 |
| Dithianon | 0.25 | | | |
| Compound 1-3 | 1 | 4:1 | 77 | 52 |
| Dithianon | 0.25 | | | |
| Compound 1-3 | 0.25 | 16:1 | 88 | 59 |
| Florylpicoxamid | 0.016 | | | |
| Compound 1-3 | 0.063 | 4:1 | 80 | 59 |
| Florylpicoxamid | 0.016 | | | |
| Compound 1-3 | 4 | 63:1 | 100 | 71 |
| Fludioxonil | 0.063 | | | |
| Compound 1-3 | 1 | 63:1 | 100 | 69 |
| Fludioxonil | 0.016 | | | |

-continued

| Active compound/active mixture | Concentration (ppm) | Mixture | Observed efficacy | Calculated efficacy according to Colby (%) |
|---|---|---|---|---|
| Compound 1-3 | 1 | 16:1 | 100 | 56 |
| Fludioxonil | 0.063 | | | |
| Compound 1-3 | 4 | 16:1 | 75 | 55 |
| Fluopyram | 0.25 | | | |
| Compound 1-3 | 4 | 1:1 | 78 | 59 |
| Isofetamid | 4 | | | |
| Compound 1-3 | 4 | 4:1 | 77 | 55 |
| Isoflucypram | 1 | | | |
| Compound 1-3 | 4 | 1:1 | 82 | 57 |
| Metalaxyl | 4 | | | |
| Compound 1-3 | 4 | 1:1 | 78 | 56 |
| Metiram | 4 | | | |
| Compound 1-3 | 4 | 1:1 | 93 | 55 |
| Metrafenon | 4 | | | |
| Compound 1-3 | 1 | 1:4 | 82 | 31 |
| Metrafenon | 4 | | | |
| Compound 1-3 | 4 | 1:1 | 85 | 66 |
| Metrafenon | 1 | | | |
| Compound 1-3 | 4 | 250:1 | 91 | 64 |
| Methyltetraprol | 0.016 | | | |
| Compound 1-3 | 4 | 1:4 | 92 | 58 |
| Probenazol | 16 | | | |
| Compound 1-3 | 1 | 1:16 | 77 | 35 |
| Probenazol | 16 | | | |
| Compound 1-3 | 4 | 1:1 | 79 | 53 |
| Probenazol | 4 | | | |
| Compound 1-3 | 4 | 1:16 | 80 | 56 |
| Prohexadion-ca | 63 | | | |
| Compound 1-3 | 4 | 16:1 | 77 | 58 |
| Prothioconazol | 0.25 | | | |
| Compound 1-3 | 1 | 1:1 | 80 | 59 |
| Pydiflumetofen | 1 | | | |
| Compound 1-3 | 4 | 1000:1 | 95 | 59 |
| Pyraclostrobin | 0.004 | | | |
| Compound 1-3 | 4 | 4000:1 | 77 | 54 |
| Pyraclostrobin | 0.001 | | | |
| Compound 1-3 | 4 | 1:4 | 89 | 54 |
| Pyrapropyon | 16 | | | |

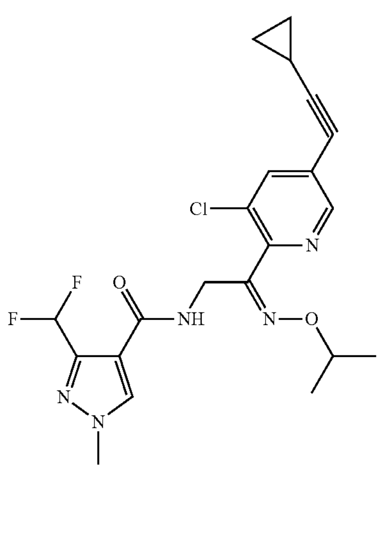 [SMILES: CC(C)O/N=C(/CNC(=O)c1cn(C)nc1C(F)F)c1ncc(C#CC2CC2)cc1Cl]

-continued

| Active compound/active mixture | Concentration (ppm) | Mixture | Observed efficacy | Calculated efficacy according to Colby (%) |
|---|---|---|---|---|
| Compound 1-3 | 1 | 1:16 | 58 | 29 |
| Pyrapropyon | 16 | | | |

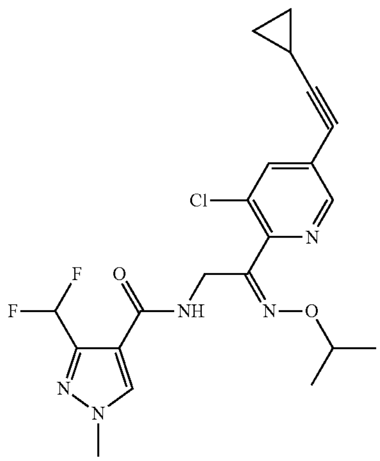 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-3 | 4 | 1:1 | 87 | 52 |
| Pyrapropyon | 4 | | | |

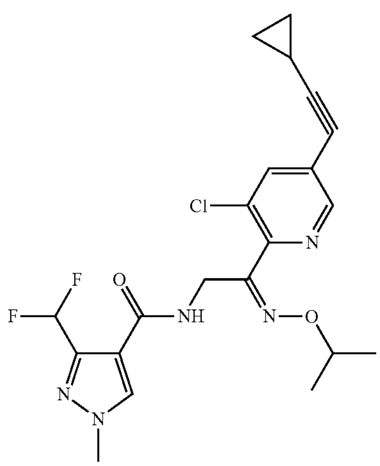 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-3 | 4 | 4:1 | 82 | 55 |
| Pyroquilon | 1 | | | |
| Compound 1-3 | 4 | 4:1 | 89 | 68 |
| Quinofumelin | 1 | | | |
| Compound 1-3 | 1 | 1:1 | 78 | 51 |
| Quinofumelin | 1 | | | |
| Compound 1-3 | 1 | 1:4 | 97 | 66 |
| Sulfur | 4 | | | |
| Compound 1-3 | 0.25 | 1:16 | 96 | 63 |
| Sulfur | 4 | | | |
| Compound 1-3 | 4 | 63:1 | 85 | 55 |
| Tetraconazol | 0.063 | | | |
| Compound 1-3 | 4 | 1:4 | 99 | 57 |
| Tiadinil | 16 | | | |
| Compound 1-3 | 4 | 1:16 | 98 | 62 |
| Tiadinil | 63 | | | |
| Compound 1-3 | 4 | 1:1 | 91 | 53 |
| Tiadinil | 4 | | | |
| Compound 1-3 | 4 | 4:1 | 71 | 53 |
| Thifluzamid | 1 | | | |

-continued

| Active compound/active mixture | Concentration (ppm) | Mixture | Observed efficacy | Calculated efficacy according to Colby (%) |
|---|---|---|---|---|
| Compound 1-3 | 4 | 1:1 | 93 | 60 |
| Thifluzamid | 4 | | | |
| Compound 1-3 | 4 | 1:1 | 76 | 55 |
| Tricyclazol | 4 | | | |
| Compound 1-3 | 4 | 250:1 | 89 | 63 |
| Trifloxystrobin | 0.016 | | | |
| Compound 1-3 | 1 | 63:1 | 81 | 43 |
| Trifloxystrobin | 0.016 | | | |
| Compound 1-3 | 4 | 1000:1 | 76 | 56 |
| Trifloxystrobin | 0.004 | | | |
| Compound 1-3 | 4 | 4:1 | 84 | 57 |
| Triticonazol | 1 | | | |
| Compound 1-3 | 4 | 1:16 | 78 | 56 |
| Validamycin | 63 | | | |

| Active compound/active mixture | Concentration (ppm) | Mixture | Observed efficacy | Calculated efficacy according to Colby (%) |
|---|---|---|---|---|
| Compound 1-4 | 4 | 1000:1 | 66 | 46 |
| Aminopyrifen | 0.004 | | | |
| Compound 1-4 | 4 | 250:1 | 99 | 63 |
| Aminopyrifen | 0.016 | | | |
| Compound 1-4 | 4 | 250:1 | 95 | 67 |
| Azoxystrobin | 0.016 | | | |
| Compound 1-4 | 1 | 63:1 | 98 | 60 |
| Azoxystrobin | 0.016 | | | |
| Compound 1-4 | 4 | 1000:1 | 62 | 44 |
| Azoxystrobin | 0.004 | | | |
| Compound 1-4 | 4 | 1:1 | 86 | 48 |
| Boscalid | 4 | | | |
| Compound 1-4 | 4 | 1:1 | 98 | 77 |
| Cyprodinil | 4 | | | |
| Compound 1-4 | 1 | 1:4 | 96 | 72 |
| Cyprodinil | 4 | | | |
| Compound 1-4 | 4 | 4:1 | 93 | 71 |
| Cyprodinil | 1 | | | |
| Compound 1-4 | 1 | 63:1 | 79 | 54 |
| Dimoxystrobin | 0.016 | | | |
| Compound 1-4 | 1 | 4:1 | 99 | 54 |
| Dimoxystrobin | 0.25 | | | |
| Compound 1-4 | 4 | 250:1 | 83 | 62 |
| Dimoxystrobin | 0.016 | | | |
| Compound 1-4 | 4 | 16:1 | 74 | 49 |
| Difenoconazol | 0.25 | | | |
| Compound 1-4 | 4 | 16:1 | 100 | 63 |
| Dithianon | 0.25 | | | |
| Compound 1-4 | 1 | 4:1 | 99 | 54 |
| Dithianon | 0.25 | | | |
| Compound 1-4 | 4 | 63:1 | 79 | 50 |
| Dithianon | 0.063 | | | |
| Compound 1-4 | 0.25 | 16:1 | 92 | 61 |
| Florylpicoxamid | 0.016 | | | |
| Compound 1-4 | 0.063 | 4:1 | 88 | 58 |
| Florylpicoxamid | 0.016 | | | |
| Compound 1-4 | 1 | 63:1 | 91 | 64 |
| Florylpicoxamid | 0.016 | | | |
| Compound 1-4 | 1 | 16:1 | 51 | 33 |
| Fluazinam | 0.063 | | | |
| Compound 1-4 | 4 | 63:1 | 100 | 65 |
| Fludioxonil | 0.063 | | | |
| Compound 1-4 | 1 | 16:1 | 100 | 57 |
| Fludioxonil | 0.063 | | | |
| Compound 1-4 | 4 | 250:1 | 100 | 62 |
| Fludioxonil | 0.016 | | | |
| Compound 1-4 | 4 | 4:1 | 89 | 66 |
| Fluindapyr | 1 | | | |
| Compound 1-4 | 4 | 16:1 | 73 | 46 |
| Fluopyram | 0.25 | | | |

-continued

| Active compound/active mixture | Concentration (ppm) | Mixture | Observed efficacy | Calculated efficacy according to Colby (%) |
|---|---|---|---|---|
| Compound 1-4 | 4 | 63:1 | 73 | 46 |
| Fluxapyroxad | 0.063 | | | |
| Compound 1-4 | 4 | 4:1 | 74 | 63 |
| Imazalil | 1 | | | |
| Compound 1-4 | 4 | 1:1 | 96 | 48 |
| Isofetamid | 4 | | | |
| Compound 1-4 | 4 | 4:1 | 75 | 50 |
| Isoflucypram | 1 | | | |
| Compound 1-4 | 1 | 1:4 | 61 | 34 |
| Metrafenon | 4 | | | |
| Compound 1-4 | 4 | 250:1 | 77 | 56 |
| Methyltetraprol | 0.016 | | | |
| Compound 1-4 | 4 | 1:4 | 67 | 49 |
| Probenazol | 16 | | | |
| Compound 1-4 | 1 | 1:16 | 59 | 37 |
| Probenazol | 16 | | | |
| Compound 1-4 | 4 | 1000:1 | 79 | 50 |
| Pyraclostrobin | 0.004 | | | |
| Compound 1-4 | 1 | 1:1 | 73 | 53 |
| Quinofumelin | 1 | | | |
| Compound 1-4 | 1 | 1:4 | 89 | 57 |
| Sulfur | 4 | | | |
| Compound 1-4 | 0.25 | 1:16 | 95 | 65 |
| Sulfur | 4 | | | |
| Compound 1-4 | 4 | 1:16 | 98 | 54 |
| Tiadinil | 63 | | | |
| Compound 1-4 | 4 | 250:1 | 88 | 55 |
| Trifloxystrobin | 0.016 | | | |
| Compound 1-4 | 1 | 63:1 | 68 | 45 |
| Trifloxystrobin | 0.016 | | | |

Example 3—Activity Against Leaf Blotch on Wheat Caused by Septorla *Tritici*

The stock solutions were mixed according to the ratio, pipetted onto a micro titer plate (MTP) and diluted with water to the stated concentrations. A spore suspension of *Septoria tritici* in an aqueous biomalt or yeast-bactopeptone-glycerine solution was then added. The plates were placed in a water vapor-saturated chamber at a temperature of 18° C. Using an absorption photometer, the MTPs were measured at 405 nm 7 days after the inoculation.

| Active compound/active mixture | Concentration (ppm) | Mixture | Observed efficacy |
|---|---|---|---|
| Compound 1-1 | 16 | — | 37 |
| 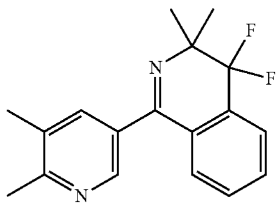 [SMILES: Cc1cc(C2=NC(C)(C)C(F)(F)c3ccccc32)cnc1C] | 4 | — | 18 |
| | 1 | — | 9 |
| Compound 1-2 | 4 | — | 29 |
| 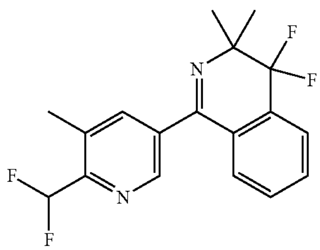 [SMILES: Cc1cc(C2=NC(C)(C)C(F)(F)c3ccccc32)cnc1C(F)F] | 1 | — | 6 |
| | 0.25 | — | 12 |
| Compound 1-3 | 16 | — | 34 |
| 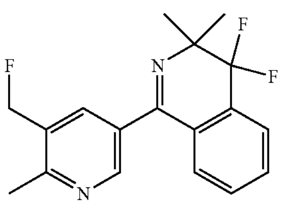 [SMILES: Cc1ncc(C2=NC(C)(C)C(F)(F)c3ccccc32)cc1CF] | 4 | — | 13 |
| | 1 | — | 9 |
| | 0.25 | — | 13 |
| | 0.063 | — | 11 |
| Compound 1-4 | 16 | — | 17 |
| 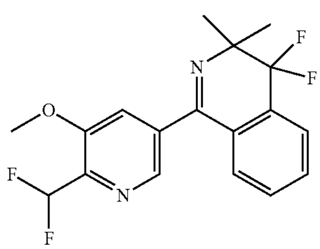 [SMILES: COc1cc(C2=NC(C)(C)C(F)(F)c3ccccc32)cnc1C(F)F] | 4 | — | 1 |
| | 1 | — | 8 |
| | 0.25 | — | 7 |
| Azoxystrobin | 0.063 | — | 26 |
| | 0.016 | — | 2 |
| | 0.004 | — | 5 |
| Boscalid | 1 | — | 58 |
| Cyprodinil | 4 | — | 10 |
| Difenoconazol | 0.016 | — | 22 |
| Dimoxystrobin | 0.063 | — | 27 |
| | 0.016 | — | 2 |
| Dithianon | 0.25 | — | 82 |
| | 0.063 | — | 22 |
| Florylpicoxamid | 0.25 | — | 79 |
| | 0.063 | — | 54 |
| Fludioxonil | 0.25 | — | 10 |
| Fluindapyr | 1 | — | 67 |
| | 0.25 | — | 22 |
| Fluopyram | 0.25 | — | 23 |
| Fluxapyroxad | 0.063 | — | 24 |
| Inpyrfluxam | 0.25 | — | 22 |
| Isofetamid | 0.25 | — | 44 |
| Isoflucypram | 0.063 | — | 72 |
| Mancozeb | 1 | — | 16 |
| Mandestrobin | 1 | — | 11 |
| Metconazol | 0.063 | — | 30 |
| Metiram | 4 | — | 4 |
| | 1 | — | 2 |

-continued

| Active compound/active mixture | Concentration (ppm) | Mixture | Observed efficacy |
|---|---|---|---|
| Methyltetraprol | 0.016 | — | 22 |
| | 0.004 | — | 5 |
| Metrafenon | 16 | — | 16 |
| | 4 | — | 4 |
| 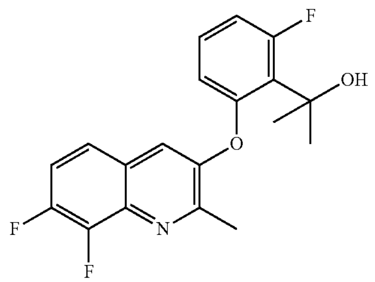 [SMILES: Cc1nc2c(F)c(F)ccc2cc1Oc1cccc(F)c1C(C)(C)O] | 1 | — | 45 |
| Prohexadion-ca | 63 | — | 12 |
| Probenazol | 4 | — | 4 |
| Prothioconazol | 0.063 | — | 1 |
| Pyraclostrobin | 0.016 | — | 52 |
| | 0.004 | — | 7 |
| Pyrapropyon | 1 | — | 42 |
| 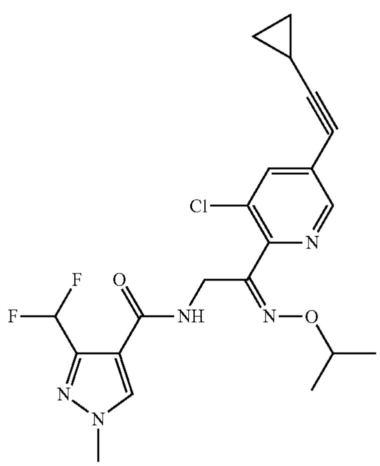 [SMILES: CC(C)O/N=C(/CNC(=O)c1cn(C)nc1C(F)F)c1ncc(C#CC2CC2)cc1Cl] | | | |
| Pyrimethanil | 16 | — | 21 |
| | 1 | — | 6 |
| Quinofumelin | 1 | — | 41 |
| Sulfur | 1 | — | 18 |
| Tetraconazol | 0.063 | — | 12 |
| | 0.004 | — | 6 |
| Thifluzamid | 4 | — | 69 |
| Tiadinil | 63 | — | 30 |
| | 16 | — | 18 |
| | 4 | — | 21 |
| Trifloxystrobin | 0.016 | — | 27 |

| Active compound/ active mixture | Concen- tration (ppm) | Mixture | Observed efficacy | Calculated efficacy according to Colby (%) |
|---|---|---|---|---|
| Compound 1-1 | 16 | 250:1 | 94 | 54 |
| Azoxystrobin | 0.063 | | | |
| Compound 1-1 | 4 | 63:1 | 67 | 40 |
| Azoxystrobin | 0.063 | | | |
| Compound 1-1 | 16 | 1000:1 | 64 | 39 |
| Azoxystrobin | 0.016 | | | |
| Compound 1-1 | 4 | 4:1 | 91 | 65 |
| Boscalid | 1 | | | |

-continued

| Active compound/ active mixture | Concen- tration (ppm) | Mixture | Observed efficacy | Calculated efficacy according to Colby (%) |
|---|---|---|---|---|
| Compound 1-1 | 16 | 16:1 | 99 | 74 |
| Boscalid | 1 | | | |
| Compound 1-1 | 4 | 63:1 | 80 | 40 |
| Dimoxystrobin | 0.063 | | | |
| Compound 1-1 | 16 | 250:1 | 98 | 54 |
| Dimoxystrobin | 0.063 | | | |

-continued

| Active compound/ active mixture | Concen- tration (ppm) | Mixture | Observed efficacy | Calculated efficacy according to Colby (%) |
|---|---|---|---|---|
| Compound 1-1 | 4 | 63:1 | 87 | 63 |
| Florylpicoxamid | 0.063 | | | |
| Compound 1-1 | 16 | 63:1 | 74 | 43 |
| Fludioxonil | 0.25 | | | |
| Compound 1-1 | 4 | 16:1 | 69 | 26 |
| Fludioxonil | 0.25 | | | |
| Compound 1-1 | 4 | 63:1 | 97 | 77 |
| Isoflucypram | 0.063 | | | |
| Compound 1-1 | 16 | 16:1 | 100 | 44 |
| Mandestrobin | 1 | | | |
| Compound 1-1 | 4 | 4:1 | 94 | 27 |
| Mandestrobin | 1 | | | |
| Compound 1-1 | 16 | 4:1 | 65 | 40 |
| Metiram | 4 | | | |
| Compound 1-1 | 16 | 1000:1 | 83 | 51 |
| Methyltetraprol | 0.016 | | | |

-continued

| Active compound/ active mixture | Concen- tration (ppm) | Mixture | Observed efficacy | Calculated efficacy according to Colby (%) |
|---|---|---|---|---|
| Compound 1-1 | 16 | 4000:1 | 73 | 40 |
| Methyltetraprol | 0.004 | | | |
| Compound 1-1 | 16 | 1000:1 | 100 | 70 |
| Pyraclostrobin | 0.016 | | | |
| Compound 1-1 | 4 | 250:1 | 85 | 61 |
| Pyraclostrobin | 0.016 | | | |
| Compound 1-1 | 16 | 4000:1 | 78 | 42 |
| Pyraclostrobin | 0.004 | | | |
| Compound 1-1 | 16 | 1:4 | 79 | 56 |
| Tiadinil | 63 | | | |
| Compound 1-1 | 1 | 1:16 | 46 | 25 |
| Tiadinil | 16 | | | |
| Compound 1-1 | 16 | 1000:1 | 96 | 54 |
| Trifloxystrobin | 0.016 | | | |

| Active compound/active mixture | Concentration (ppm) | Mixture | Observed efficacy | Calculated efficacy according to Colby (%) |
|---|---|---|---|---|
| Compound 1-2 | 4 | 250:1 | 78 | 31 |
| Azoxystrobin | 0.016 | | | |
| Compound 1-2 | 4 | 63:1 | 71 | 48 |
| Azoxystrobin | 0.063 | | | |
| Compound 1-2 | 4 | 1000:1 | 52 | 33 |
| Azoxystrobin | 0.004 | | | |
| Compound 1-2 | 4 | 4:1 | 100 | 70 |
| Boscalid | 1 | | | |
| Compound 1-2 | 4 | 1:1 | 82 | 37 |
| Cyprodinil | 4 | | | |
| Compound 1-2 | 4 | 250:1 | 57 | 33 |
| Difenoconazol | 0.016 | | | |
| Compound 1-2 | 1 | 63:1 | 49 | 11 |
| Difenoconazol | 0.016 | | | |
| Compound 1-2 | 4 | 250:1 | 77 | 31 |
| Dimoxystrobin | 0.016 | | | |
| Compound 1-2 | 4 | 63:1 | 89 | 48 |
| Dimoxystrobin | 0.063 | | | |
| Compound 1-2 | 4 | 63:1 | 64 | 45 |
| Dithianon | 0.063 | | | |
| Compound 1-2 | 4 | 63:1 | 95 | 68 |
| Florylpicoxamid | 0.063 | | | |
| Compound 1-2 | 4 | 16:1 | 84 | 36 |
| Fludioxonil | 0.25 | | | |
| Compound 1-2 | 4 | 16:1 | 73 | 44 |
| Fluindapyr | 0.25 | | | |
| Compound 1-2 | 4 | 4:1 | 97 | 77 |
| Fluindapyr | 1 | | | |
| Compound 1-2 | 4 | 16:1 | 87 | 44 |
| Inpyrfluxam | 0.25 | | | |
| Compound 1-2 | 1 | 4:1 | 55 | 26 |
| Inpyrfluxam | 0.25 | | | |
| Compound 1-2 | 1 | 4:1 | 74 | 48 |
| Isofetamid | 0.25 | | | |
| Compound 1-2 | 0.25 | 1:1 | 78 | 51 |
| Isofetamid | 0.25 | | | |
| Compound 1-2 | 4 | 16:1 | 93 | 61 |
| Isofetamid | 0.25 | | | |
| Compound 1-2 | 1 | 16:1 | 92 | 73 |
| Isoflucypram | 0.063 | | | |
| Compound 1-2 | 4 | 63:1 | 100 | 80 |
| Isoflucypram | 0.063 | | | |
| Compound 1-2 | 4 | 4:1 | 60 | 40 |
| Mancozeb | 1 | | | |
| Compound 1-2 | 4 | 250:1 | 65 | 45 |
| Methyltetraprol | 0.016 | | | |
| Compound 1-2 | 4 | 1000:1 | 61 | 34 |
| Pyraclostrobin | 0.004 | | | |
| Compound 1-2 | 4 | 250:1 | 99 | 66 |
| Pyraclostrobin | 0.016 | | | |

-continued

| Active compound/active mixture | Concentration (ppm) | Mixture | Observed efficacy | Calculated efficacy according to Colby (%) |
|---|---|---|---|---|
| Compound 1-2 | 1 | 1:1 | 97 | 46 |
| Pyrapropyon | 1 | | | |

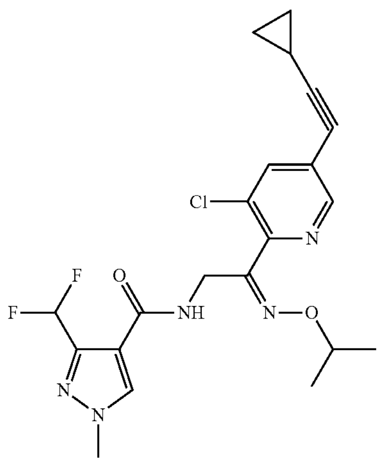 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) |
|---|---|---|---|---|
| Compound 1-2 | 4 | 4:1 | 91 | 58 |
| Quinofumelin | 1 | | | |
| Compound 1-2 | 4 | 250:1 | 95 | 48 |
| Trifloxystrobin | 0.016 | | | |

| Active compound/active mixture | Concentration (ppm) | Mixture | Observed efficacy | Calculated efficacy according to Colby (%) | Synergism (%) |
|---|---|---|---|---|---|
| Compound 1-3 | 16 | 250:1 | 86 | 51 | 35 |
| Azoxystrobin | 0.063 | | | | |
| Compound 1-3 | 16 | 1000:1 | 65 | 38 | 27 |
| Azoxystrobin | 0.016 | | | | |
| Compound 1-3 | 4 | 4:1 | 91 | 63 | 28 |
| Boscalid | 1 | | | | |
| Compound 1-3 | 16 | 16:1 | 98 | 72 | 26 |
| Boscalid | 1 | | | | |
| Compound 1-3 | 4 | 63:1 | 75 | 36 | 39 |
| Dimoxystrobin | 0.063 | | | | |
| Compound 1-3 | 16 | 250:1 | 89 | 52 | 37 |
| Dimoxystrobin | 0.063 | | | | |
| Compound 1-3 | 4 | 63:1 | 85 | 60 | 25 |
| Florylpicoxamid | 0.063 | | | | |
| Compound 1-3 | 16 | 63:1 | 58 | 40 | 18 |
| Fludioxonil | 0.25 | | | | |
| Compound 1-3 | 4 | 16:1 | 63 | 32 | 31 |
| Inpyrfluxam | 0.25 | | | | |
| Compound 1-3 | 16 | 63:1 | 69 | 48 | 21 |
| Inpyrfluxam | 0.25 | | | | |
| Compound 1-3 | 4 | 63:1 | 93 | 75 | 18 |
| Isoflucypram | 0.063 | | | | |
| Compound 1-3 | 16 | 16:1 | 83 | 41 | 42 |
| Mandestrobin | 1 | | | | |
| Compound 1-3 | 1 | 16:1 | 54 | 36 | 18 |
| Metconazol | 0.063 | | | | |
| Compound 1-3 | 4 | 250:1 | 64 | 32 | 32 |
| Methyltetraprol | 0.016 | | | | |
| Compound 1-3 | 16 | 4:1 | 98 | 37 | 61 |
| Metiram | 4 | | | | |
| Compound 1-3 | 4 | 1:1 | 79 | 16 | 63 |
| Metiram | 4 | | | | |
| Compound 1-3 | 16 | 16:1 | 57 | 35 | 22 |
| Metiram | 1 | | | | |

-continued

| Active compound/active mixture | Concentration (ppm) | Mixture | Observed efficacy | Calculated efficacy according to Colby (%) | Synergism (%) |
|---|---|---|---|---|---|
| Compound 1-3 | 16 | 1:1 | 76 | 45 | 31 |
| Metrafenon | 16 | | | | |
| Compound 1-3 | 16 | 4:1 | 70 | 37 | 33 |
| Metrafenon | 4 | | | | |
| Compound 1-3 | 16 | 1000:1 | 94 | 49 | 45 |
| Methyltetraprol | 0.016 | | | | |
| Compound 1-3 | 16 | 4000:1 | 79 | 37 | 42 |
| Methyltetraprol | 0.004 | | | | |
| Compound 1-3 | 1 | 1:1 | 85 | 50 | 35 |
| 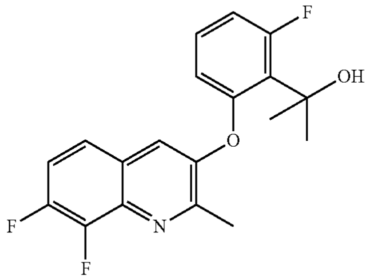 [SMILES: Cc1nc2c(F)c(F)ccc2cc1Oc1cccc(F)c1C(C)(C)O] | 1 | | | | |
| Compound 1-3 | 0.25 | 1:4 | 78 | 52 | 26 |
| 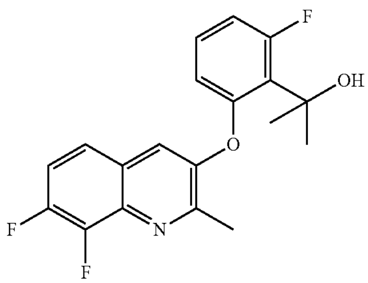 [SMILES: Cc1nc2c(F)c(F)ccc2cc1Oc1cccc(F)c1C(C)(C)O] | 1 | | | | |
| Compound 1-3 | 4 | 4:1 | 75 | 52 | 23 |
| 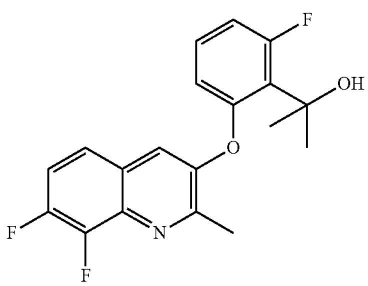 [SMILES: Cc1nc2c(F)c(F)ccc2cc1Oc1cccc(F)c1C(C)(C)O] | 1 | | | | |
| Compound 1-3 | 4 | 1:1 | 40 | 16 | 24 |
| Probenazol | 4 | | | | |
| Compound 1-3 | 4 | 1:16 | 79 | 23 | 56 |
| Prohexadion-ca | 63 | | | | |
| Compound 1-3 | 16 | 1:4 | 88 | 42 | 46 |
| Prohexadion-ca | 63 | | | | |
| Compound 1-3 | 4 | 63:1 | 45 | 14 | 31 |
| Prothioconazol | 0.063 | | | | |
| Compound 1-3 | 1 | 16:1 | 89 | 10 | 79 |
| Prothioconazol | 0.063 | | | | |
| Compound 1-3 | 16 | 1000:1 | 100 | 68 | 32 |
| Pyraclostrobin | 0.016 | | | | |
| Compound 1-3 | 4 | 63:1 | 99 | 58 | 41 |
| Pyraclostrobin | 0.063 | | | | |
| Compound 1-3 | 16 | 4000:1 | 94 | 39 | 55 |
| Pyraclostrobin | 0.004 | | | | |

-continued

| Active compound/active mixture | Concentration (ppm) | Mixture | Observed efficacy | Calculated efficacy according to Colby (%) | Synergism (%) |
|---|---|---|---|---|---|
| Compound 1-3 | 0.25 | 1:4 | 87 | 50 | 37 |
| Pyrapropyon | 1 | | | | |

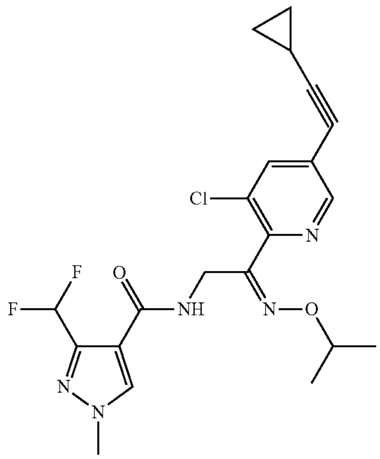 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) | Synergism (%) |
|---|---|---|---|---|---|
| Compound 1-3 | 1 | 1:1 | 100 | 47 | 53 |
| Pyrapropyon | 1 | | | | |

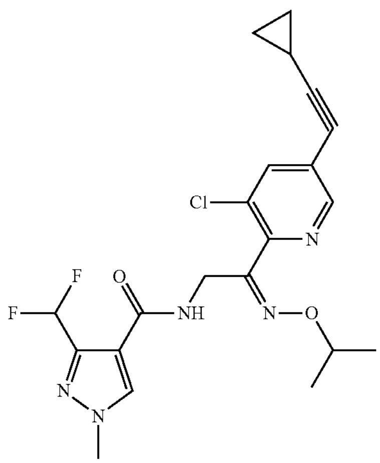 [SMILES: CC(C)O/N=C(/CNC(=O)c1cn(C)nc1C(F)F)c1ncc(C#CC2CC2)cc1Cl]

| Active compound/active mixture | Concentration (ppm) | Mixture | Observed efficacy | Calculated efficacy according to Colby (%) | Synergism (%) |
|---|---|---|---|---|---|
| Compound 1-3 | 16 | 1:1 | 88 | 48 | 40 |
| Pyrimethanil | 16 | | | | |
| Compound 1-3 | 4 | 4:1 | 40 | 18 | 22 |
| Pyrimethanil | 1 | | | | |
| Compound 1-3 | 4 | 4:1 | 96 | 49 | 47 |
| Quinofumelin | 1 | | | | |
| Compound 1-3 | 1 | 1:1 | 78 | 46 | 32 |
| Quinofumelin | 1 | | | | |
| Compound 1-3 | 16 | 16:1 | 98 | 61 | 37 |
| Quinofumelin | 1 | | | | |
| Compound 1-3 | 0.25 | 1:4 | 100 | 29 | 71 |
| Sulfur | 1 | | | | |
| Compound 1-3 | 0.063 | 1:16 | 100 | 28 | 72 |
| Sulfur | 1 | | | | |
| Compound 1-3 | 4 | 63:1 | 44 | 23 | 21 |
| Tetraconazol | 0.063 | | | | |
| Compound 1-3 | 4 | 1000:1 | 39 | 18 | 21 |
| Tetraconazol | 0.004 | | | | |
| Compound 1-3 | 16 | 1:4 | 89 | 54 | 35 |
| Tiadinil | 63 | | | | |
| Compound 1-3 | 4 | 1:1 | 60 | 32 | 28 |
| Tiadinil | 4 | | | | |

-continued

| Active compound/active mixture | Concentration (ppm) | Mixture | Observed efficacy | Calculated efficacy according to Colby (%) | Synergism (%) |
|---|---|---|---|---|---|
| Compound 1-3 | 4 | 250:1 | 89 | 36 | 53 |
| Trifloxystrobin | 0.016 | | | | |
| Compound 1-3 | 1 | 63:1 | 61 | 33 | 28 |
| Trifloxystrobin | 0.016 | | | | |
| Compound 1-3 | 4 | 1000:1 | 100 | 52 | 48 |
| Trifloxystrobin | 0.004 | | | | |

| Active compound/active mixture | Concentration (ppm) | Mixture | Observed efficacy | Calculated efficacy according to Colby (%) |
|---|---|---|---|---|
| Compound 1-4 | 16 | 250:1 | 92 | 39 |
| Azoxystrobin | 0.063 | | | |
| Compound 1-4 | 4 | 63:1 | 61 | 27 |
| Azoxystrobin | 0.063 | | | |
| Compound 1-4 | 16 | 1000:1 | 61 | 19 |
| Azoxystrobin | 0.016 | | | |
| Compound 1-4 | 4 | 4:1 | 100 | 58 |
| Boscalid | 1 | | | |
| Compound 1-4 | 1 | 1:1 | 96 | 61 |
| Boscalid | 1 | | | |
| Compound 1-4 | 16 | 16:1 | 99 | 65 |
| Boscalid | 1 | | | |
| Compound 1-4 | 1 | 63:1 | 39 | 13 |
| Difenoconazol | 0.016 | | | |
| Compound 1-4 | 4 | 63:1 | 70 | 28 |
| Dimoxystrobin | 0.063 | | | |
| Compound 1-4 | 16 | 250:1 | 92 | 39 |
| Dimoxystrobin | 0.063 | | | |
| Compound 1-4 | 4 | 16:1 | 100 | 82 |
| Dithianon | 0.25 | | | |
| Compound 1-4 | 4 | 63:1 | 55 | 23 |
| Dithianon | 0.063 | | | |
| Compound 1-4 | 4 | 16:1 | 100 | 79 |
| Florylpicoxamid | 0.25 | | | |
| Compound 1-4 | 4 | 63:1 | 83 | 55 |
| Florylpicoxamid | 0.063 | | | |
| Compound 1-4 | 16 | 63:1 | 60 | 25 |
| Fludioxonil | 0.25 | | | |
| Compound 1-4 | 4 | 16:1 | 31 | 11 |
| Fludioxonil | 0.25 | | | |
| Compound 1-4 | 16 | 16:1 | 100 | 73 |
| Fluindapyr | 1 | | | |
| Compound 1-4 | 4 | 4:1 | 98 | 68 |
| Fluindapyr | 1 | | | |
| Compound 1-4 | 16 | 63:1 | 69 | 35 |
| Fluindapyr | 0.25 | | | |
| Compound 1-4 | 16 | 63:1 | 70 | 36 |
| Fluopyram | 0.25 | | | |
| Compound 1-4 | 4 | 16:1 | 51 | 24 |
| Fluopyram | 0.25 | | | |
| Compound 1-4 | 16 | 250:1 | 62 | 37 |
| Fluxapyroxad | 0.063 | | | |
| Compound 1-4 | 4 | 63:1 | 51 | 25 |
| Fluxapyroxad | 0.063 | | | |
| Compound 1-4 | 4 | 16:1 | 88 | 23 |
| Inpyrfluxam | 0.25 | | | |
| Compound 1-4 | 1 | 4:1 | 46 | 28 |
| Inpyrfluxam | 0.25 | | | |
| Compound 1-4 | 16 | 63:1 | 99 | 35 |
| Inpyrfluxam | 0.25 | | | |
| Compound 1-4 | 1 | 4:1 | 91 | 49 |
| Isofetamid | 0.25 | | | |
| Compound 1-4 | 0.25 | 1:1 | 94 | 48 |
| Isofetamid | 0.25 | | | |

-continued

| Active compound/active mixture | Concentration (ppm) | Mixture | Observed efficacy | Calculated efficacy according to Colby (%) |
|---|---|---|---|---|
| Compound 1-4 | 4 | 16:1 | 98 | 45 |
| Isofetamid | 0.25 | | | |
| Compound 1-4 | 1 | 16:1 | 98 | 74 |
| Isoflucypram | 0.063 | | | |
| Compound 1-4 | 0.25 | 4:1 | 98 | 74 |
| Isoflucypram | 0.063 | | | |
| Compound 1-4 | 4 | 63:1 | 100 | 72 |
| Isoflucypram | 0.063 | | | |
| Compound 1-4 | 16 | 16:1 | 49 | 30 |
| Mancozeb | 1 | | | |
| Compound 1-4 | 1 | 250:1 | 98 | 68 |
| Mefentrifluconazol | 0.004 | | | |
| Compound 1-4 | 16 | 1000:1 | 79 | 35 |
| Methyltetraprol | 0.016 | | | |
| Compound 1-4 | 16 | 4000:1 | 56 | 21 |
| Methyltetraprol | 0.004 | | | |
| Compound 1-4 | 16 | 1000:1 | 34 | 10 |
| Prothioconazol | 0.016 | | | |
| Compound 1-4 | 16 | 1000:1 | 99 | 60 |
| Pyraclostrobin | 0.016 | | | |
| Compound 1-4 | 4 | 250:1 | 90 | 53 |
| Pyraclostrobin | 0.016 | | | |
| Compound 1-4 | 16 | 4000:1 | 80 | 23 |
| Pyraclostrobin | 0.004 | | | |
| Compound 1-4 | 1 | 1:1 | 81 | 47 |
| Pyrapropyon | 1 | | | |
| 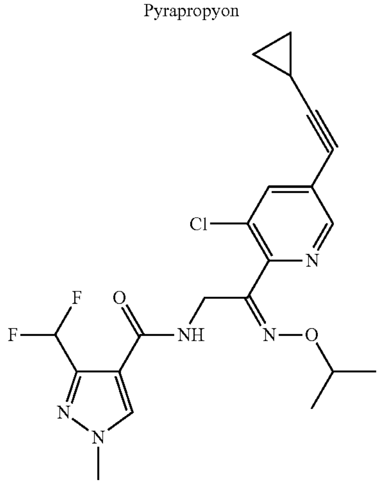 | | | | |
| Compound 1-4 | 16 | 1:1 | 69 | 34 |
| Pyrimethanil | 16 | | | |
| Compound 1-4 | 4 | 4:1 | 88 | 42 |
| Quinofumelin | 1 | | | |
| Compound 1-4 | 16 | 16:1 | 99 | 51 |
| Quinofumelin | 1 | | | |
| Compound 1-4 | 4 | 1:4 | 86 | 42 |
| Tiadinil | 16 | | | |
| Compound 1-4 | 16 | 4:1 | 97 | 74 |
| Thifluzamid | 4 | | | |
| Compound 1-4 | 4 | 1:1 | 92 | 70 |
| Thifluzamid | 4 | | | |
| Compound 1-4 | 4 | 250:1 | 73 | 28 |
| Trifloxystrobin | 0.016 | | | |
| Compound 1-4 | 16 | 1000:1 | 96 | 39 |
| Trifloxystrobin | 0.016 | | | |

Example 4—Activity Against *Sclerotinia sclerotiorum* in the Microtiterplate Test The stock solutions were mixed according to the ratio, pipetted onto a micro titer plate (MTP) and diluted with water to the stated concentrations. *Sclerotinia sclerotiorum* spores (solute with ultrasonic from a filter membrane) in an aqueous biomalt or yeast-bactopeptone-glycerine solution was then added. The plates were placed in a water vapor-saturated chamber at a temperature of 18° C. Using an absorption photometer, the MTPs were measured at 405 nm 7 days after the inoculation.

| Active compound/active mixture | Concentration (ppm) | Mixture | Observed efficacy |
|---|---|---|---|
| Compound 1-1 | 16 | — | 32 |
| 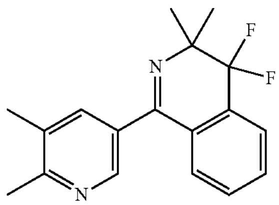 [SMILES: Cc1cc(C2=NC(C)(C)C(F)(F)c3ccccc32)cnc1C] | 4 | — | 10 |
| | 1 | — | 7 |
| | 0.25 | — | 7 |
| Compound 1-2 | 4 | — | 16 |
| 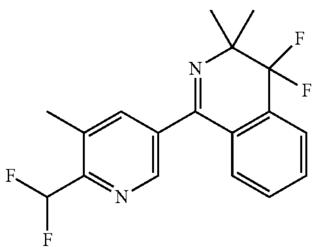 [SMILES: Cc1cc(C2=NC(C)(C)C(F)(F)c3ccccc32)cnc1C(F)F] | | | |
| Compound 1-3 | 4 | — | 8 |
| 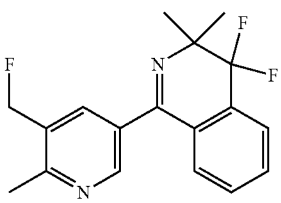 [SMILES: Cc1ncc(C2=NC(C)(C)C(F)(F)c3ccccc32)cc1CF] | 1 | — | 3 |
| Dithianon | 1 | — | 36 |
| Fluazinam | 0.25 | — | 58 |
| Fludioxonil | 0.016 | — | 13 |
| Pyrapropyon | 4 | — | 55 |
| 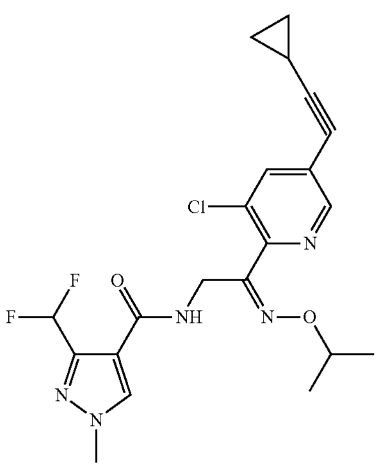 [SMILES: CC(C)O/N=C(/CNC(=O)c1cn(C)nc1C(F)F)c1ncc(C#CC2CC2)cc1Cl] | | | |
| Pyrimethanil | 4 | — | 21 |
| | 1 | — | 15 |
| Quinofumelin | 4 | — | 65 |

| Active Compound/ active mixture | Concentration (ppm) | Mixture | Observed efficacy | Calculated efficacy according to Colby (%) |
|---|---|---|---|---|
| Compound 1-1 | 16 | 16:1 | 79 | 57 |
| Dithianon | 1 | | | |
| Compound 1-1 | 4 | 4:1 | 69 | 43 |
| Dithianon | 1 | | | |
| Compound 1-1 | 4 | 16:1 | 100 | 62 |
| Fluazinam | 0.25 | | | |
| Compound 1-1 | 0.25 | 1:16 | 79 | 59 |
| Pyrapropyron | 4 | | | |
| Compound 1-1 | 4 | 1:1 | 84 | 60 |
| Pyrapropyon | 4 | | | |

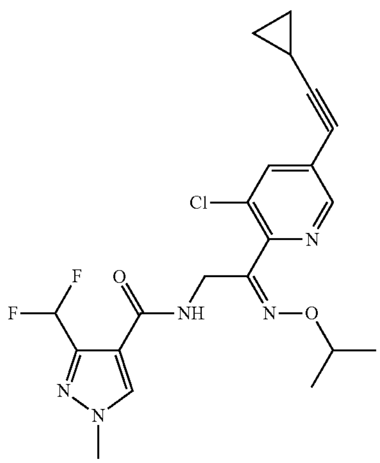 [SMILES: CC(C)O/N=C(/CNC(=O)c1cn(C)nc1C(F)F)c1ncc(C#CC2CC2)cc1Cl]

| Active Compound/ active mixture | Concentration (ppm) | Mixture | Observed efficacy | Calculated efficacy according to Colby (%) |
|---|---|---|---|---|
| Compound 1-1 | 1 | 1:1 | 47 | 21 |
| Pyrimethanil | 1 | | | |
| Compound 1-1 | 1 | 1:4 | 50 | 27 |
| Pyrimethanil | 4 | | | |
| Compound 1-2 | 4 | 1:1 | 85 | 63 |
| Pyrapropyon | 4 | | | |

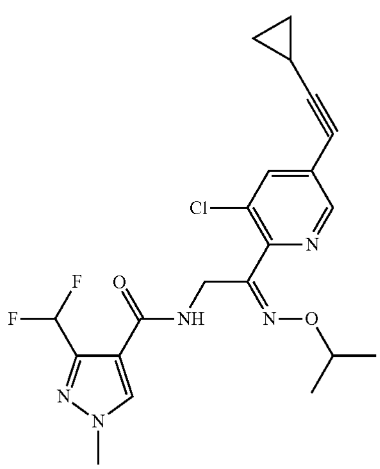 [SMILES: CC(C)O/N=C(/CNC(=O)c1cn(C)nc1C(F)F)c1ncc(C#CC2CC2)cc1Cl]

| Active Compound/ active mixture | Concentration (ppm) | Mixture | Observed efficacy | Calculated efficacy according to Colby (%) |
|---|---|---|---|---|
| Compound 1-3 | 1 | 63:1 | 46 | 15 |
| Fludioxonil | 0.016 | | | |
| Compound 1-3 | 4 | 16:1 | 99 | 61 |
| Fluazinam | 0.25 | | | |
| Compound 1-3 | 4 | 1:1 | 85 | 67 |
| Quinofumelin | 4 | | | |
| Compound 1-3 | 4 | 4:1 | 45 | 22 |
| Pyrimethanil | 1 | | | |

The measured parameters were compared to the growth of the active compound-free control variant (100%) and the fungus-free and active compound-free blank value to determine the relative growth in % of the pathogens in the respective active compounds.

The expected efficacies of active compound mixtures were determined using Colby's formula [R. S. Colby, "Calculating synergistic and antagonistic responses of herbicide combinations", Weeds 15, 20-22 (1967)] and compared with the observed efficacies.

The invention claimed is:

1. A fungicidal mixture comprising active components 1) and 2), wherein component 1) is at least one active compound of the formula I, or an N-oxide, or an agriculturally useful salt thereof,

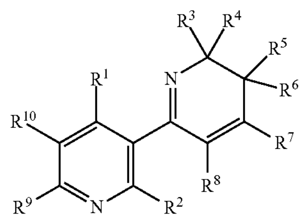

I wherein $R^1$ is in each case independently selected from hydrogen, halogen, $C_1$-$C_6$-alkyl and $C_1$-$C_6$-halogenalkyl;

$R^2$ is in each case independently selected from hydrogen, halogen, $C_1$-$C_6$-alkyl and $C_1$-$C_6$-halogenalkyl;

$R^3$, $R^4$ are independently selected from $C_1$-$C_6$-alkyl, $C_2$-$C_6$-alkenyl, $C_2$-$C_6$-alkynyl, $C_1$-$C_6$-halogenalkyl, $C_2$-$C_6$-halogenalkenyl and $C_2$-$C_6$-halogenalkynyl;

$R^5$ is halogen;

$R^6$ is halogen;

$R^7$, $R^6$ together with the carbon atoms to which they are bound form a ring A, wherein the ring A is phenyl and wherein the ring A is substituted by $(R^{78})_o$, wherein o is 0, 1, 2 or 3; and $R^{78}$ is independently selected from halogen, $C_1$-$C_6$-alkyl, $C_1$-$C_6$-alkoxy, $C_1$-$C_6$-halogenalkyl and $C_1$-$C_6$-halogenalkoxy;

$R^9$, $R^{10}$ are independently selected from H, halogen, $O(R^{95})$, $C_1$-$C_6$-alkyl and $C_1$-$C_6$-halogenalkyl; wherein $R^{95}$ is $C_1$-$C_6$-alkyl or $C_1$-$C_6$-halogenalkyl; and component 2) is at least one active compound II, or an N-oxide, or an agriculturally useful salt thereof, selected from the group consisting of A) Respiration inhibitors selected from the group consisting of Inhibitors of complex III at $Q_o$ site selected from the group consisting of azoxystrobin (A.1.1), coumethoxystrobin (A.1.2), coumoxystrobin (A.1.3), dimoxystrobin (A.1.4), enestroburin (A.1.5), fenaminstrobin (A.1.6), fenoxystrobin/flufenoxystrobin (A.1.7), fluoxastrobin (A.1.8), kresoxim-methyl (A.1.9), mandestrobin (A.1.10), metominostrobin (A.1.11), orysastrobin (A.1.12), picoxystrobin (A.1.13), pyraclostrobin (A.1.14), pyrametostrobin (A.1.15), pyraoxystrobin (A.1.16), trifloxystrobin (A.1.17), 2-(2-(3-(2,6-di-chlorophenyl)-1-methyl-allylideneaminooxymethyl)-phenyl)-2-methoxyimino-N-methyl-acetamide (A.1.18), pyribencarb (A.1.19), triclopyricarb/chlorodincarb (A.1.20), famoxadone (A.1.21), fenamidone (A.1.21a), methyl-N-[2-[(1,4-dimethyl-5-phenyl-pyrazol-3-yl)oxylmethyl]phenyl]-N-methoxy-carbamate (A.1.22), 1-[3-chloro-2-[[1-(4-chlorophenyl)-1H-pyrazol-3-yl]oxymethyl]phenyl]-4-methyl-tetrazol-5-one (A.1.23), 1-[3-bromo-2-[[1-(4-chlorophenyl)pyrazol-3-yl]oxymethyl]phenyl]-4-methyl-tetrazol-5-one (A.1.24), metyltetrapole (A.1.25), 1-[2-[[1-(4-chlorophenyl)pyrazol-3-yl]oxymethyl]-3-fluoro-phenyl]-4-methyl-tetrazol-5-one (A.1.26), 1-[2-[[1-(2,4-dichlorophenyl)pyrazol-3-yl]oxymethyl]-3-fluoro-phenyl]-4-methyl-tetrazol-5-one (A.1.27), 1-[2-[[4-(4-chlorophenyl)thiazol-2-yl]oxymethyl]-3-methyl-phenyl]-4-methyl-tetrazol-5-one (A.1.28), 1-[3-chloro-2-[[4-(p-tolyl)thiazol-2-yl]-oxymethyl]phenyl]-4-methyl-tetrazol-5-one (A.1.29), 1-[3-cyclopropyl-2-[[2-methyl-4-(1-methylpyrazol-3-yl)phenoxy]methyl]phenyl]-4-methyl-tetrazol-5-one (A.1.30), 1-[3-(difluoromethoxy)-2-[[2-methyl-4-(1-methylpyrazol-3-yl)phenoxy]methyl]phenyl]-4-methyl-tetrazol-5-one (A.1.31), 1-methyl-4-[3-methyl-2-[[2-methyl-4-(1-methylpyrazol-3-yl)phen-oxy]methyl]phenyl]tetrazol-5-one (A.1.32), 1-methyl-4-[3-methyl-2-[[1-[3-(trifluoromethyl)-phenyl]-ethylideneamino]oxymethyl]phenyl]tetrazol-5-one (A.1.33), (Z,2E)-5-[1-(2,4-dichloro-phenyl)pyrazol-3-yl]-oxy-2-methoxyimino-N,3-dimethyl-pent-3-enamide (A.1.34), (Z,2E)-5-[1-(4-chlorophenyl)pyrazol-3-yl]oxy-2-methoxyimino-N,3-dimethyl-pent-3-enamide (A.1.35), pyriminostrobin (A.1.36), bifujunzhi (A.1.37), and 2-(ortho-((2,5-dimethylphenyl-oxy-methylen)phenyl)-3-methoxy-acrylic acid methylester (A.1.38), Inhibitors of complex III at $Q_i$ site selected from the group consisting of cyazofamid (A.2.1), amisulbrom (A.2.2), [(6S,7R,8R)-8-benzyl-3-[(3-hydroxy-4-methoxy-pyridine-2-carbonyl)amino]-6-methyl-4,9-dioxo-1,5-dioxonan-7-yl] 2-methylpropanoate (A.2.3), fenpicoxamid (A.2.4), [(6S,7R,8R)-8-benzyl-3-[[4-methoxy-3-(propanoyloxy-methoxy)pyridine-2-carbonyl]amino]-6-methyl-4,9-dioxo-1,5-dioxonan-7-yl] 2-methylpropanoate (A.2.5), and florylpicoxamid (A.2.6), Inhibitors of complex 11 selected from the group consisting of benodanil (A.3.1), benzovindiflupyr (A.3.2), bixafen (A.3.3), boscalid (A.3.4), carboxin (A.3.5), fenfuram (A.3.6), fluopyram (A.3.7), flutolanil (A.3.8), fluxapyroxad (A.3.9), furametpyr (A.3.10), isofetamid (A.3.11), isopyrazam (A.3.12), mepronil (A.3.13), oxycarboxin (A.3.14), penflufen (A.3.15), penthiopyrad (A.3.16),), pydiflumetofen (A.3.17), pyraziflumid (A.3.18), sedaxane (A.3.19), tecloftalam (A.3.20), thifluzamide (A.3.21), inpyrfluxam (A.3.22), pyrapropoyne (A.3.23), fluindapyr (A.3.28), methyl (E)-2-[2-[(5-cyano-2-methyl-phenoxy)methyl]phenyl]-3-methoxy-prop-2-enoate (A.3.30), isoflucypram (A.3.31), 2-(difluoromethyl)-N-(1,1,3-trimethyl-indan-4-yl)pyridine-3-carboxamide (A.3.32), 2-(difluoromethyl)-N-[(3R)-1,1,3-trmethylindan-4-yl]-pyridine-3-carboxamide (A.3.33), 2-(difluoromethyl)-N-(3-ethyl-1,1-dimethyl-indan-4-yl)-pyridine-3-carboxamide (A.3.34), 2-(difluoromethyl)-N-[(3R)-3-ethyl-1,1-dimethyl-indan-4-yl]-pyridine-3-carboxamide (A.3.35), 2-(difluoromethyl)-N-(1,1-dimethyl-3-propyl-indan-4-yl)pyridine-3-carboxamide (A.3.36), 2-(difluoromethyl)-N-[(3R)-1,1-dimethyl-3-propyl-indan-4-yl]-pyridine-3-carboxamide (A.3.37), 2-(difluoromethyl)-N-(3-isobutyl-1,1-dimethyl-indan-4-yl)-pyridine-3-carboxamide (A.3.38), and 2-(difluoromethyl)-N-[(3R)-3-isobutyl-1,1-dimethyl-indan-4-yl]pyridine-3-carboxamide (A.3.39), and Other respiration inhibitors selected from the group consisting of diflumetorim (A.4.1); nitrophenyl derivates binapacryl (A.4.2), dinobuton (A.4.3), dinocap (A.4.4), fluazinam (A.4.5), meptyldinocap (A.4.6), ferimzone (A.4.7); organometal compounds fentin salts, e. g. fentin-acetate (A.4.8), fentin chloride (A.4.9), fentin hydroxide (A.4.10); ametoctradin (A.4.11), and silthiofam (A.4.12);

B) Sterol biosynthesis inhibitors (SBI fungicides)

C14 demethylase inhibitors selected from the group consisting of triazoles: azaconazole (B.1.1), bitertanol (B.1.2), bromuconazole (B.1.3), cyproconazole (B.1.4), difenoconazole (B.1.5), diniconazole (B.1.6), diniconazole-M (B.1.7), epoxiconazole (B.1.8), fenbuconazole (B.1.9), fluquinconazole (B.1.10), flusilazole (B.1.11), flutriafol (B.1.12), hexaconazole (B.1.13), imibenconazole (B.1.14), ipconazole (B.1.15), metconazole (B.1.17), myclobutanil (B.1.18), oxpoconazole (B.1.19), paclobutrazole (B.1.20), penconazole (B.1.21), propiconazole (B.1.22), prothioconazole (B.1.23), simeconazole (B.1.24), tebuconazole (B.1.25), tetraconazole (B.1.26), triadimefon (B.1.27), triadimenol (B.1.28), triticonazole (B.1.29), uniconazole (B.1.30), 1-[rel-(2S,3R)-3-(2-chlorophenyl)-2-(2,4-difluorophenyl)-oxiranylmethyl]-5-thiocyanato-1H-[1,2,4]trazole (B.1.31), 2-[rel-(2S,3R)-3-(2-chlorophenyl)-2-(2,4-difluorophenyl)-oxiranylmethyl]-2H-[1,2,4]triazole-3-thiol (B.1.32), 2-[2-chloro-4-(4-chlorophenoxy)phenyl]-1-(1,2,4-triazol-1-yl)pentan-2-ol (B.1.33), 1-[4-(4-chlorophenoxy)-2-(trifluoromethyl)phenyl]-1-cyclopropyl-2-(1,2,4-trazol-1-yl)ethanol (B.1.34), 2-[4-(4-chlorophenoxy)-2-(trifluoromethyl)phenyl]-1-(1,2,4-trazol-1-yl)butan-2-ol (B.1.35), 2-[2-chloro-4-(4-chlorophenoxy)phenyl]-1-(1,2,4-trazol-1-yl)butan-2-ol (B.1.36), ipfentrifluconazole (B.1.37), mefentrifluconazole (B.1.38), 2-[2-chloro-4-(4-chlorophenoxy)phenyl]-3-methyl-1-(1,2,4-trazol-1-yl)butan-2-ol (B.1.39), 2-[4-(4-chlorophenoxy)-2-(trifluoromethyl)phenyl]-1-(1,2,4-triazol-1-yl)pentan-2-ol (B.1.40), 2-[4-(4-fluorophenoxy)-2-(trifluoromethyl)phenyl]-1-(1,2,4-triazol-1-yl)propan-2-ol (B.1.41), 2-[2-chloro-4-(4-chlorophenoxy)phenyl]-1-(1,2,4-triazol-1-yl)pent-3-yn-2-ol (B.1.42), 2-(chloromethyl)-2-methyl-5-(p-tolylmethyl)-1-(1,2,4-triazol-1-ylmethyl)cyclopentanol (B.1.43); imidazoles imazalil (B.1.44), pefurazoate (B.1.45), prochloraz (B.1.46), triflumizol (B.1.47); pyrimidines, pyridines and piperazines fenarimol (B.1.49), pyrifenox (B.1.50), triforine (B.1.51), and [3-(4-chloro-2-fluoro-phenyl)-5-(2,4-difluorophenyl)isoxazol-4-yl]-(3-pyridyl)methanol (B.1.52);

Delta14-reductase inhibitors selected from the group consisting of aldimorph (B.2.1), dodemorph (B.2.2), dodemorph-acetate (B.2.3), fenpropimorph (B.2.4), tridemorph (B.2.5), fenpropidin (B.2.6), piperalin (B.2.7), and spiroxamine (B.2.8);

fenhexamid (B.3.1); an chlorphenomizole (B.4.1);

C) Nucleic acid synthesis inhibitors selected from the group consisting of

Phenylamides or acyl amino acid fungicides benalaxyl (C.1.1), benalaxyl-M (C.1.2), kiralaxyl (C.1.3), metalaxyl (C.1.4), metalaxyl-M (C.1.5), ofurace (C.1.6), an oxadixyl (C.1.7); and Other nucleic acid synthesis inhibitors selected from the group consisting of hymexazole (C.2.1), octhilinone (C.2.2), oxolinic acid (C.2.3), bupirimate (C.2.4), 5-fluorocytosine (C.2.5), 5-fluoro-2-(p-tolylmethoxy)pyrmidin-4-amine (C.2.6), 5-fluoro-2-(4-fluorophenylmethoxy)pyrmidin-4-amine (C.2.7), and 5-fluoro-2-(4-chlorophenylmethoxy)pyrmidin-4 amine (C.2.8);

D) Inhibitors of cell division and cytoskeleton selected from the group consisting of Tubulin inhibitors selected from the group consisting of benomyl (D.1.1), carbendazim (D.1.2), fuberidazole (D1.3), thiabendazole (D.1.4), thiophanate-methyl (D.1.5), 3-chloro-4-(2,6-difluorophenyl)-6-methyl-5-phenyl-pyridazine (D.1.6), 3-chloro-6-methyl-5-phenyl-4-(2,4,6-trifluorophenyl)pyridazine (D.1.7), N-ethyl-2-[(3-ethynyl-8-methyl-6-quinolyl)oxy]butanamide (D.1.8), N-ethyl-2-[(3-ethynyl-8-methyl-6-quinolyl)oxy]-2-methylsulfanyl-acetamide (D.1.9), 2-[(3-ethynyl-8-methyl-6-quinolyl)oxy]-N-(2-fluoroethyl)butanamide (D.1.10), 2-[(3-ethynyl-8-methyl-6-quinolyl)oxy]-N-(2-fluoroethyl)-2-methoxy-acetamide (D.1.11), 2-[(3-ethynyl-8-methyl-6-quinolyl)oxy]-N-propyl-butanamide (D.1.12), 2-[(3-ethynyl-8-methyl-6-quinolyl)oxy]-2-methoxy-N-propyl-acetamide (D.1.13), 2-[(3-ethynyl-8-methyl-6-quinolyl)oxy]-2-methylsulfanyl-N-propyl-acetamide (D.1.14), 2-[(3-ethynyl-8-methyl-6-quinolyl)oxy]-N-(2-fluoroethyl)-2-methylsulfanyl-acetamide (D.1.15), and 4-(2-bromo-4-fluoro-phenyl)-N-(2-chloro-6-fluoro-phenyl)-2,5-dimethyl-pyrazol-3-amine (D.1.16); and Other cell division inhibitors selected from the group consisting of diethofencarb (D.2.1), ethaboxam (D.2.2), pencycuron (D.2.3), fluopicolide (D.2.4), zoxamide (D.2.5), metrafenone (D.2.6), and pyriofenone (D.2.7);

E) Inhibitors of amino acid and protein synthesis selected from the group consisting of Methionine synthesis inhibitors selected from the group consisting cyprodinil (E.1.1), mepanipyrim (E.1.2), and pyrimethanil (E.1.3); and Protein synthesis inhibitors selected from the group consisting of blasticidin-S (E.2.1), kasugamycin (E.2.2), kasugamycin hydrochloride-hydrate (E.2.3), mildiomycin (E.2.4), streptomycin (E.2.5), and oxytetracyclin (E.2.6);

F) Signal transduction inhibitors selected from the group consisting of

MAP/histidine kinase inhibitors fluoroimid (F.1.1), iprodione (F.1.2), procymidone (F.1.3), vinclozolin (F.1.4), and fludioxonil (F.1.5); and quinoxyfen (F.2.1);

G) Lipid and membrane synthesis inhibitors selected from the group consisting of Phospholipid biosynthesis inhibitors selected from the around consisting of edifenphos (G.1.1), iprobenfos (G.1.2), pyrazophos (G.1.3), and isoprothiolane (G.1.4);

Lipid peroxidation selected from the group consisting of dicloran (G.2.1), quintozene (G.2.2), tecnazene (G.2.3), tolclofos-methyl (G.2.4), biphenyl (G.2.5), chloroneb (G.2.6), and etridiazole (G.2.7);

Phospholipid biosynthesis and cell wall deposition selected from the group consisting of dimethomorph (G.3.1), flumorph (G.3.2), mandipropamid (G.3.3), pyrimorph (G.3.4), benthiavalicarb (G.3.5), iprovalicarb (G.3.6), and valifenalate (G.3.7);

propamocarb (G.4.1); and

Inhibitors of oxysterol binding protein selected from the group consisting of oxathiapiprolin (G.5.1), 2-{3-[2-(1-{[3,5-bis(difluoromethyl-1H-pyrazol-1-yl]

acetyl}piperidin-4-yl)-1,3-thiazol-4-yl]-4,5-dihydro-1,2-oxazol-5-yl}phenyl methanesulfonate (G.5.2), 2-{3-[2-(1-{[3,5-bis(difluoromethyl)-1H-pyrazol-1-yl] acetyl}piperidin-4-yl) 1,3-thiazol-4-yl]-4,5-dihydro-1,2-oxazol-5-yl}-3-chlorophenyl methanesulfonate (G.5.3), 4-[1-[2-[3-(difluoromethyl)-5-methyl-pyrazol-1-yl]acetyl]-4-piperidyl]-N-tetralin-1-yl-pyridine-2-carboxamide (G.5.4), 4-[1-[2-[3,5-bis(difluoromethyl) pyrazol-1-yl]acetyl]-4-piperidyl]-N-tetralin-1-yl-pyridine-2-carboxamide (G.5.5), 4-[1-[2-[3-(difluoromethyl)-5-(trifluoromethyl)pyrazol-1-yl] acetyl]-4-piperidyl]-N-tetralin-1-yl-pyridine-2-carboxamide (G.5.6), 4-[1-[2-[5-cyclopropyl-3-(difluoromethyl)pyrazol-1-yl]acetyl]-4-piperidyl]-N-tetralin-1-yl-pyridine-2-carboxamide (G.5.7), 4-[1-[2-[5-methyl-3-(trifluoromethyl)pyrazol-1-yl]acetyl]-4-piperidyl]-N-tetralin-1-yl-pyridine-2-carboxamide (G.5.8), 4-[1-[2-[5-(difluoromethyl)-3-(trifluoromethyl)pyrazol-1-yl]acetyl]-4-piperidyl]-N-tetralin-1-yl-pyridine-2-carboxamide (G.5.9), 4-[1-[2-[3,5-bis(trifluoromethyl)pyrazol-1-yl]acetyl]-4-piperidyl]-N-tetralin-1-yl-pyridine-2-carboxamide (G.5.10), and (4-[1-[2-[5-cyclopropyl-3-(trifluoromethyl)pyrazol-1-yl] acetyl]-4-piperidyl]-N-tetralin-1-yl-pyridine-2-carboxamide (G.5.11);

H) Inhibitors with Multi Site Action selected from the group consisting of

Inorganic active substances selected from the group consisting of Bordeaux mixture (H.1.1), copper (H.1.2), copper acetate (H.1.3), copper hydroxide (H.1.4), copper oxychloride (H.1.5), basic copper sulfate (H.1.6), and sulfur (H.1.7);

Thio- and dithiocarbamates selected from the group consisting of ferbam (H.2.1), mancozeb (H.2.2), maneb (H.2.3), metam (H.2.4), metiram (H.2.5), propineb (H.2.6), thiram (H.2.7), zineb (H.2.8), and ziram (H.2.9);

Organochlorine compounds selected from the group consisting of anilazine (H.3.1), chlorothalonil (H.3.2), captafol (H.3.3), captan (H.3.4), folpet (H.3.5), dichlofluanid (H.3.6), dichlorophen (H.3.7), hexachlorobenzene (H.3.8), pentachlorphenole (H.3.9) and its salts, phthalide (H.3.10), and tolylfluanid (H.3.11); and Guanidines and others selected from the group consisting of guanidine (H.4.1), dodine (H.4.2), dodine free base (H.4.3), guazatine (H.4.4), guazatine-acetate (H.4.5), iminoctadine (H.4.6), iminoctadine-tiacetate (H.4.7), iminoctadine-tris(albesilate) (H.4.8), dithianon (H.4.9), and 2,6-dimethyl-1H,5H-[1,4]dithiino[2,3-c5,6-c] dipyrrole-1,3,5,7(2H,6H)-tetraone (H.4.10);

I) Cell wall synthesis inhibitors selected from the group consisting of

Inhibitors of glucan synthesis selected from the group consisting of validamycin (I.1.1), polyoxin B (I.1.2) and Melanin synthesis inhibitors pyroquilon (I.2.1), tricyclazole (I.2.2), carpropamid (I.2.3), diclocymet (I.2.4), and fenoxanil (I.2.5);

J) Plant defence inducers selected from the group consisting of

Acibenzolar-S-methyl (J.1.1), probenazole (J.1.2), isotianil (J.1.3), tiadinil (J.1.4), prohexadione-calcium (J.1.5); phosphonates: fosetyl (J.1.6), fosetyl-aluminum (J.1.7), phosphorous acid and its salts (J.1.8), potassium or sodium bicarbonate (J.1.9), 4-cyclopropyl-N-(2,4-dimethoxyphenyl)thiadiazole-5-carboxamide (J.1.10), calcium phosphonate (J.1.11), and potassium phosphonate (J.1.12);

K) Unknown mode of action selected from the group consisting of

Bronopol (K.1.1), chinomethionat (K.1.2), cyflufenamid (K.1.3), cymoxanil (K.1.4), dazomet (K.1.5), debacarb (K.1.6), diclomezine (K.1.8), difenzoquat (K.1.9), difenzoquat-methylsulfate (K.1.10), diphenylamin (K.1.11), fenitropan (K.1.12), fenpyrazamine (K.1.13), flumetover (K.1.14), flusulfamide (K.1.15), flutianil (K.1.16), harpin (K.1.17), methasulfocarb (K.1.18), nitrapyrin (K.1.19), nitrothal-isopropyl (K.1.20), tolprocarb (K.1.21), oxin-copper (K.1.22), proquinazid (K.1.23), tebufloquin (K.1.24), tecloftalam (K.1.25), triazoxide (K.1.26), N'-(4-(4-chloro-3-trifluoromethyl-phenoxy)-2,5-dimethyl-phenyl)-N-ethyl-N-methyl formamidine (K.1.27), N'-(4-(4-fluoro-3-trifluoromethyl-phenoxy)-2,5-dimethyl-phenyl)-N-eth-yl-N-methyl formamidine (K.1.28), N'-[4-[[3-[(4-chlorophenyl) methyl]-1,2,4-thiadiazol-5-yl]-oxy]-2,5-dimethyl-phenyl]-N-ethyl-N-methyl-formamidine (K.1.29), N'-(5-bromo-6-indan-2-yl-oxy-2-methyl-3-pyridyl)-N-ethyl-N-methyl-formamidine (K.1.30), N'-[5-bromo-6-[1-(3,5-difluorophenyl)ethoxy]-2-methyl-3-pyridyl]-N-ethyl-N-methyl-formamidine (K.1.31), N'-[5-bromo-6-(4-isopropylcyclohexoxy)-2-methyl-3-pyridyl]-N-ethyl-N-methyl-formamidine (K.1.32), N'-[5-bromo-2-methyl-6-(1-phenylethoxy)-3-pyridyl]-N-ethyl-N-methyl-formamidine (K.1.33), N'-(2-methyl-5-trifluoromethyl-4-(3-trimethylsilanyl-propoxy)-phenyl)-N-ethyl-N-methyl formamidine (K.1.34), N'-(5-difluoromethyl-2-methyl-4-(3-trimethylsilanyl-propoxy)-phenyl)-N-ethyl-N-methyl formamidine (K.1.35), 2-(4-chloro-phenyl)-N-[4-(3,4-dimethoxy-phenyl)-isoxazol-5-yl]-2-prop-2-ynyloxy-acetamide (K.1.36), 3-[5-(4-chloro-phenyl)-2,3-dimethyl-isoxazolidin-3-yl]-pyridine (pyrisoxazole) (K.1.37), 3-[5-(4-methylphenyl)-2,3-dimethyl-isoxazolidin-3 yl]-pyridine (K.1.38), 5-chloro-1-(4,6-dimethoxy-pyrimidin-2-yl)-2-methyl-1H-benzoimidazole (K.1.39), ethyl (Z)-3-amino-2-cyano-3-phenyl-prop-2-enoate (K.1.40), picarbutrazox (K.1.41), pentyl N-[6-[[(Z)-[(1-methyl-tetrazol-5-yl)-phenyl-methylene]amino]oxymethyl]-2-pyridyl]carbamate (K.1.42), but-3-ynyl N-[6-[[(Z)-[(1-methyltetrazol-5-yl)-phenyl-methylene]amino] oxymethyl]-2-pyridyl]carbamate (K.1.43), 2-[2-[(7,8-difluoro-2-methyl-3-quinolyl)oxy]-6-fluoro-phenyl] propan-2-ol (K.1.44), 2-[2-fluoro-6-[(8-fluoro-2-methyl-3-quinolyl)oxy]phen-yl]propan-2-ol (K.1.45), 3-(5-fluoro-3,3,4,4-tetramethyl-3,4-dihydroiso-quinolin-1-yl)quinoline (K.1.46), quinofumelin (K.1.47), 3-(4,4,5-trifluoro-3,3-dimethyl-3,4-dihydroisoquinolin-1-yl)quinoline (K.1.48), 9-fluoro-2,2-dimethyl-5-(3-quinolyl)-3H-1,4-benzoxazepine (K.1.49), 2-(6-benzyl-2-pyridyl)quinazoline (K.1.50), 2-[6-(3-fluoro-4-methoxy-phenyl)-5-methyl-2-pyridyl]quinazoline (K.1.51), dichlobentiazox (K.1.52), N'-(2,5-dimethyl-4-phenoxy-phenyl)-N-ethyl-N-methyl-formamidine (K.1.53), and aminopyrifen (K.1.54);

L) Biopesticides selected from the group consisting of

L1) Microbial pesticides with fungicidal, bactericidal, viricidal and/or plant defense activator activity selected from the group consisting of *Ampelomyces quisqualis* (L.1.1), *Aspergillus flavus* (L.1.2), *Aureobasidium pullulans* (L.1.3), *Bacillus altitudinis* (L.1.4), *B. amyloliquefaciens* (L.1.5), *B. megaterium* (L.1.6), *B. mojavensis*

(L.1.7), *B. mycoides* (L.1.8), *B. pumilus* (L.1.9), *B. simplex* (L.1.10), *B. solisalsi* (L.1.11), *B. subtilis* (L.1.12), *B. subtilis* var. *amyloliquefaciens* (L.1.13), *Candida oleophila* (L.1.14), *C. saitoana* (L.1.15), *Clavibacter michiganensis* (bacterophages) (L.1.16), *Coniothyrium minitans* (L.1.17), *Cryphonectria parasitica* (L.1.18), *Cryptococcus albidus* (L.1.19), Dilophosphora *alopecuri* (L.1.20), *Fusarium oxysporum* (L.1.21), *Clonostachys rosea* f. *catenulate* (also named *Gliocladium catenulatum*) (L.1.22), *Gliocladium roseum* (L.1.23), Lysobacter *antibioticus* (L.1.24), *L. enzymogenes* (L.1.25), *Metschnikowia fructicola* (L.1.26), Microdochium *dimerum* (L.1.27), Microsphaeropsis *ochracea* (L.1.28), Muscodor *albus* (L.1.29), *Paenibacillus alvei* (L.1.30), *Paenibacillus* epiphyticus (L.1.31), *P. polymyxa* (L.1.32), *Pantoea vagans* (L.1.33), *Penicillium* bilaiae (L.1.34), *Phlebiopsis gigantea* (L.1.35), *Pseudomonas* sp. (L.1.36), *Pseudomonas* chloraphis (L.1.37), Pseudozyma flocculosa (L.1.38), *Pichia anomala* (L.1.39), *Pythium oligandrum* (L.1.40), Sphaerodes mycoparasitica (L.1.41), *Streptomyces griseoviridis* (L.1.42), *S. lydicus* (L.1.43), *S. violaceusniger* (L.1.44), *Talaromyces flavus* (L.1.45), *Trichoderma* asperelloides (L.1.46), *T. asperellum* (L.1.47), *T. atroviride* (L.1.48), *T. fertile* (L.1.49), *T. gamsii* (L.1.50), T. harmatum (L.1.51), *T. harzianum* (L.1.52), *T. polysporum* (L.1.53), *T. stromaticum* (L.1.54), *T. virens* (L.1.55), *T. viride* (L.1.56), Typhula phacorrhiza (L.1.57), Ulocladium oudemansii0 (L.1.58), *Verticillium* dahlia, and zucchini yellow mosaic virus (avirulent strain) (L.1.59);

L2) Biochemical pesticides with fungicidal, bactericidal, viricidal and/or plant defense activator activity selected from the group consisting of harpin protein (L.2.1 and *Reynoutria sachalinensis* extract (L.2.1);

L3) Microbial pesticides with insecticidal, acaricidal, molluscidal and/or nematicidal activity selected from the group consisting of *Agrobacterium radiobacter* (L.3.1), *Bacillus cereus* (L.3.2), *B. firmus* (L.3.3), *B. thuringiensis* (L.3.4), *B. thuringiensis* ssp. *aizawai* (L.3.5), B. t. ssp. *israelensis* (L.3.6), B. t. ssp. *galleriae* (L.3.7), B. t. ssp. kurstaki (L.3.8), B. t. ssp. *tenebrionis* (L.3.9), *Beauveria bassiana* (L.3.10), *B. brongniarti* (L.3.11), *Burkholderia* spp. (L.3.12), *Chromobacterium subtsugae* (L.3.13), *Cydia pomonella* granulovirus (CpGV) (L.3.14), Cryptophlebia leucotreta granulovirus (CrIeGV) (L.3.15), *Flavobacterium* spp. (L.3.16), *Helicoverpa armigera* nucleopolyhedrovirus (HearNPV) (L.3.17), *Helicoverpa zea* nucleopolyhedrovirus (HzNPV) (L.3.18), *Helicoverpa zea* single capsid nucleopolyhedrovirus (HzSNPV) (L.3.19), Heterorhabditis bacteriophora (L.3.20), Isaria fumosorosea (L.3.21), Lecanicillium *longisporum* (L.3.22), *L. muscarium* (L.3.23), Metarhizium anisopliae (L.3.24), *M. anisopliae* var. anisopliae (L.3.25), *M. anisopliae* var. acridum (L.3.26), *Nomuraea rileyi* (L.3.27), *Paecilomyces* fumosoroseus (L.3.28), *P. lilacinus* (L.3.29), *Paenibacillus popilliae* (L.3.30), Pasteuria spp. (L.3.31), *P. nishizawae* (L.3.32), *P. penetrans* (L.3.33), *P. ramosa* (L.3.34), P. thornea (L.3.35), P. usgae (L.3.36), *Pseudomonas fluorescens* (L.3.37), *Spodoptera littoralis* nucleopolyhedrovirus (SpliNPV) (L.3.38), Steinernema carpocapsae (L.3.39), *S. feltiae* (L.3.40), *S. kraussei* (L.3.41), *Streptomyces galbus* (L.3.42), and *S. microflavus* (L.3.43);

L4) Biochemical pesticides with insecticidal, acaricidal, molluscidal, pheromone and/or nematicidal activity selected from the group consisting of L-carvone, citral (L.4.1), (E,Z)-7,9-dodecadien-1-yl acetate (L.4.2), ethyl formate (L.4.3), (E,Z)-2,4-ethyl decadienoate (pear ester) (L4.4), (Z,Z,E)-7,11,13-hexadecatrienal (L.4.5), heptyl butyrate (L.4.6), isopropyl myristate (L.4.7), lavanulyl senecioate (L.4.8), cis-jasmone (L.4.9), 2-methyl 1-butanol (L.4.10), methyl eugenol (L.4.11), methyl jasmonate (L.4.12), (E,Z)-2,13-octadecadien-1-ol (L.4.13), (E,Z)-2,13-octadecadien-1-ol acetate (L.4.14), (E,Z)-3,13-octadecadien-1-ol (L.4.15), (R)-1-octen-3-ol (L.4.16), pentatermanone (L.4.17), (E,Z,Z)-3,8,11-tetradecatrienyl acetate (L.4.18), (Z,E)-9,12-tetradecadien-1-yl acetate (L.4.19), (Z)-7-tetradecen-2-one (L.4.20), (Z)-9-tetradecen-1-yl acetate (L.4.21), (Z)-11-tetradecenal (L.4.22), (Z)-11-tetradecen-1-ol (L.4.23), extract of *Chenopodium ambrosiodes* (L.4.24), Neem oil, and Quillay extract (L.4.25); and L5) Microbial pesticides with plant stress reducing, plant growth regulator, plant growth promoting and/or yield enhancing activity selected from the group consisting of Azospirillum amazonense (L.5.1), *A. brasilense* (L.5.2), *A. lipoferum* (L.5.3), *A. irakense* (L.5.4), *A. halopraeferens* (L.5.5), *Bradyrhizobium* spp. (L.5.6), *B. elkanii* (L.5.7), *B. japonicum* (L.5.8), *B. liaoningense* (L.5.9), *B. lupini* (L.5.10), Delftia *acidovorans* (L.5.11), *Glomus intraradices* (L.5.12), *Mesorhizobium* spp. (L.5.13), *Rhizobium leguminosarum* bv. *phaseoli* (L.5.14), R. I. bv. *trifolii* (L.5.15), R. I. bv. *viciae* (L.5.16), *R. tropici* (L.5.17), and *Sinorhizobium meliloti* (L.5.18);

M) Growth regulators selected from the group consisting of abscisic acid (M.1.1), amidochlor, ancymidol (M.1.2), 6-benzylaminopurne (M.1.3), brassinolide (M.1.4), butralin (M.1.5), chlormequat (M.1.6), chlormequat chloride (M.1.7), choline chloride (M.1.8), cyclanilide (M.1.9), daminozide (M.1.10), dikegulac (M.1.11), dimethipin (M.1.12), 2,6-dimethylpuridine (M.1.13), ethephon (M.1.14), flumetralin (M.1.15), flurprimidol (M.1.16), fluthiacet (M.1.17), forchlorfenuron (M.1.18), gibberellic acid (M.1.19), inabenfide (M.1.20), indole-3-acetic acid (M.1.21), maleic hydrazide (M.1.22), mefluidide (M.1.23), mepiquat (M.1.24), mepiquat chloride (M.1.25), naphthaleneacetic acid (M.1.26), N-6-benzyladenine (M.1.27), paclobutrazol (M.1.28), prohexadione (M.1.29), prohexadione-calcium (M.1.30), prohydrojasmon (M.1.31), thidiazuron (M.1.32), triapenthenol (M.1.33), tributyl phosphorotrithioate (M.1.34), 2,3,5-tri-iodobenzoic acid (M.1.35), trinexapac-ethyl, and uniconazole (M.1.36);

N) Herbicides from classes N.1 to N.15 selected from the group consisting of

N.1 Lipid biosynthesis inhibitors selected from the group consisting of alloxydim (N.1.1), alloxydim-sodium (N.1.2), butroxydim (N.1.3), clethodim (N.1.4), clodinafop (N.1.5), clodinafop-propargyl (N.1.6), cycloxydim (N.1.7), cyhalofop (N.1.8), cyhalofop-butyl (N.1.9), diclofop(N.1.10), diclofop-methyl (N.1.11), fenoxaprop (N.1.12), fenoxaprop-ethyl (N.1.13), fenoxaprop-P (N.1.14), fenoxaprop-P-ethyl (N.1.15), fluazifop (N.1.16), fluazifop-butyl (N.1.17), fluazifop-P (N.1.18), fluazifop-P-butyl (N.1.19), haloxyfop (N.1.20), haloxyfop-methyl (N.1.21), haloxyfop-P (N.1.22), haloxyfop-P-methyl (N.1.23), metamifop (N.1.24), pinoxaden (N.1.25), profoxydim (N.1.26), propaquizafop (N.1.27), quizalofop (N.1.28), quizalofop-ethyl (N.1.29), quizalofop-tefuryl (N.1.30), quizalofop-P (N.1.31), quizalofop-P-ethyl (N.1.32), quizalofop-P-tefuryl (N.1.33), sethoxydim (N.1.34), tepraloxydim (N.1.35), tralkoxydim (N.1.36), 4-(4'-chloro-4-[[cyclo¬]] cyclo-propyl-2'-fluoro[1,1'-biphenyl]-3-yl)-5-hydroxy-2,2,6,6-tetramethyl-2H-pyran-3(6H)-one ((N.1.37) CAS 1312337-72-6); 4-(2',4'-dichloro-4-cyclopropyl[1,1'-biphenyl]-3-yl)-5-hydroxy-2,2,6,6-tetramethyl-2H-pyran-3(6H)-one ((N.1.38) CAS 1312337-45-3); 4-(4'-chloro-4-ethyl-2'-fluoro[1,1'-biphenyl]-3-yl)-5-hydroxy-2,2,6,6-tetramethyl-2H-pyran-3(6H)-one ((N.1.39) CAS 1033757-93-5); 4-(2',4'-Dichloro-4-ethyl[1,1'-biphenyl]-3-yl)-2,2,6,6-tetramethyl-2H-pyran-3,5(4H,6H)-dione ((N.1.40) CAS 1312340-84-3); 5-(acetyloxy)-4-(4'-chloro-4-cyclopropyl-2'-fluoro[1,1'-biphenyl]-3-yl)-3,6-dihydro-2,2,6,6-tetramethyl-2H-pyran-3-one ((N.1.41) CAS 1312337-48-6); 5-(acetyloxy)-4-(2',4'-dichloro-4-cyclopropyl-[1,1'-biphenyl]-3-yl)-3,6-dihydro-2,2,6,6-tetramethyl-2H-pyran-3-one (N.1.42); 5-(acetyloxy)-4-(4'-chloro-4-ethyl-2'-fluoro[1,1'-biphenyl]-3-yl)-3,6-dihydro-2,2,6,6-tetramethyl-2H-pyran-3-one ((N.1.43) CAS 1312340-82-1); 5-(acetyloxy)-4-(2',4'-dichloro-4-ethyl[1,1'-biphenyl]-3-yl)-3,6-dihydro-2,2,6,6-tetramethyl-2H-pyran-3-one ((N.1.44) CAS 1033760-55-2); 4-(4'-chloro-4-cyclopropyl-2'-fluoro[1,1'-biphenyl]-3-yl)-5,6-dihydro-2,2,6,6-tetramethyl-5-oxo-2H-pyran-3-yl carbonic acid methyl ester ((N.1.45) CAS 1312337-51-1); 4-(2',4'-dichloro-4-cyclopropyl-[1,1'-biphenyl]-3-yl)-5,6-dihydro-2,2,6,6-tetramethyl-5-oxo-2H-pyran-3-yl carbonic acid methyl ester (N.1.46); 4-(4'-chloro-4-ethyl-2'-fluoro[1,1'-biphenyl]-3-yl)-5,6-dihydro-2,2,6,6-tetramethyl-5-oxo-2H-pyran-3-yl carbonic acid methyl ester ((N.1.47) CAS 1312340-83-2); 4-(2',4'-dichloro-4-ethyl-[1,1'-biphenyl]-3-yl)-5,6-dihydro-2,2,6,6-tetramethyl-5-oxo-2H-pyran-3-yl carbonic acid methyl ester ((N.1.48) CAS 1033760-58-5); benfuresate (N.1.49), butylate (N.1.50), cycloate (N.1.51), dalapon (N.1.52), dimepiperate (N.1.53), EPTC (N.1.54), esprocarb (N.1.55), ethofumesate (N.1.56), flupropanate (N.1.57), molinate (N.1.58), orbencarb (N.1.59), pebulate (N.1.60), prosulfocarb (N.1.61), TCA (N.1.62), thiobencarb (N.1.63), tiocarbazil (N.1.64), triallate (N.1.65), and vernolate (N.1.66);

N.2 ALS inhibitors selected from the group consisting of amidosulfuron (N.2.1), azimsulfuron (N.2.2), bensulfuron (N.2.3), bensulfuron-methyl (N.2.4), chlorimuron (N.2.5), chlorimuron-ethyl (N.2.6), chlorsulfuron (N.2.7), cinosulfuron (N.2.8), cyclosulfamuron (N.2.9), ethametsulfuron (N.2.10), ethametsulfuron-methyl (N.2.11), ethoxysulfuron (N.2.12), flazasulfuron (N.2.13), flucetosulfuron (N.2.14), flupyrsulfuron (N.2.15), flupyrsulfuron-methyl-sodium (N.2.16), foramsulfuron (N.2.17), halosulfuron (N.2.18), halosulfuron-methyl (N.2.19), imazosulfuron (N.2.20), iodosulfuron (N.2.21), iodosulfuron-methyl-sodium (N.2.22), iofensulfuron (N.2.23), iofensulfuron-sodium (N.2.24), mesosulfuron (N.2.25), metazosulfuron (N.2.26), metsulfuron (N.2.27), metsulfuron-methyl (N.2.28), nicosulfuron (N.2.29), orthosulfamuron (N.2.30), oxasulfuron (N.2.31), primisulfuron (N.2.32), primisulfuron-methyl (N.2.33), propyrisulfuron (N.2.34), prosulfuron (N.2.35), pyrazosulfuron (N.2.36), pyrazosulfuron-ethyl (N.2.37), rimsulfuron (N.2.38), sulfometuron (N.2.39), sulfometuron-methyl (N.2.40), sulfosulfuron (N.2.41), thifensulfuron (N.2.42), thifensulfuron-methyl (N.2.43), triasulfuron (N.2.44), tribenuron (N.2.45), tribenuron-methyl (N.2.46), trifloxysulfuron (N.2.47), triflusulfuron (N.2.48), triflusulfuron-methyl (N.2.49), tritosulfuron (N.2.50), imazamethabenz (N.2.51), imazamethabenz-methyl (N.2.52), imazamox (N.2.53), imazapic (N.2.54), imazapyr (N.2.55), imazaquin (N.2.56), imazethapyr (N.2.57); cloransulam (N.2.58), cloransulam-methyl (N.2.59), diclosulam (N.2.60), flumetsulam (N.2.61), florasulam (N.2.62), metosulam (N.2.63), penoxsulam (N.2.64), pyrimisulfan (N.2.65) and pyroxsulam (N.2.66); bispyribac (N.2.67), bispyribac-sodium (N.2.68), pyribenzoxim (N.2.69), pyriftalid (N.2.70), pyriminobac (N.2.71), pyriminobac-methyl (N.2.72), pyrithiobac (N.2.73), pyrithiobac-sodium (N.2.74), 4-[[[2-[(4,6-dimethoxy-2-pyrimidinyl)oxy]phenyl]methyl]amino]-benzoic acid-1-methyl¬ethyl ester ((N.2.75) CAS 420138-41-6), 4-[[[2-[(4,6-dimethoxy-2-pyrmidinyl)oxy]phenyl-methyl]amino]-benzoic acid propyl ester ((N.2.76) CAS 420138-40-5), N-(4-bromophenyl)-2-[(4,6-dimethoxy-2-pyrimidinyl)oxy]benzenemethanamine ((N.2.77) CAS 420138-01-8); flucarbazone (N.2.78), flucarbazone-sodium (N.2.79), propoxycarbazone (N.2.80), propoxycarbazone-sodium (N.2.81), thiencarbazone (N.2.82), thiencarbazone-methyl (N.2.83), and triafamone (N.2.84);

N.3 Photosynthesis inhibitors selected from the group consisting of amicarbazone (N.3.1); chlorotriazine (N.3.2); ametryn (N.3.3), atrazine (N.3.4), chloridazone (N.3.5), cyanazine (N.3.6), desmetryn (N.3.7), dimethametryn (N.3.8), hexazinone (N.3.9), metribuzin (N.3.10), prometon (N.3.11), prometryn (N.3.12), propazine (N.3.13), simazine (N.3.14), simetryn (N.3.15), terbumeton (N.3.16), terbuthylazin (N.3.17), terbutryn (N.3.18), trietazin (N.3.19); chlorobromuron (N.3.20), chlorotoluron (N.3.21), chloroxuron (N.3.22), dimefuron (N.3.23), diuron (N.3.24), fluometuron (N.3.25), isoproturon (N.3.26), isouron (N.3.27), linuron (N.3.28), metamitron (N.3.29), methabenzthiazuron (N.3.30), metobenzuron (N.3.31), metoxuron (N.3.32), monolinuron (N.3.33), neburon (N.3.34), siduron (N.3.35), tebuthiuron (N.3.36), thiadiazuron (N.3.37), desmedipham (N.3.38), karbutilat (N.3.39), phenmedipham (N.3.40), phenmedipham-ethyl (N.3.41), bromofenoxim (N.3.42), bromoxynil (N.3.43) and its salts and esters, ioxynil (N.3.44) and its salts and esters, bromacil (N.3.45), lenacil (N.3.46), terbacil (N.3.47), bentazon (N.3.48), bentazon-sodium (N.3.49), pyridate (N.3.50), pyridafol (N.3.51), pentanochlor (N.3.52), propanil (N.3.53); diquat (N.3.54), diquat-dibromide (N.3.55), paraquat (N.3.56), paraquat-dichloride (N.3.57), and paraquat-dimetilsulfate (N.3.58);

N.4 protoporphyrinogen-IX oxidase inhibitors selected from the group consisting of acifluorfen (N.4.1), acifluorfen-sodium (N.4.2), azafenidin (N.4.3), bencarbazone (N.4.4), benzfendizone (N.4.5), bifenox (N.4.6), butafenacil (N.4.7), carfentrazone (N.4.8), carfentrazone-ethyl (N.4.9), chlormethoxyfen (N.4.10), cinidon-ethyl (N.4.11), fluazolate (N.4.12), flufenpyr (N.4.13), flufenpyr-ethyl (N.4.14), flumiclorac (N.4.15), flumiclorac-pentyl (N.4.16), flumioxazin (N.4.17), fluoroglycofen (N.4.18), fluoroglycofen-ethyl (N.4.19), fluthiacet (N.4.20), fluthiacet-methyl (N.4.21), fomesafen (N.4.22), halosafen (N.4.23), lactofen (N.4.24), oxadiargyl (N.4.25), oxadiazon (N.4.26), oxyfluorfen (N.4.27), pentoxazone (N.4.28), profluazol (N.4.29), pyraclonil (N.4.30), pyraflufen (N.4.31), pyraflufen-ethyl (N.4.32), saflufenacil (N.4.33), sulfentrazone (N.4.34), thidiazimin (N.4.35), tiafenacil (N.4.36), trifludimoxazin (N.4.37), ethyl [3-[2-chloro-4-fluoro-5-(1-methyl-6-trifluoromethyl-2,4-dioxo-1,2,3,4-tetrahydropyrimidin-3-yl)phenoxy]-2-pyridyloxy]acetate ((N.4.38) CAS 353292-31-6), N-ethyl-3-(2,6-dichloro-4-trifluoro-methylphenoxy)-5-methyl-1H-pyrazole-1-carboxamide ((N.4.39) CAS 452098-92-9), N tetrahydrofurfuryl-3-(2,6-dichloro-4-trifluoromethylphenoxy)-5-methyl-1H-pyrazole-1-carboxamide ((N.4.40) CAS 915396-43-9), N-ethyl-3-(2-chloro-6-fluoro-4-trifluoromethyl-phenoxy)-5-methyl-1H-pyrazole-1-carboxamide ((N.4.41) CAS 452099-05-7), N tetrahydro-furfuryl-3-(2-chloro-6-fluoro-4-trifluoro¬methylphenoxy)-5-methyl-1H-pyrazole-1-carboxamide ((N.4.42) CAS 452100-03-7), 3-[7-fluoro-3-oxo-4-(prop-2-ynyl)-3,4-dihydro-2H-benzo[1,4]oxazin-6-yl]-1,5-dimethyl-6-thioxo-[1,3,5] triazinan-2,4-dione ((N.4.43) CAS 451484-50-7), 2-(2,2,7-trifluoro-3-oxo-4-prop-2-ynyl-3,4-dihydro-2H-benzo[1,4]oxazin-6-yl)-4,5,6,7-tetrahydro-isoindole-1,3-dione ((N.4.44) CAS 1300118-96-0), 1-methyl-6-tetrafluoro-methyl-3-(2,2,7-tri-fluoro-3-oxo-4-prop-2-ynyl-3,4-dihydro-2H-benzo[1,4]oxazin-6-yl)-1H-pyrimidine-2,4-dione ((N.4.45) CAS 1304113-05-0), methyl (E)-4-[2-chloro-5-[4-chloro-5-(difluoromethoxy)-1H-methyl-pyrazol-3-yl]-4-fluoro-phenoxy]-3-methoxy-but-2-enoate ((N.4.46) CAS 948893-00-3), and 3-[7-chloro-5-fluoro-2-(trifluoromethyl)-1H-benzimidazol-4-yl]-1-methyl-6-(trifluoromethyl)-1H-pyrimidine-2,4-dione ((N.4.47) CAS 212754-02-4);

N.5 Bleacher herbicides selected from the group consisting of beflubutamid (N.5.1), diflufenican (N.5.2), fluridone (N.5.3), flurochloridone (N.5.4), flurtamone (N.5.5), norflurazon (N.5.6), picolinafen (N.5.7), 4-(3-trfluoromethyl-phenoxy)-2-(4-trifluoromethylphenyl)-pyrimidine ((N.5.8) CAS 180608-33-7), benzobicyclon (N.5.9), benzofenap (N.5.10), bicyclopyrone (N.5.11), clomazone (N.5.12), fenquintrione (N.5.13), isoxaflutole (N.5.14), mesotrione (N.5.15), pyrasulfotole (N.5.16), pyrazolynate (N.5.17), pyrazoxyfen (N.5.18), sulcotrione (N.5.19), tefuryltrione (N.5.20), tembotrione (N.5.21), tolpyralate (N.5.22), topramezone (N.5.23); aclonifen (N.5.24), amitrole (N.5.25), and fluometuron (N.5.26);

N.6 EPSP synthase inhibitors selected from the group consisting of glyphosate (N.6.1), glyphosate-isopropylammonium (N.6.2), glyposate-potassium (N.6.3), and glyphosate-trimesium (sulfosate) (N.6.4);

N.7 Glutamine synthase inhibitors selected from the group consisting of bilanaphos (bialaphos) (N.7.1), bilanaphos-sodium (N.7.2), glufosinate (N.7.3), glufosinate-P (N.7.4), and glufosinate-ammonium (N.7.5);

N.8 asulam (N.8.1);

N.9 Mitosis inhibitors selected from the group consisting of benfluralin (N.9.1), butralin (N.9.2), dinitramine (N.9.3), ethalfluralin (N.9.4), fluchloralin (N.9.5), oryzalin (N.9.6), pendimethalin (N.9.7), prodiamine (N.9.8), trifluralin (N.9.9), amiprophos (N.9.10), amiprophos-methyl (N.9.11), butamiphos (N.9.12), chlorthal (N.9.13), chlorthal-dimethyl (N.9.14), dithiopyr (N.9.15), thiazopyr (N.9.16), propyzamide (N.9.17), tebutam (N.9.18), carbetamide (N.9.19), chlorpropham (N.9.20), flamprop (N.9.21), flamprop-isopropyl (N.9.22), flamprop-methyl (N.9.23), flamprop-M-isopropyl (N.9.24), flamprop-M-methyl (N.9.25), and propham (N.9.26);

N.10 VLCFA inhibitors selected from the group consisting of acetochlor (N.10.1), alachlor (N.10.2), butachlor (N.10.3), dimethachlor (N.10.4), dimethenamid (N.10.5), dimethenamid-P (N.10.6), metazachlor (N.10.7), metolachlor (N.10.8), metolachlor-S (N.10.9), pethoxamid (N.10.10), pretilachlor (N.10.11), propachlor (N.10.12), propisochlor (N.10.13), thenylchlor (N.10.14), flufenacet (N.10.15), mefenacet (N.10.16), diphenamid (N.10.17), naproanilide (N.10.18), napropamide (N.10.19), napropamide-M (N.10.20), fentrazamide (N.10.21), anilofos (N.10.22), cafenstrole (N.10.23), fenoxasulfone (N.10.24), ipfencarbazone (N.10.25), piperophos (N.10.26), pyroxasulfone (N.10.27), and isoxazoline compounds of the formulae II.1, II.2, II.3, II.4, II.5, II.6, II.7, II.8, and II.9

II.1

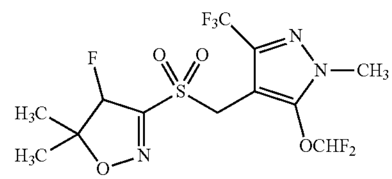

II.2

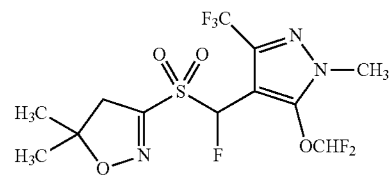

II.3

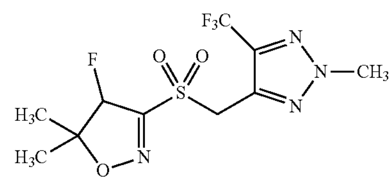

II.4

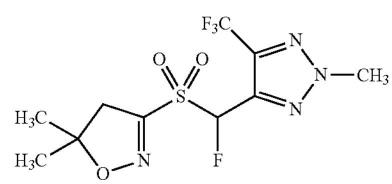

II.5

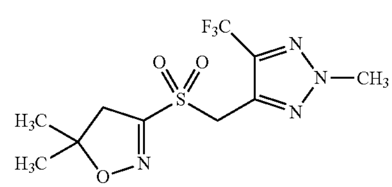

II.6

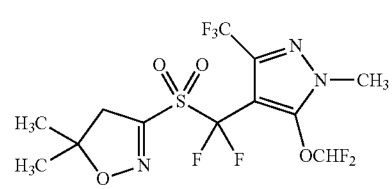

-continued

II.7

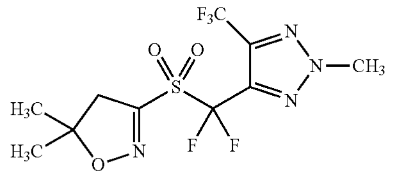

II.8

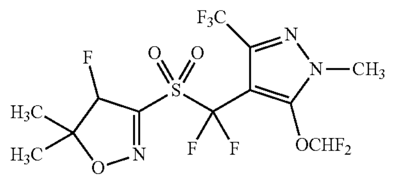

II.9

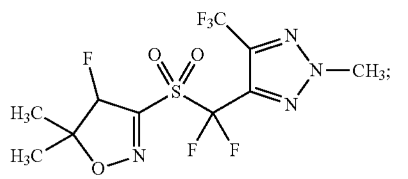

N.11 Cellulose biosynthesis inhibitors selected from the group consisting of chlorthiamid (N.11.1), dichlobenil (N.11.2), flupoxam (N.11.3), indaziflam (N.11.4), isoxaben (N.11.5), triaziflam (N.11.6), and 1-cyclohexyl-5-pentafluorphenyloxy-14-[1,2,4,6]thiatrazin-3-ylamine ((N.11.7) CAS 175899-01-1);

N.12 Decoupler herbicides selected from the group consisting of dinoseb (N.12.1), dinoterb (N.12.2), DNOC (N.12.3), and its salts;

N.13 Auxinic herbicides selected from the group consisting of 2,4-D (N.13.1) and its salts and esters, clacyfos (N.13.2), 2,4-DB (N.13.3) and its salts and esters, aminocyclopyrachlor (N.13.4) and its salts and esters, aminopyralid (N.13.5) and its salts (N.13.6), aminopyralid-tris(2-hydroxypropyl)ammonium (N.13.7) and its esters, benazolin (N.13.8), benazolin-ethyl (N.13.9), chloramben (N.13.10) and its salts and esters, clomeprop (N.13.11), clopyralid (N.13.12) and its salts and esters, dicamba (N.13.13) and its salts and esters, dichlorprop (N.13.14) and its salts and esters, dichlorprop-P (N.13.15) and its salts and esters, fluroxypyr (N.13.16), fluroxypyr-butometyl (N.13.17), fluroxypyr-meptyl (N.13.18), halauxifen (CAS 943832-60-8) and its salts and esters; MCPA and its salts and esters, MCPA-thioethyl (N.13.19), MCPB (N.13.20) and its salts and esters, mecoprop (N.13.21) and its salts and esters, mecoprop-P (N.13.22) and its salts and esters, picloram (N.13.23) and its salts and esters, quinclorac (N.13.24), quinmerac (N.13.25), 2.3.6-trichlorobenzoic acid (N.13.26) and its salts and esters, triclopyr (N.13.27) and its salts and esters, 4-amino-3-chloro-6-(4-chloro-2-fluoro-3-methoxyphenyl)-5-fluoropyridine-2-carboxylic acid (N.13.28), and benzyl 4-amino-3-chloro-6-(4-chloro-2-fluoro-3-methoxyphenyl)-5-fluoropyridine-2-carboxylate ((N.13.29) CAS 1390661-72-9);

N.14 Auxin transport inhibitors selected from the group consisting of diflufenzopyr (N.14.1), diflufenzopyr-sodium (N.14.2), naptalam (N.14.3), and naptalam-sodium (N.14.4); and N.15 Other herbicides selected from the group consisting of bromobutide (N.15.1), chlorflurenol (N.15.2), chlorflurenol-methyl (N.15.3), cinmethylin (N.15.4), cumyluron (N.15.5), cyclopyrimorate ((N.15.6) CAS 499223-49-3) and its salts and esters, dalapon (N.15.7), dazomet (N.15.8), difenzoquat (N.15.9), difenzoquat-metilsulfate (N.15.10), dimethipin (N.15.11), DSMA (N.15.12), dymron (N.15.13), endothal (N.15.14) and its salts, etobenzanid (N.15.15), flurenol (N.15.16), flurenol-butyl (N.15.17), flurprimidol (N.15.18), fosamine (N.15.19), fosamine-ammonium (N.15.20), indanofan (N.15.21), maleic hydrazide (N.15.22), mefluidide (N.15.23), metam (N.15.24), methiozolin ((N.15.25) CAS 403640-27-7), methyl azide (N.15.26), methyl bromide (N.15.27), methyl-dymron (N.15.28), methyl iodide (N.15.29), MSMA (N.15.30), oleic acid (N.15.31), oxaziclomefone (N.15.32), pelargonic acid (N.15.33), pyributicarb (N.15.34), quinoclamine (N.15.35), and tridiphane (N.15.36);

O) Insecticides from classes O.1 to O.27 selected from the group consisting of

O.1 Acetylcholine esterase (AChE) inhibitors selected from the group consisting of aldicarb (O.1.1), alanycarb (O.1.2), bendiocarb (O.1.3), benfuracarb (O.1.4), butocarboxim (O.1.5), butoxycarboxim (O.1.6), carbaryl (O.1.7), carbofuran (O.1.8), carbosulfan (O.1.9), ethiofencarb (O.1.10), fenobucarb (O.1.11), formetanate (O.1.12), furathiocarb (O.1.13), isoprocarb (O.1.14), methiocarb (O.1.15), methomyl (O.1.16), metolcarb (O.1.17), oxamyl (O.1.18), pirimicarb (O.1.19), propoxur (O.1.20), thiodicarb (O.1.21), thiofanox (O.1.22), trimethacarb (O.1.23), XMC (O.1.24), xylylcarb (O.1.25), triazamate (O.1.26); acephate (O.1.27), azamethiphos (O.1.28), azinphos-ethyl (O.1.29), azinphosmethyl (O.1.30), cadusafos (O.1.31), chlorethoxyfos (O.1.32), chlorfenvinphos (O.1.33), chlormephos (O.1.34), chlorpyrifos (O.1.35), chlorpyrifos-methyl (O.1.36), coumaphos (O.1.37), cyanophos (O.1.38), demeton-S-methyl (O.1.39), diazinon (O.1.40), dichlorvos/DDVP (O.1.41), dicrotophos (O.1.42), dimethoate (O.1.43), dimethylvinphos (O.1.44), disulfoton (O.1.45), EPN (O.1.46), ethion (O.1.47), ethoprophos (O.1.48), famphur (O.1.49), fenamiphos (O.1.50), fenitrothion (O.1.51), fenthion (O.1.52), fosthiazate (O.1.53), heptenophos (O.1.54), imicyafos (O.1.55), isofenphos (O.1.56), isopropyl 0-(methoxyaminothio-phosphoryl) salicylate (O.1.57), isoxathion (O.1.58), malathion (O.1.59), mecarbam (O.1.60), methamidophos (O.1.61), methidathion (O.1.62), mevinphos (O.1.63), monocrotophos (O.1.64), naled (O.1.65), omethoate (O.1.66), oxydemeton-methyl (O.1.67), parathion (O.1.68), parathion-methyl (O.1.69), phenthoate (O.1.70), phorate (O.1.71), phosalone (O.1.72), phosmet (O.1.73), phosphamidon (O.1.74), phoxim (O.1.75), pirimiphos-methyl (O.1.76), profenofos (O.1.77), propetamphos (O.1.78), prothiofos (O.1.79), pyraclofos (O.1.80), pyridaphenthion (O.1.81), quinalphos (O.1.82), sulfotep (O.1.83), tebupirimfos (O.1.84), temephos (O.1.85), terbufos (O.1.86), tetrachlorvinphos (O.1.87), thiometon (O.1.88), triazophos (O.1.89), trichlorfon (O.1.90), and vamidothion (O.1.91);

O.2 GABA-gated chloride channel antagonists selected from the group consisting of endosulfan (O.2.1), chlordane (O.2.2); ethiprole (O.2.3), fipronil (O.2.4), flufiprole (O.2.5), pyrafluprole (O.2.6), and pyriprole (O.2.7);

O.3 Sodium channel modulators selected from the group consisting of acrinathrin (O.3.1), allethrin (O.3.2), d-cis-trans allethrin (O.3.3), d-trans allethrin (O.3.4), bifenthrin (O.3.5), bioallethrin (O.3.6), bioallethrin S-cylclopentenyl (O.3.7), bioresmethrin (O.3.8), cycloprothrin (O.3.9), cyfluthrin (O.3.10), beta-cyfluthrin (O.3.11), cyhalothrin (O.3.12), lambda-cyhalothrin (O.3.13), gamma-cyhalothrn (O.3.14), cypermethrin (O.3.15), alpha-cypermethrin (O.3.16), beta-cypermethrin (O.3.17), theta-cypermethrin (O.3.18), zeta-cypermethrin (O.3.19), cyphenothrin (O.3.20), deltamethrin (O.3.21), empenthrin (O.3.22), esfenvalerate (O.3.23), etofenprox (O.3.24), fenpropathrin (O.3.25), fenvalerate (O.3.26), flucythrinate (O.3.27), flumethrin (O.3.28), tau-fluvalinate (O.3.29), halfenprox (O.3.30), heptafluthrin (O.3.31), imiprothrin (O.3.32), meperfluthrin (O.3.33), metofluthrin (O.3.34), momfluorothrin (O.3.35), permethrin (O.3.36), phenothrin (O.3.37), prallethrin (O.3.38), profluthrin (O.3.39), pyrethrin (pyrethrum) (O.3.40), resmethrin (O.3.41), silafluofen (O.3.42), tefluthrin (O.3.43), tetramethylfluthrin (O.3.44), tetramethrin (O.3.45), tralomethrin (O.3.46), and transfluthrin (O.3.47), DDT (O.3.48), a methoxychlor (O.3.49);

O.4 Nicotinic acetylcholine receptor agonists (nAChR) selected from the group consisting of acetamiprid (O.4.1), clothianidin (O.4.2), cycloxaprid (O.4.3), dinotefuran (O.4.4), imidacloprid (O.4.5), nitenpyram (O.4.6), thiacloprid (O.4.7), thiamethoxam (O.4.8), (2E)-1-[(6-chloropyridin-3-yl)methyl]-N'-nitro-2-pentylidene-hydrazinecarboximidamide (O.4.9), and 1-[(6-chloropyridin-3-yl)methyl]-7-methyl-8-nitro-5-propoxy-1,2,3,5,6,7-hexahydroimidazo[1,2-a]pyridine (O.4.10), and nicotine (O.4.11);

O.5 Nicotinic acetylcholine receptor allosteric activators spinosad (O.5.1), spinetoram (O.5.2);

O.6 Chloride channel activators selected from the group consisting of abamectin (O.6.1), emamectin benzoate (O.6.2), ivermectin (O.6.3), lepimectin (O.6.4), and milbemectin (O.6.5);

O.7 Juvenile hormone mimics selected from the group consisting of hydroprene (O.7.1), kinoprene (O.7.2), methoprene (O.7.3), fenoxycarb (O.7.4), and pyriproxyfen (O.7.5);

O.8 miscellaneous non-specific (multi-site) inhibitors selected from the group consisting of methyl bromide (O.8.1) and other alkyl halides; chloropicrin (O.8.2), sulfuryl fluoride (O.8.3), borax (O.8.4), and tartar emetic (O.8.5);

O.9 Selective homopteran feeding blockers selected from the group consisting of pymetrozine (O.9.1), flonicamid (O.9.2);

O.10 Mite growth inhibitors selected from the group consisting of clofentezine (O.10.1), hexythiazox (O.10.2), diflovidazin (O.10.3), and etoxazole (O.10.4);

O.11 Microbial disruptors of insect midgut membranes selected from the group consisting of the Bt crop proteins Cry1Ab, Cry1Ac, Cry1Fa, Cry2Ab, mCry3A, Cry3Ab, Cry3Bb, and Cry34/35Ab1;

O.12 Inhibitors of mitochondrial ATP synthase selected from the group consisting g diafenthiuron (O.12.1), azocyclotin (O.12.2), cyhexatin (O.12.3), fenbutatin oxide (O.12.4), propargite (O.12.5), and tetradifon (O.12.6);

O.13 Uncouplers of oxidative phosphorylation via disruption of the proton gradient selected from the group consisting of chlorfenapyr (O.13.1), DNOC (O.13.2), and sulfluramid (O.13.3);

O.14 Nicotinic acetylcholine receptor (nAChR) channel blockers selected from the group consisting of bensultap (O.14.1), cartap hydrochloride (O.14.2), thiocyclam (O.14.3), and thiosultap sodium (O.14.4);

O.15 Inhibitors of the chitin biosynthesis type 0 selected from the group consisting g bistrifluron (O.15.1), chlorfluazuron (O.15.2), diflubenzuron (O.15.3), flucycloxuron (O.15.4), flufenoxuron (O.15.5), hexaflumuron (O.15.6), lufenuron (O.15.7), novaluron (O.15.8), noviflumuron (O.15.9), teflubenzuron (O.15.10), and triflumuron (O.15.11);

O.16 buprofezin (O.16.1);

O.17 cyromazine (O.17.1);

O.18 Ecdyson receptor agonists selected from the group consisting of methoxyfenozide (O.18.1), tebufenozide (O.18.2), halofenozide (O.18.3), fufenozide (O.18.4), and chromafenozide (O.18.5);

O.19 amitraz (O.19.1);

O.20 Mitochondrial complex Ill electron transport inhibitors selected from the group consisting of hydramethylnon (O.20.1), acequinocyl (O.20.2), and fluacrypyrim (O.20.3);

O.21 Mitochondrial complex I electron transport inhibitors selected from the group consisting of fenazaquin (O.21.1), fenpyroximate (O.21.2), pyrimidifen (O.21.3), pyridaben (O.21.4), tebufenpyrad (O.21.5), tolfenpyrad (O.21.6), and rotenone (O.21.7);

O.22 Voltage-dependent sodium channel blockers selected from the group consisting of indoxacarb (O.22.1), metaflumizone (O.22.2), 2-[2-(4-cyanophenyl)-1-[3-(trifluoromethyl)phenyl]ethylidene]-N-[4-(difluoromethoxy)phenyl]-hydrazinecarboxamide (O.22.3), and N-(3-chloro-2-methylphenyl)-2-[(4-chlorophenyl)-[4-[methyl(methylsulfonyl)-amino]phenyl]methylene]-hydrazinecarboxamide (O.22.4);

O.23 Inhibitors of the of acetyl CoA carboxylase selected from the group consisting of spirodiclofen (O.23.1), spiromesifen (O.23.2), and spirotetramat (O.23.3);

O.24 Mitochondrial complex IV electron transport inhibitors selected from the group consisting of aluminium phosphide (O.24.1), calcium phosphide (O.24.2), phosphine (O.24.3), zinc phosphide (O.24.4), and cyanide (O.24.5);

0.25 Mitochondrial complex II electron transport inhibitors selected from the group consisting of cyenopyrafen (O.25.1) and cyflumetofen (O.25.2);

O.26 Ryanodine receptor-modulators selected from the group consisting of flubendiamide (O.26.1), chlorantraniliprole (O.26.2), cyantraniliprole (O.26.3), cyclaniliprole (O.26.4), tetraniliprole (O.26.5), (R)-3-chloro-N1-{2-methyl-4-[1,2,2,2-tetrafluoro-1-(trifluoromethyl)ethyl]phenyl}-N2-(1-methyl-2-methylsulfonylethyl)phthalamide (O.26.6), (S)-3-chloro-N1-{2-methyl-4-[1,2,2,2-tetrafluoro-1-(trifluoromethyl)ethyl]phenyl}-N2-(1-methyl-2-methylsulfonylethyl)phthalamide (O.26.7), methyl-2-[3,5-dibromo-2-({[3-bromo-1-(3-chloropyridin-2-yl)-1H-pyrazol-5-yl]carbonyl}amino)benzoyl]-1,2-dimethylhydrazinecarboxylate (O.26.8), N-[4,6-dichloro-2-[(diethyl-lambda-4-sulfanylidene)carbamoyl]-phenyl]-2-(3-chloro-2-pyridyl)-5-(trifluoromethyl)pyrazole-3-carboxamide (O.26.9), N-[4-chloro-2-[(diethyl-lambda-4-sulfanylidene)carbamoyl]-6-methyl-phenyl]-2-(3-chloro-2-pyridyl)-5-(trifluoromethyl)pyrazole-3-carboxamide (O.26.10), N-[4-chloro-2-[(di-2-propyl-lambda-4-sulfanylidene)carbamoyl]-6-methyl-phenyl]-2-(3-chloro-2-pyridyl)-

5-(trifluoromethyl)pyrazole-3-carboxamide (O.26.11), N-[4,6-dichloro-2-[(di-2-propyl-lambda-4-sulfanylidene)carbamoyl]-phenyl]-2-(3-chloro-2-pyridyl)-5-(trifluoromethyl)pyrazole-3-carboxamide (O.26.12), N-[4,6-dibromo-2-[(diethyl-lambda-4-sulfanylidene) carbamoyl]-phenyl]-2-(3-chloro-2-pyridyl)-5-(trifluoromethyl)pyrazole-3-carboxamide (O.26.13), N-[2-(5-amino-1,3,4-thiadiazol-2-yl)-4-chloro-6-methylphenyl]-3-bromo-1-(3-chloro-2-pyridinyl)-1H-pyrazole-5-carboxamide (O.26.14); 3-chloro-1-(3-chloro-2-pyridinyl)-N-[2,4-dichloro-6-[[(1-cyano-1-methylethyl)amino]carbonyl]phenyl]-1H-pyrazole-5-carboxamide (O.26.15), 3-bromo-N-[2,4-dichloro-6-(methylcarbamoyl)phenyl]-1-(3,5-dichloro-2-pyridyl)-1H-pyrazole-5-carboxamide (O.26.16), N-[4-chloro-2-[[(1,1-dimethylethyl)amino]carbonyl]-6-methylphenyl]-1-(3-chloro-2-pyridinyl)-3-(fluoromethoxy)-1H-pyrazole-5-carboxamide (O.26.17), and cyhalodiamide (O.26.18); and O.27. insecticidally active compounds of unknown or uncertain mode of action selected from the group consisting of afidopyropen (O.27.1), afoxolaner (O.27.2), azadirachtin (O.27.3), amidoflumet (O.27.4), benzoximate (O.27.5), bifenazate (O.27.6), broflanilide (O.27.7), bromopropylate (O.27.8), chinomethionat (O.27.9), cryolite (O.27.10), dicloromezotiaz (O.27.11), dicofol (O.27.12), flufenerim (O.27.13), flometoquin (O.27.14), fluensulfone (O.27.15), fluhexafon (O.27.16), fluopyram (O.27.17), flupyradifurone (O.27.18), fluralaner (O.27.19), metoxadiazone (O.27.20), piperonyl butoxide (O.27.21), pyflubumide (O.27.22), pyridalyl (O.27.23), pyrifluquinazon (O.27.24), sulfoxaflor (O.27.25), tioxazafen (O.27.26), triflumezopyrim (O.27.27), 11-(4-chloro-2,6-dimethylphenyl)-12-hydroxy-1,4-dioxa-9-azadispiro[4.2.4.2]-tetradec-11-en-10-one (O.27.28), 3-(4'-fluoro-2,4-dimethylbiphenyl-3-yl)-4-hydroxy-8-oxa-1-azaspiro[4.5] dec-3-en-2-one (O.27.28), 1-[2-fluoro-4-methyl-5-[(2,2,2-trifluoroethyl)sulfinyl]phenyl]-3-(trifluoromethyl)-1H-1,2,4-triazole-5-amine (O.27.29), (E/Z)-N-[1-[(6-chloro-3-pyridyl)methyl]-2-pyridylidene]-2,2,2-trifluoro-acetamide (O.27.31), (E/Z)-N-[1-[(6-chloro-5-fluoro-3-pyridyl)methyl]-2-pyridylidene]-2,2,2-trifluoro-acetamide (O.27.32), (E/Z)-2,2,2-trifluoro-N-[1-[(6-fluoro-3-pyridyl)methyl]-2-pyridylidene] acetamide (O.27.33), (E/Z)-N-[1-[(6-bromo-3-pyridyl) methyl]-2-pyridylidene]-2,2,2-trifluoro-acetamide (O.27.34), (E/Z)-N-[1-[1-(6-chloro-3-pyridyl)ethyl]-2-pyridylidene]-2,2,2-trifluoro-acetamide (O.27.35), (E/Z)-N-[1-[(6-chloro-3-pyridyl)methyl]-2-pyridylidene]-2,2-difluoro-acetamide (O.27.36), (E/Z)-2-chloro-N-[1-[(6-chloro-3-pyridyl)methyl]-2-pyridylidene]-2,2-difluoro-acetamide (O.27.37), (E/Z)-N-[1-[(2-chlo-ropyrimidin-5-yl)methyl]-2-pyridylidene]-2,2,2-trifluoro-acetamide (O.27.38), (E/Z)-N-[1-[(6-chloro-3-pyridyl)methyl]-2-pyridylidene]-2,2,3,3,3-pentafluoro-propanamide (O.27.39), N-[1-[(6-chloro-3-pyridyl)methyl]-2-pyridylidene]-2,2,2-trifluoro-thioacetamide (O.27.40), N-[1-[(6-chloro-3-pyridyl)methyl]-2-pyridylidene]-2,2,2-trifluoro-N'-isopropyl-acetamidine (O.27.41), fluazaindolizine (O.27.42), 4-[5-(3,5-dichlorophenyl)-5-(trifluoromethyl)-4H-isoxazol-3-yl]-2-methyl-N-(1-oxothietan-3-yl)benzamide (O.27.43), fluxametamide (O.27.44), 5-[3-[2,6-dichloro-4-(3,3-dichloroallyloxy) phenoxy]propoxy]-1H-pyrazole (O.27.45), 3-(benzoylmethylamino)-N-[2-bromo-4-[1,2,2,3,3,3-hexafluoro-1-(trifluoromethyl)propyl]-6-(trifluoromethyl)phenyl]-2-fluoro-benzamide (O.27.46), 3-(benzoylmethylamino)-2-fluoro-N-[2-iodo-4-[1,2,2,2-tetrafluoro-1-(trifluoromethyl)ethyl]-6-(trifluoromethyl)phenyl]-benzamide (O.27.47), N-[3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide (O.27.48), N-[3-[[[2-bromo-4-[1,2,2,2-tetrafluoro-1-(trifluoromethyl)ethyl]-6-(trifluoromethyl)phenyl]amino]carbonyl]-2-fluorophenyl]-4-fluoro-N-methyl-benzamide (O.27.49), 4-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide (O.27.50), 3-fluoro-N-[2-fluoro-3-[[[2-iodo-4-[1,2,2,2-tetrafluoro-1-(trifluoromethyl)ethyl]-6-(trifluoromethyl)phenyl]amino]carbonyl]phenyl]-N-methyl-benzamide (O.27.51), 2-chloro-N-[3-[[[2-iodo-4-[1,2,2,2-tetrafluoro-1-(trifluoromethyl)ethyl]-6-(trifluoromethyl)phenyl]amino]carbonyl]phenyl]-3-pyridinecarboxamide (O.27.52), 4-cyano-N-[2-cyano-5-[[2,6-dibromo-4-[1,2,2,3,3,3-hexafluoro-1-(trifluoromethyl)propyl]phenyl]-carbamoyl]phenyl]-2-methyl-benzamide (O.27.53), 4-cyano-3-[(4-cyano-2-methyl-benzoyl)amino]-N-[2,6-dichloro-4-[1,2,2,3,3,3-hexafluoro-1-(trifluoromethyl)propyl]phenyl]-2-fluoro-benzamide (O.27.54), N-[5-[[2-chloro-6-cyano-4-[1,2,2,3,3,3-hexafluoro-1-(trifluoromethyl)propyl] phenyl]carbamoyl]-2-cyano-phenyl]-4-cyano-2-methyl-benzamide (O.27.55), N-[5-[[2-bromo-6-chloro-4-[2,2,2-trifluoro-1-hydroxy-1-(trifluoromethyl)ethyl]phenyl]carbamoyl]-2-cyano-phenyl]-4-cyano-2-methyl-benzamide (O.27.56), N-[5-[[2-bromo-6-chloro-4-[1,2,2,3,3,3-hexafluoro-1-(trifluoromethyl)-propyl]phenyl]carbamoyl]-2-cyano-phenyl]-4-cyano-2-methyl-benzamide (O.27.57), 4-cyano-N-[2-cyano-5-[[2,6-dichloro-4-[1,2,2,3,3,3-hexafluoro-1-(trifluoromethyl)propyl]phenyl]-carbamoyl]phenyl]-2-methyl-benzamide (O.27.58), 4-cyano-N-[2-cyano-5-[[2,6-dichloro-4-[1,2,2,2-tetrafluoro-1-(trifluoromethyl)ethyl]phenyl]carbamoyl]phenyl]-2-methyl-benzamide (O.27.59), N-[5-[[2-bromo-6-chloro-4-[1,2,2,2-tetrafluoro-1-(trifluoromethyl)ethyl] phenyl]carbamoyl]-2-cyano-phenyl]-4-cyano-2-methyl-benzamide (O.27.60), 2-(1,3-dioxan-2-yl)-6-[2-(3-pyridinyl)-5-thiazolyl]-pyridine; 2-[6-[2-(5-fluoro-3-pyridinyl)-5-thiazolyl]-2-pyridinyl]-pyrimidine (O.27.61), 2-[6-[2-(3-pyridinyl)-5-thiazolyl]-2-pyridinyl]-pyrimidine (O.27.62), N-methylsulfonyl-6-[2-(3-pyridyl)thiazol-5-yl]pyridine-2-carboxamide (O.27.63), N-methylsulfonyl-6-[2-(3-pyridyl)thiazol-5-yl]pyridine-2-carboxamide (O.27.64), N-ethyl-N-[4-methyl-2-(3-pyridyl)thiazol-5-yl]-3-methylthio-propanamide (O.27.65); N-methyl-N-[4-methyl-2-(3-pyridyl)thiazol-5-yl]-3-methylthio-propanamide (O.27.66), N,2-dimethyl-N-[4-methyl-2-(3-pyridyl)thiazol-5-yl]-3-methylthio-propanamide (O.27.67), N-ethyl-2-methyl-N-[4-methyl-2-(3-pyridyl)thiazol-5-yl]-3-methylthio-propanamide (O.27.68), N-[4-chloro-2-(3-pyridyl)thiazol-5-yl]-N-ethyl-2-methyl-3-methylthio-propanamide (O.27.69), N-[4-chloro-2-(3-pyridyl)thiazol-5-yl]-N,2-dimethyl-3-methylthio-propanamide (O.27.70), N-[4-chloro-2-(3-pyridyl)thiazol-5-yl]-N-methyl-3-methylthio-propanamide (O.27.71), N-[4-chloro-2-(3-pyridyl)thiazol-5-yl]-N-ethyl-3-methylthio-propanamide (O.27.72), 1-[(6-chloro-3-pyridinyl)methyl]-1,2,3,5,6,7-hexahydro-5-methoxy-7-methyl-8-nitro-imidazo[1,2-a] pyridine (O.27.73), 1-[(6-chloropyridin-3-yl)methyl]-7-methyl-8-nitro-1,2,3,5,6,7-hexahydroimidazo[1,2-a] pyridin-5-ol (O.27.74), 1-isopropyl-N,5-dimethyl-N-pyridazin-4-yl-pyrazole-4-carboxamide (O.27.75), 1-(1,2-dimethylpropyl)-N-ethyl-5-methyl-N-pyridazin-4-yl-pyrazole-4-carboxamide (O.27.76), N,5-dimethyl-N-pyridazin-4-yl-1-(2,2,2-trifluoro-1-methyl-ethyl)pyrazole-4-carboxamide (O.27.77), 1-[1-(1-cyanocyclopropyl)ethyl]-N-ethyl-5-methyl-N-pyridazin-4-yl-pyrazole-4-carboxamide (O.27.78), N-ethyl-1-(2-fluoro-1-methyl-propyl)-5-methyl-N-pyridazin-4-yl-pyrazole-4-carboxamide (O.27.79), 1-(1,2-dimethylpropyl)-N,5-dimethyl-N-pyridazin-4-yl-pyrazole-4-carboxamide (O.27.80), 1-[1-(1-cyano-cyclopropyl)ethyl]-N,5-dimethyl-N-pyridazin-4-yl-pyrazole-4-carboxamide (O.27.81), N-methyl-1-(2-fluoro-1-methyl-propyl]-5-methyl-N-pyridazin-4-yl-pyrazole-4-carboxamide (O.27.82), 1-(4,4-difluorocyclohexyl)-N-ethyl-5-methyl-N-pyridazin-4-yl-pyrazole-4-carboxamide (O.27.83), 1-(4,4-difluorocyclohexyl)-N,5-dimethyl-N-pyridazin-4-yl-pyrazole-4-carboxamide (O.27.84), N-(1-methylethyl)-2-(3-pyridinyl)-2H-indazole-4-carboxamide (O.27.85), N-cyclopropyl-2-(3-pyridinyl)-2H-indazole-4-carboxamide (O.27.86), N-cyclohexyl-2-(3-pyridinyl)-2H-indazole-4-carboxamide (O.27.87), 2-(3-pyridinyl)-N-(2,2,2-trifluoroethyl)-2H-indazole-4-carboxamide (O.27.88), 2-(3-pyridinyl)-N-[(tetrahydro-2-furanyl) methyl]-2H-indazole-5-carboxamide (O.27.89), methyl 2-[[2-(3-pyridinyl)-2H-indazol-5-yl]carbonyl] hydrazinecarboxylate (O.27.90), N-[(2,2-di-fluorocyclopropyl)methyl]-2-(3-pyridinyl)-2H-indazole-5-carboxamide (O.27.91), N-(2,2-difluoropropyl)-2-(3-pyridinyl)-2H-indazole-5-carboxamide (O.27.92), 2-(3-pyridinyl)-N-(2-pyrimidinylmethyl)-2H-indazole-5-carboxamide (O.27.93), N-[(5-methyl-2-pyrazinyl) methyl]-2-(3-pyridinyl)-2H-indazole-5-carboxamide (O.27.94), N-[3-chloro-1-(3-pyridyl)pyrazol-4-yl]-N-ethyl-3-(3,3,3-ti fluoropropylsulfanyl)propanamide (O.27.95), N-[3-chloro-1-(3-pyridyl)pyrazol-4-yl]-N-ethyl-3-(3,3,3-trifluoropropylsulfinyl)propanamide (O.27.96), N-[3-chloro-1-(3-pyridyl)pyrazol-4-yl]-3-[(2,2-difluorocyclopropyl)methyl-sulfanyl]-N-ethyl-propanamide (O.27.97), N-[3-chloro-1-(3-pyridyl) pyrazol-4-yl]-3-[(2,2-difluorocyclopropyl) methylsulfinyl]-N-ethyl-propanamide (O.27.98), sarolaner (O.27.99), lotilaner (O.27.100), 3-(2-chloro-thiazol-5-yl)-8-methyl-5-oxo-6-phenyl-2,3-dihydrothiazolo[3,2-1]pyrimidin-8-ium-7-olate (O.27.101), (3R)-3-(2-chlorothiazol-5-yl)-8-methyl-5-oxo-6-phenyl-2,3-dihydrothiazolo[3,2-1]pyrmidin-8-ium-7-olate (O.27.102), oxazo-sulfyl (O.27.103), N-[4-chloro-3-[[(phenylmethyl)amino]carbonyl]phenyl]-1-methyl-3-(1,1,2,2,2-pentafluoroethyl)-4-(trifluoromethyl)-1H-pyrazole-5-carboxamide (O.27.104), 2-[2-fluoro-4-methyl-5-(2,2,2-trifluoroethylsulfinyl)phenyl]-5-(trifluoromethyl)-1,2,4-trazol-3-amine (O.27.105), and 1-[2,4-dimethyl-5-(2,2,2-trifluoroethylsulfinyl)phenyl]-3-(trifluoromethyl)-1,2,4-trazole (O.27.106)

in a weight ratio of from 100:1 to 1:100.

2. A fungicidal mixture comprising active components 1), 2), and 3), wherein component 1) is at least one active compound I of the formula I as defined in claim 1, or an N-oxide, or an agriculturally useful salt thereof;

component 2) is at least one active compound II selected from groups A) to O) as defined for component 2) in claim 1, or an N-oxide, or an agriculturally useful salt thereof;

component 3) is at least one active compound Ill selected from groups A) to O) as defined for component 2) in claim 1, or an N-oxide, or an agriculturally useful salt thereof;

wherein the at least one active compound Ill of component 3) is not identical with the at least one active compound II of component 2).

3. The mixture according to claim 2, comprising the compound of formula I and the active compound II and the further active compound III in a synergistically effective amount.

4. The mixture according to claim 2, comprising the compound of formula I and the active compound II in a weight ratio of from 100:1 to 1:100, and the compound of formula I and the active compound III in a weight ratio of from 100:1 to 1:100.

5. The mixture according to claim 1, wherein $R^1$ and $R^2$ in compounds of the formula I are hydrogen, $R^3$ and $R^4$ is $C_1$-$C_6$-alkyl, $R^5$ and $R^6$ are halogen, $R^7$ and $R^8$ forms a phenyl, o is 0, and $R^9$ and $R^{10}$ are in each case independently selected from $C_1$-$C_6$-alkyl or $C_1$-$C_6$-halogenalkyl.

6. The mixture according to claim 1, wherein $R^1$ and $R^2$ in compounds of the formula I are hydrogen, $R^3$ and $R^4$ are $CH_3$, $R^5$ and $R^6$ is F, $R^7$ and $R^8$ forms a phenyl, o is 0 and $R^9$ and $R^{10}$ are in each case independently selected from $CH_3$ or $CHF_2$.

7. An agrochemical mixture, comprising a solvent or solid carrier and a mixture according to claim 1.

8. The mixture according to claim 1 for controlling phytopathogenic harmful fungi.

9. The mixture according to claim 8, for use against grey mold and white mold diseases.

10. The mixture according to claim 8, for use against rice leaf, neck, collar and panicle blast.

11. The mixture according to claim 8, for use against pomefruit and stonefruit diseases.

12. The mixture according to claim 8, for use against *Rhizoctonia* diseases in crops.

13. The mixture according to claim 8, for use against storage disease complexes in pome and stonefruits.

14. The mixture according to claim 8, for use against soil and seedbome pathogens.

15. A method for controlling phytopathogenic harmful fungi, comprising treating the fungi, their habitat or the seed, the soil or the plants to be protected against fungal attack with an effective amount of the compound I as defined in claim 1.

16. The mixture according to claim 12 wherein the crop is turf, a cereal, leafy vegetable, or potato.

* * * * *